US010955644B2

(12) United States Patent
Kawamura et al.

(10) Patent No.: US 10,955,644 B2
(45) Date of Patent: Mar. 23, 2021

(54) ZOOM OPTICAL SYSTEM, IMAGE PICKUP OPTICAL SYSTEM, AND IMAGE PICKUP APPARATUS USING THE SAME

(71) Applicant: OLYMPUS CORPORATION, Hachioji (JP)

(72) Inventors: Kazuteru Kawamura, Hachioji (JP); Yasuharu Yamada, Sagamihara (JP); Toyoki Kon, Kokubunji (JP); Yuki Kubota, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 159 days.

(21) Appl. No.: 16/231,522

(22) Filed: Dec. 23, 2018

(65) Prior Publication Data

US 2019/0196157 A1 Jun. 27, 2019

(30) Foreign Application Priority Data

Dec. 25, 2017 (JP) ............................ JP2017-247943
Dec. 28, 2017 (JP) ............................ JP2017-254177
Jan. 16, 2018 (JP) ............................ JP2018-005224

(51) Int. Cl.

| | |
|---|---|
| ***G02B 15/14*** | (2006.01) |
| ***G02B 13/02*** | (2006.01) |
| ***G02B 7/04*** | (2021.01) |
| ***G02B 27/00*** | (2006.01) |
| ***G02B 13/06*** | (2006.01) |
| ***G02B 15/173*** | (2006.01) |

(52) U.S. Cl.

CPC .............. *G02B 13/02* (2013.01); *G02B 7/04* (2013.01); *G02B 13/06* (2013.01); *G02B 15/173* (2013.01); *G02B 27/0025* (2013.01)

(58) Field of Classification Search

CPC .......... G02B 13/02; G02B 7/04; G02B 13/06; G02B 15/173; G02B 27/0025
USPC ................ 359/676, 681, 682, 683, 689, 745
See application file for complete search history.

(56) References Cited

U.S. PATENT DOCUMENTS

2004/0070844 A1 4/2004 Sato
2005/0157403 A1 7/2005 Sato
(Continued)

FOREIGN PATENT DOCUMENTS

JP 2000171708 A 6/2000
JP 2004145304 A 5/2004
(Continued)

*Primary Examiner* — William Choi
(74) *Attorney, Agent, or Firm* — Holtz, Holtz & Volek PC

(57) ABSTRACT

A zoom optical system includes a front-side lens unit, an intermediate lens unit, and a rear-side lens unit. The front-side lens unit includes a first front unit and a second front unit, and a distance between the first front unit and the second front unit is wider at a telephoto end than at a wide angle end. The intermediate lens unit includes a first intermediate unit and a second intermediate unit, and a distance between the first intermediate unit and the second intermediate unit is narrower at the telephoto end than at the wide angle end. A distance between the second intermediate unit and a lens unit adjacent to the second intermediate unit varies. The second intermediate unit moves at the time of focusing, and the following conditional expressions (1) and (2) are satisfied:

$$0.9 \le LTLT/LTLW \le 1.17 \quad (1)$$

$$4.2 \le KMBT \le 20.0 \quad (2).$$

12 Claims, 120 Drawing Sheets

(56) References Cited

U.S. PATENT DOCUMENTS

| | | | | |
|---|---|---|---|---|
| 2006/0279850 | A1* | 12/2006 | Horiuchi .............. | G02B 15/173 359/676 |
| 2013/0120853 | A1* | 5/2013 | Hagiwara ............ | G02B 15/173 359/684 |
| 2013/0208155 | A1 | 8/2013 | Hatada | |
| 2013/0308041 | A1 | 11/2013 | Hatada | |
| 2017/0184824 | A1 | 6/2017 | Bito | |
| 2018/0284478 | A1 | 10/2018 | Bito | |

FOREIGN PATENT DOCUMENTS

| | | | |
|---|---|---|---|
| JP | 2013167749 | A | 8/2013 |
| JP | 2013250290 | A | 12/2013 |
| JP | 5409841 | B2 | 2/2014 |
| JP | 2015125385 | A | 7/2015 |
| JP | 2016126278 | A | 7/2016 |
| JP | 2017120382 | A | 7/2017 |

* cited by examiner

SA
FNO 4.586

AS
FIY 10.81

DT
FIY 10.81

CC
FIY 10.81

SA
FNO 5.148

AS
FIY 10.81

DT
FIY 10.81

CC
FIY 10.81

SA
FNO 5.778

AS
FIY 10.81

DT
FIY 10.81

CC
FIY 10.81

435.84
486.13
656.27
587.56

SA
FNO 4.596

AS
FIY 10.81

DT
FIY 10.81

CC
FIY 10.81

SA
FNO 5.028

AS
FIY 10.81

DT
FIY 10.81

CC
FIY 10.81

SA
FNO 5.783

AS
FIY 10.81

DT
FIY 10.81

CC
FIY 10.81

SA
FNO 4.597

AS
FIY 10.81

DT
FIY 10.81

CC
FIY 10.81

SA
FNO 4.597

AS
FIY 10.81

DT
FIY 10.81

CC
FIY 10.81

SA
FNO 4.597

AS
FIY 10.81

DT
FIY 10.81

CC
FIY 10.81

SA
FNO 4.568

AS
FIY 10.81

DT
FIY 10.81

CC
FIY 10.81

SA
FNO 4.568

AS
FIY 10.81

DT
FIY 10.81

CC
FIY 10.81

SA
FNO 4.568

AS
FIY 10.81

DT
FIY 10.81

CC
FIY 10.81

SA
FNO 5.707

AS
FIY 10.81

DT
FIY 10.81

CC
FIY 10.81

SA
FNO 5.707

AS
FIY 10.81

DT
FIY 10.81

CC
FIY 10.81

SA
FNO 5.707

AS
FIY 10.81

DT
FIY 10.81

CC
FIY 10.81

SA
FNO 4.552

AS
FIY 10.81

DT
FIY 10.81

CC
FIY 10.81

SA
FNO 4.551

AS
FIY 10.81

DT
FIY 10.81

CC
FIY 10.81

SA
FNO 4.551

AS
FIY 10.81

DT
FIY 10.81

CC
FIY 10.81

SA
FNO 5.690

AS
FIY 10.81

DT
FIY 10.81

CC
FIY 10.81

SA
FNO 5.689

AS
FIY 10.81

DT
FIY 10.81

CC
FIY 10.81

SA
FNO 5.689

AS
FIY 10.81

DT
FIY 10.81

CC
FIY 10.81

SA
FNO 5.721

AS
FIY 10.81

DT
FIY 10.81

CC
FIY 10.81

SA
FNO 5.721

AS
FIY 10.81

DT
FIY 10.81

CC
FIY 10.81

SA
FNO 5.721

AS
FIY 10.81

DT
FIY 10.81

CC
FIY 10.81

SA
FNO 4.580

AS
FIY 10.81

DT
FIY 10.81

CC
FIY 10.81

SA
FNO 4.580

AS
FIY 10.81

DT
FIY 10.81

CC
FIY 10.81

SA
FNO 4.580

AS
FIY 10.81

DT
FIY 10.81

CC
FIY 10.81

SA
FNO 5.719

AS
FIY 10.81

DT
FIY 10.81

CC
FIY 10.81

SA
FNO 5.720

AS
FIY 10.81

DT
FIY 10.81

CC
FIY 10.81

SA
FNO 5.720

AS
FIY 10.81

DT
FIY 10.81

CC
FIY 10.81

SA
FNO 5.745

AS
FIY 10.81

DT
FIY 10.81

CC
FIY 10.81

SA
FNO 5.745

AS
FIY 10.81

DT
FIY 10.81

CC
FIY 10.81

SA
FNO 5.745

AS
FIY 10.81

DT
FIY 10.81

CC
FIY 10.81

SA
FNO 2.915

AS
FIY 10.81

DT
FIY 10.81

CC
FIY 10.81

SA
FNO 2.915

AS
FIY 10.81

DT
FIY 10.81

CC
FIY 10.81

SA
FNO 2.915

AS
FIY 10.81

DT
FIY 10.81

CC
FIY 10.81

SA
FNO 4.486

AS
FIY 10.81

DT
FIY 10.81

CC
FIY 10.81

SA
FNO 4.486

AS
FIY 10.81

DT
FIY 10.81

CC
FIY 10.81

SA
FNO 4.485

AS
FIY 10.81

DT
FIY 10.81

CC
FIY 10.81

SA
FNO 4.557

AS
FIY 10.81

DT
FIY 10.81

CC
FIY 10.81

SA
FNO 4.557

AS
FIY 10.81

DT
FIY 10.81

CC
FIY 10.81

SA
FNO 4.557

AS
FIY 10.81

DT
FIY 10.81

CC
FIY 10.81

SA
FNO 5.695

AS
FIY 10.81

DT
FIY 10.81

CC
FIY 10.81

SA
FNO 5.696

AS
FIY 10.81

DT
FIY 10.81

CC
FIY 10.81

SA
FNO 5.695

AS
FIY 10.81

DT
FIY 10.81

CC
FIY 10.81

SA
FNO 4.080

AS
FIY 10.81

DT
FIY 10.81

CC
FIY 10.81

SA
FNO 4.310

AS
FIY 10.81

DT
FIY 10.81

CC
FIY 10.81

SA
FNO 4.581

AS
FIY 10.81

DT
FIY 10.81

CC
FIY 10.81

SA
FNO 4.587

AS
FIY 10.81

DT
FIY 10.81

CC
FIY 10.81

SA
FNO 4.588

AS
FIY 10.81

DT
FIY 10.81

CC
FIY 10.81

SA
FNO 4.587

AS
FIY 10.81

DT
FIY 10.81

CC
FIY 10.81

SA
FNO 4.776

AS
FIY 10.81

DT
FIY 10.81

CC
FIY 10.81

SA
FNO 5.127

AS
FIY 10.81

DT
FIY 10.81

CC
FIY 10.81

SA
FNO 5.308

AS
FIY 10.81

DT
FIY 10.81

CC
FIY 10.81

SA
FNO 4.587

AS
FIY 10.81

DT
FIY 10.81

CC
FIY 10.81

SA
FNO 4.589

AS
FIY 10.81

DT
FIY 10.81

CC
FIY 10.81

SA
FNO 4.593

AS
FIY 10.81

DT
FIY 10.81

CC
FIY 10.81

SA
FNO 4.551

AS
FIY 10.81

DT
FIY 10.81

CC
FIY 10.81

SA
FNO 5.065

AS
FIY 10.81

DT
FIY 10.81

CC
FIY 10.81

SA
FNO 5.796

AS
FIY 10.81

DT
FIY 10.81

CC
FIY 10.81

435.84 — — — — –
486.13 —·—·—·—
656.27 - - - - - - - -
587.56 ————

SA
FNO 4.580

AS
FIY 10.81

DT
FIY 10.81

CC
FIY 10.81

SA
FNO 4.580

AS
FIY 10.81

DT
FIY 10.81

CC
FIY 10.81

SA
FNO 4.580

AS
FIY 10.81

DT
FIY 10.81

CC
FIY 10.81

SA
FNO 4.552

AS
FIY 10.81

DT
FIY 10.81

CC
FIY 10.81

SA
FNO 4.551

AS
FIY 10.81

DT
FIY 10.81

CC
FIY 10.81

SA
FNO 4.551

AS
FIY 10.81

DT
FIY 10.81

CC
FIY 10.81

435.84 – – – – – –
486.13 —·—·—
656.27 - - - - - - - -
587.56 ————

SA
FNO 4.564

AS
FIY 10.81

DT
FIY 10.81

CC
FIY 10.81

SA
FNO 4.564

AS
FIY 10.81

DT
FIY 10.81

CC
FIY 10.81

SA
FNO 4.565

AS
FIY 10.81

DT
FIY 10.81

CC
FIY 10.81

SA
FNO 4.583

AS
FIY 10.81

DT
FIY 10.81

CC
FIY 10.81

SA
FNO 4.582

AS
FIY 10.81

DT
FIY 10.81

CC
FIY 10.81

SA
FNO 4.584

AS
FIY 10.81

DT
FIY 10.81

CC
FIY 10.81

SA
FNO 4.580

AS
FIY 10.81

DT
FIY 10.81

CC
FIY 10.81

SA
FNO 4.580

AS
FIY 10.81

DT
FIY 10.81

CC
FIY 10.81

SA
FNO 4.580

AS
FIY 10.81

DT
FIY 10.81

CC
FIY 10.81

ZOOM OPTICAL SYSTEM, IMAGE PICKUP OPTICAL SYSTEM, AND IMAGE PICKUP APPARATUS USING THE SAME

CROSS-REFERENCE TO RELATED APPLICATION

The present application is based upon and claims the benefit of priority from the prior Japanese Patent Application Nos. 2017-247943 filed on Dec. 25, 2017, 2017-254177 filed on Dec. 28, 2017, and 2018-005224 filed on Jan. 16, 2018; the entire contents of which are incorporated herein by reference.

BACKGROUND OF THE INVENTION

Field of the Invention

The present invention relates to a zoom optical system, an image pickup optical system, and an image pickup apparatus using the same.

Description of the Related Art

In photography using a telephoto lens and a super-telephoto lens (hereinafter, referred to as 'telephoto lenses'), it is possible to achieve an effect of drawing an object which is far away or an object which is small before eyes of a photographer. For this reason, telephoto lenses have widely been used for photographing of various scenes such as photography of sport scenes, photography of wild animals such as wild birds, photography of astronomical objects, and the like.

In the photography of abovementioned scenes, superiority of a mobility of an image pickup apparatus becomes significant. Here, the mobility refers to an ease of carrying, a stability at the time of hand-held photography, and a rapidity of focusing speed. For making an apparatus to be one with a superior mobility, an optical system which is small-sized and light-weight is desirable. Moreover, a capability of an optical system to focus as quickly as possible is a significant factor which determines the superiority of the mobility the optical system.

An optical system with a telephoto lens having a zoom function (hereinafter, referred to as 'telephoto zoom') becomes heavier as compared to an optical system not having the zoom function. Particularly, since a telephoto zoom with an extremely small angle of view, such as a super-telephoto zoom, is large and heavy, the hand-held photography is difficult. Therefore, in photography by the super-telephoto zoom, generally, the photography is carried out in a state of the super-telephoto zoom fixed to a tripod.

In the photography, travelling to the scene of photography carrying the super-telephoto zoom and tripod, fixing the super-telephoto zoom to the tripod, and framing are carried out. In this case, since it takes time till the framing is done, a possibility of missing a chance of capturing becomes high. Moreover, carrying the heavy super-telephoto zoom and tripod makes it difficult to travel speedily, and the mobility is impaired.

For securing the mobility, the optical system is to be made small-sized and light-weight. However, when the optical system is made small-sized and light-weight, a zoom ratio becomes small. When the zoom ratio becomes small, it is not possible to cope with various photography scenes.

Moreover, in a case in which the movement of the object is fast, when a focusing speed is slow, a focusing while tracking the movement of the object becomes difficult. Consequently, photography of a fast-moving object becomes difficult.

Moreover, when the hand-held photography is carried out, an optical system is required to have a small F-number and an ability to correct an image blur due to camera shake.

Telephoto zooms are disclosed in Japanese Patent Application Laid-open Publication No. 2013-167749 (first example), Japanese Patent Application Laid-open Publication No. 2004-145304 (first example), Japanese Patent Application Laid-open Publication No. 2015-125385 (first example), Japanese Patent Application Laid-open Publication No. 2017-120382 (first example), and Japanese Patent Application Laid-open Publication No. 2016-126278 (first example).

In the Japanese Patent Application Laid-open Publication No. 2013-167749, a zoom lens (first example) includes in order from an object side, a first lens unit having a positive refractive power, a second lens unit having a negative refractive power, a third lens unit having a positive refractive power, and a fourth lens unit having a positive refractive power. At a time of zooming, the second lens unit and the third lens unit move.

In the Japanese Patent Application Laid-open Publication No. 2004-145304, a zoom lens (first example) includes in order from an object side, a first lens unit having a positive refractive power, a second lens unit having a negative refractive power, a third lens unit having a positive refractive power, and a fourth lens unit having a positive refractive power. At a time of zooming, the second lens unit and the third lens unit move.

In the Japanese Patent Application Laid-open Publication No. 2015-125385, a zoom lens (first example) includes in order from an object side, a first lens unit having a positive refractive power, a second lens unit having a negative refractive power, a third lens unit having a positive refractive power, a fourth lens unit having a negative refractive power, a fifth lens unit having a positive refractive power, and a sixth lens unit having a negative refractive power. At a time of zooming, the first lens unit, the third lens unit, the fifth lens unit, and the sixth lens unit move.

In the Japanese Patent Application Laid-open Publication No. 2017-120382, a zoom lens (first example) includes in order from an object side, a first lens unit having a positive refractive power, a second lens unit having a negative refractive power, a third lens unit having a positive refractive power, a fourth lens unit having a negative refractive power, and a fifth lens unit having a negative refractive power. At a time of zooming, the first lens unit, the third lens unit, the fourth lens unit, and the fifth lens unit move.

In the Japanese Patent Application Laid-open Publication No. 2016-126278, a zoom lens (first example) includes in order from an object side, a first lens unit having a positive refractive power, a second lens unit having a negative refractive power, a third lens unit having a positive refractive power, a fourth lens unit having a positive refractive power, a fifth lens unit having a negative refractive power, and a sixth lens unit having a positive refractive power. At a time of zooming, the second lens unit, the third lens unit, the fourth lens unit, and the fifth lens unit move.

Moreover, as a method for further increasing a magnification ratio of photography, a method by using a teleconverter lens is available. Teleconverter lenses are of two types, a rear teleconverter lens and a front teleconverter lens.

Generally, a rear teleconverter lens is used for the teleconverter lens. The rear teleconverter lens is to be mounted at an end of a lens that is used for photography (hereinafter, referred to as 'taking lens'). Therefore, the rear teleconverter lens is positioned between the taking lens and a camera body.

The rear teleconverter lens is mounted by the following procedure. To begin with, the taking lens is removed from the camera body. Next, the rear teleconverter lens is mounted on the taking lens. Thereafter, the taking lens is remounted on the camera body via the rear teleconverter lens. However, the taking lens may be mounted after mounting the rear teleconverter lens on the camera body.

In such manner, while using the rear teleconverter lens, the taking lens is to be removed and mounted. Consequently, it is difficult to mount the teleconverter lens quickly. As a result, a chance of capturing may be missed out.

The front teleconverter lens is to be mounted at a front end of a taking lens. Therefore, while using the front teleconverter lens, the taking lens is not to be removed and mounted. As a result, it is possible to mount the front teleconverter lens quickly as compared to the rear teleconverter lens. It is possible to shorten a time till getting ready for photography.

However, even while using the front teleconverter lens, the lens is to be mounted similarly as while using the rear teleconverter lens. In this case, since there is a loss of time due to mounting, a possibility of missing out a chance of capturing becomes high.

In a taking lens, as the magnification ratio of photography becomes higher, an overall length of an optical system becomes longer. Moreover, as the magnification ratio of photography becomes higher, a diameter of a lens positioned on an object side becomes large. Consequently, with the magnification ratio of photography becoming high, in the front teleconverter lens, a diameter of a lens becomes large, and a weight also becomes heavy.

As mentioned above, it is possible to mount the front teleconverter lens without removing the taking lens from the camera body. However, in a case in which the magnification ratio of photography of the taking lens is high, it is not easy to mount the front teleconverter lens which is large and heavy, on the taking lens in a short time.

Moreover, whether it is front teleconverter lens or rear teleconverter lens, when mounted on the taking lens, an overall length of the optical system changes. Consequently, a position of the center of gravity of the optical system varies.

Particularly, the front teleconverter lens is mounted at a front end of the taking lens. In that case, the position of the center of gravity of the optical system varies substantially before mounting the lens and after mounting the lens. Therefore, even with a tripod being used, it becomes difficult to keep the camera in a stable state.

The rear converter lens and the front converter lens are converter lenses of a type in which a lens is mounted at an end of a taking lens (hereinafter, referred to as 'mounting type'). On the other hand, there is a converter lens of a type in which a lens is inserted into and drawn out from a taking lens (hereinafter, referred to as 'insertion type').

In the converter lens of insertion type, it is not necessary to remove the taking lens from the camera body at the time of use. Therefore, similarly as the front teleconverter lens, it is possible to shorten the time till getting ready for photography, to be shorter as compared to that for the rear teleconverter lens.

Optical systems including a converter lens are disclosed in Japanese Patent Application Laid-open Publication No. 2013-250290 (first example), Japanese Patent Application Laid-open Publication No. 2000-171708 (first example), and Japanese Patent Publication No. 5409841 (first example).

In Japanese Patent Application Laid-open Publication No. 2013-250290, a rear converter lens is mounted on an image side of a taking optical system. In an example 1, the taking optical system includes a first lens unit having a positive refractive power, a second lens unit having a negative refractive power, and a third lens unit having a positive refractive power. The rear converter lens has a negative refractive power.

In Japanese Patent Application Laid-open Publication No. 2000-171708, a teleconverter lens is mounted in front of a taking lens. In the example 1, the taking lens includes a first lens unit having a positive refractive power, a second lens unit having a negative refractive power, a third lens unit having a positive refractive power, and a fourth lens unit having a positive refractive power. The converter lens has a negative refractive power.

In Japanese Patent Publication No. 5409841, a converter lens has been inserted into a taking lens system. In the example 1, the taking lens system includes a first lens unit having a positive refractive power, a second lens unit having a negative refractive power, a third lens unit having a positive refractive power, and a fourth lens unit having a positive refractive power. The converter lens is inserted into the fourth lens unit.

SUMMARY OF THE INVENTION

A zoom optical system according to at least some embodiments of the present invention comprises:

a front-side lens unit which is disposed nearest to an object, an intermediate lens unit, and a rear-side lens unit which is disposed nearest to an image, wherein the front-side lens unit includes in order from an object side, a first front unit having a positive refractive power and a second front unit having a negative refractive power, and each of the first front unit and the second front unit includes a positive lens and a negative lens, and a distance between the first front unit and the second front unit is wider at a telephoto end than at a wide angle end, and the intermediate lens unit includes in order from the object side, a first intermediate unit having a positive refractive power and a second intermediate unit having a negative refractive power, and the first intermediate unit includes a positive lens and a negative lens, and a distance between the first intermediate unit and the second front unit is narrower at the telephoto end than at the wide angle end, and a distance between the second intermediate unit and a lens unit adjacent to the second intermediate unit on an image side varies at a time of zooming or at a time of focusing, and the second intermediate unit moves toward the image side at the time of focusing from a far point to a near point, and the rear-side lens unit includes a positive lens and a negative lens, and the following conditional expressions (1) and (2) are satisfied:

$$0.9 \leq LTLT/LTLW \leq 1.17 \quad (1)$$

$$4.2 \leq KMBT \leq 20.0 \quad (2)$$

where,

LTLW denotes an overall length of the zoom optical system at the wide angle end, LTLT denotes an overall length of the zoom optical system at the telephoto end, and here the overall length is a distance from a lens surface positioned nearest to the object up to an image plane, $$KMBT=|MGMBTback^2\times(MGMBT^2-1)|, \text{ where}$$

MGMBTback denotes a lateral magnification of a first predetermined optical system at the telephoto end, and MGMBT denotes a lateral magnification of the second intermediate unit at the telephoto end, and here the first predetermined optical system is an optical system which includes all lenses positioned on the image side of the second intermediate unit, and the lateral magnification is a lateral magnification at a time of an infinite object point focusing.

Moreover, another zoom optical system according to at least some other embodiments of the present invention comprises:

a front-side lens unit which is disposed nearest to an object, an intermediate lens unit, and a rear-side lens unit which is disposed nearest to an image, wherein the front-side lens unit includes in order from an object side, a first front unit having a positive refractive power and a second front unit having a negative refractive power, and each of the first front unit and the second front unit includes a positive lens and a negative lens, and a distance between the first front unit and the second front unit is wider at a telephoto end than at a wide angle end, and the intermediate lens unit includes in order from the object side, a first intermediate unit having a positive refractive power and a second intermediate unit having a negative refractive power, and the first intermediate unit includes a positive lens and a negative lens, and a distance between the first intermediate unit and the second front unit is narrower at the telephoto end than at the wide angle end, and a distance between the second intermediate unit and a lens unit adjacent to the second intermediate unit on an image side varies at a time of zooming or at a time of focusing, and the second intermediate unit moves toward the image side at the time of focusing from a far point to a near point, and the rear-side lens unit includes a positive lens and a negative lens, and a motion blur correction lens unit is included between the first intermediate unit and an image plane, and an image blur is corrected by the motion blur correction lens unit being moved in a direction perpendicular to an optical axis, and the following conditional expression (1) is satisfied:

$$0.9\leq LTLT/LTLW\leq 1.17 \quad (1)$$

where,

LTLW denotes an overall length of the zoom optical system at the wide angle end, and LTLT denotes an overall length of the zoom optical system at the telephoto end, and here the overall length is a distance from a lens surface positioned nearest to the object up to an image plane.

Moreover, another zoom optical system according to at least some other embodiments of the present invention comprises a front-side lens unit which is disposed nearest to an object, an intermediate lens unit, and a rear-side lens unit which is disposed nearest to an image, wherein the front-side lens unit includes in order from an object side, a first front unit having a positive refractive power and a second front unit having a negative refractive power, and each of the first front unit and the second front unit includes a positive lens and a negative lens, and a distance between the first front unit and the second front unit is wider at a telephoto end than at a wide angle end, and the intermediate lens unit includes in order from the object side, a first intermediate unit having a positive refractive power and second intermediate unit having a negative refractive power, and the first intermediate unit includes a positive lens and a negative lens, and a distance between the first intermediate unit and the second front unit is narrower at the telephoto end than at the wide angle end, and a distance between the second intermediate unit and a lens unit adjacent to the second intermediate unit on an image side varies at a time of zooming or at a time of focusing, and the second intermediate unit moves toward the image side at the time of focusing from a far point to a near point, and the rear-side lens unit includes a positive lens and a negative lens, and a motion blur correction lens unit is included between the first intermediate unit and an image plane, and an image blur is corrected by the motion blur correction lens unit being moved in a direction perpendicular to an optical axis, and the following conditional expressions (1) and (2') are satisfied:

$$0.9\leq LTLT/LTLW\leq 1.17 \quad (1)$$

$$2.5\leq KMBT\leq 20.0 \quad (2')$$

where,

LTLW denotes an overall length of the zoom optical system at the wide angle end, LTLT denotes an overall length of the zoom optical system at the telephoto end, and here the overall length is a distance from a lens surface positioned nearest to the object up to an image plane, where $$KMBT=|MGMBTback^2\times(MGMBT^2-1)|, \text{ where}$$

MGMBTback denotes a lateral magnification of a first predetermined optical system at the telephoto end, and MGMBT denotes a lateral magnification of the second intermediate unit at the telephoto end, and here the first predetermined optical system is an optical system which includes all lenses positioned on the image side of the second intermediate unit, and the lateral magnification is a lateral magnification at a time of infinite object point focusing.

A zoom optical system according to at least some other embodiments of the present invention comprises:

a front-side lens unit which is disposed nearest to an object, an intermediate lens unit, and a rear-side lens unit which is disposed nearest to an image, wherein the front-side lens unit includes in order from an object side, a first front unit having a positive refractive power and a second front unit having a negative refractive power, and each of the first front unit and the second front unit includes a positive lens and a negative lens, and a distance between the first front unit and the second front unit is wider at a telephoto end than at a wide angle end, and the intermediate lens unit includes in order from the object side, a first intermediate unit, and a second intermediate unit having a negative refractive power, and the first intermediate unit includes in order from the object side, a first sub unit having a positive refractive power and a second sub unit having a positive refractive power, and the first intermediate unit as a whole, includes a positive lens and a negative lens, and a distance between the first sub unit and the second front unit is narrower at the telephoto end than at the wide angle end, and a distance between the second intermediate unit and a lens unit adjacent to the second intermediate unit on an image side varies at a time of zooming or at a time of focusing, and the second intermediate unit moves toward the image side at the time of focusing from a far point to a near point, and the rear-side lens unit includes a positive lens, and a motion blur correction lens unit having a negative refractive power is included between the first sub unit and an image plane, and an image blur is corrected by the motion blur correction lens unit being moved in a direction perpendicular to an optical axis, and the following conditional expressions (1) and (2a) are satisfied:

$$0.9 \leq LTLT/LTLW \leq 1.17 \quad (1)$$

$$4.4 \leq KMBT \leq 20.0 \quad (2a)$$

where,

LTLW denotes an overall length of the zoom optical system at the wide angle end, LTLT denotes an overall length of the zoom optical system at the telephoto end, and here the overall length is a distance from a lens surface positioned nearest to the object up to an image plane, $KMBT = |MGMBT\text{back}^2 \times (MGMBT^2 - 1)|$, where MGMBTback denotes a lateral magnification of a first predetermined optical system at the telephoto end, MGMBT denotes a lateral magnification of the second intermediate unit at the telephoto end, and here the first predetermined optical system is an optical system which includes all lenses positioned on the image side of the second intermediate unit, and the lateral magnification is a lateral magnification at a time of infinite object point focusing.

Another zoom optical system according to at least some other embodiments of the present invention comprises:

a front-side lens unit which is disposed nearest to an object, an intermediate lens unit, and a rear-side lens unit which is disposed nearest to an image, wherein the front-side lens unit includes in order from an object side, a first front unit having a positive refractive power and a second front unit having a negative refractive power, and each of the first front unit and the second front unit includes a positive lens and a negative lens, and a distance between the first front unit and the second front unit is wider at a telephoto end than at a wide angle end, and the intermediate lens unit includes in order from the object side, a first intermediate unit, and a second intermediate unit having a negative refractive power, and the first intermediate unit includes in order from the object side, a first sub unit having a positive refractive power and a second sub unit having a positive refractive power, and the first intermediate unit as a whole, includes a positive lens and a negative lens, and a distance between the first sub unit and the second front unit is narrower at the telephoto end than at the wide angle end, and a distance between the second intermediate unit and a lens unit adjacent to the second intermediate unit on an image side varies at a time of zooming or at a time of focusing, and the second intermediate unit moves toward the image side at the time of focusing from a far point to a near point, and the rear-side lens unit includes a positive lens, and a motion blur correction lens unit having a negative refractive power is included between the first sub unit and an image plane, and an image blur is corrected by the motion blur correction lens unit being moved in a direction perpendicular to an optical axis, and in a lens unit which includes the motion blur correction lens unit, a position is fixed at the time of zooming and at the time of focusing, and the following conditional expression (1) is satisfied.

$$0.9 \leq LTLT/LTLW \leq 1.17 \quad (1)$$

where,

LTLW denotes an overall length of the zoom optical system at the wide angle end, and LTLT denotes an overall length of the zoom optical system at the telephoto end, and here the overall length is a distance from a lens surface positioned nearest to the object up to an image plane.

Another zoom optical system according to at least some other embodiments of the present invention comprises:

a front-side lens unit which is disposed nearest to an object, an intermediate lens unit, and a rear-side lens unit which is disposed nearest to an image, wherein the front-side lens unit includes in order from an object side, a first front unit having a positive refractive power and a second front unit having a negative refractive power, and each of the first front unit and the second front unit includes a positive lens and a negative lens, and a distance between the first front unit and the second front unit is wider at a telephoto end than at a wide angle end, and the intermediate lens unit includes in order from the object side, a first intermediate unit, and a second intermediate unit having a negative refractive power, and the first intermediate unit includes in order from the object side, a first sub unit having a positive refractive power and a second sub unit having a positive refractive power, and the first intermediate unit as a whole, includes a positive lens and a negative lens, and a distance between the first sub unit and the second front unit is narrower at the telephoto end than at the wide angle end, and a distance between the second intermediate unit and a lens unit adjacent to the second intermediate unit on an image side varies at a time of zooming or at a time of focusing, and the second intermediate unit moves toward an image side at the time of focusing from a far point to a near point, and the rear-side lens unit includes a positive lens, and a motion blur correction lens unit having a negative refractive power is disposed in a rear-side lens unit, and an image blur is corrected by the motion blur correction lens unit being moved in a direction perpendicular to an optical axis, and the following conditional expression (1) is satisfied:

$$0.9 \leq LTLT/LTLW \leq 1.17 \quad (1)$$

where,

LTLW denotes an overall length of the zoom optical system at the wide angle end, and LTLT denotes an overall length of the zoom optical system at the telephoto end, and here the overall length is a distance from a lens surface positioned nearest to the object up to an image plane.

Another zoom optical system according to at least some other embodiments of the present invention comprises a front-side lens unit which is disposed nearest to an object, an intermediate lens unit, and a rear-side lens unit which is disposed nearest to an image, wherein the front-side lens unit includes in order from an object side, a first front unit having a positive refractive power and a second front unit having a negative refractive power, and each of the first front unit and the second front unit includes a positive lens and a negative lens, and a distance between the first front unit and the second front unit is wider at a telephoto end that at a wide angle end, and the intermediate lens unit includes in order from the object side, a first intermediate unit, and a second intermediate unit having a negative refractive power, and the first intermediate unit includes in order from the object side, a first sub unit having a positive refractive power and a second sub unit having a positive refractive power, and the first intermediate unit as a whole, includes a positive lens and a negative lens, and a distance between the first sub unit and the second front unit is narrower at the telephoto end than at the wide angle end, and a distance between the second intermediate unit and a lens unit adjacent to the second intermediate unit on an image side varies at a time of zooming or at a time of focusing, and the second intermediate unit moves toward an image side at the time of focusing from a far point to a near point, and the rear-side lens unit includes a positive lens, and a motion blur correction lens unit having a negative refractive power is disposed in a lens unit having a positive refractive power in the first intermediate unit, and an image blur is corrected by the motion blur correction lens unit being moved in a direction perpendicular to an optical axis, and in a lens unit which includes the motion blur correction lens unit, a position is fixed at the time of zooming and at the time of focusing, and the following conditional expression (1) is satisfied:

$$0.9 \leq LTLT/LTLW \leq 1.17 \quad (1)$$

where,

LTLW denotes an overall length of the zoom optical system at the wide angle end, and LTLT denotes an overall length of the zoom optical system at the telephoto end, and here the overall length is a distance from a lens surface positioned nearest to the object up to an image plane.

Another zoom optical system according to at least some other embodiments of the present invention comprises:

a front-side lens unit which is disposed nearest to an object, an intermediate lens unit, and a rear-side lens unit which is disposed nearest to an image, wherein the front-side lens unit includes in order from an object side, a first front unit having a positive refractive power and a second front unit having a negative refractive power, and each of the first front unit and the second front unit includes a positive lens and a negative lens, and a distance between the first front unit and the second front unit is wider at a telephoto end than at a wide angle end, and the intermediate lens unit includes in order from the object side, a first intermediate unit, and a second intermediate unit having a negative refractive power, and the first intermediate unit includes in order from the object side, a first sub unit having a positive refractive power and a second sub unit having a positive refractive power, and the first intermediate unit as a whole, includes a positive lens and a negative lens, and a distance between the first sub unit and the second front unit is narrower at the telephoto end than at the wide angle end, and a distance between the second intermediate unit and a lens unit adjacent to the second intermediate unit on an image side varies at a time of zooming or at a time of focusing, and the second intermediate unit moves toward an image side at the time of focusing from a far point to a near point, and the rear-side lens unit includes a positive lens, and the following conditional expressions (1) and (2a') are satisfied:

$$0.9 \leq LTLT/LTLW \leq 1.17 \quad (1)$$

$$4.7 \leq KMBT \leq 20.0 \quad (2a')$$

where,

LTLW denotes an overall length of the zoom optical system at the wide angle end, LTLT denotes an overall length of the zoom optical system at the telephoto end, and here the overall length is a distance from a lens surface positioned nearest to the object up to an image plane, $KMBT = |MGMBTback^2 \times (MGMBT^2 - 1)|$, where MGMBTback denotes a lateral magnification of a first predetermined optical system at the telephoto end, MGMBT denotes a lateral magnification of the second intermediate unit at the telephoto end, and here the first predetermined optical system is an optical system which includes all lenses positioned on the image side of the second intermediate unit, and the lateral magnification is a lateral magnification at a time of infinite object point focusing.

An image pickup optical system according to at least some other embodiments of the present invention comprises:

a master optical system, and a converter lens which includes a plurality of lenses, wherein the master optical system includes a rear-side lens unit which is disposed nearest to an image, and of which a position is fixed all the time, and the rear-side lens unit includes a third sub unit and a fourth sub unit, and a predetermined space for putting in and out the converter lens, is provided between the third sub unit and the fourth sub unit, and a focal length of the master optical system differs in a first state and in a second state, and an overall length of the master optical system is same in the first state and in the second state, and the following conditional expressions (21b) and (22b) are satisfied:

$$0.12 \le LconT/LT \le 0.3 \quad (21b)$$

$$1.65 \le LconT/FbT \le 3.5 \quad (22b)$$

where,

LconT denotes a predetermined distance at a time of infinite object point focusing in the second state, LT denotes an overall length of the image pickup optical system at the time of infinite object point focusing in the first state, FbT denotes a back focus of the image pickup optical system at the time of infinite object point focusing in the first state, and here the predetermined distance is a distance from a lens surface positioned nearest to an object of the converter lens up to an image plane in a state in which the focal length of the master optical system becomes the maximum, the overall length is a distance from a lens surface positioned nearest to the object of the image pickup optical system up to the image plane in the state in which the focal length of the master optical system becomes the maximum, the back focus is a back focus in the state in which the focal length of the master optical system becomes the maximum, the first state is a state in which the converter lens has not been inserted into the predetermined space, and the second state is a state in which the converter lens has been inserted into the predetermined space.

Moreover, an image pickup optical system according to at least some other embodiments of the present invention comprises:

a master optical system, and a converter lens which includes a plurality of lenses, wherein the master optical system includes a rear-side lens unit which is disposed nearest to an image, and of which a position is fixed all the time, and the rear-side lens unit includes a third sub unit and a fourth sub unit, and a predetermined space for putting in and out the converter lens, is provided between the third sub unit and the fourth sub unit, and a focal length of the master optical system differs in a first state and in a second state, and an overall length of the master optical system is same in the first state and in the second state, and the following conditional expression (23b) is satisfied:

$$-5.0 \le FbT/RtconR \le 0.5 \quad (23b)$$

where,

FbT denotes a back focus of the image pickup optical system at a time of infinite object point focusing in the first state, and RtconR denotes a radius of curvature of a lens surface of the converter lens, which is positioned nearest to the image, and here the back focus is a back focus in a state in which the focal length of the master optical system becomes the maximum, the first state is a state in which the converter lens has not been inserted into the predetermined space, and the second state is a state in which the converter lens has been inserted into the predetermined space.

Moreover, an image pickup optical system according to at least some other embodiments of the present invention comprises:

a master optical system, a converter lens which includes a plurality of lenses, wherein the master optical system includes a rear-side lens unit which is disposed nearest to an image, and of which a position is fixed all the time, and the rear-side lens unit includes a third sub unit and a fourth sub unit, and a predetermined space for putting in an out the converter lens, is provided between the third sub unit and the fourth sub unit, and a focal length of the master optical system differs in a first state and in a second state, and an overall length of the master optical system is same in the first state and in the second state, and the following conditional expressions (21b') and (24b) are satisfied:

$$0.1 \le LconT/LT \le 0.44 \quad (21b')$$

$$0.1 \le FbT/RtconF \le 2.4 \quad (24b)$$

where,

LconT denotes a predetermined distance at a time of infinite object point focusing in the second state, LT denotes an overall length of the image pickup optical system at the time of infinite object point focusing in the first state, FbT denotes a back focus of the image pickup optical system at the time of infinite object point focusing in the first state, and Rtconf denotes a radius of curvature of a lens surface of the converter lens, which is positioned nearest to an object, and here the predetermined distance is a distance from a lens surface positioned nearest to the object of the converter lens up to an image plane in a state in which the focal length of the master optical system becomes the maximum, the overall length is a distance from a lens surface positioned nearest to the object of the image pickup optical system up to the image plane in the state in which the focal length of the master optical system becomes the maximum, the back focus is a back focus in the state in which the focal length of the master optical system becomes the maximum, the first state is a state in which the converter lens has not been inserted into the predetermined space, and the second state is a state in which the converter lens has been inserted into the predetermined space.

Moreover, an image pickup optical system according to at least some other embodiments of the present invention comprises:

a master optical system, and a converter lens which includes a plurality of lenses, wherein the master optical system includes a rear-side lens unit which is disposed nearest to an image, and of which a position is fixed all the time, and the rear-side lens unit includes a third sub unit and a fourth sub unit, and a predetermined space for putting in and out the converter lens, is provided between the third sub unit and the fourth sub unit, and a focal length of the master optical system differs in a first state and in a second state, and an overall length of the master optical system is same in the first state and in the second state, and the following conditional expressions (23b') and (24b') are satisfied:

$$-5.0 \le FbT/RtconR \le 1.0 \quad (23b')$$

$$0.1 \le FbT/RtconF \le 2.65 \quad (24b')$$

where,

FbT denotes a back focus of the image pickup optical system at a time of infinite object point focusing in the first state, RtconF denotes a radius of curvature of a lens surface of the converter lens, which is positioned nearest to an object, and RtconR denotes a radius of curvature of a lens surface of the converter lens, which is positioned nearest to the image, and here the back focus is a back focus in a state in which the focal length of the master optical system becomes the maximum, the first state is a state in which the converter lens has not been inserted into the predetermined space, and the second state is a state in which the converter lens has been inserted into the predetermined space.

Moreover, an image pickup optical system according to at least some other embodiments of the present invention comprises:

a master optical system, and a converter lens which includes a plurality of lens components, wherein in the lens component, only a side of incidence and a side of emergence are air-contact surfaces, and the master optical system includes a rear-side lens unit which is disposed nearest to an image, and of which a position is fixed all the time, and the rear-side lens unit includes a third sub unit and a fourth sub unit, and a predetermined space for putting in and out the converter lens, is provided between the third sub unit and the fourth sub unit, and a focal length of the master optical system differs in a first state and in a second state, and an overall length of the master optical system is same in the first state and in the second state, and the converter lens is a teleconverter lens, and the teleconverter lens includes an object-side lens component having a positive refractive power, an image-side lens component which includes a positive lens, and an intermediate lens component having a negative refractive power, and the object-side lens component is positioned nearest to an object, and the image-side lens component is positioned nearest to the image, and the intermediate lens component is positioned between the object-side lens component and the image side lens component, and the negative refractive power of the intermediate lens component is the largest of all the lens components having a negative refractive power, and the following conditional expression (26b) is satisfied:

$$1.2 \le |fconLCObj/fconLCM2| \le 4.0 \quad (26b)$$

where, fconLCObj denotes a focal length of the object-side lens component, fconLCM2 denotes a focal length of the intermediate lens component, the first state is a state in which the converter lens has not been inserted into the predetermined space, and the second state is a state in which the converter lens has been inserted into the predetermined space.

Moreover, an image pickup optical system according to at least some other embodiments of the present invention comprises:

a master optical system, and a converter lens which includes a plurality of lenses, wherein the master optical system includes a rear-side lens unit which is disposed nearest to an image, and of which a position is fixed all the time, and the rear-side lens unit includes a third sub unit and a fourth sub unit, and a predetermined space for putting in and out the converter lens, is provided between the third sub unit and the fourth sub unit, and a focal length of the master optical system differs in a first state and in a second state, and an overall length of the master optical system is same in the first state and in the second state, and the converter lens is a teleconverter lens, and the teleconverter lens includes an object-side sub unit having a positive refractive power, an intermediate sub unit, and an image-side sub unit having a negative refractive power, and the object-side sub unit is positioned nearest to an object, and the intermediate sub unit is positioned on an image side of the object-side sub unit, and the image-side sub unit is positioned on the image side of the intermediate sub unit, and a lens surface on an object side of the object-side sub unit is a surface which is convex toward the object side, and the image-side sub unit includes a positive lens and a negative lens, and the following conditional expression (16) is satisfied:

$$0.7 \le |fconLCOB/fconLCB| \le 3.5 \quad (16)$$

where, fconLCOB denotes a focal length of the object-side sub unit, fconLCB denotes a focal length of the image-side sub unit, the first state is a state in which the converter lens has not been inserted into the predetermined space, and the second state is a state in which the converter lens has been inserted into the predetermined space.

Moreover, an image pickup optical system according to at least some other embodiments of the present invention comprises:

a master optical system, and a converter lens which includes a plurality of lenses, wherein the master optical system includes a rear-side lens unit which is disposed nearest to an image, and of which a position is fixed all the time, and the rear-side lens unit includes a third sub unit and a fourth sub unit, and a predetermined space for putting in and out the converter lens, is provided between the third sub unit and the fourth sub unit, and a focal length of the master optical system differs in a first state and in a second state, and an overall length of the master optical system is same in the first state and in the second state, and the converter lens is a teleconverter lens, and the teleconverter lens includes an object-side sub unit having a positive refractive power, an intermediate sub unit, and an image-side sub unit having a negative refractive power, and the object-side sub unit is positioned nearest to an object, and the intermediate sub unit is positioned on an image side of the object-side sub unit, and the image-side sub unit is positioned on the image side of the intermediate sub unit, and a lens surface on an object side of the object-side sub unit is a surface which is convex toward the object side, and the image-side sub unit includes a positive lens and a negative lens, and the following conditional expression (17) is satisfied:

$$2.0 \le (fT/FnoT)/LTC \le 6.0 \qquad (17)$$

where, fT denotes a focal length of the image pickup optical system in the first state, FnoT denotes an F-number of the master optical system at the time of infinite object point focusing, and LTC denotes a distance from a lens surface positioned nearest to the object of the converter lens up to a lens surface positioned nearest to the image of the converter lens, and here the focal length and the F-number are a focal length and an F-number in a state in which the focal length of the master optical system becomes the maximum, the first state is a state in which the converter lens has not been inserted into the predetermined space, and the second lens is a state in which the converter lens has been inserted into the predetermined space.

BRIEF DESCRIPTION OF THE DRAWINGS

FIG. 120 is a structural block diagram of an internal circuit of main components of the image pickup apparatus.

DETAILED DESCRIPTION OF THE INVENTION

Figure 1A:
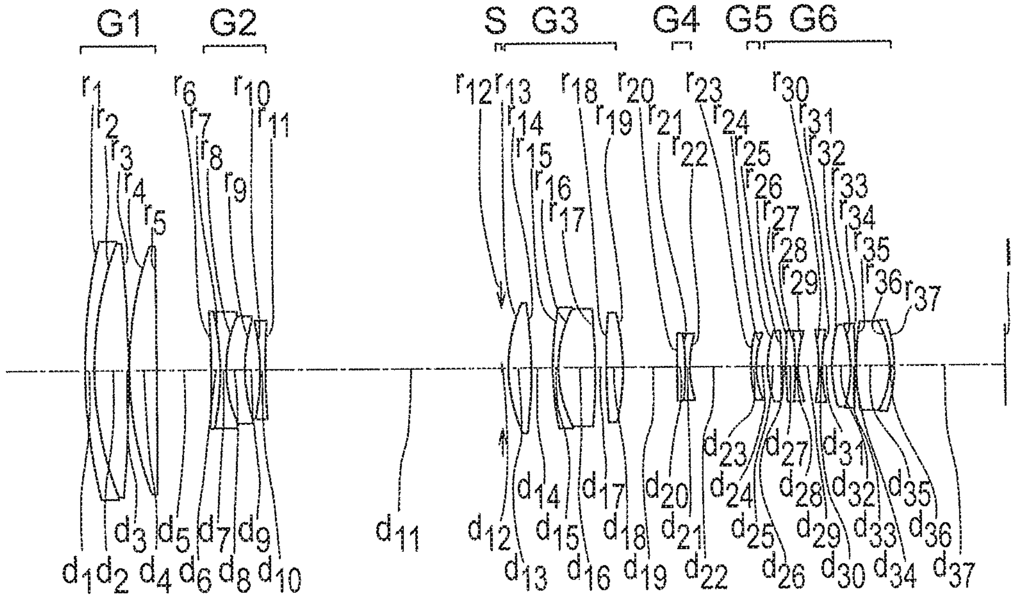
FIG. 1A, FIG. 1B, and FIG. 1C are lens cross-sectional views of an example 1.
Figure 1B:
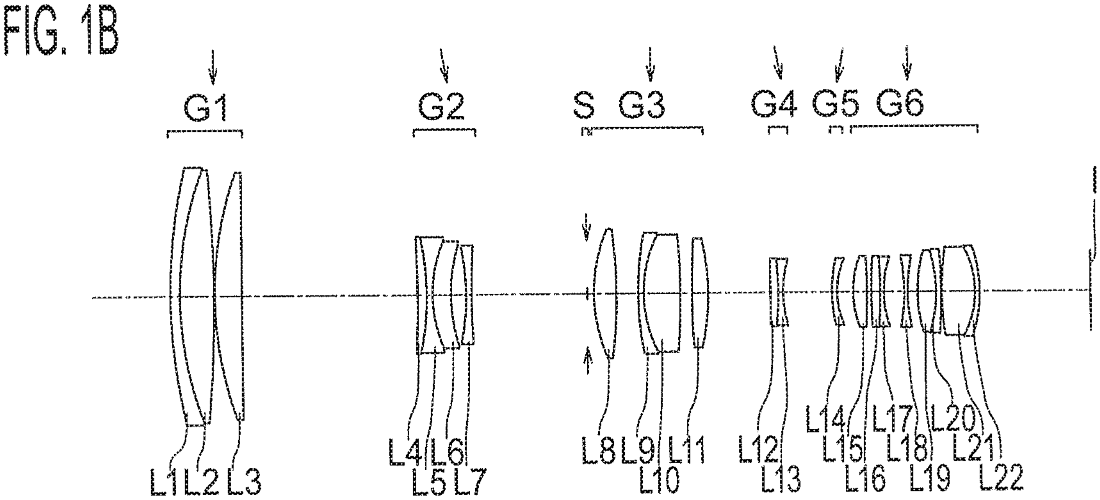
Figure 1C:
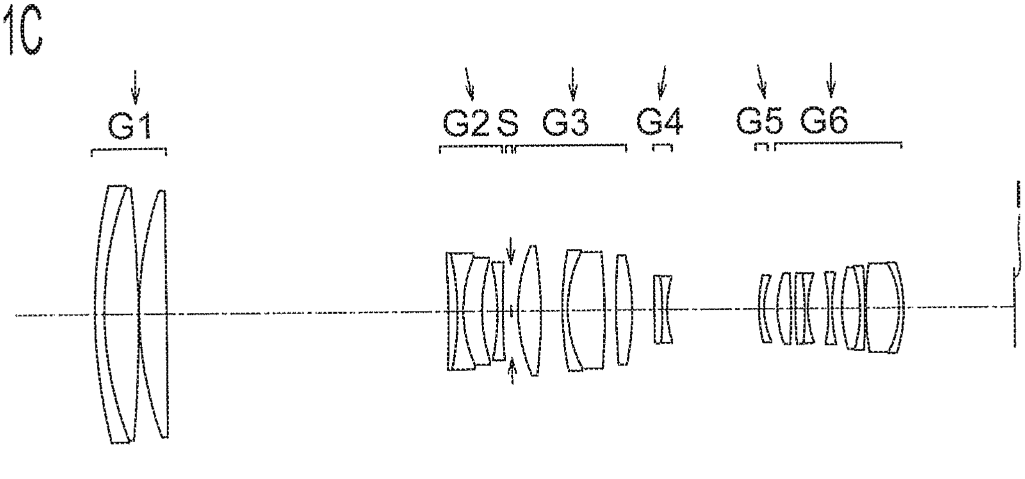
Figure 2A:
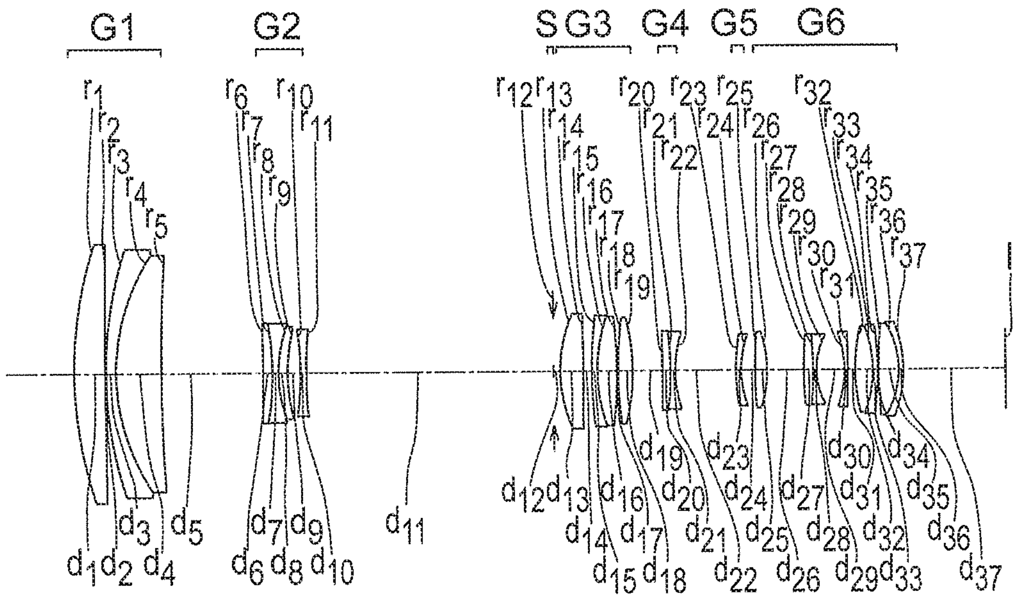
FIG. 2A, FIG. 2B, and FIG. 2C are lens cross-sectional views of an example 2.
Figure 2B:
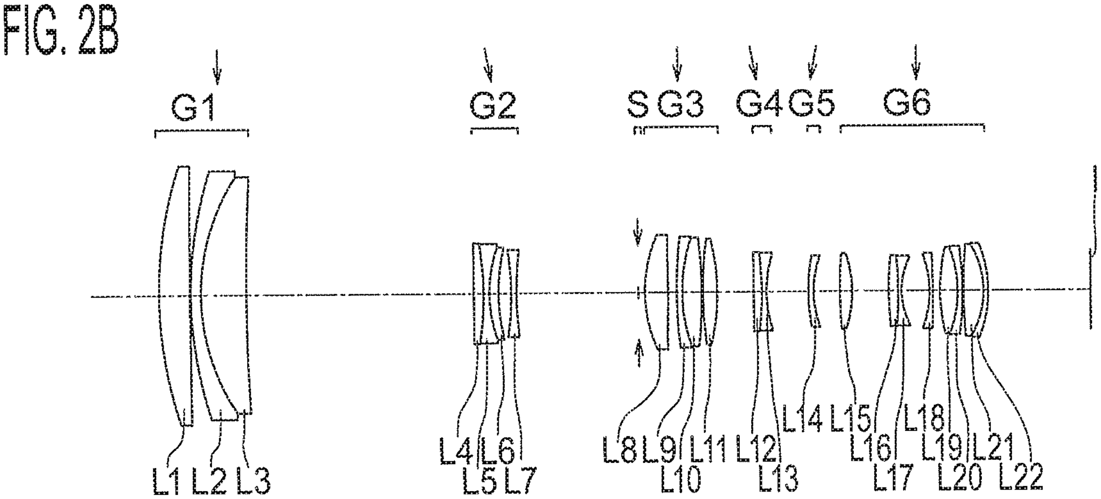
Figure 2C:
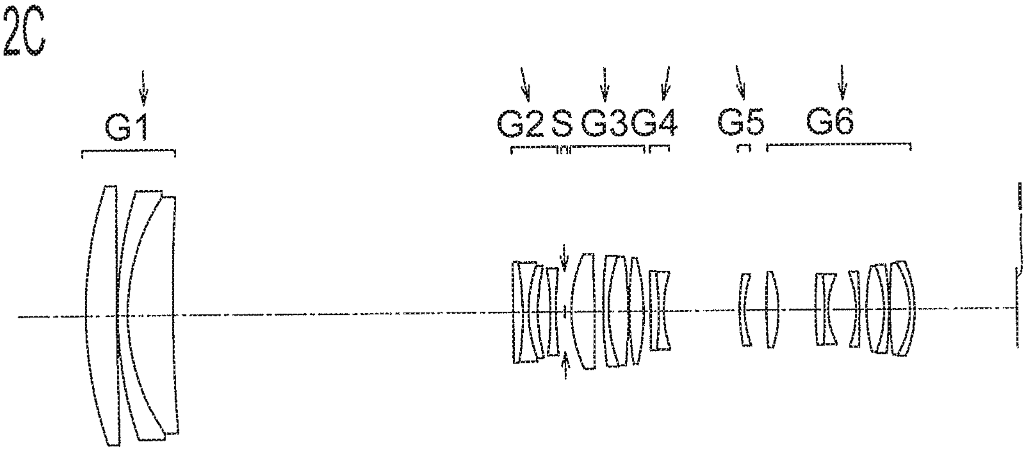
Figure 3A:
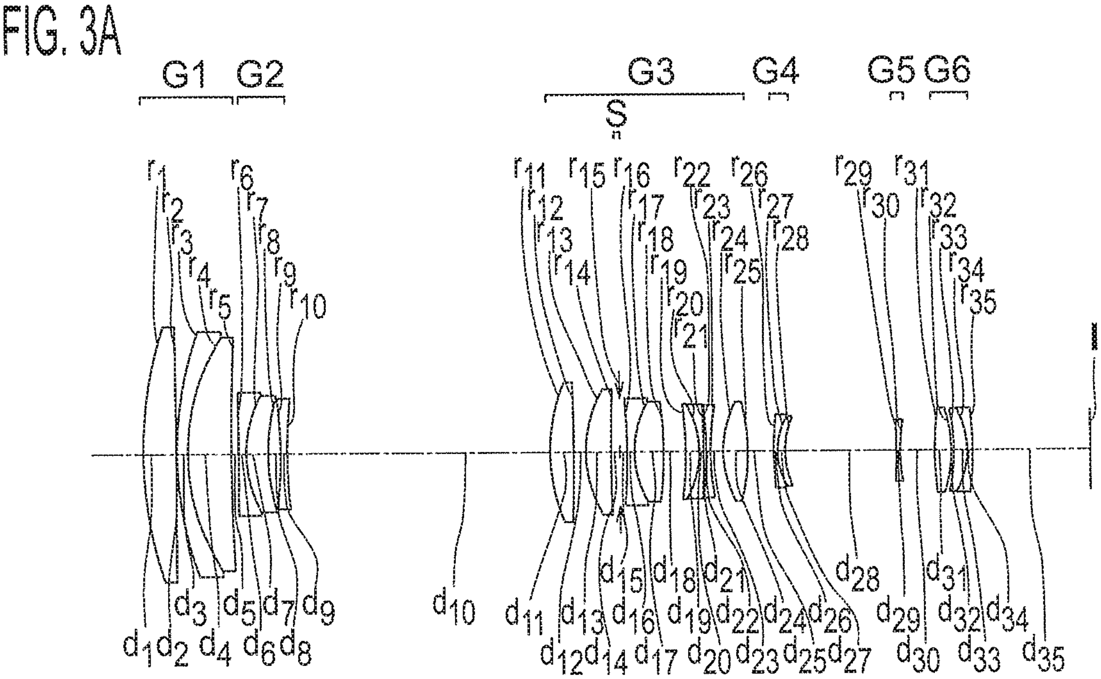
FIG. 3A, FIG. 3B, and FIG. 3C are lens cross-sectional views of an example 3.
Figure 3B:
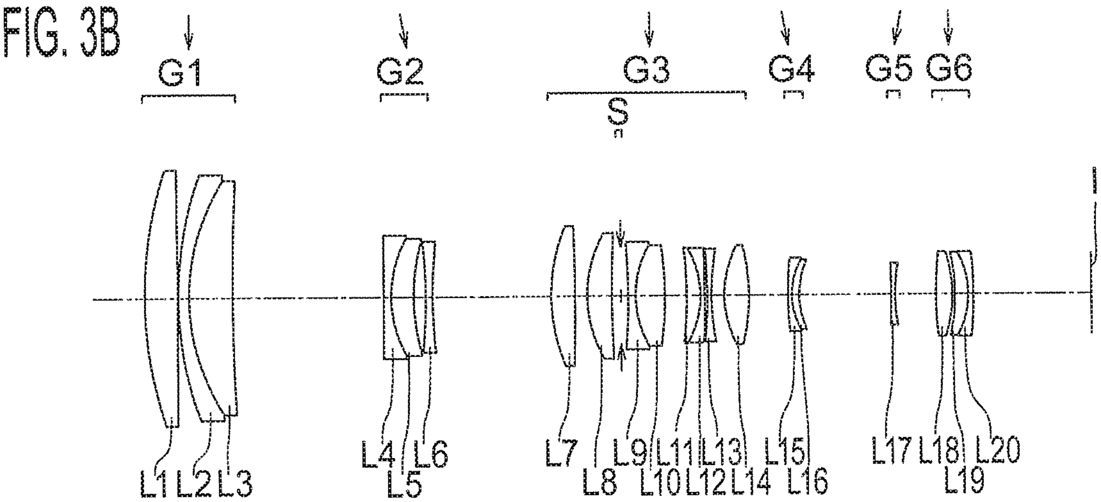
Figure 3C:
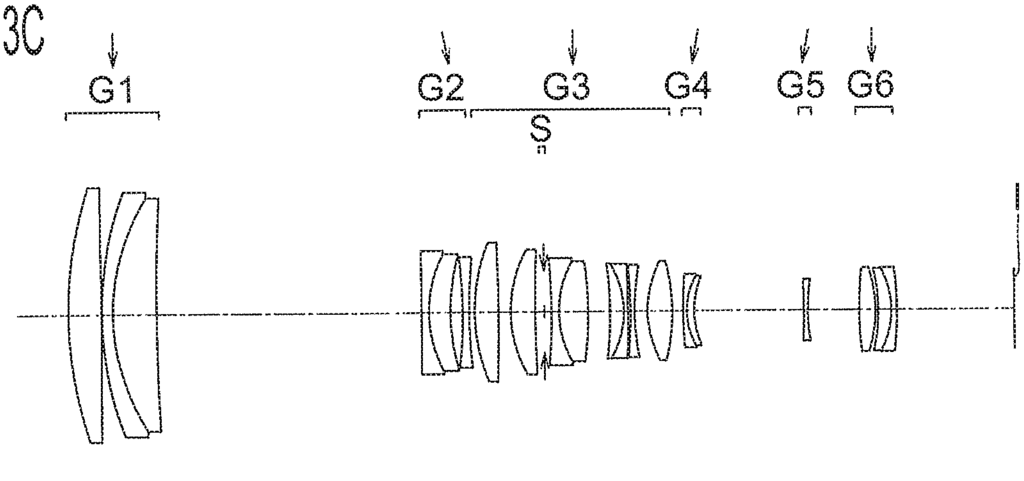
Figure 4A:
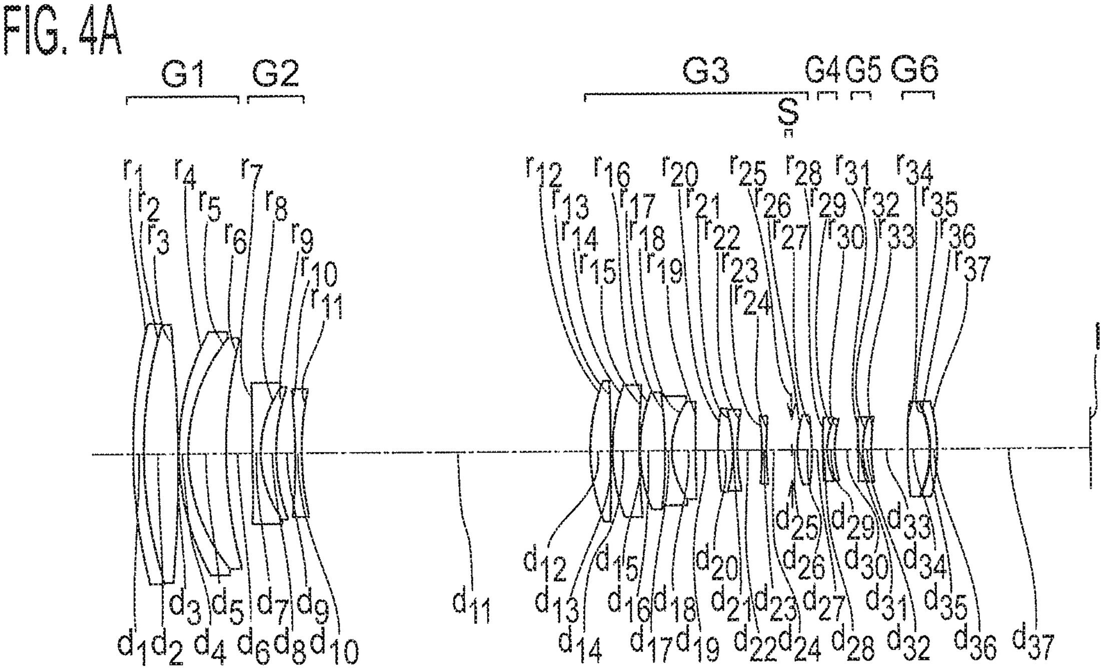
FIG. 4A, FIG. 4B, and FIG. 4C are lens cross-sectional views of an example 4.
Figure 4B:
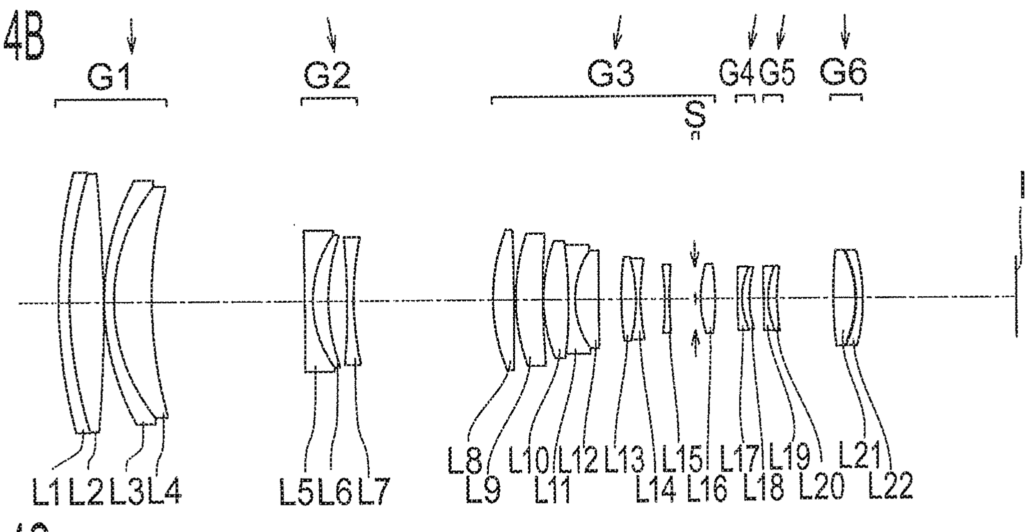
Figure 4C:
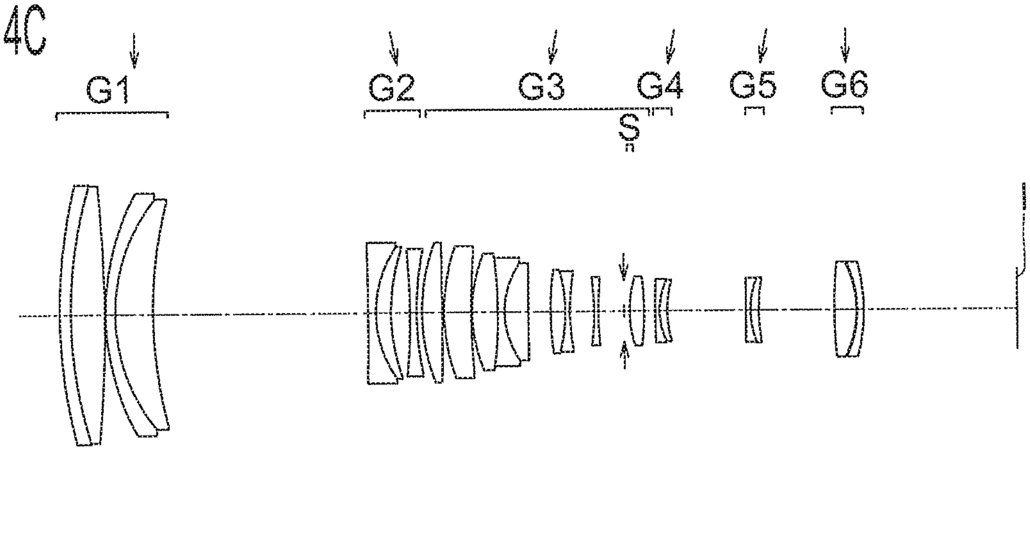
Figure 5A:
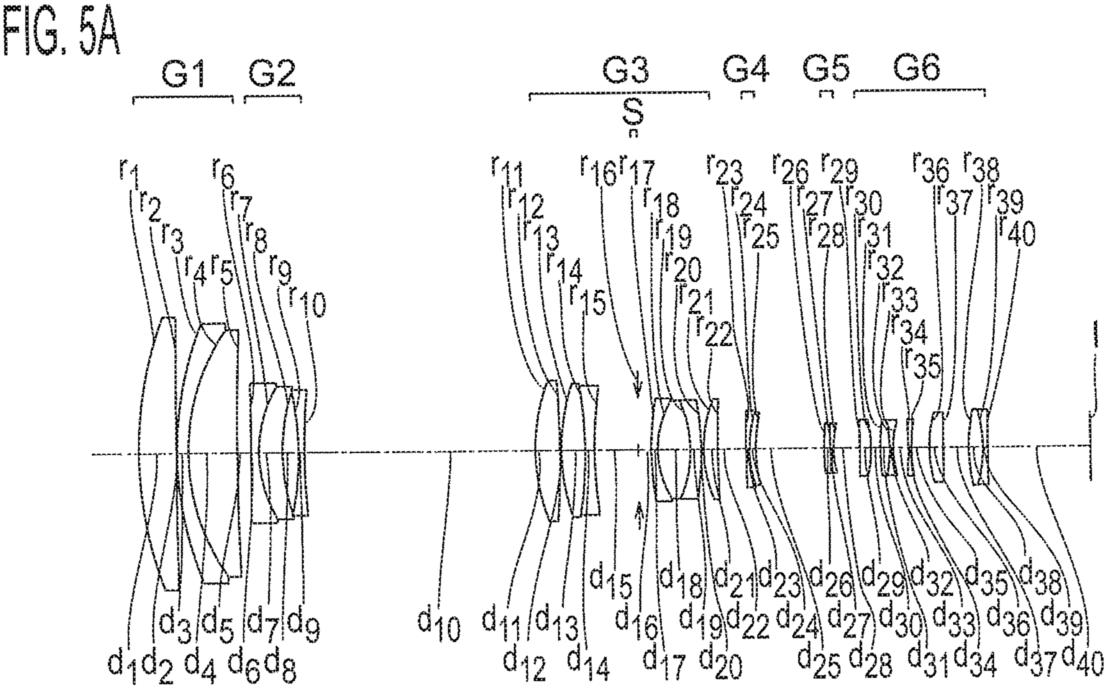
FIG. 5A, FIG. 5B, and FIG. 5C are lens cross-sectional views of an example 5.
Figure 5B:
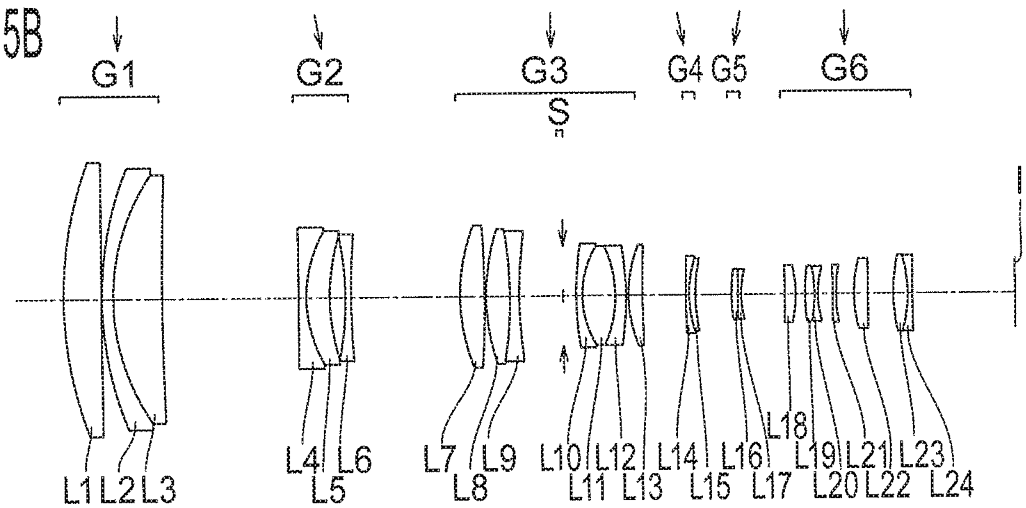
Figure 5C:
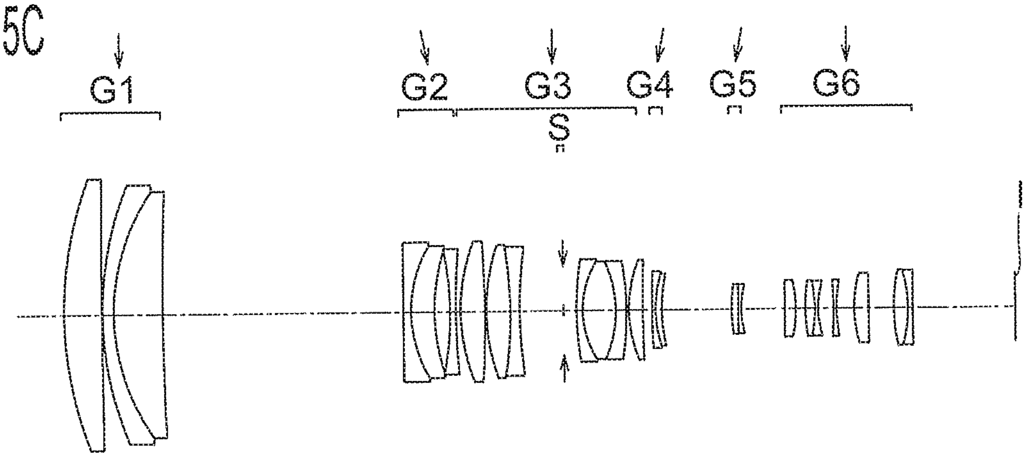
Figure 6A:
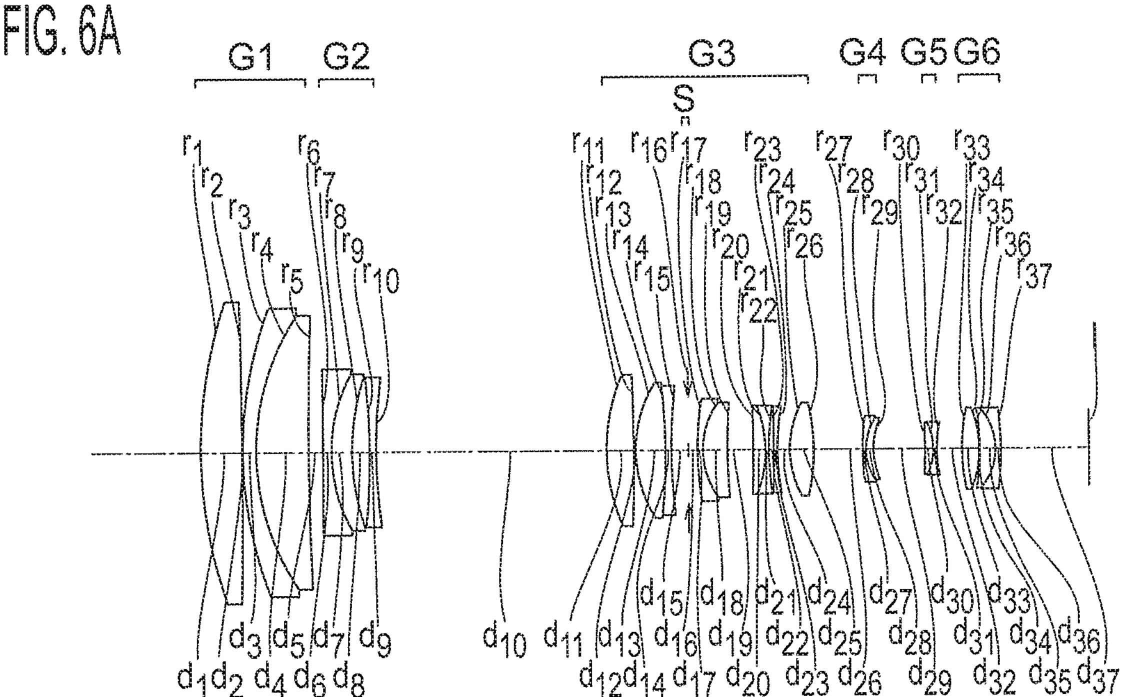
FIG. 6A, FIG. 6B, and FIG. 6C are lens cross-sectional views of an example 6.
Figure 6B:
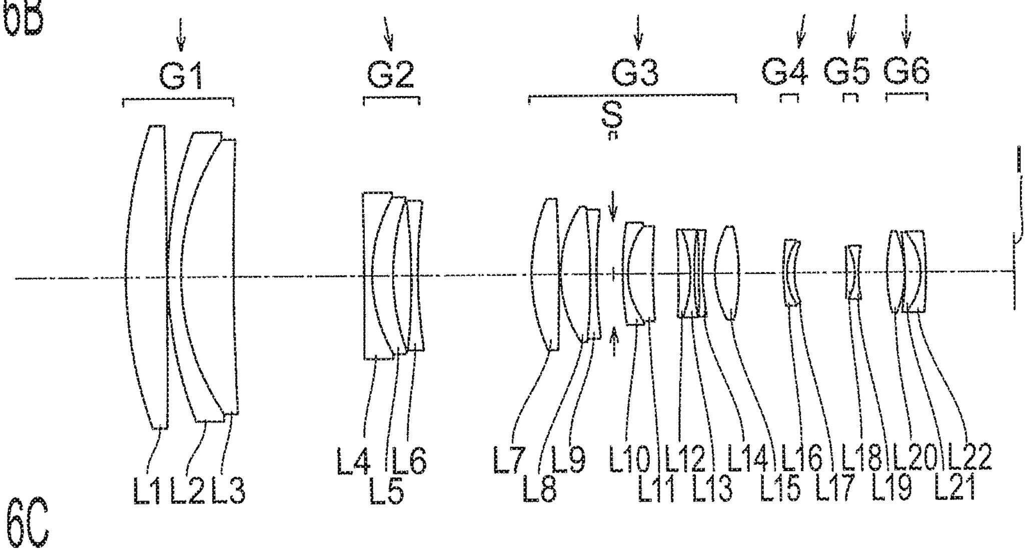
Figure 6C:
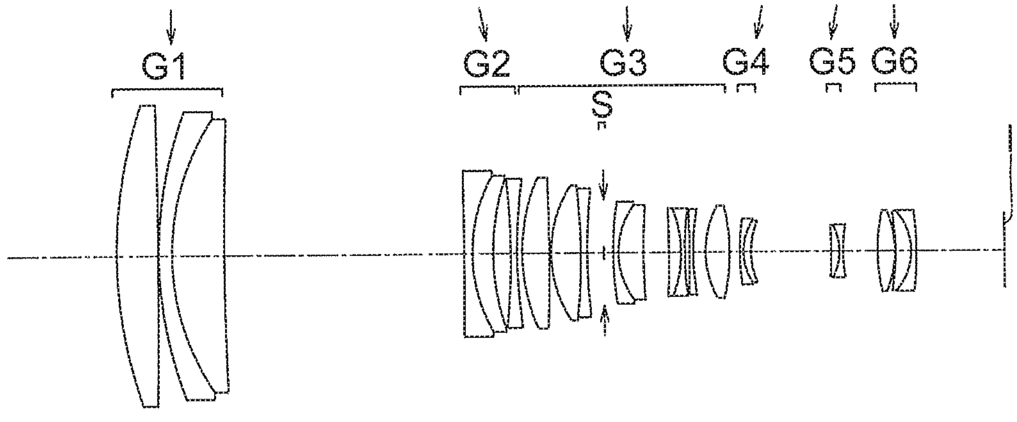
Figure 7A:
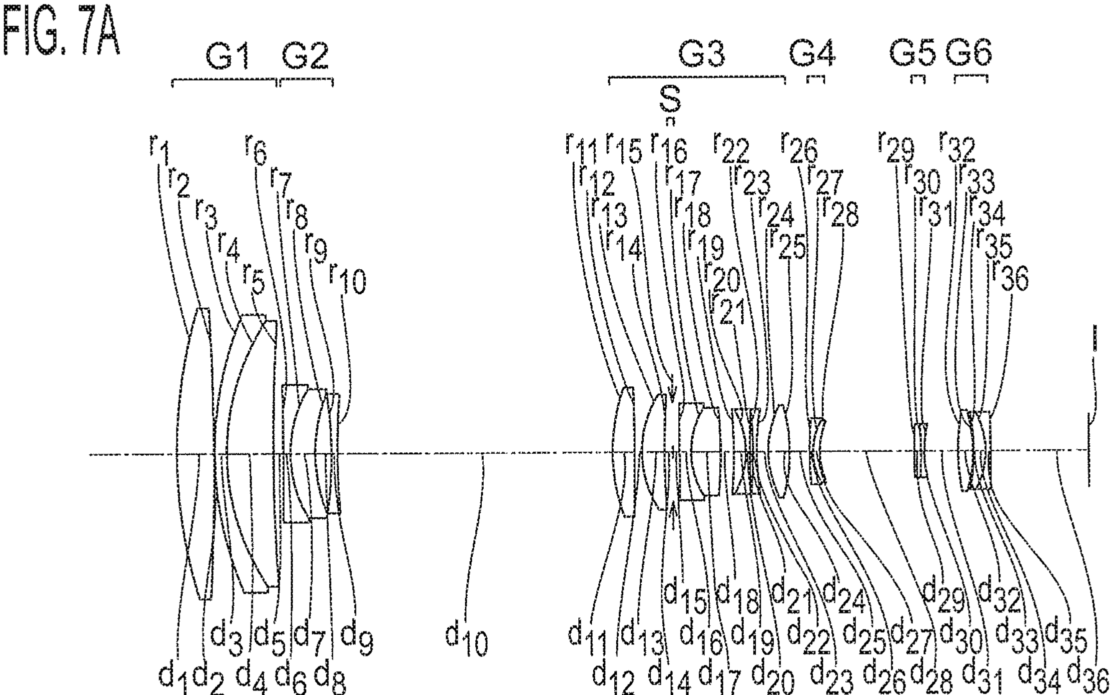
FIG. 7A, FIG. 7B, and FIG. 7C are lens cross-sectional views of an example 7.
Figure 7B:
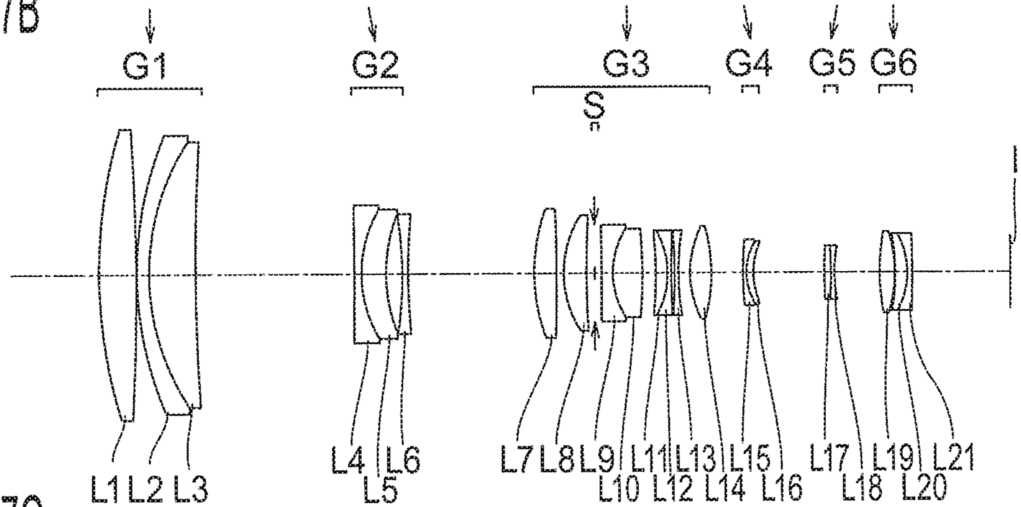
Figure 7C:
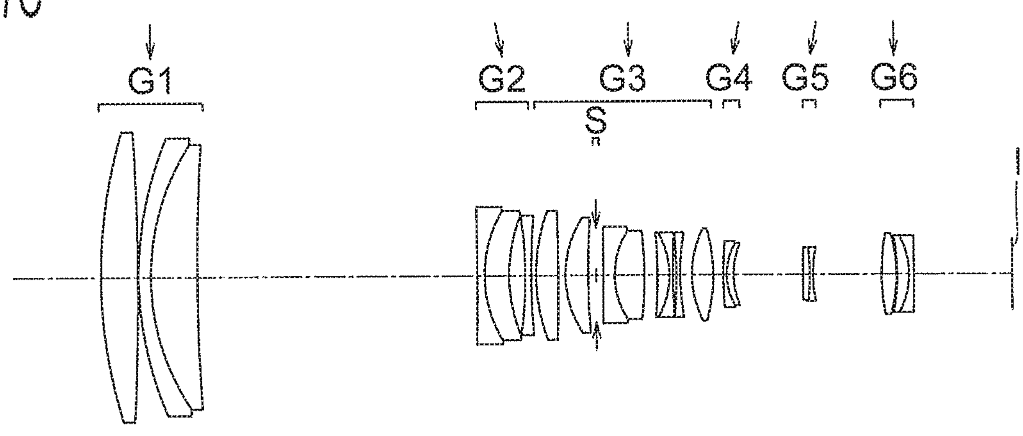
Figure 8A:
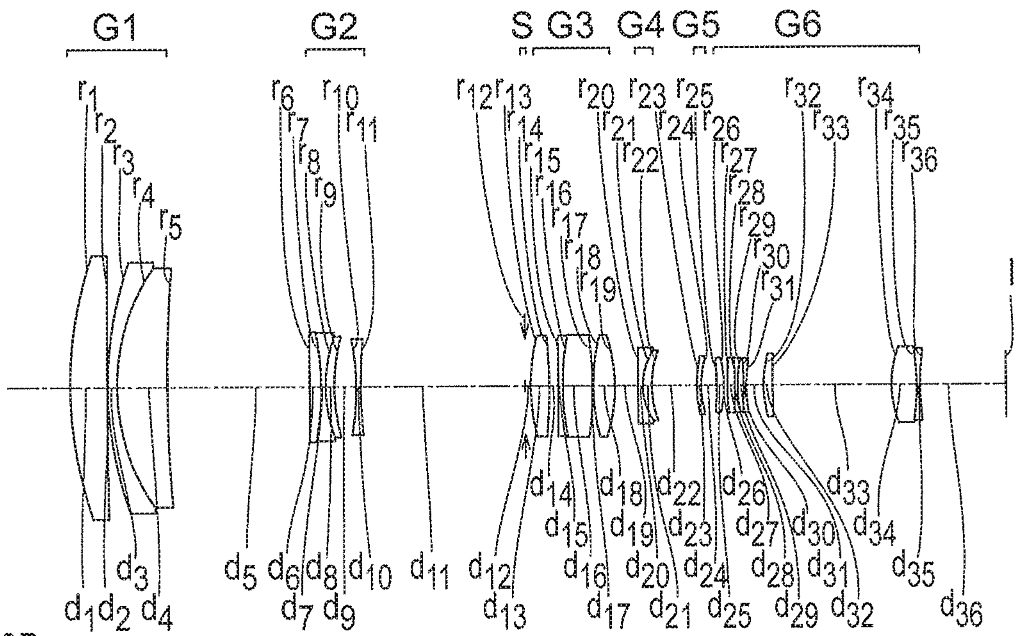
FIG. 8A, FIG. 8B, and FIG. 8C are lens cross-sectional views of an example 8.
Figure 8B:
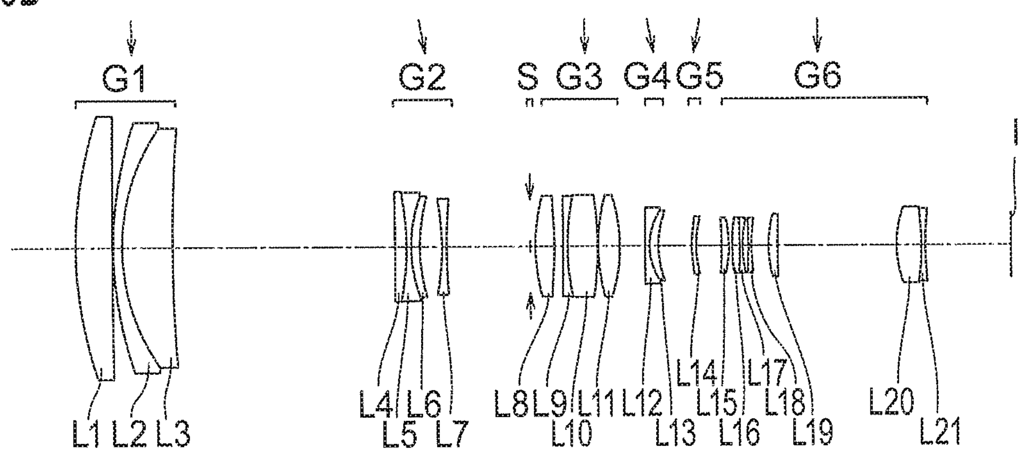
Figure 8C:
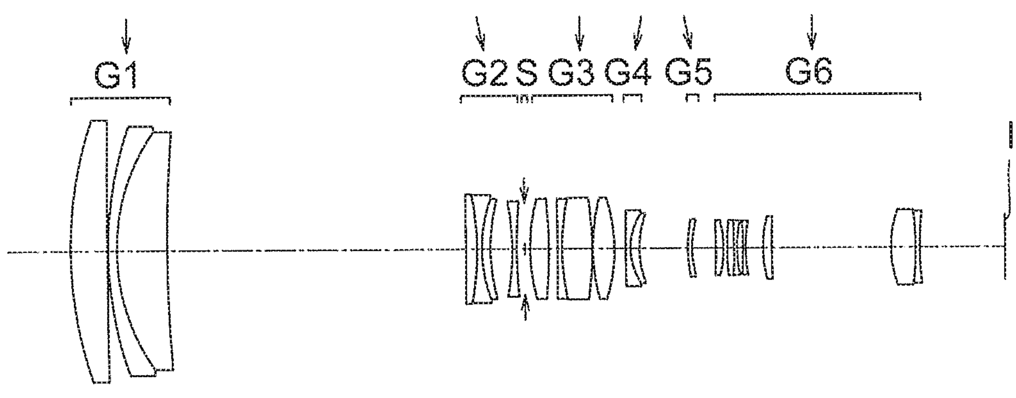
Figure 9A:
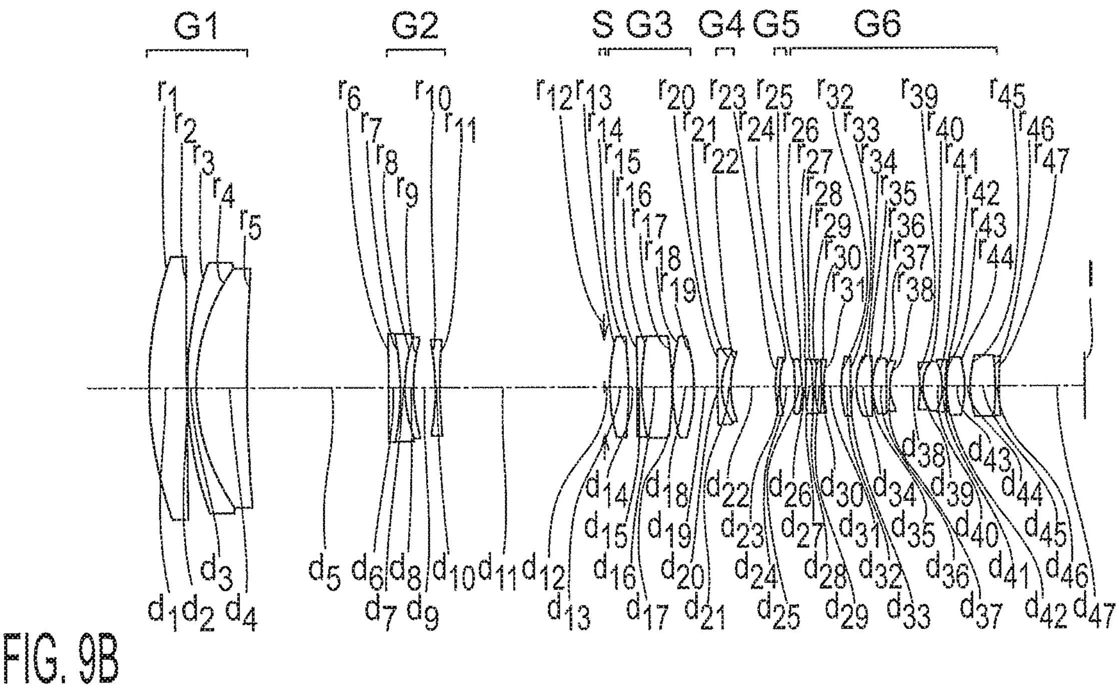
FIG. 9A, FIG. 9B, and FIG. 9C are lens cross-sectional views of an example 9.
Figure 9B:
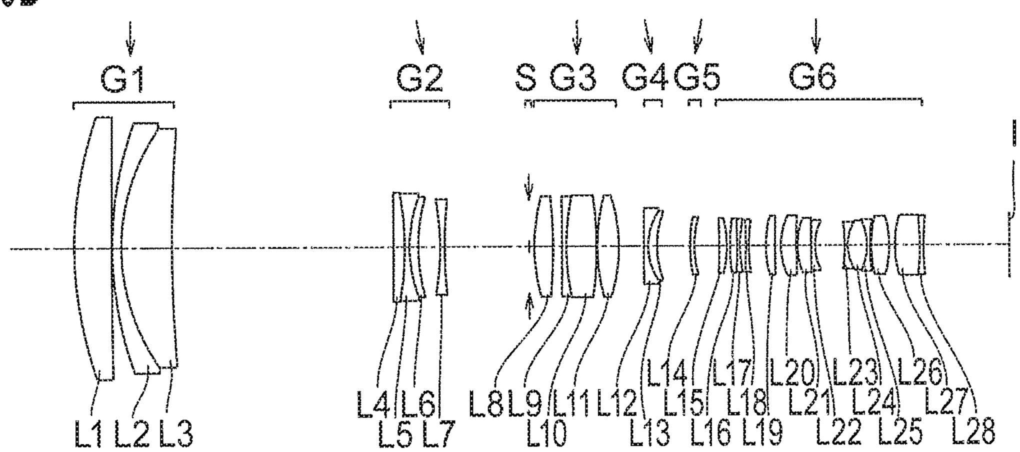
Figure 9C:
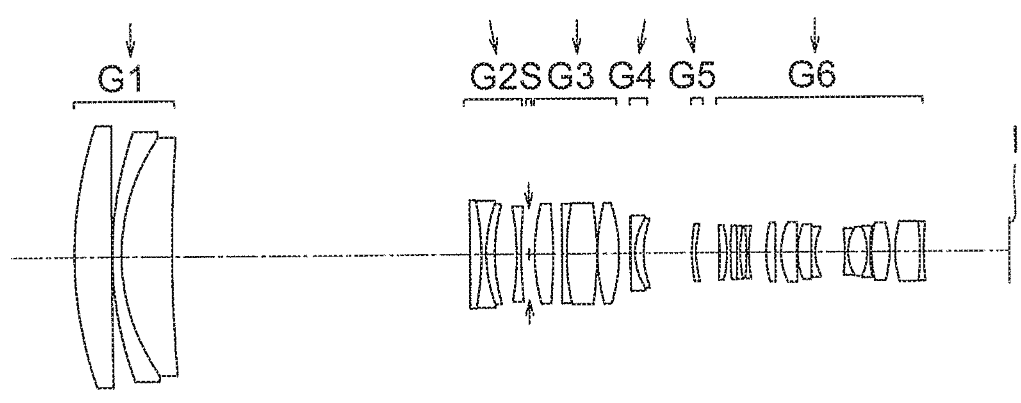
Figure 10A:
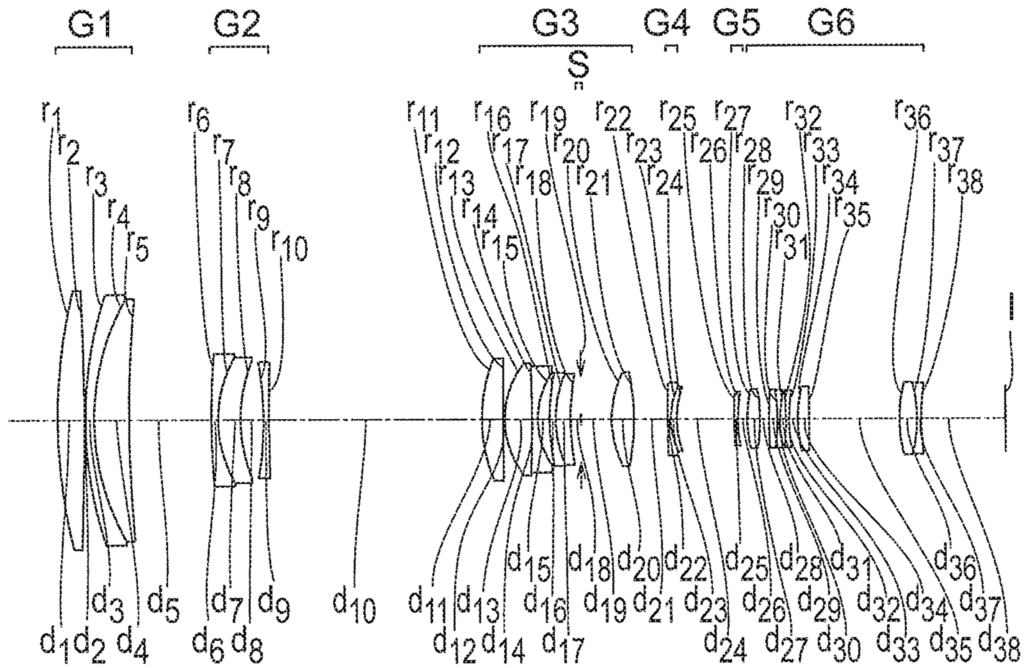
FIG. 10A, FIG. 10B, and FIG. 10C are lens cross-sectional views of an example 10.
Figure 10B:
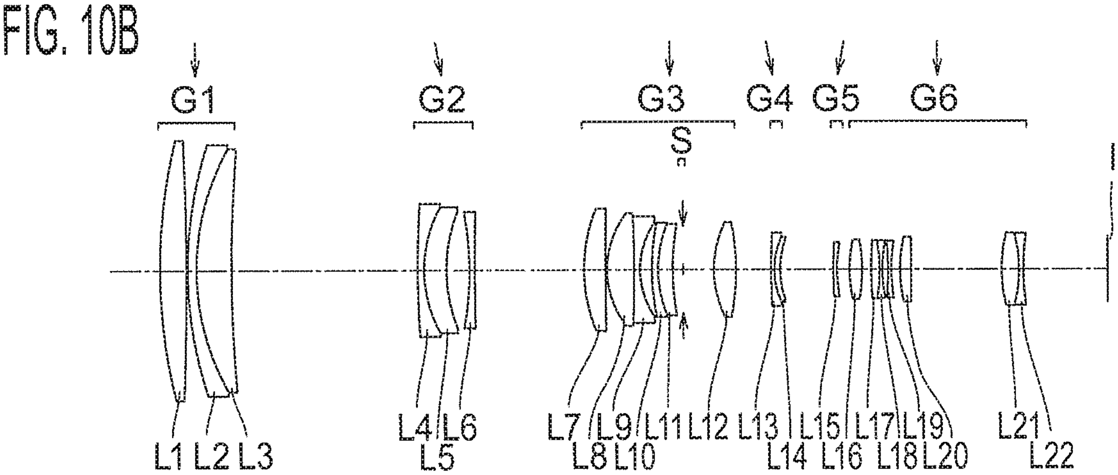
Figure 10C:
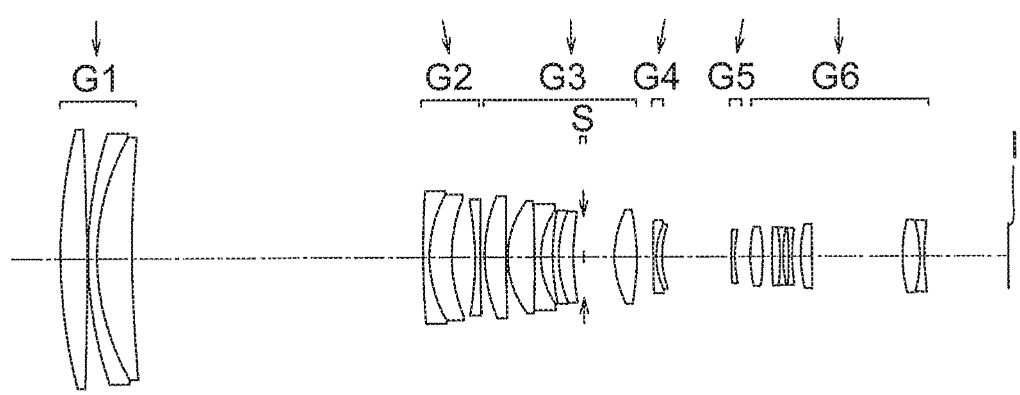
Figure 11A:
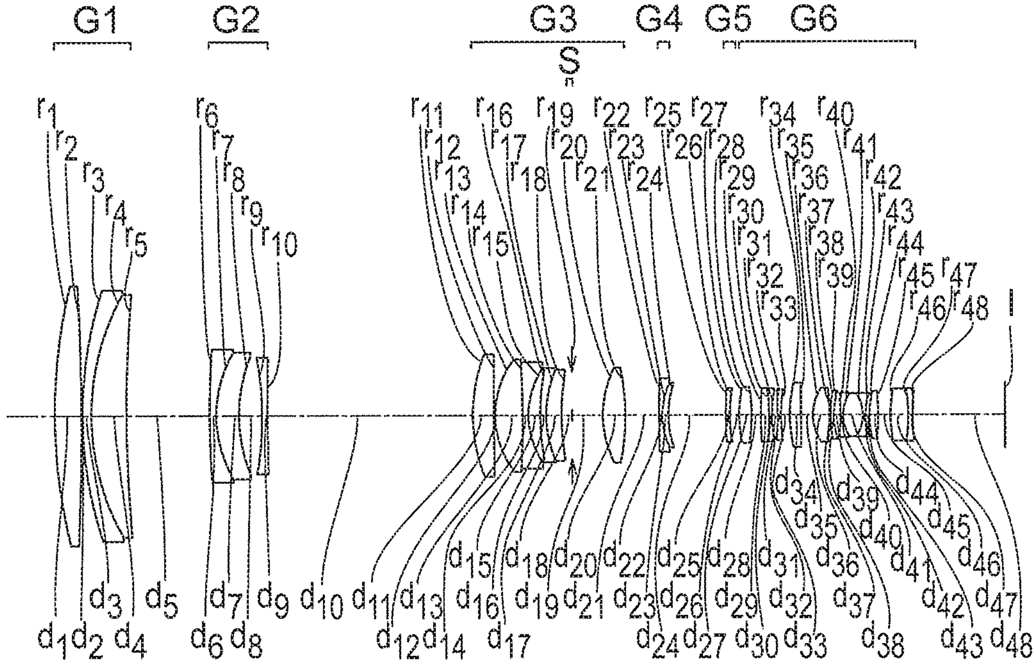
FIG. 11A, FIG. 11B, and FIG. 11C are lens cross-sectional views of an example 11.
Figure 11B:
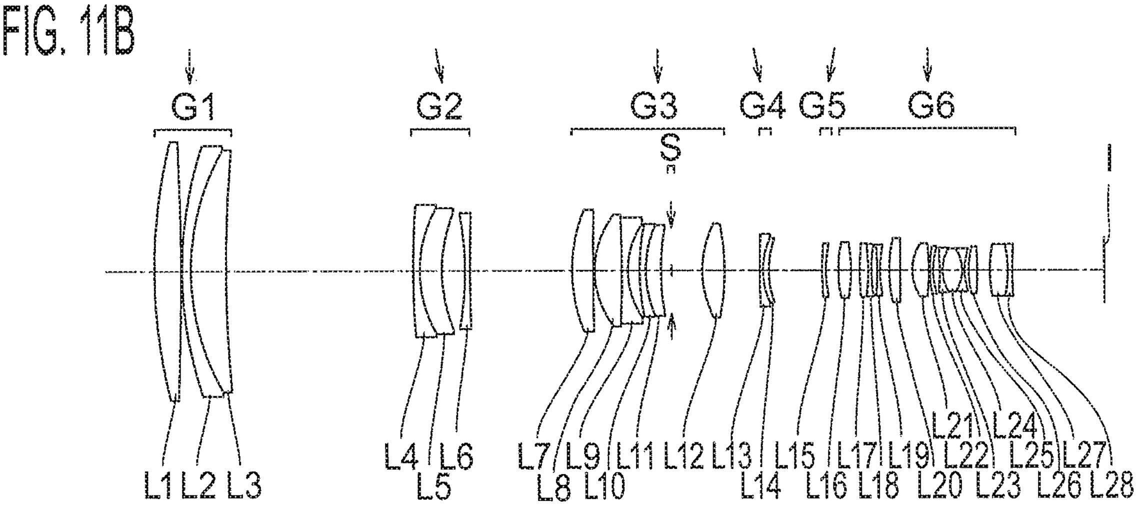
Figure 11C:
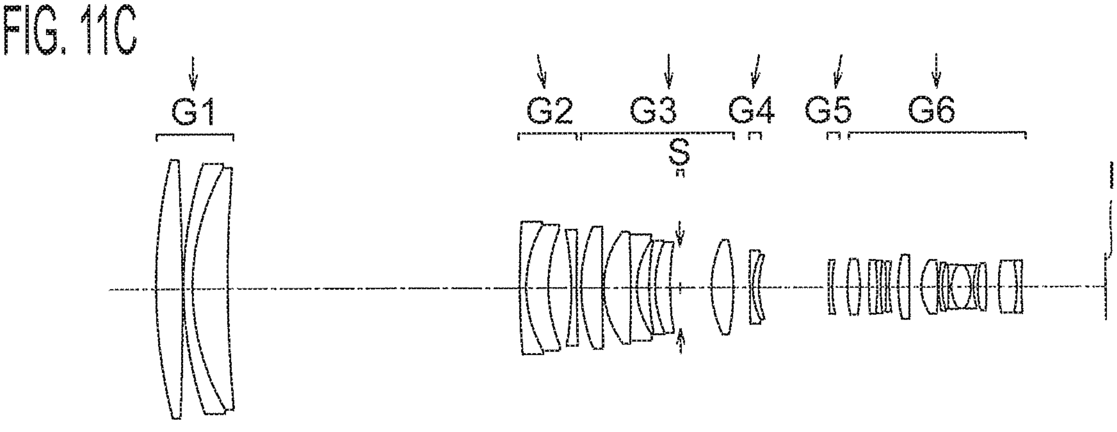
Figure 12A:
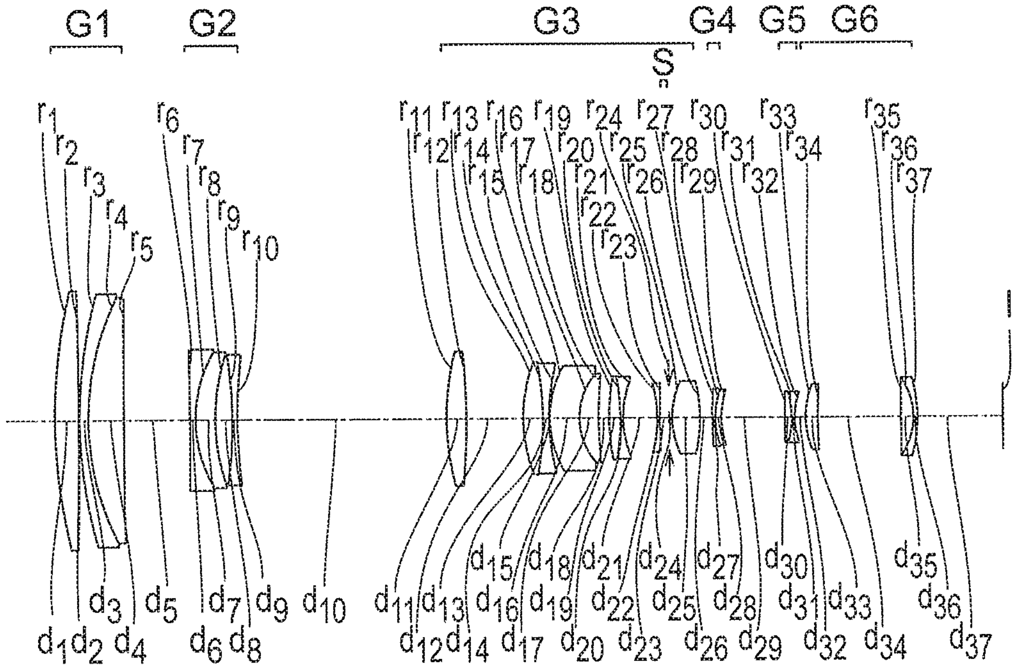
FIG. 12A, FIG. 12B, and FIG. 12C are lens cross-sectional views of an example 12.
Figure 12B:
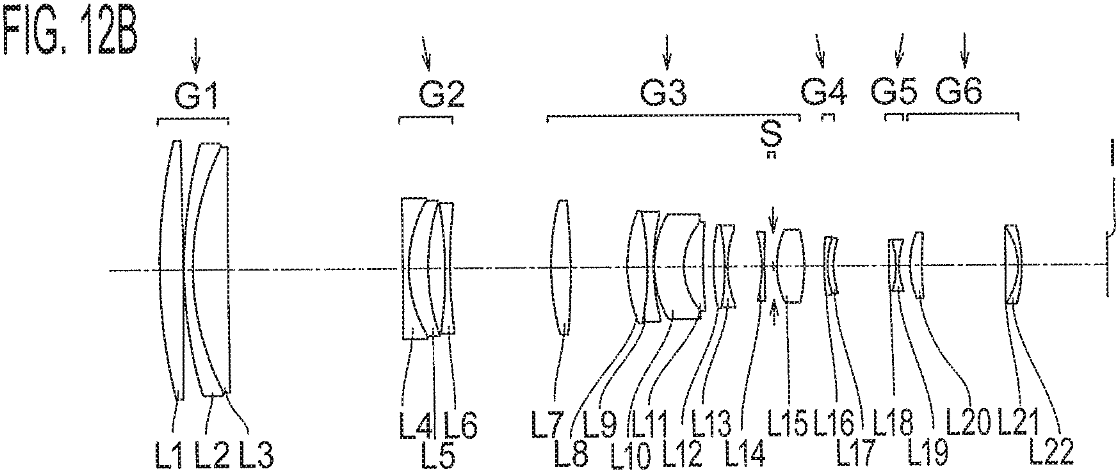
Figure 12C:
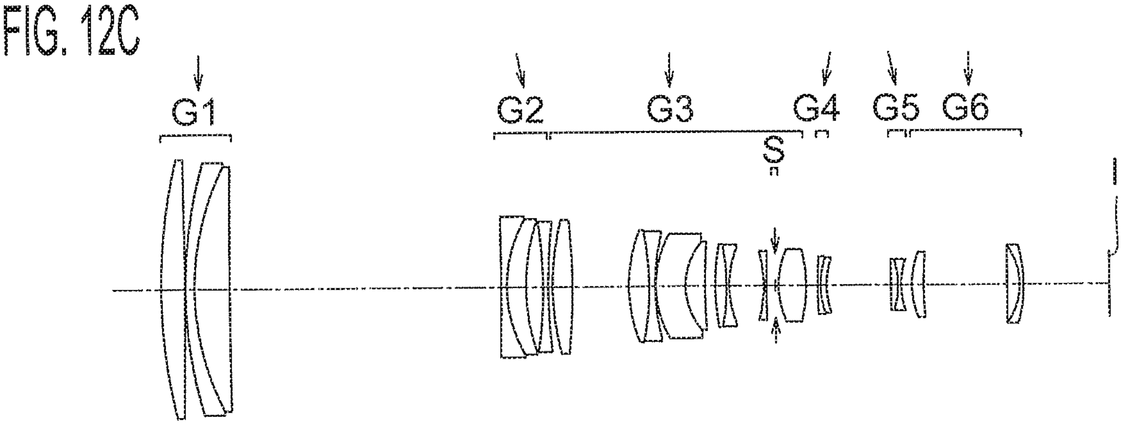
Figure 13A:
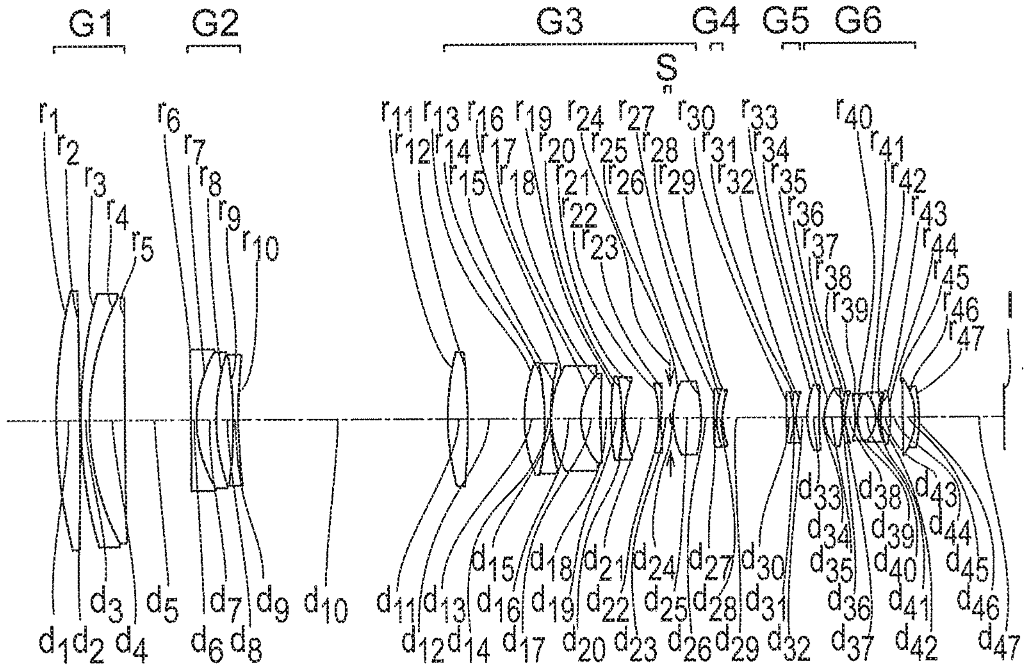
FIG. 13A, FIG. 13B, and FIG. 13C are lens cross-sectional views of an example 13.
Figure 13B:
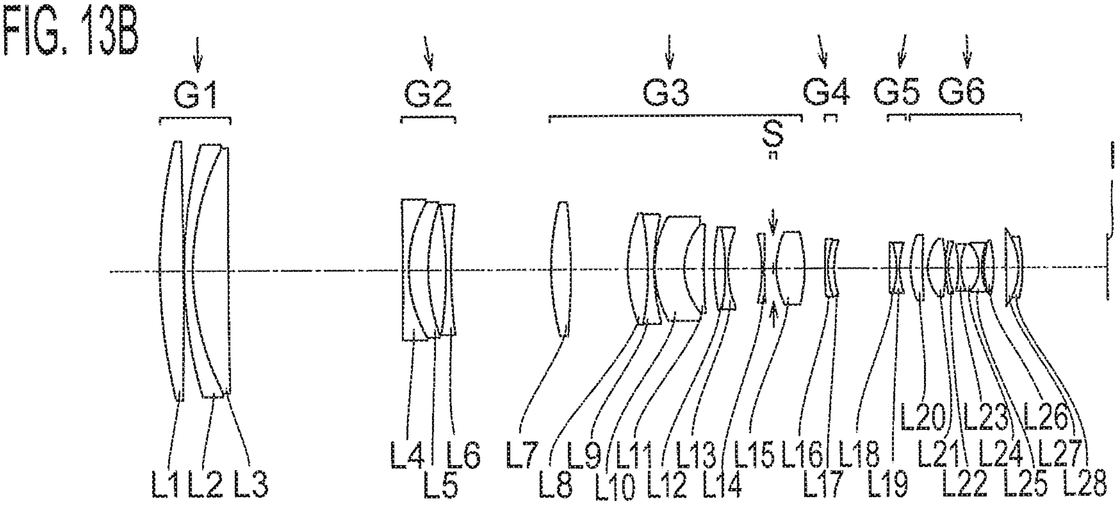
Figure 13C:
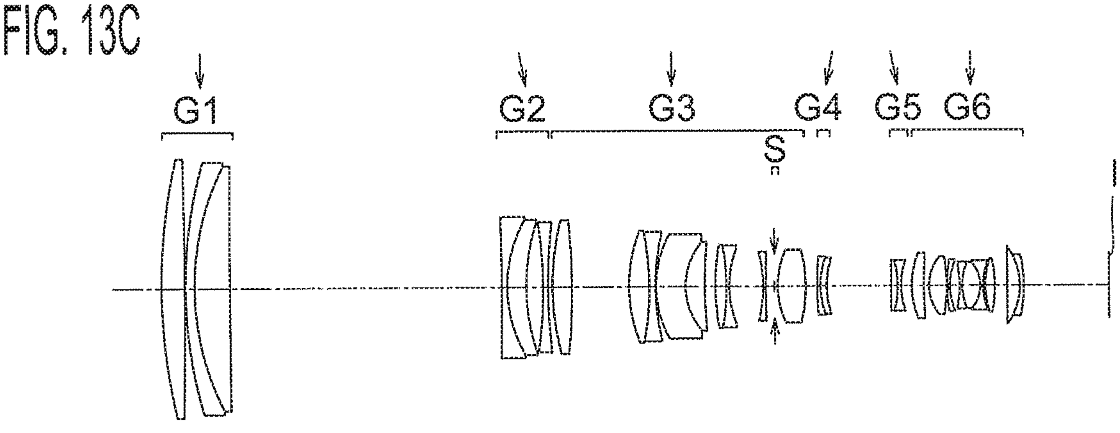
Figure 14A:
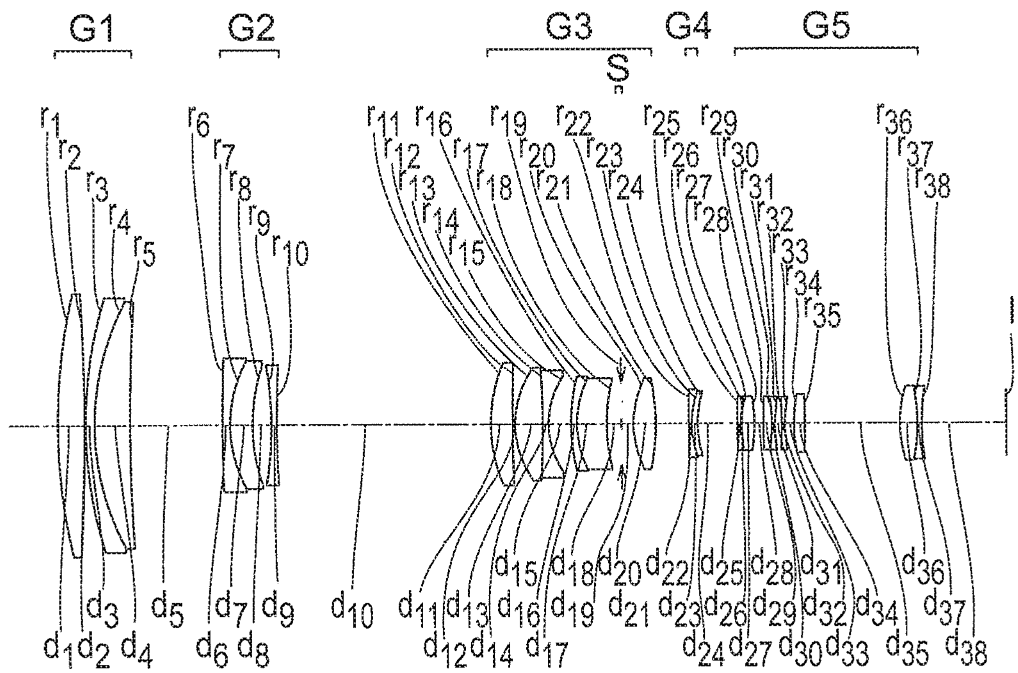
FIG. 14A, FIG. 14B, and FIG. 14C are lens cross-sectional views of an example 14.
Figure 14B:
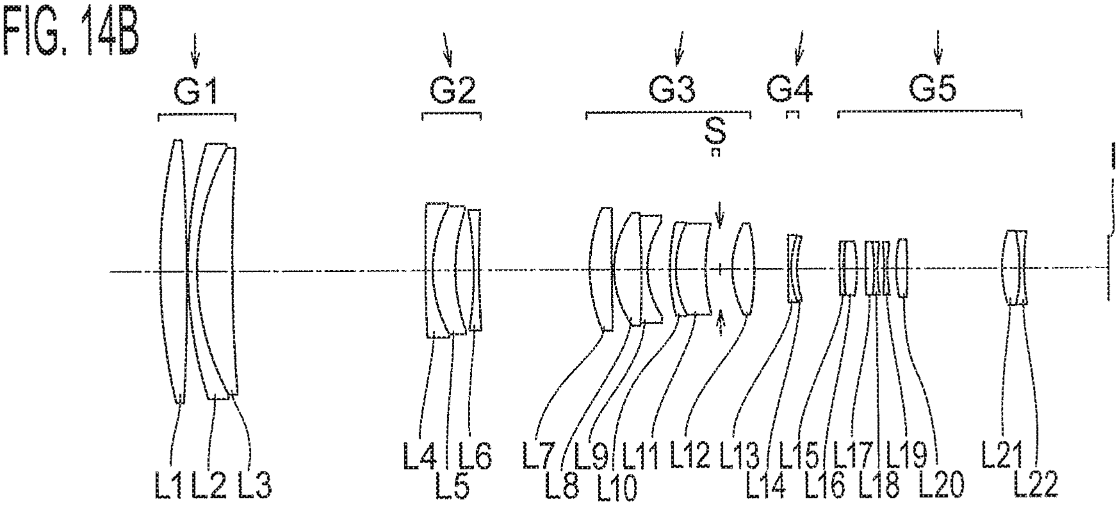
Figure 14C:
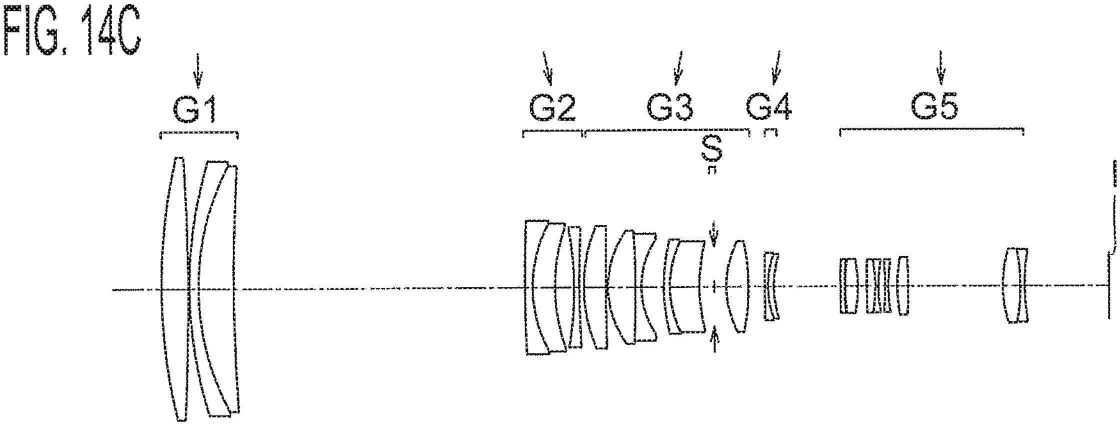
Figure 15A:
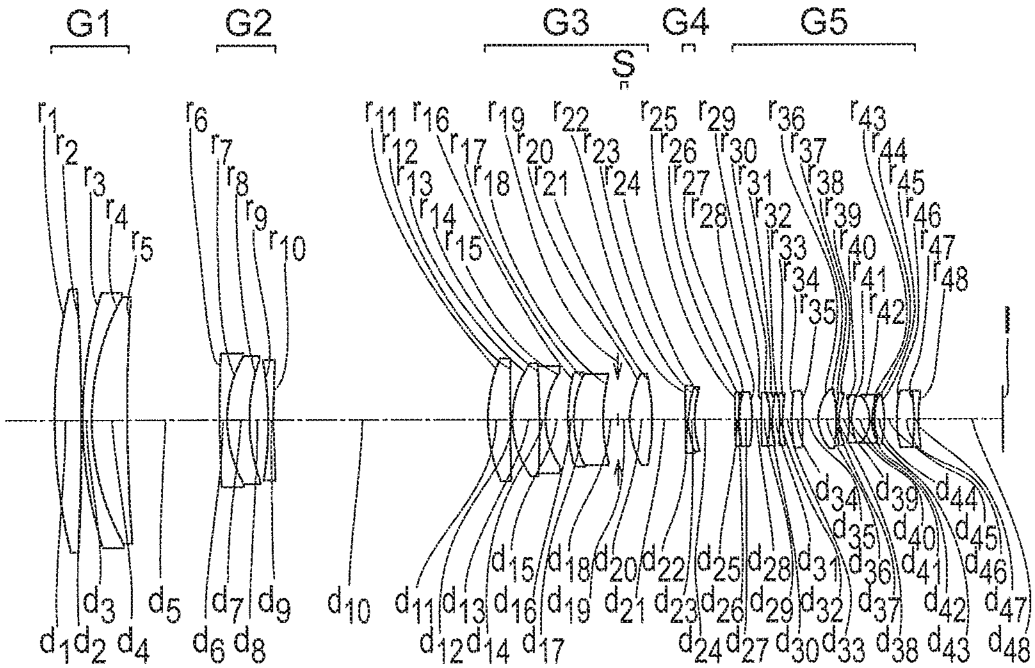
FIG. 15A, FIG. 15B, and FIG. 15C are lens cross-sectional views of an example 15.
Figure 15B:
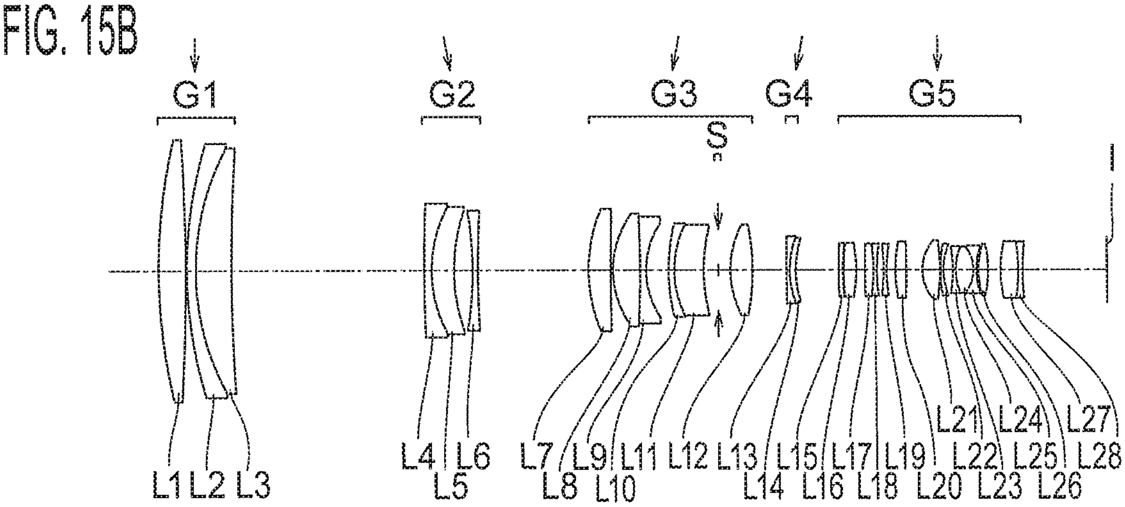
Figure 15C:
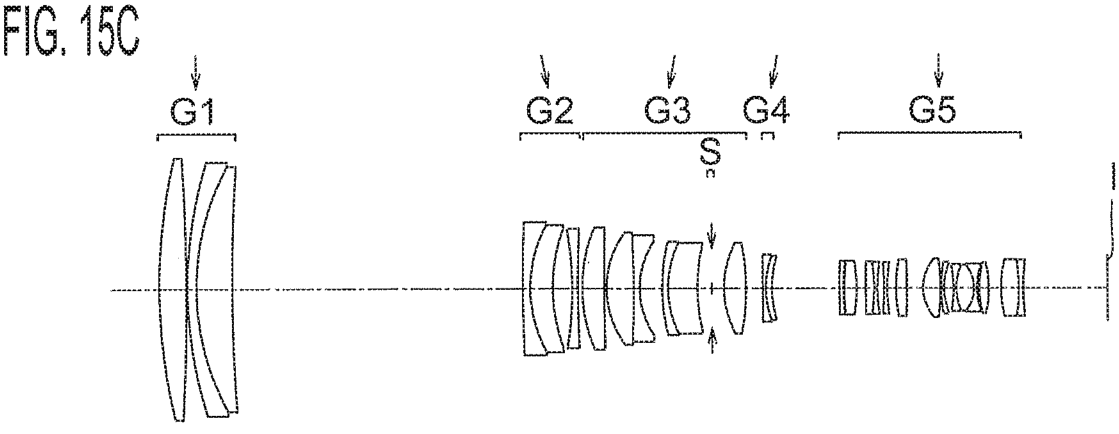
Figure 16A:
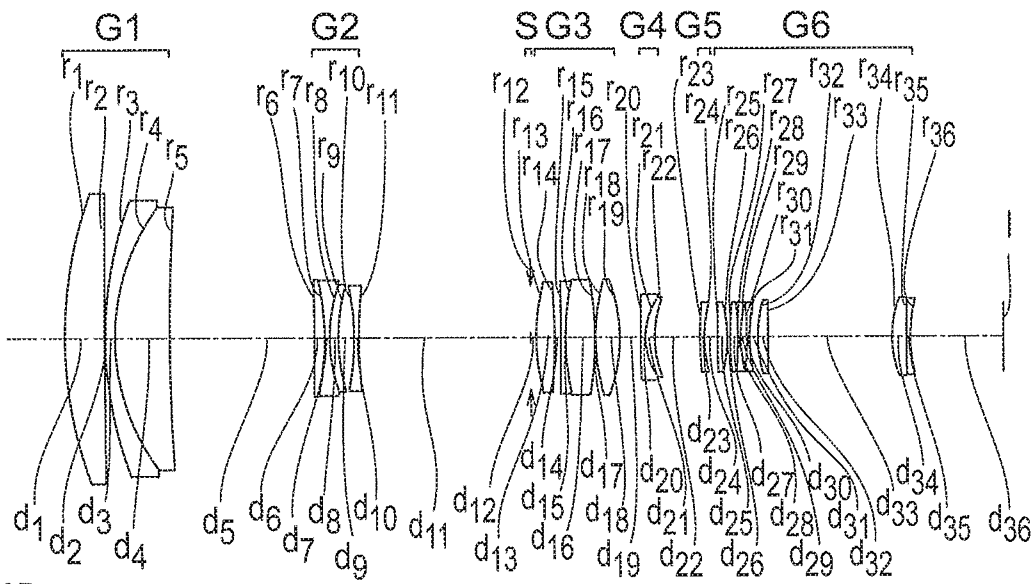
FIG. 16A, FIG. 16B, and FIG. 16C are lens cross-sectional views of an example 16.
Figure 16B:
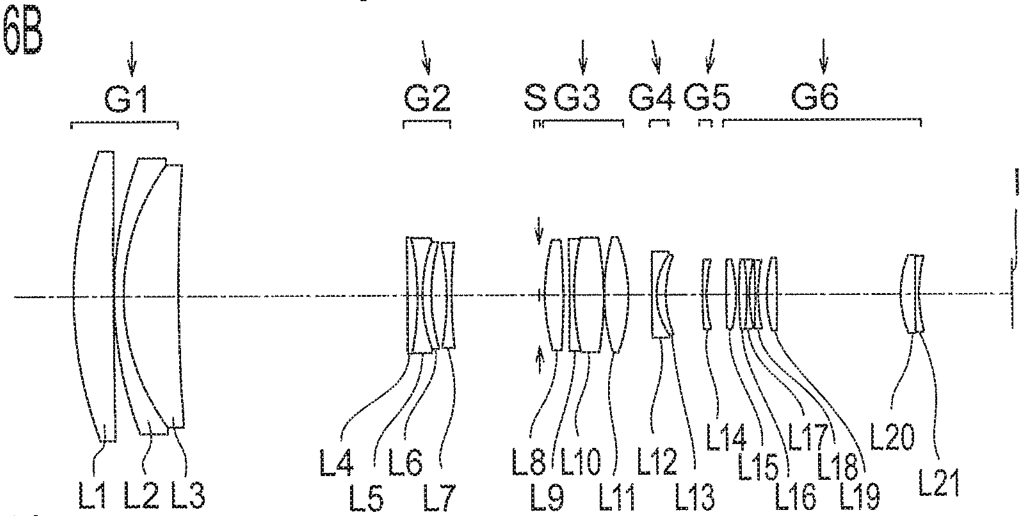
Figure 16C:
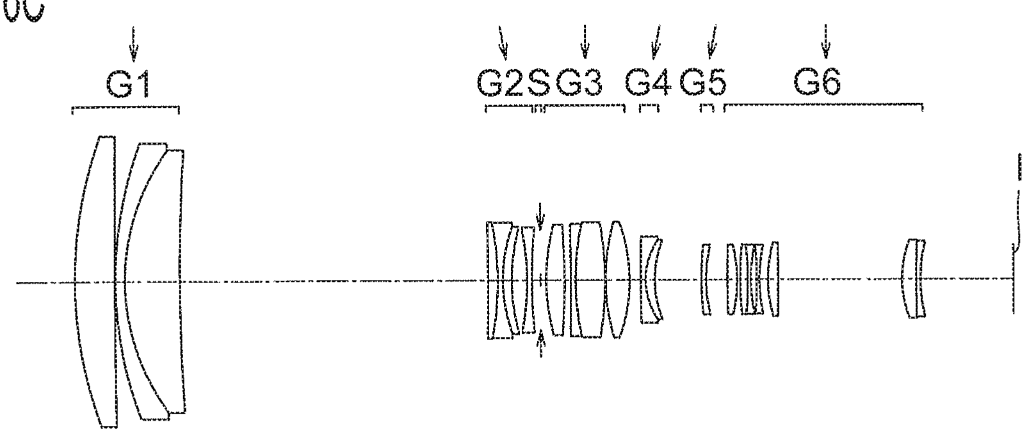
Figure 17A:
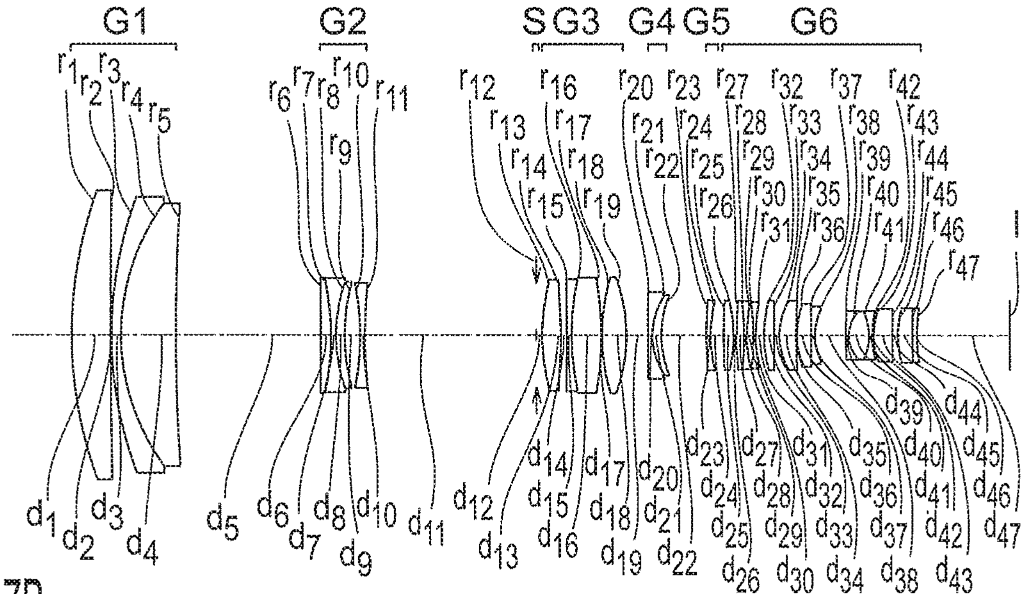
FIG. 17A, FIG. 17B, and FIG. 17C are lens cross-sectional views of an example 17.
Figure 17B:
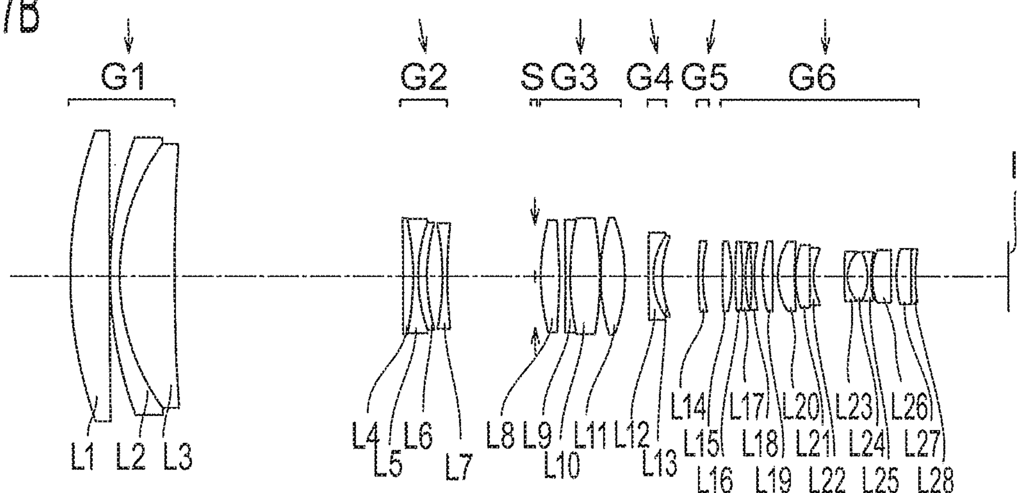
Figure 17C:
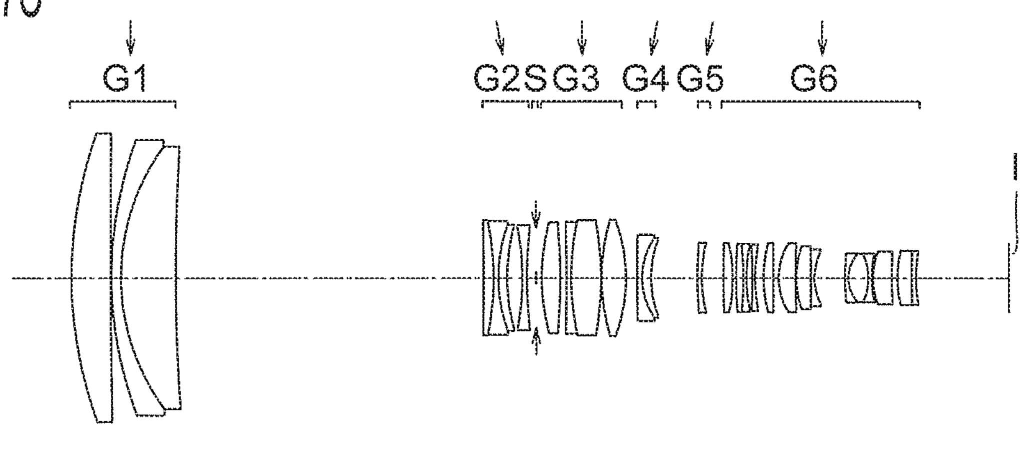
Figure 18A:
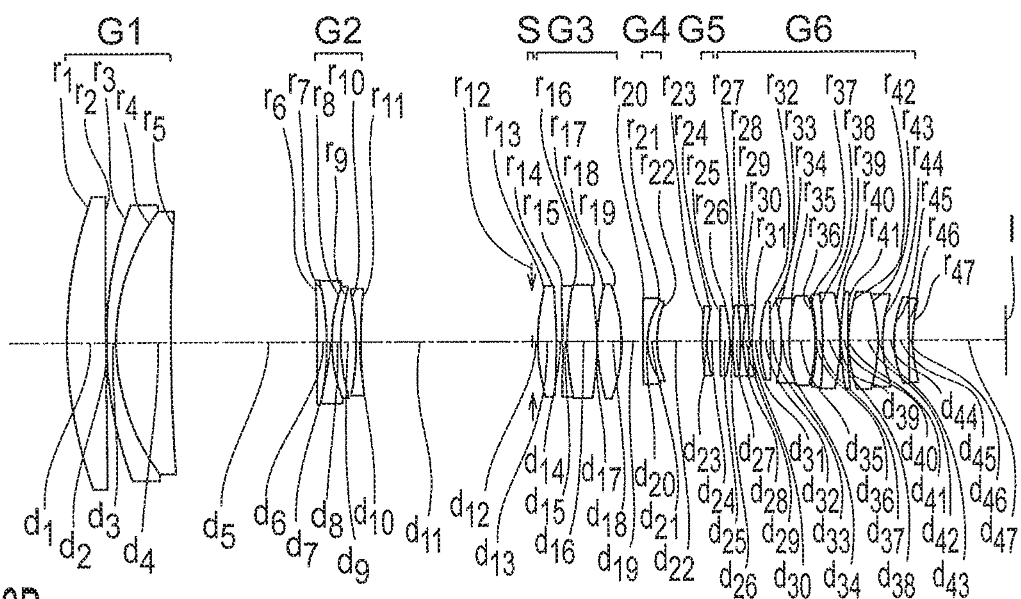
FIG. 18A, FIG. 18B, and FIG. 18C are lens cross-sectional views of an example 18.
Figure 18B:
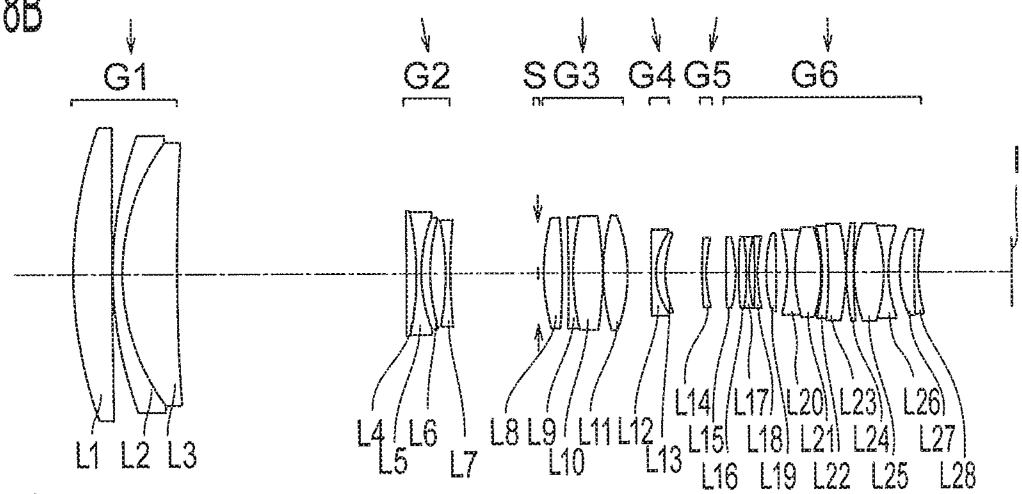
Figure 18C:
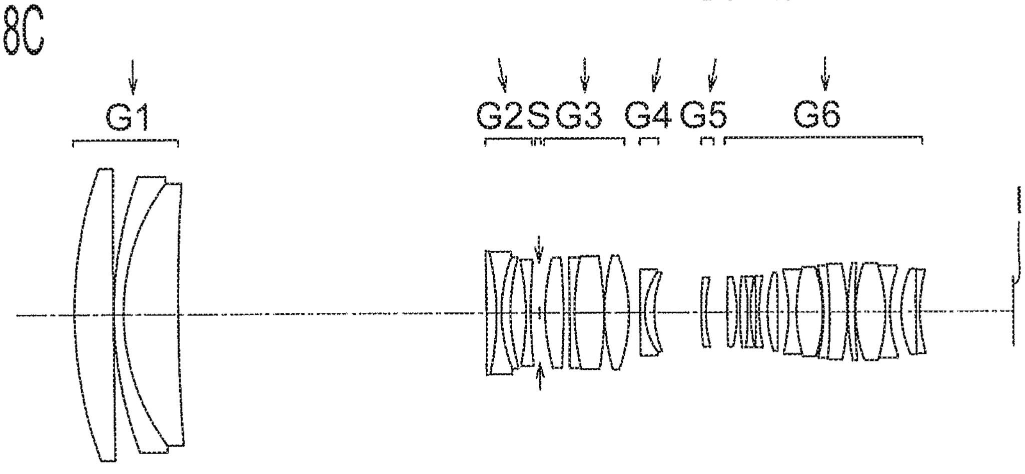
Figure 19A:
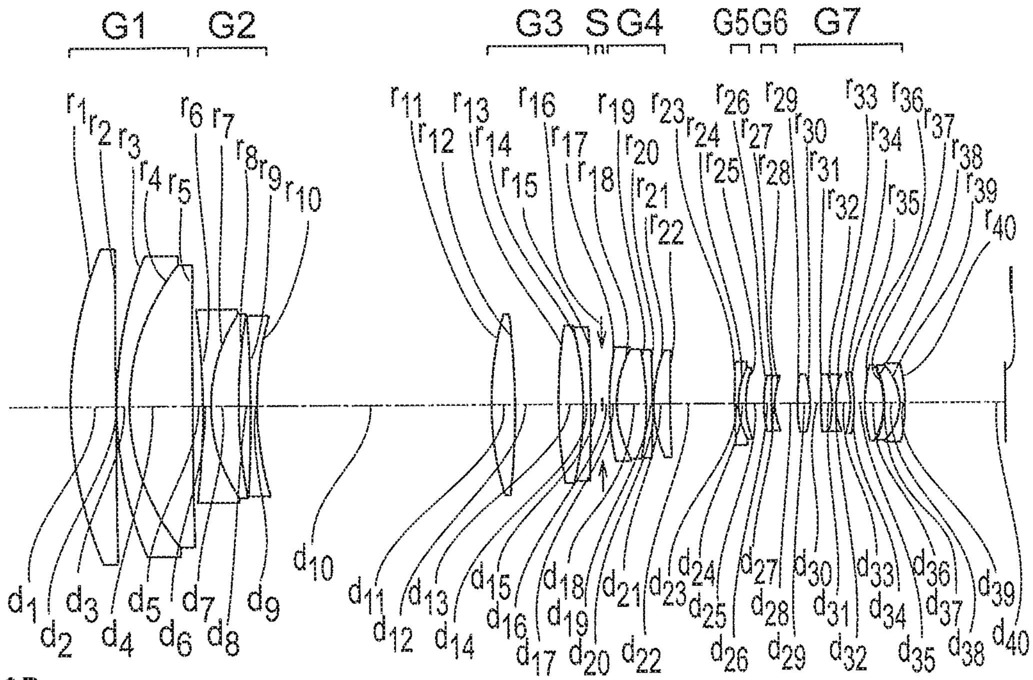
FIG. 19A, FIG. 19B, and FIG. 19C are lens cross-sectional views of an example 19.
Figure 19B:
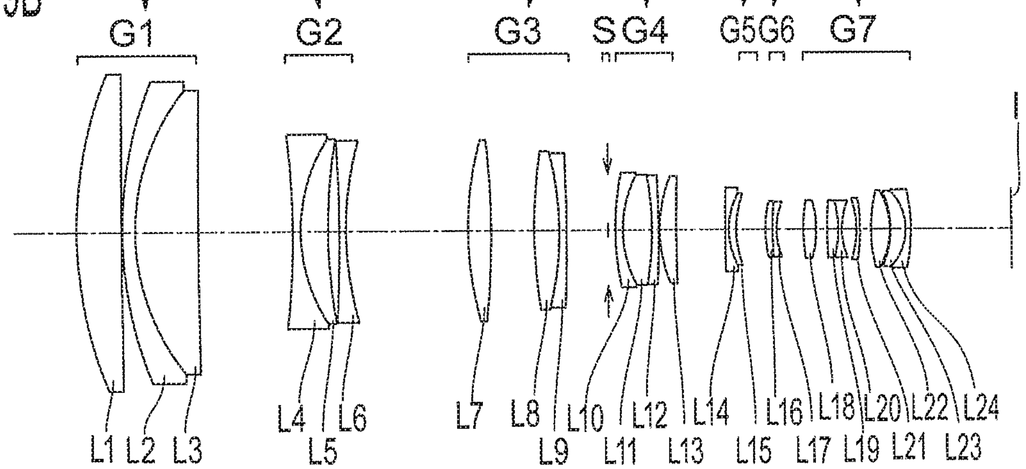
Figure 19C:
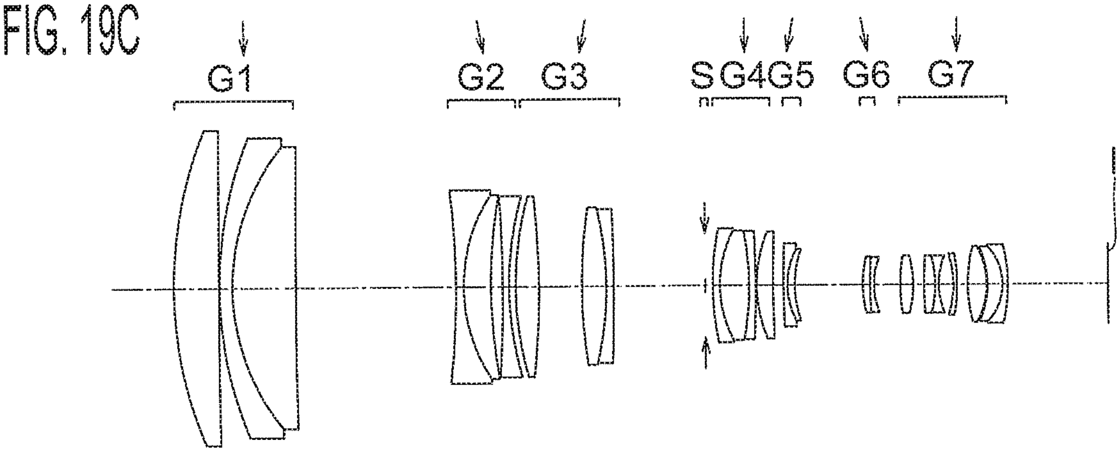
Figure 20A:
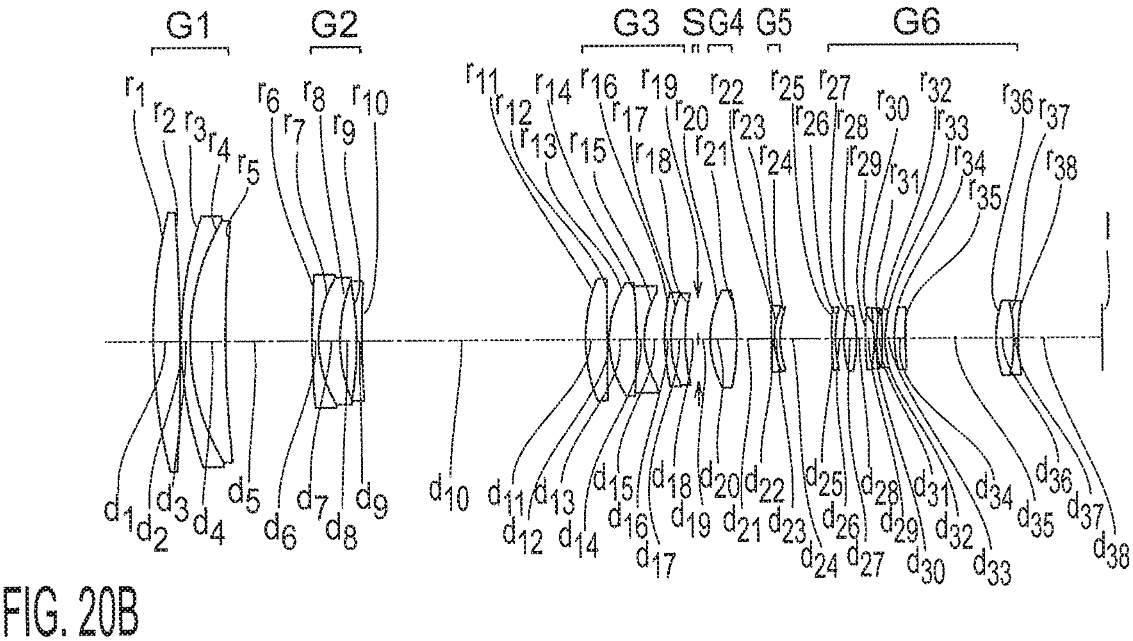
FIG. 20A, FIG. 20B, and FIG. 20C are lens cross-sectional views of an example 20.
Figure 20B:
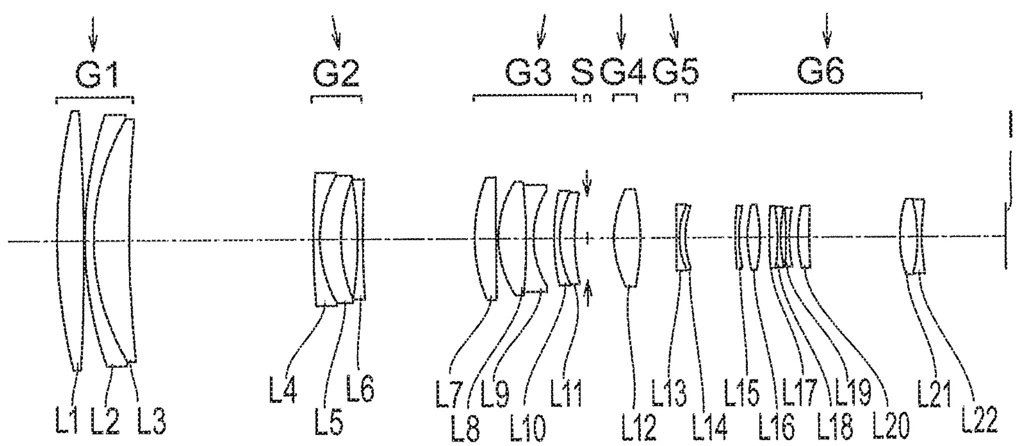
Figure 20C:
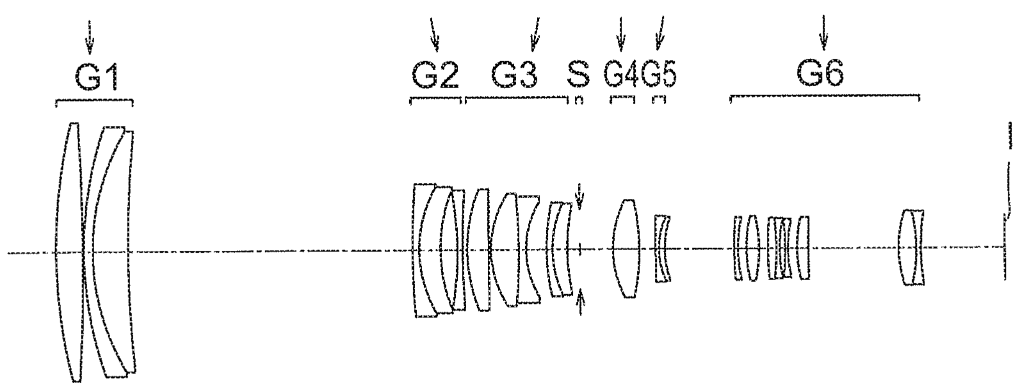
Figure 21A:
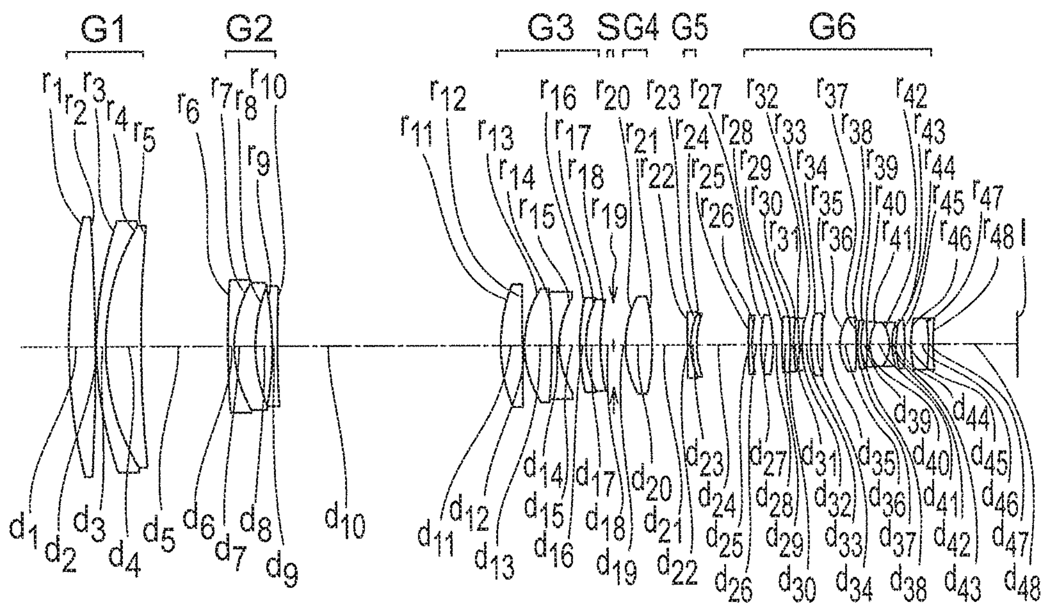
FIG. 21A, FIG. 21B, and FIG. 21C are lens cross-sectional views of an example 21.
Figure 21B:
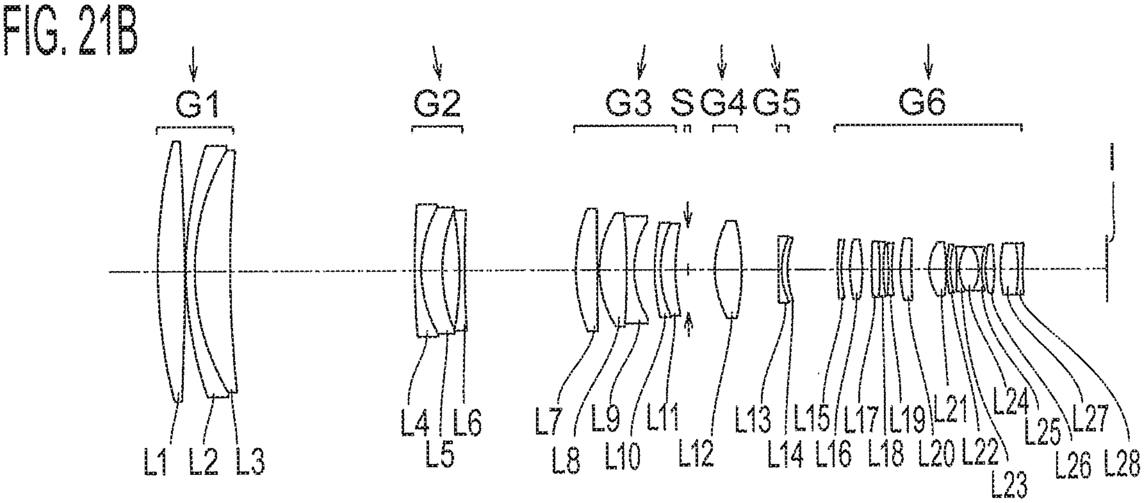
Figure 21C:
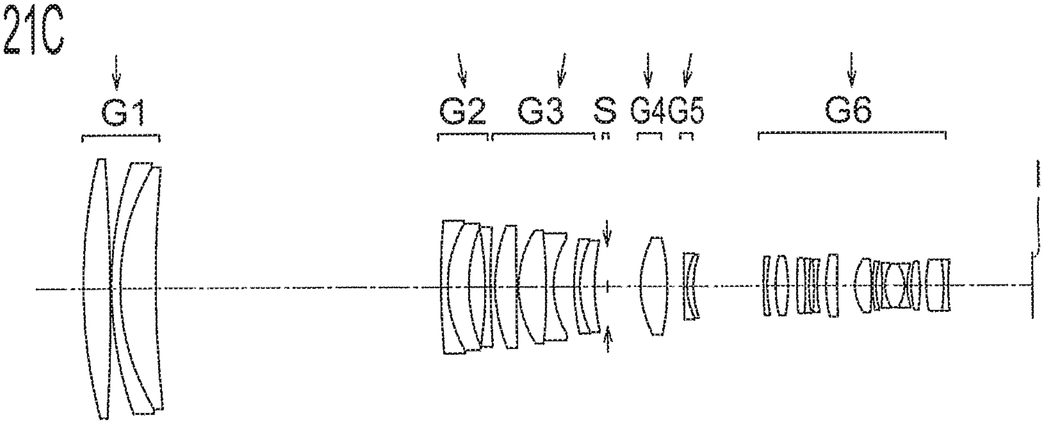
Figure 22A:
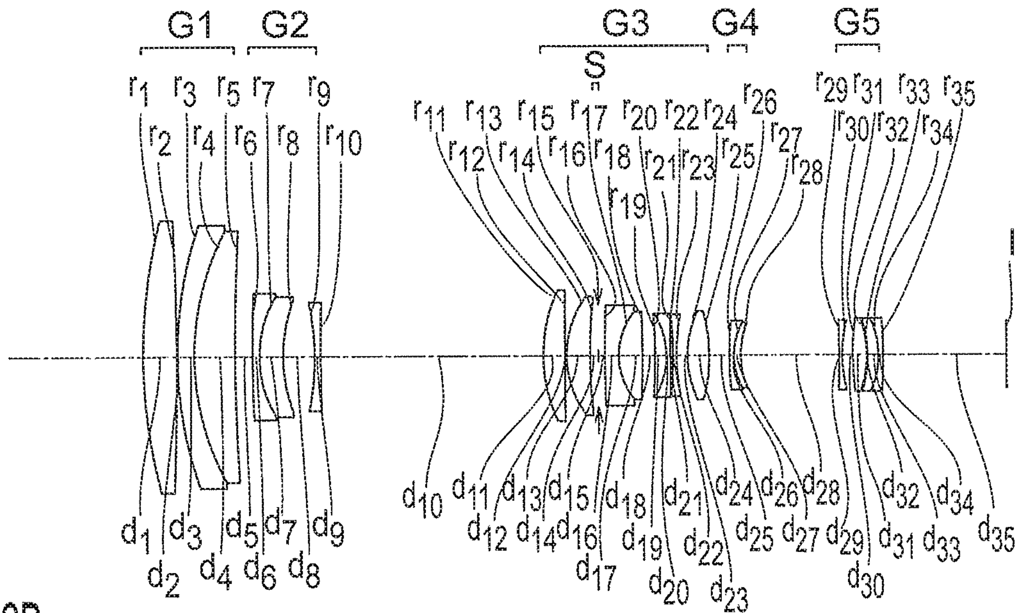
FIG. 22A, FIG. 22B, and FIG. 22C are lens cross-sectional views of an example 22.
Figure 22B:
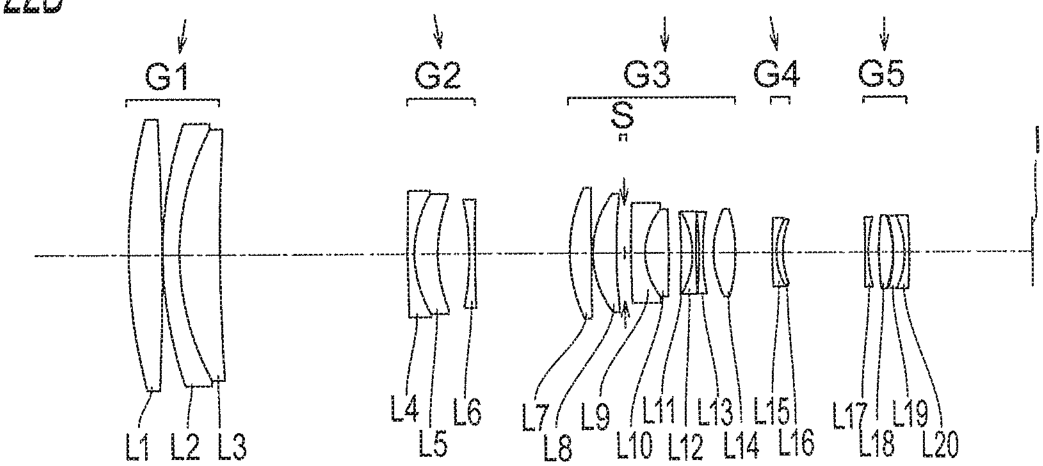
Figure 22C:
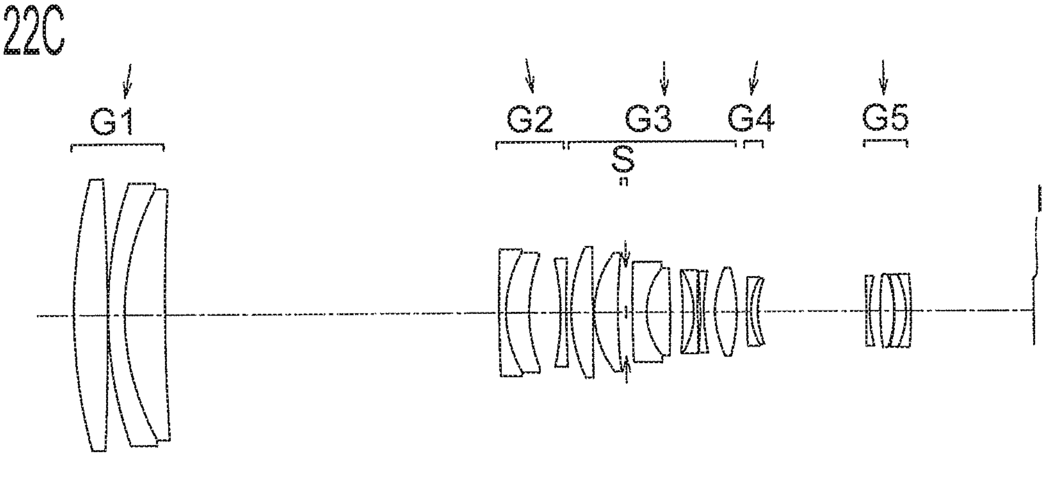
Figure 23A:
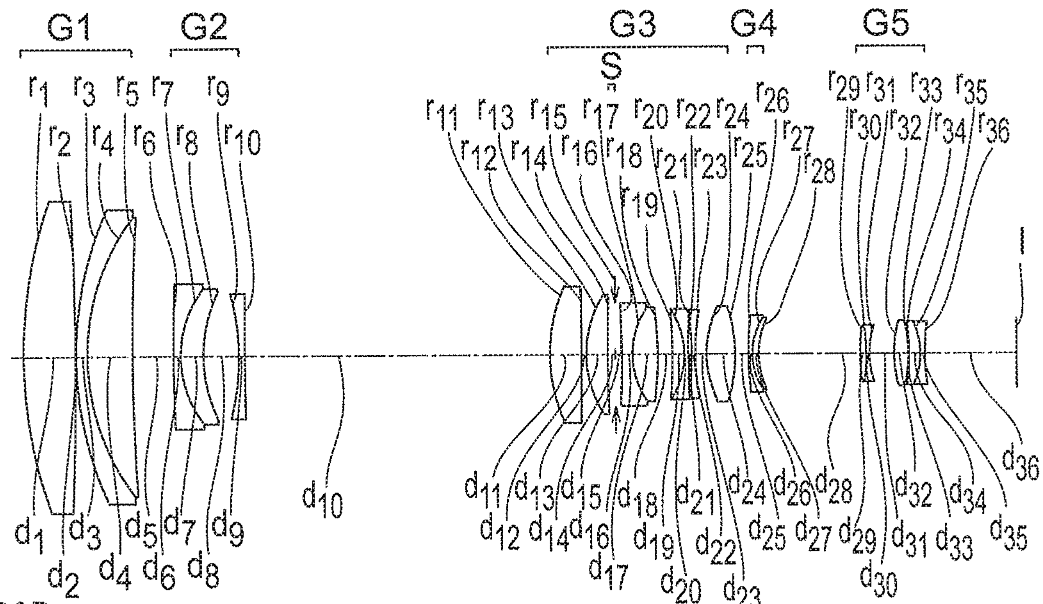
FIG. 23A, FIG. 23B, and FIG. 23C are lens cross-sectional views of an example 23.
Figure 23B:
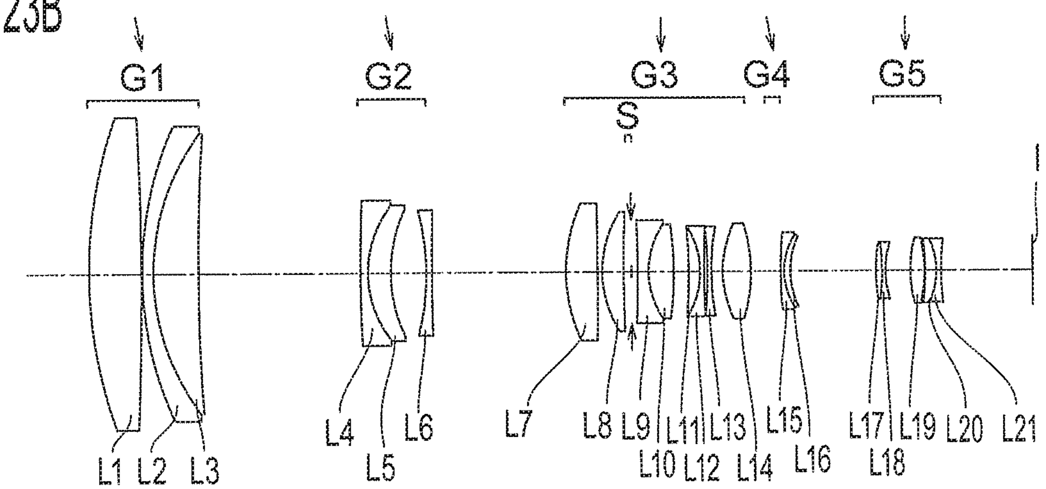
Figure 23C:
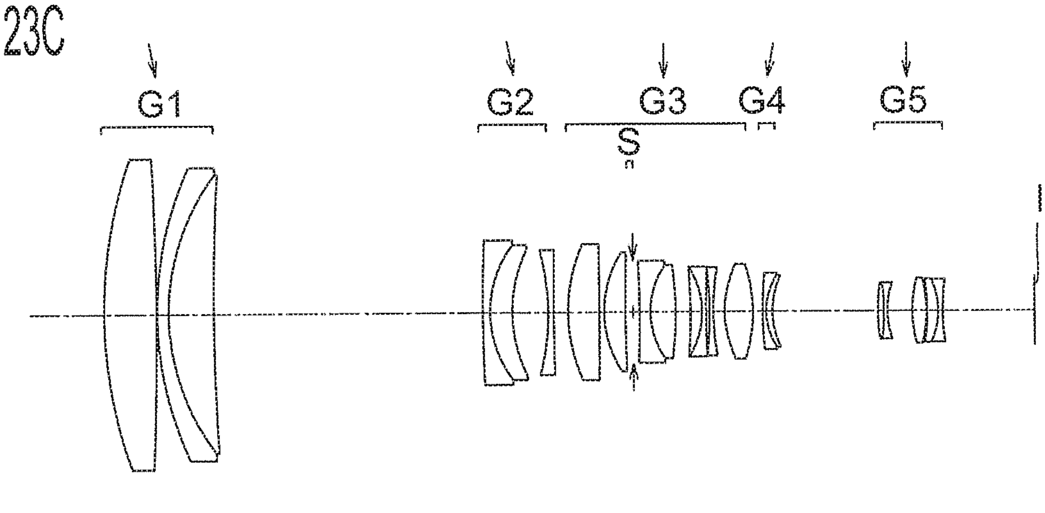
Figure 24A:
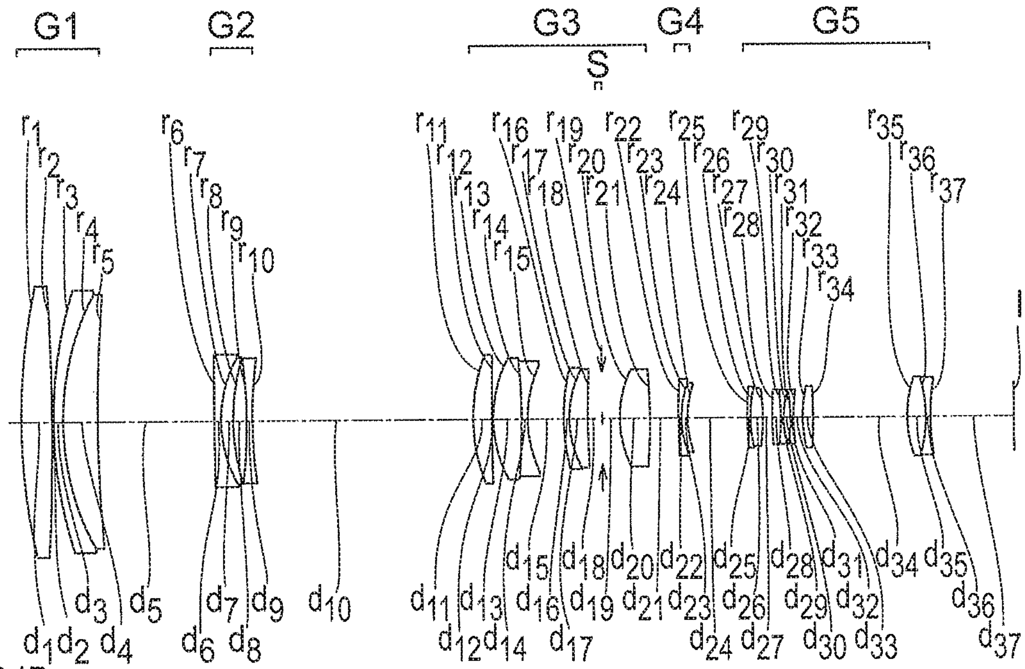
FIG. 24A, FIG. 24B, and FIG. 24C are lens cross-sectional views of an example 24.
Figure 24B:
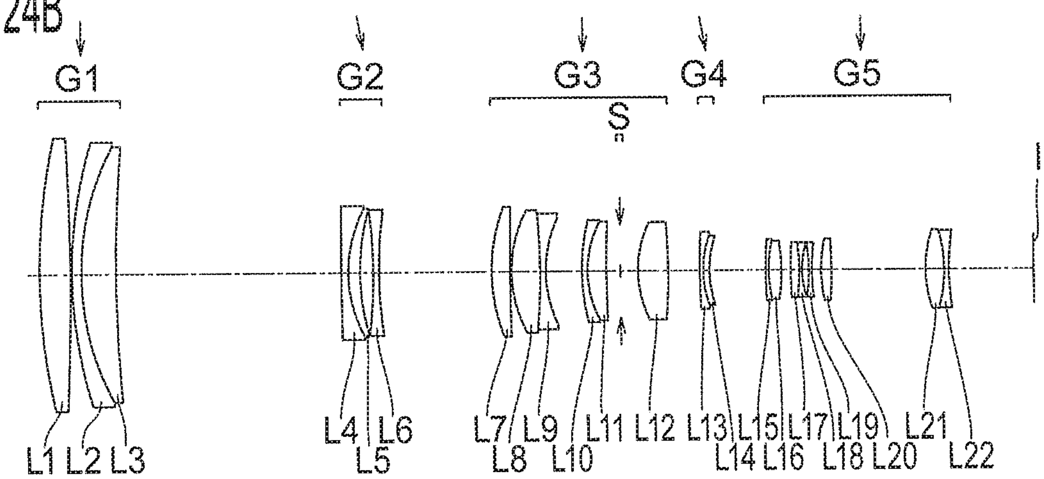
Figure 24C:
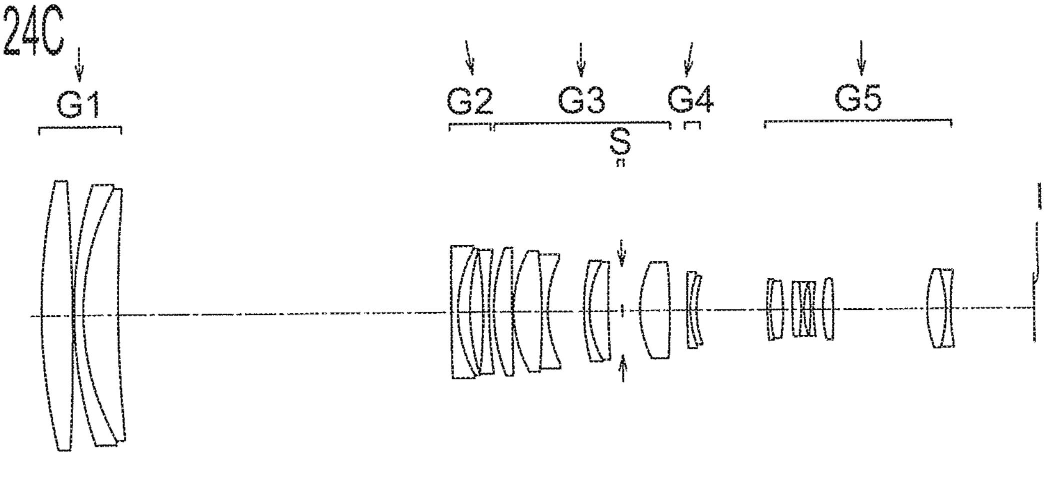
Figure 25A:
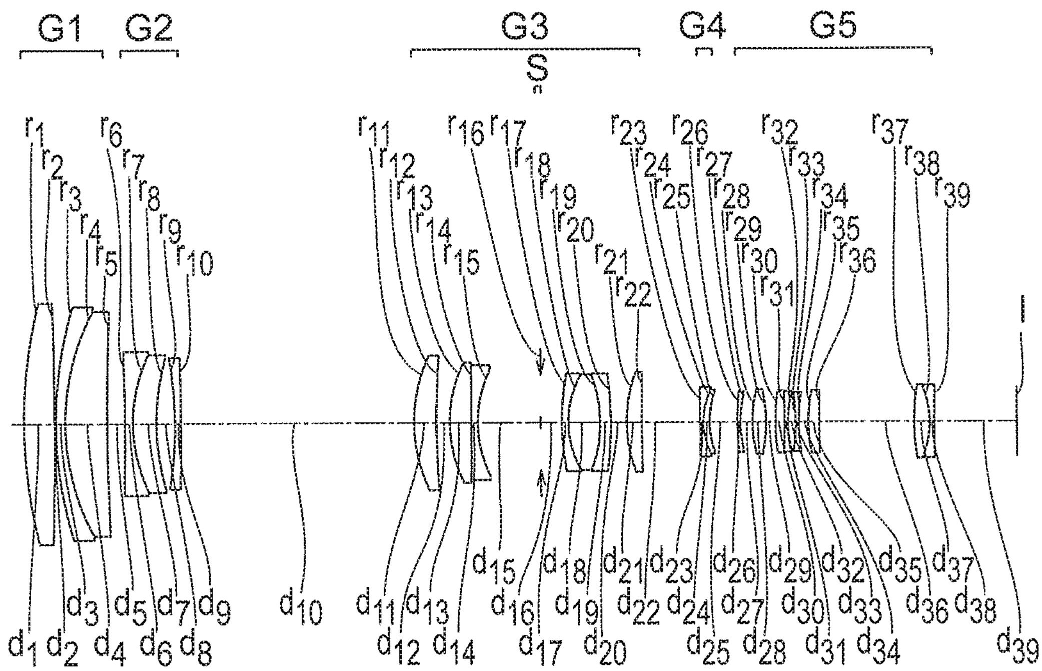
FIG. 25A, FIG. 25B, and FIG. 25C are lens cross-sectional views of an example 25.
Figure 25B:
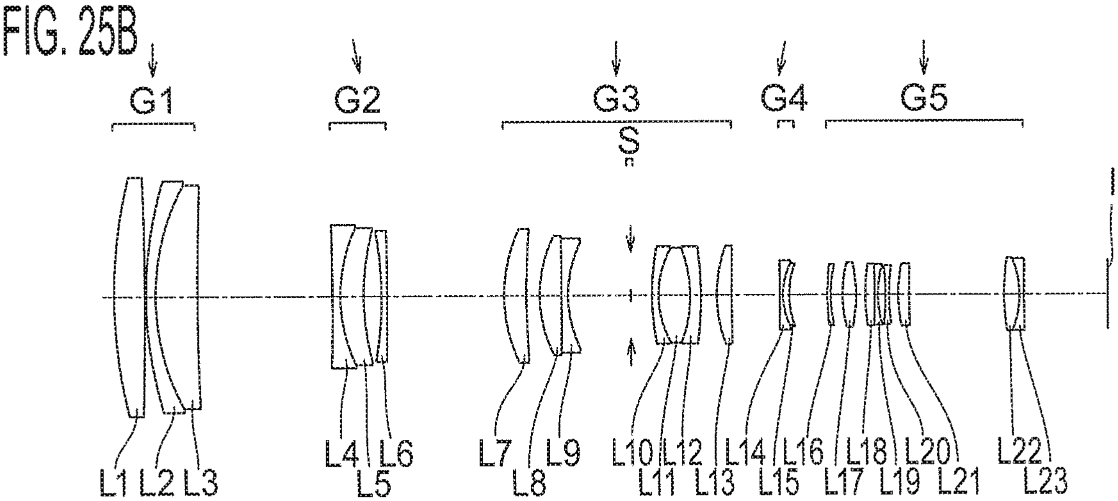
Figure 25C:
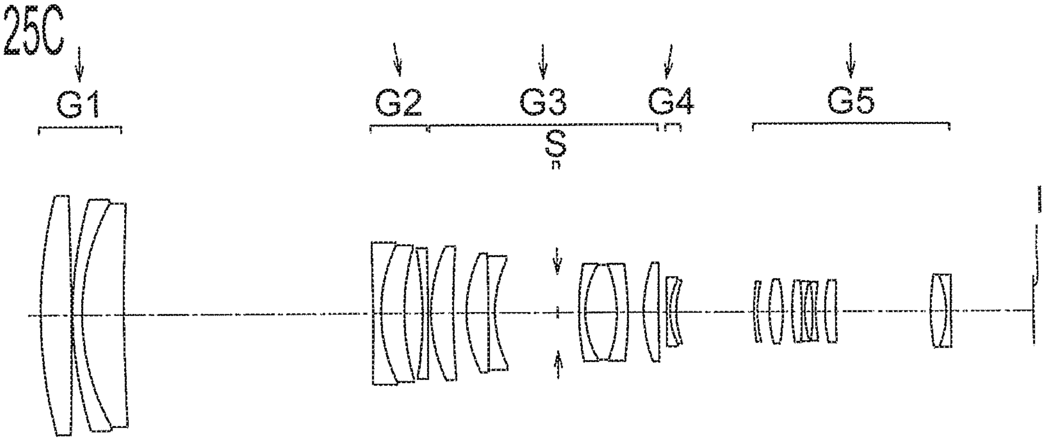
Figure 26A:
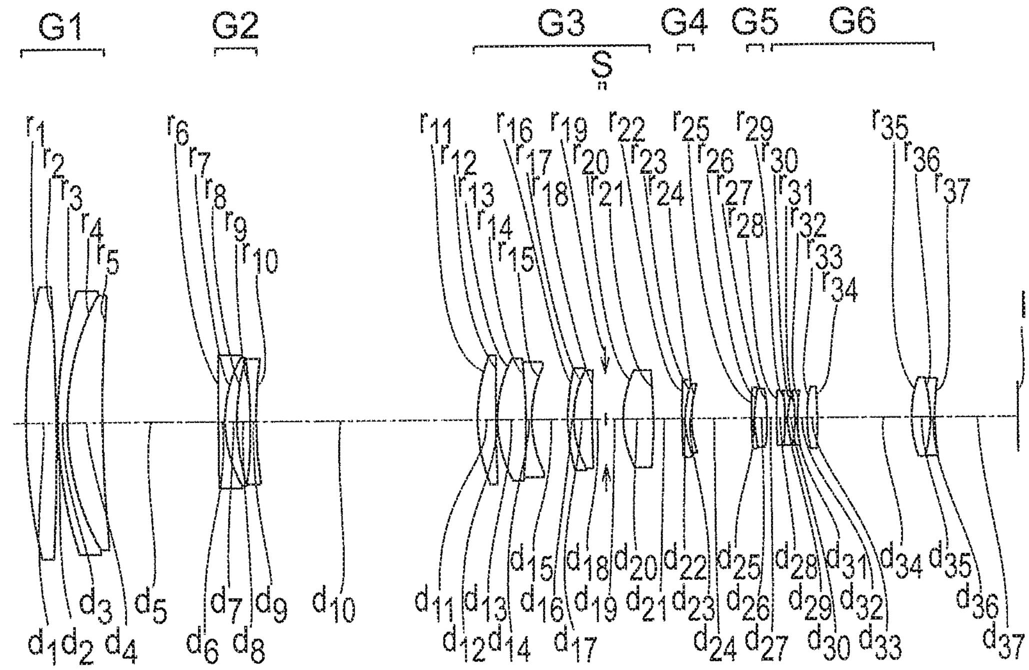
FIG. 26A, FIG. 26B, and FIG. 26C are lens cross-sectional views of an example 26.
Figure 26B:
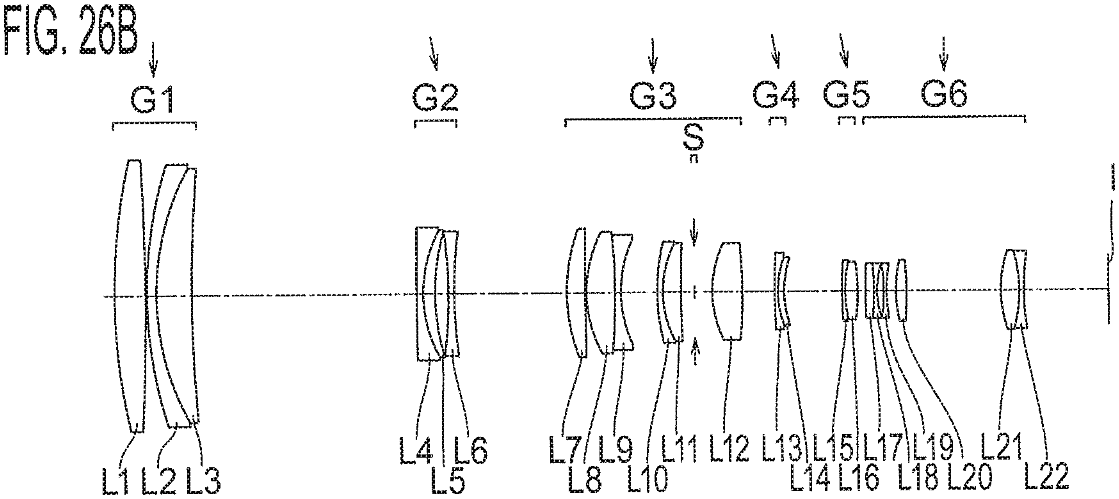
Figure 26C:
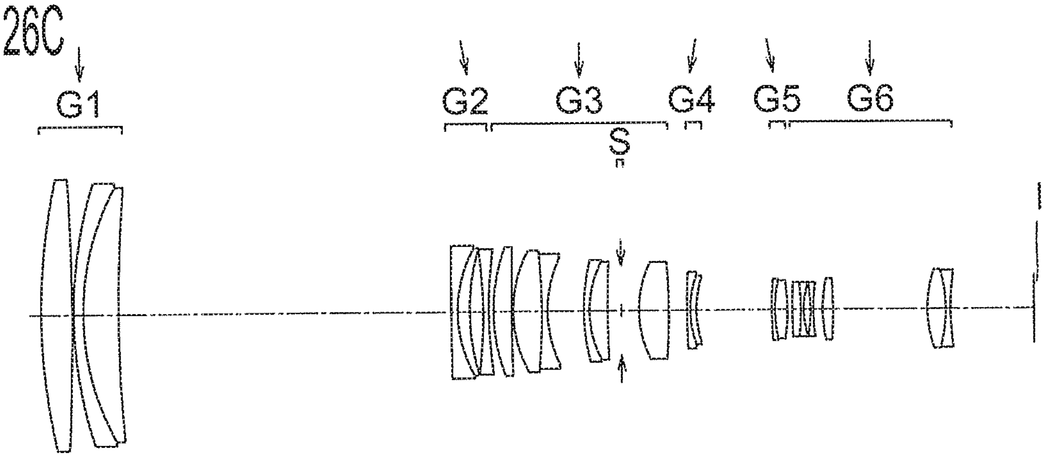
Figure 27A:
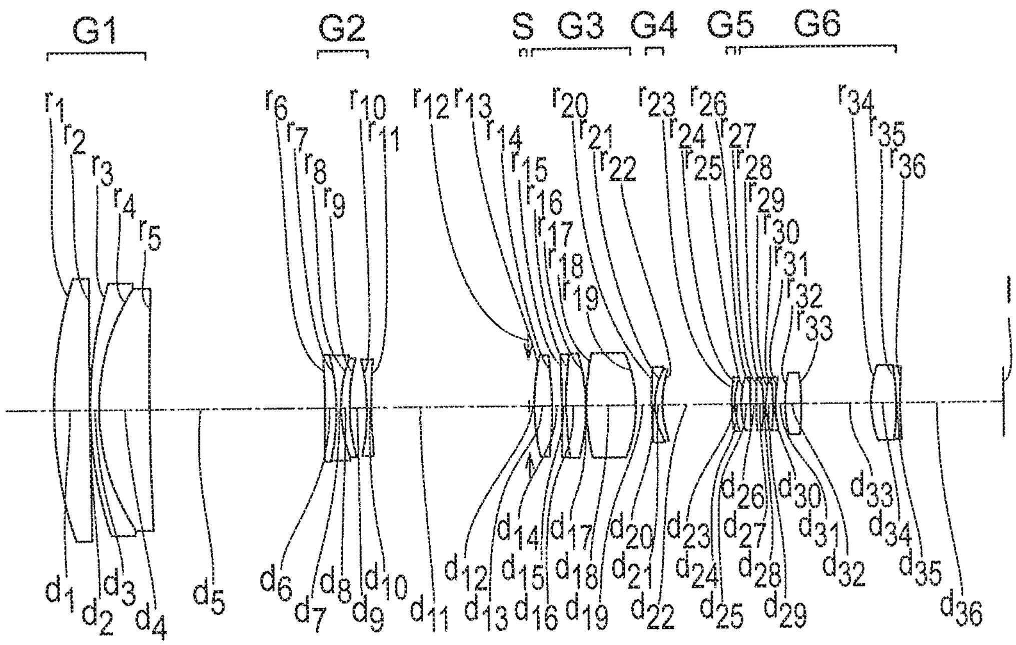
FIG. 27A, FIG. 27B, and FIG. 27C are lens cross-sectional views of an example 27.
Figure 27B:
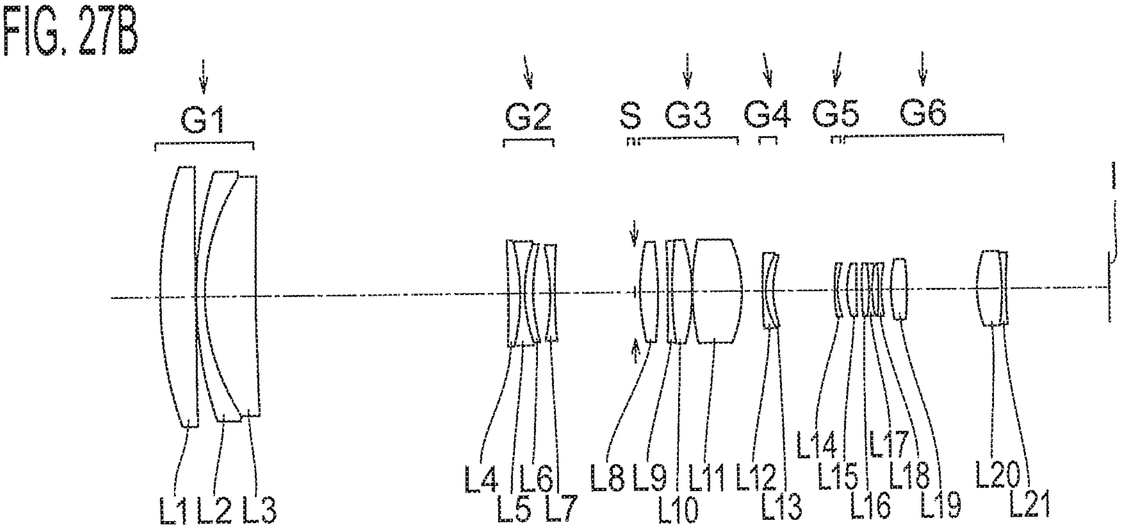
Figure 27C:
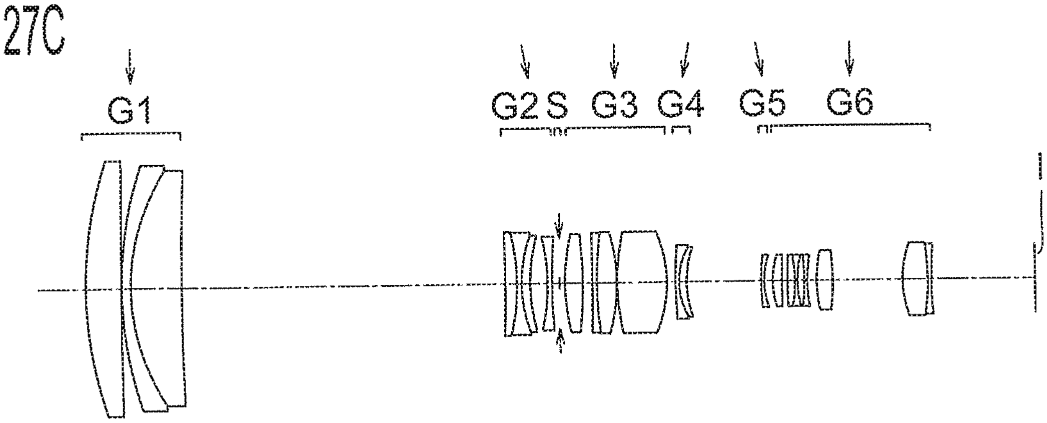
Figure 28A:
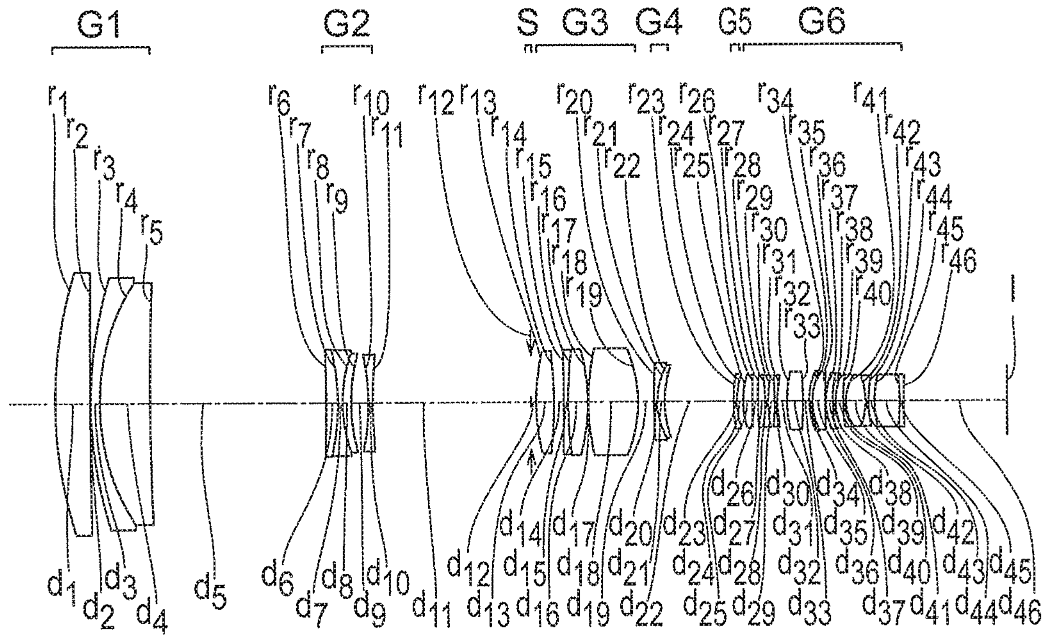
FIG. 28A, FIG. 28B, and FIG. 28C are lens cross-sectional views of an example 28.
Figure 28B:
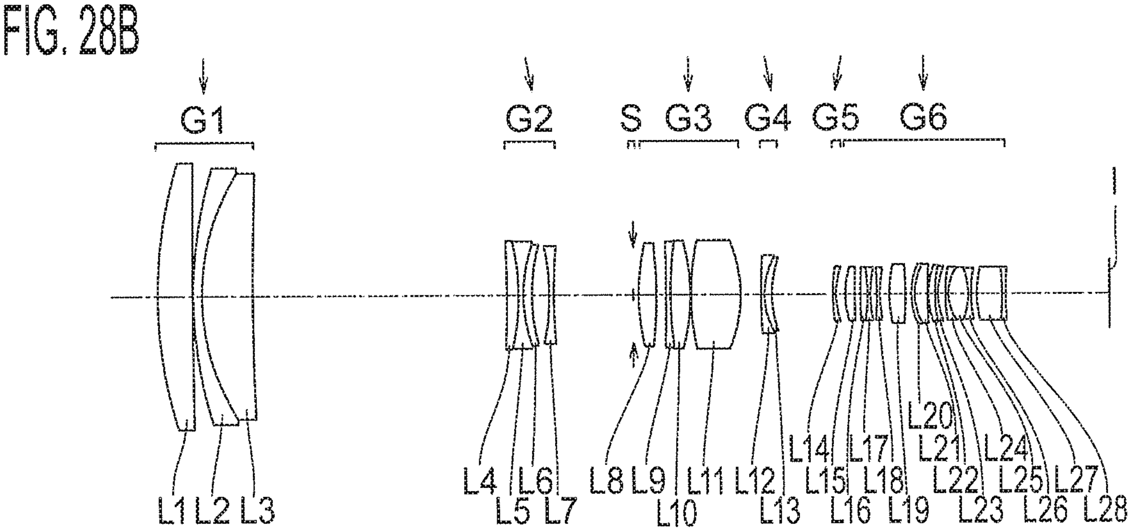
Figure 28C:
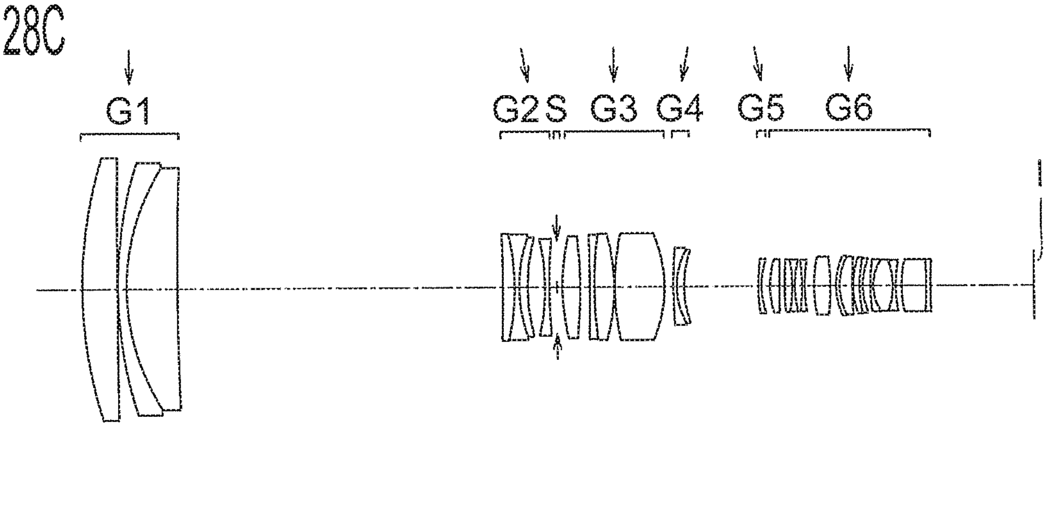
Figure 29A:
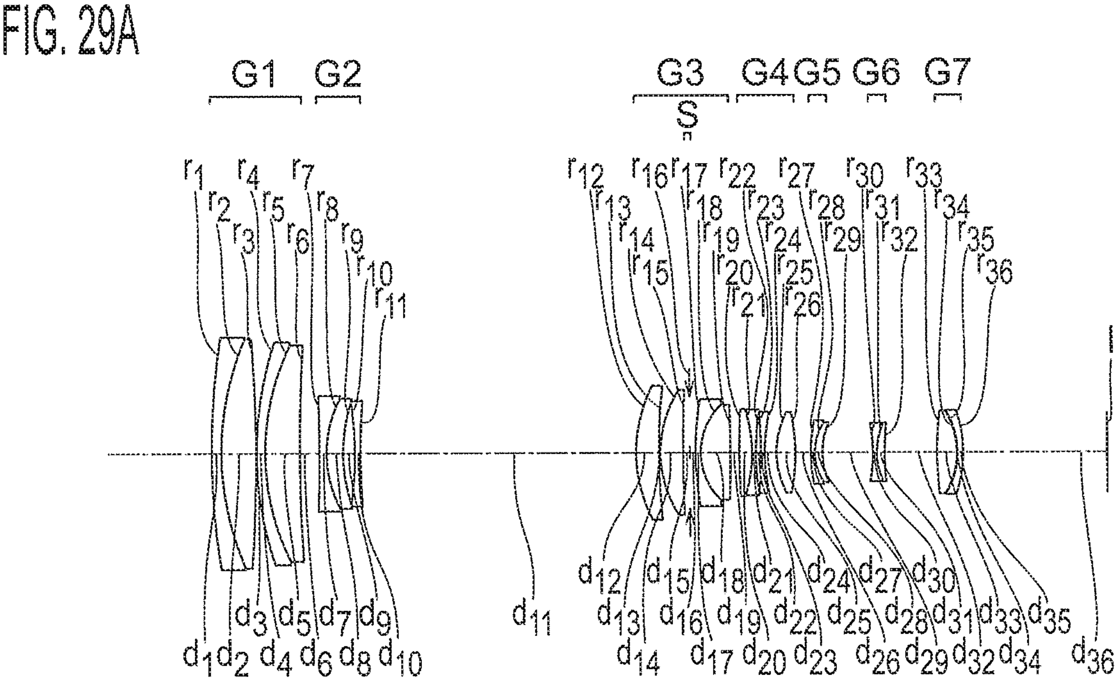
FIG. 29A, FIG. 29B, and FIG. 29C are lens cross-sectional views of an example 29.
Figure 29B:
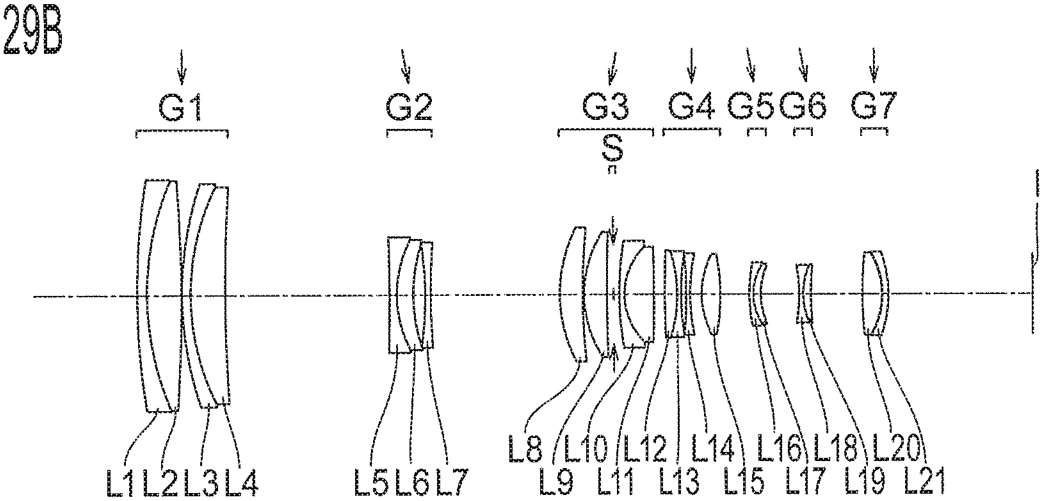
Figure 29C:
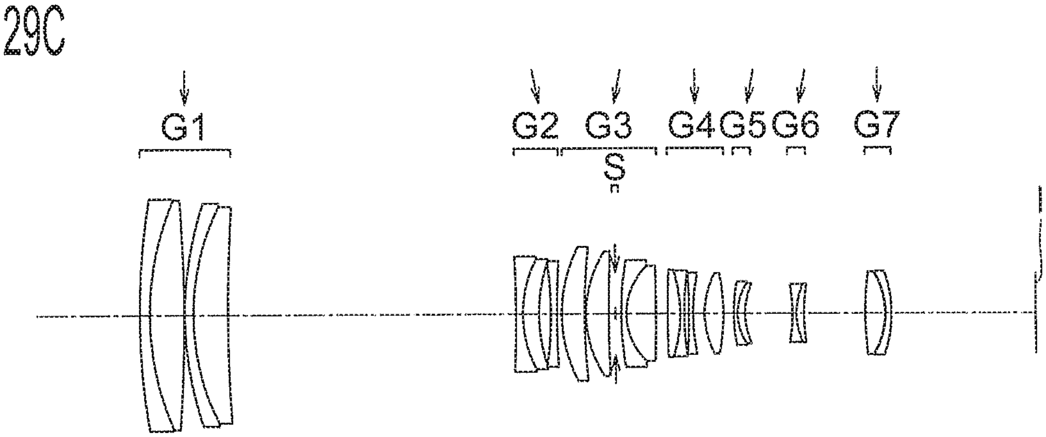
Figure 30A:
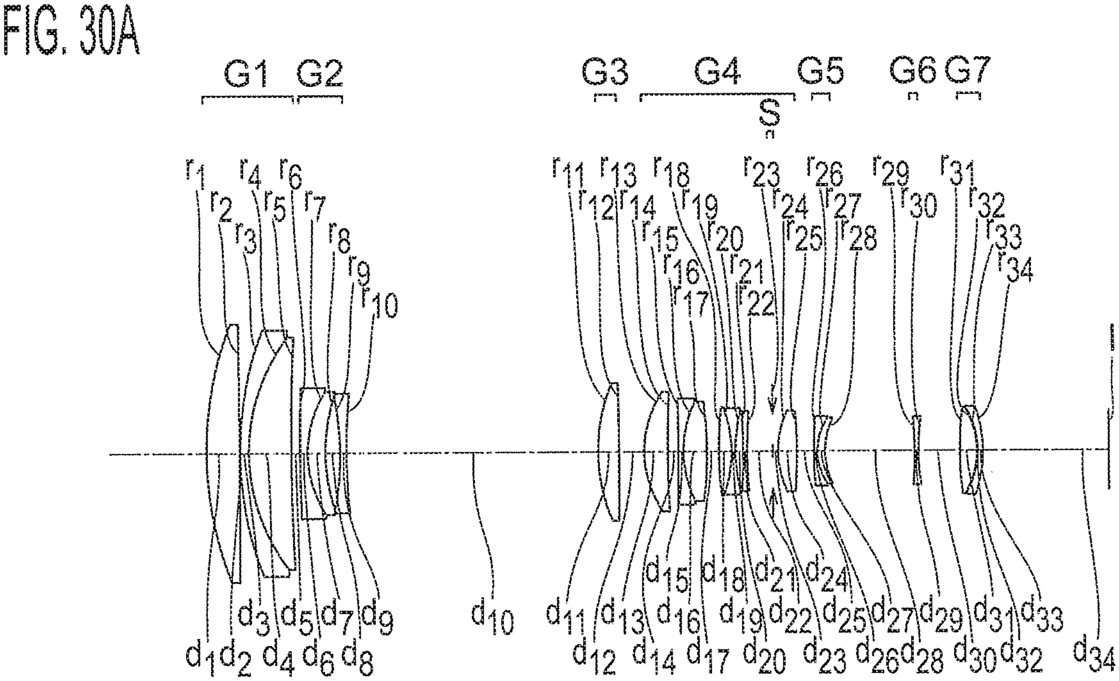
FIG. 30A, FIG. 30B, and FIG. 30C are lens cross-sectional views of an example 30.
Figure 30B:
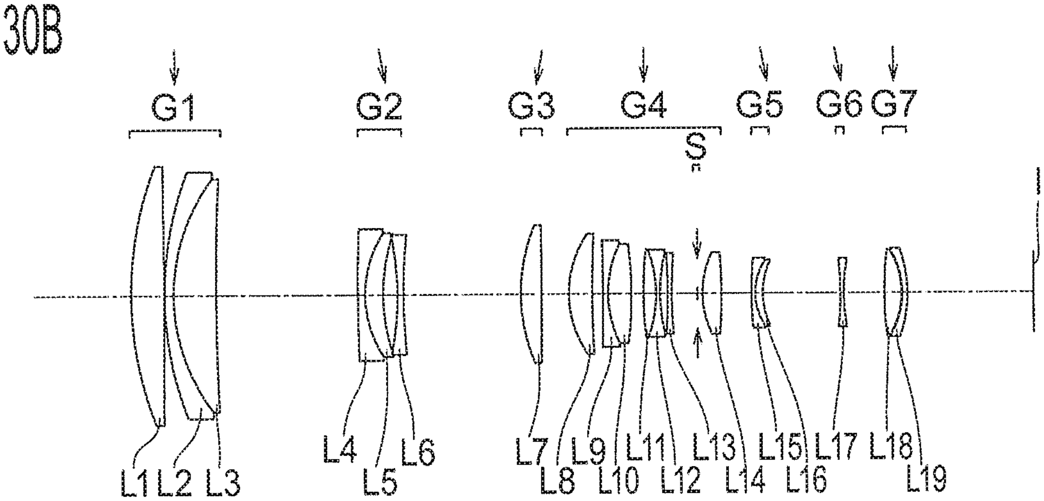
Figure 30C:
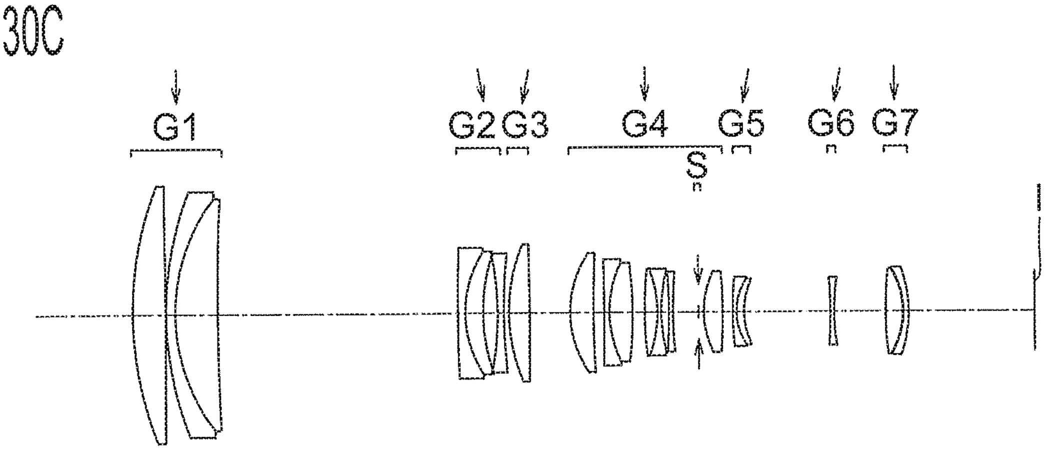
Figure 31A:
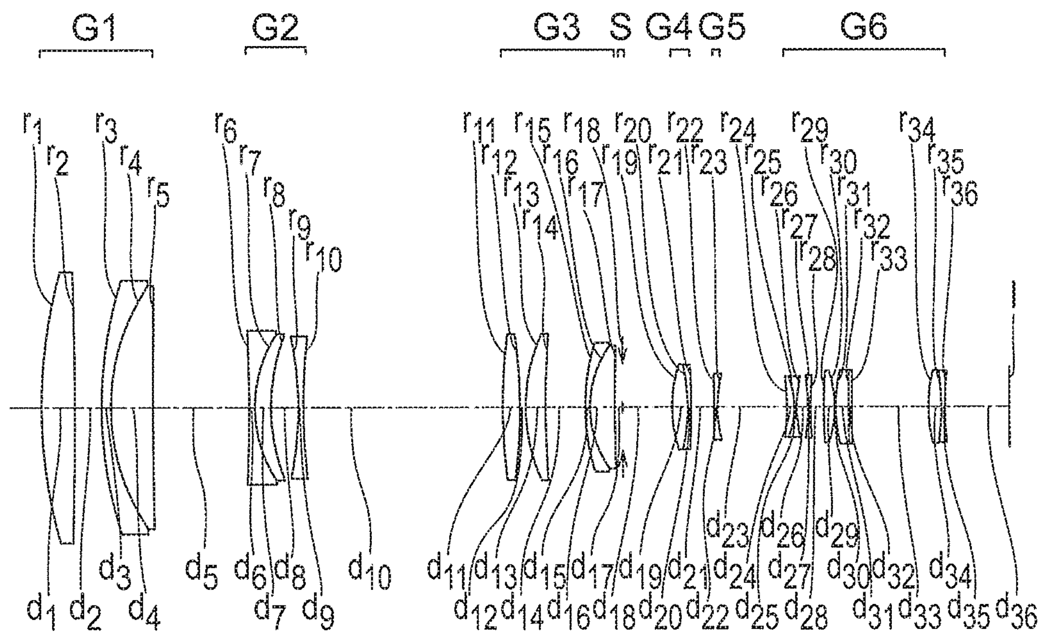
FIG. 31A, FIG. 31B, and FIG. 31C are lens cross-sectional views of an example 31.
Figure 31B:
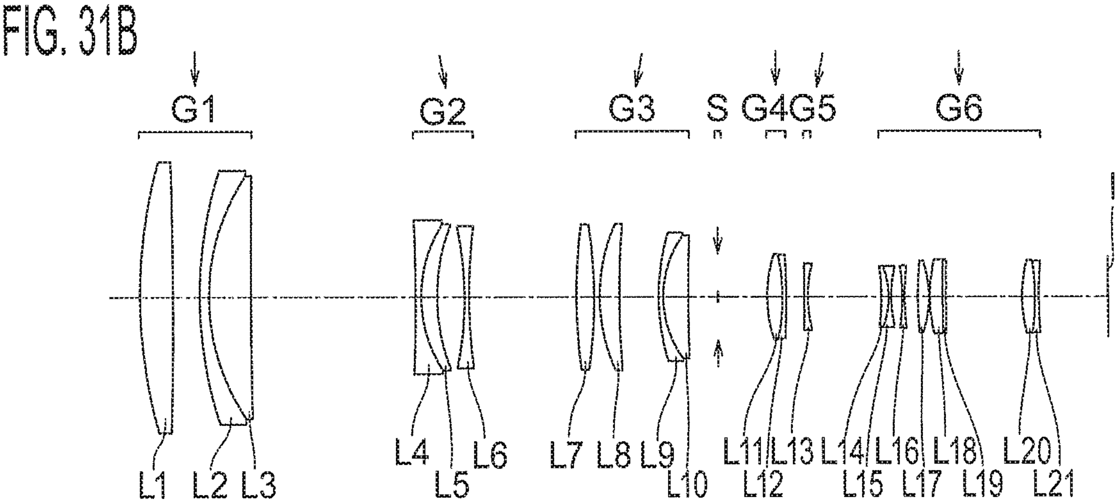
Figure 31C:
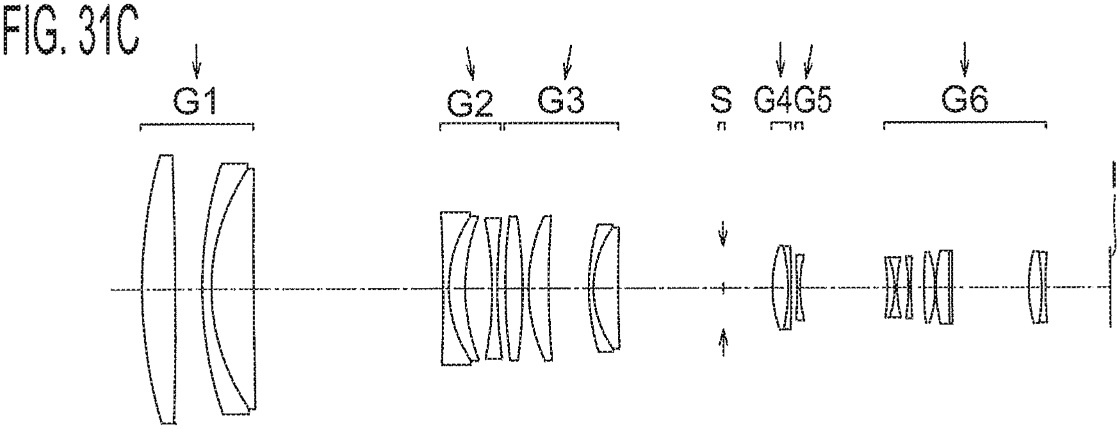
Figure 32A:
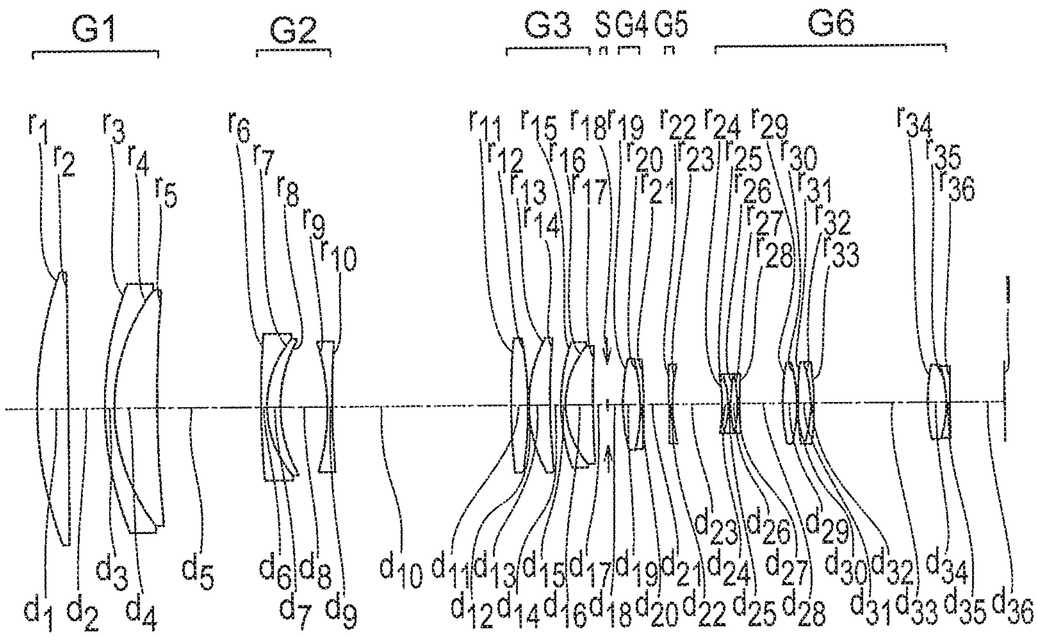
FIG. 32A, FIG. 32B, and FIG. 32C are lens cross-sectional views of an example 32.
Figure 32B:
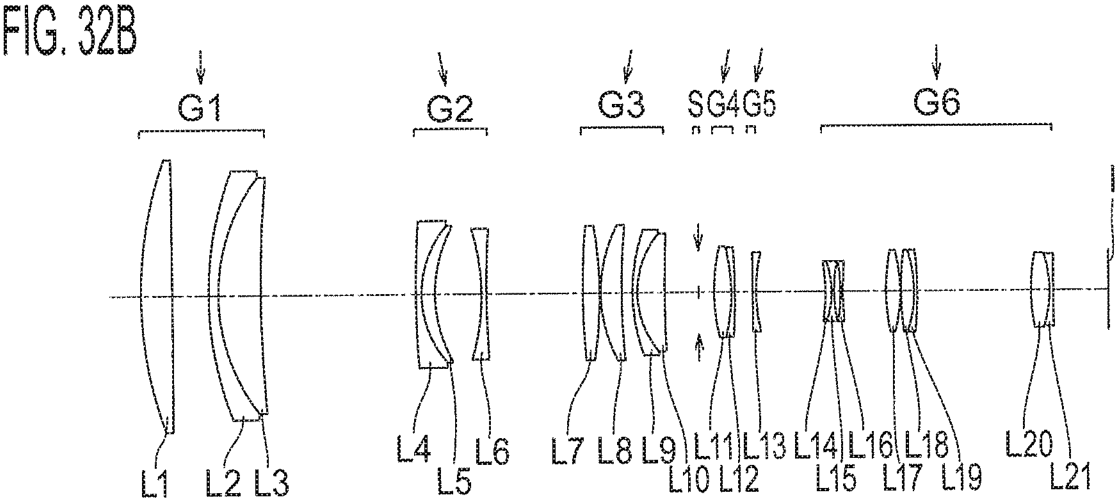
Figure 32C:
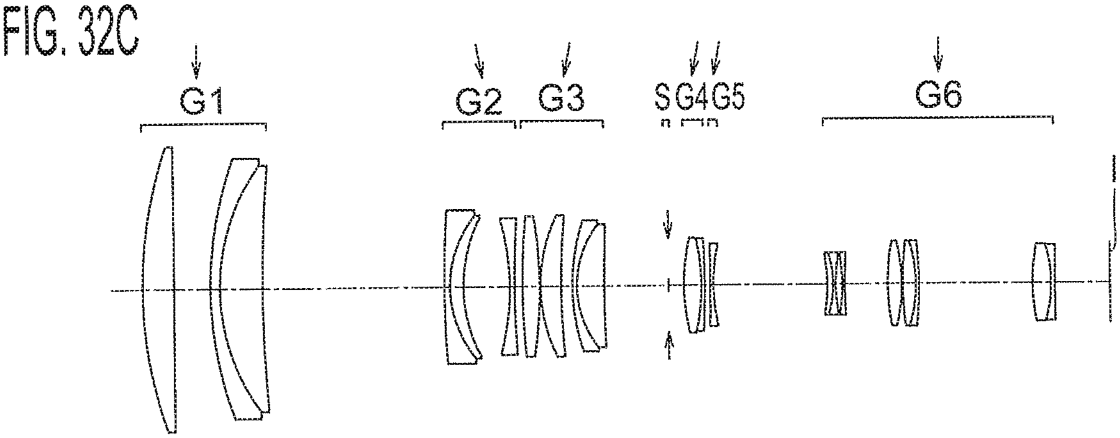
Figure 33A:
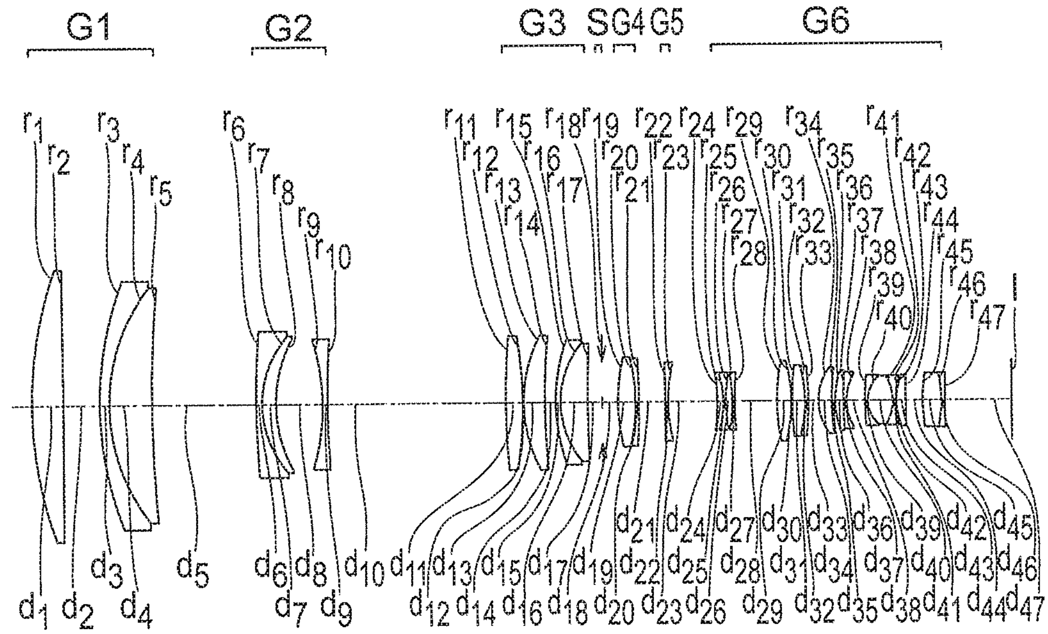
FIG. 33A, FIG. 33B, and FIG. 33C are lens cross-sectional views of an example 33.
Figure 33B:
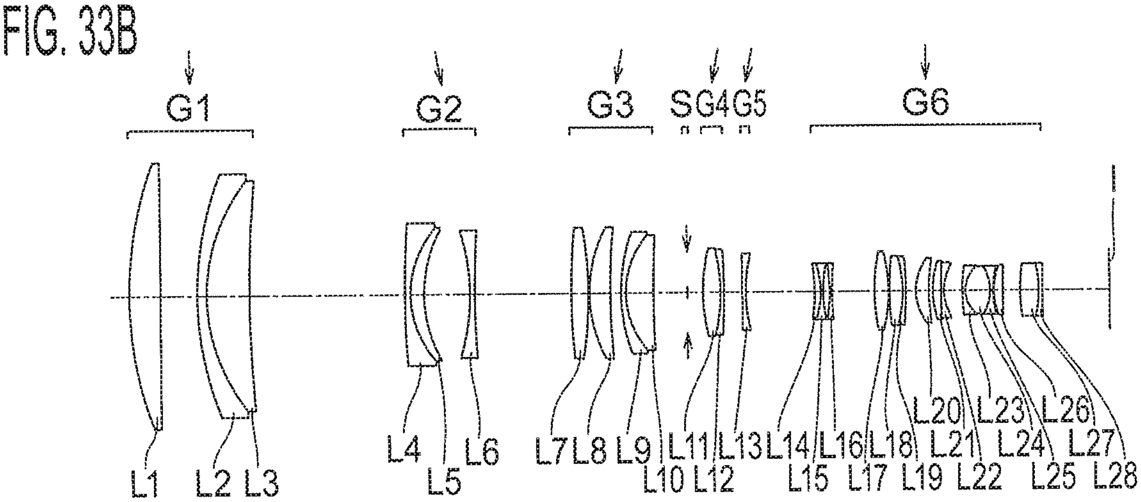
Figure 33C:
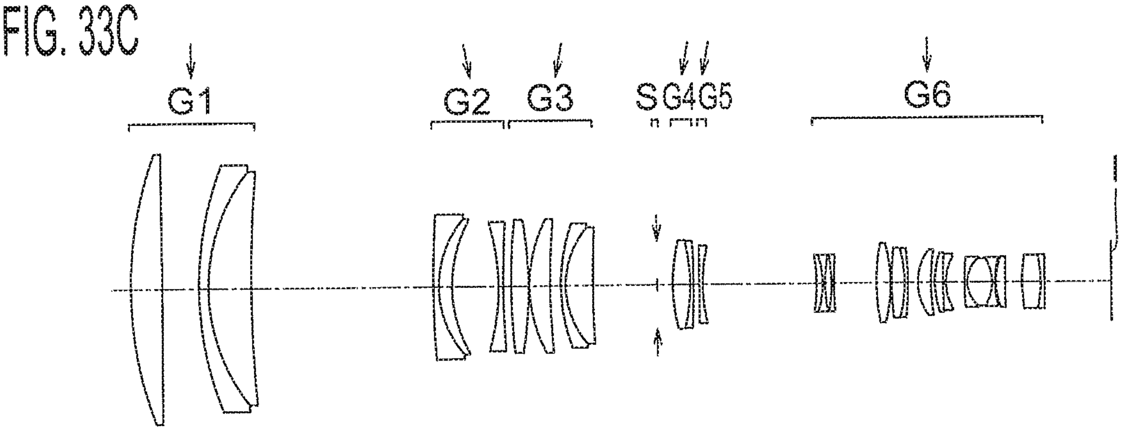
Figure 34A:
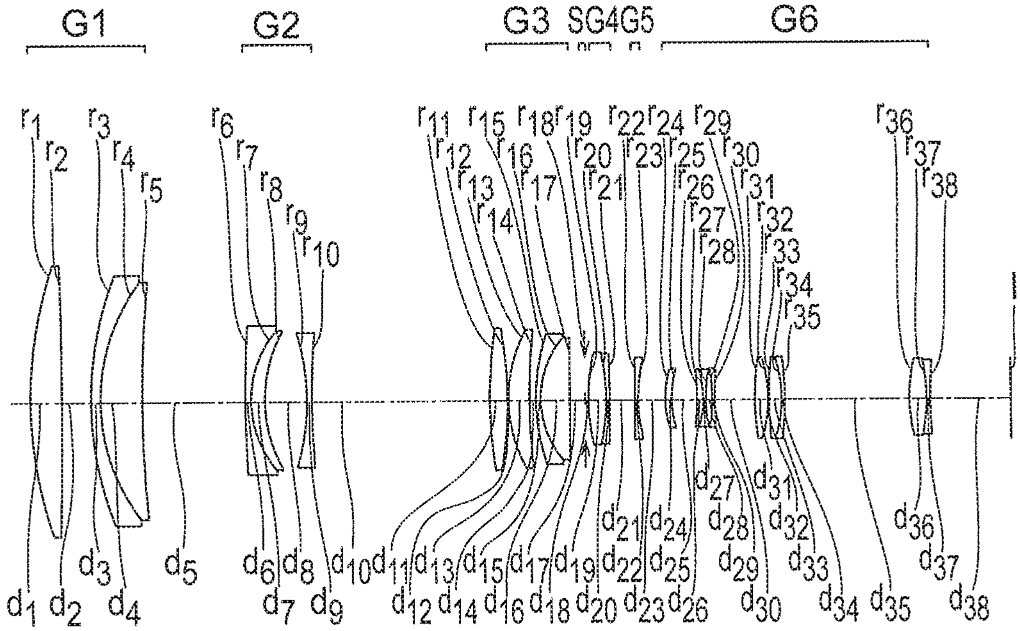
FIG. 34A, FIG. 34B, and FIG. 34C are lens cross-sectional views of an example 34.
Figure 34B:
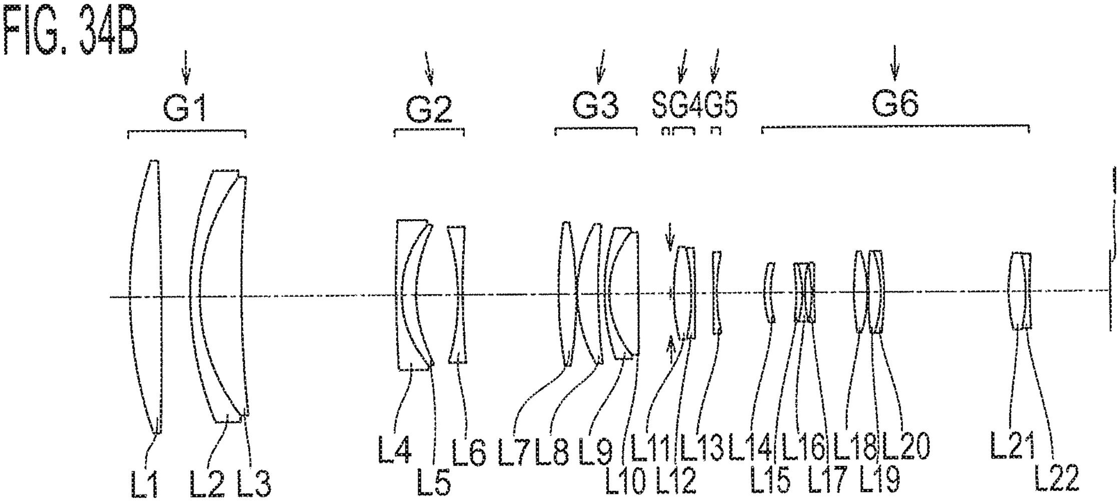
Figure 34C:
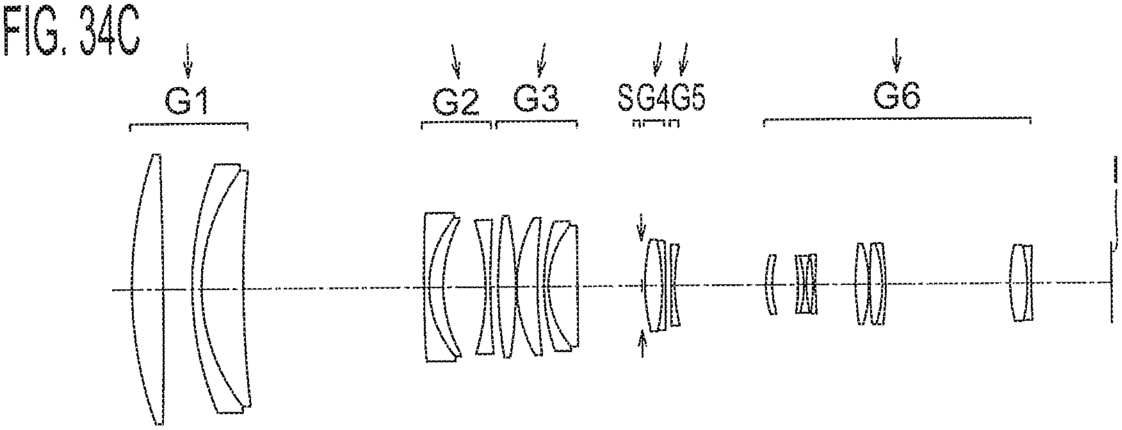
Figure 35A:
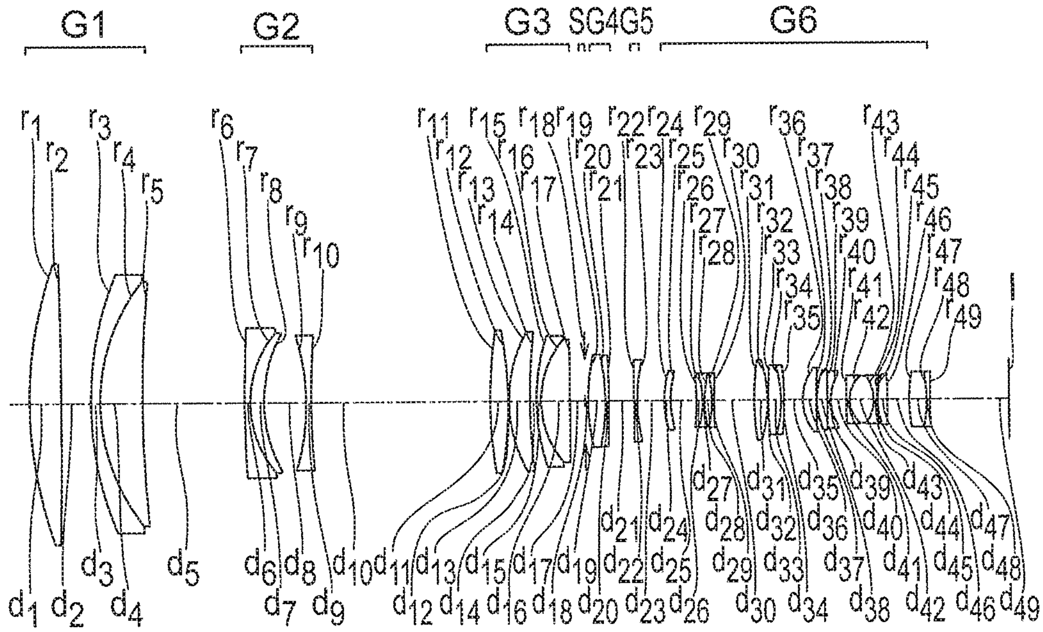
FIG. 35A, FIG. 35B, and FIG. 35C are lens cross-sectional views of an example 35.
Figure 35B:
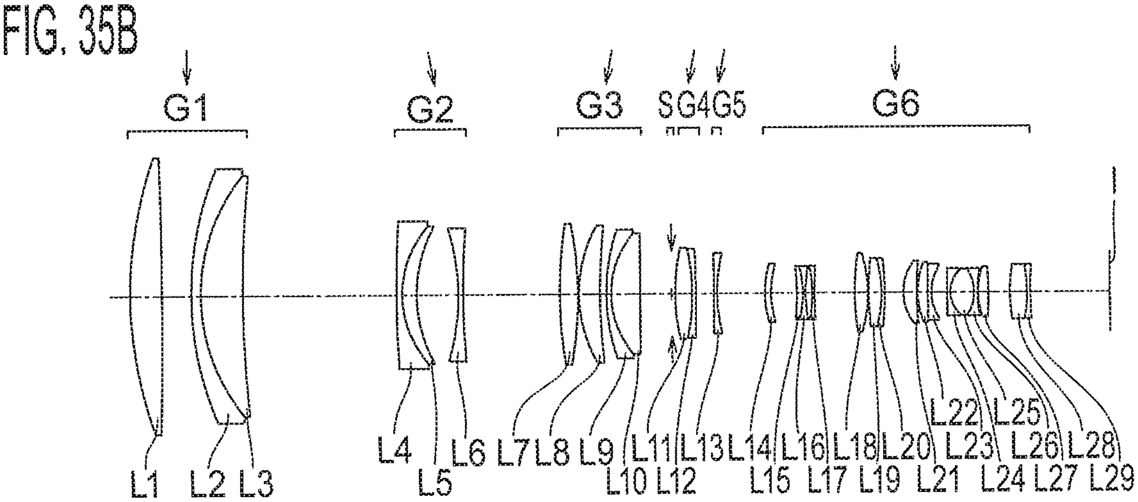
Figure 35C:
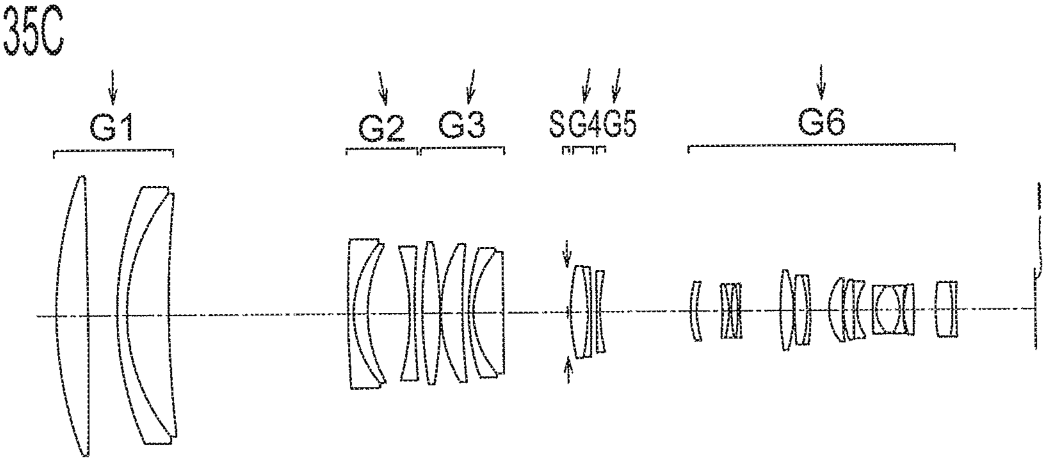
Figure 36A:
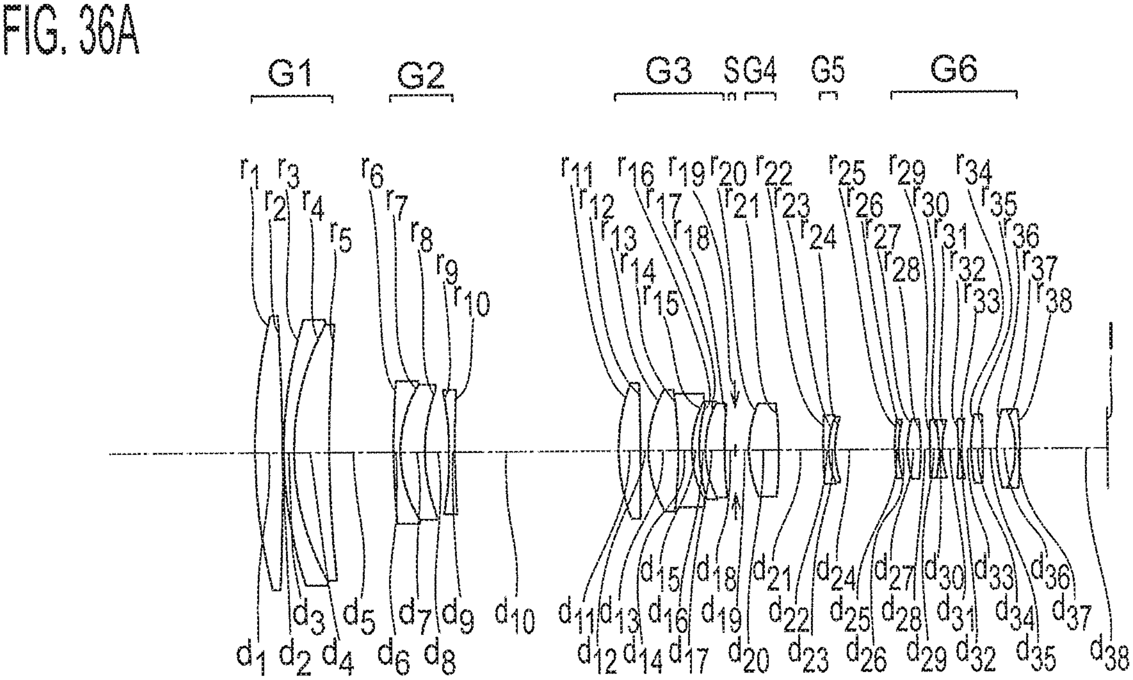
FIG. 36A, FIG. 36B, and FIG. 36C are lens cross-sectional views of an example 36.
Figure 36B:
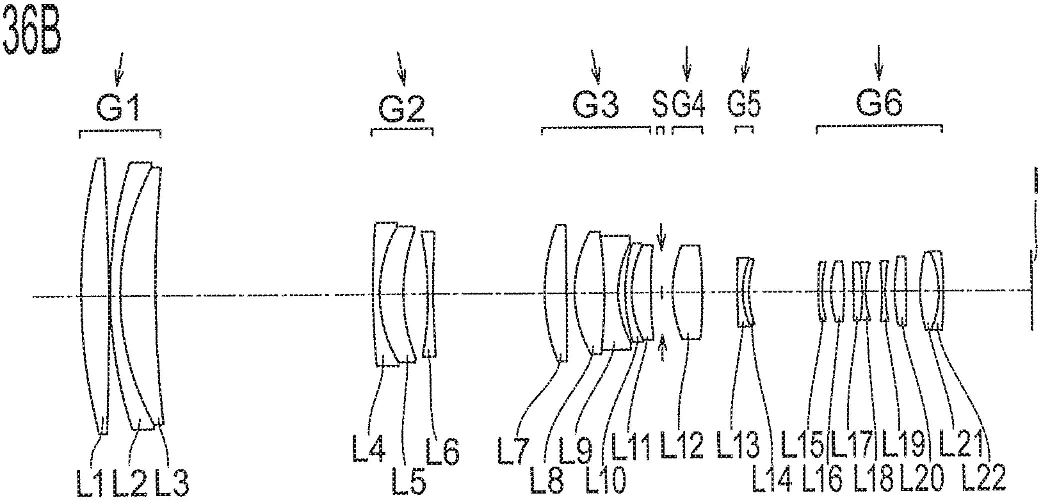
Figure 36C:
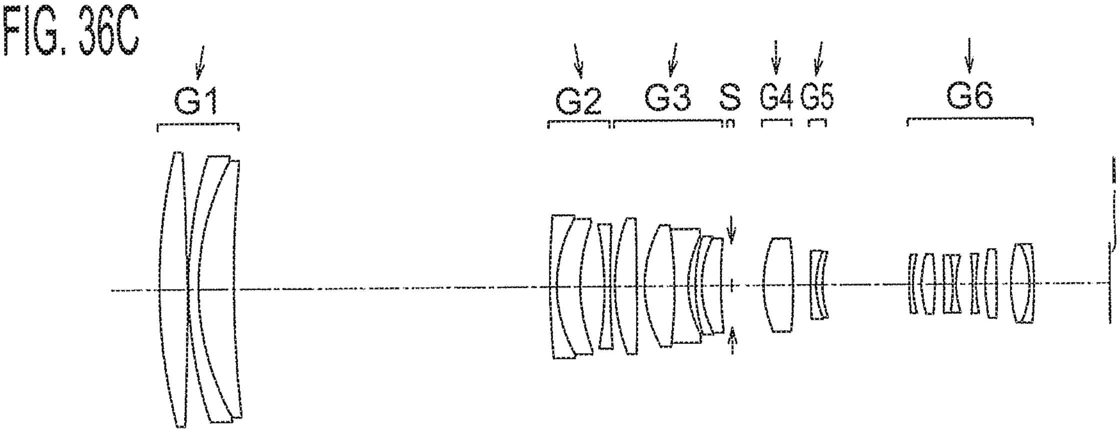
Figure 37A:
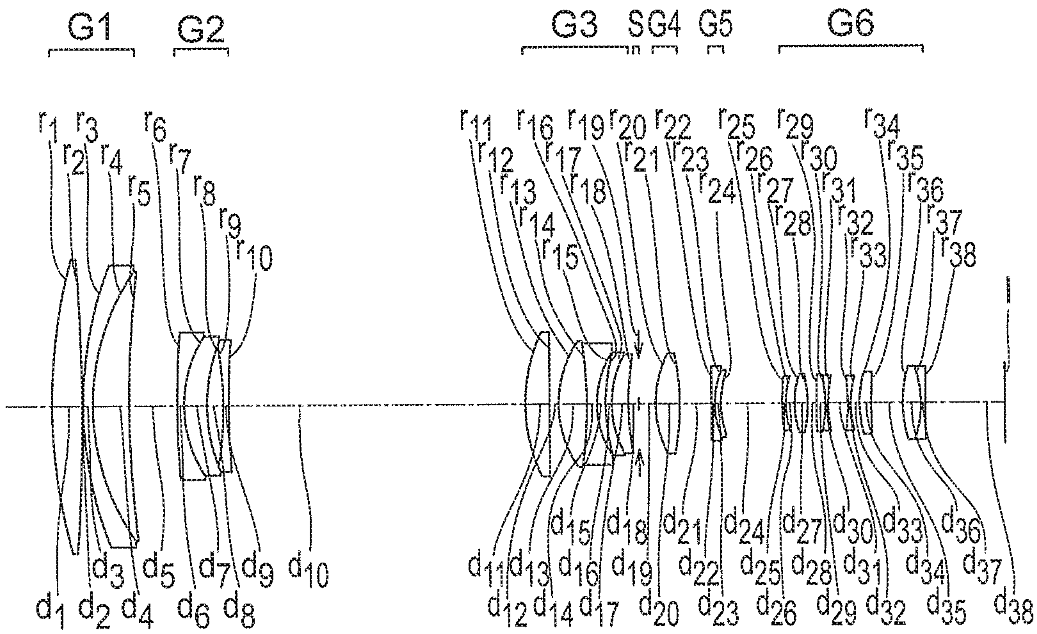
FIG. 37A, FIG. 37B, and FIG. 37C are lens cross-sectional views of an example 37.
Figure 37B:
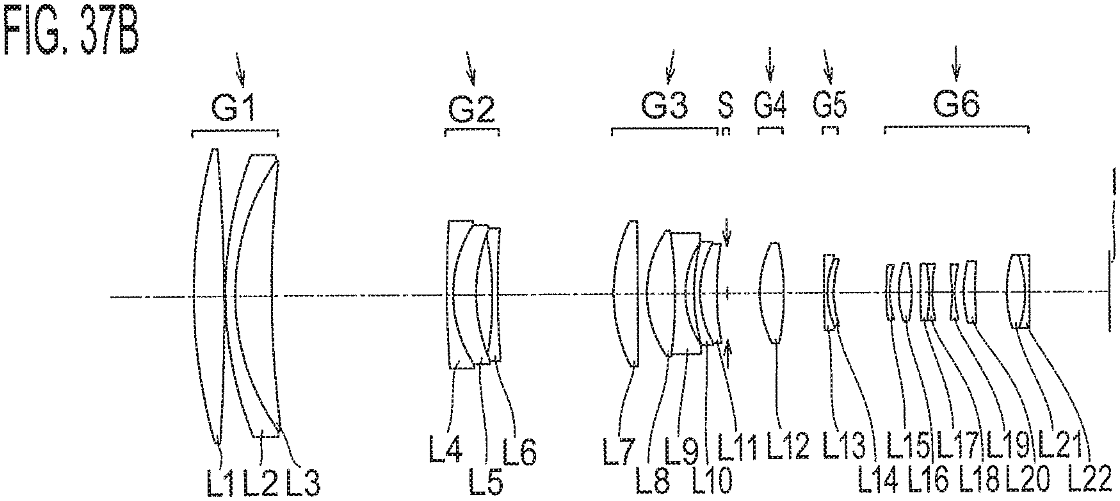
Figure 37C:
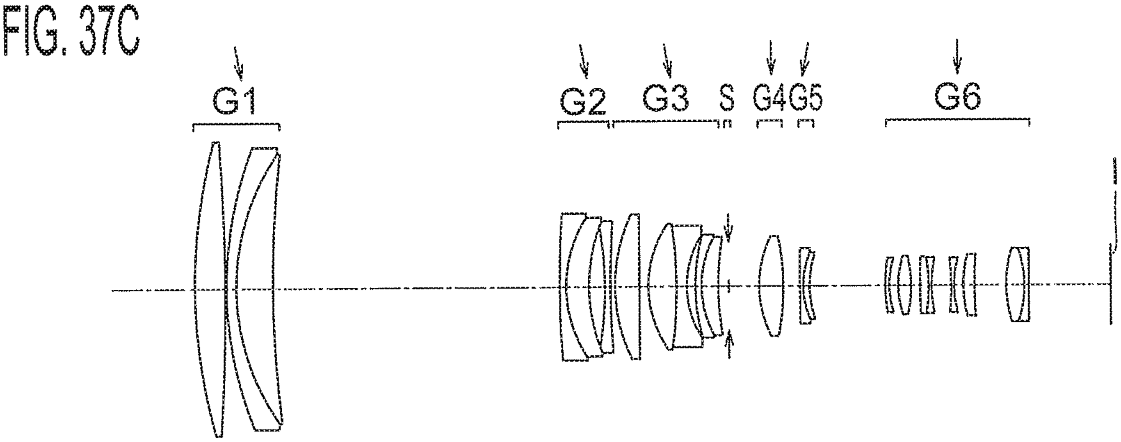
Figure 38A:
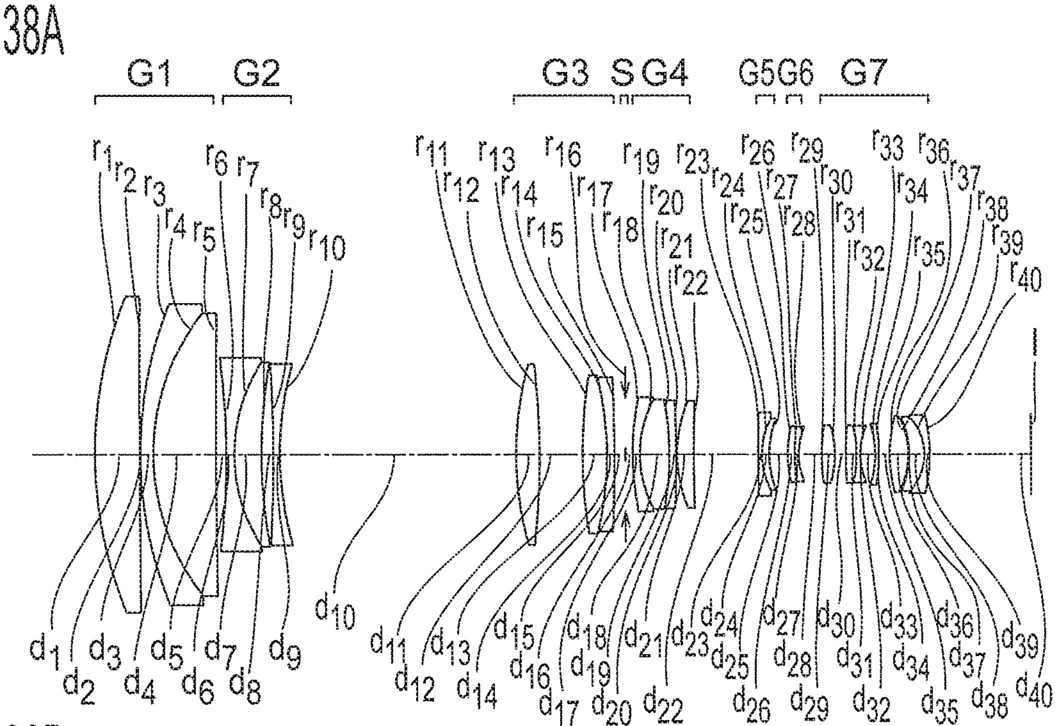
FIG. 38A, FIG. 38B, and FIG. 38C are lens cross-sectional views of an example 38.
Figure 38B:
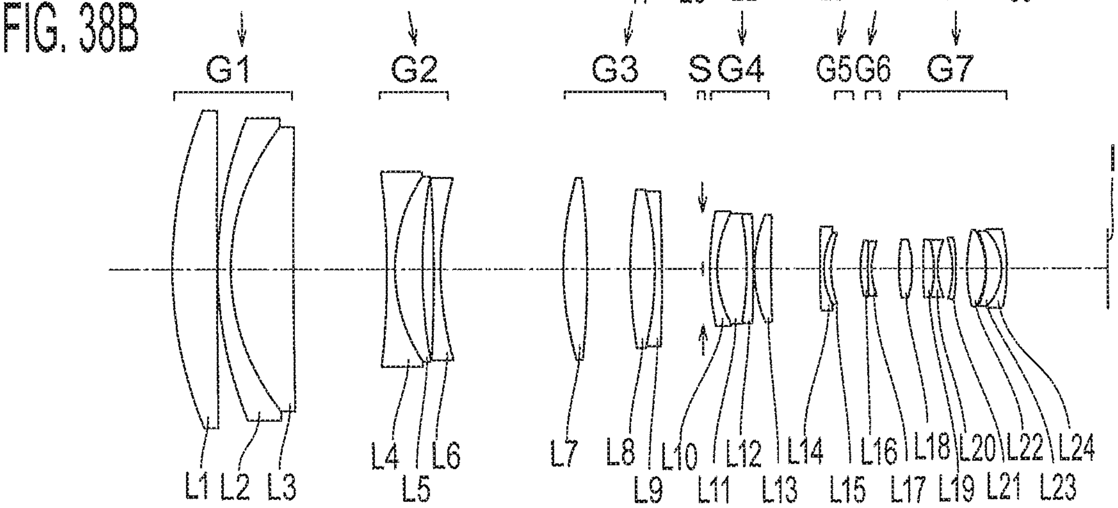
Figure 38C:
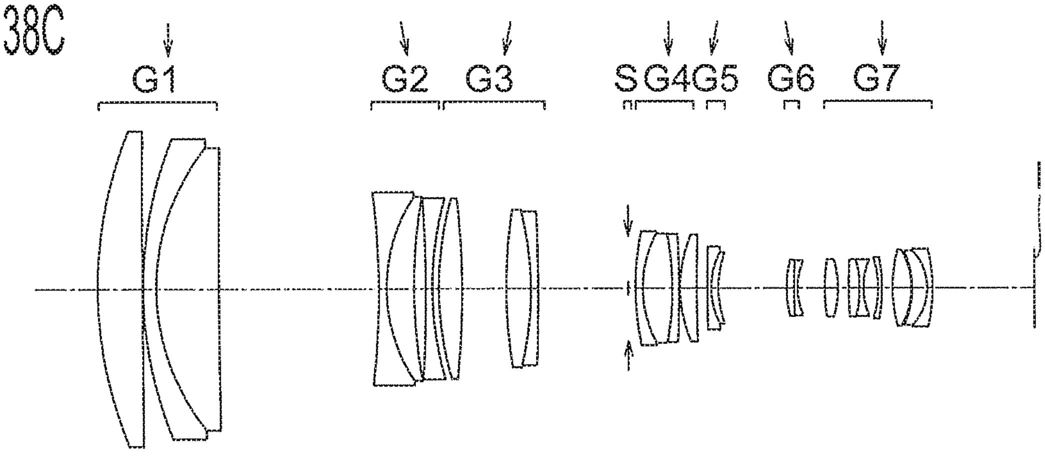
Figure 39A:
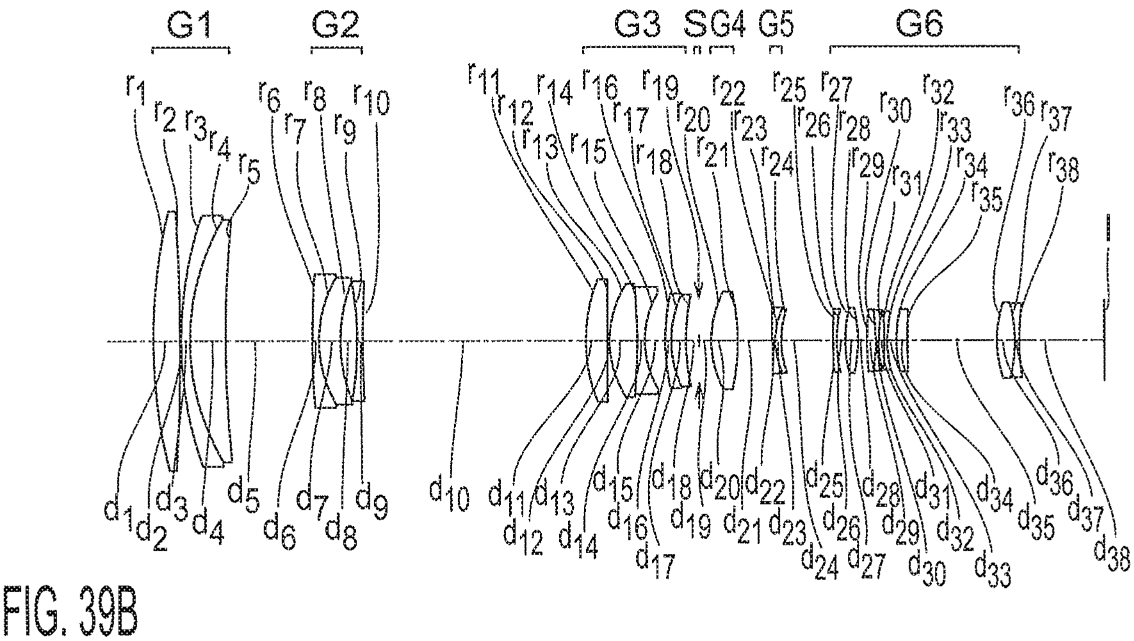
FIG. 39A, FIG. 39B, and FIG. 39C are lens cross-sectional views of an example 39.
Figure 39B:
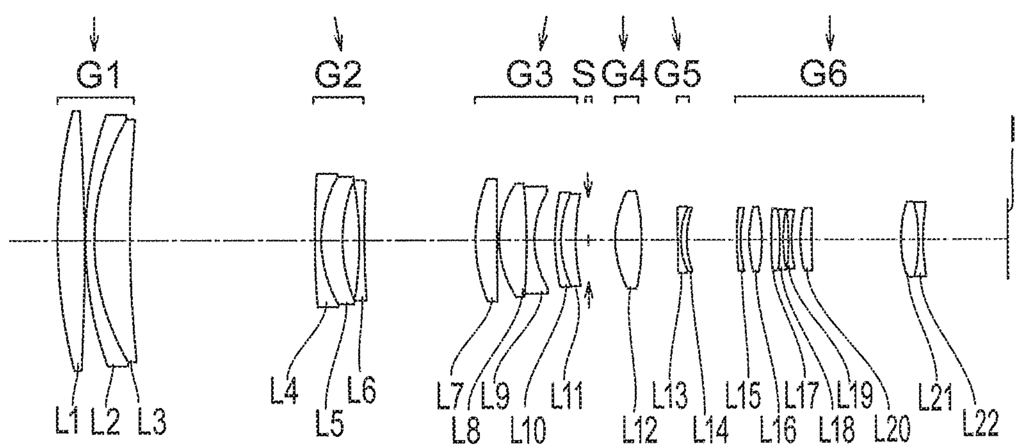
Figure 39C:
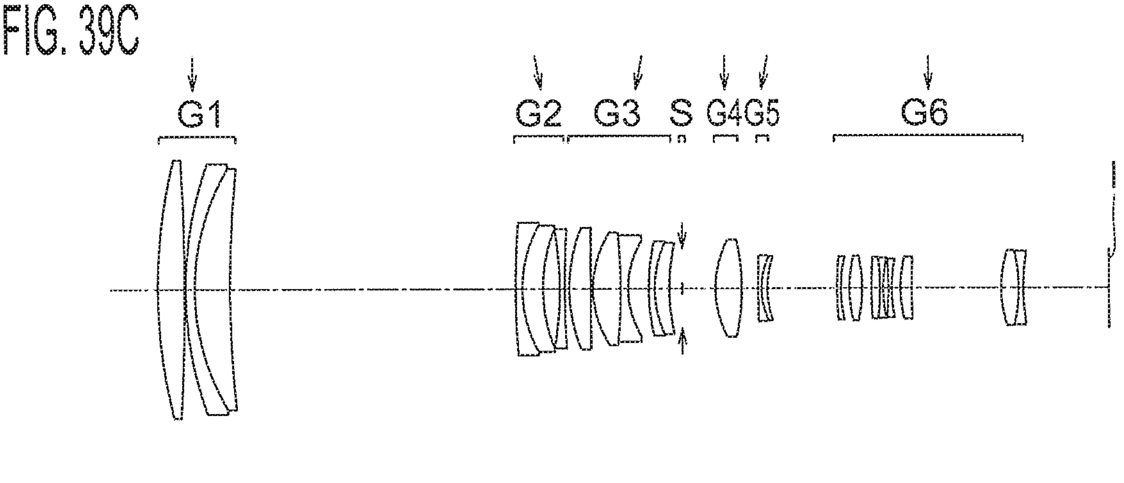
Figure 40A:
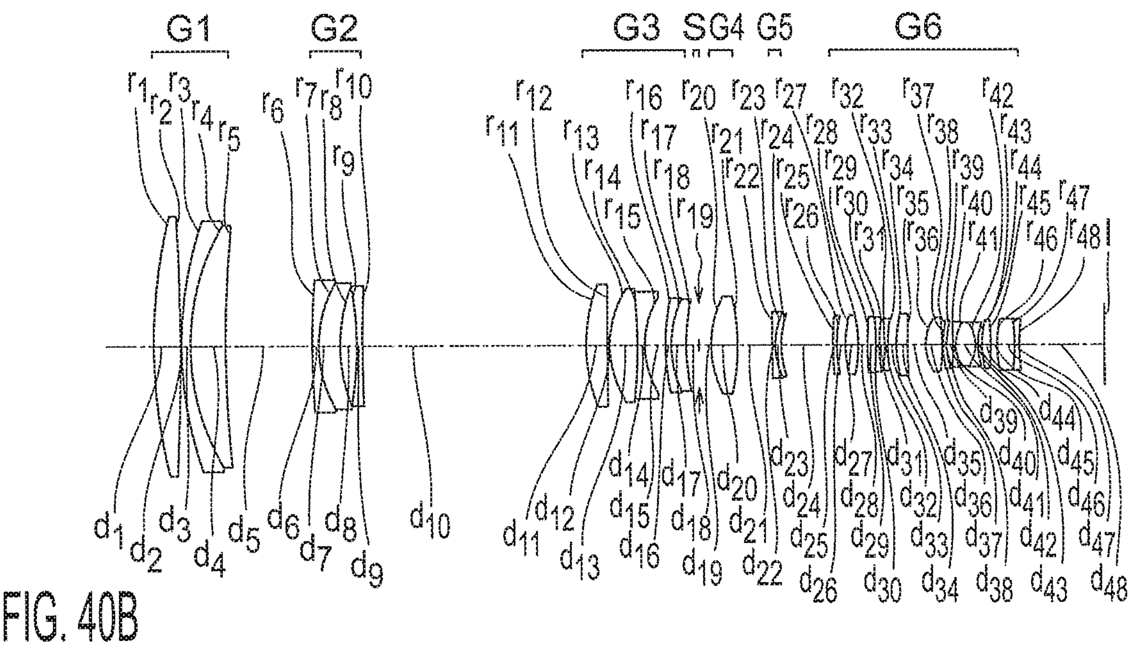
FIG. 40A, FIG. 40B, and FIG. 40C are lens cross-sectional views of an example 40.
Figure 40B:
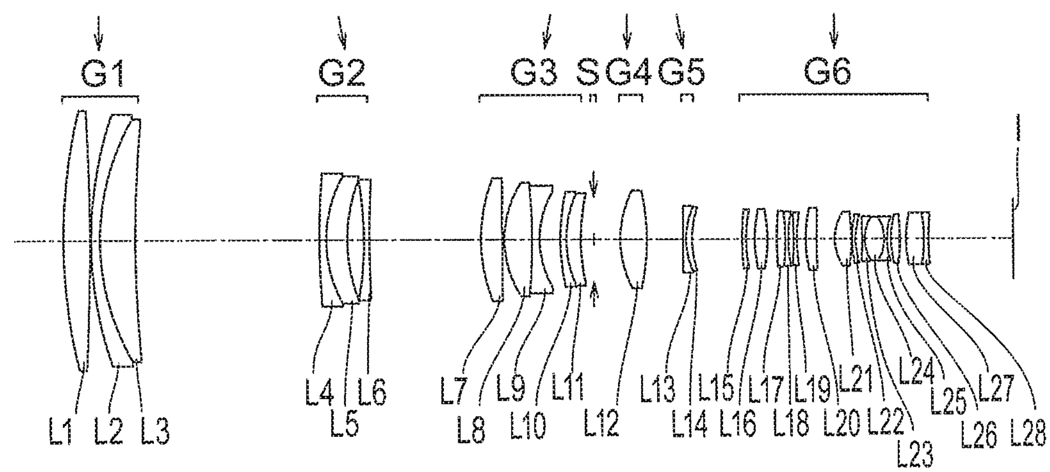
Figure 40C:
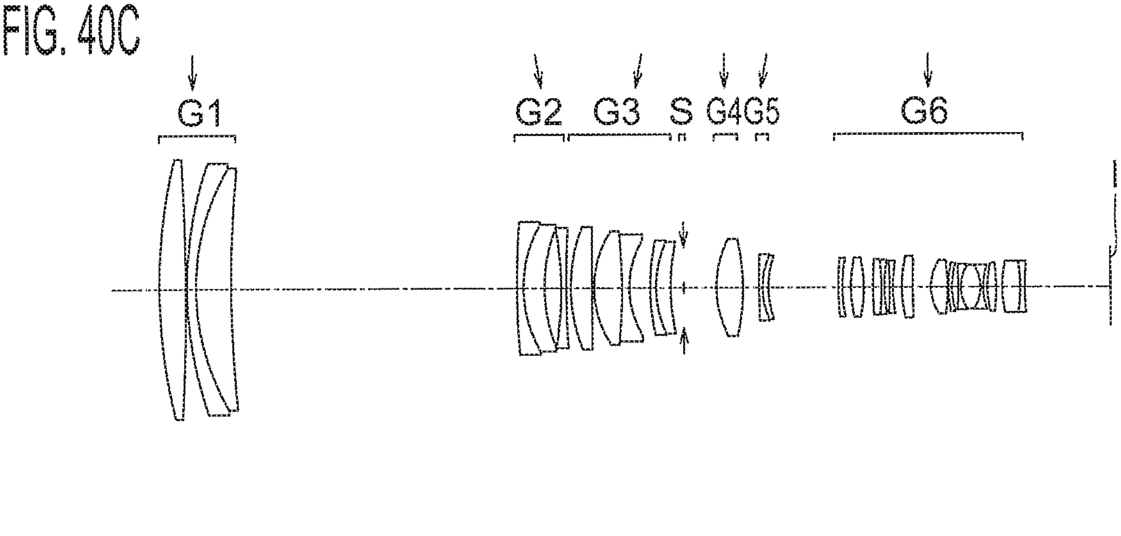
Figure 41A:
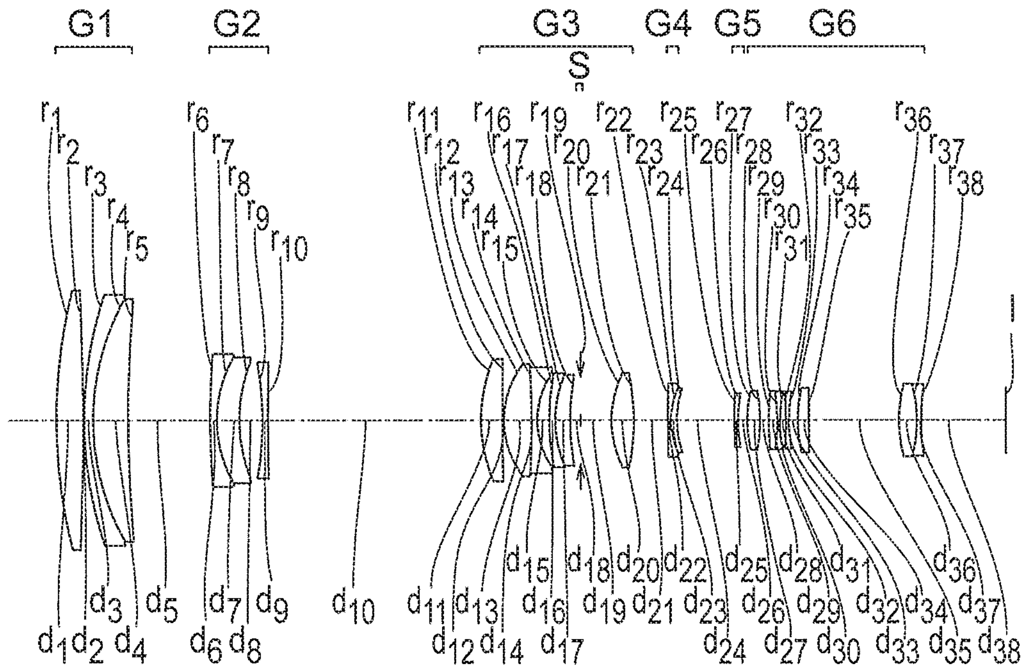
FIG. 41A, FIG. 41B, and FIG. 41C are lens cross-sectional views of an example 41.
Figure 41B:
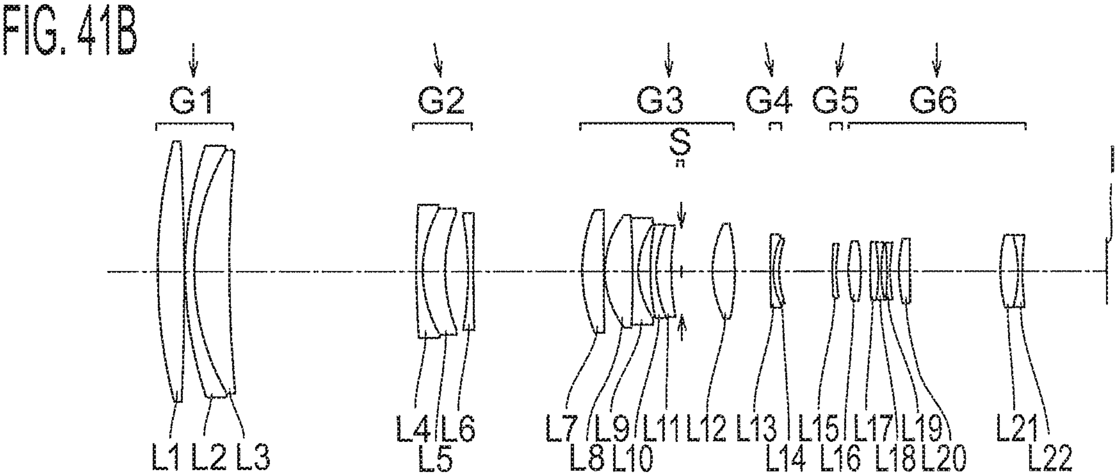
Figure 41C:
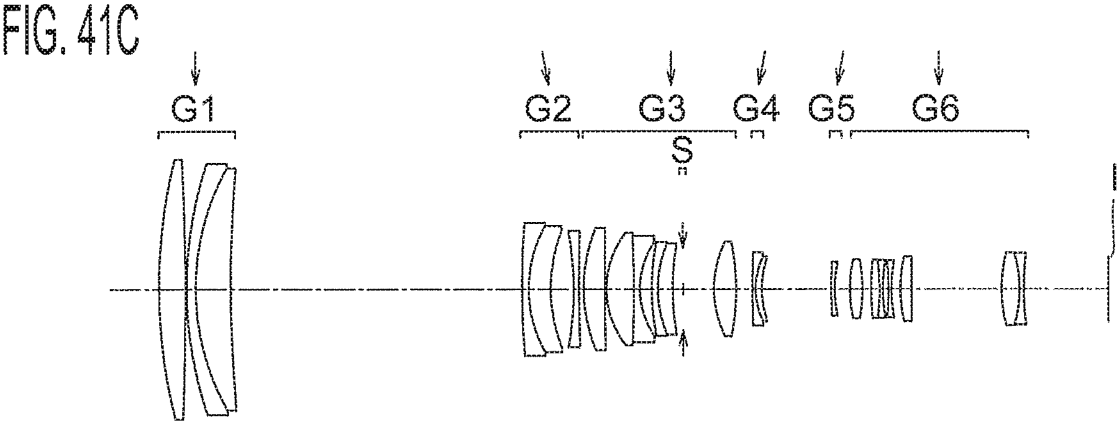
Figure 42A:
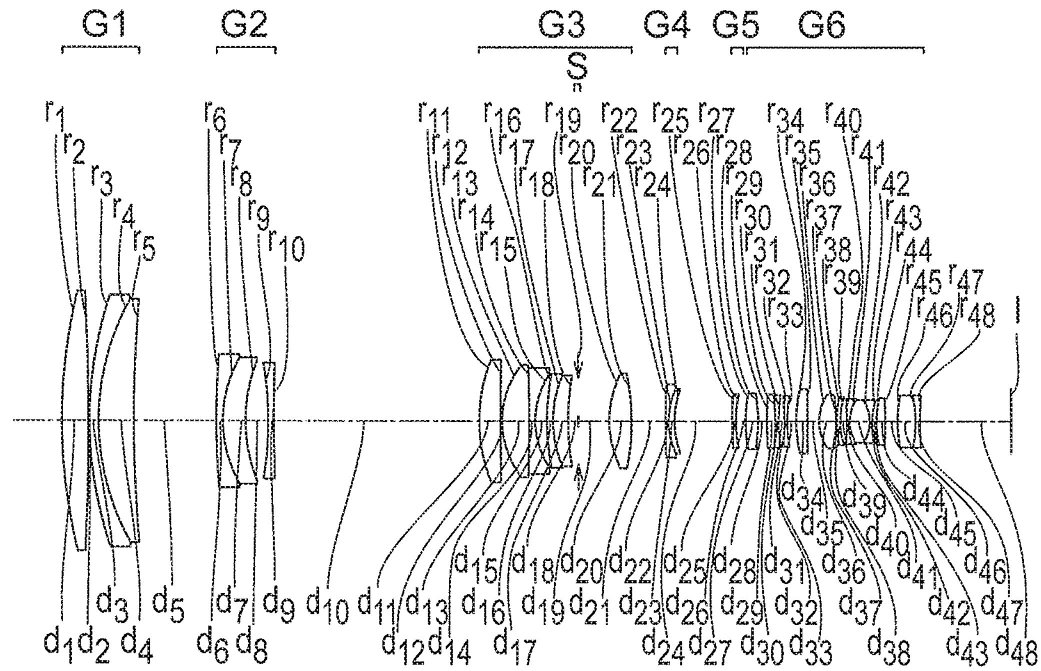
FIG. 42A, FIG. 42B, and FIG. 42C are lens cross-sectional views of an example 42.
Figure 42B:
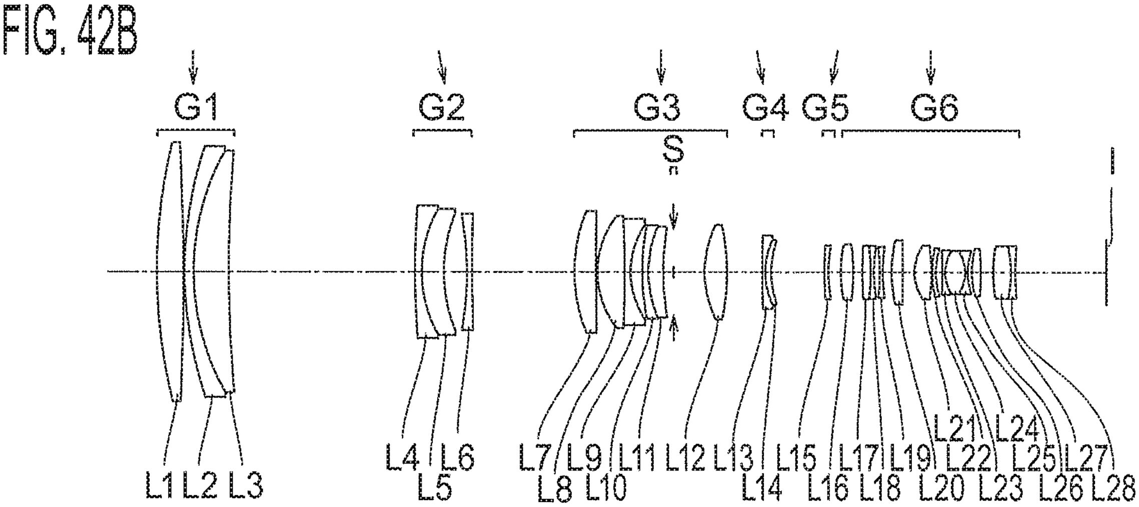
Figure 42C:
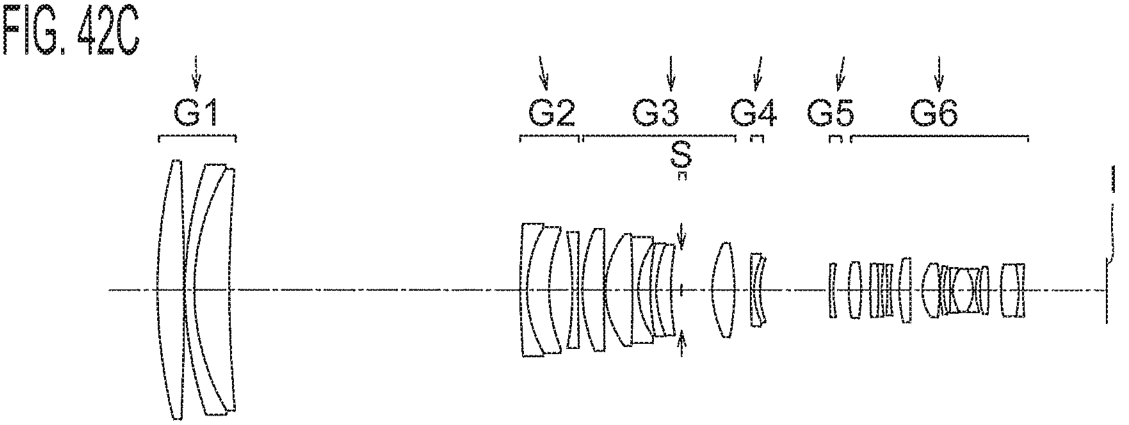
Figure 43A:
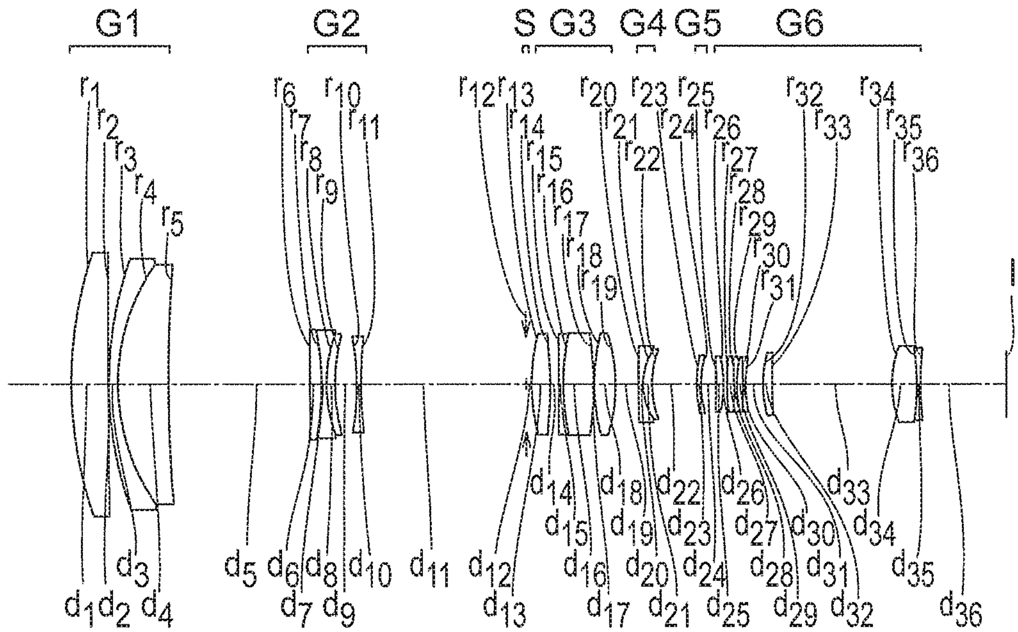
FIG. 43A, FIG. 43B, and FIG. 43C are lens cross-sectional views of an example 43.
Figure 43B:
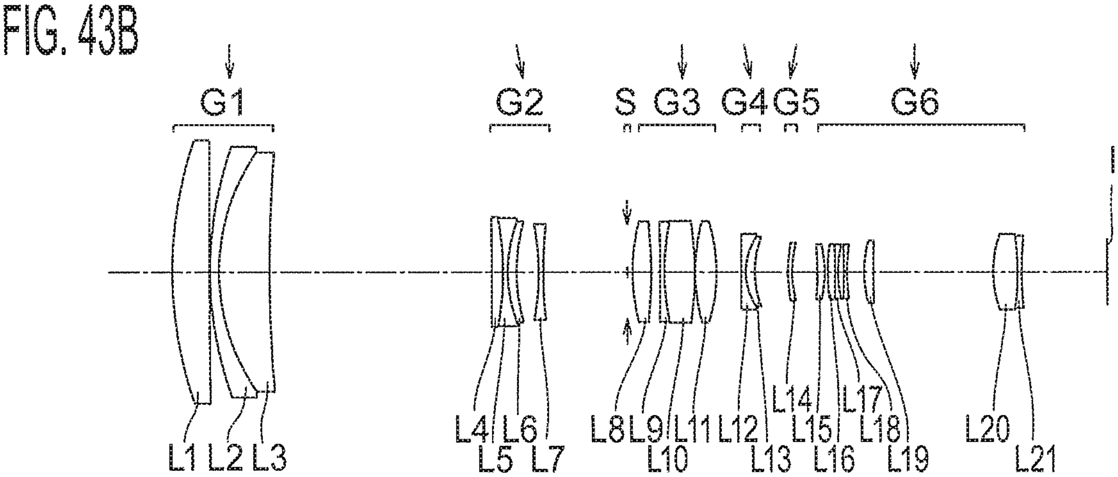
Figure 43C:
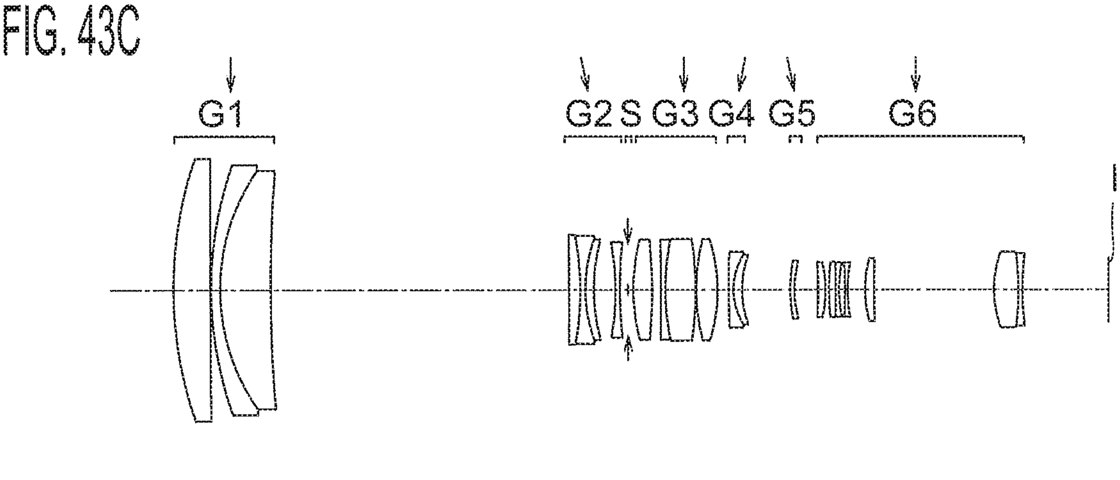
Figure 44A:
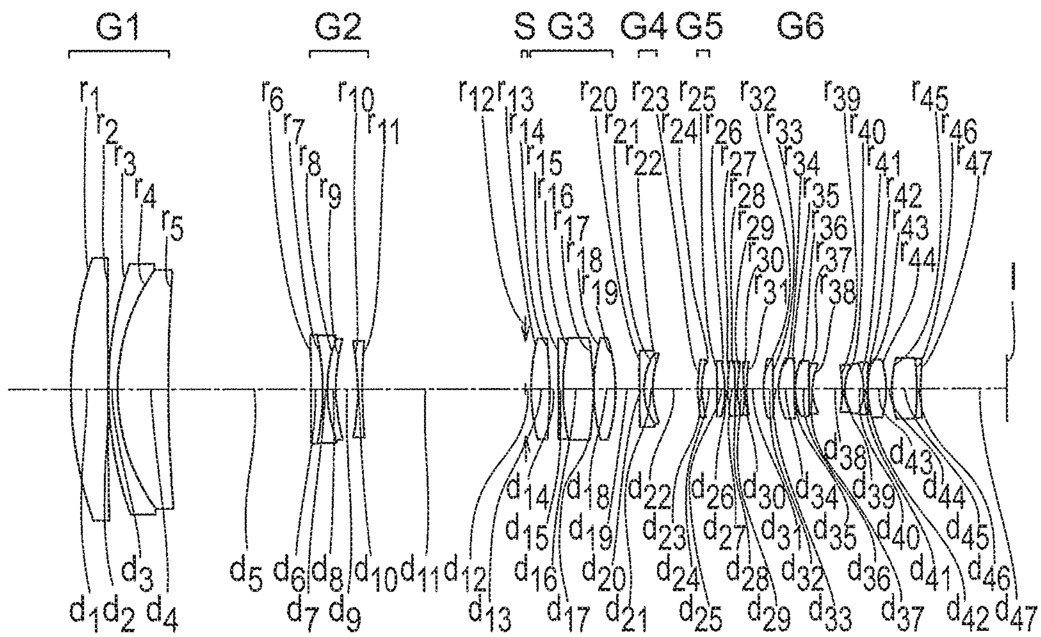
FIG. 44A, FIG. 44B, and FIG. 44C are lens cross-sectional views of an example 44.
Figure 44B:
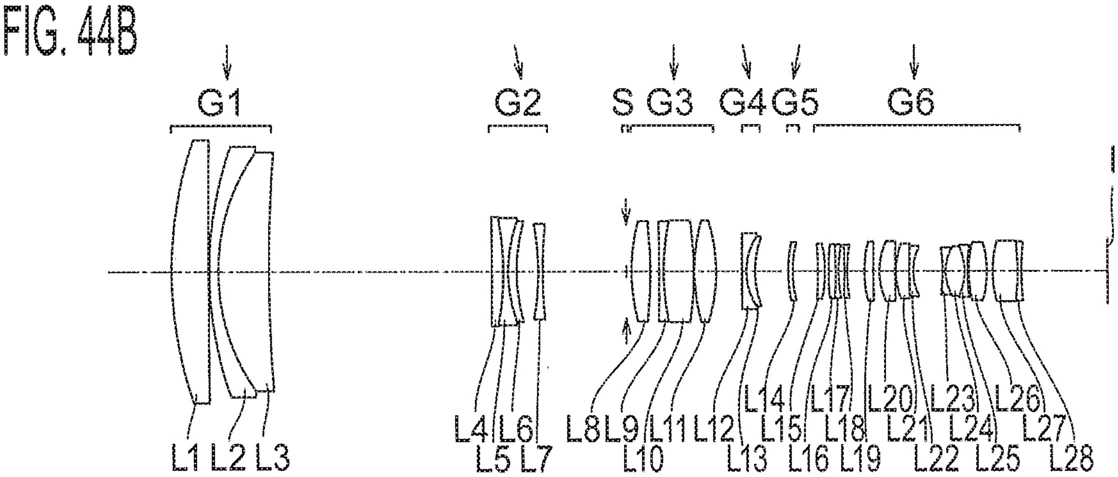
Figure 44C:
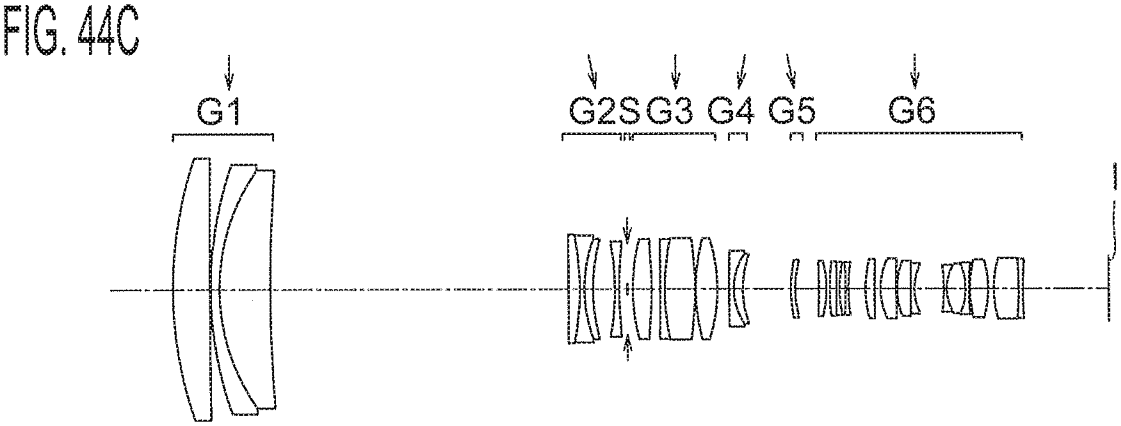
Figure 45A:
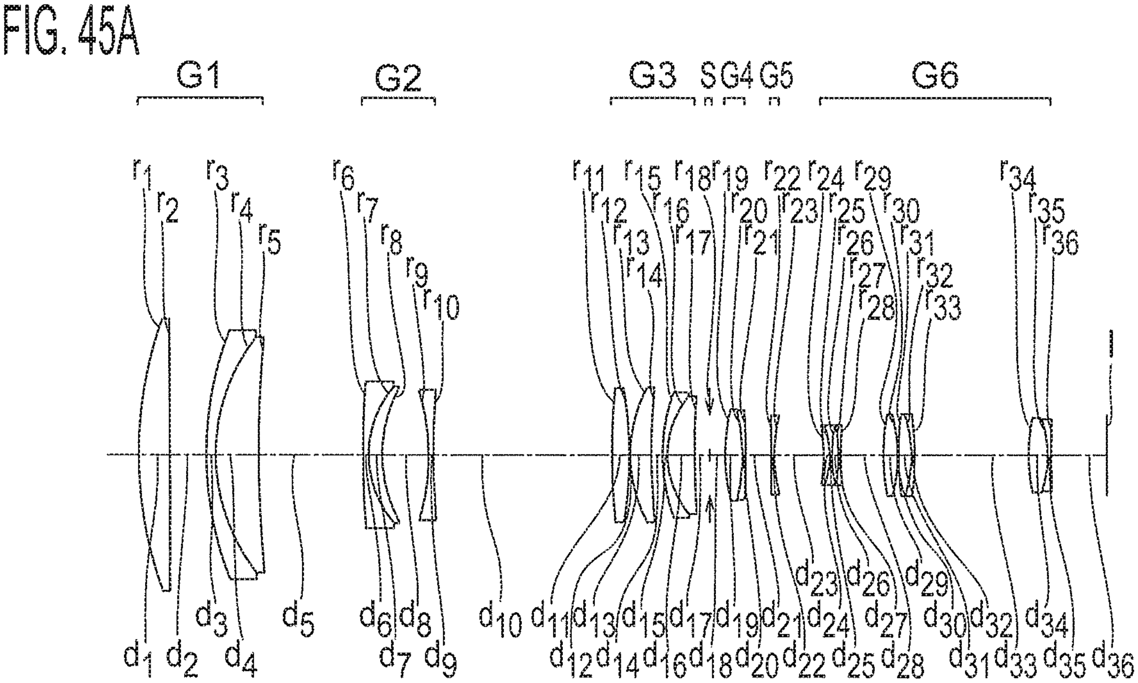
FIG. 45A, FIG. 45B, and FIG. 45C are lens cross-sectional views of an example 45.
Figure 45B:
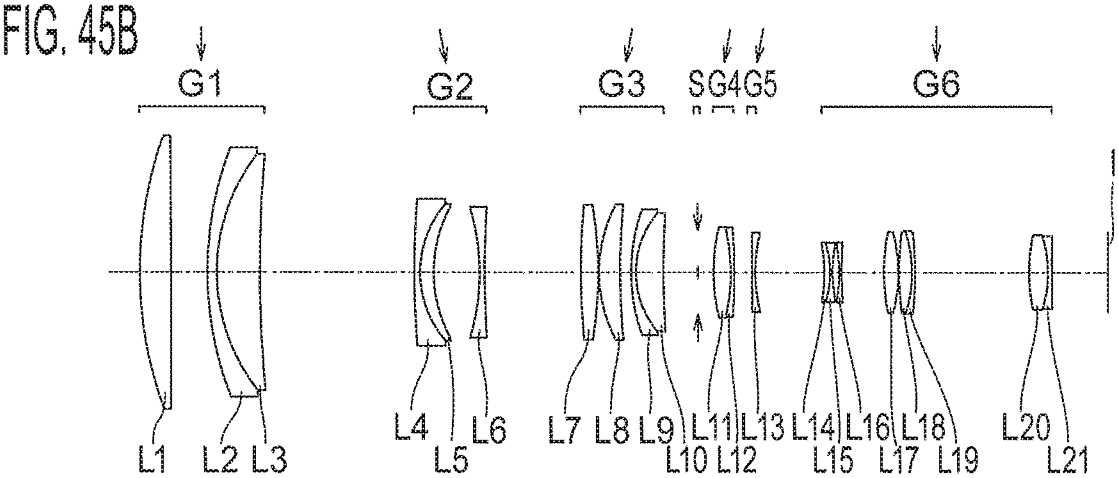
Figure 45C:
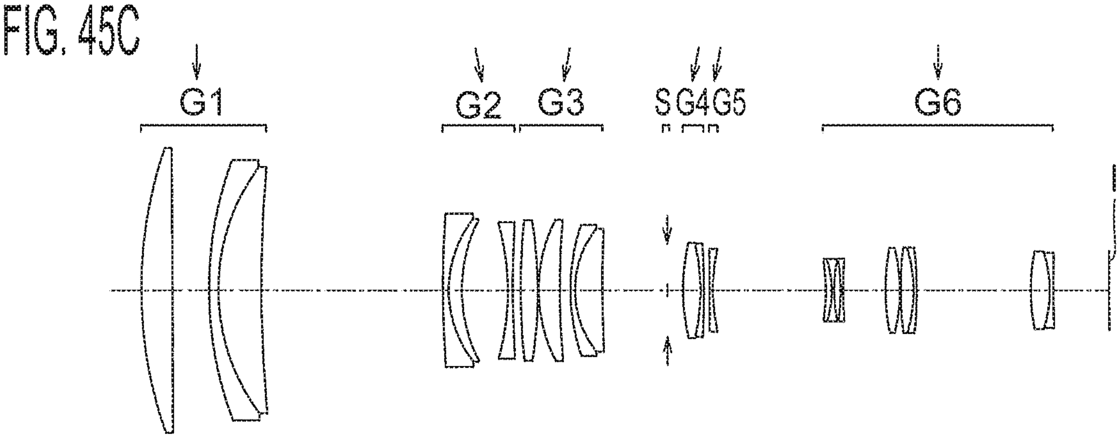
Figure 46A:
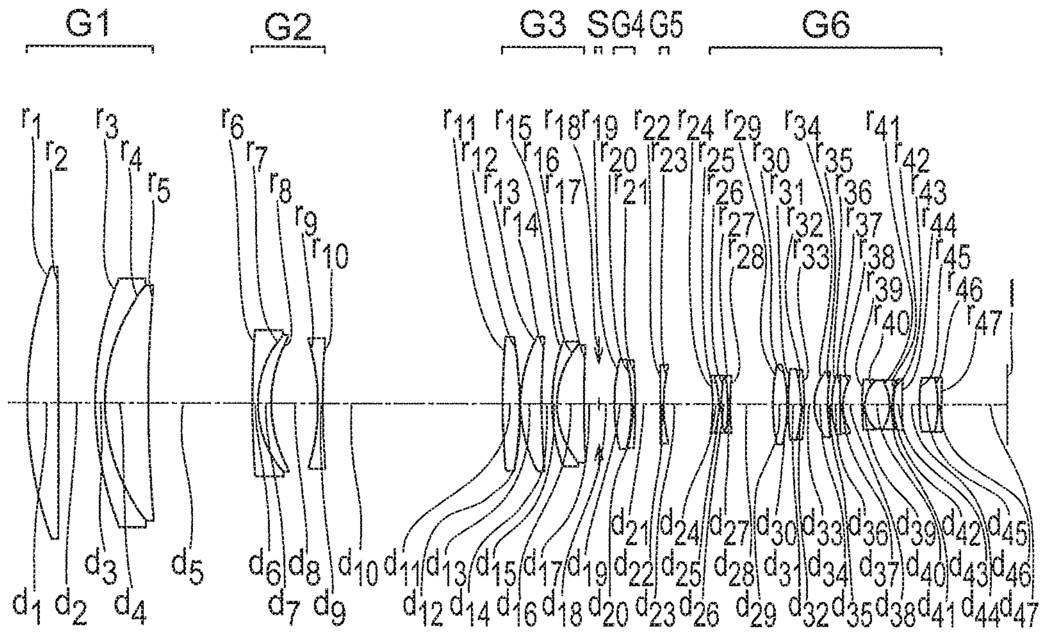
FIG. 46A, FIG. 46B, and FIG. 46C are lens cross-sectional views of an example 46.
Figure 46B:
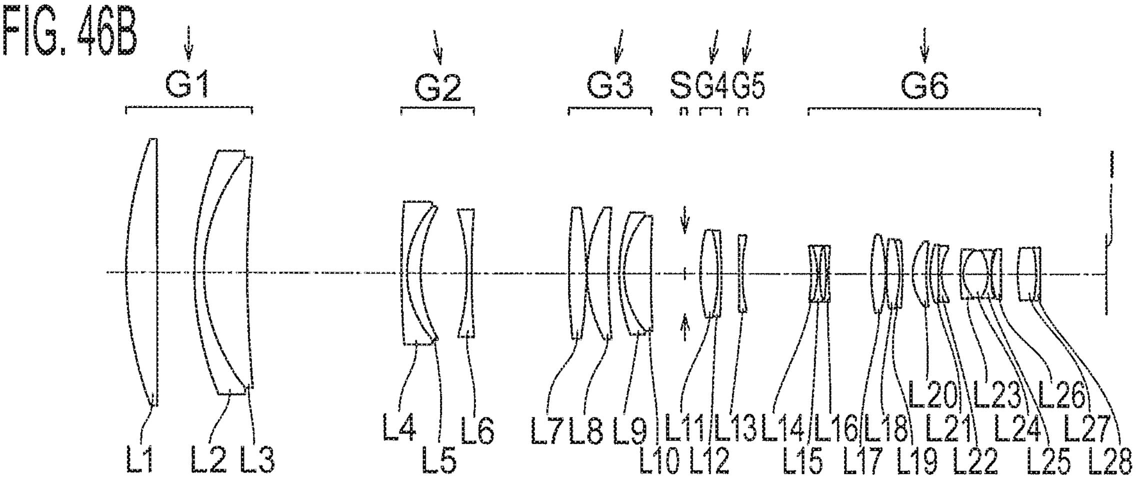
Figure 46C:
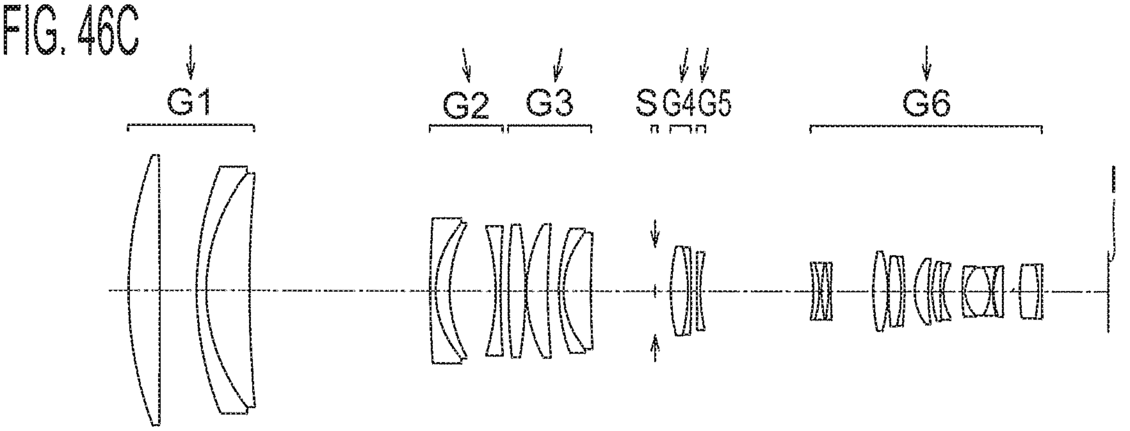
Figure 47A:
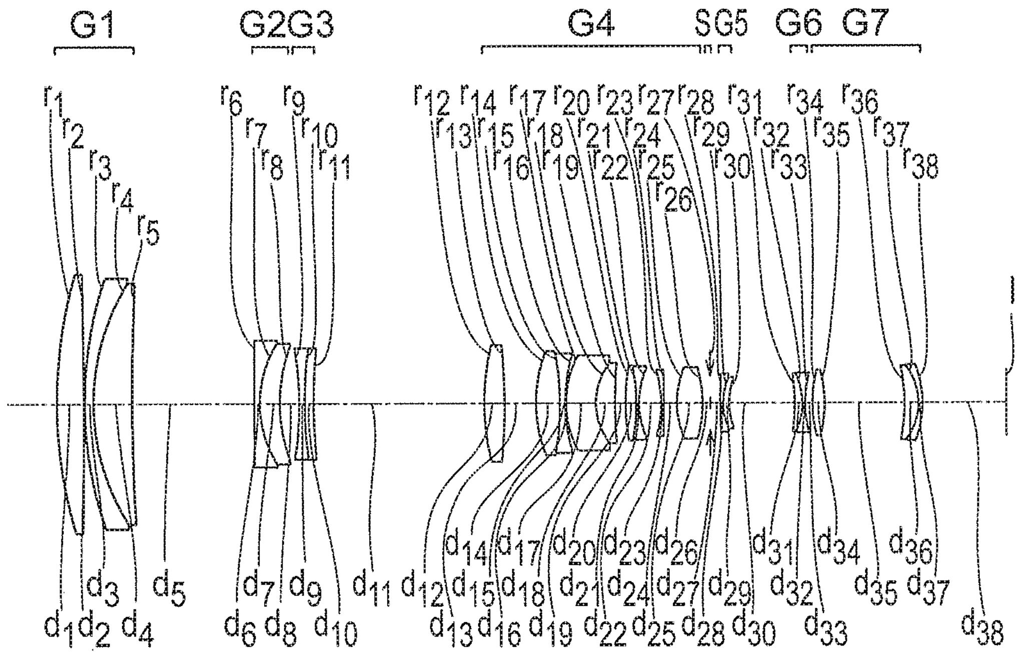
FIG. 47A, FIG. 47B, and FIG. 47C are lens cross-sectional views of an example 47.
Figure 47B:
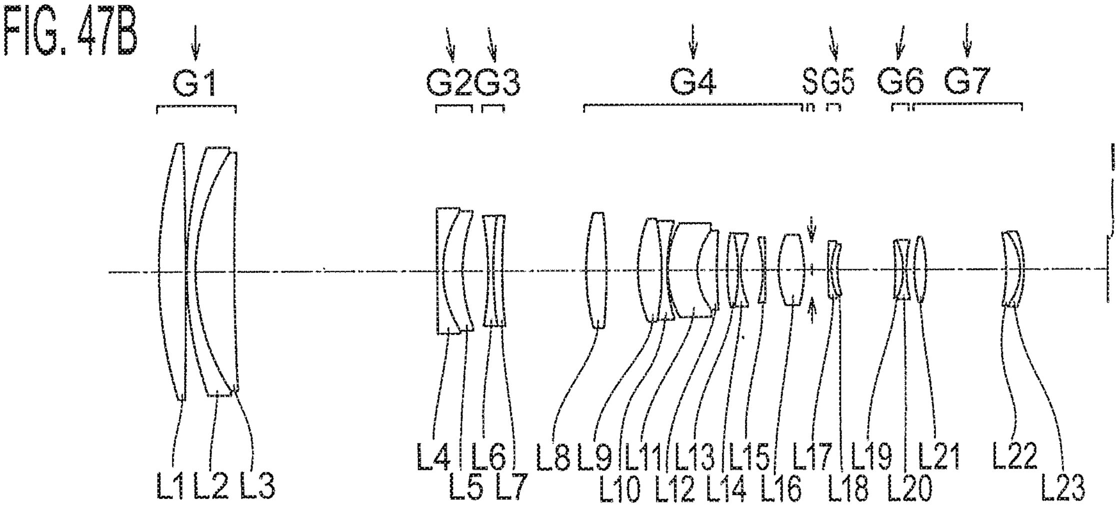
Figure 47C:
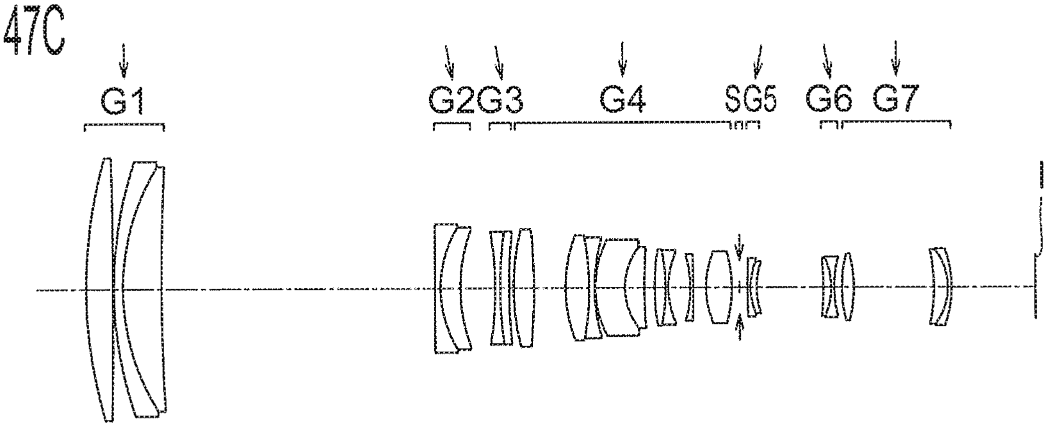
Figure 48A:
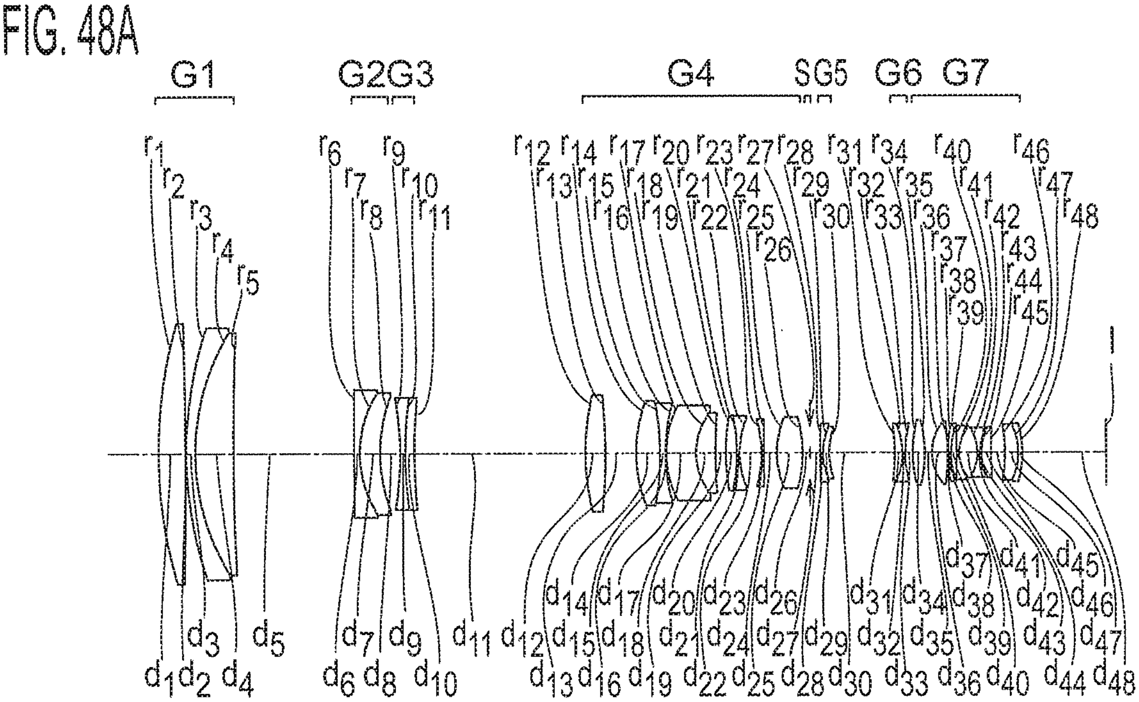
FIG. 48A, FIG. 48B, and FIG. 48C are lens cross-sectional views of an example 48.
Figure 48B:
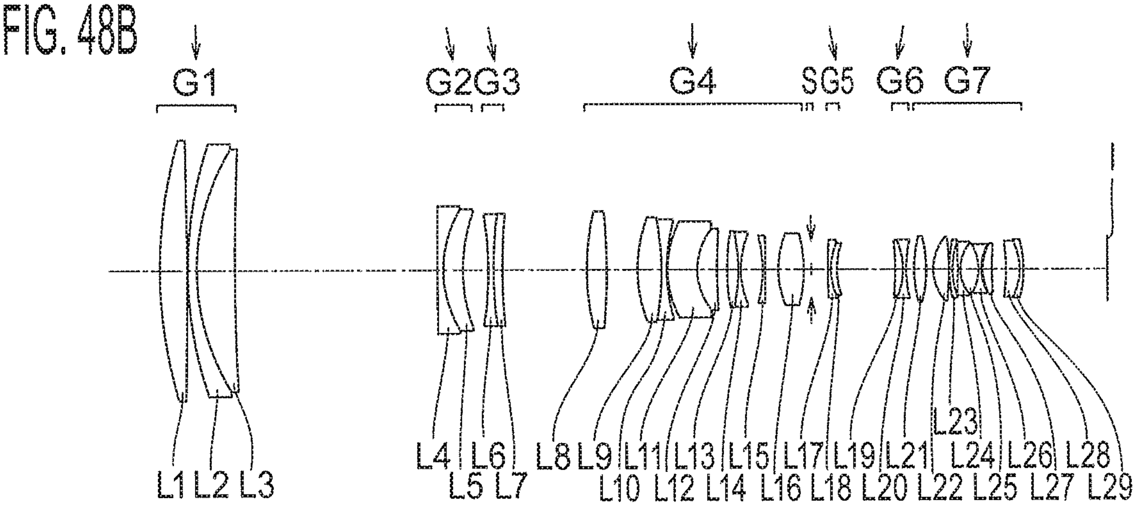
Figure 48C:
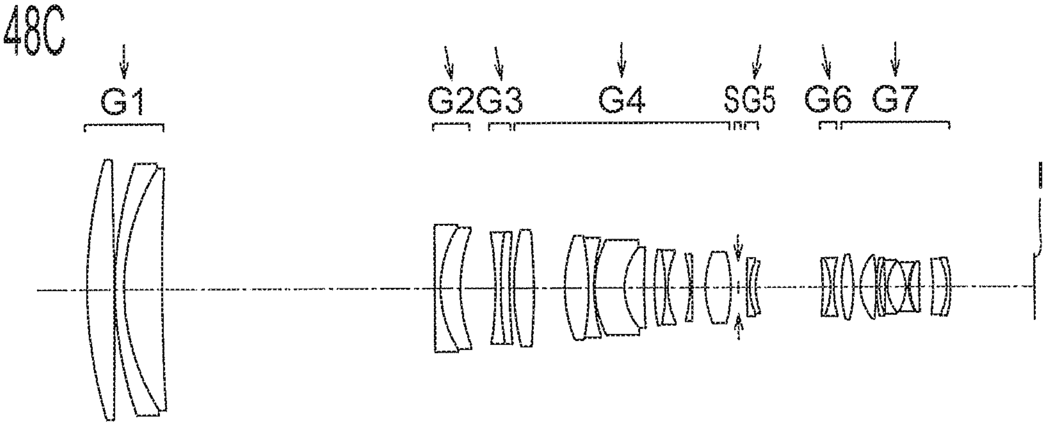
Figure 49A:
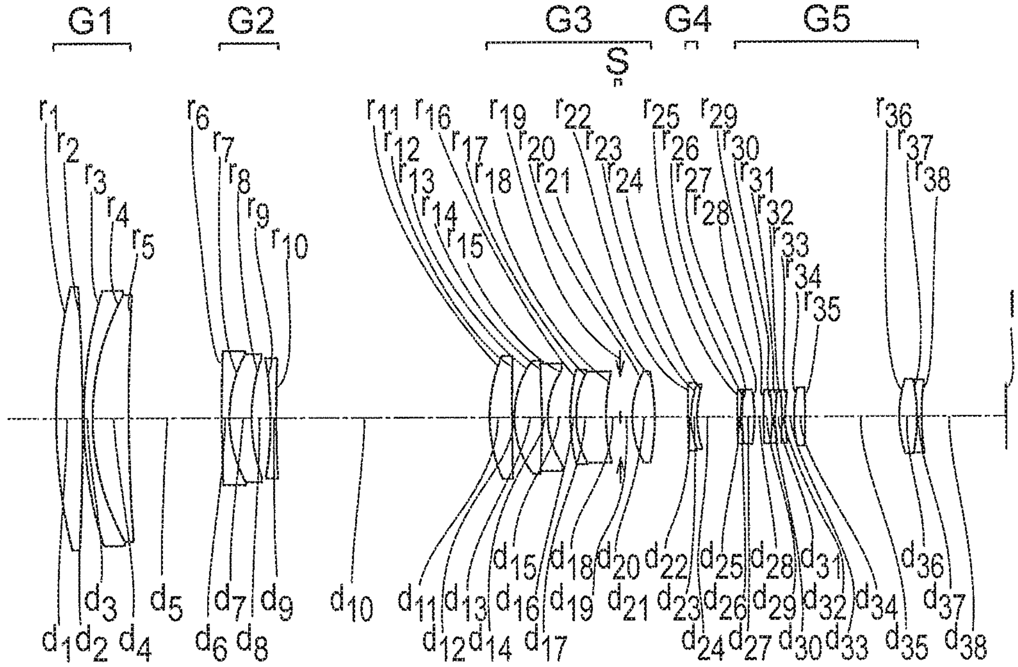
FIG. 49A, FIG. 49B, and FIG. 49C are lens cross-sectional views of an example 49.
Figure 49B:
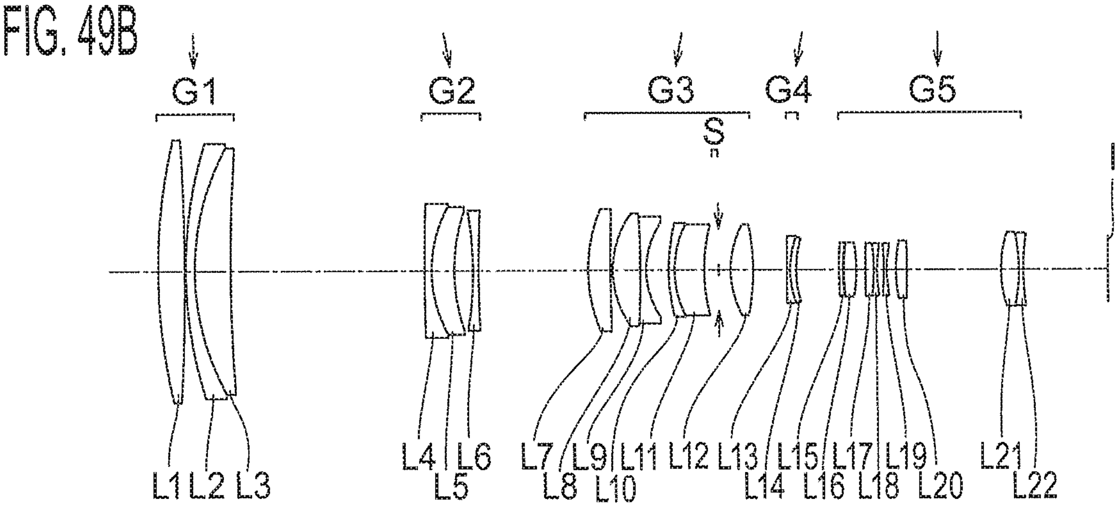
Figure 49C:
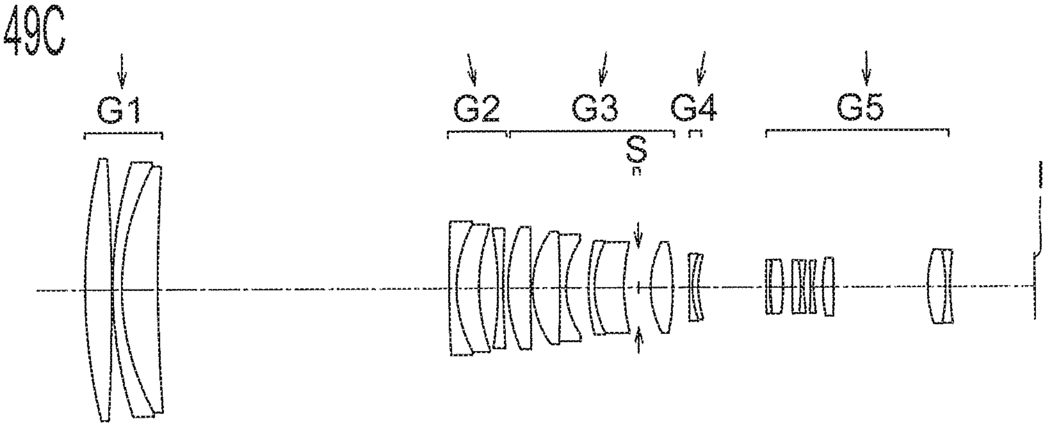
Figure 50A:
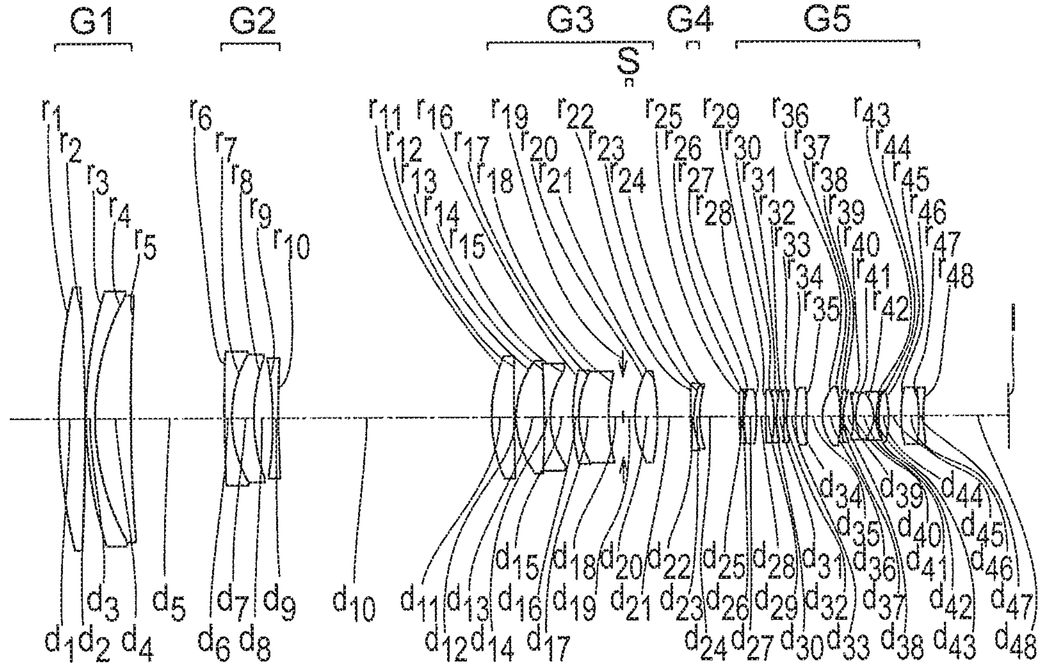
FIG. 50A, FIG. 50B, and FIG. 50C are lens cross-sectional views of an example 50.
Figure 50B:
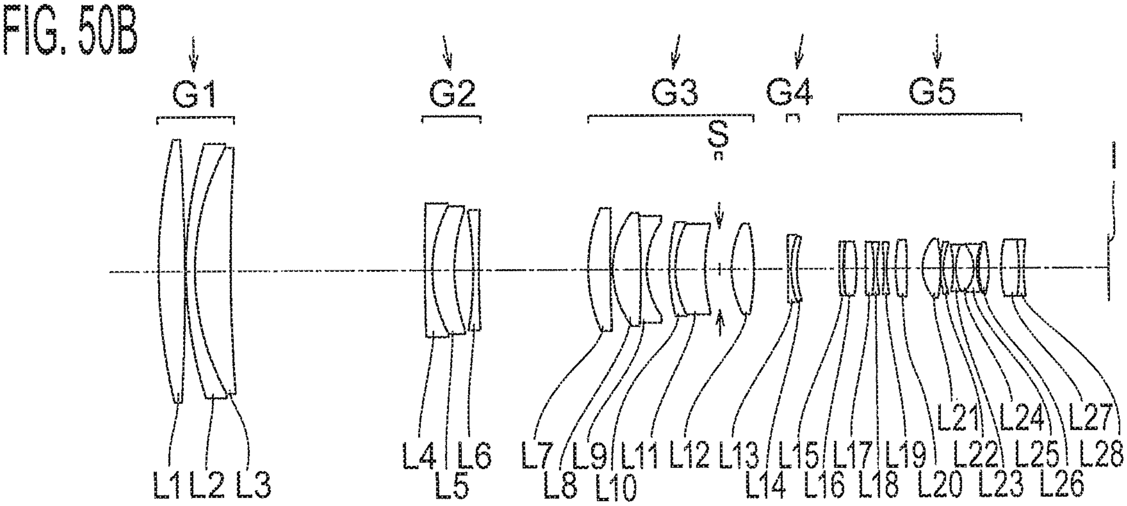
Figure 50C:
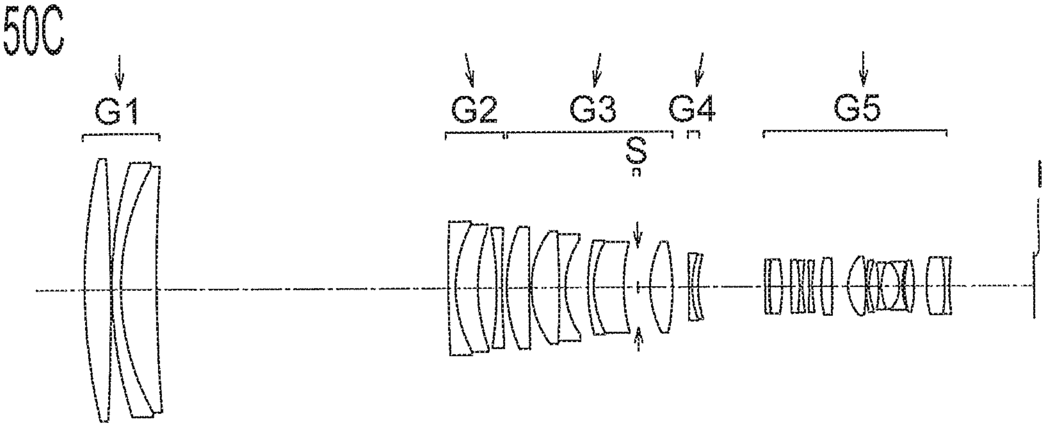
Figure 51A:
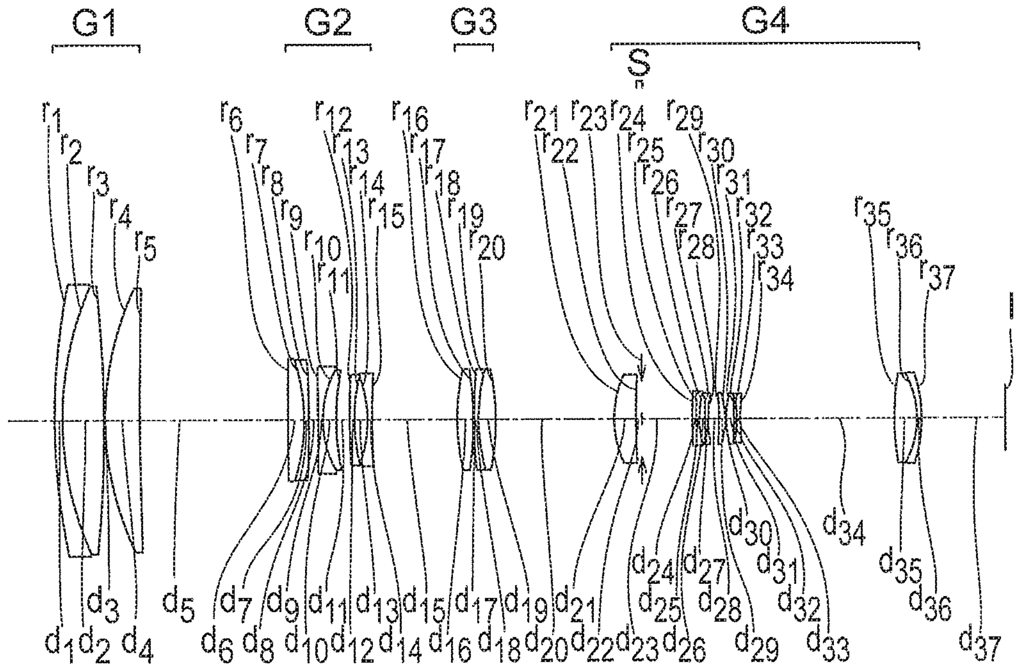
FIG. 51A, FIG. 51B, and FIG. 51C are lens cross-sectional views of an example 51.
Figure 51B:
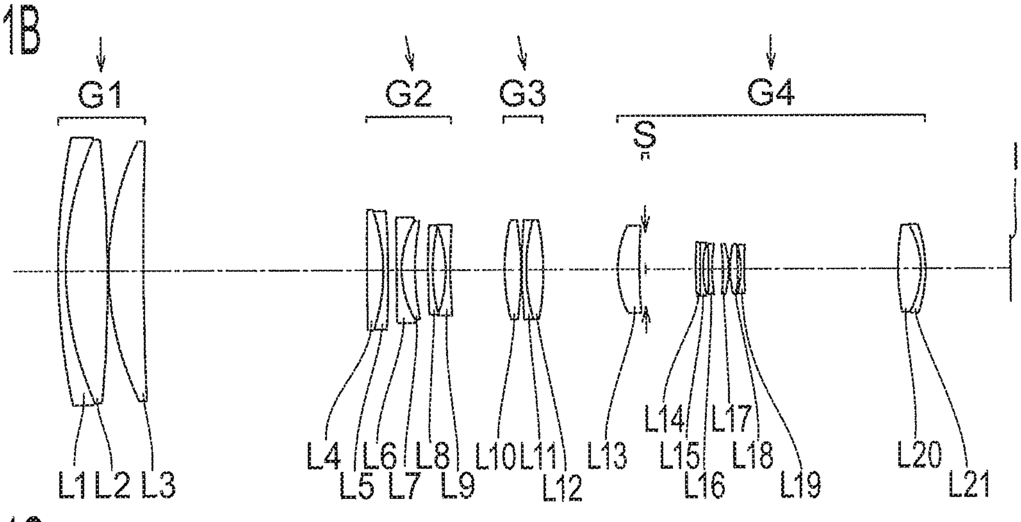
Figure 51C:
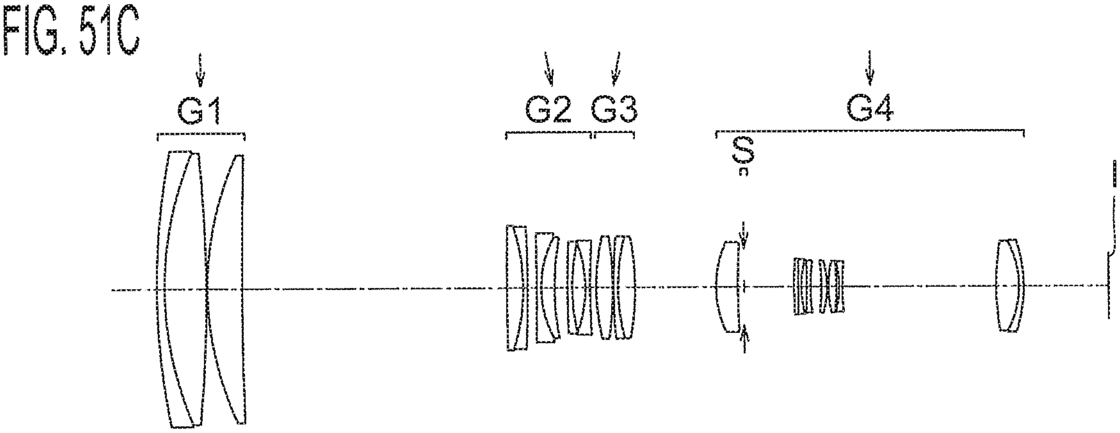
Figure 52A:
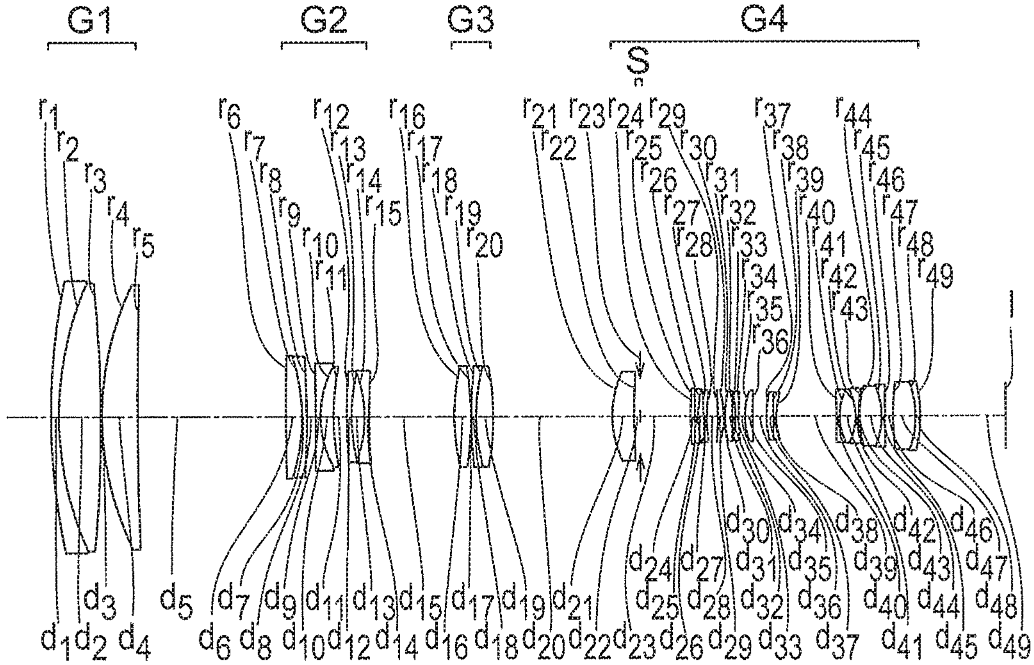
FIG. 52A, FIG. 52B, and FIG. 52C are lens cross-sectional views of an example 52.
Figure 52B:
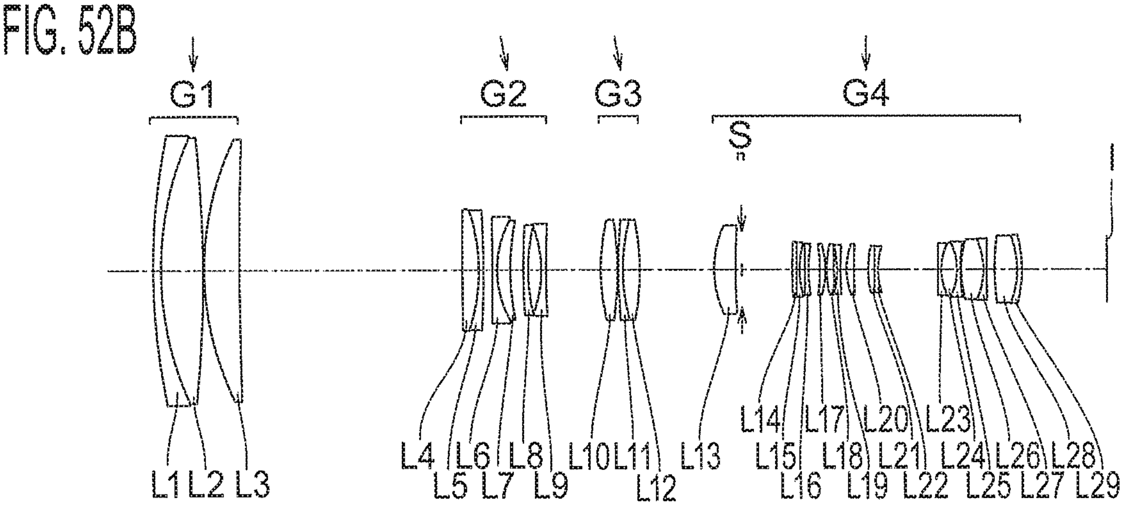
Figure 52C:
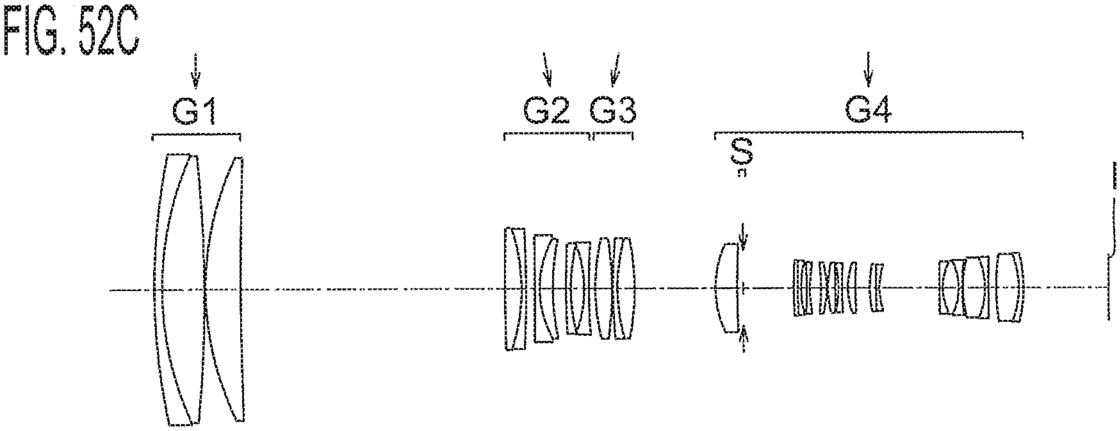
Figure 53A:
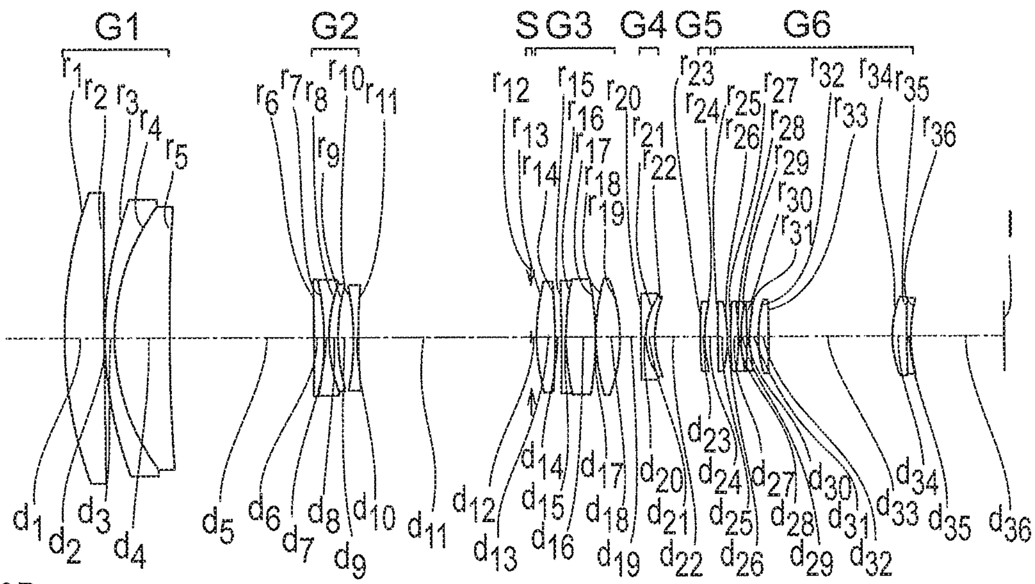
FIG. 53A, FIG. 53B, and FIG. 53C are lens cross-sectional views of an example 53.
Figure 53B:
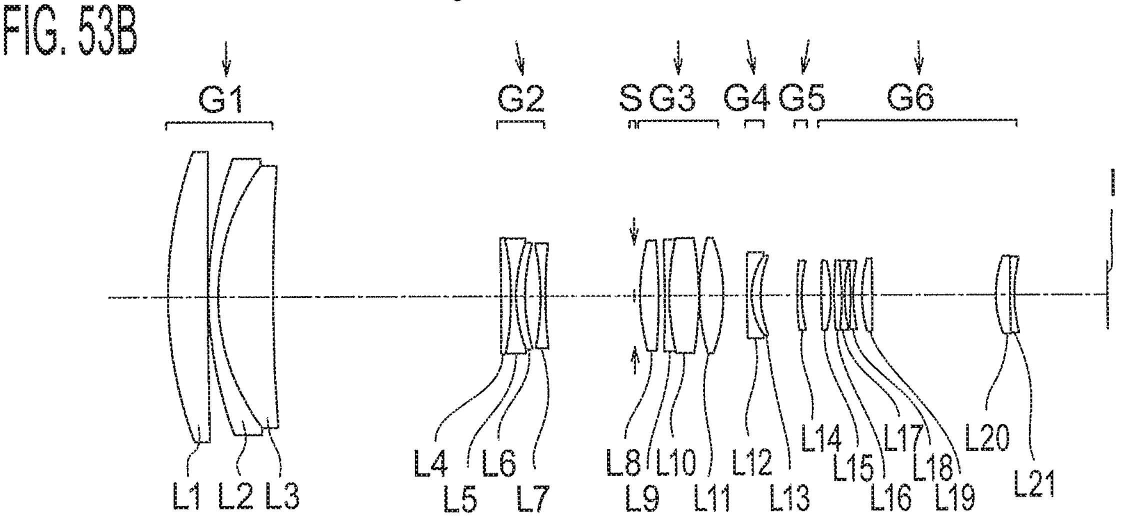
Figure 53C:
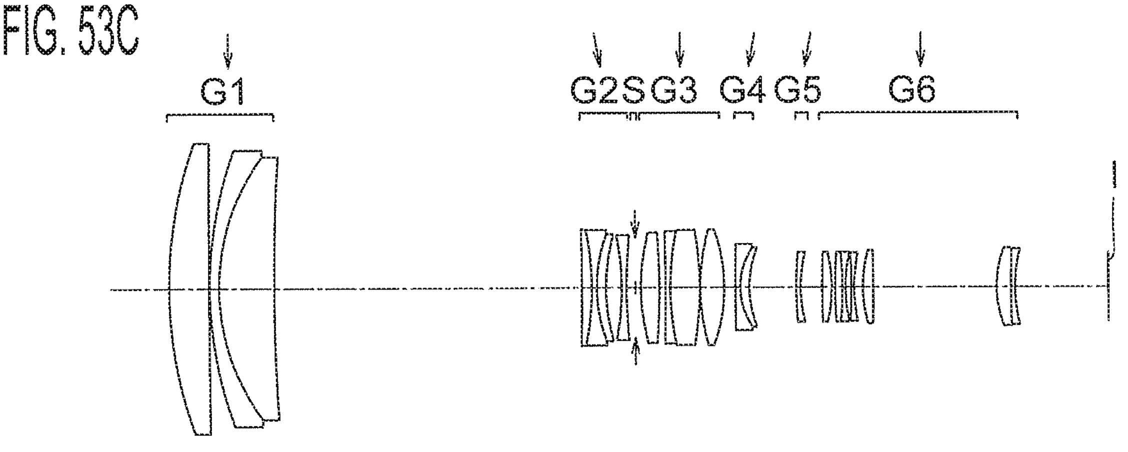
Figure 54A:
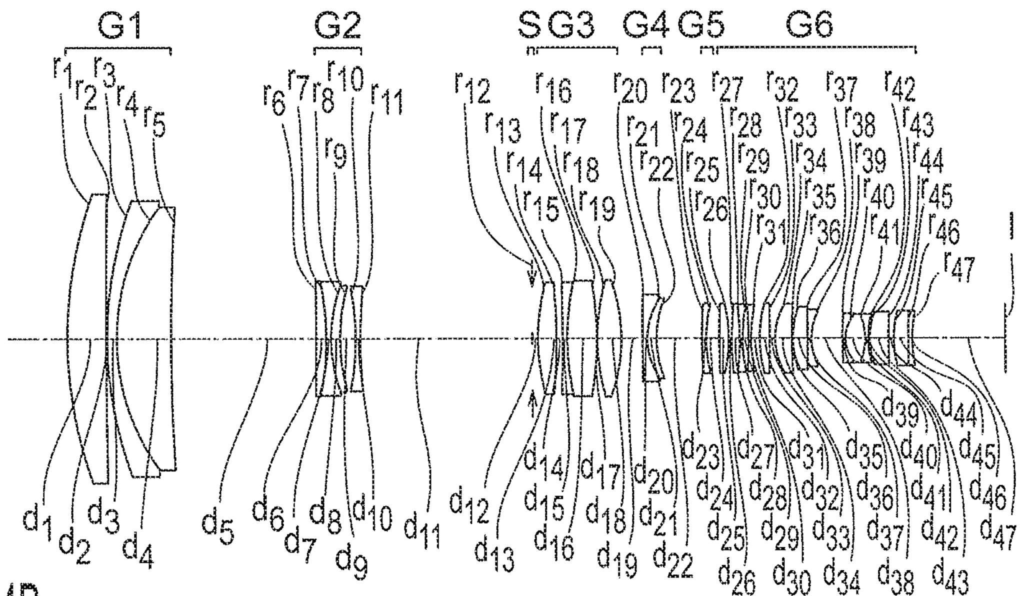
FIG. 54A, FIG. 54B, and FIG. 54C are lens cross-sectional views of an example 54.
Figure 54B:
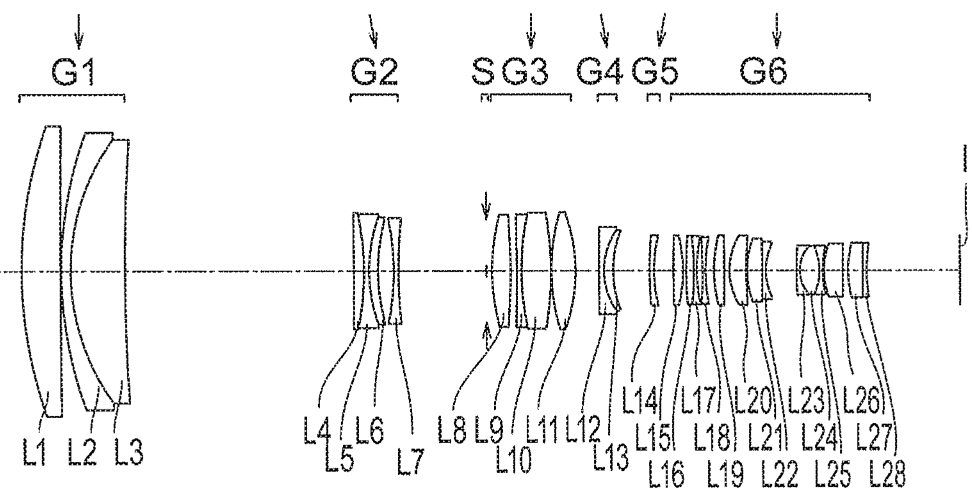
Figure 54C:
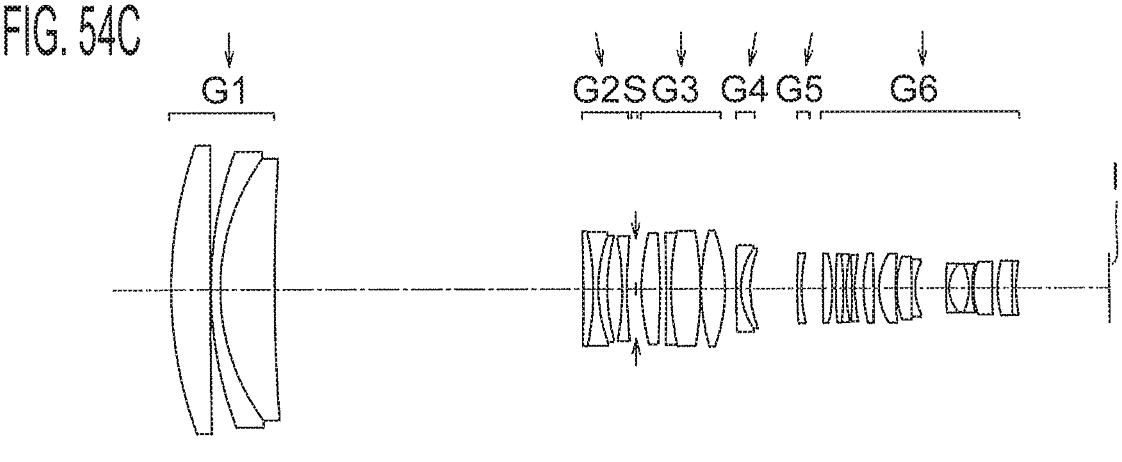
Figure 55A:
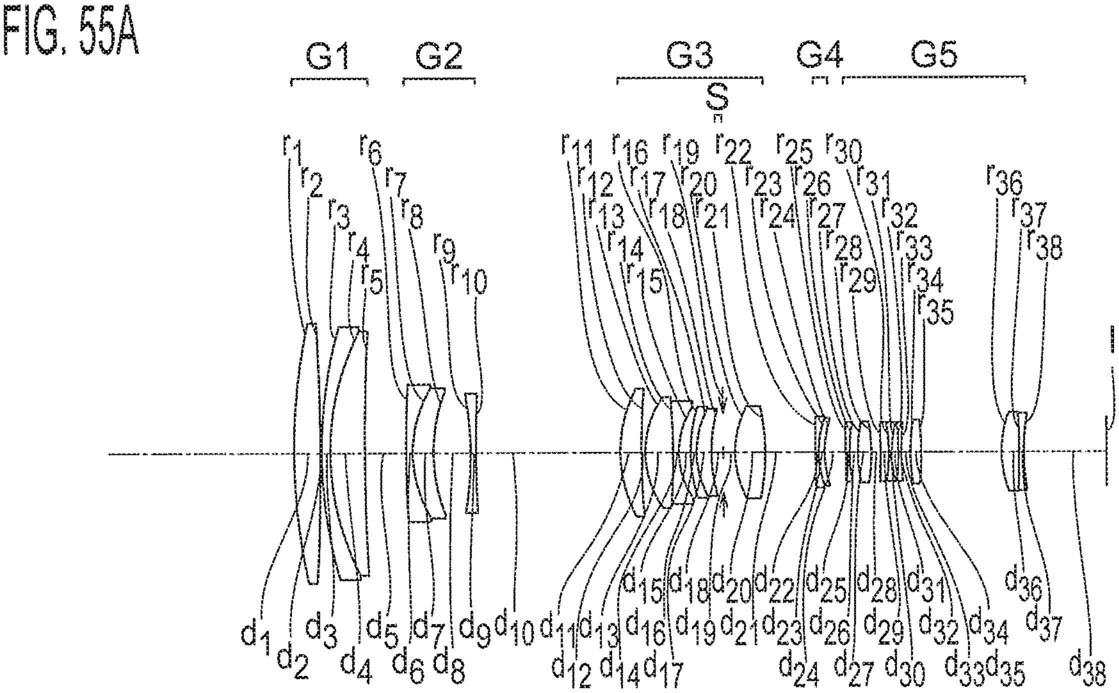
FIG. 55A, FIG. 55B, and FIG. 55C are lens cross-sectional views of an example 55.
Figure 55B:
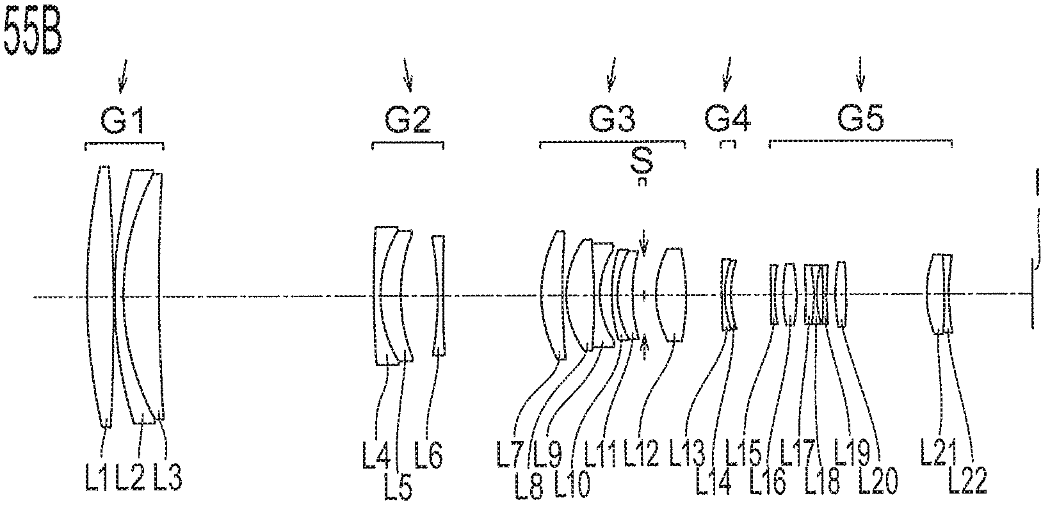
Figure 55C:
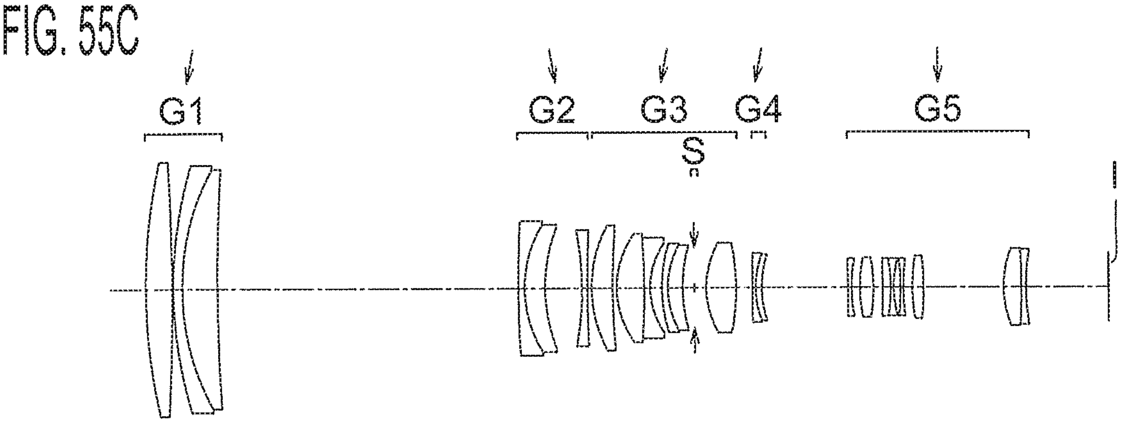
Figure 56A:
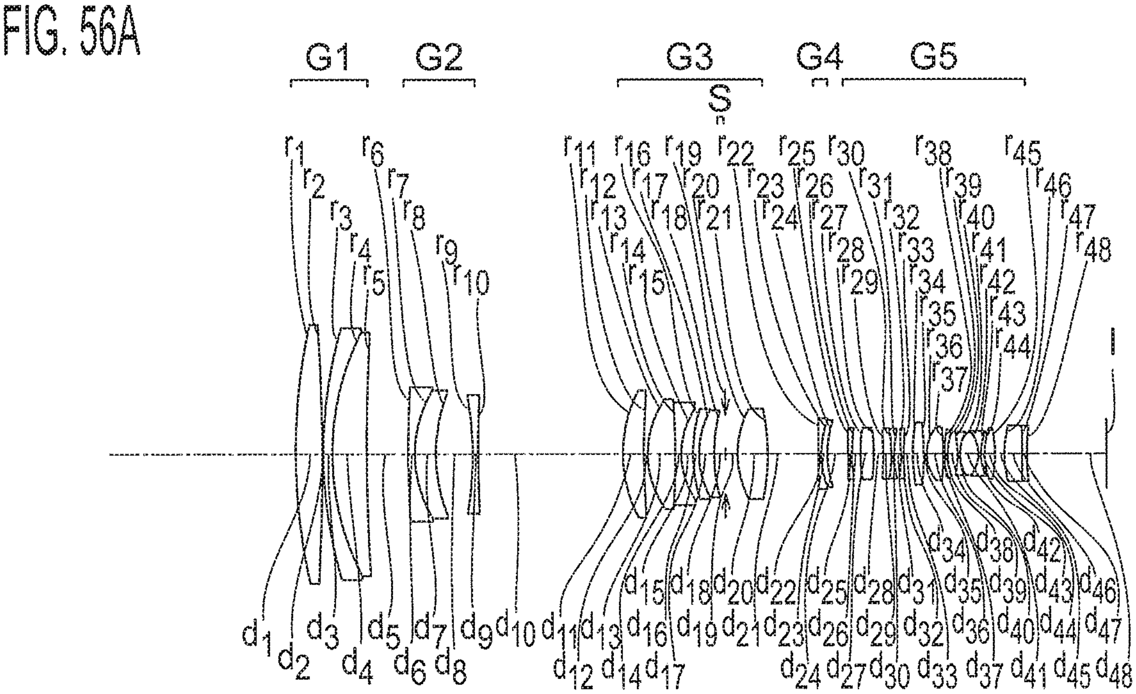
FIG. 56A, FIG. 56B, and FIG. 56C are lens cross-sectional views of an example 56.
Figure 56B:
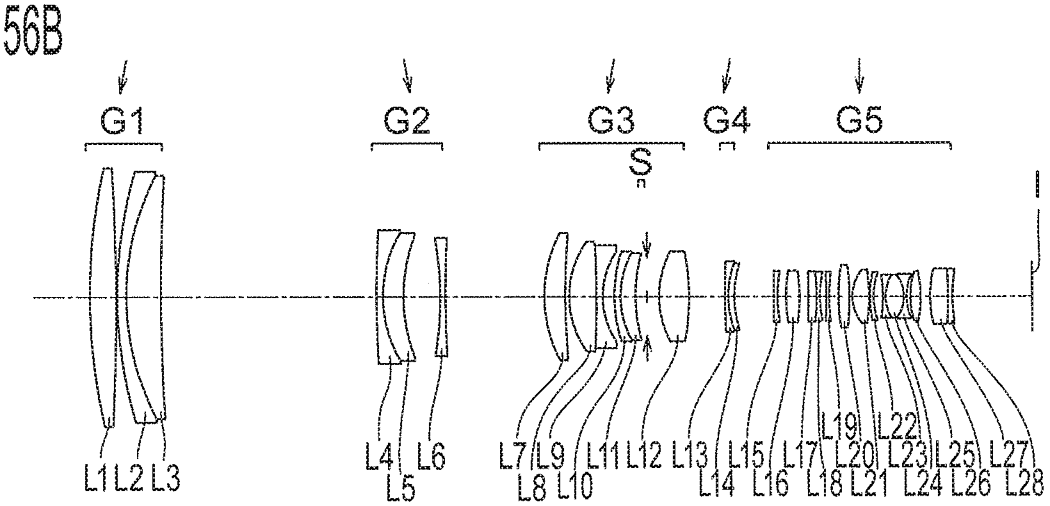
Figure 56C:
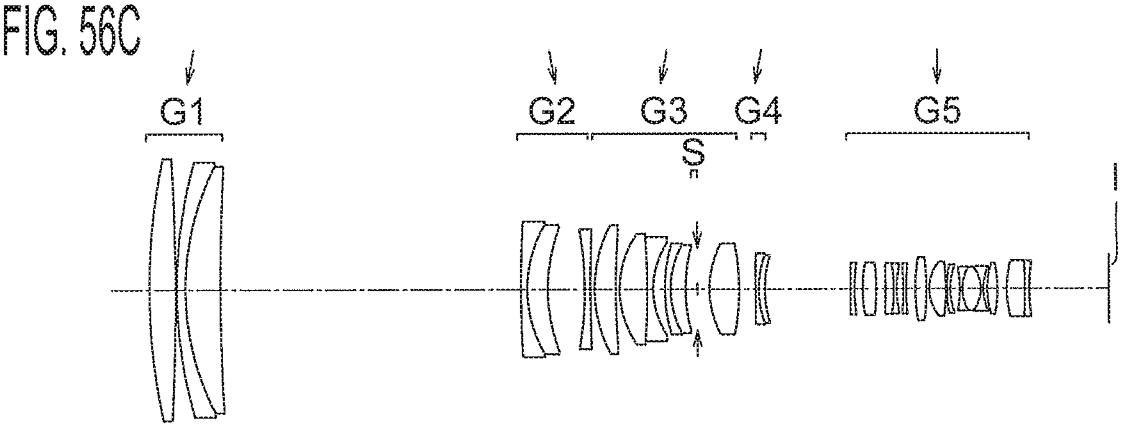
Figure 57A:
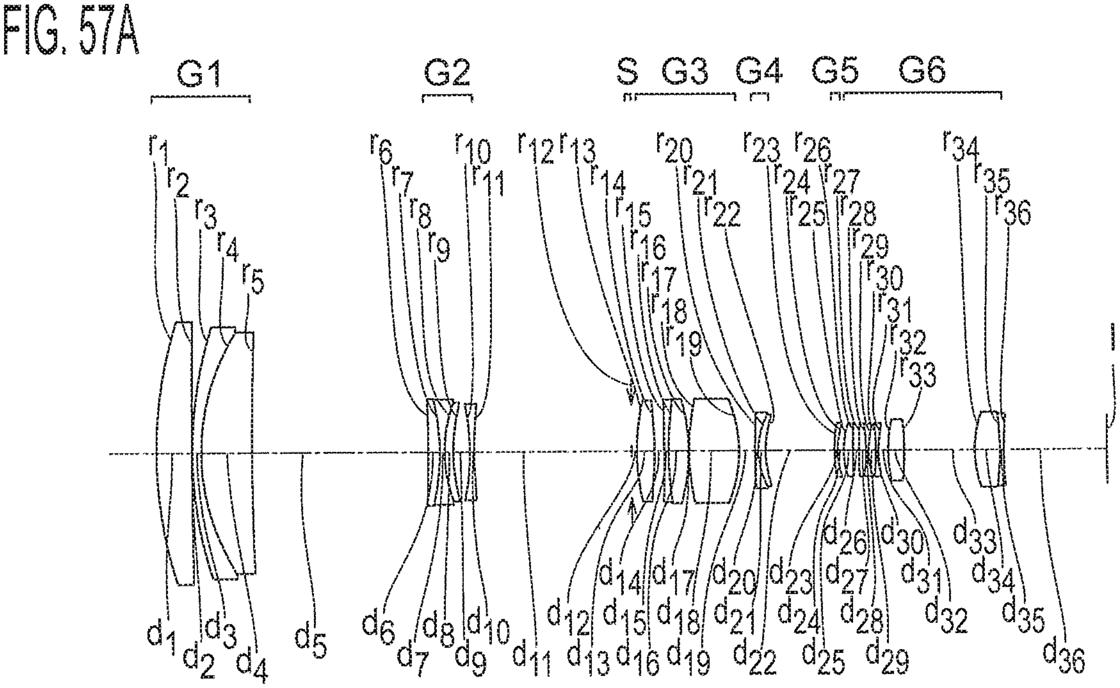
FIG. 57A, FIG. 57B, and FIG. 57C are lens cross-sectional views of an example 57.
Figure 57B:
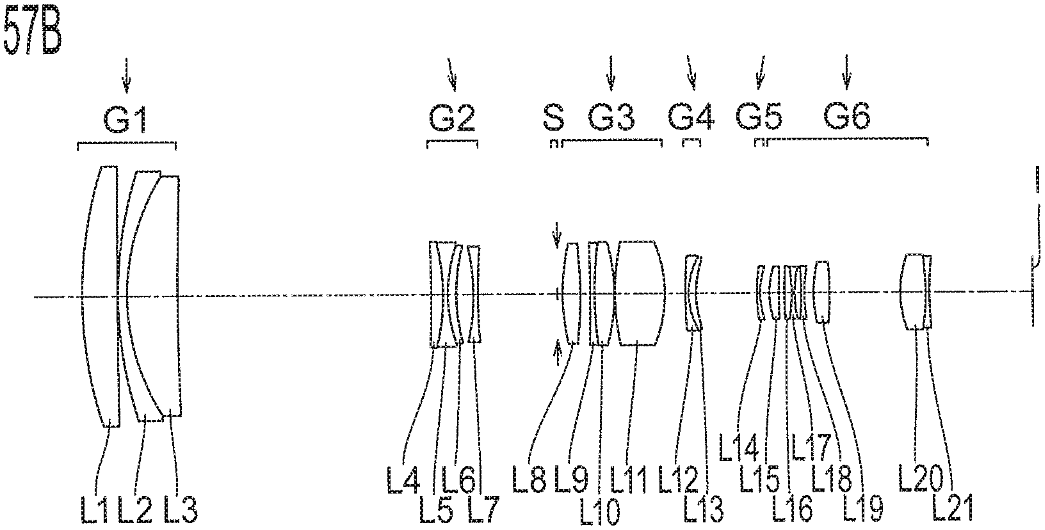
Figure 57C:
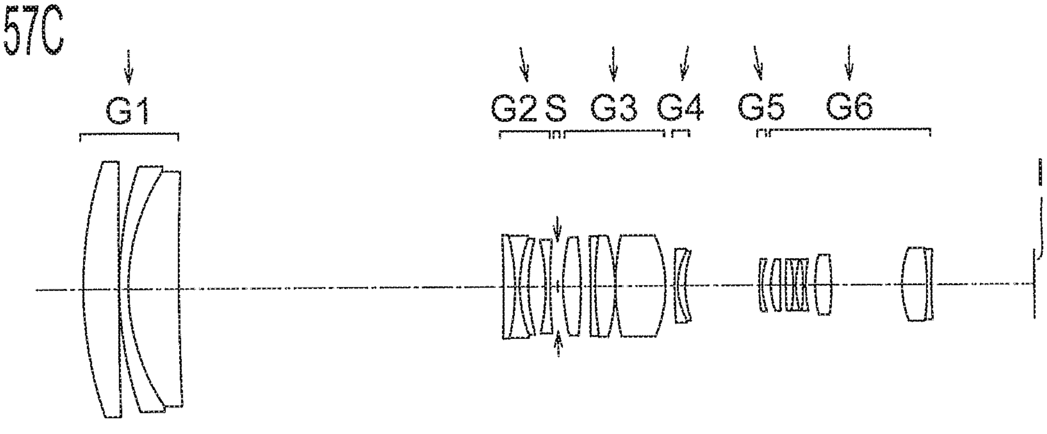
Figure 58A:
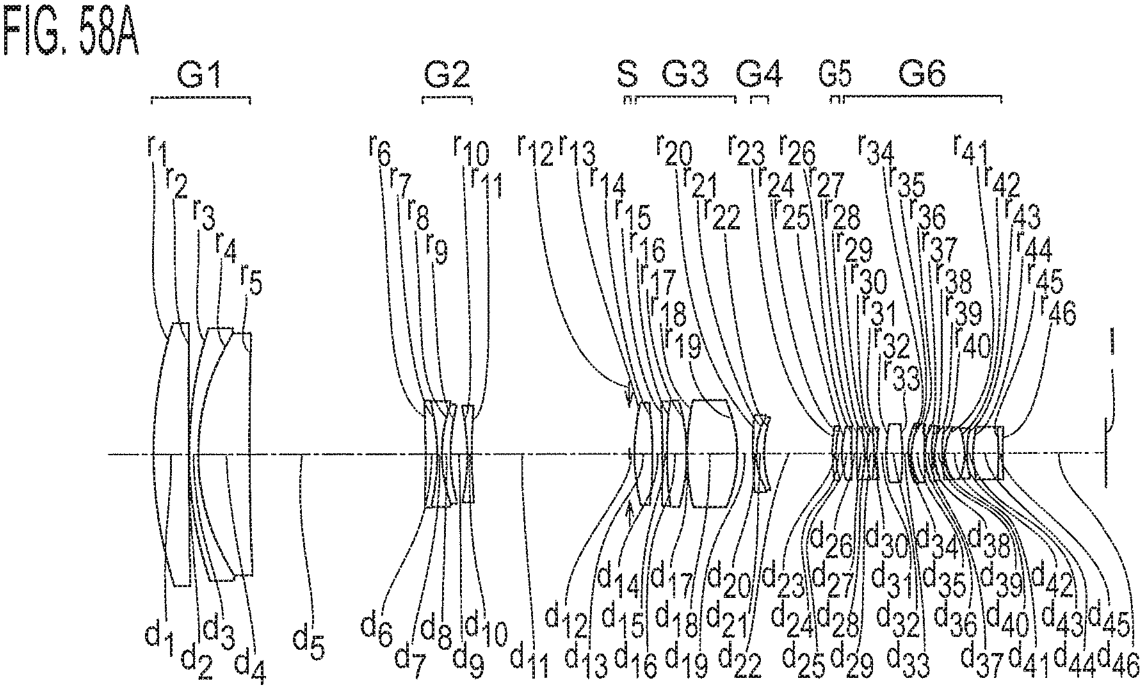
FIG. 58A, FIG. 58B, and FIG. 58C are lens cross-sectional views of an example 58.
Figure 58B:
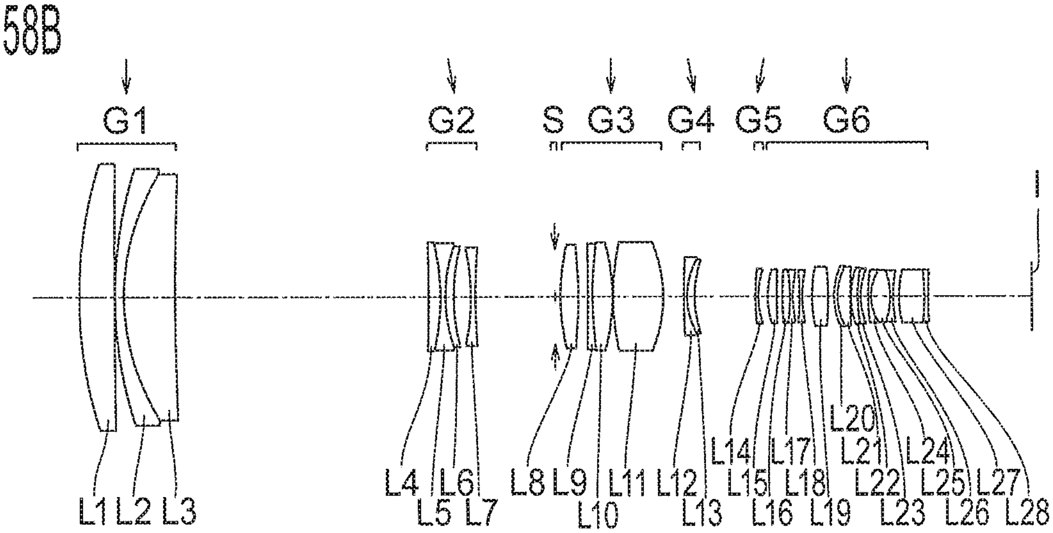
Figure 58C:
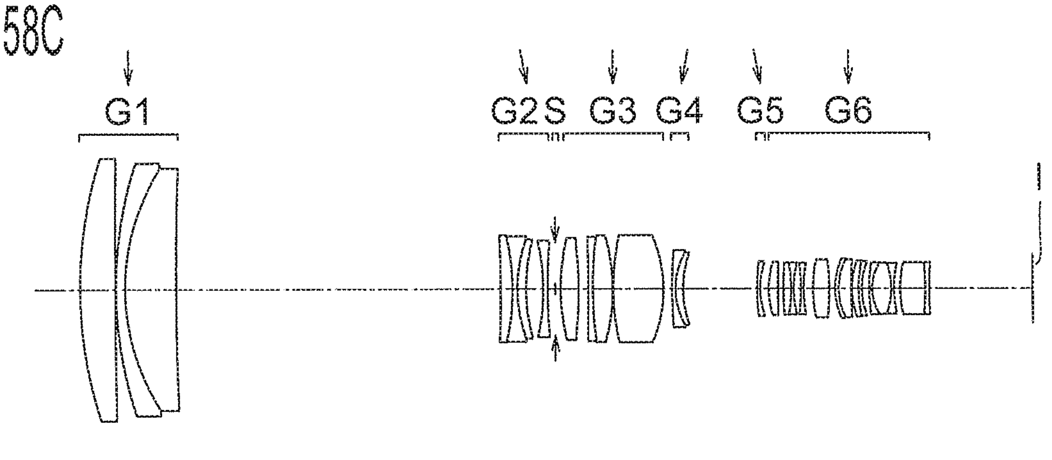
Figure 59A:
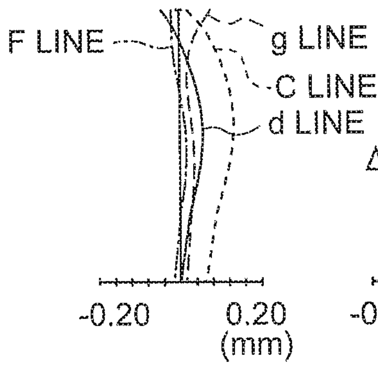
FIG. 59A, FIG. 59B, FIG. 59C, FIG. 59D, FIG. 59E, FIG. 59F, FIG. 59G, FIG. 59H, FIG. 59I, FIG. 59J, FIG. 59K, and FIG. 59L are aberration diagrams of the example 1.
Figure 59B:
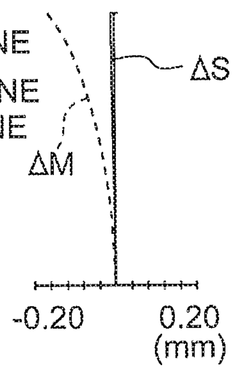
Figure 59C:
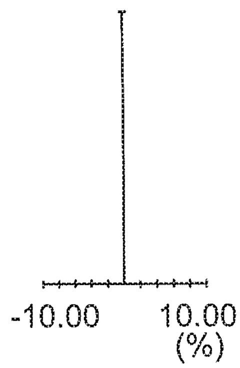
Figure 59D:
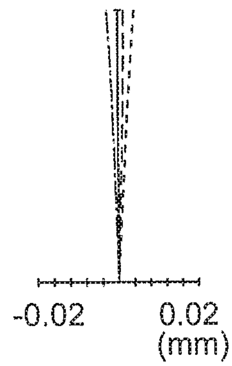
Figure 59E:
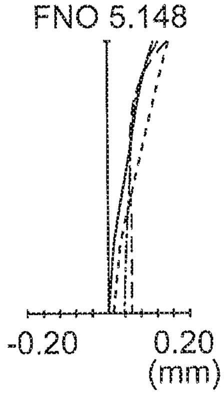
Figure 59F:
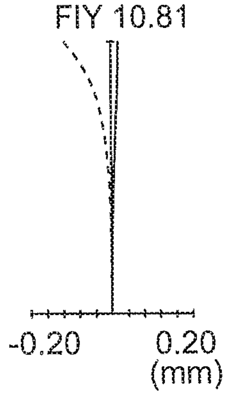
Figure 59G:
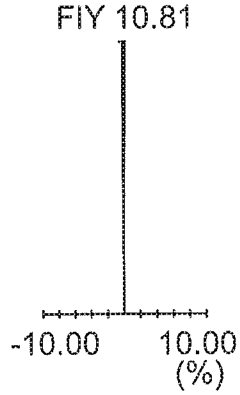
Figure 59H:
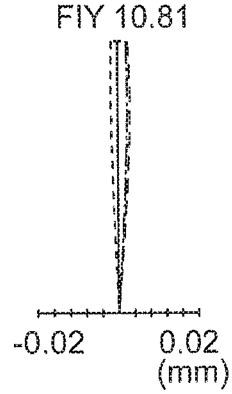
Figure 59I:
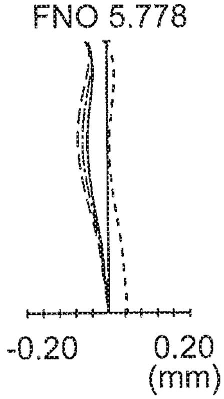
Figure 59J:
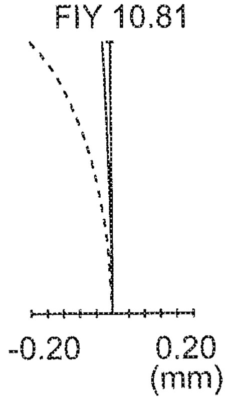
Figure 59K:
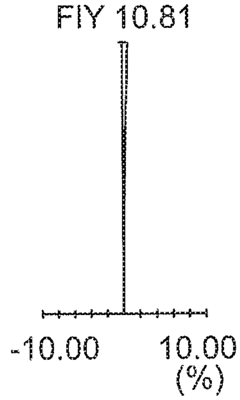
Figure 59L:
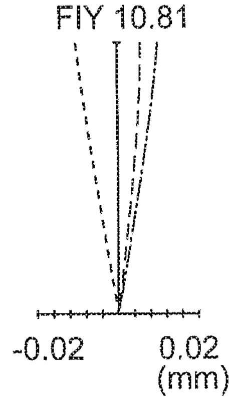
Figure 60A:
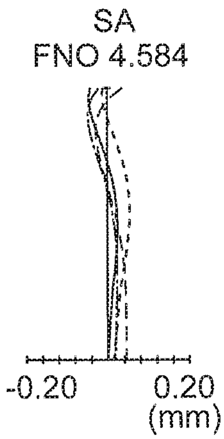
FIG. 60A, FIG. 60B, FIG. 60C, FIG. 60D, FIG. 60E, FIG. 60F, FIG. 60G, FIG. 60H, FIG. 60I, FIG. 60J, FIG. 60K, and FIG. 60L are aberration diagrams of the example 2.
Figure 60B:
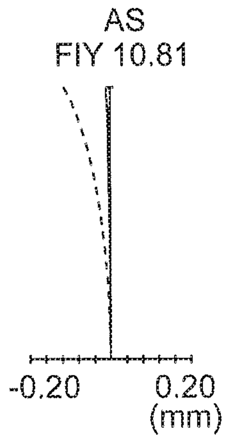
Figure 60C:
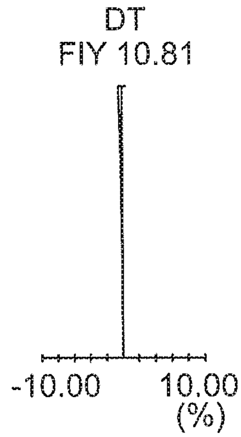
Figure 60D:
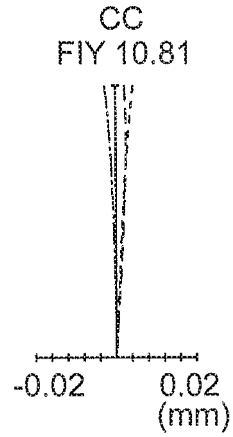
Figure 60E:
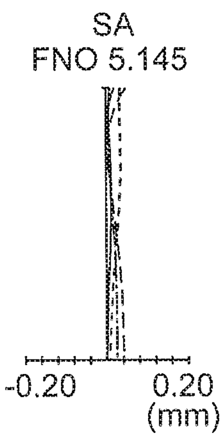
Figure 60F:
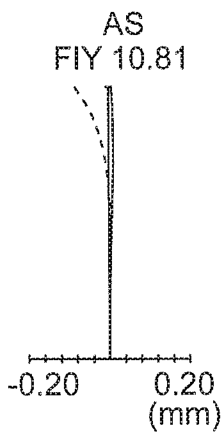
Figure 60G:
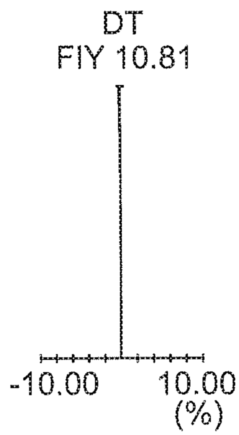
Figure 60H:
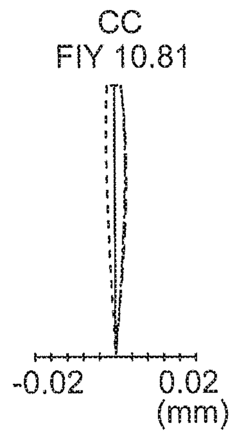
Figure 60I:
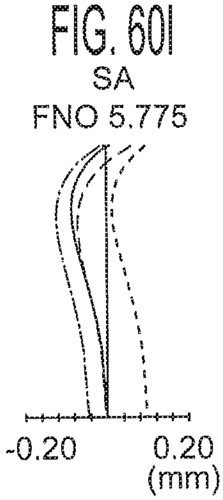
Figure 60J:
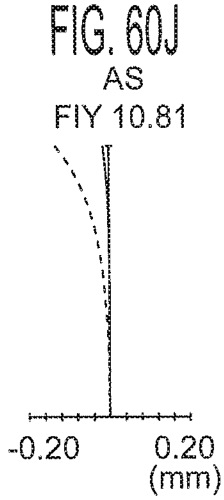
Figure 60K:
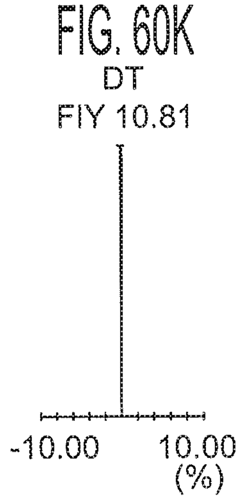
Figure 60L:
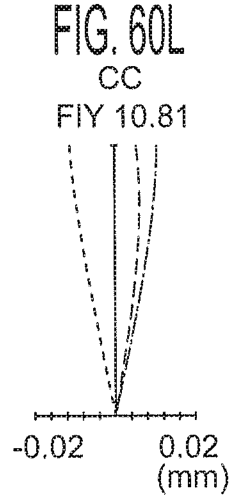
Figure 61A:
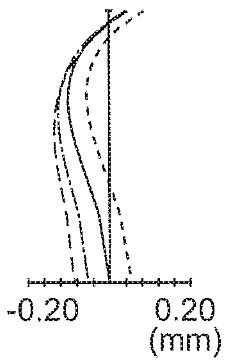
FIG. 61A, FIG. 61B, FIG. 61C, FIG. 61D, FIG. 61E, FIG. 61F, FIG. 61G, FIG. 61H, FIG. 61I, FIG. 61J, FIG. 61K, and FIG. 61L are aberration diagrams of the example 3.
Figure 61B:
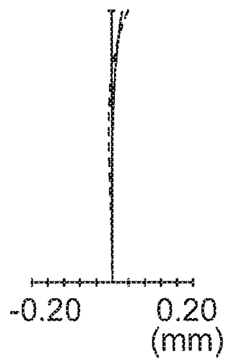
Figure 61C:
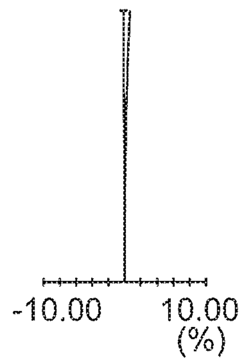
Figure 61D:
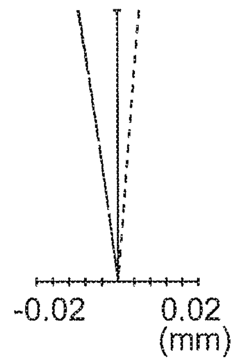
Figure 61E:
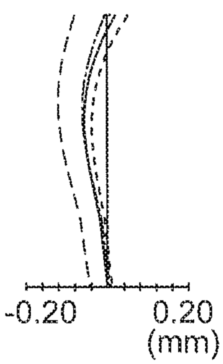
Figure 61F:
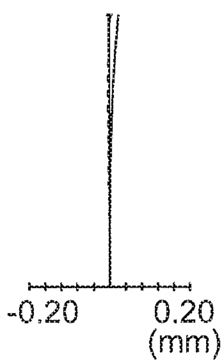
Figure 61G:
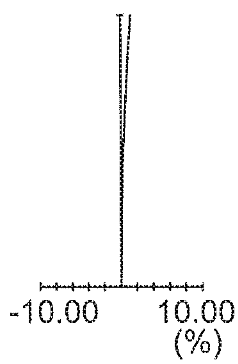
Figure 61H:
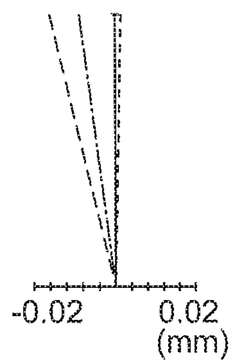
Figure 61I:
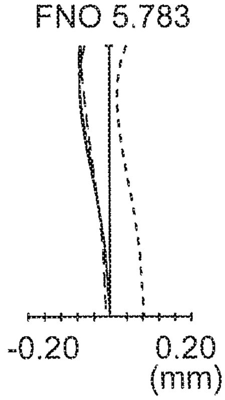
Figure 61J:
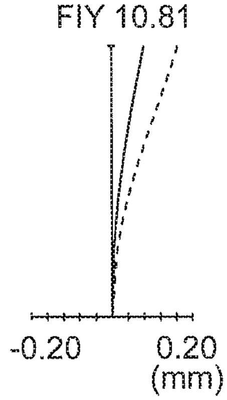
Figure 61K:
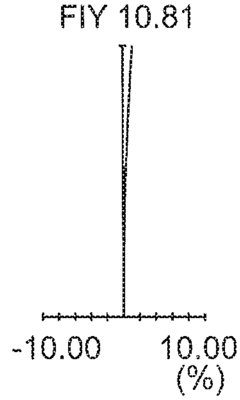
Figure 61L:
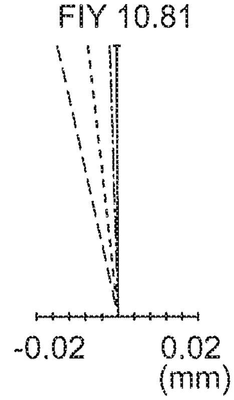
Figure 62A:
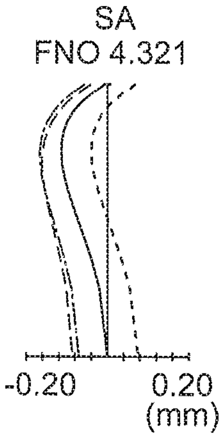
FIG. 62A, FIG. 62B, FIG. 62C, FIG. 62D, FIG. 62E, FIG. 62F, FIG. 62G, FIG. 62H, FIG. 62I, FIG. 62J, FIG. 62K, and FIG. 62L are aberration diagrams of the example 4.
Figure 62B:
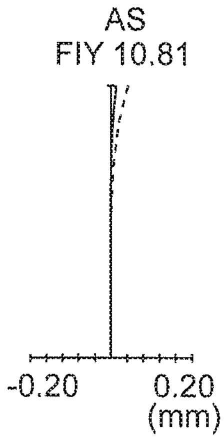
Figure 62C:
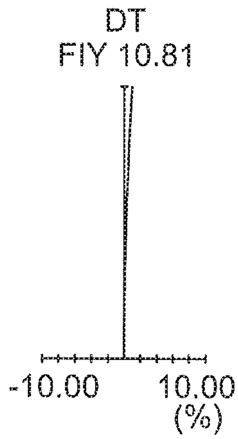
Figure 62D:
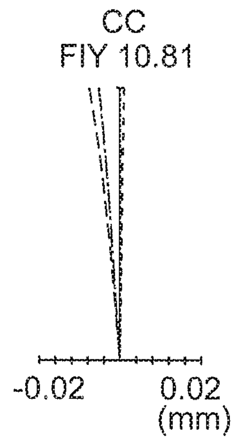
Figure 62E:
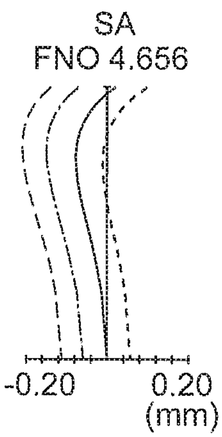
Figure 62F:
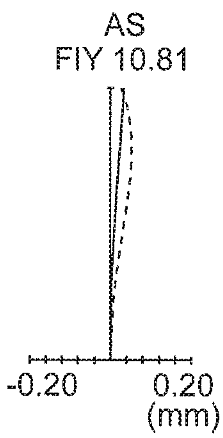
Figure 62G:
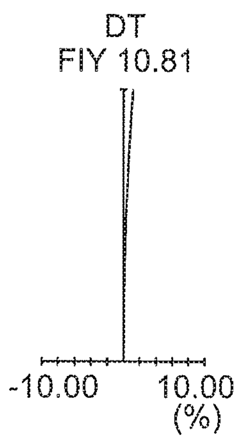
Figure 62H:
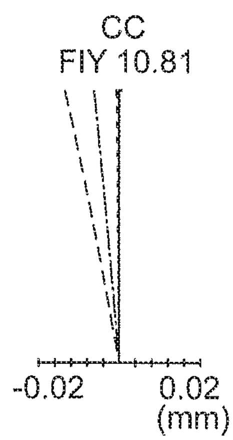
Figure 62I:
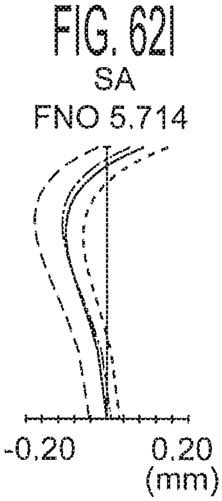
Figure 62J:
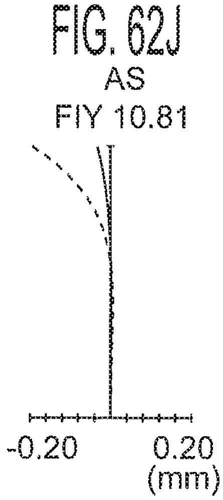
Figure 62K:
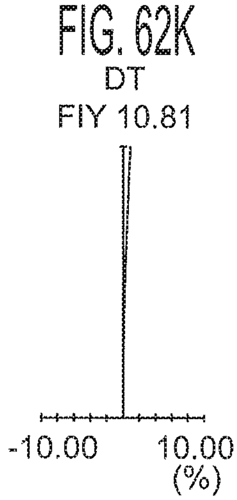
Figure 62L:
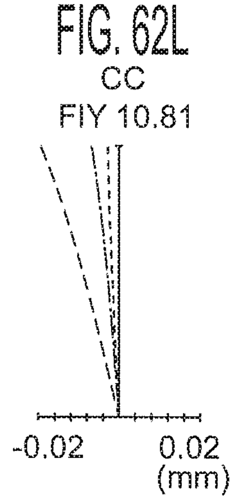
Figure 63A:
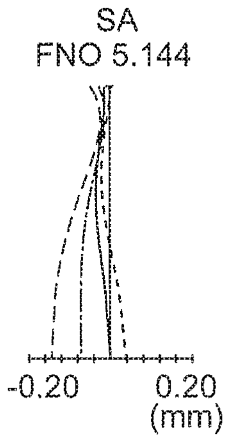
FIG. 63A, FIG. 63B, FIG. 63C, FIG. 63D, FIG. 63E, FIG. 63F, FIG. 63G, FIG. 63H, FIG. 63I, FIG. 63J, FIG. 63K, and FIG. 63L are aberration diagrams of the example 5.
Figure 63B:
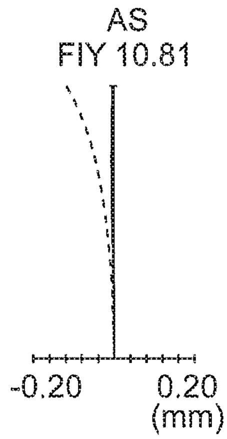
Figure 63C:
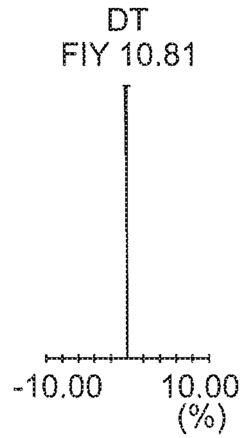
Figure 63D:
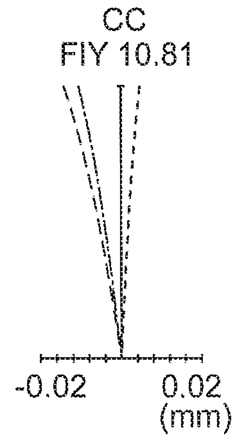
Figure 63E:
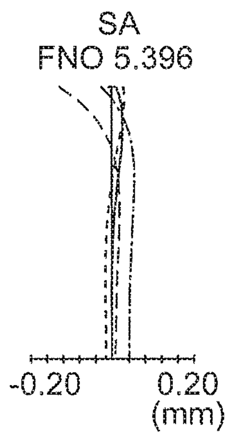
Figure 63F:
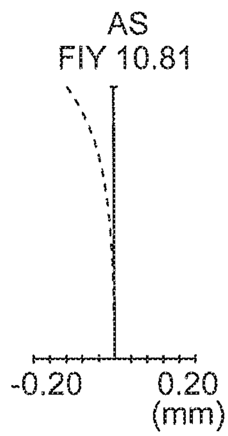
Figure 63G:
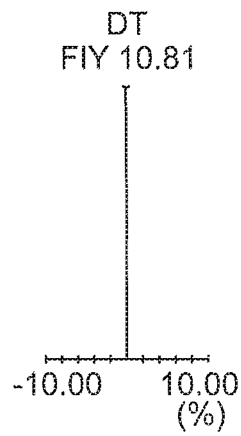
Figure 63H:
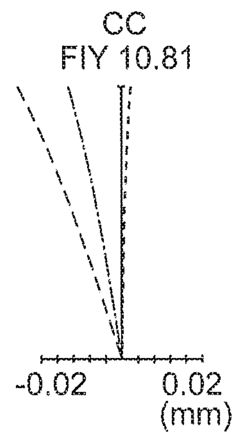
Figure 63I:
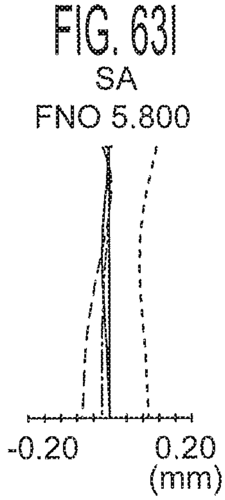
Figure 63J:
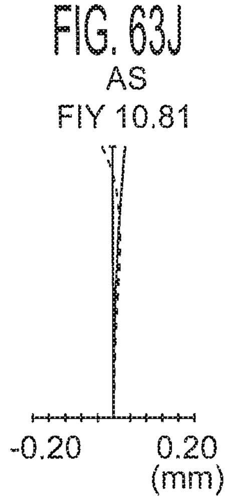
Figure 63K:
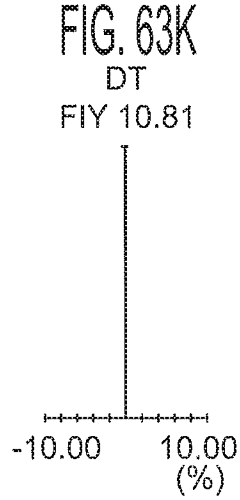
Figure 63L:
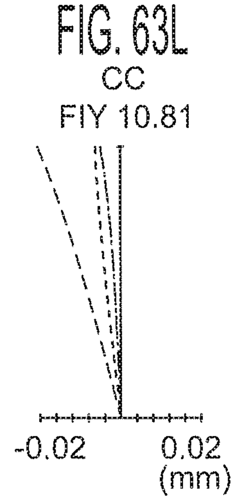
Figure 64A:
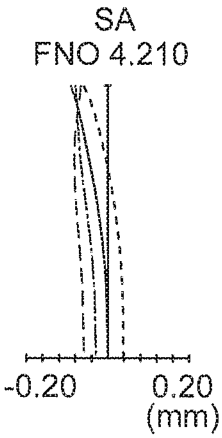
FIG. 64A, FIG. 64B, FIG. 64C, FIG. 64D, FIG. 64E, FIG. 64F, FIG. 64G, FIG. 64H, FIG. 64I, FIG. 64J, FIG. 64K, and FIG. 64L are aberration diagrams of the example 6.
Figure 64B:
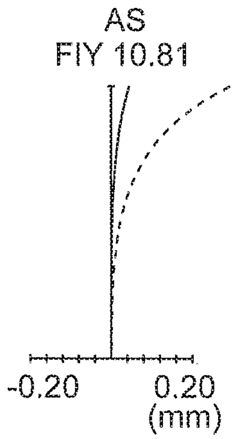
Figure 64C:
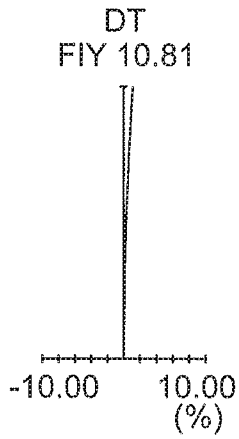
Figure 64D:
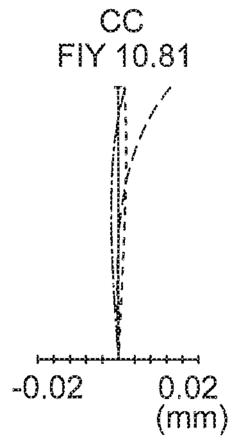
Figure 64E:
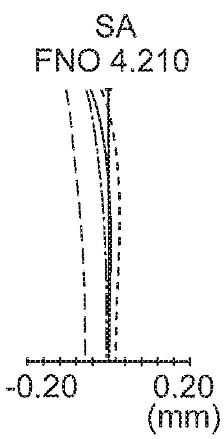
Figure 64F:
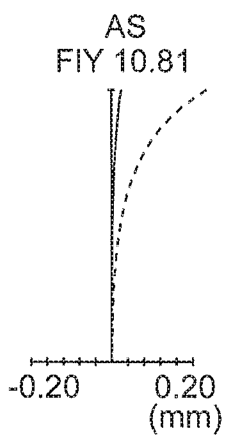
Figure 64G:
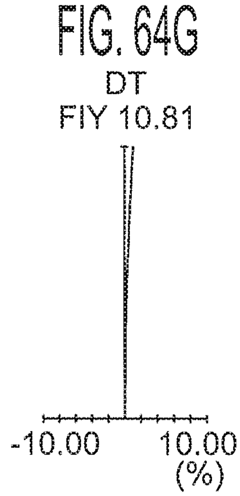
Figure 64H:
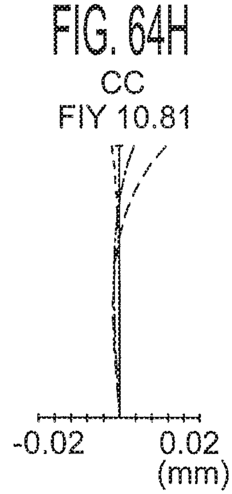
Figure 64I:
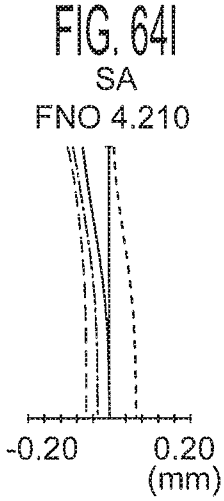
Figure 64J:
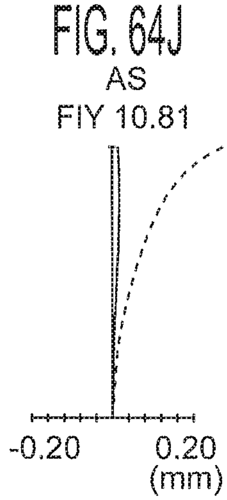
Figure 64K:
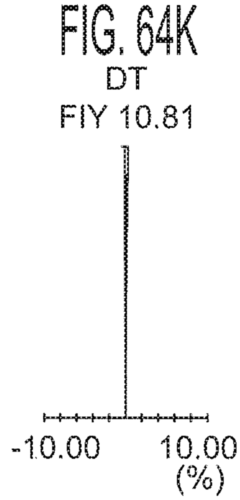
Figure 64L:
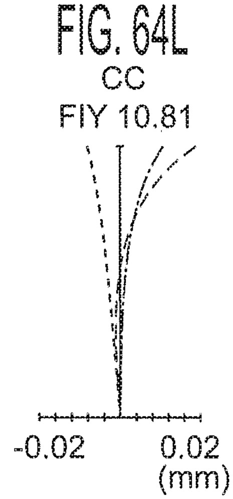
Figure 65A:
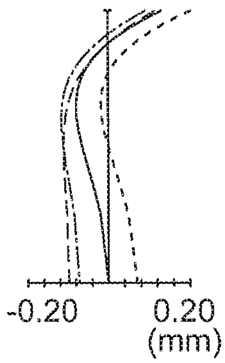
FIG. 65A, FIG. 65B, FIG. 65C, FIG. 65D, FIG. 65E, FIG. 65F, FIG. 65G, FIG. 65H, FIG. 65I, FIG. 65J, FIG. 65K, and FIG. 65L are aberration diagrams of the example 7.
Figure 65B:
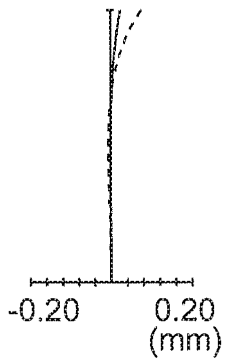
Figure 65C:
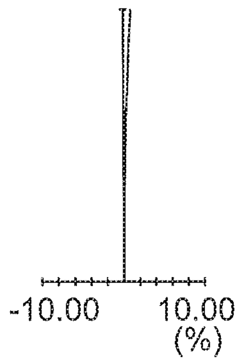
Figure 65D:
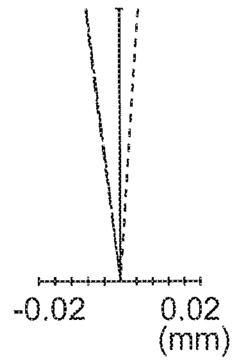
Figure 65E:
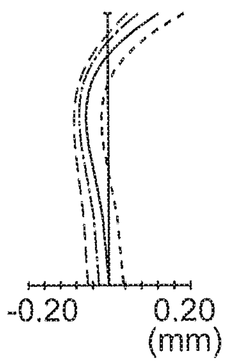
Figure 65F:
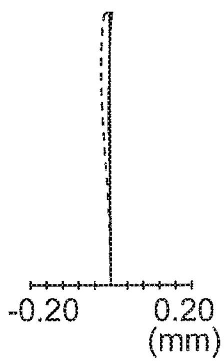
Figure 65G:
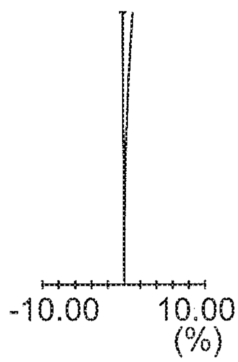
Figure 65H:
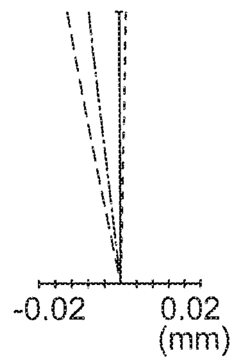
Figure 65I:
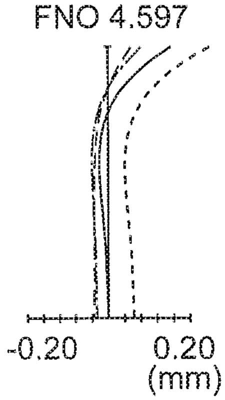
Figure 65J:
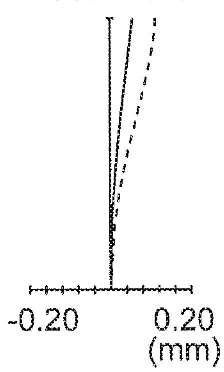
Figure 65K:
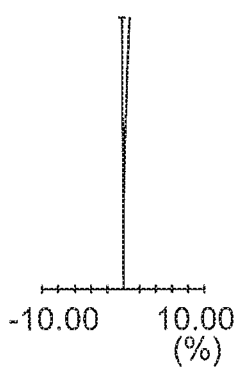
Figure 65L:
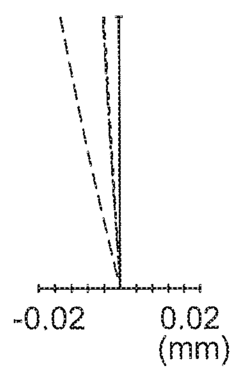
Figure 66A:
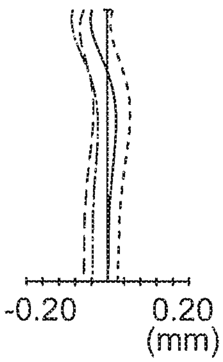
FIG. 66A, FIG. 66B, FIG. 66C, FIG. 66D, FIG. 66E, FIG. 66F, FIG. 66G, FIG. 66H, FIG. 66I, FIG. 66J, FIG. 66K, and FIG. 66L are aberration diagrams of the example 8.
Figure 66B:
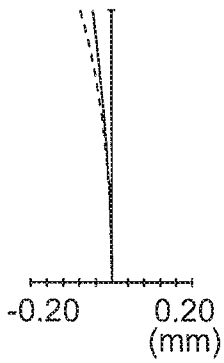
Figure 66C:
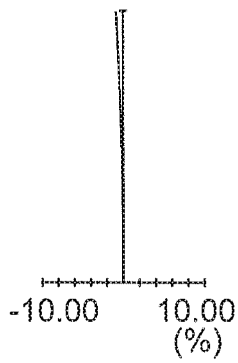
Figure 66D:
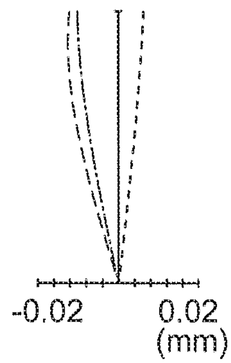
Figure 66E:
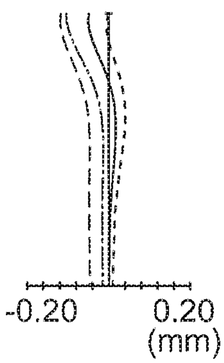
Figure 66F:
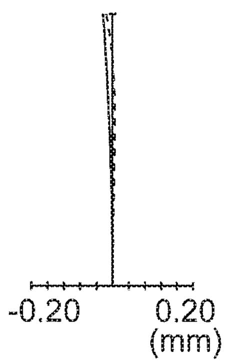
Figure 66G:
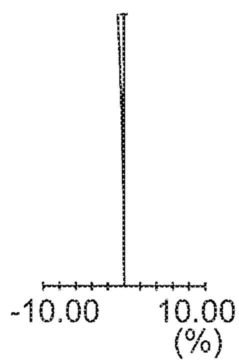
Figure 66H:
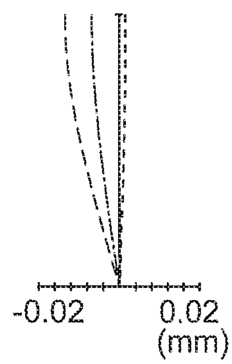
Figure 66I:
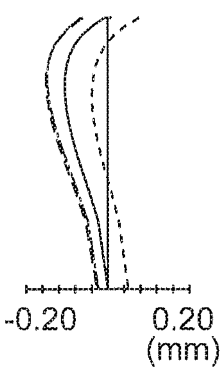
Figure 66J:
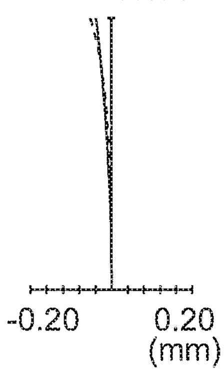
Figure 66K:
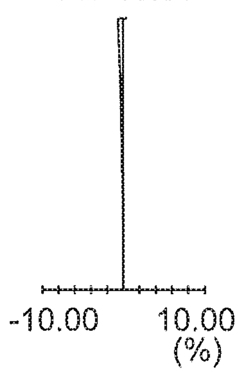
Figure 66L:
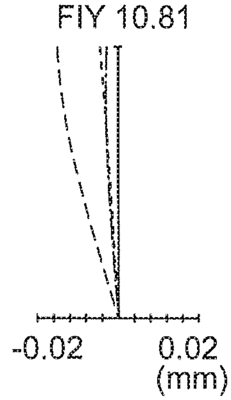
Figure 67A:
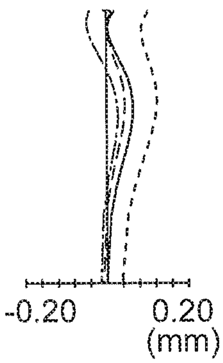
FIG. 67A, FIG. 67B, FIG. 67C, FIG. 67D, FIG. 67E, FIG. 67F, FIG. 67G, FIG. 67H, FIG. 67I, FIG. 67J, FIG. 67K, and FIG. 67L are aberration diagrams of the example 9.
Figure 67B:
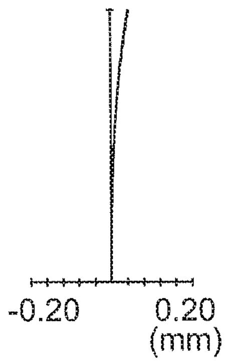
Figure 67C:
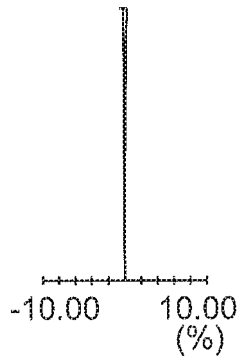
Figure 67D:
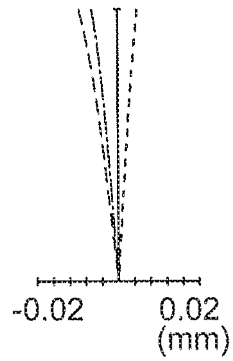
Figure 67E:
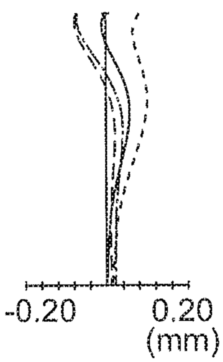
Figure 67F:
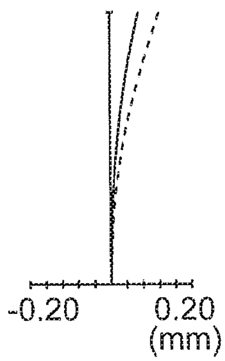
Figure 67G:
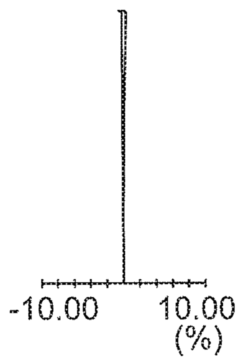
Figure 67H:
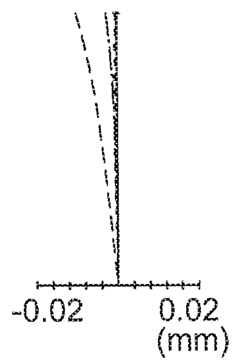
Figure 67I:
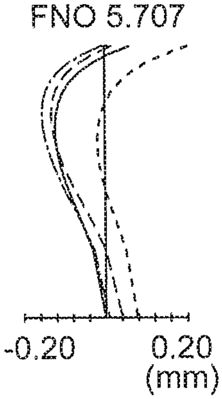
Figure 67J:
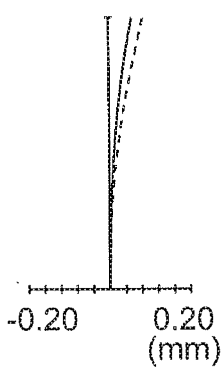
Figure 67K:
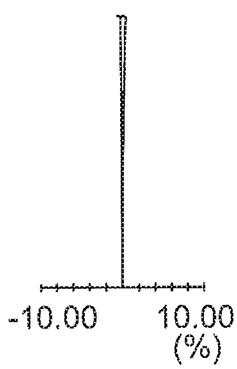
Figure 67L:
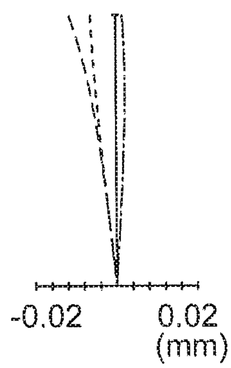
Figure 68A:
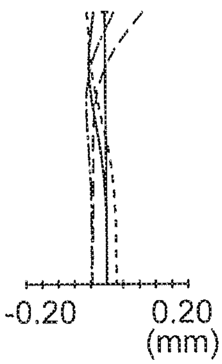
FIG. 68A, FIG. 68B, FIG. 68C, FIG. 68D, FIG. 68E, FIG. 68F, FIG. 68G, FIG. 68H, FIG. 68I, FIG. 68J, FIG. 68K, and FIG. 68L are aberration diagrams of the example 10.
Figure 68B:
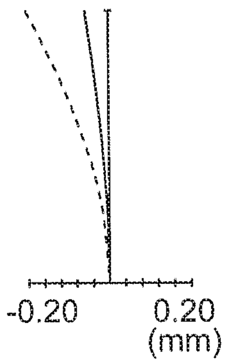
Figure 68C:
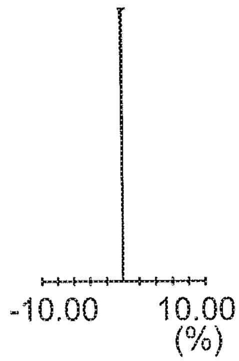
Figure 68D:
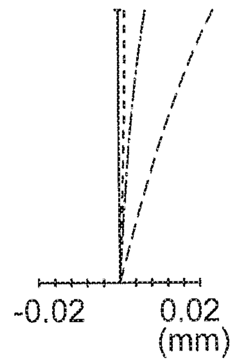
Figure 68E:
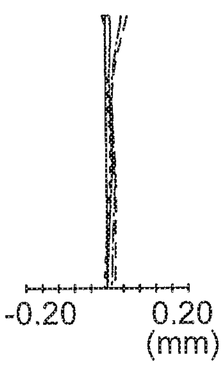
Figure 68F:
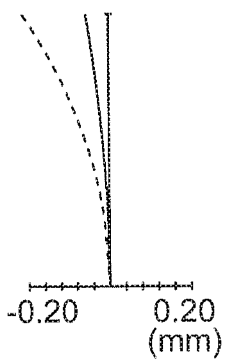
Figure 68G:
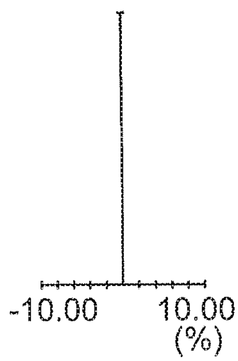
Figure 68H:
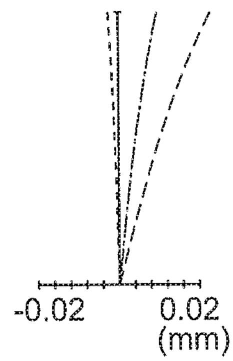
Figure 68I:
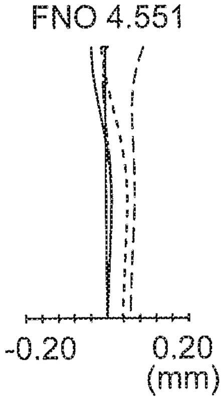
Figure 68J:
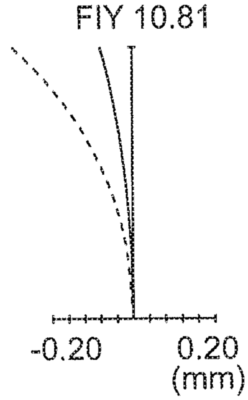
Figure 68K:
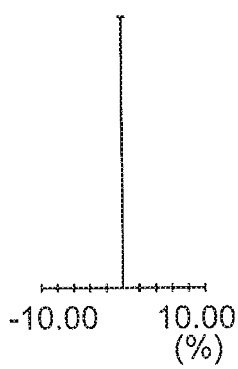
Figure 68L:
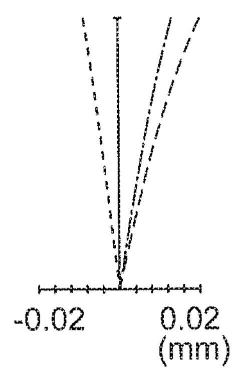
Figure 69A:
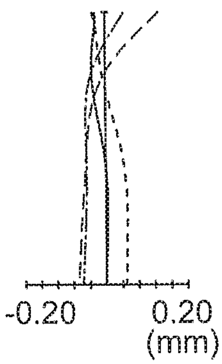
FIG. 69A, FIG. 69B, FIG. 69C, FIG. 69D, FIG. 69E, FIG. 69F, FIG. 69G, FIG. 69H, FIG. 69I, FIG. 69J, FIG. 69K, and FIG. 69L are aberration diagrams of the example 11.
Figure 69B:
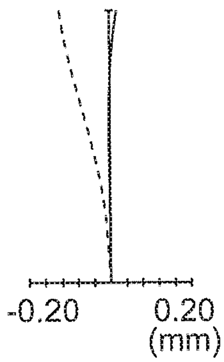
Figure 69C:
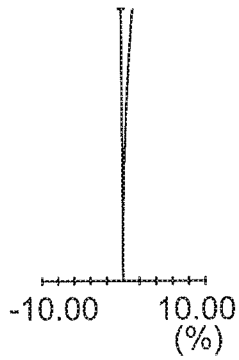
Figure 69D:
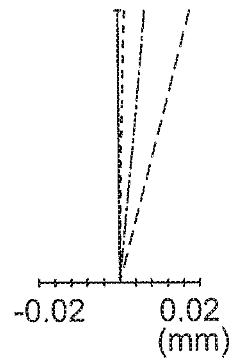
Figure 69E:
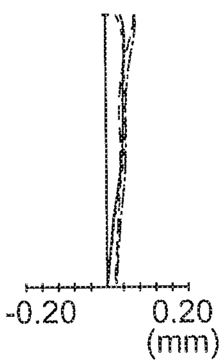
Figure 69F:
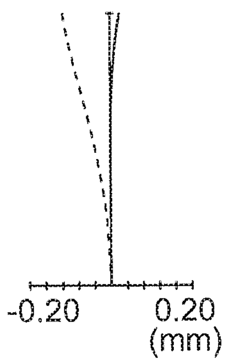
Figure 69G:
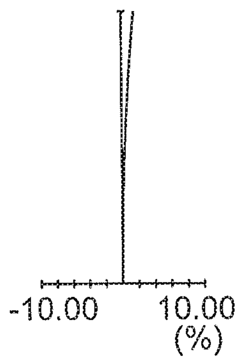
Figure 69H:
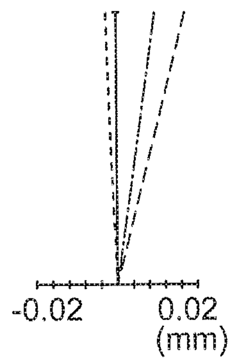
Figure 69I:
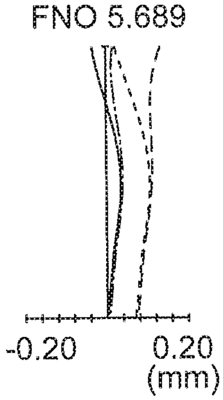
Figure 69J:
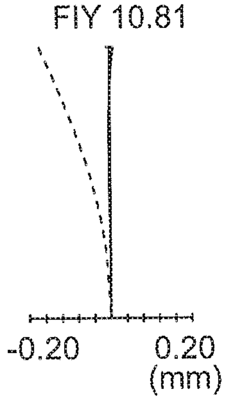
Figure 69K:
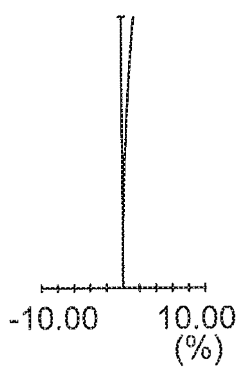
Figure 69L:
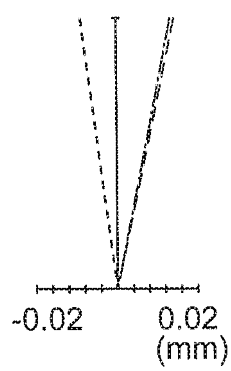
Figure 70A:
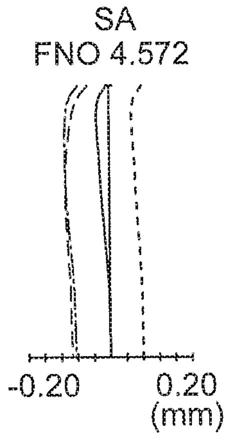
FIG. 70A, FIG. 70B, FIG. 70C, FIG. 70D, FIG. 70E, FIG. 70F, FIG. 70G, FIG. 70H, FIG. 70I, FIG. 70J, FIG. 70K, and FIG. 70L are aberration diagrams of the example 12.
Figure 70B:
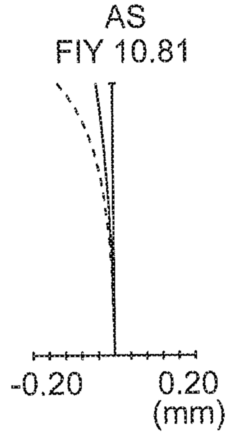
Figure 70C:
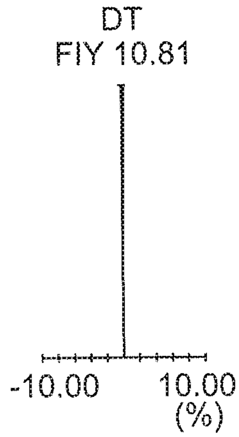
Figure 70D:
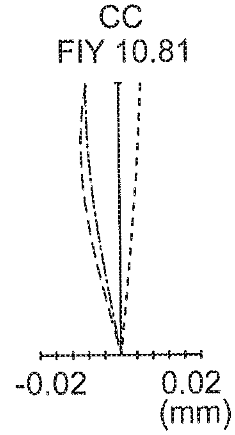
Figure 70E:
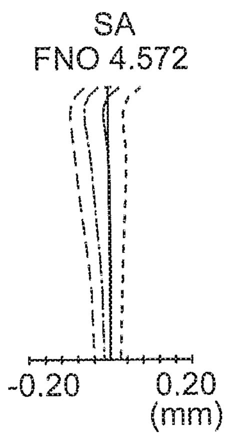
Figure 70F:
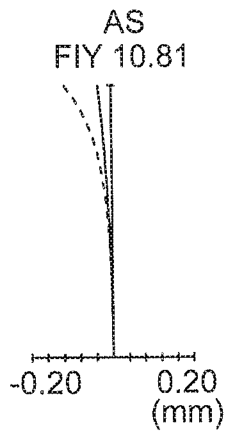
Figure 70G:
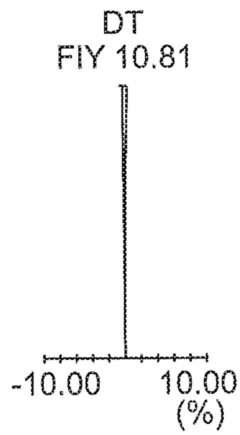
Figure 70H:
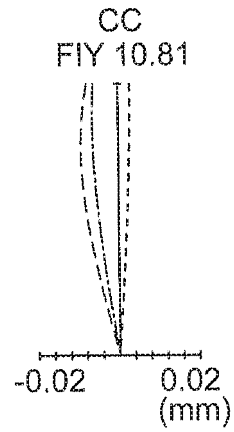
Figure 70I:
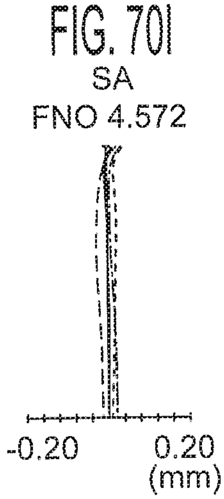
Figure 70J:
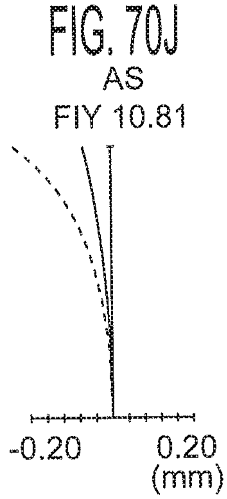
Figure 70K:
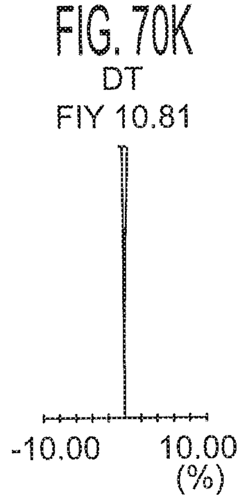
Figure 70L:
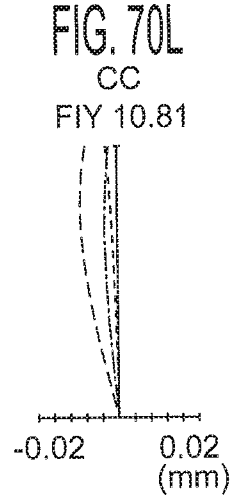
Figure 71A:
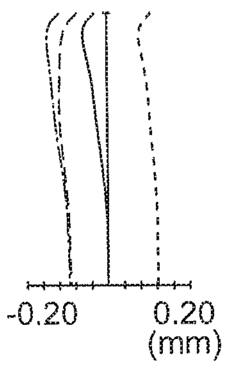
FIG. 71A, FIG. 71B, FIG. 71C, FIG. 71D, FIG. 71E, FIG. 71F, FIG. 71G, FIG. 71H, FIG. 71I, FIG. 71J, FIG. 71K, and FIG. 71L are aberration diagrams of the example 13.
Figure 71B:
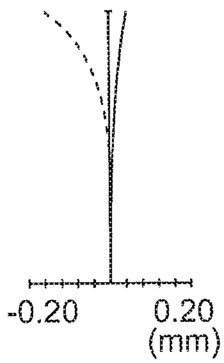
Figure 71C:
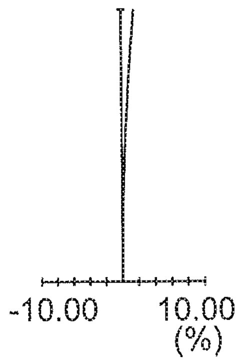
Figure 71D:
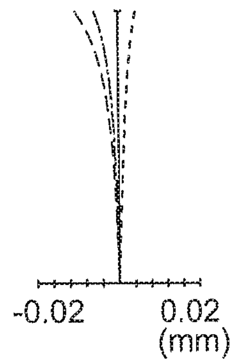
Figure 71E:
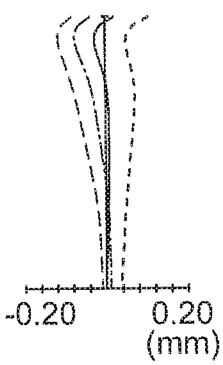
Figure 71F:
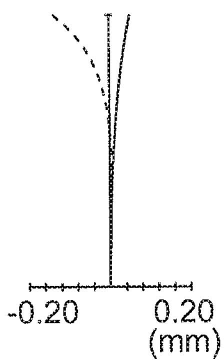
Figure 71G:
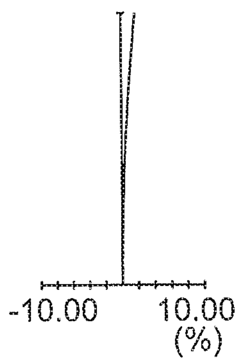
Figure 71H:
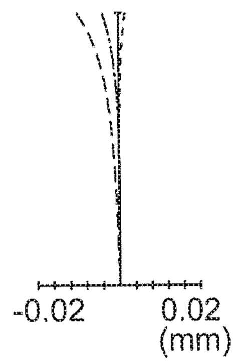
Figure 71I:
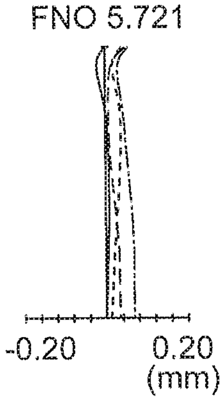
Figure 71J:
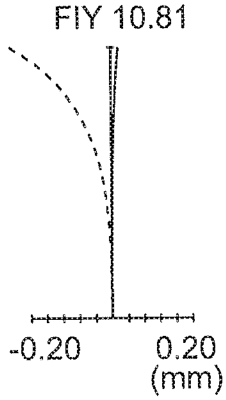
Figure 71K:
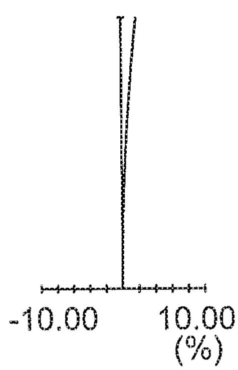
Figure 71L:
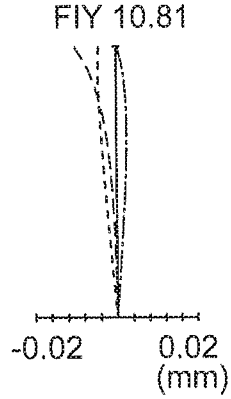
Figure 72A:
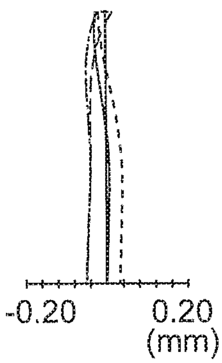
FIG. 72A, FIG. 72B, FIG. 72C, FIG. 72D, FIG. 72E, FIG. 72F, FIG. 72G, FIG. 72H, FIG. 72I, FIG. 72J, FIG. 72K, and FIG. 72L are aberration diagrams of the example 14.
Figure 72B:
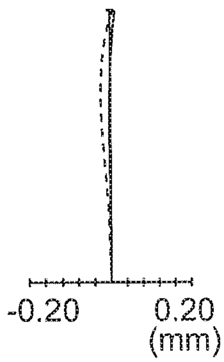
Figure 72C:
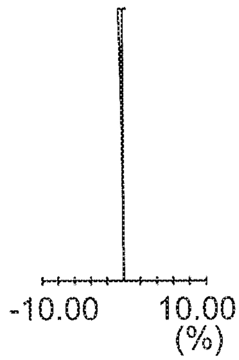
Figure 72D:
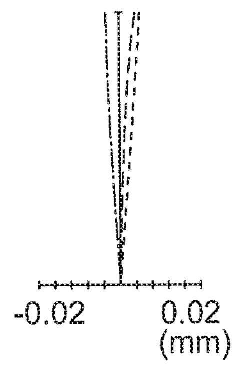
Figure 72E:
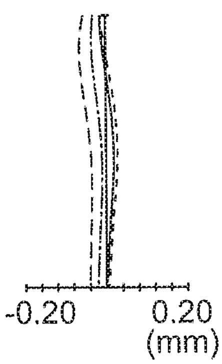
Figure 72F:
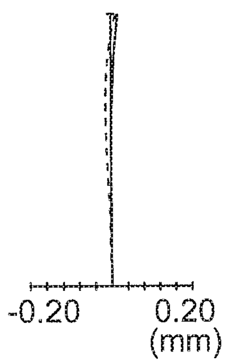
Figure 72G:
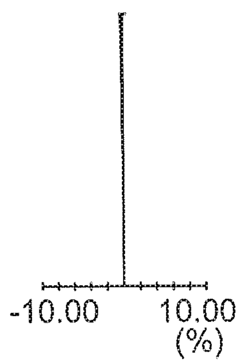
Figure 72H:
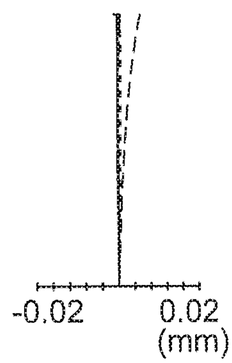
Figure 72I:
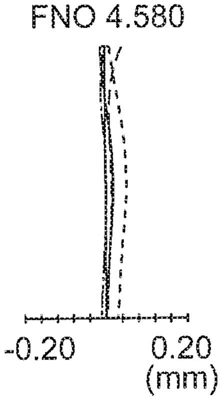
Figure 72J:
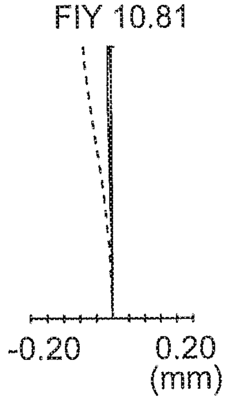
Figure 72K:
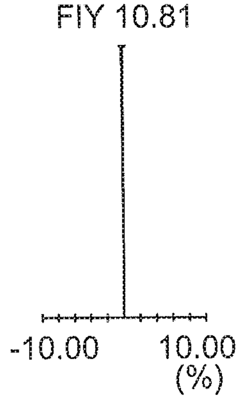
Figure 72L:
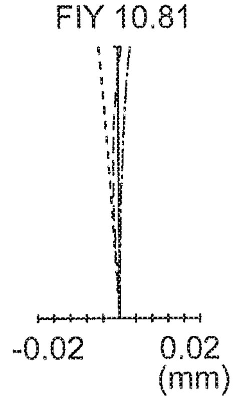
Figure 73A:
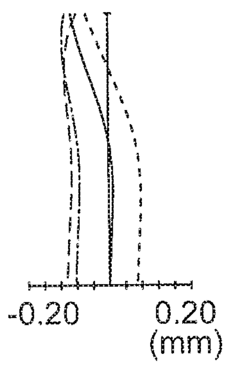
FIG. 73A, FIG. 73B, FIG. 73C, FIG. 73D, FIG. 73E, FIG. 73F, FIG. 73G, FIG. 73H, FIG. 73I, FIG. 73J, FIG. 73K, and FIG. 73L are aberration diagrams of the example 15.
Figure 73B:
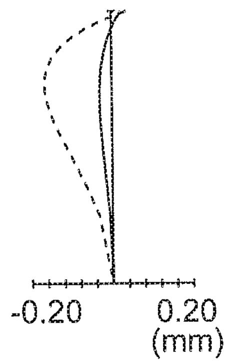
Figure 73C:
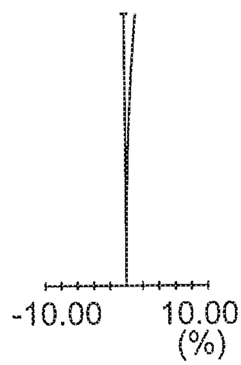
Figure 73D:
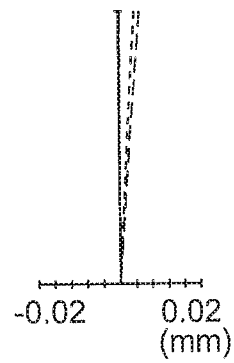
Figure 73E:
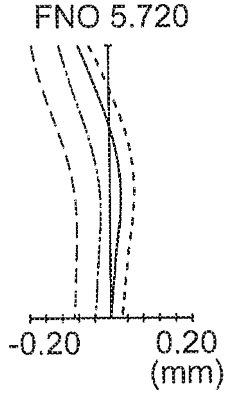
Figure 73F:
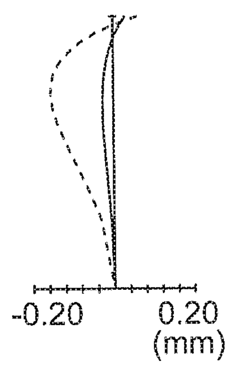
Figure 73G:
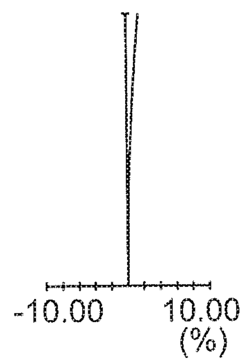
Figure 73H:
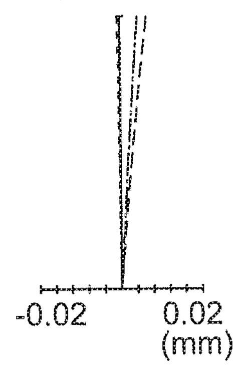
Figure 73I:
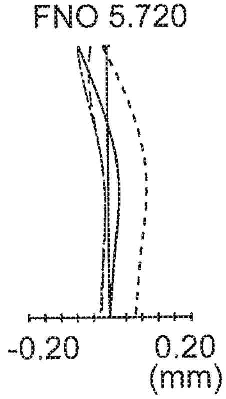
Figure 73J:
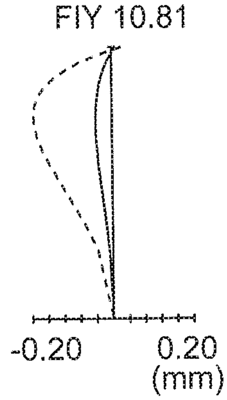
Figure 73K:
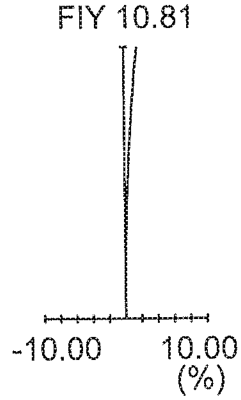
Figure 73L:
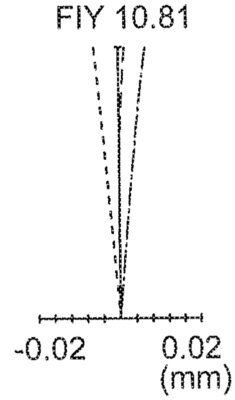
Figure 74A:
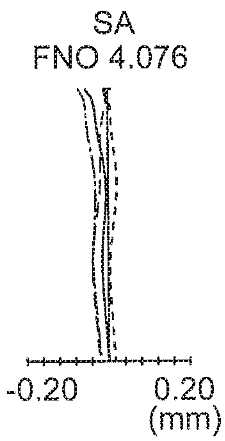
FIG. 74A, FIG. 74B, FIG. 74C, FIG. 74D, FIG. 74E, FIG. 74F, FIG. 74G, FIG. 74H, FIG. 74I, FIG. 74J, FIG. 74K, and FIG. 74L are aberration diagrams of the example 16.
Figure 74B:
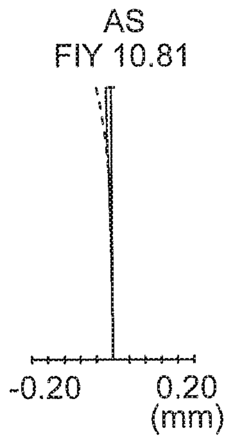
Figure 74C:
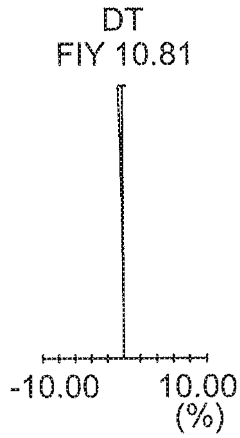
Figure 74D:
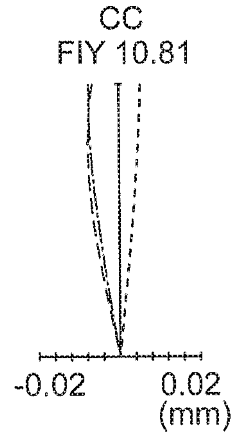
Figure 74E:
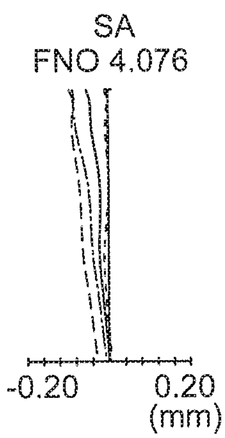
Figure 74F:
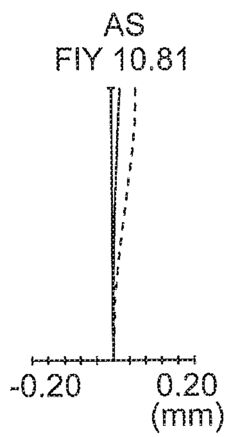
Figure 74G:
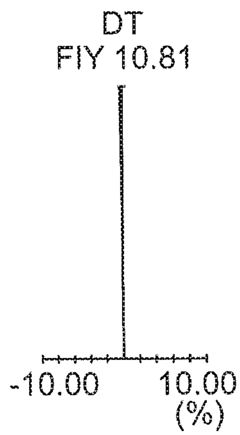
Figure 74H:
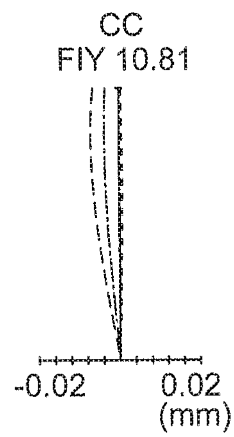
Figure 74I:
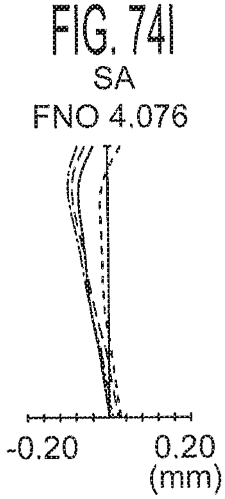
Figure 74J:
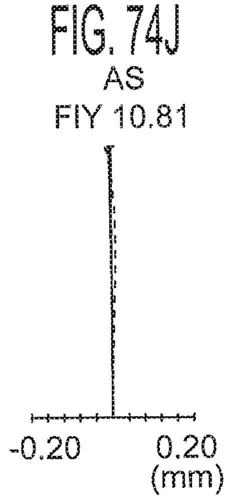
Figure 74K:
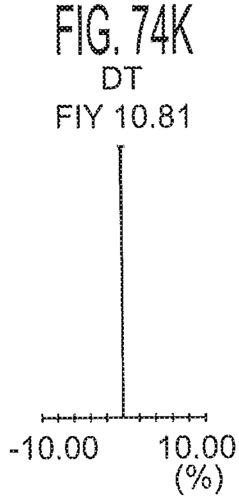
Figure 74L:
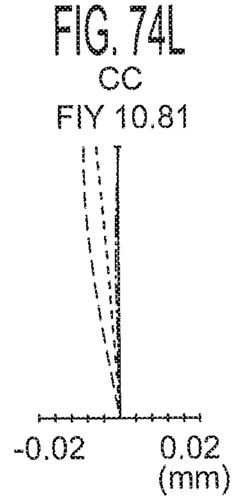
Figure 75A:
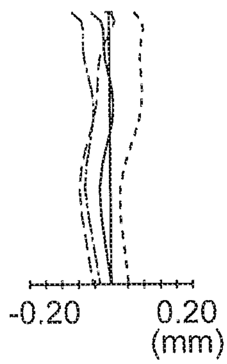
FIG. 75A, FIG. 75B, FIG. 75C, FIG. 75D, FIG. 75E, FIG. 75F, FIG. 75G, FIG. 75H, FIG. 75I, FIG. 75J, FIG. 75K, and FIG. 75L are aberration diagrams of the example 17.
Figure 75B:
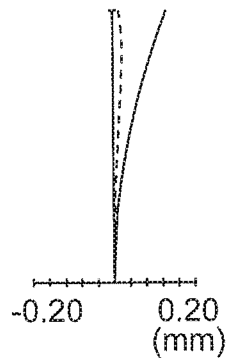
Figure 75C:
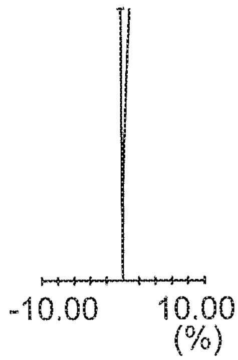
Figure 75D:
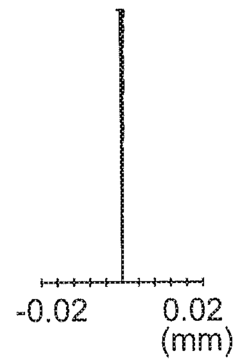
Figure 75E:
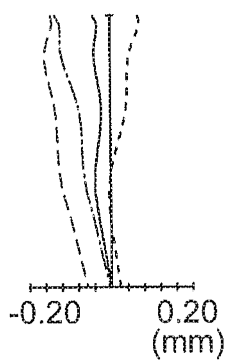
Figure 75F:
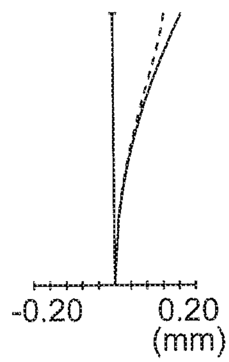
Figure 75G:
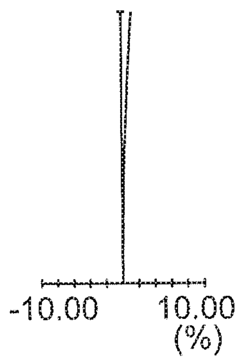
Figure 75H:
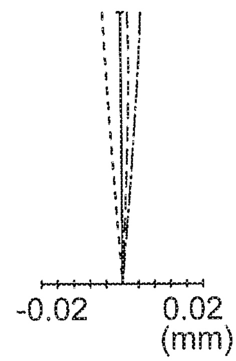
Figure 75I:
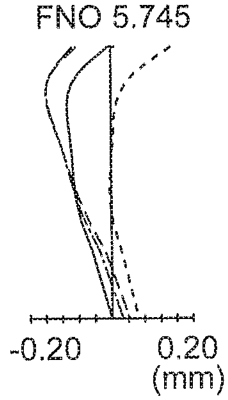
Figure 75J:
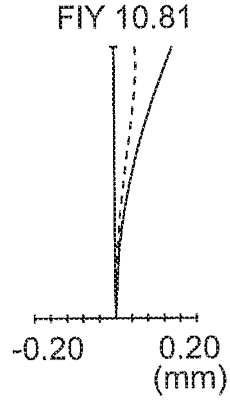
Figure 75K:
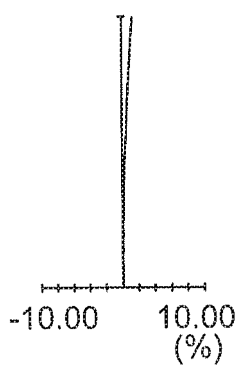
Figure 75L:
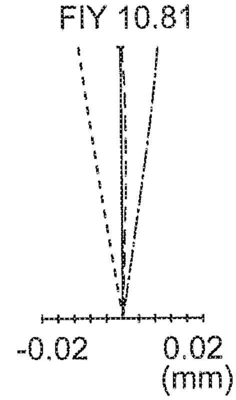
Figure 76A:
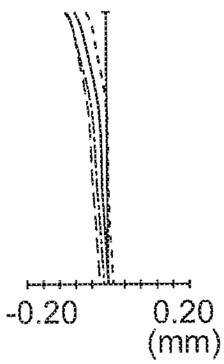
FIG. 76A, FIG. 76B, FIG. 76C, FIG. 76D, FIG. 76E, FIG. 76F, FIG. 76G, FIG. 76H, FIG. 76I, FIG. 76J, FIG. 76K, and FIG. 76L are aberration diagrams of the example 18.
Figure 76B:
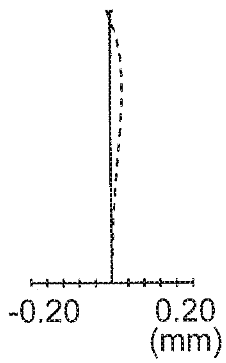
Figure 76C:
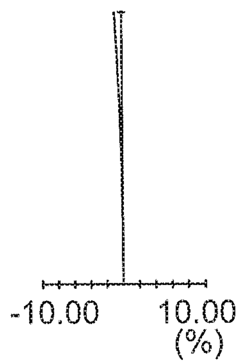
Figure 76D:
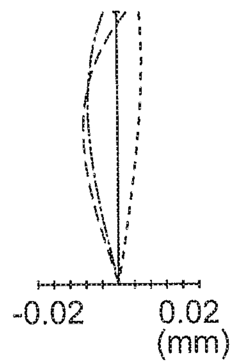
Figure 76E:
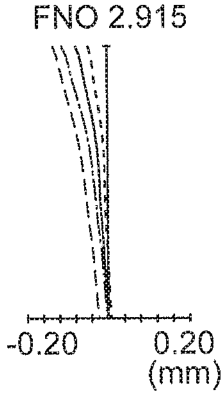
Figure 76F:
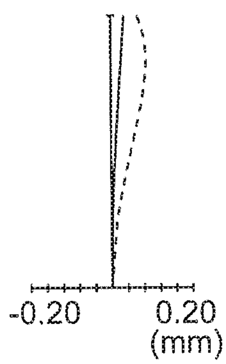
Figure 76G:
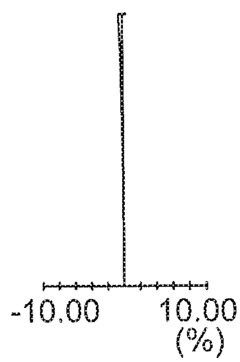
Figure 76H:
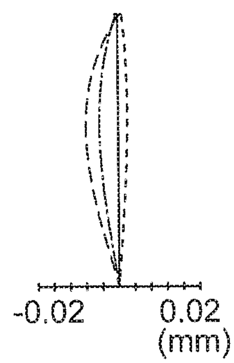
Figure 76I:
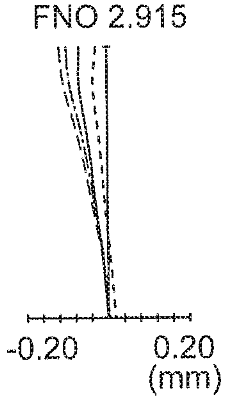
Figure 76J:
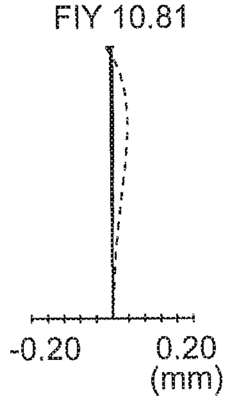
Figure 76K:
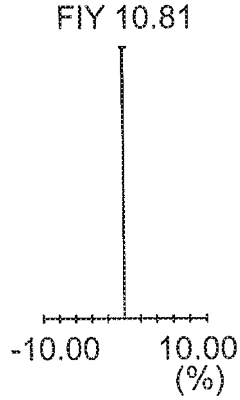
Figure 76L:
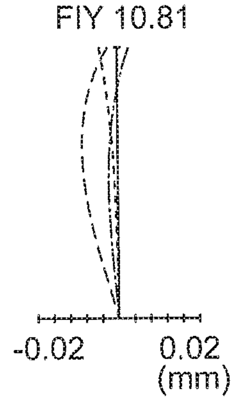
Figure 77A:
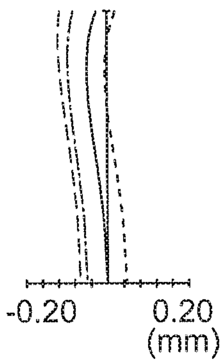
FIG. 77A, FIG. 77B, FIG. 77C, FIG. 77D, FIG. 77E, FIG. 77F, FIG. 77G, FIG. 77H, FIG. 77I, FIG. 77J, FIG. 77K, and FIG. 77L are aberration diagrams of the example 19.
Figure 77B:
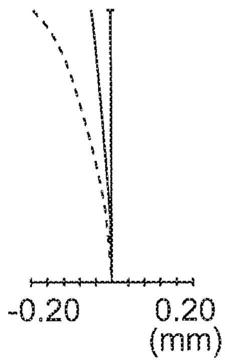
Figure 77C:
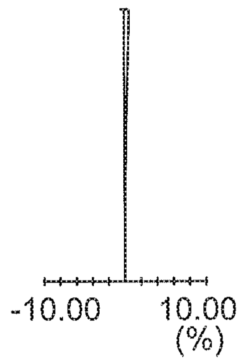
Figure 77D:
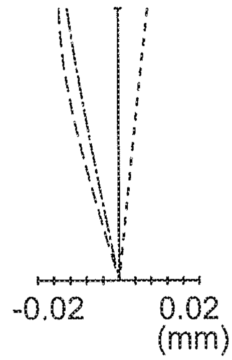
Figure 77E:
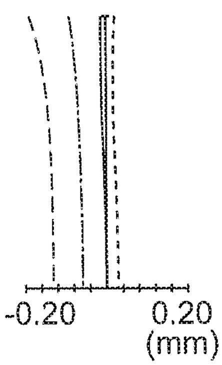
Figure 77F:
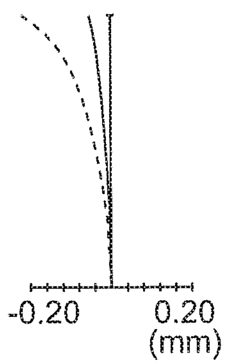
Figure 77G:
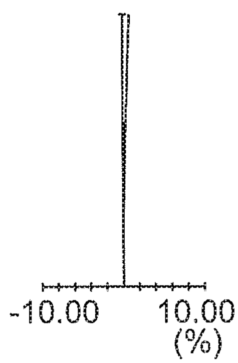
Figure 77H:
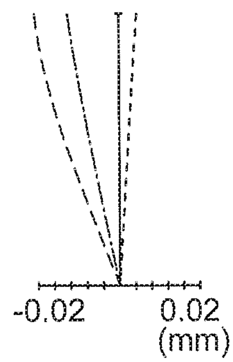
Figure 77I:
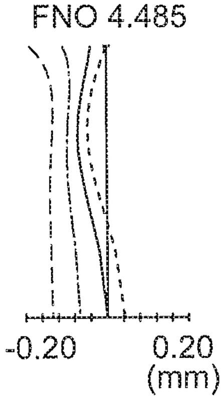
Figure 77J:
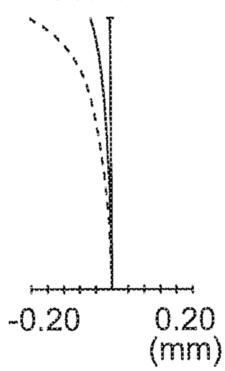
Figure 77K:
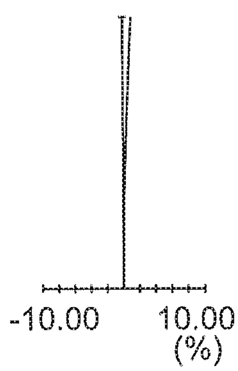
Figure 77L:
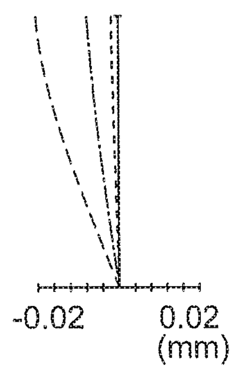
Figure 78A:
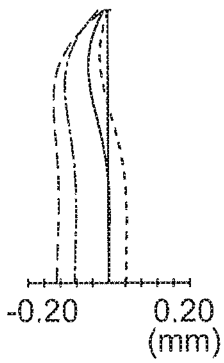
FIG. 78A, FIG. 78B, FIG. 78C, FIG. 78D, FIG. 78E, FIG. 78F, FIG. 78G, FIG. 78H, FIG. 78I, FIG. 78J, FIG. 78K, and FIG. 78L are aberration diagrams of the example 20.
Figure 78B:
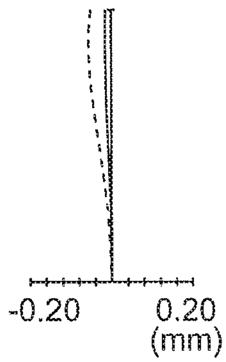
Figure 78C:
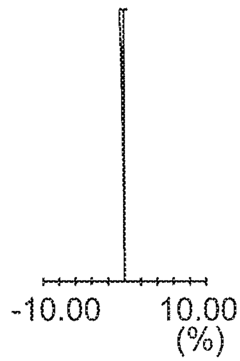
Figure 78D:
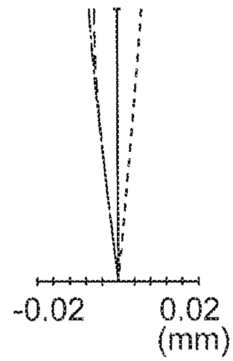
Figure 78E:
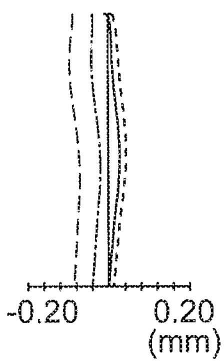
Figure 78F:
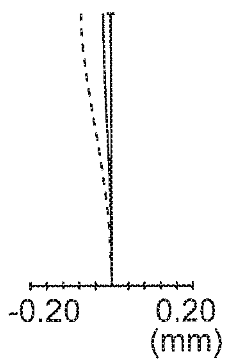
Figure 78G:
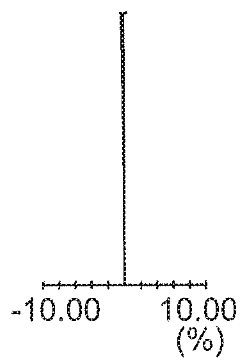
Figure 78H:
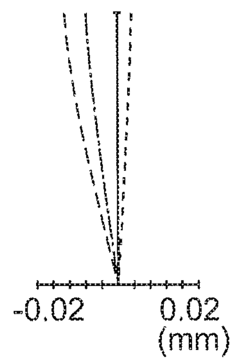
Figure 78I:
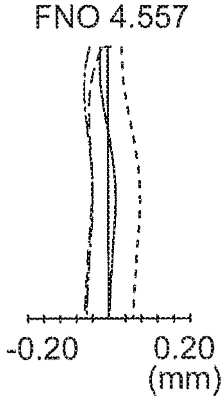
Figure 78J:
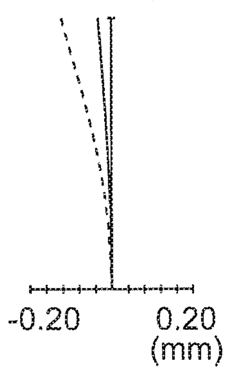
Figure 78K:
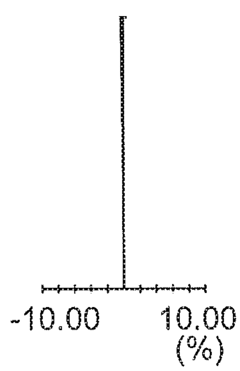
Figure 78L:
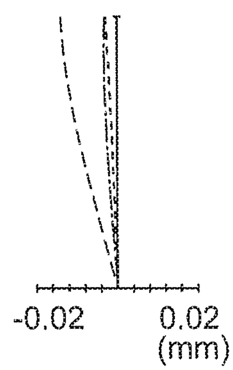
Figure 79A:
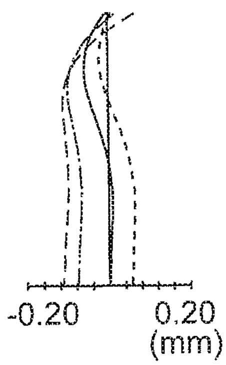
FIG. 79A, FIG. 79B, FIG. 79C, FIG. 79D, FIG. 79E, FIG. 79F, FIG. 79G, FIG. 79H, FIG. 79I, FIG. 79J, FIG. 79K, and FIG. 79L are aberration diagrams of the example 21.
Figure 79B:
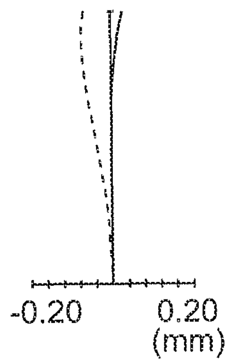
Figure 79C:
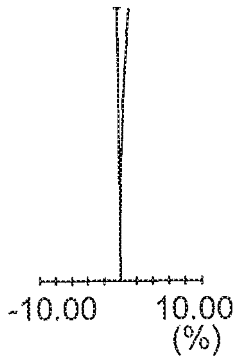
Figure 79D:
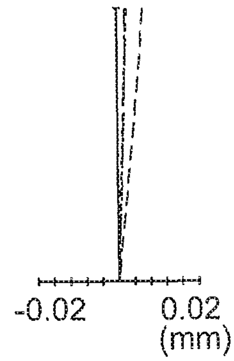
Figure 79E:
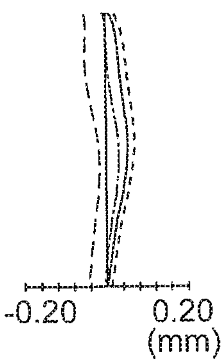
Figure 79F:
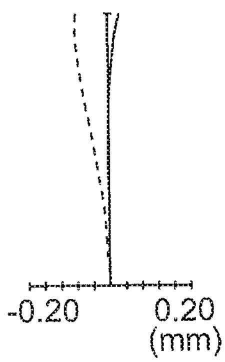
Figure 79G:
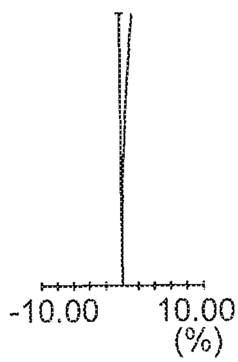
Figure 79H:
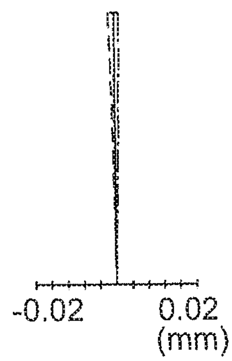
Figure 79I:
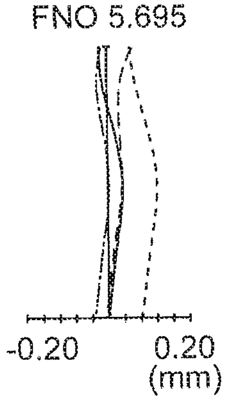
Figure 79J:
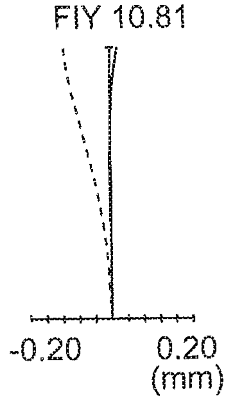
Figure 79K:
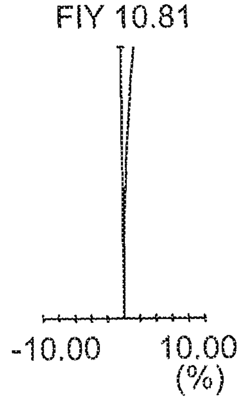
Figure 79L:
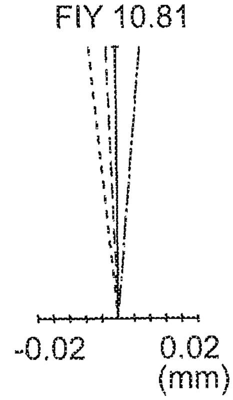
Figure 80A:
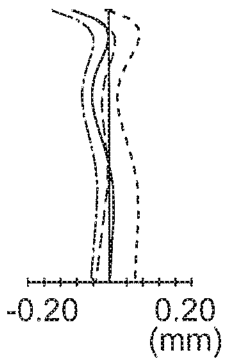
FIG. 80A, FIG. 80B, FIG. 80C, FIG. 80D, FIG. 80E, FIG. 80F, FIG. 80G, FIG. 80H, FIG. 80I, FIG. 80J, FIG. 80K, and FIG. 80L are aberration diagrams of the example 22.
Figure 80B:
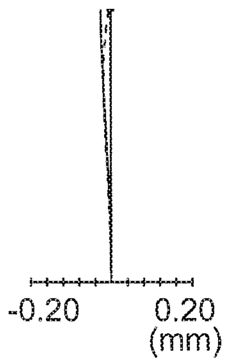
Figure 80C:
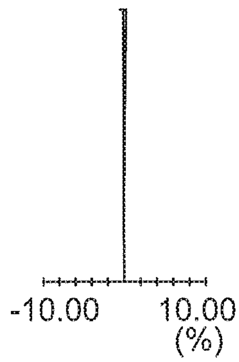
Figure 80D:
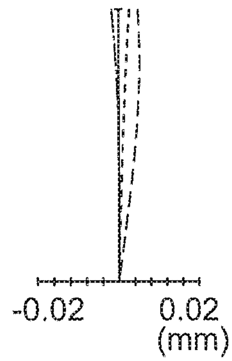
Figure 80E:
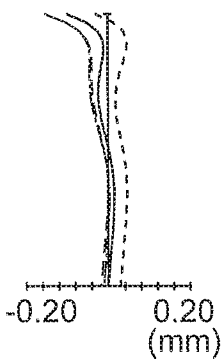
Figure 80F:
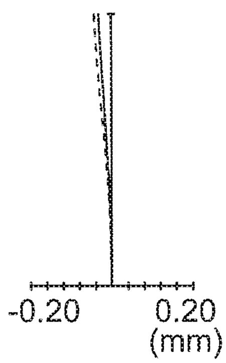
Figure 80G:
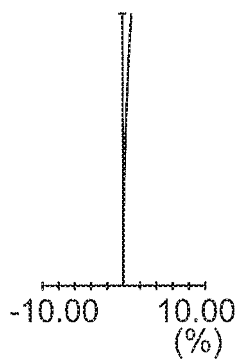
Figure 80H:
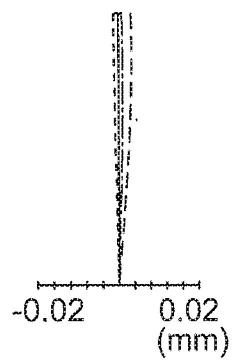
Figure 80I:
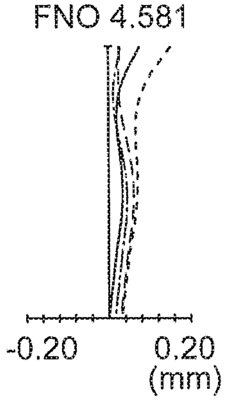
Figure 80J:
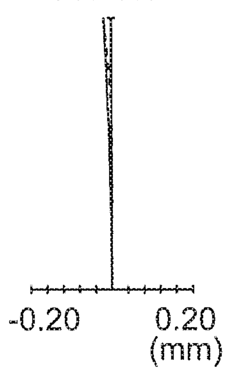
Figure 80K:
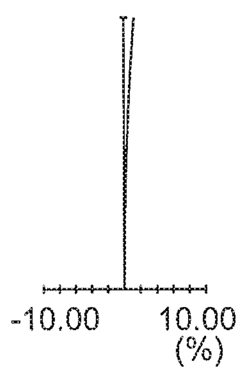
Figure 80L:
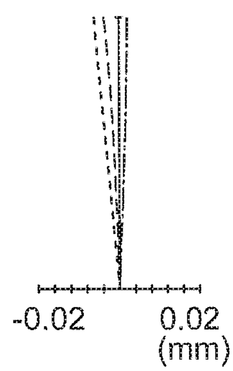
Figure 81A:
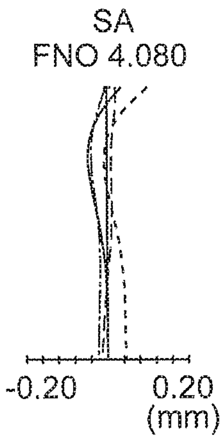
FIG. 81A, FIG. 81B, FIG. 81C, FIG. 81D, FIG. 81E, FIG. 81F, FIG. 81G, FIG. 81H, FIG. 81I, FIG. 81J, FIG. 81K, and FIG. 81L are aberration diagrams of the example 23.
Figure 81B:
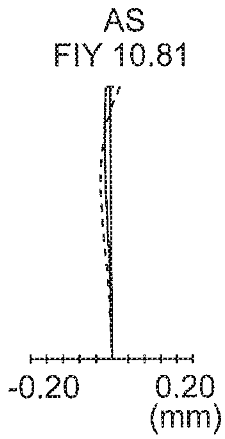
Figure 81C:
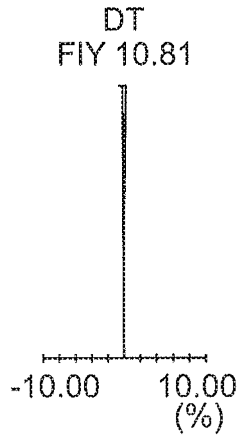
Figure 81D:
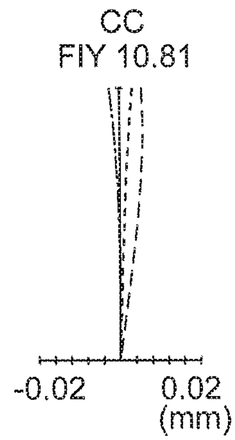
Figure 81E:
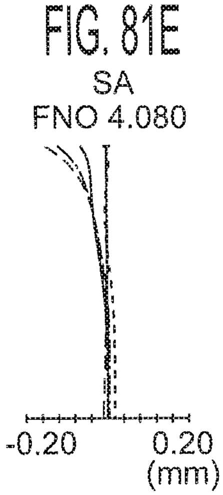
Figure 81F:
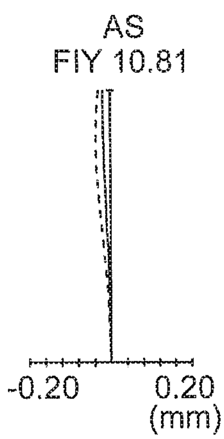
Figure 81G:
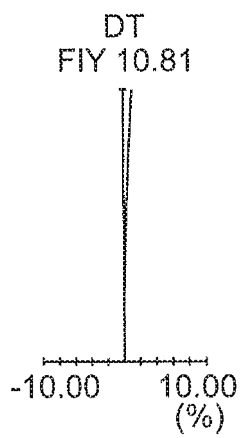
Figure 81H:
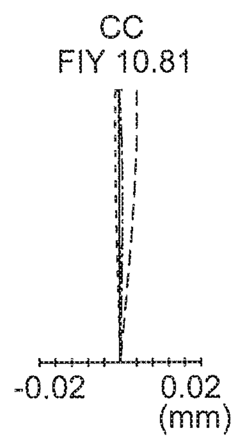
Figure 81I:
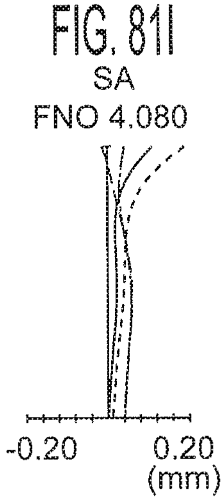
Figure 81J:
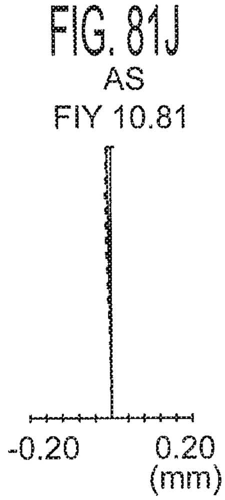
Figure 81K:
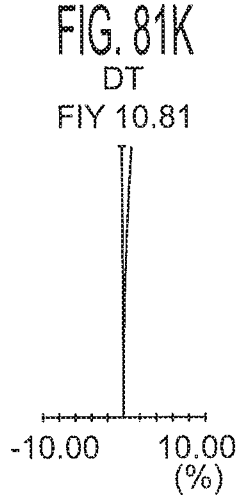
Figure 81L:
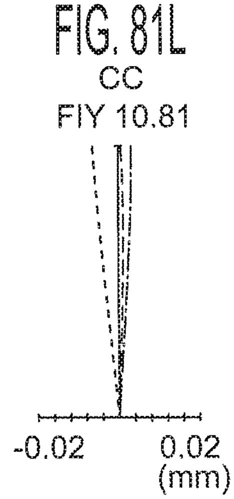
Figure 82A:
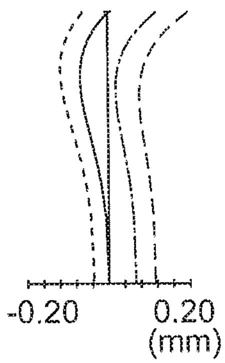
FIG. 82A, FIG. 82B, FIG. 82C, FIG. 82D, FIG. 82E, FIG. 82F, FIG. 82G, FIG. 82H, FIG. 82I, FIG. 82J, FIG. 82K, and FIG. 82L are aberration diagrams of the example 24.
Figure 82B:
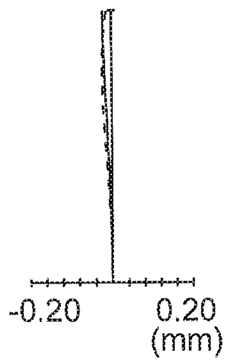
Figure 82C:
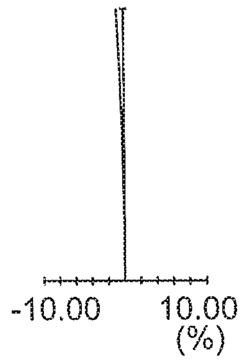
Figure 82D:
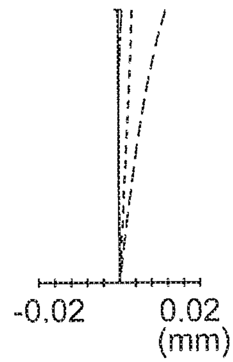
Figure 82E:
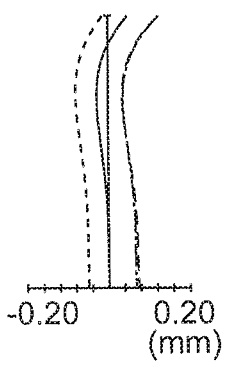
Figure 82F:
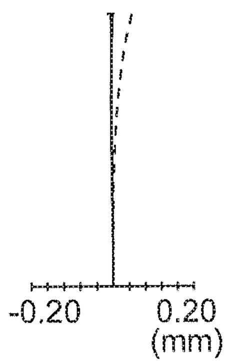
Figure 82G:
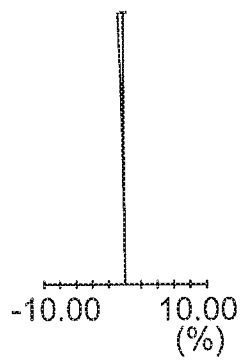
Figure 82H:
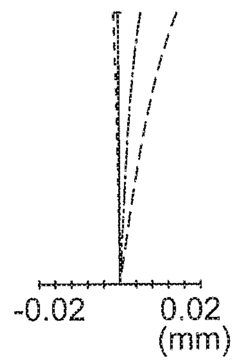
Figure 82I:
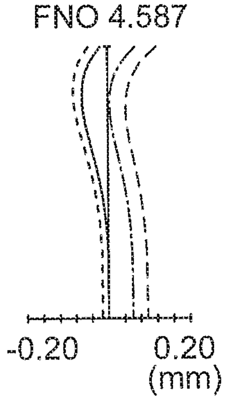
Figure 82J:
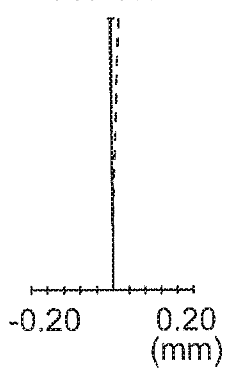
Figure 82K:
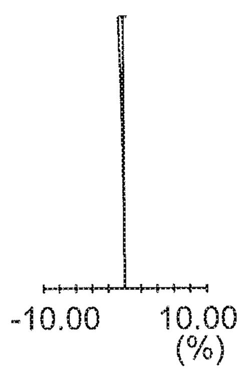
Figure 82L:
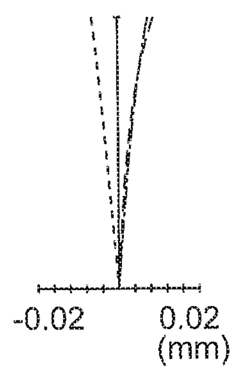
Figure 83A:
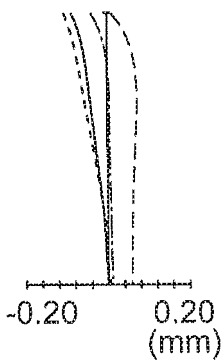
FIG. 83A, FIG. 83B, FIG. 83C, FIG. 83D, FIG. 83E, FIG. 83F, FIG. 83G, FIG. 83H, FIG. 83I, FIG. 83J, FIG. 83K, and FIG. 83L are aberration diagrams of the example 25.
Figure 83B:
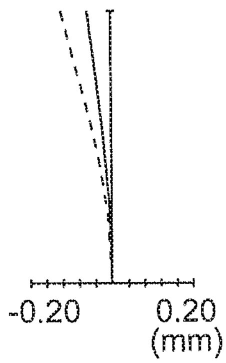
Figure 83C:
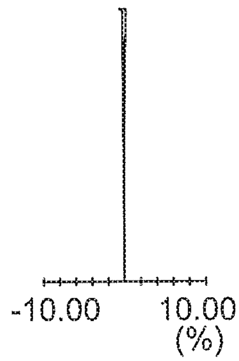
Figure 83D:
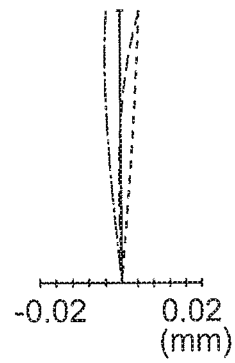
Figure 83E:
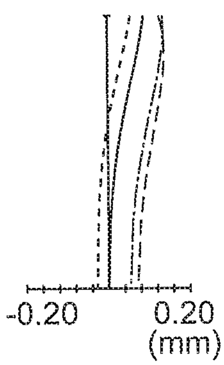
Figure 83F:
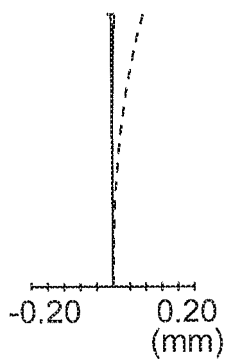
Figure 83G:
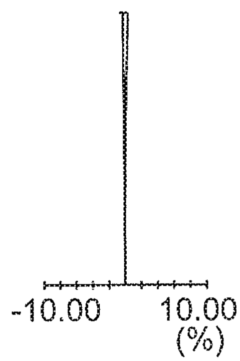
Figure 83H:
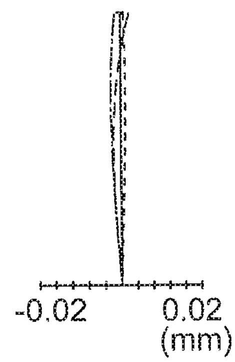
Figure 83I:
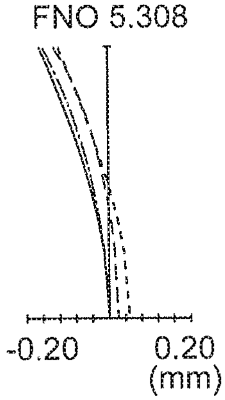
Figure 83J:
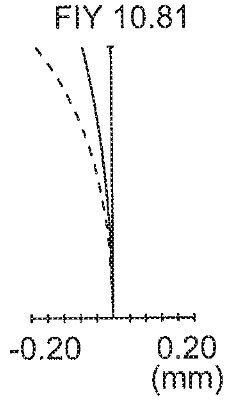
Figure 83K:
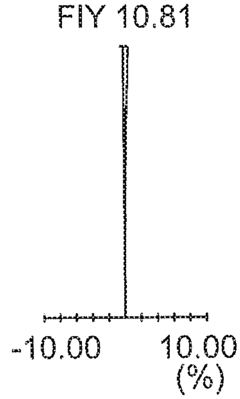
Figure 83L:
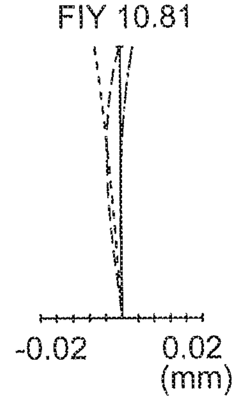
Figure 84A:
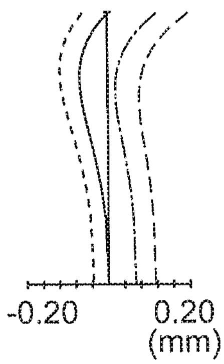
FIG. 84A, FIG. 84B, FIG. 84C, FIG. 84D, FIG. 84E, FIG. 84F, FIG. 84G, FIG. 84H, FIG. 84I, FIG. 84J, FIG. 84K, and FIG. 84L are aberration diagrams of the example 26.
Figure 84B:
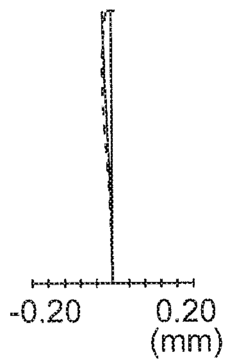
Figure 84C:
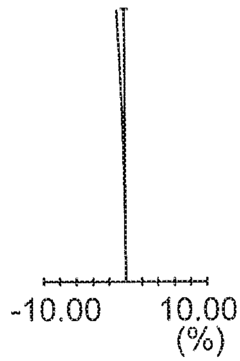
Figure 84D:
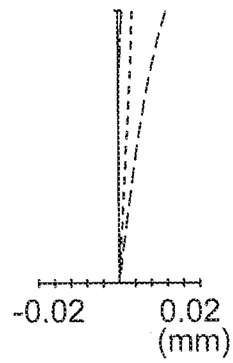
Figure 84E:
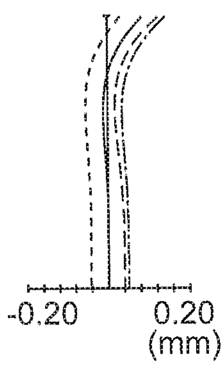
Figure 84F:
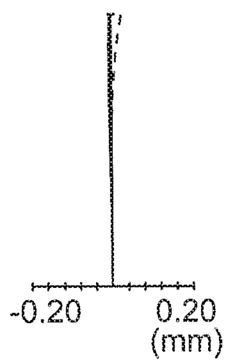
Figure 84G:
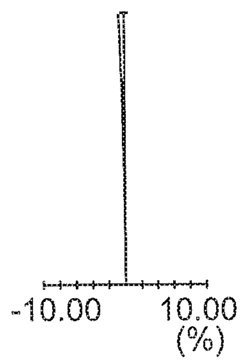
Figure 84H:
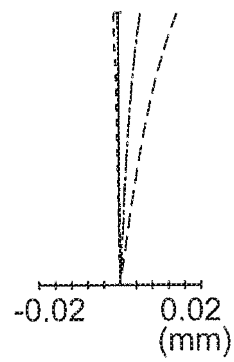
Figure 84I:
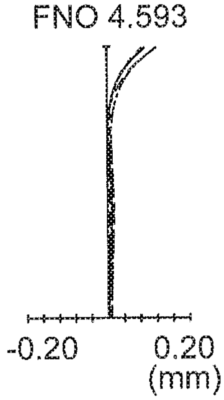
Figure 84J:
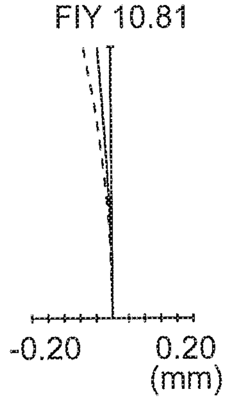
Figure 84K:
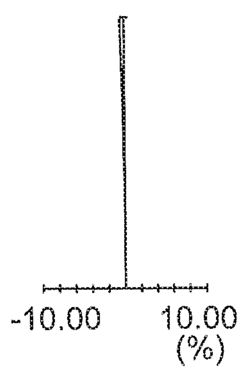
Figure 84L:
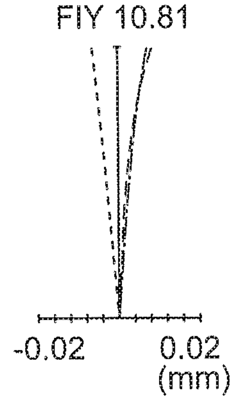
Figure 85A:
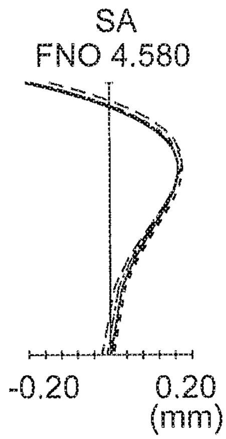
FIG. 85A, FIG. 85B, FIG. 85C, FIG. 85D, FIG. 85E, FIG. 85F, FIG. 85G, FIG. 85H, FIG. 85I, FIG. 85J, FIG. 85K, and FIG. 85L are aberration diagrams of the example 27.
Figure 85B:
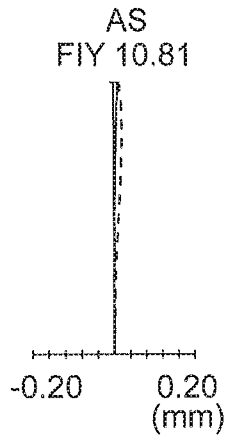
Figure 85C:
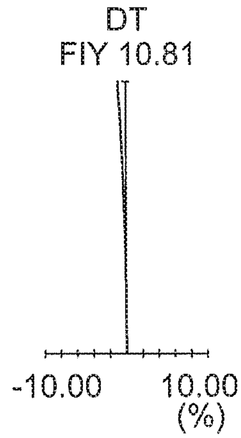
Figure 85D:
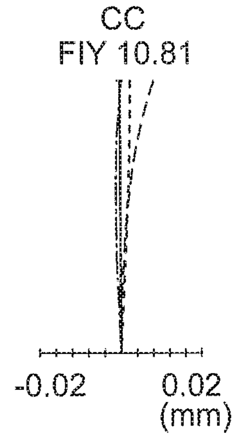
Figure 85E:
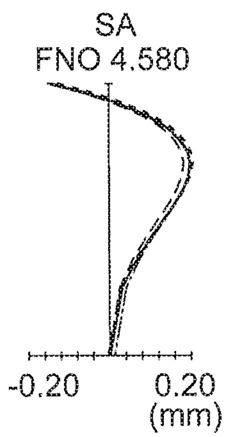
Figure 85F:
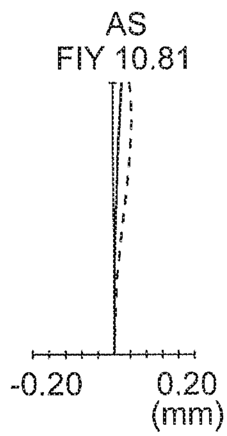
Figure 85G:
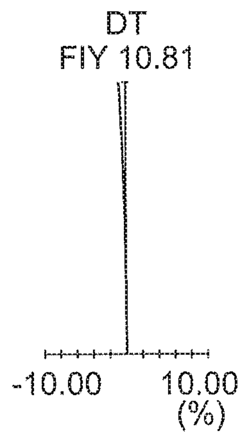
Figure 85H:
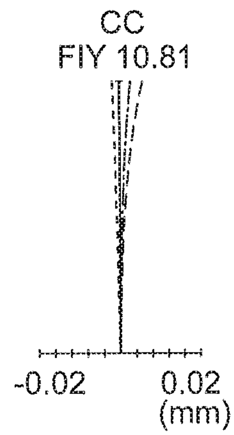
Figure 85I:
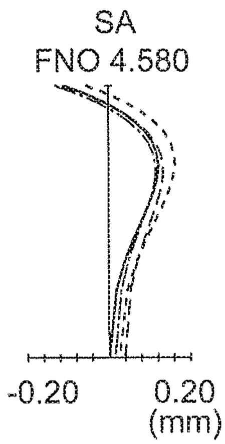
Figure 85J:
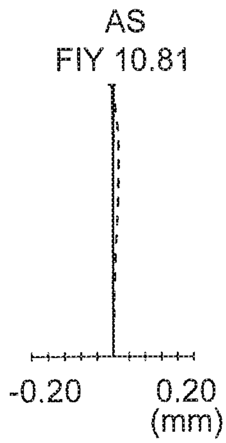
Figure 85K:
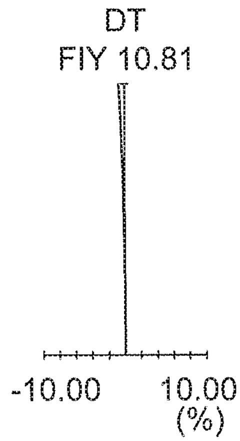
Figure 85L:
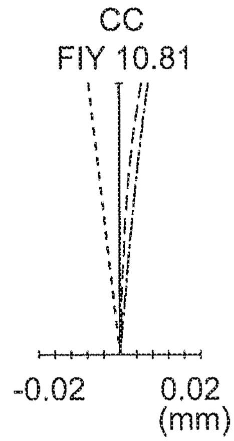
Figure 86A:
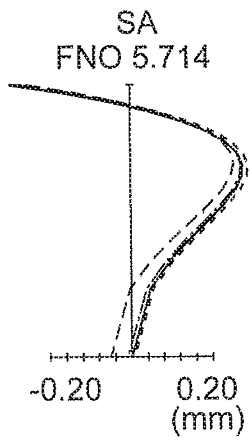
FIG. 86A, FIG. 86B, FIG. 86C, FIG. 86D, FIG. 86E, FIG. 86F, FIG. 86G, FIG. 86H, FIG. 86I, FIG. 86J, FIG. 86K, and FIG. 86L are aberration diagrams of the example 28.
Figure 86B:
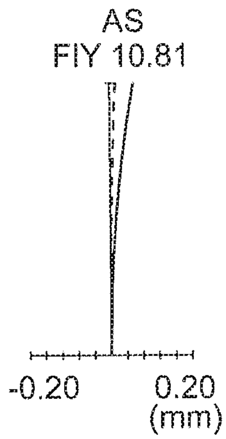
Figure 86C:
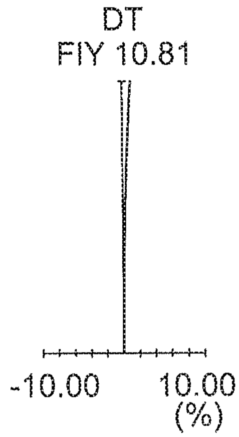
Figure 86D:
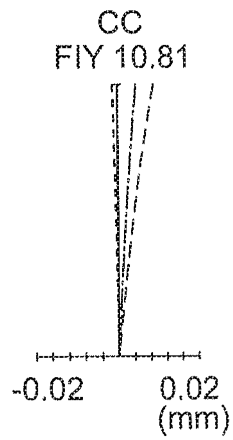
Figure 86E:
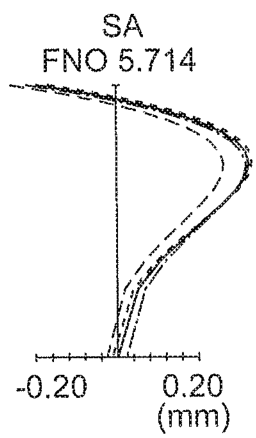
Figure 86F:
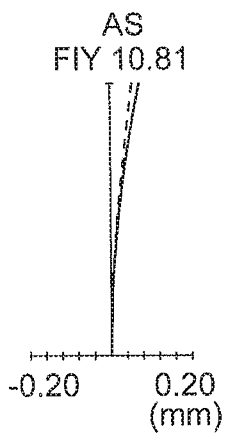
Figure 86G:
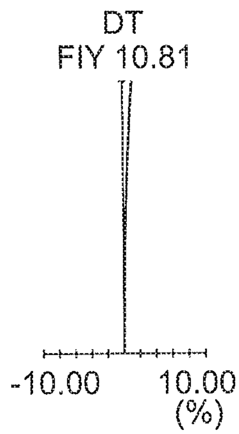
Figure 86H:
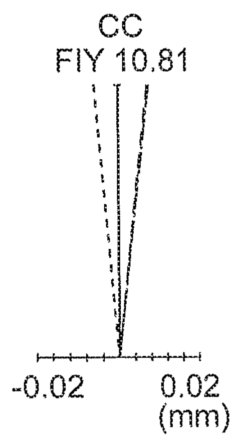
Figure 86I:
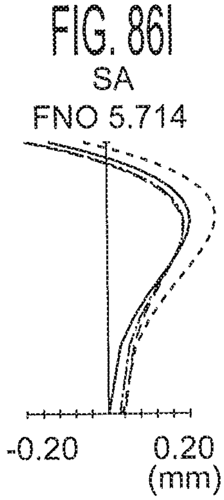
Figure 86J:
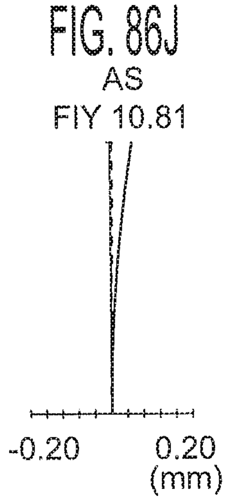
Figure 86K:
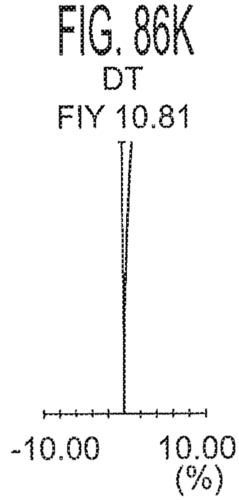
Figure 86L:
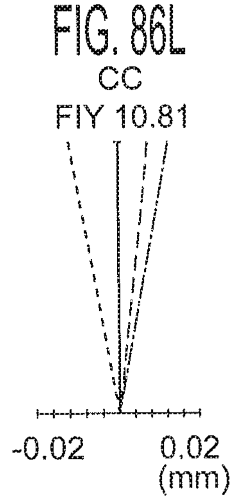
Figure 87A:
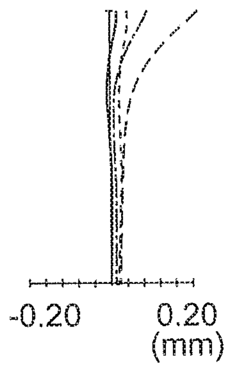
FIG. 87A, FIG. 87B, FIG. 87C, FIG. 87D, FIG. 87E, FIG. 87F, FIG. 87G, FIG. 87H, FIG. 87I, FIG. 87J, FIG. 87K, and FIG. 87L are aberration diagrams of the example 29.
Figure 87B:
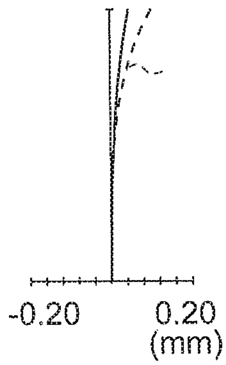
Figure 87C:
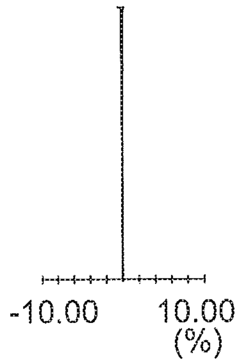
Figure 87D:
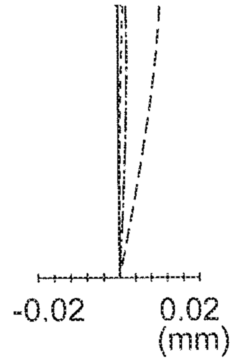
Figure 87E:
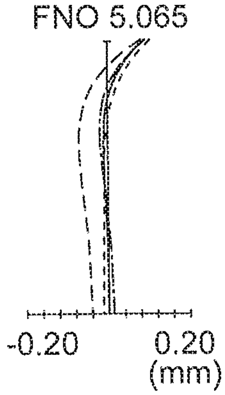
Figure 87F:
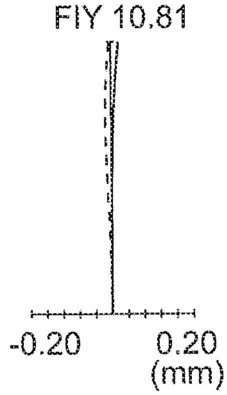
Figure 87G:
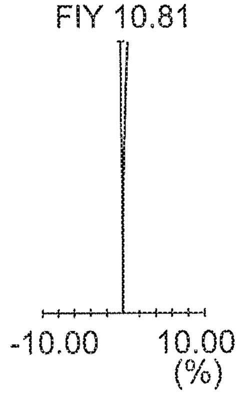
Figure 87H:
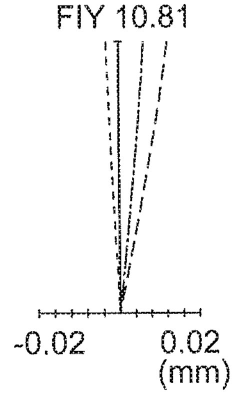
Figure 87I:
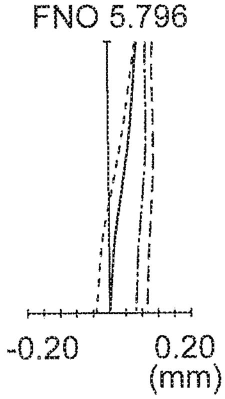
Figure 87J:
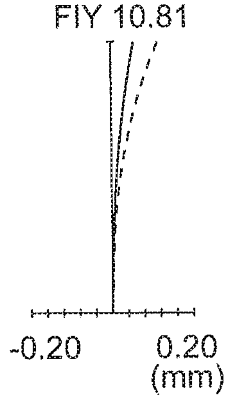
Figure 87K:
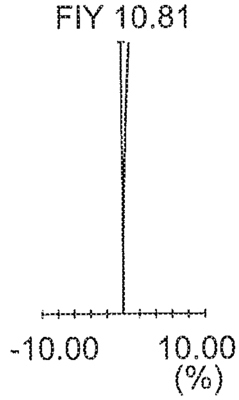
Figure 87L:
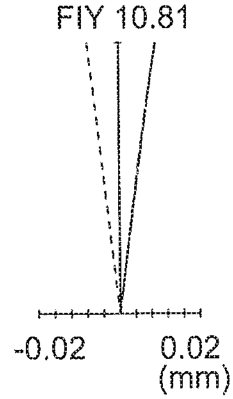
Figure 88A:
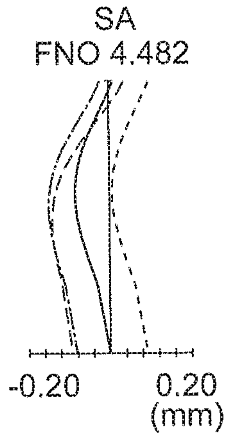
FIG. 88A, FIG. 88B, FIG. 88C, FIG. 88D, FIG. 88E, FIG. 88F, FIG. 88G, FIG. 88H, FIG. 88I, FIG. 88J, FIG. 88K, and FIG. 88L are aberration diagrams of the example 30.
Figure 88B:
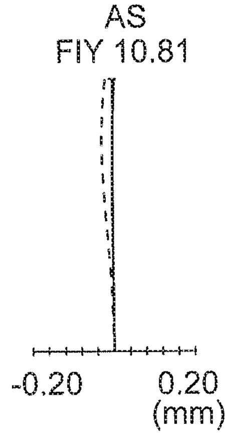
Figure 88C:
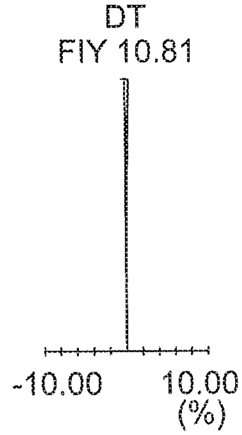
Figure 88D:
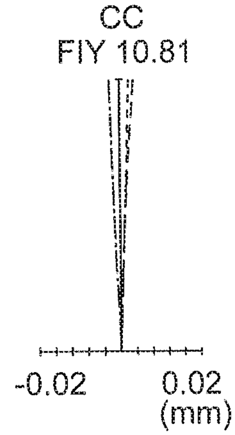
Figure 88E:
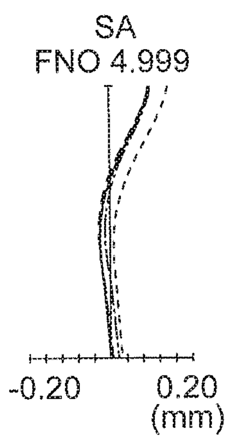
Figure 88F:
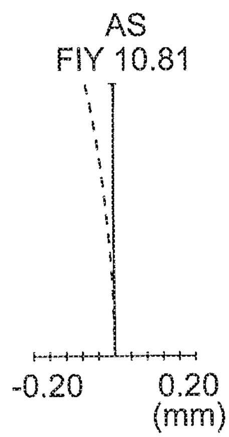
Figure 88G:
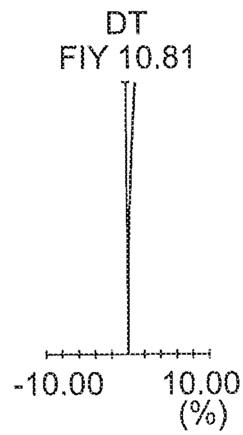
Figure 88H:
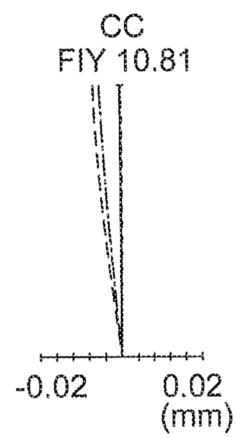
Figure 88I:
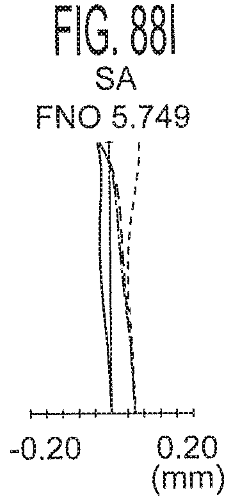
Figure 88J:
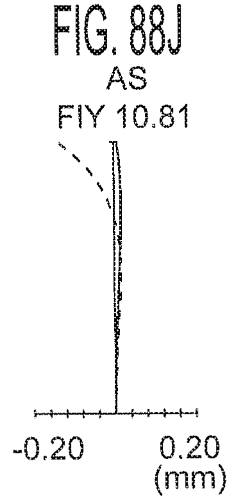
Figure 88K:
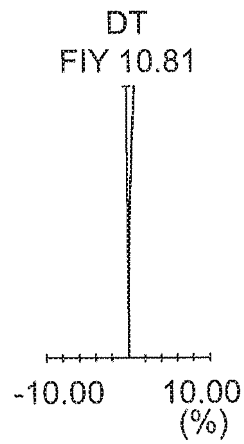
Figure 88L:
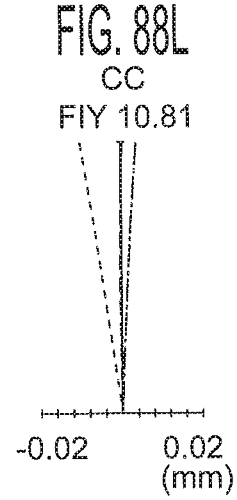
Figure 89A:
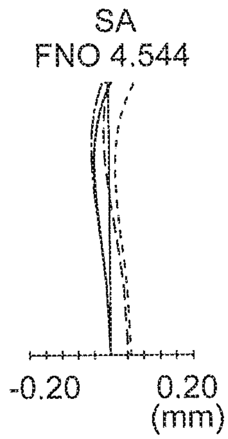
FIG. 89A, FIG. 89B, FIG. 89C, FIG. 89D, FIG. 89E, FIG. 89F, FIG. 89G, FIG. 89H, FIG. 89I, FIG. 89J, FIG. 89K, and FIG. 89L are aberration diagrams of the example 31.
Figure 89B:
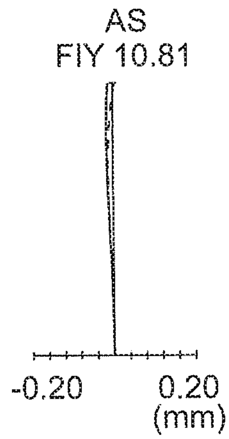
Figure 89C:
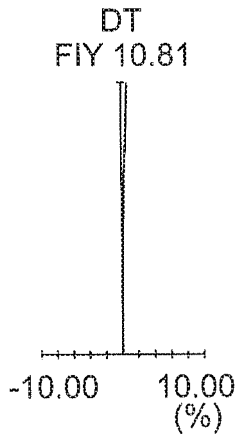
Figure 89D:
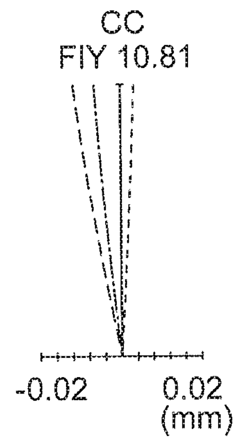
Figure 89E:
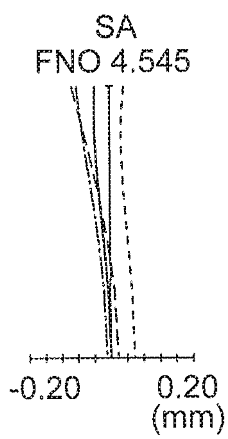
Figure 89F:
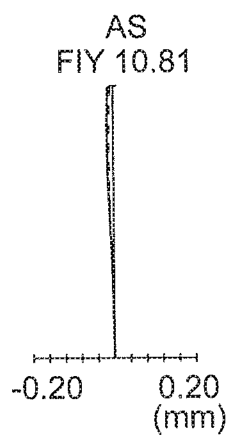
Figure 89G:
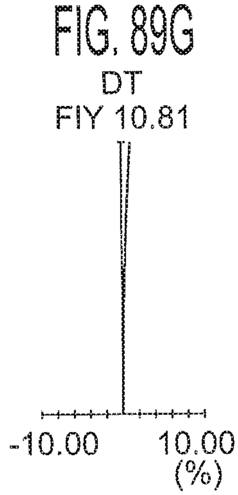
Figure 89H:
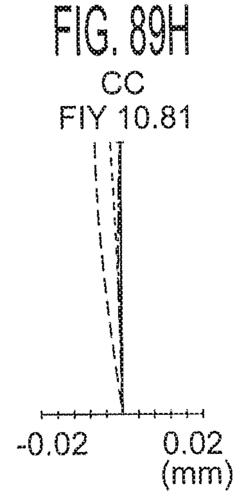
Figure 89I:
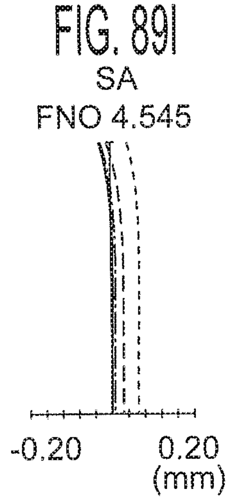
Figure 89J:
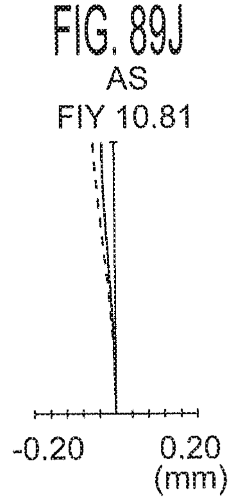
Figure 89K:
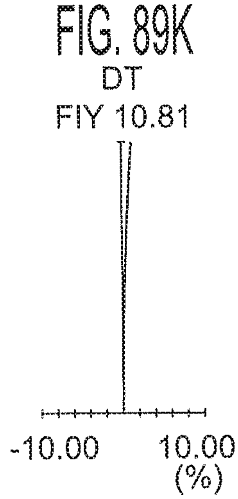
Figure 89L:
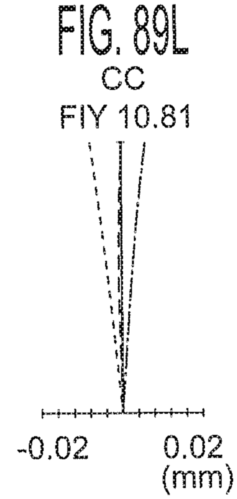
Figure 90A:
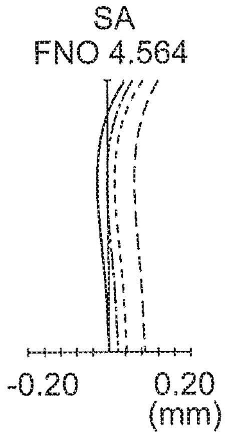
FIG. 90A, FIG. 90B, FIG. 90C, FIG. 90D, FIG. 90E, FIG. 90F, FIG. 90G, FIG. 90H, FIG. 90I, FIG. 90J, FIG. 90K, and FIG. 90L are aberration diagrams of the example 32.
Figure 90B:
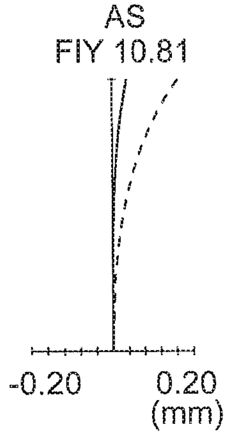
Figure 90C:
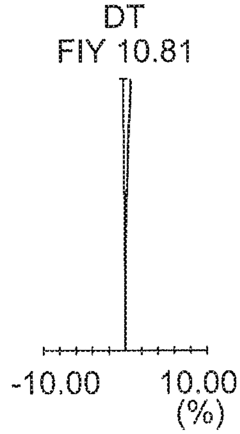
Figure 90D:
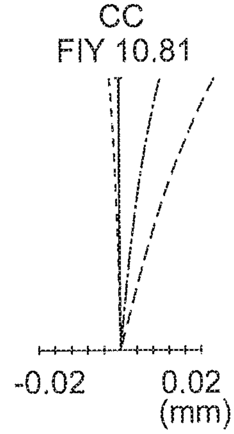
Figure 90E:
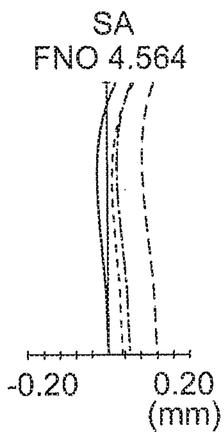
Figure 90F:
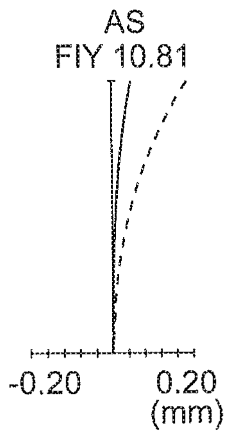
Figure 90G:
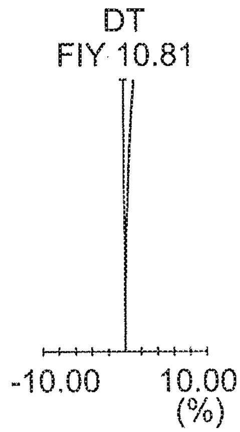
Figure 90H:
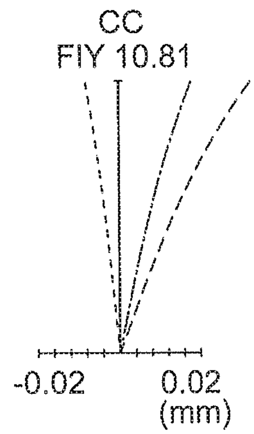
Figure 90I:
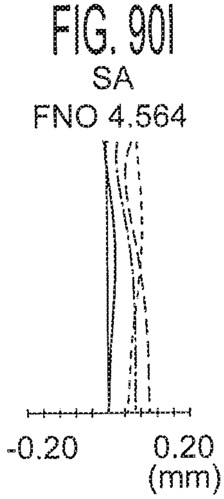
Figure 90J:
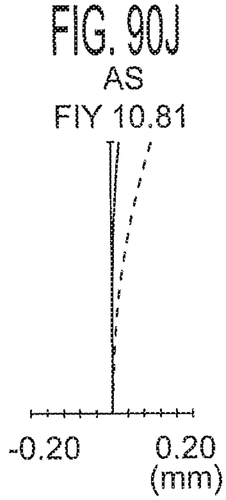
Figure 90K:
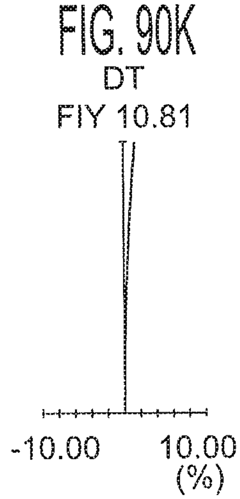
Figure 90L:
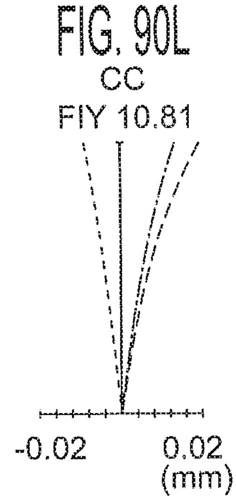
Figure 91A:
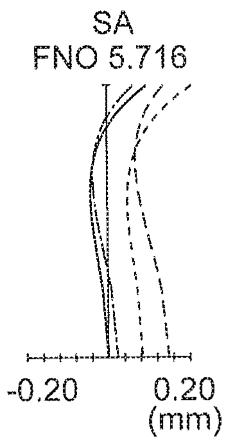
FIG. 91A, FIG. 91B, FIG. 91C, FIG. 91D, FIG. 91E, FIG. 91F, FIG. 91G, FIG. 91H, FIG. 91I, FIG. 91J, FIG. 91K, and FIG. 91L are aberration diagrams of the example 33.
Figure 91B:
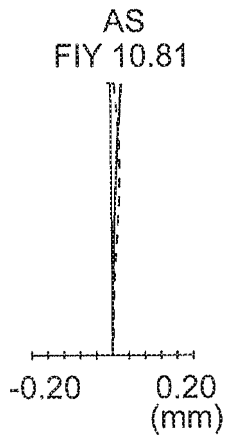
Figure 91C:
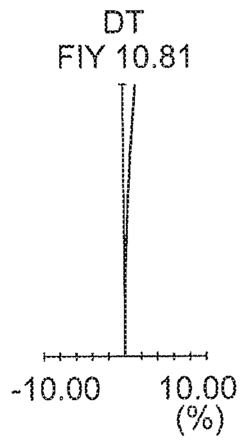
Figure 91D:
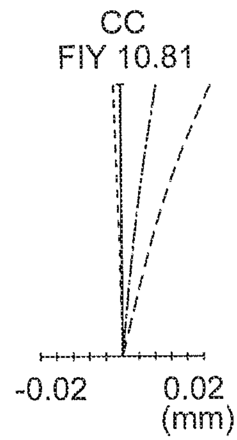
Figure 91E:
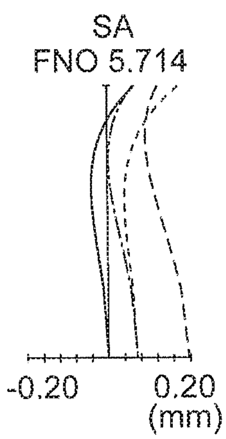
Figure 91F:
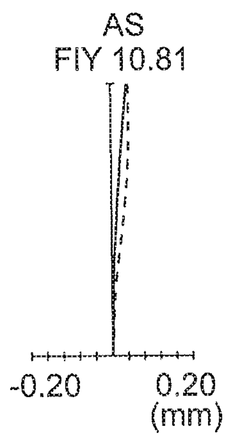
Figure 91G:
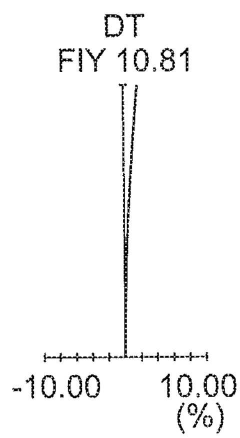
Figure 91H:
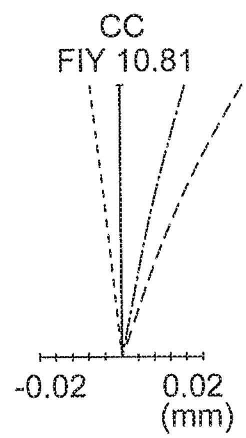
Figure 91I:
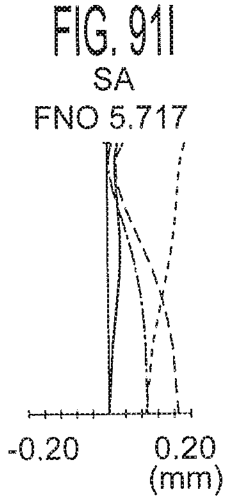
Figure 91J:
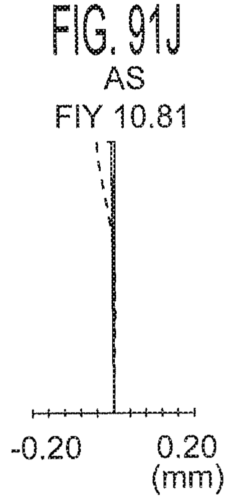
Figure 91K:
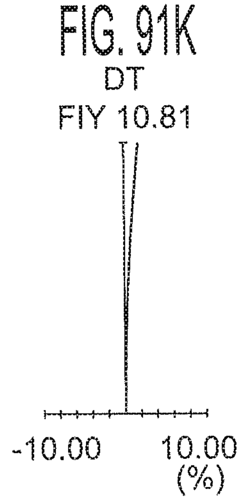
Figure 91L:
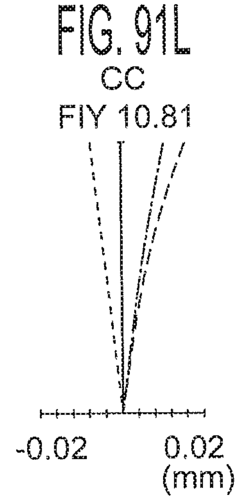
Figure 92A:
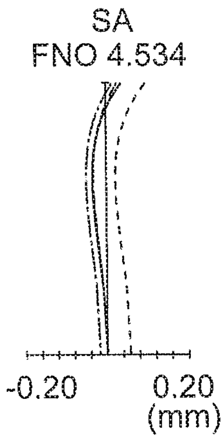
FIG. 92A, FIG. 92B, FIG. 92C, FIG. 92D, FIG. 92E, FIG. 92F, FIG. 92G, FIG. 92H, FIG. 92I, FIG. 92J, FIG. 92K, and FIG. 92L are aberration diagrams of the example 34.
Figure 92B:
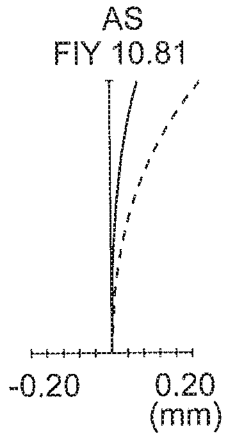
Figure 92C:
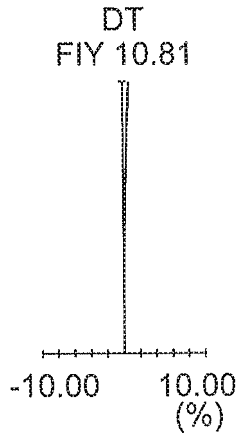
Figure 92D:
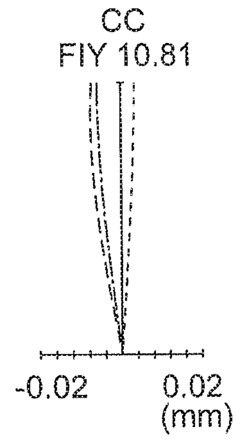
Figure 92E:
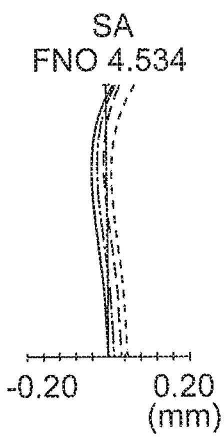
Figure 92F:
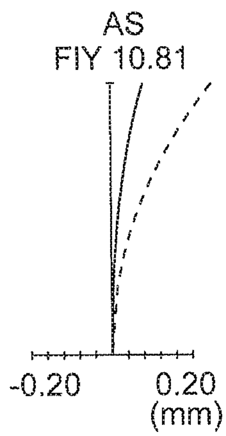
Figure 92G:
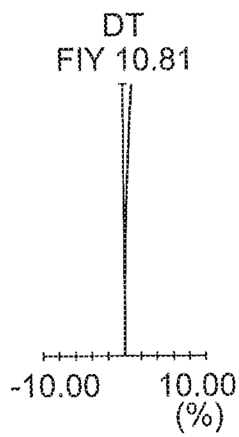
Figure 92H:
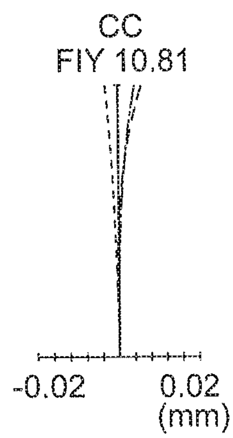
Figure 92I:
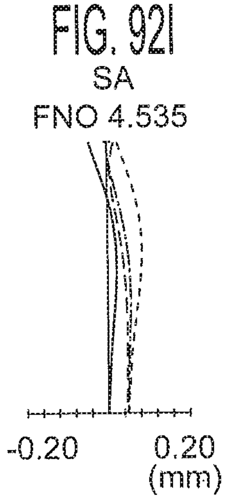
Figure 92J:
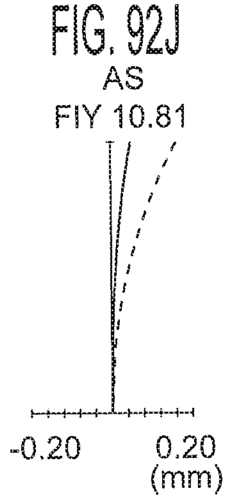
Figure 92K:
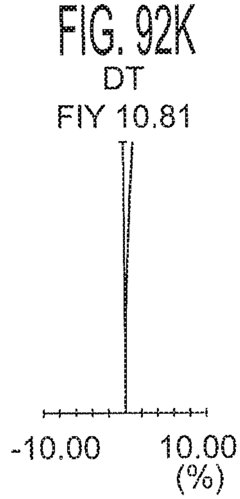
Figure 92L:
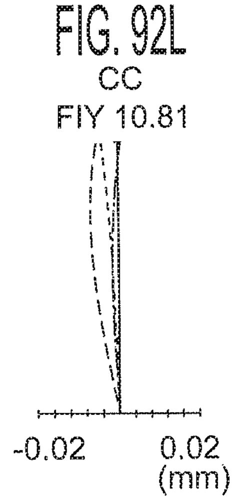
Figure 93A:
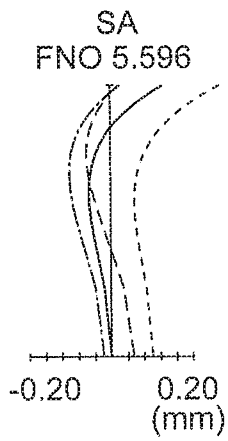
FIG. 93A, FIG. 93B, FIG. 93C, FIG. 93D, FIG. 93E, FIG. 93F, FIG. 93G, FIG. 93H, FIG. 93I, FIG. 93J, FIG. 93K, and FIG. 93L are aberration diagrams of the example 35.
Figure 93B:
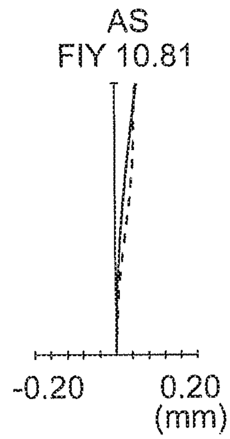
Figure 93C:
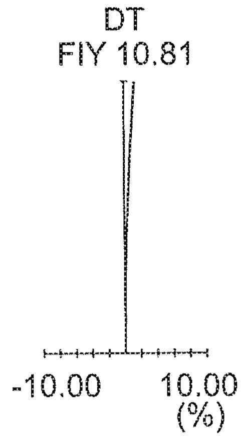
Figure 93D:
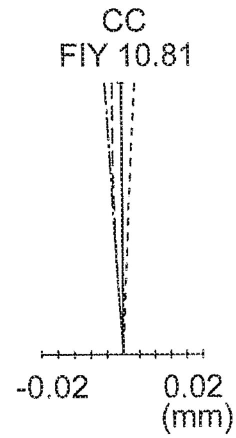
Figure 93E:
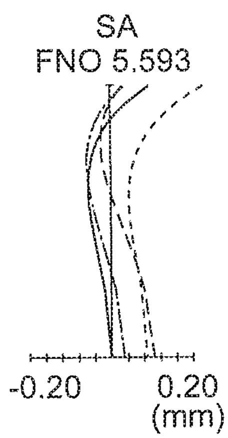
Figure 93F:
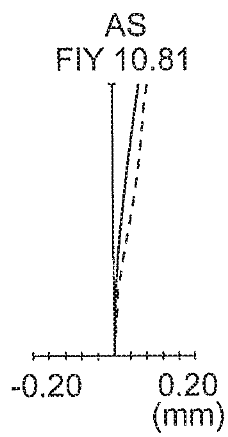
Figure 93G:
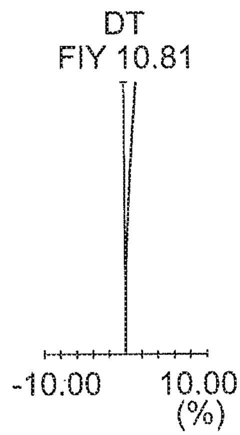
Figure 93H:
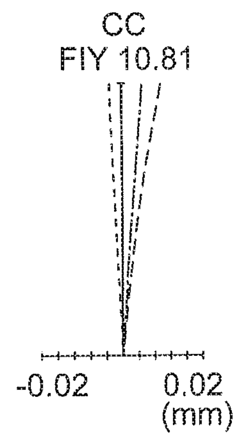
Figure 93I:
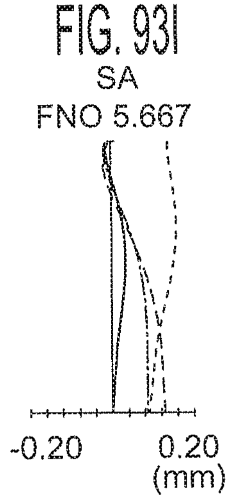
Figure 93J:
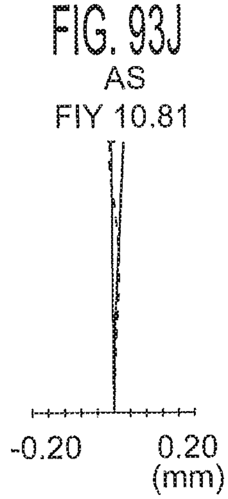
Figure 93K:
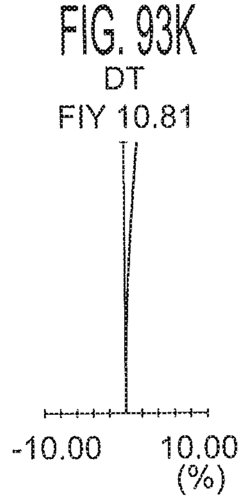
Figure 93L:
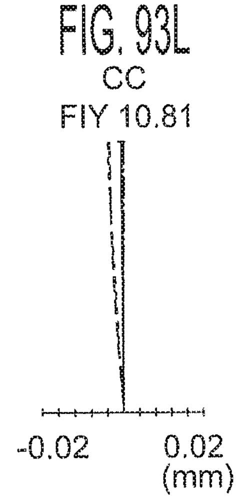
Figure 94A:
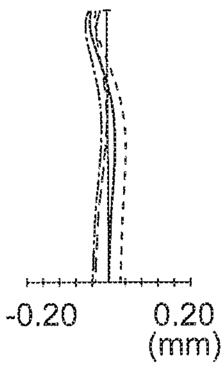
FIG. 94A, FIG. 94B, FIG. 94C, FIG. 94D, FIG. 94E, FIG. 94F, FIG. 94G, FIG. 94H, FIG. 94I, FIG. 94J, FIG. 94K, and FIG. 94L are aberration diagrams of the example 36.
Figure 94B:
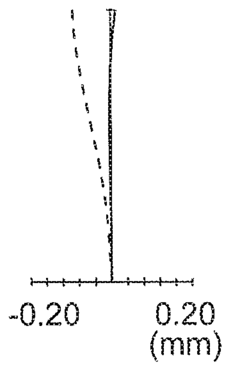
Figure 94C:
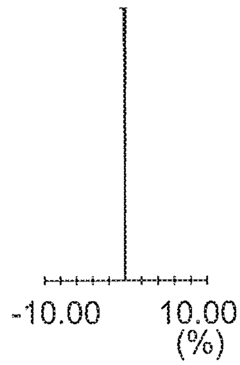
Figure 94D:
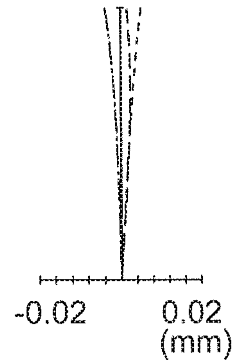
Figure 94E:
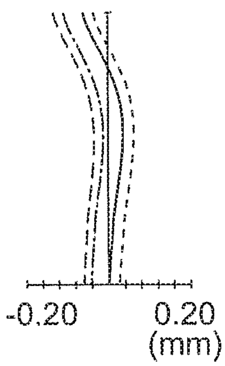
Figure 94F:
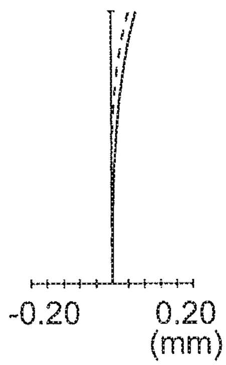
Figure 94G:
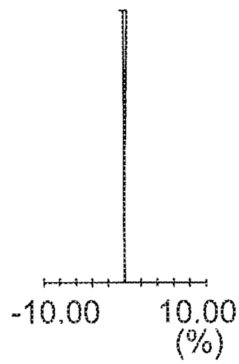
Figure 94H:
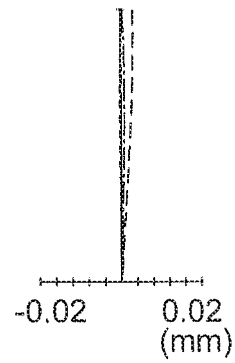
Figure 94I:
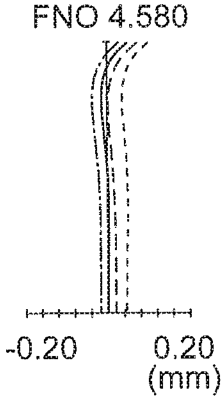
Figure 94J:
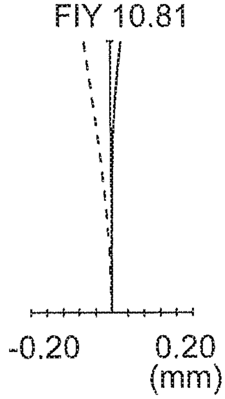
Figure 94K:
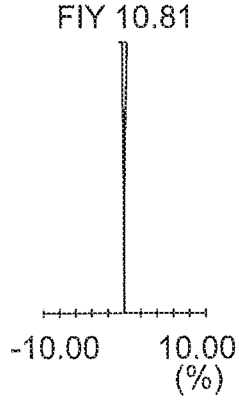
Figure 94L:
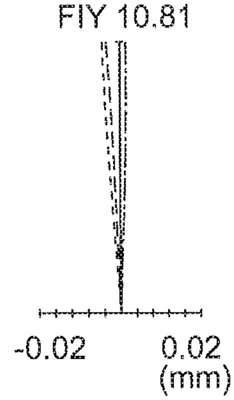
Figure 95A:
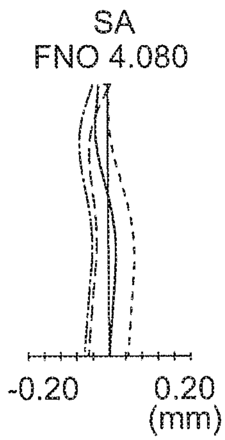
FIG. 95A, FIG. 95B, FIG. 95C, FIG. 95D, FIG. 95E, FIG. 95F, FIG. 95G, FIG. 95H, FIG. 95I, FIG. 95J, FIG. 95K, and FIG. 95L are aberration diagrams of the example 37.
Figure 95B:
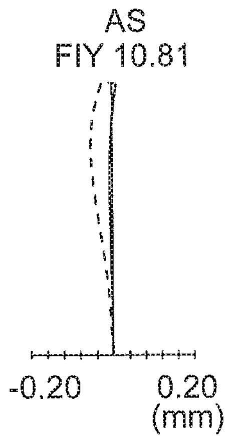
Figure 95C:
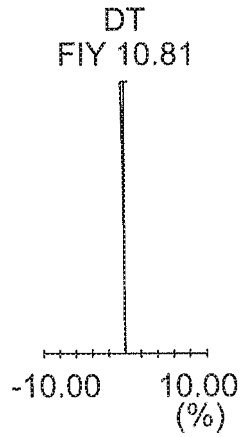
Figure 95D:
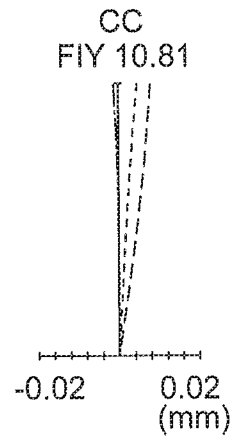
Figure 95E:
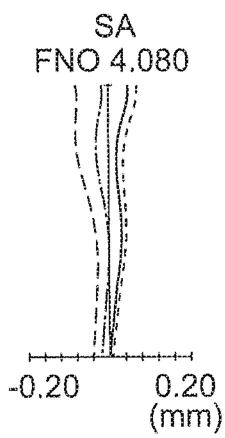
Figure 95F:
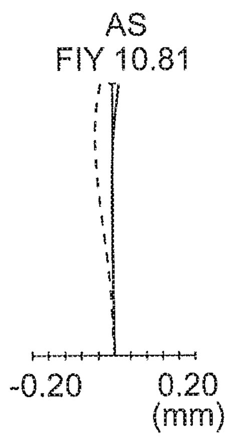
Figure 95G:
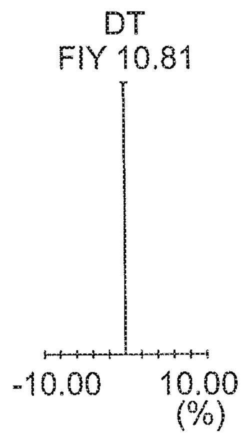
Figure 95H:
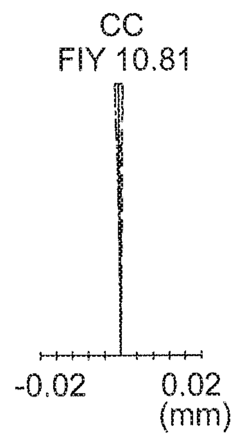
Figure 95I:
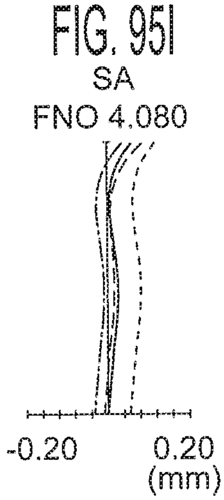
Figure 95J:
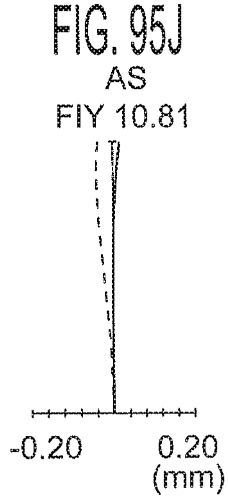
Figure 95K:
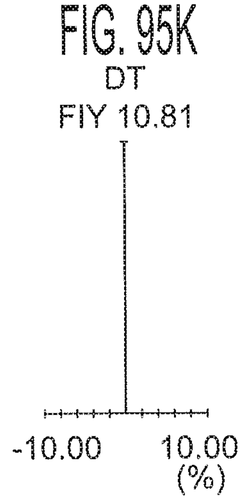
Figure 95L:
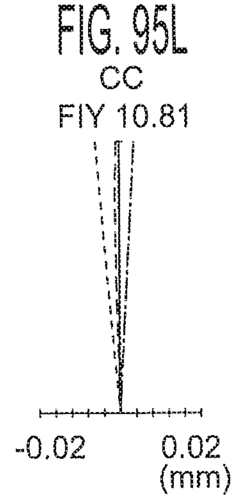
Figure 96A:
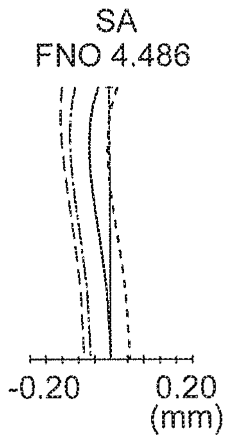
FIG. 96A, FIG. 96B, FIG. 96C, FIG. 96D, FIG. 96E, FIG. 96F, FIG. 96G, FIG. 96H, FIG. 96I, FIG. 96J, FIG. 96K, and FIG. 96L are aberration diagrams of the example 38.
Figure 96B:
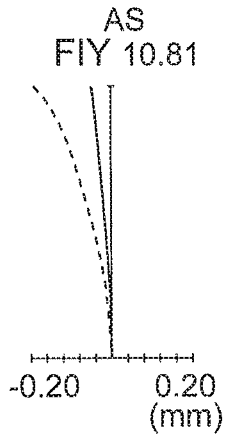
Figure 96C:
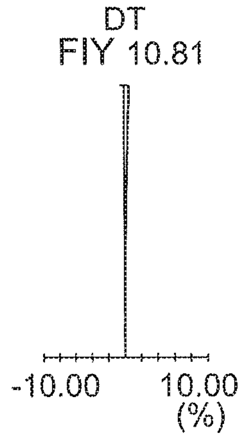
Figure 96D:
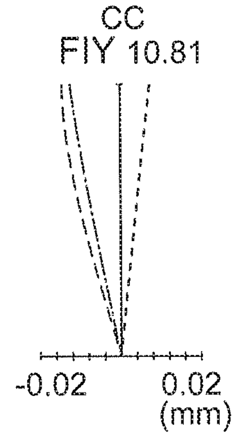
Figure 96E:
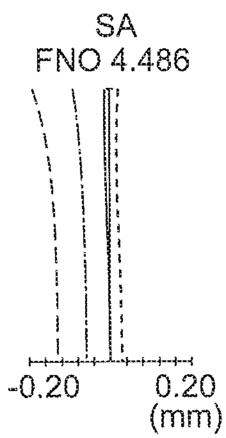
Figure 96F:
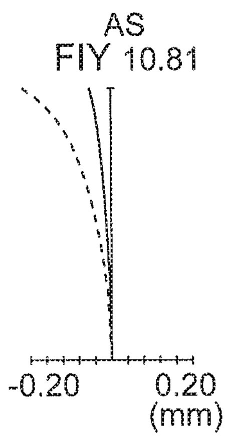
Figure 96G:
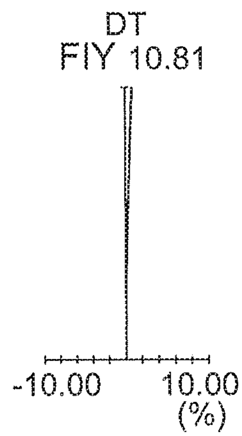
Figure 96H:
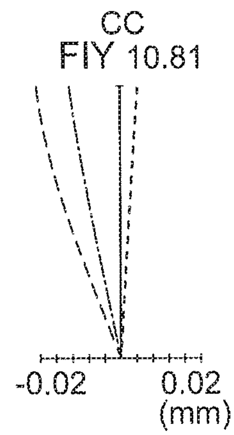
Figure 96I:
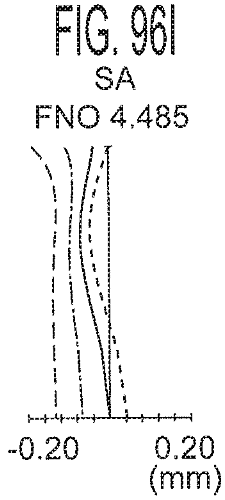
Figure 96J:
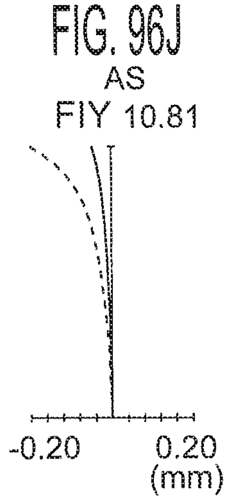
Figure 96K:
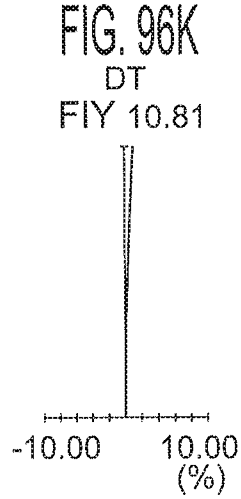
Figure 96L:
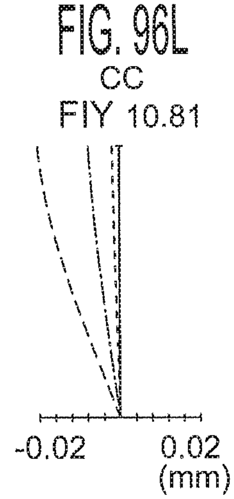
Figure 97A:
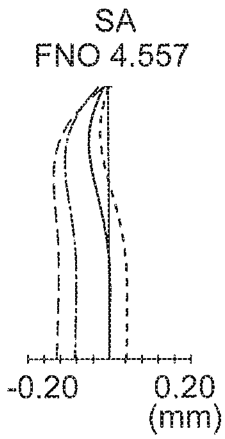
FIG. 97A, FIG. 97B, FIG. 97C, FIG. 97D, FIG. 97E, FIG. 97F, FIG. 97G, FIG. 97H, FIG. 97I, FIG. 97J, FIG. 97K, and FIG. 97L are aberration diagrams of the example 39.
Figure 97B:
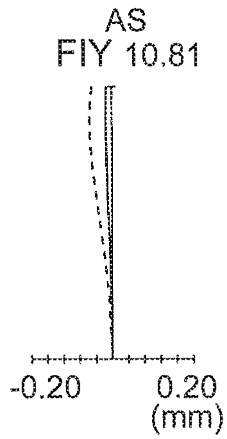
Figure 97C:
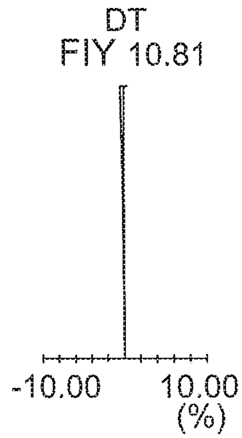
Figure 97D:
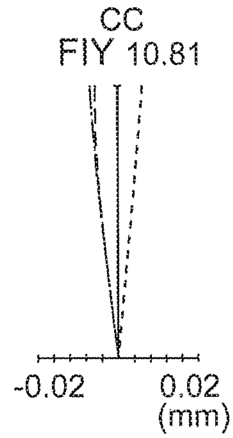
Figure 97E:
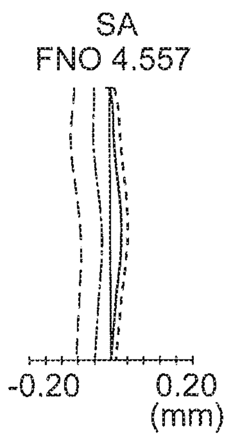
Figure 97F:
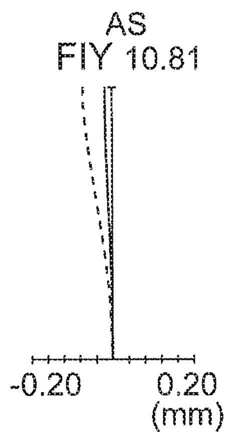
Figure 97G:
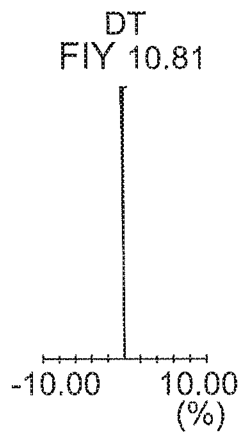
Figure 97H:
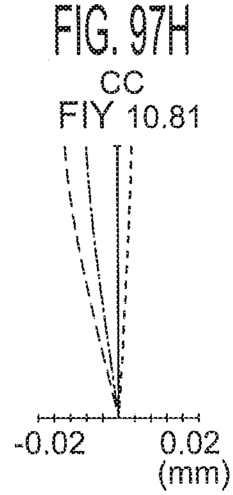
Figure 97I:
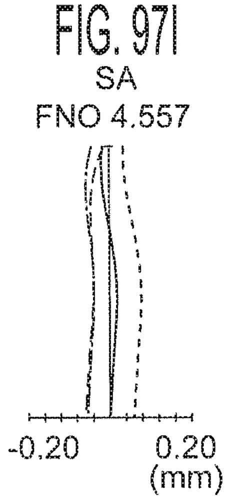
Figure 97J:
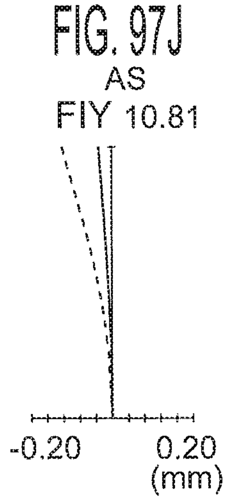
Figure 97K:
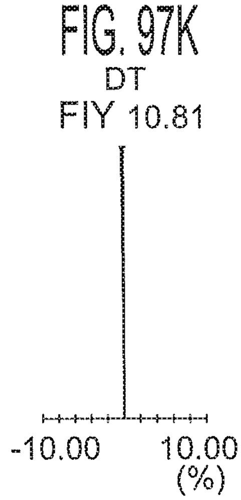
Figure 97L:
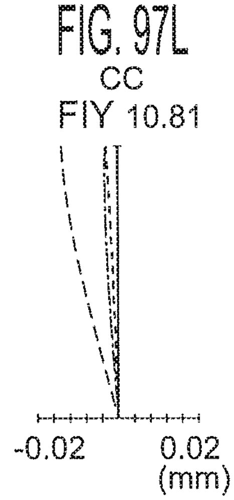
Figure 98A:
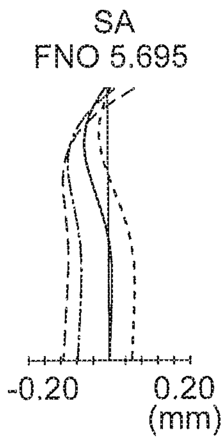
FIG. 98A, FIG. 98B, FIG. 98C, FIG. 98D, FIG. 98E, FIG. 98F, FIG. 98G, FIG. 98H, FIG. 98I, FIG. 98J, FIG. 98K, and FIG. 98L are aberration diagrams of the example 40.
Figure 98B:
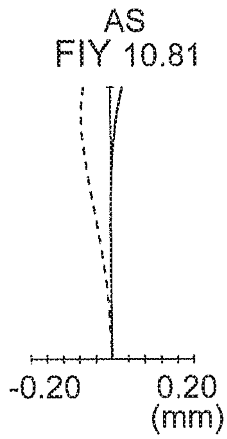
Figure 98C:
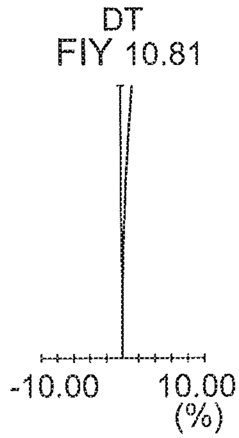
Figure 98D:
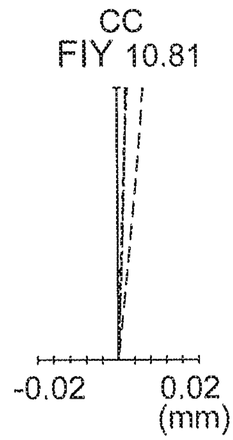
Figure 98E:
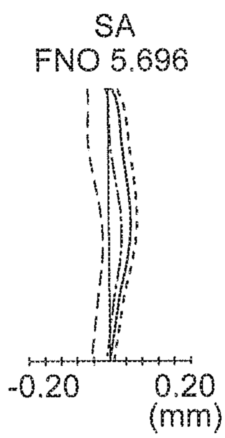
Figure 98F:
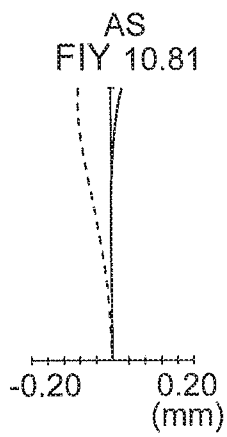
Figure 98G:
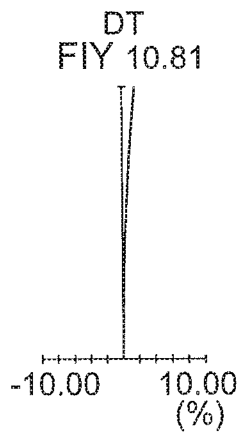
Figure 98H:
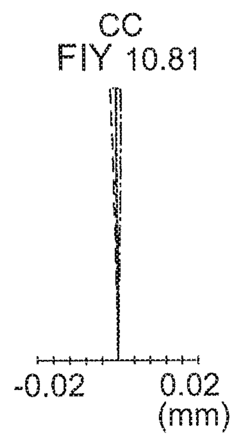
Figure 98I:
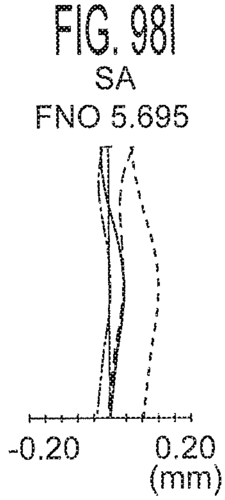
Figure 98J:
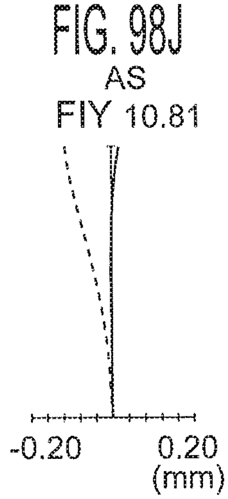
Figure 98K:
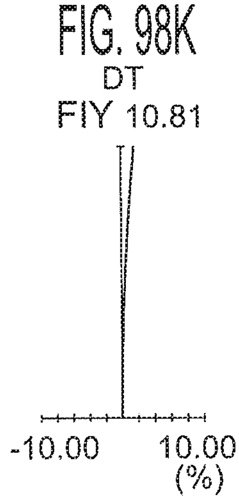
Figure 98L:
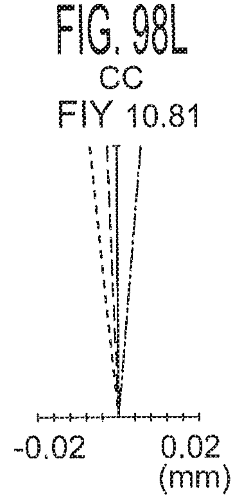
Figure 99A:
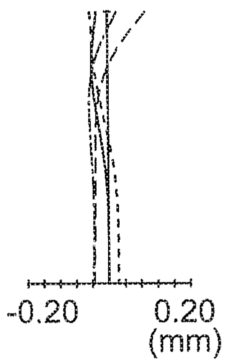
FIG. 99A, FIG. 99B, FIG. 99C, FIG. 99D, FIG. 99E, FIG. 99F, FIG. 99G, FIG. 99H, FIG. 99I, FIG. 99J, FIG. 99K, and FIG. 99L are aberration diagrams of the example 41.
Figure 99B:
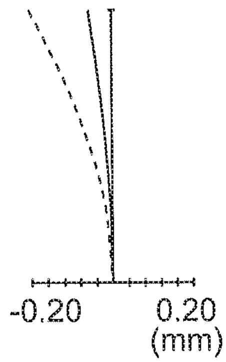
Figure 99C:
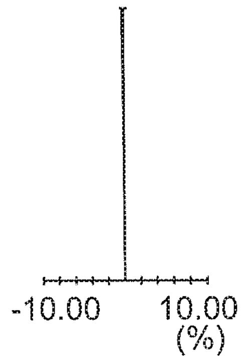
Figure 99D:
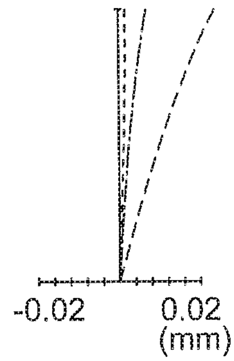
Figure 99E:
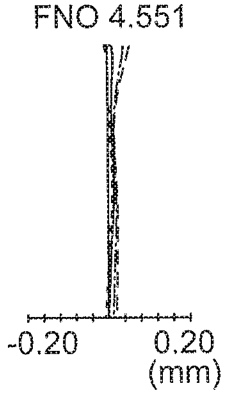
Figure 99F:
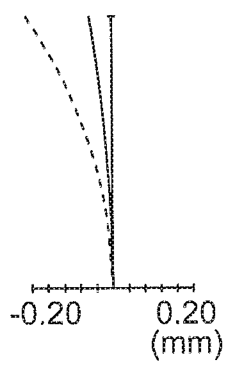
Figure 99G:
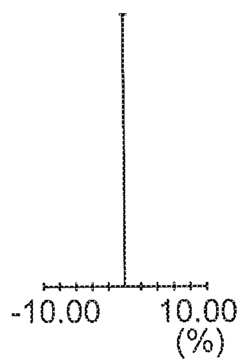
Figure 99H:
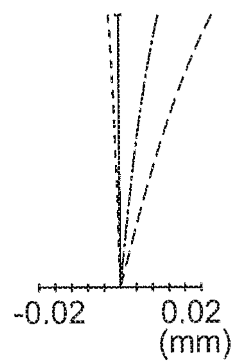
Figure 99I:
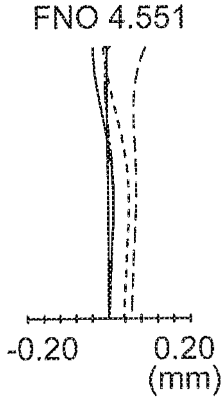
Figure 99J:
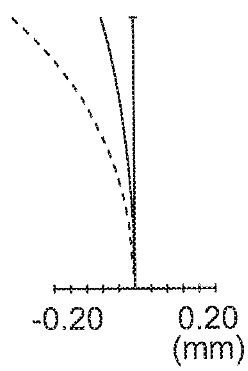
Figure 99K:
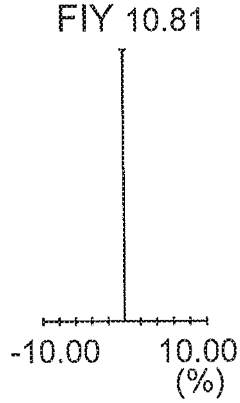
Figure 99L:
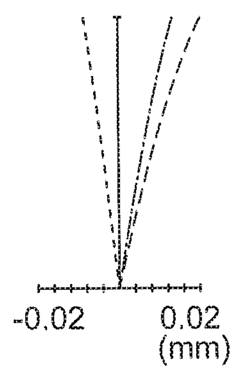
Figure 100A:
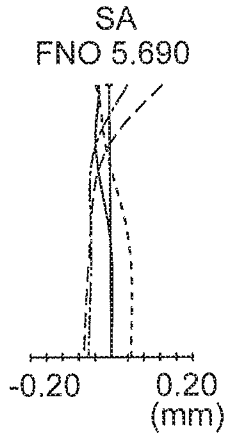
FIG. 100A, FIG. 100B, FIG. 100C, FIG. 100D, FIG. 100E, FIG. 100F, FIG. 100G, FIG. 100H, FIG. 100I, FIG. 100J, FIG. 100K, and FIG. 100L are aberration diagrams of the example 42.
Figure 100B:
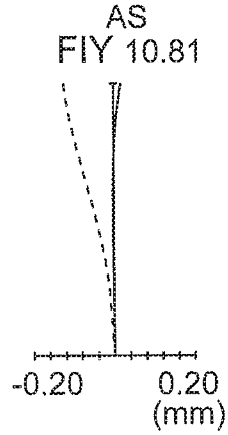
Figure 100C:
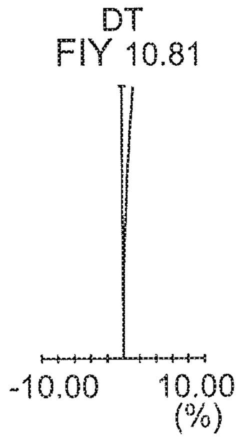
Figure 100D:
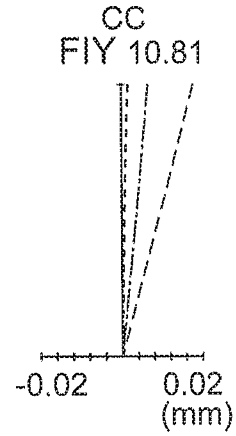
Figure 100E:
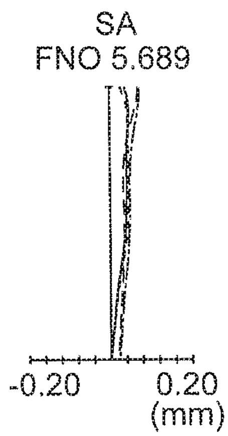
Figure 100F:
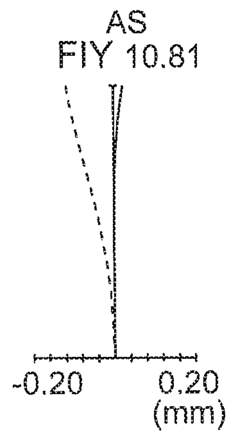
Figure 100G:
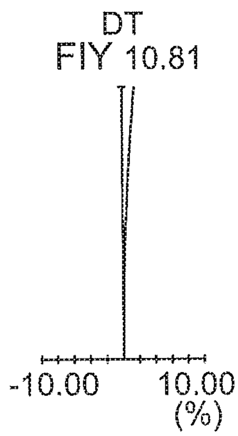
Figure 100H:
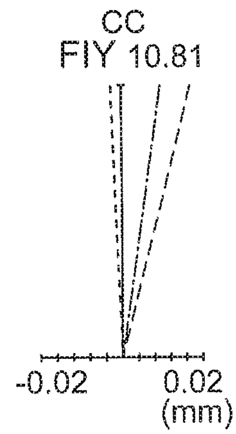
Figure 100I:
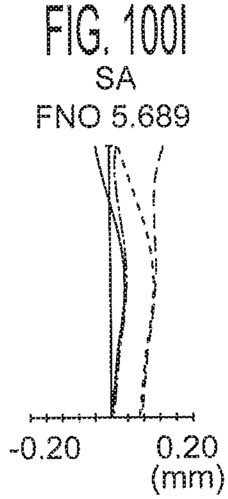
Figure 100J:
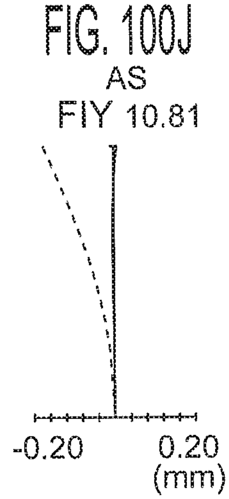
Figure 100K:
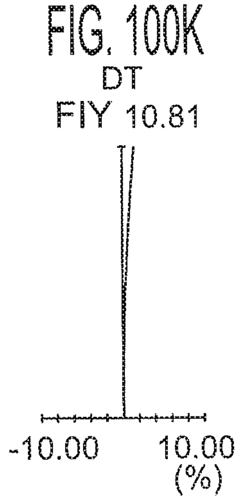
Figure 100L:
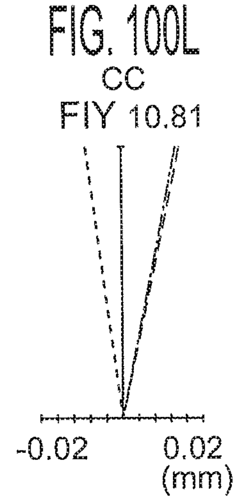
Figure 101A:
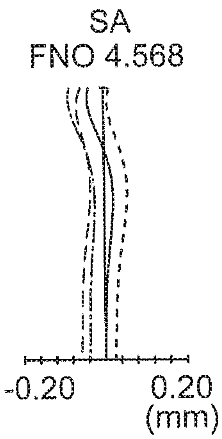
FIG. 101A, FIG. 101B, FIG. 101C, FIG. 101D, FIG. 101E, FIG. 101F, FIG. 101G, FIG. 101H, FIG. 101I, FIG. 101J, FIG. 101K, and FIG. 101L are aberration diagrams of the example 43.
Figure 101B:
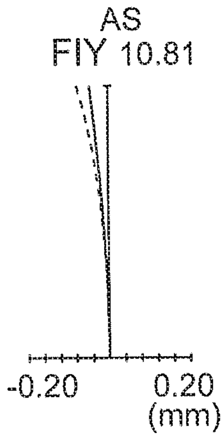
Figure 101C:
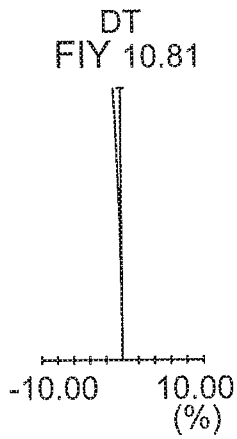
Figure 101D:
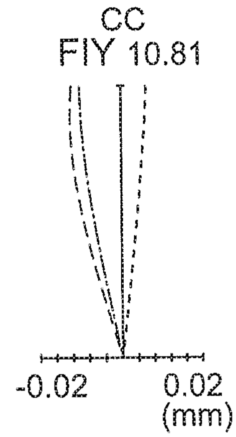
Figure 101E:
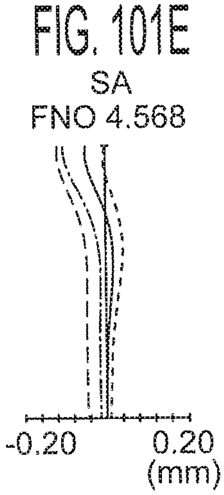
Figure 101F:
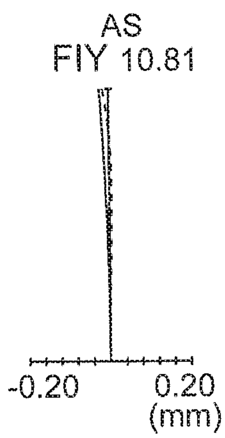
Figure 101G:
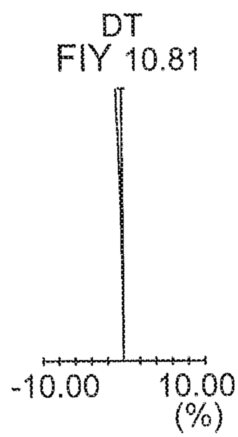
Figure 101H:
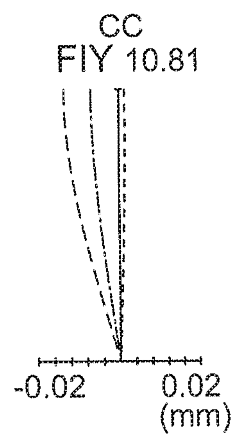
Figure 101I:
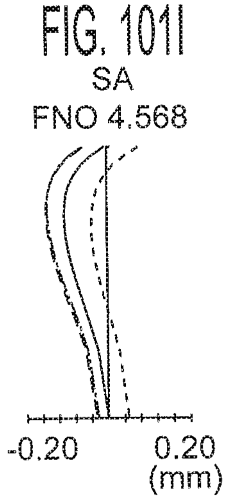
Figure 101J:
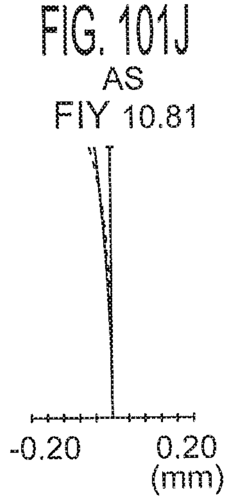
Figure 101K:
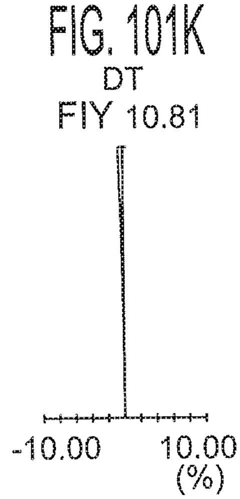
Figure 101L:
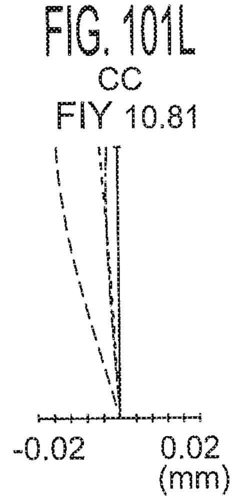
Figure 102A:
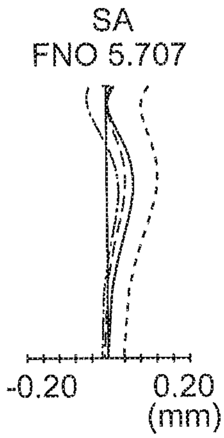
FIG. 102A, FIG. 102B, FIG. 102C, FIG. 102D, FIG. 102E, FIG. 102F, FIG. 102G, FIG. 102H, FIG. 102I, FIG. 102J, FIG. 102K, and FIG. 102L are aberration diagrams of the example 44.
Figure 102B:
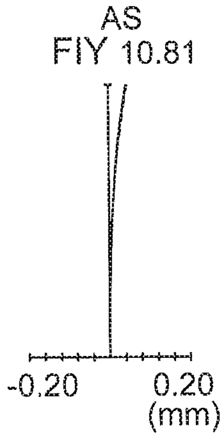
Figure 102C:
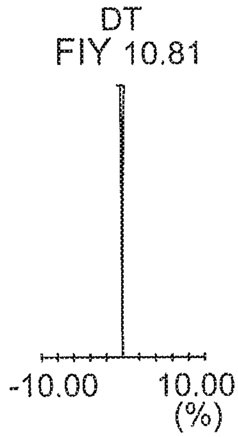
Figure 102D:
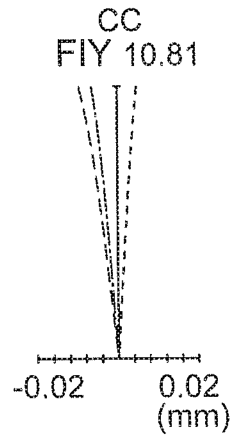
Figure 102E:
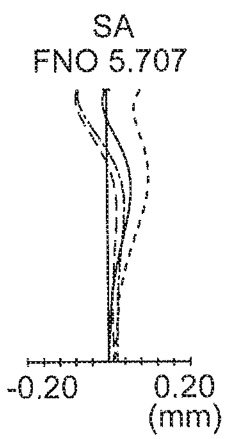
Figure 102F:
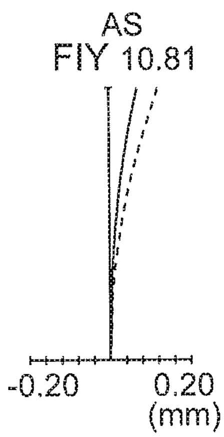
Figure 102G:
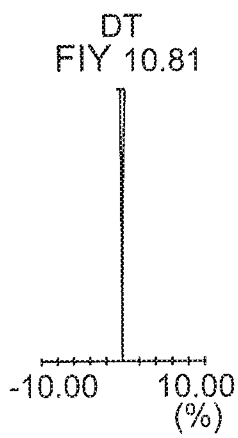
Figure 102H:
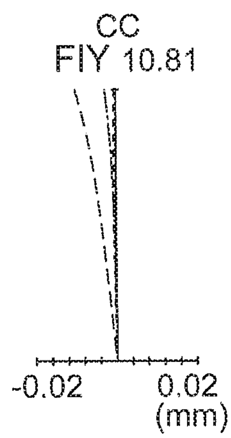
Figure 102I:
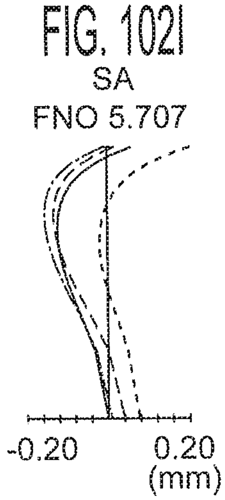
Figure 102J:
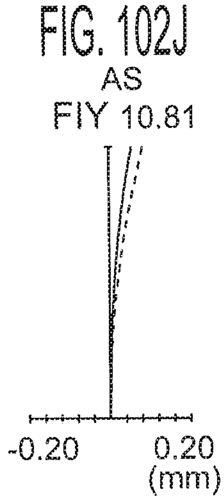
Figure 102K:
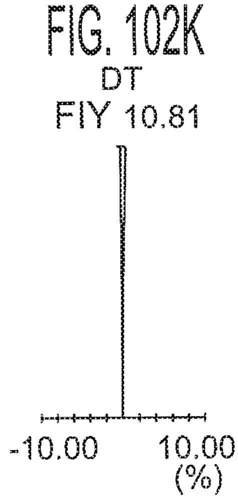
Figure 102L:
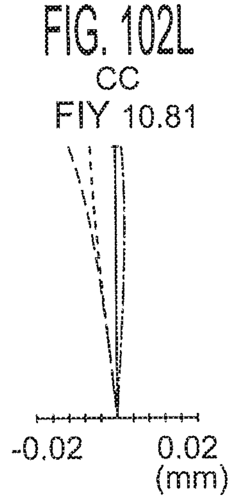
Figure 103A:
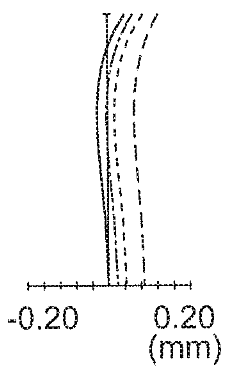
FIG. 103A, FIG. 103B, FIG. 103C, FIG. 103D, FIG. 103E, FIG. 103F, FIG. 103G, FIG. 103H, FIG. 103I, FIG. 103J, FIG. 103K, and FIG. 103L are aberration diagrams of the example 45.
Figure 103B:
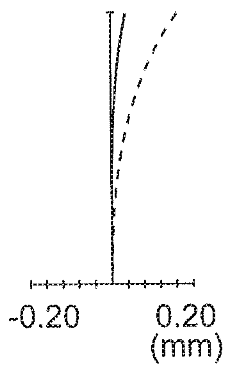
Figure 103C:
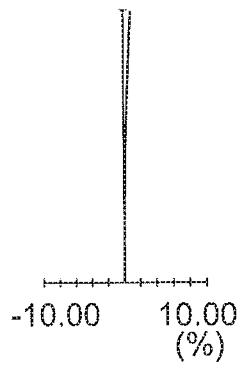
Figure 103D:
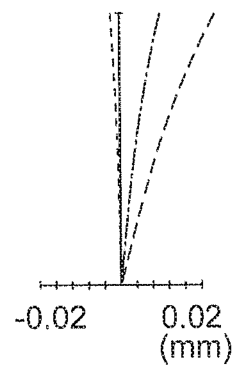
Figure 103E:
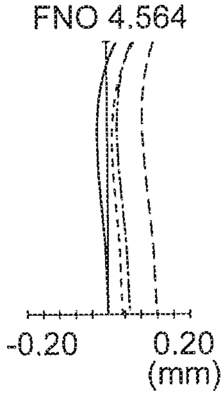
Figure 103F:
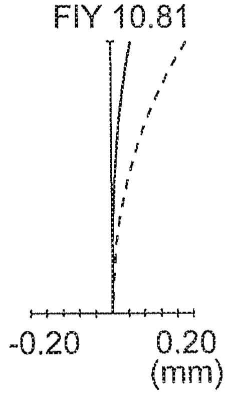
Figure 103G:
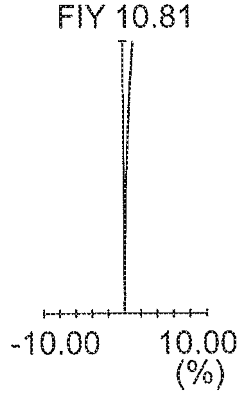
Figure 103H:
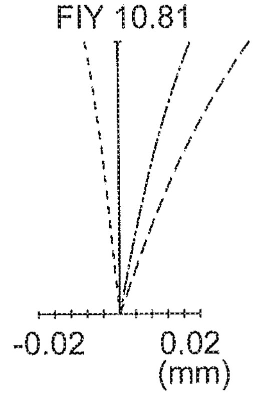
Figure 103I:
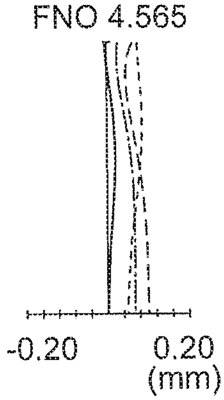
Figure 103J:
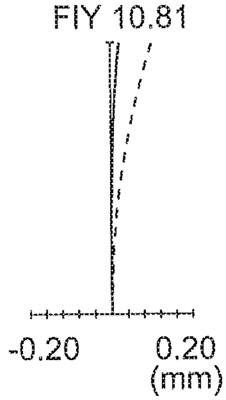
Figure 103K:
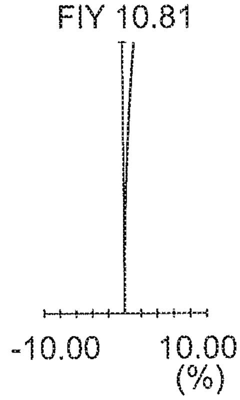
Figure 103L:
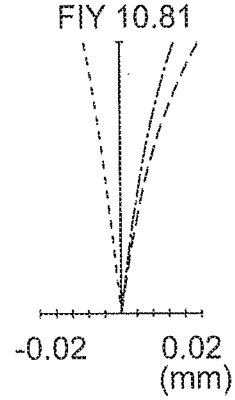
Figure 104A:
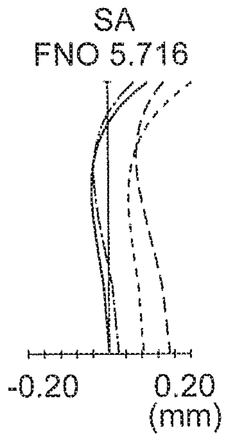
FIG. 104A, FIG. 104B, FIG. 104C, FIG. 104D, FIG. 104E, FIG. 104F, FIG. 104G, FIG. 104H, FIG. 104I, FIG. 104J, FIG. 104K, and FIG. 104L are aberration diagrams of the example 46.
Figure 104B:
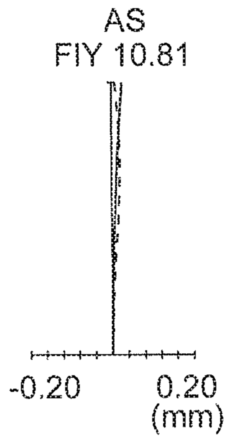
Figure 104C:
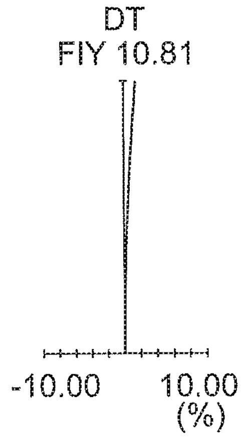
Figure 104D:
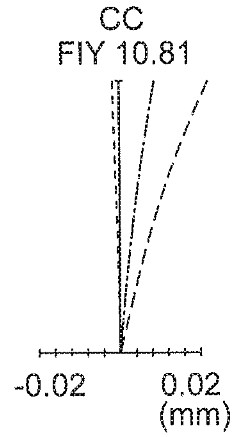
Figure 104E:
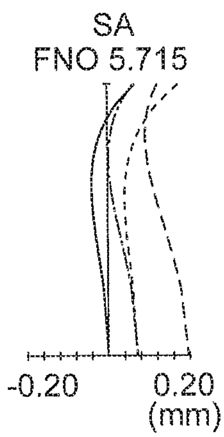
Figure 104F:
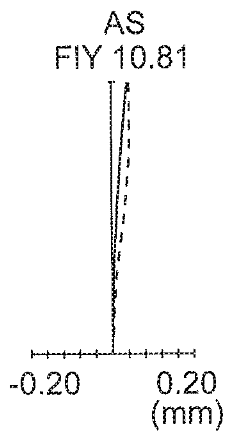
Figure 104G:
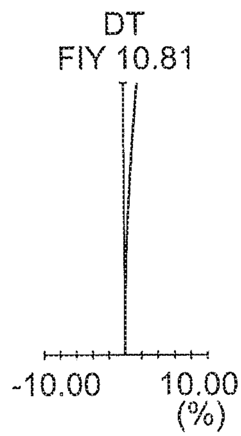
Figure 104H:
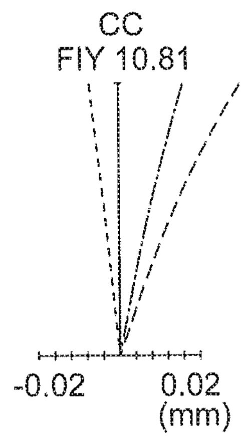
Figure 104I:
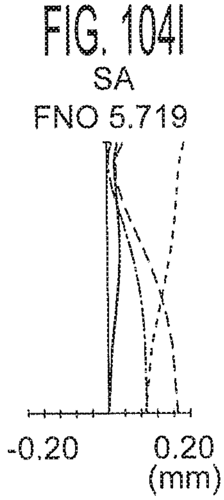
Figure 104J:
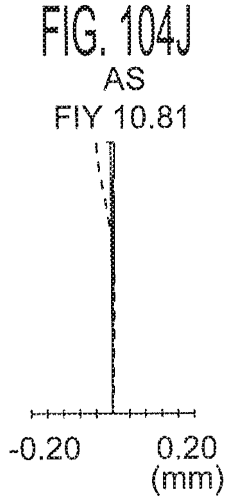
Figure 104K:
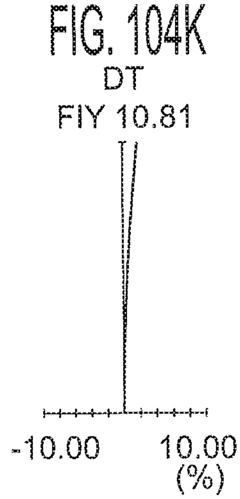
Figure 104L:
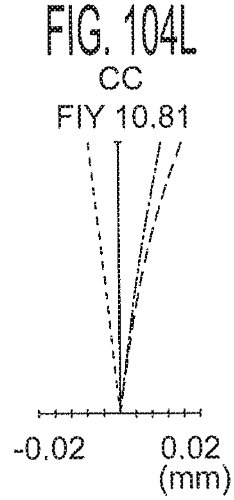
Figure 105A:
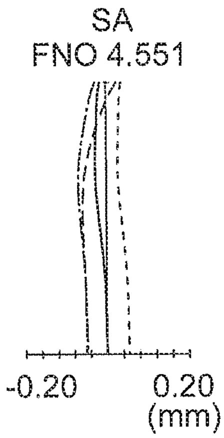
FIG. 105A, FIG. 105B, FIG. 105C, FIG. 105D, FIG. 105E, FIG. 105F, FIG. 105G, FIG. 105H, FIG. 105I, FIG. 105J, FIG. 105K, and FIG. 105L are aberration diagrams of the example 47.
Figure 105B:
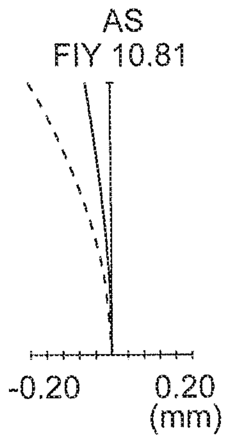
Figure 105C:
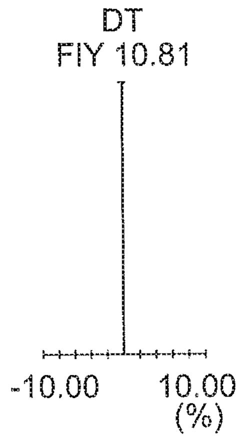
Figure 105D:
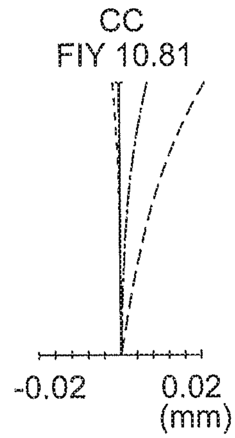
Figure 105E:
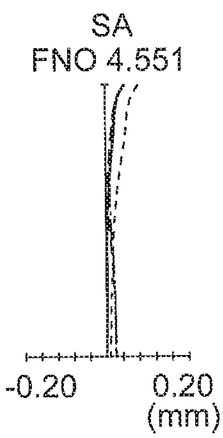
Figure 105F:
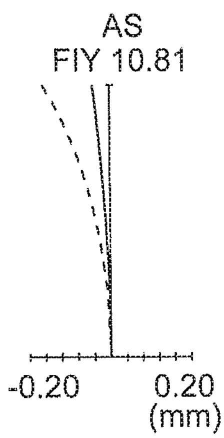
Figure 105G:
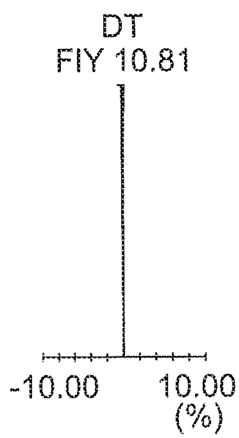
Figure 105H:
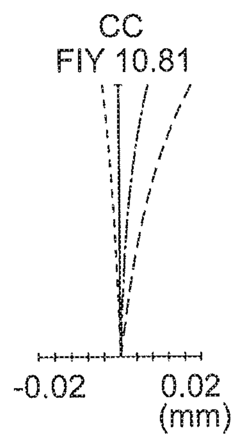
Figure 105I:
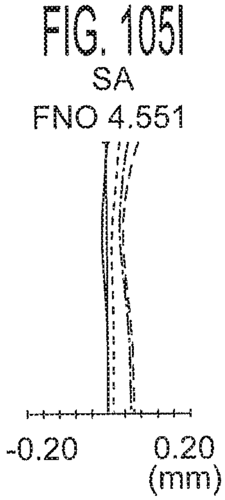
Figure 105J:
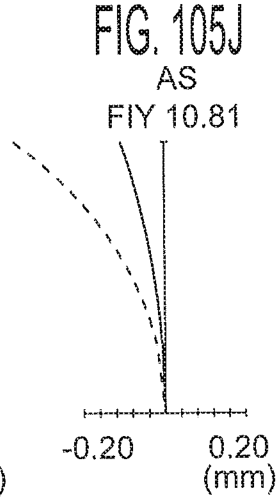
Figure 105K:
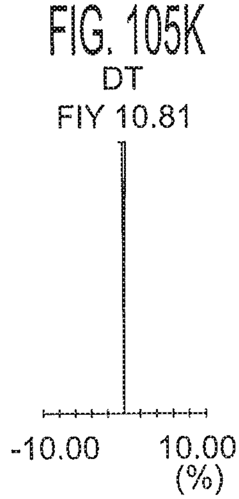
Figure 105L:
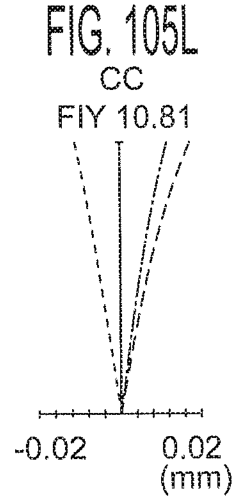
Figure 106A:
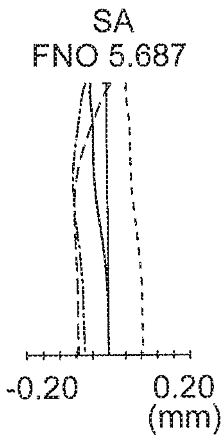
FIG. 106A, FIG. 106B, FIG. 106C, FIG. 106D, FIG. 106E, FIG. 106F, FIG. 106G, FIG. 106H, FIG. 106I, FIG. 106J, FIG. 106K, and FIG. 106L are aberration diagrams of the example 48.
Figure 106B:
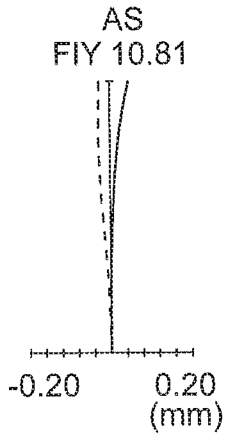
Figure 106C:
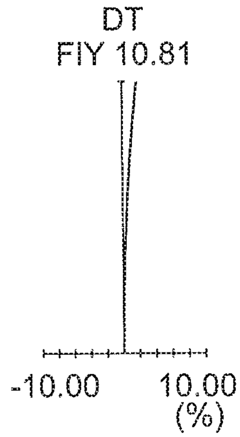
Figure 106D:
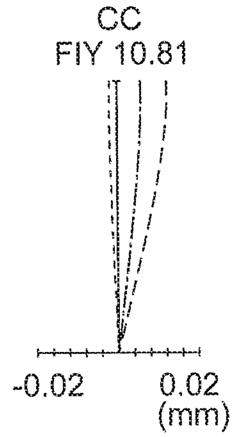
Figure 106E:
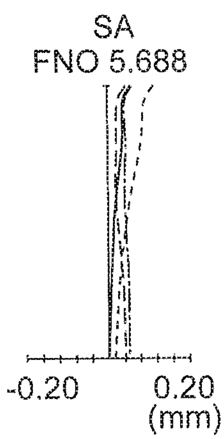
Figure 106F:
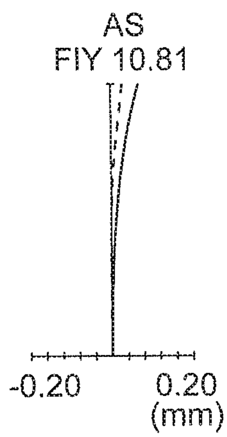
Figure 106G:
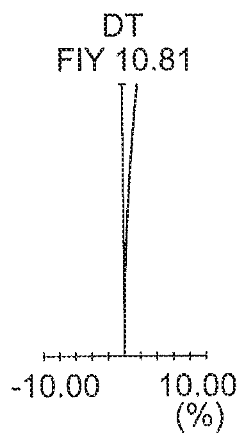
Figure 106H:
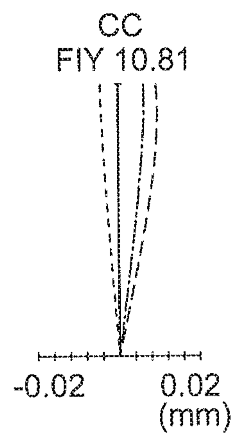
Figure 106I:
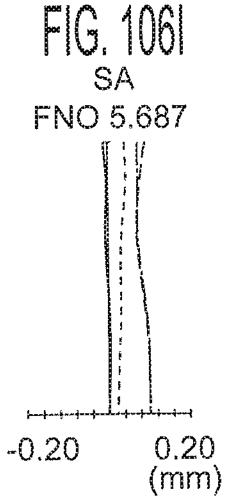
Figure 106J:
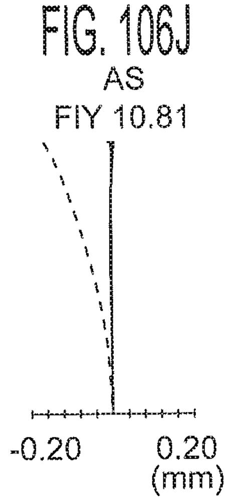
Figure 106K:
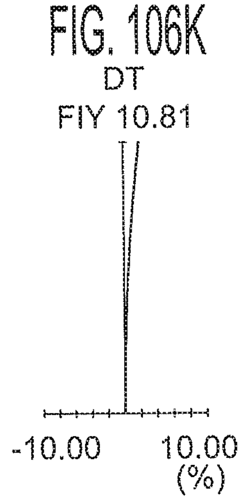
Figure 106L:
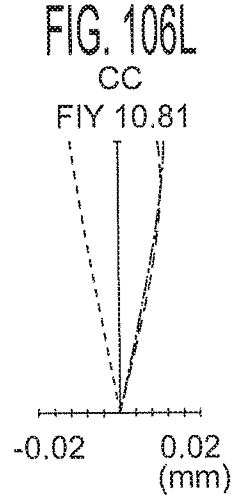
Figure 107A:
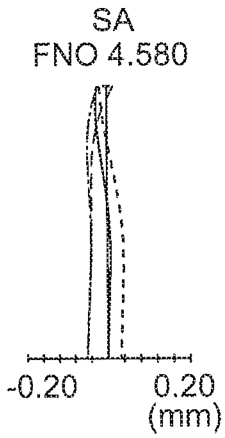
FIG. 107A, FIG. 107B, FIG. 107C, FIG. 107D, FIG. 107E, FIG. 107F, FIG. 107G, FIG. 107H, FIG. 107I, FIG. 107J, FIG. 107K, and FIG. 107L are aberration diagrams of the example 49.
Figure 107B:
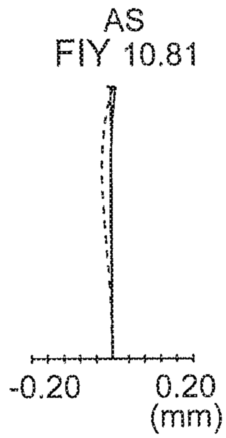
Figure 107C:
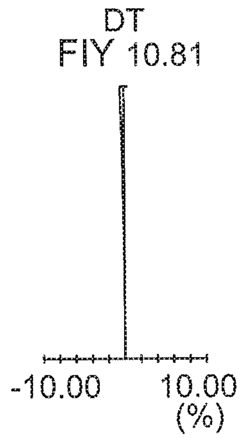
Figure 107D:
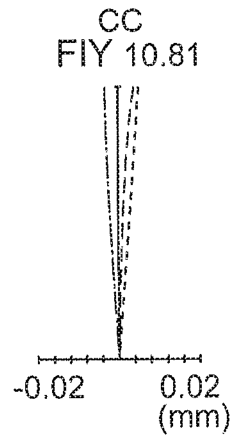
Figure 107E:
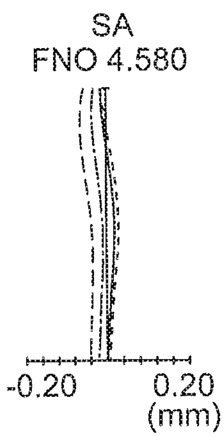
Figure 107F:
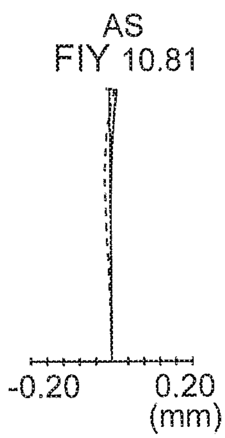
Figure 107G:
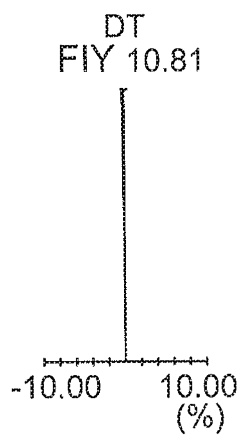
Figure 107H:
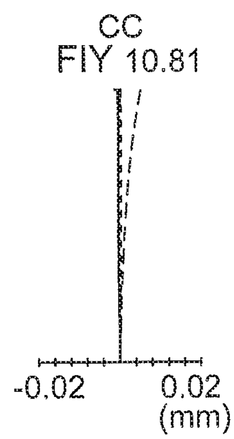
Figure 107I:
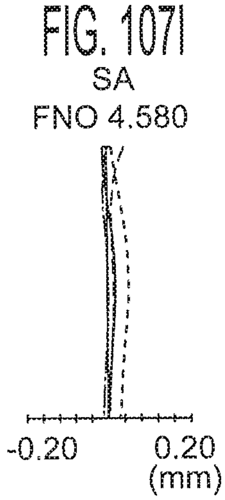
Figure 107J:
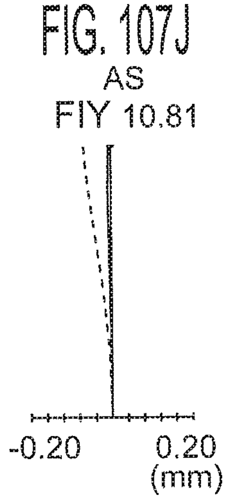
Figure 107K:
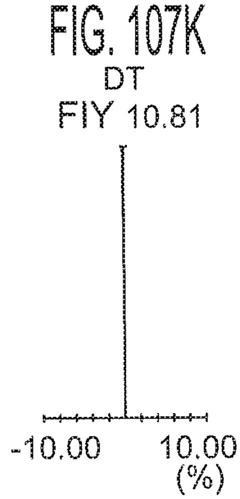
Figure 107L:
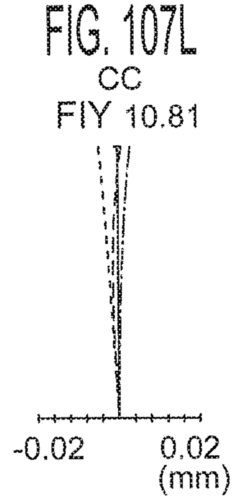
Figure 108A:
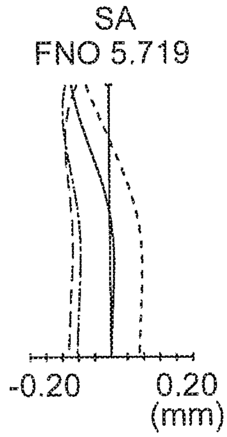
FIG. 108A, FIG. 108B, FIG. 108C, FIG. 108D, FIG. 108E, FIG. 108F, FIG. 108G, FIG. 108H, FIG. 108I, FIG. 108J, FIG. 108K, and FIG. 108L are aberration diagrams of the example 50.
Figure 108B:
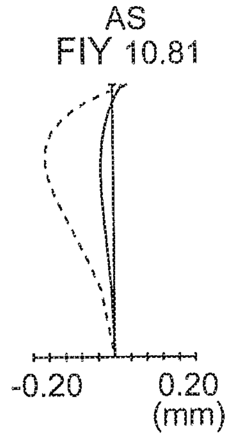
Figure 108C:
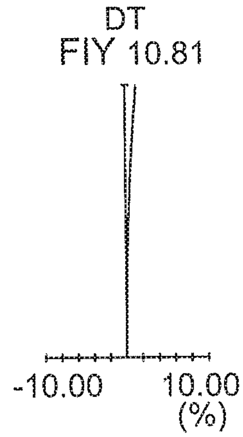
Figure 108D:
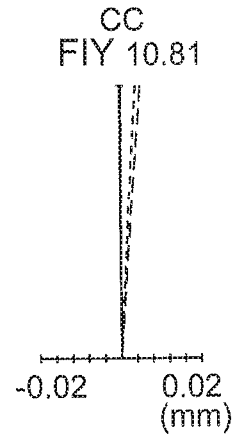
Figure 108E:
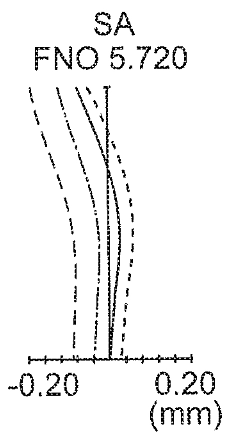
Figure 108F:
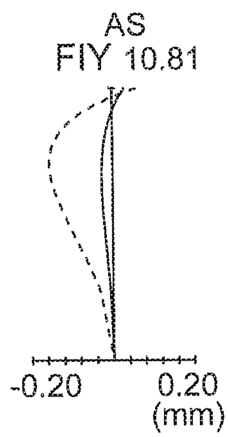
Figure 108G:
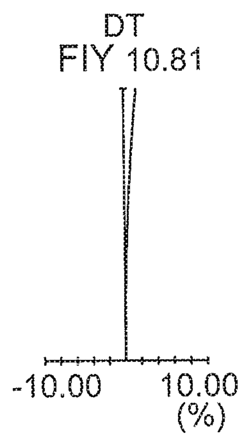
Figure 108H:
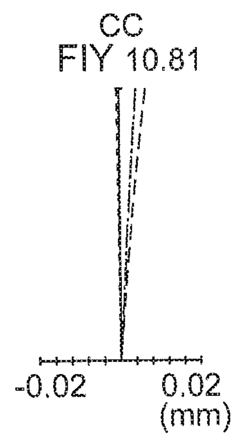
Figure 108I:
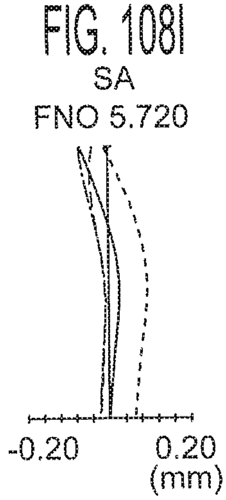
Figure 108J:
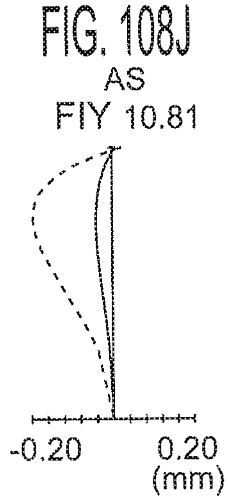
Figure 108K:
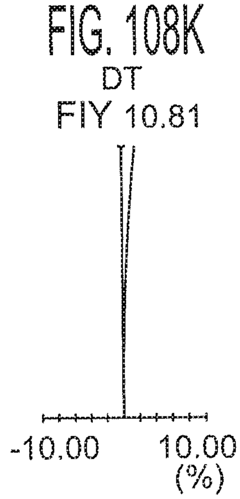
Figure 108L:
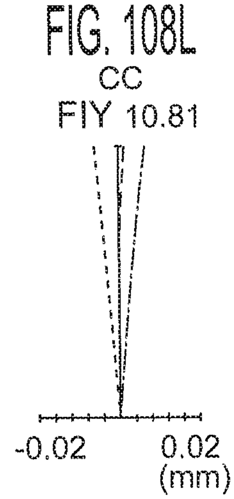
Figure 109A:
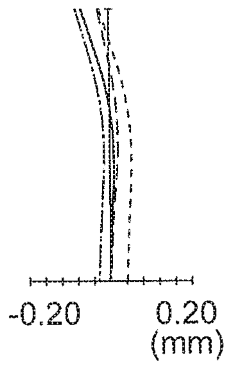
FIG. 109A, FIG. 109B, FIG. 109C, FIG. 109D, FIG. 109E, FIG. 109F, FIG. 109G, FIG. 109H, FIG. 109I, FIG. 109J, FIG. 109K, and FIG. 109L are aberration diagrams of the example 51.
Figure 109B:
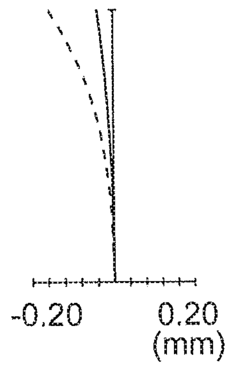
Figure 109C:
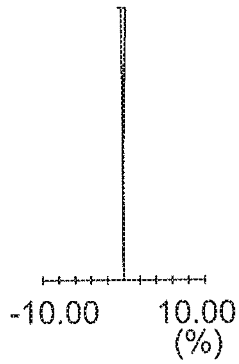
Figure 109D:
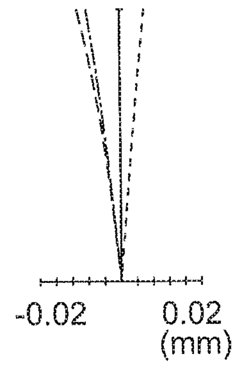
Figure 109E:
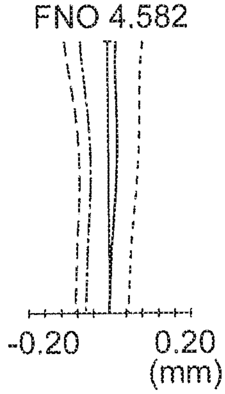
Figure 109F:
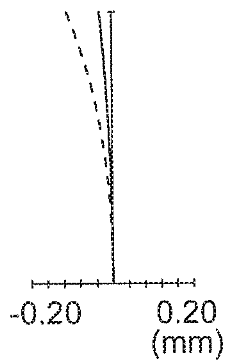
Figure 109G:
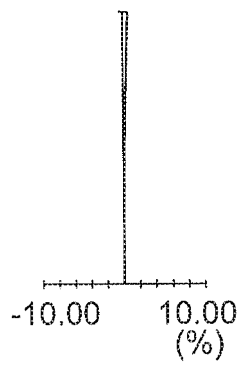
Figure 109H:
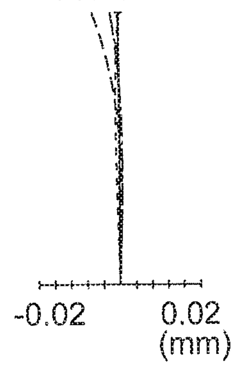
Figure 109I:
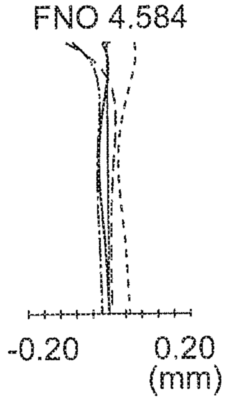
Figure 109J:
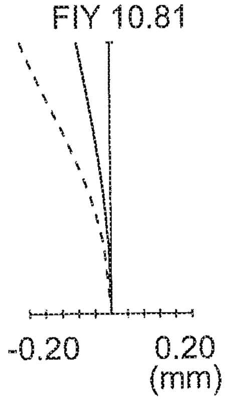
Figure 109K:
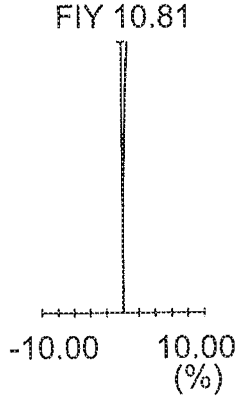
Figure 109L:
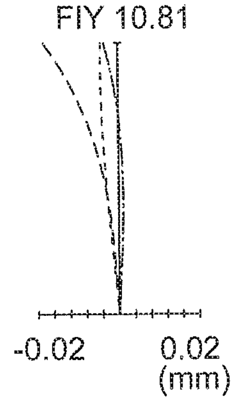
Figure 110A:
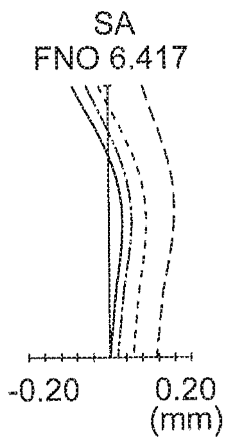
FIG. 110A, FIG. 110B, FIG. 110C, FIG. 110D, FIG. 110E, FIG. 110F, FIG. 110G, FIG. 110H, FIG. 110I, FIG. 110J, FIG. 110K, and FIG. 110L are aberration diagrams of the example 52.
Figure 110B:
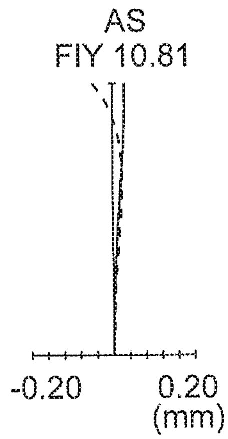
Figure 110C:
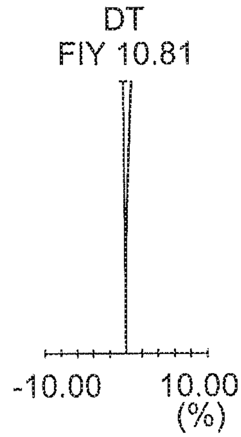
Figure 110D:
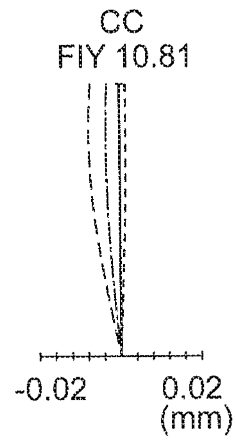
Figure 110E:
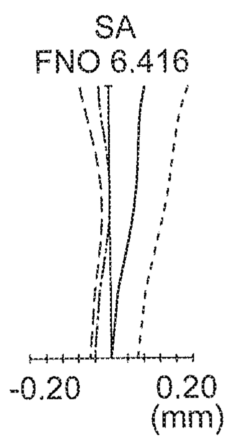
Figure 110F:
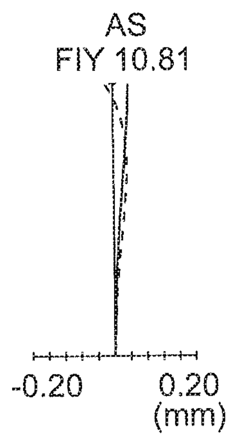
Figure 110G:
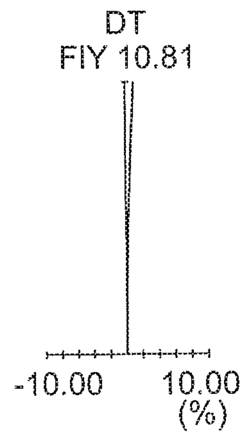
Figure 110H:
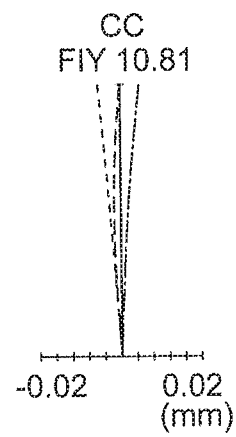
Figure 110I:
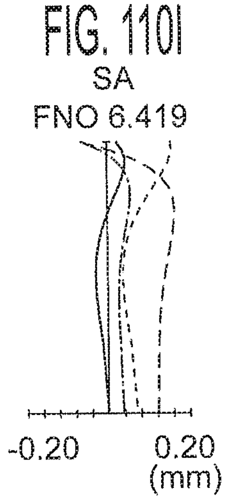
Figure 110J:
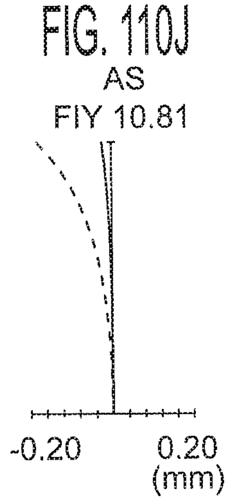
Figure 110K:
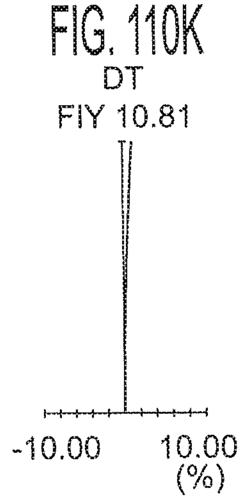
Figure 110L:
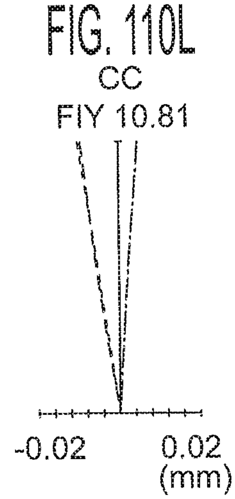
Figure 111A:
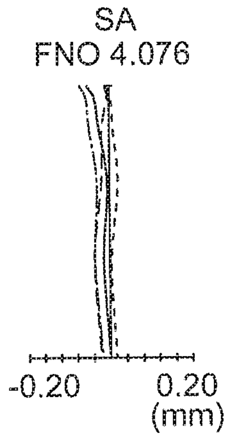
FIG. 111A, FIG. 111B, FIG. 111C, FIG. 111D, FIG. 111E, FIG. 111F, FIG. 111G, FIG. 111H, FIG. 111I, FIG. 111J, FIG. 111K, and FIG. 111L are aberration diagrams of the example 53.
Figure 111B:
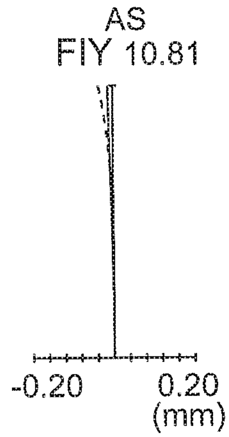
Figure 111C:
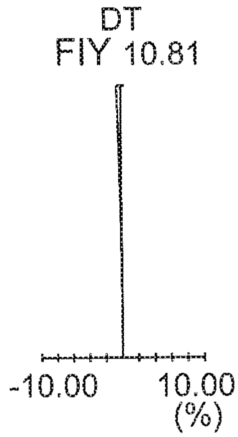
Figure 111D:
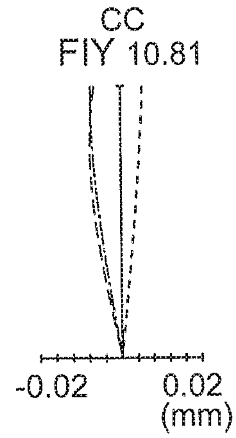
Figure 111E:
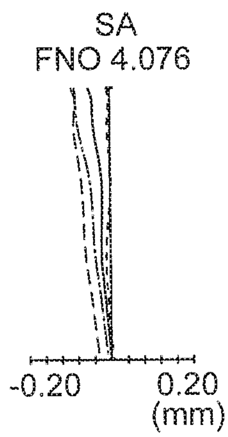
Figure 111F:
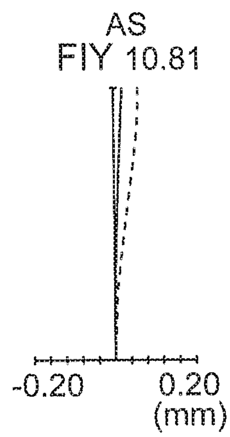
Figure 111G:
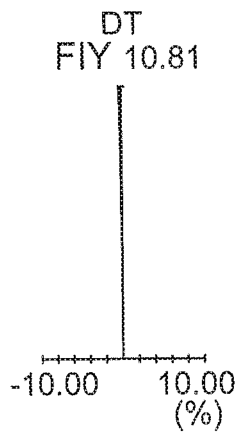
Figure 111H:
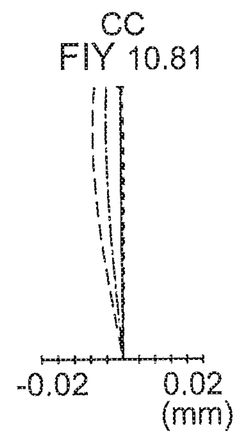
Figure 111I:
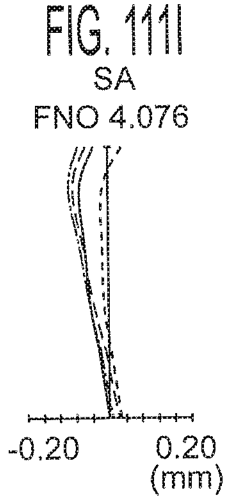
Figure 111J:
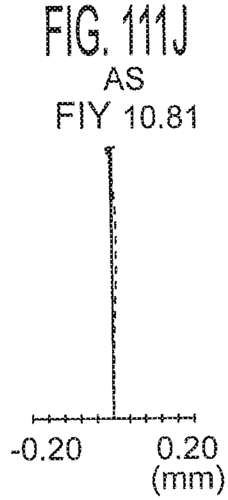
Figure 111K:
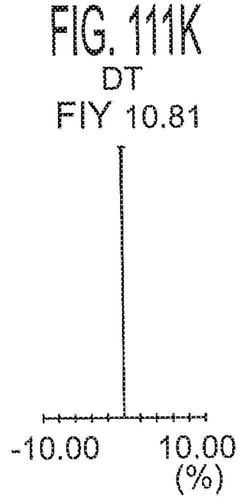
Figure 111L:
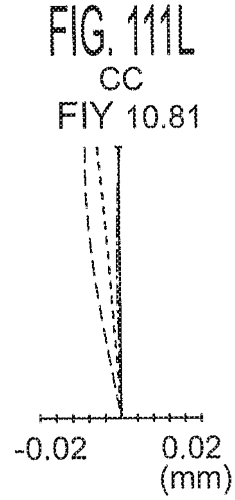
Figure 112A:
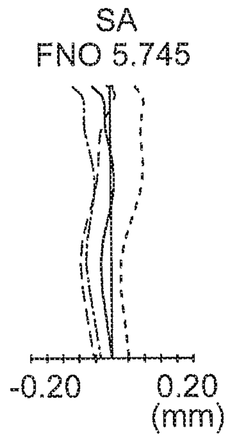
FIG. 112A, FIG. 112B, FIG. 112C, FIG. 112D, FIG. 112E, FIG. 112F, FIG. 112G, FIG. 112H, FIG. 112I, FIG. 112J, FIG. 112K, and FIG. 112L are aberration diagrams of the example 54.
Figure 112B:
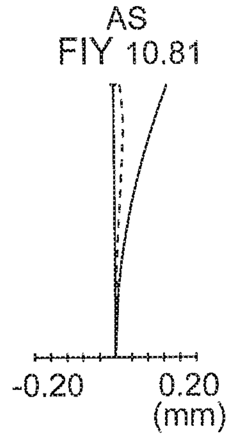
Figure 112C:
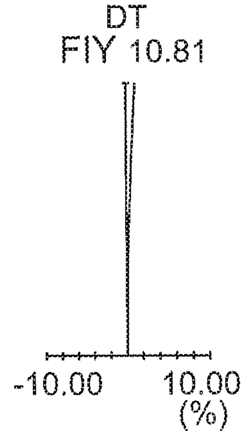
Figure 112D:
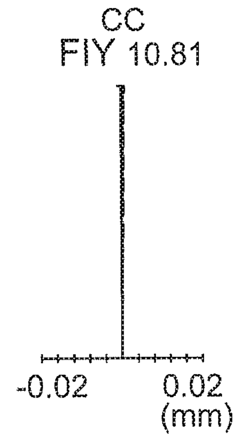
Figure 112E:
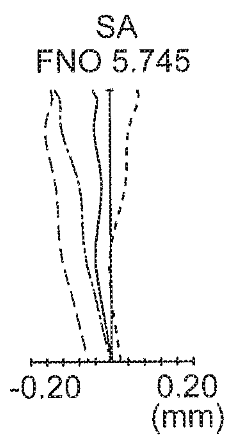
Figure 112F:
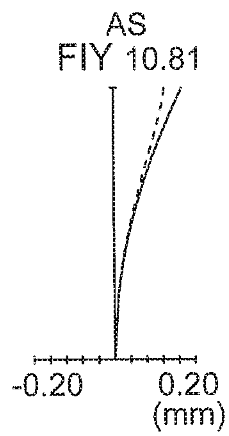
Figure 112G:
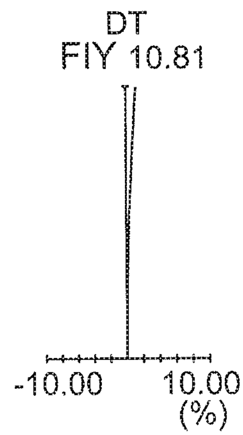
Figure 112H:
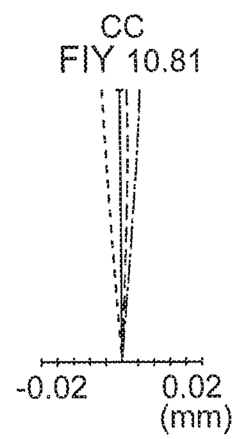
Figure 112I:
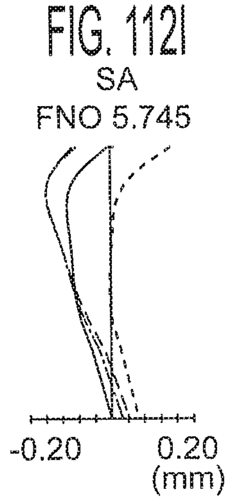
Figure 112J:
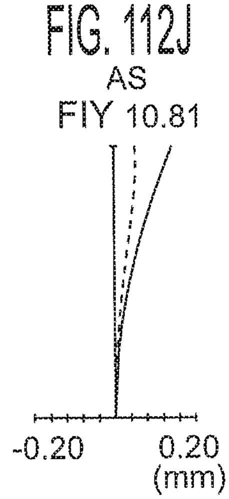
Figure 112K:
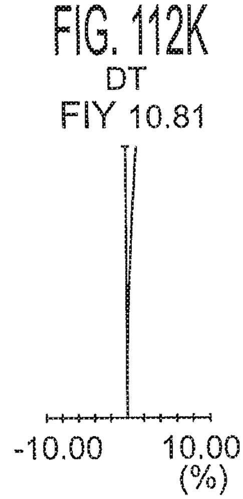
Figure 112L:
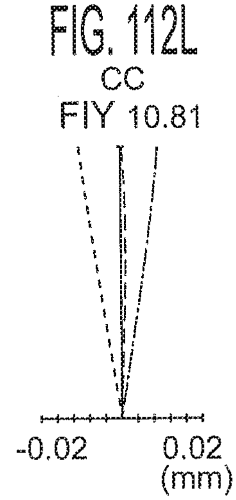
Figure 113A:
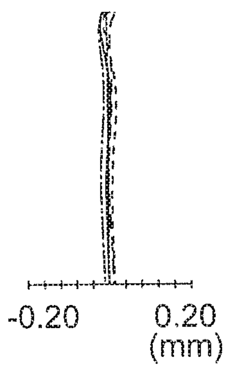
FIG. 113A, FIG. 113B, FIG. 113C, FIG. 113D, FIG. 113E, FIG. 113F, FIG. 113G, FIG. 113H, FIG. 113I, FIG. 113J, FIG. 113K, and FIG. 113L are aberration diagrams of the example 55.
Figure 113B:
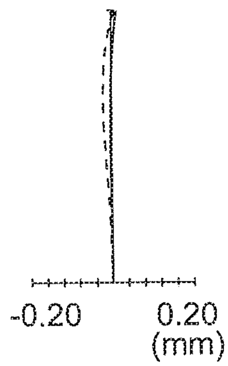
Figure 113C:
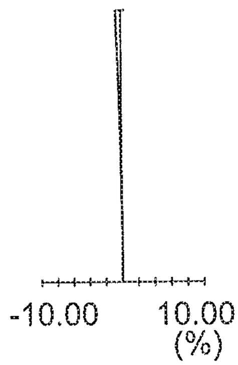
Figure 113D:
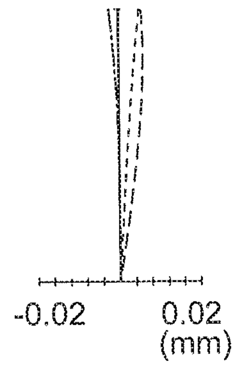
Figure 113E:
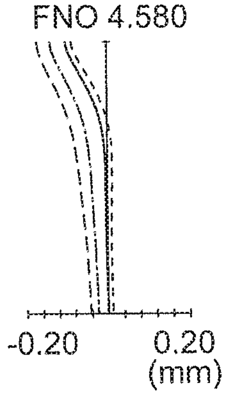
Figure 113F:
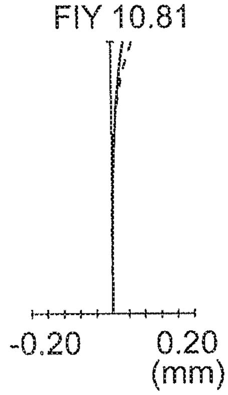
Figure 113G:
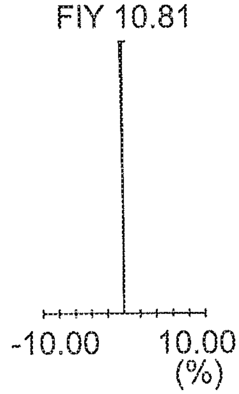
Figure 113H:
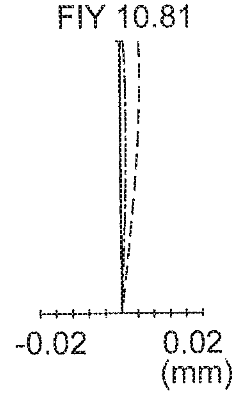
Figure 113I:
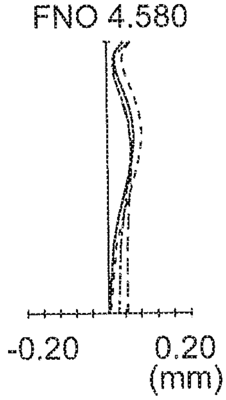
Figure 113J:
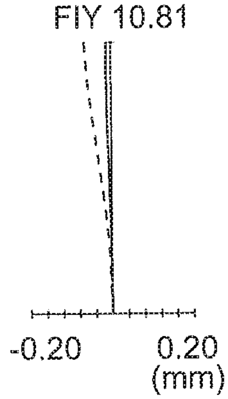
Figure 113K:
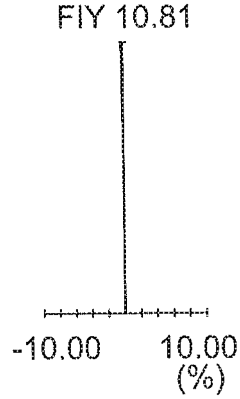
Figure 113L:
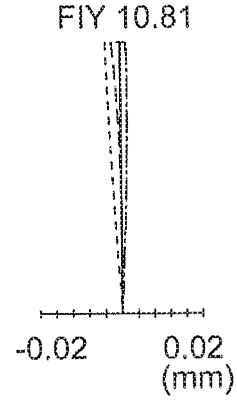
Figure 114A:
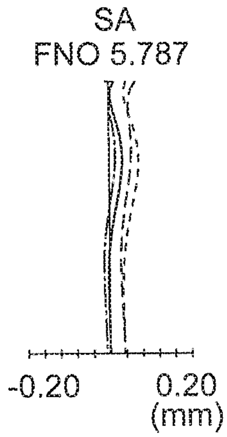
FIG. 114A, FIG. 114B, FIG. 114C, FIG. 114D, FIG. 114E, FIG. 114F, FIG. 114G, FIG. 114H, FIG. 114I, FIG. 114J, FIG. 114K, and FIG. 114L are aberration diagrams of the example 56.
Figure 114B:
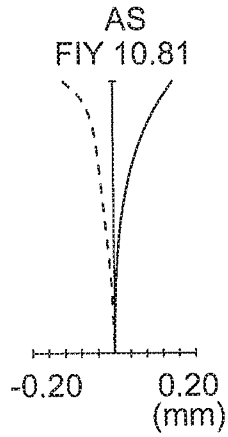
Figure 114C:
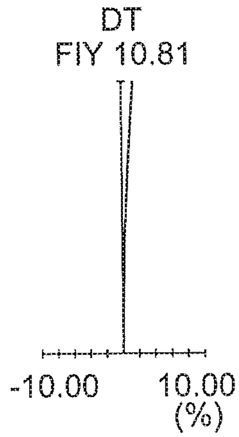
Figure 114D:
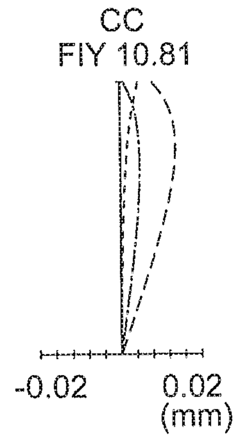
Figure 114E:
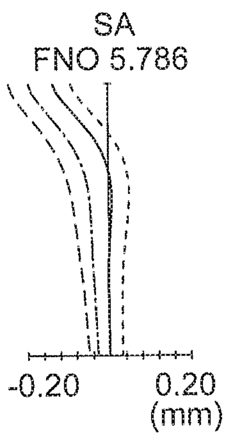
Figure 114F:
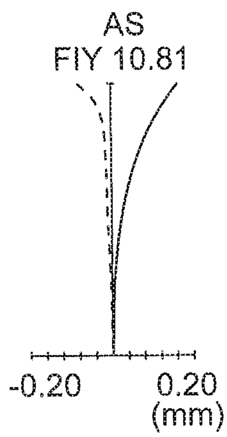
Figure 114G:
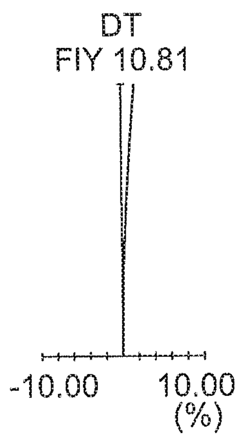
Figure 114H:
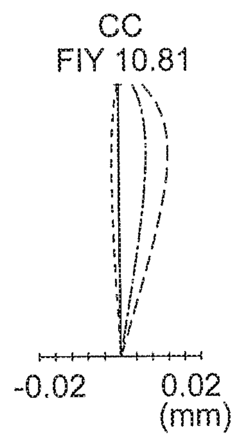
Figure 114I:
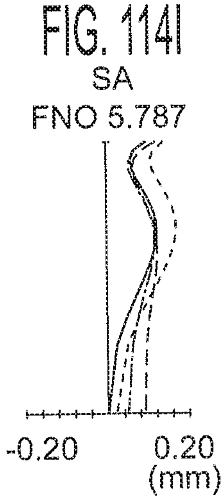
Figure 114J:
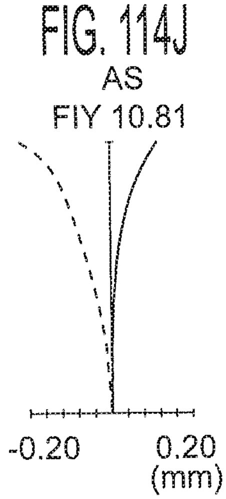
Figure 114K:
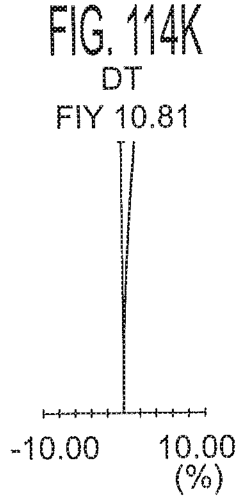
Figure 114L:
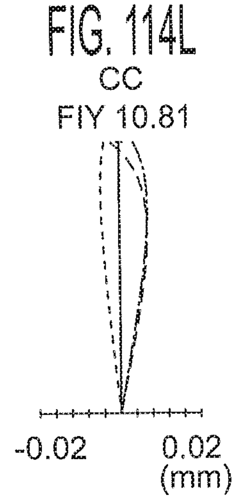
Figure 115A:
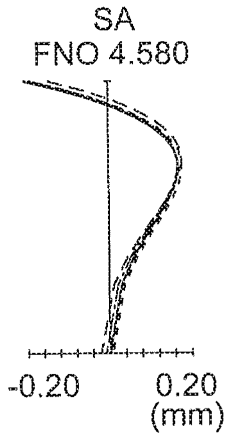
FIG. 115A, FIG. 115B, FIG. 115C, FIG. 115D, FIG. 115E, FIG. 115F, FIG. 115G, FIG. 115H, FIG. 115I, FIG. 115J, FIG. 115K, and FIG. 115L are aberration diagrams of the example 57.
Figure 115B:
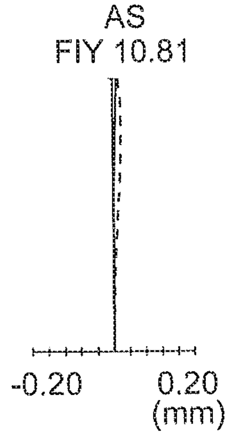
Figure 115C:
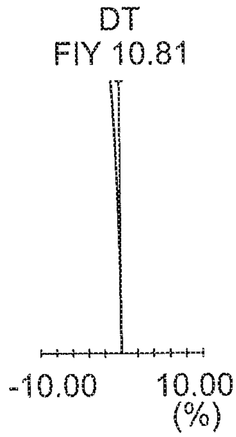
Figure 115D:
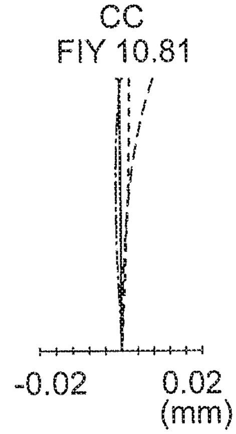
Figure 115E:
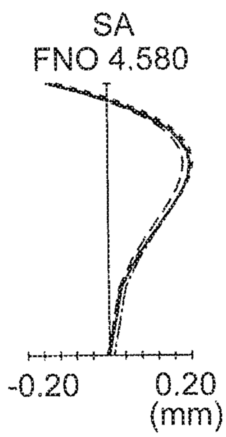
Figure 115F:
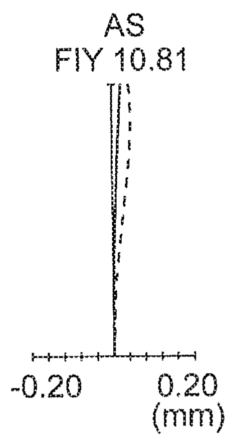
Figure 115G:
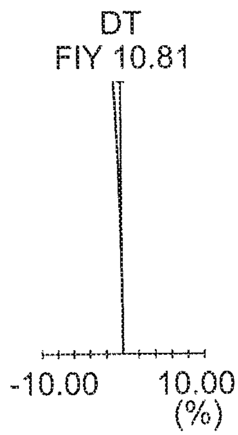
Figure 115H:
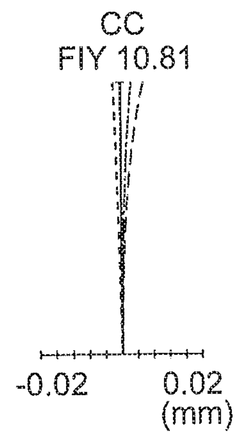
Figure 115I:
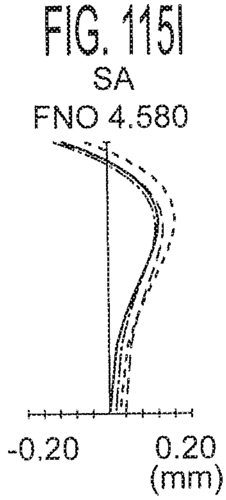
Figure 115J:
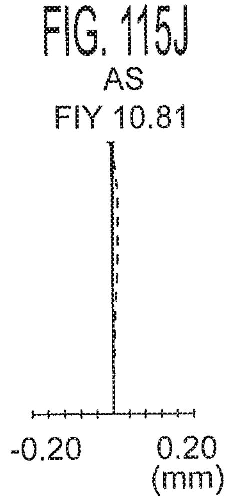
Figure 115K:
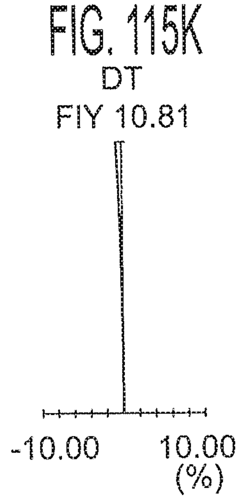
Figure 115L:
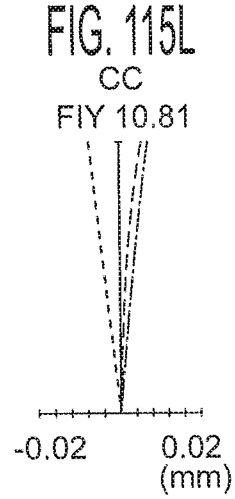
Figure 116A:
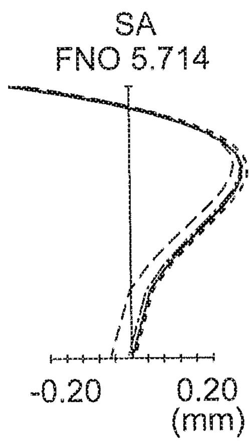
FIG. 116A, FIG. 116B, FIG. 116C, FIG. 116D, FIG. 116E, FIG. 116F, FIG. 116G, FIG. 116H, FIG. 116I, FIG. 116J, FIG. 116K, and FIG. 116L are aberration diagrams of the example 58.
Figure 116B:
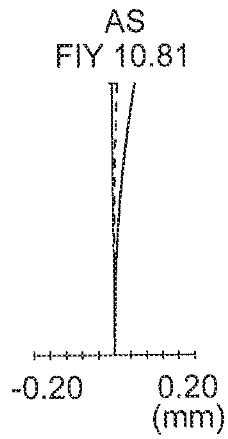
Figure 116C:
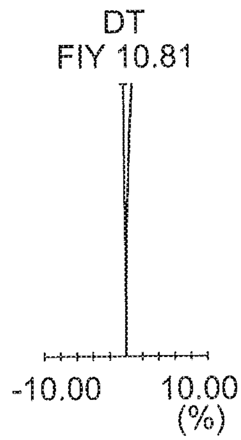
Figure 116D:
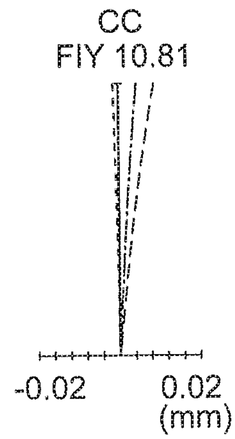
Figure 116E:
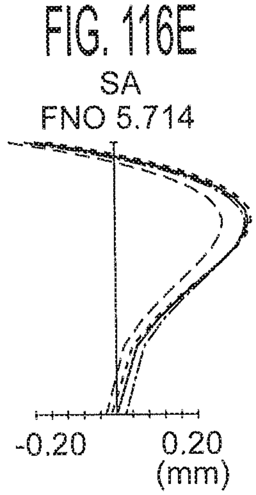
Figure 116F:
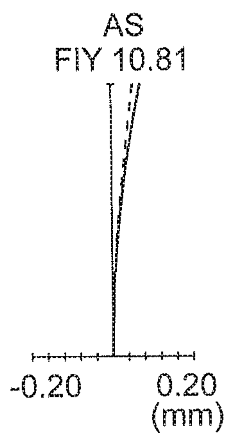
Figure 116G:
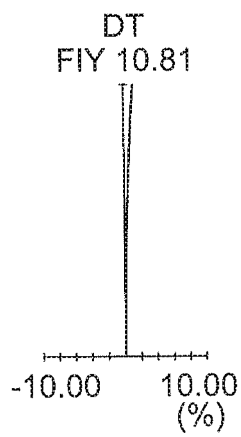
Figure 116H:
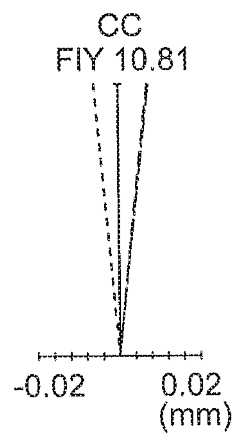
Figure 116I:
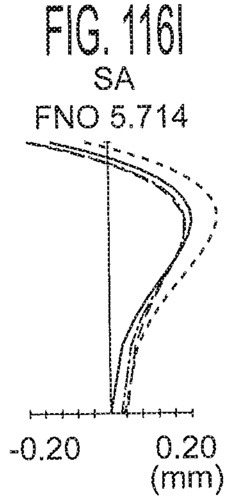
Figure 116J:
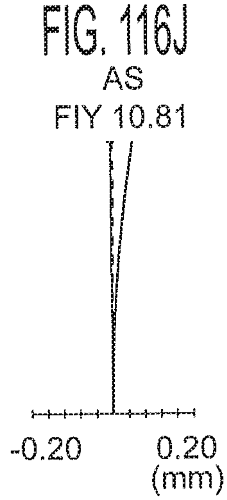
Figure 116K:
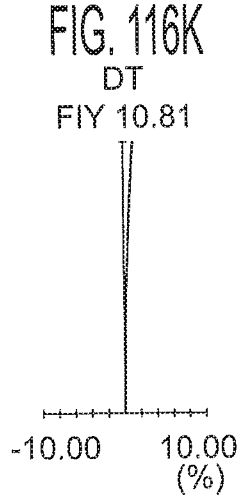
Figure 116L:
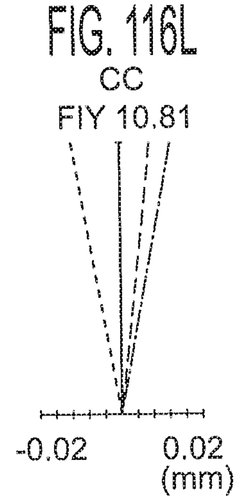

Prior to the explanation of examples, action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

A basic arrangement of zoom optical systems from a zoom optical system of a first embodiment up to a zoom optical system of a third embodiment (hereinafter, referred to as 'first basic arrangement') will be described below.

The first basic arrangement includes a front-side lens unit which is disposed nearest to an object, an intermediate lens unit, and a rear-side lens unit which is disposed nearest to an image, wherein the front-side lens unit includes in order from an object side, a first front unit having a positive refractive power and a second front unit having a negative refractive power, and each of the first front unit and the second front unit includes a positive lens and a negative lens, and a distance between the first front unit and the second front unit is wider at a telephoto end than at a wide angle end, and the intermediate lens unit includes in order from the object side, a first intermediate unit having a positive refractive power and a second intermediate unit having a negative refractive power, and the first intermediate unit includes a positive lens and a negative lens, and a distance between the first intermediate unit and the second front unit is narrower at the telephoto end than at the wide angle end, and a distance between the second intermediate unit and a lens unit adjacent to the second intermediate unit on an image side varies at a time of zooming or at a time of focusing, and the second intermediate unit moves toward the image side at the time of focusing from a far point to a near point, and the rear-side lens unit includes a positive lens and a negative lens, and the following conditional expression (1) is satisfied:

$$0.9 \leq LTLT/LTLW \leq 1.17 \quad (1)$$

where,

LTLW denotes an overall length of the zoom optical system at the wide angle end, and LTLT denotes an overall length of the zoom optical system at the telephoto end, and here the overall length is a distance from a lens surface positioned nearest to the object up to an image plane.

A basic arrangement of zoom optical systems from a zoom optical system of a fourth embodiment up to a zoom optical system of an eighth embodiment (hereinafter, referred to as 'second basic arrangement') will be described below.

The second basic arrangement includes a front-side lens unit which is disposed nearest to an object, an intermediate lens unit, and a rear-side lens unit which is disposed nearest to an image, wherein the front-side lens unit includes in order from an object side, a first front unit having a positive refractive power and a second front unit having a negative refractive power, and each of the first front unit and the second front unit includes a positive lens and a negative lens, and a distance between the first front unit and the second front unit is wider at a telephoto end than at a wide angle end, and the intermediate lens unit includes in order from the object side, a first intermediate unit, and a second intermediate unit having a negative refractive power, and the first intermediate unit includes in order from the object side, a first sub unit having a positive refractive power and a second subunit having a positive refractive power, and the first intermediate unit as a whole, includes a positive lens and a negative lens, and a distance between the first sub unit and the second front unit is narrower at the telephoto end than at the wide angle end, and a distance between the second intermediate unit and a lens unit adjacent to the second intermediate unit on an image side varies at a time of zooming or at a time of focusing, and the second intermediate unit moves toward the image side at the time of focusing from a far point to a near point, and the rear-side lens unit includes a positive lens, and the following conditional expression (1) is satisfied:

$$0.9 \leq LTLT/LTLW \leq 1.17 \quad (1)$$

where,

LTLW denotes an overall length of the zoom optical system at the wide angle end, and LTLT denotes an overall length of the zoom optical system at the telephoto end, and here the overall length is a distance from a lens surface positioned nearest to the object up to an image plane.

A zoom optical system having a half angle of view not more than 5 degrees or not more than 4 degrees is called as a telephoto zoom or a super-telephoto zoom. For securing a superior mobility in such zoom optical system, it is significant to shorten the overall length of an optical system and to make the optical system light-weight. Moreover, it is also significant to further increase a focusing speed for securing the superior mobility.

Moreover, in a zoom optical system, it is significant to have a favorable imaging performance in both of an entire zoom range and an entire focusing range. For securing a favorable imaging performance, correction of a spherical aberration and correction of a chromatic aberration become extremely significant.

In the first basic arrangement and the second basic arrangement, the front-side lens unit includes in order from the object side, the first front unit having a positive refractive power and the second front unit having a negative refractive power, and each of the first front unit and the second front unit includes the positive lens and the negative lens. By making such arrangement, it is possible to reduce an occurrence of the chromatic aberration in each lens unit. As a result, it is possible to suppress an occurrence of a longitudinal chromatic aberration and an occurrence of an off-axis chromatic aberration at the time of zooming.

The distance between the first front unit and the second front unit is wider at the telephoto end than at the wide angle end. By making such arrangement, it is possible to improve mainly a zooming effect as well as to enhance a telephoto effect near the telephoto end. Such arrangement contributes to securing a high zoom ratio and shortening the overall length of the optical system.

In the first basic arrangement, the intermediate lens unit includes in order from the object side, the first intermediate unit having a positive refractive power and the second intermediate unit having a negative refractive power, and the first intermediate unit includes the positive lens and the negative lens. The distance between the first intermediate unit and the second front unit is narrower at the telephoto end than at the wide angle end, and the distance between the second intermediate unit and the lens unit adjacent to the second intermediate unit on the image side varies either at the time of zooming or at the time of focusing. The second intermediate unit moves toward the image side at the time of focusing from a far point to a near point.

In the second basic arrangement, the intermediate lens unit includes in order from the object side, the first intermediate unit, and the second intermediate unit having a negative refractive power. The first intermediate unit includes in order from the object side, the first sub unit having a positive refractive power and the second sub unit having a positive refractive power, and the first intermediate unit as a whole, includes the positive lens and the negative lens. The distance between the first sub unit and the second sub unit is narrower at the telephoto end than at the wide angle end, and the distance between the second intermediate unit and the lens unit adjacent to the second intermediate unit on the image side varies either at the time of zooming or at the time of focusing. The second intermediate unit moves toward the image side at the time of focusing from a far point to a near point.

The first intermediate unit contributes substantially to shorten the overall length of the optical system and to an occurrence of the spherical aberration in the entire zoom range. By making the refractive power of the first intermediate unit large, it is possible to shorten the overall length of the optical system. However, when the refractive power of the first intermediate unit is made large, the occurrence of the spherical aberration becomes large.

In the first basic arrangement, the first intermediate unit includes the positive lens and the negative lens. Accordingly, even in a case of shortening the overall length of the optical system by making the refractive power of the first intermediate unit large, it is possible to suppress the occurrence of the spherical aberration and the occurrence of the longitudinal chromatic aberration.

In the second basic arrangement, the first intermediate unit includes in order from the object side, the first sub unit having a positive refractive power and the second sub unit having a positive refractive power, and the first intermediate unit as a whole includes at least the positive lens and the negative lens. Accordingly, even in a case of shortening the overall length of the optical system by making the refractive power of the first intermediate unit large, it is possible to suppress the occurrence of the spherical aberration and the occurrence of the longitudinal chromatic aberration.

It is possible to vary the distance between the first sub unit and the second sub unit at the time of zooming. By making such arrangement, it is possible suppress the occurrence of the spherical aberration in the entire zoom range.

Moreover, in the first basic arrangement and the second basic arrangement, by the second intermediate unit having a negative refractive power, it is possible to achieve a correction effect of spherical aberration. Moreover, by making the negative refractive power large, it is possible to improve further the correction effect of the spherical aberration. Accordingly, even when the refractive power of the first intermediate unit is made further larger and the overall length of the optical system is shortened, it is possible to correct the spherical aberration that has occurred in the first intermediate unit.

Moreover, in a case in which an image-plane position fluctuates at the time of focusing, by varying the distance between the second intermediate unit and the lens unit adjacent to the second intermediate unit on the image side, it is possible to make a diameter of the second intermediate unit small, and to improve a correction effect of the image-plane position. The image-plane position may fluctuate even at the time of zooming. The variation in the distance between the two lens units may be used for making the diameter of the second intermediate unit small and improving the correction effect of the image-plane position at the time of zooming.

Moreover, when the negative refractive power of the second intermediate unit is made large, as mentioned above, not only that the correction effect of the spherical aberration is improved, but also the correction effect of the image-plane position of the second intermediate unit is also improved. The improvement in the correction effect of image-plane position leads to an improvement in sensitivity of correction of the image-plane position, or in other words, to a reduction in an amount of movement of the second intermediate unit in the correction of image-plane position.

In an optical system having the overall length thereof shortened, an amount of movement of lens units is restricted. By reducing the amount of movement of the second intermediate unit, it is possible to reduce a fluctuation in the overall length of the optical system at the time of zooming. Accordingly, it is possible to reduce a fluctuation in a position of the center of gravity. As a result, it is possible to carry out a stable photography.

The second intermediate unit moves toward the image side at the time of focusing from the far point to the near point. Thus, the second intermediate unit functions as a focusing unit. As mentioned above, it is possible to make the diameter of the second intermediate unit small. Therefore, it is possible to make the focusing unit light-weight and to reduce the amount of movement of the focusing unit.

In the first basic arrangement, the first front unit has a positive refractive power, the second front unit has a negative refractive power, and the first intermediate unit has a positive refractive power. Therefore, the zoom optical system has a portion in which an arrangement of refractive power is a positive refractive power, a negative refractive power, and a positive refractive power. In such arrangement of refractive power, the distance between the first front unit and the second front unit is wider at the telephoto end than at the wide angle end, and the distance between the intermediate unit and the second front unit is narrower at the telephoto end than at the wide angle end.

By making such arrangement, it becomes easy to let a light ray in the first intermediate unit to be in a state close to afocal, over the entire zoom range. Accordingly, in a space from the first intermediate unit up to the image plane, it is possible to reduce a fluctuation in an angle of a light ray and a fluctuation in a height of a light ray at the time of zooming.

In the second basic arrangement, the first front unit has a positive refractive power and the second front unit has a negative refractive power, and the first intermediate unit includes the first sub unit having a positive refractive power and the second sub unit having a positive refractive power. Therefore, the zoom optical system has a portion in which an arrangement of refractive power is a positive refractive power, a negative refractive power, a positive refractive power, and a positive refractive power. In such arrangement of refractive power, the distance between the first front unit and the second front unit is wider at the telephoto end than at the wide angle end, and the distance between the first sub unit and the second front unit is narrower at the telephoto end than at the wide angle end.

By making such arrangement, it becomes easy to let a light ray in the first intermediate unit, or in other words, a light ray in the first sub unit and the second sub unit, to be in a state close to afocal, over the entire zoom range. Accordingly, in a space from the first sub unit up to the image plane, it is possible to reduce a fluctuation in an angle of a light ray and a fluctuation in a height of a light ray at the time of zooming.

In this case, in both of the first basic arrangement and the second basic arrangement, it is possible to reduce a fluctuation in the spherical aberration and a fluctuation in a curvature of field over the entire zoom range. Consequently, it becomes easy to reduce the number of lenses in the second intermediate unit. Moreover, since it is possible to reduce an aberration fluctuation caused due to a movement of the second intermediate unit at the time of focusing and at the time of zooming, it becomes easier to reduce the number of lenses in the second intermediate unit.

As mentioned above, the second intermediate unit functions as the focusing unit. Since it becomes easier to make the focusing unit light-weight by reducing the number of lenses in the second intermediate unit, it becomes easy to further increase the focusing speed. As a result, speedy focusing becomes possible.

In the first basic arrangement, the rear-side lens unit includes the positive lens and the negative lens. By making such arrangement, it is possible to achieve the following predetermined effect.

When the overall length of the optical system is shortened, mainly a positive distortion occurs in the first front unit. It is possible to correct the positive distortion favorably by the positive lens in the rear-side lens unit. Moreover, it is possible to improve a correction effect of a chromatic aberration of magnification. The chromatic aberration of magnification remains in the front-side lens unit. Therefore, it is possible to correct the chromatic aberration of magnification favorably by the negative lens in the rear-side lens unit.

The front-side lens unit, particularly the first front unit bears the shortening of the overall length of the optical system and correction of the chromatic aberration. By the rear-side lens unit including the positive lens and the negative lens, it is possible distribute a load on the first front unit to the rear-side lens unit. As a result, it is possible to achieve small-sizing of the optical system and securing a high imaging performance.

Moreover, a diameter of lenses being large in the first front unit, the first front unit has become a heavy lens unit. By distributing the load on the first front unit, it is possible to reduce the number of lenses in the first front unit. Moreover, since types of glasses that can be selected increases, it is possible to use a glass of a lower specific gravity in the first front unit. As a result, it becomes easy to make the first front unit light-weight.

In the second basic arrangement, the rear-side lens unit includes the positive lens. By making such arrangement, similarly as the abovementioned predetermined effect, it is possible to achieve the following effect.

When the overall length of the optical system is shortened, mainly the positive distortion occurs in the first front unit. It is possible to correct the positive distortion favorably by the positive lens in the rear-side lens unit.

It is possible to dispose a negative lens in the rear-side lens unit. By making such arrangement, it is possible improve the correction effect of the chromatic aberration of magnification by the negative lens in the rear-side lens unit. The chromatic aberration of magnification remains in the front-side lens unit. Therefore, it is possible to correct the chromatic aberration of magnification favorably by the negative lens in the rear-side lens unit.

In a telephoto zoom or a super-telephoto zoom, a diameter of a lens unit nearest to the object becomes large. Consequently, a weight of the lens unit nearest to the object becomes extremely heavy as compared to other lens units. When a heavy lens unit moves substantially at the time of zooming, a fluctuation in the position of the center of gravity before the movement of the lens unit and after the movement of the lens unit becomes large. A large fluctuation in the position of the center of gravity causes an image shift at the time of photography. Thus, the movement of the lens unit nearest to the object hinders a stable photography.

Moreover, in a moving a lens unit, a lens barrel which holds the lens unit is moved with respect to a circular cylindrical member. The circular cylindrical member is disposed at an outer side of the lens barrel. The lens barrel moves along an inner peripheral surface of the circular cylindrical member. Consequently, there is more than a little mechanical resistance at the time of movement of a lens unit. When a heavy lens unit moves, the mechanical resistance becomes high. As the mechanical resistance becomes high, an operability of an image pickup apparatus is degraded. Consequently, the movement of the lens unit nearest to the object hinders realization of a favorable operability.

In the first basic arrangement and the second basic arrangement, the first front unit is disposed nearest to the object. Therefore, in the first basic arrangement and the second basic arrangement, for reducing the abovementioned effect or for eliminating the abovementioned effect, an amount of movement of the first front unit at the time of zooming has been regulated.

In a case of falling below a lower limit value of conditional expression (1) or in a case of exceeding an upper limit value of conditional expression (1), the fluctuation in the position of the center of gravity and a drive resistance at the time of zooming becomes large. Consequently, it becomes difficult to carry out a stable photography or to realize a favorable operability. When a value of conditional expression (1) is 1, the overall length of the zoom optical system does not vary at the time of zooming. In other words, in the zoom optical system, the overall length of the optical system is fixed.

In the first basic arrangement, at the time of zooming, it is possible to move one of the first intermediate unit and the second intermediate unit.

It is possible to reduce easily the drive resistance and the fluctuation in the position of the center of gravity by improving an effect achieved by the intermediate lens unit. By moving one of the first intermediate unit and the second intermediate unit, it is possible to improve the effect achieved by the intermediate lens unit. In other words, it is possible to correct favorably the fluctuation in the image-plane position at the time of zooming. Moreover, it becomes easy to reduce the fluctuation in the overall length of the optical system or to fix the overall length of the optical system.

In the second basic arrangement, at the time of zooming, it is possible to move one of the first sub unit and the second intermediate unit.

It is possible to reduce easily the drive resistance and the fluctuation in the position of the center of gravity by improving an effect achieved by the intermediate lens unit. By moving one of the first sub unit and the second intermediate unit, it is possible to improve the effect achieved by the intermediate lens unit. In other words, it is possible to correct favorably the fluctuation in the image-plane position at the time of zooming. Moreover, it becomes easy to reduce the fluctuation in the overall length of the optical system or to fix the overall length of the optical system.

A zoom optical system of a first embodiment has the abovementioned first basic arrangement, and the following conditional expression (2) is satisfied:

$$4.2 \leq KMBT \leq 20.0 \tag{2}$$

where, $KMBT = |MGMBTback^2 \times (MGMBT^2 - 1)|$, where

MGMBTback denotes a lateral magnification of a first predetermined optical system at the telephoto end, MGMBT denotes a lateral magnification of the second intermediate unit at the telephoto end, and here the first predetermined optical system is an optical system which includes all lenses positioned on the image side of the second intermediate unit, and the lateral magnification is a lateral magnification at a time of infinite object point focusing.

In a case of falling below a lower limit value of conditional expression (2), the correction effect of the image-plane position in the second intermediate unit is weakened. In this case, the fluctuation in the overall length of the optical system at the time of zooming becomes large. In this case, since it becomes difficult to reduce the fluctuation in the position of the center of gravity, a stable photography becomes difficult.

In a case of exceeding an upper limit value of conditional expression (2), an error of an image forming position due to an error in the position of the second intermediate unit becomes large. Consequently, it is not possible to achieve a sharp optical image.

A zoom optical system of a second embodiment has the abovementioned first basic arrangement, and a motion blur correction lens unit is included between the first intermediate unit and the image plane, and an image blur is corrected by the motion blur correction lens unit being moved in a direction perpendicular to an optical axis.

By moving the lens unit in the direction perpendicular to the optical axis, it is possible to correct a shift in an image forming position occurring due to camera shake (hereinafter, referred to as 'image blur'). At this time, when the lens unit that is to be moved (hereinafter, referred to as 'image blur correction lens unit') is small-sized and light-weight, it is possible to carry out correction of the image blur quickly. Moreover, when a fluctuation in aberration due to the movement of the lens unit is small, it is possible to suppress deterioration of imaging performance.

As mentioned above, in the first basic arrangement, between the first intermediate unit and the image plane, at the time of zooming, the fluctuation in the angle of a light ray and the fluctuation in the height of a light ray are small. Consequently, even when a lens unit moves between the first intermediate unit and the image plane, a fluctuation in aberration caused by the movement of the lens unit is small.

Therefore, the motion blur correction lens unit is disposed between the first intermediate unit and the image plane, and the motion blur correction lens unit is moved in the direction perpendicular to the optical axis. By making such arrangement, even when the image blur occurs, it is possible to correct the image blur while securing a stable imaging performance over the entire zoom range.

Moreover, an image forming optical system is formed between the first intermediate unit and the image plane. In the image forming optical system, a variation in the height of alight ray is small over the entire zoom range. Consequently, when the motion blur correction lens unit is disposed between the first intermediate unit and the image plane, it is possible to make a diameter of the motion blur correction lens unit small. When it is possible to make the diameter of the motion blur correction lens unit small, it is possible to improve a response of the motion blur correction lens unit. As a result, it is possible to correct the image blur at a high speed.

It is possible to make the refractive power of the motion blur correction lens unit a negative refractive power. As mentioned above, the image forming optical system is formed between the first intermediate unit and the image plane. The refractive power of the image forming optical system being a positive refractive power, when the refractive power of the motion blur correction lens unit is let to be a negative refractive power, a motion blur correction lens unit having a negative refractive power is disposed in the optical system of a positive refractive power.

By making such arrangement, it is possible to make large an amount of shift in an image forming position with respect to an amount of shift of the motion blur correction lens unit (hereinafter, referred to as 'sensitivity of image blur correction'). In other words, it is possible to make the amount of shift of the motion blur correction lens unit small. As a result, it is possible to make a correction at a high speed.

Moreover, a light beam is converged in the image forming optical system. Therefore, by disposing the motion blur correction lens unit in the image forming optical system, it is possible to facilitate making the diameter of the motion blur correction lens unit small. Accordingly, it is possible to realize a motion blur correction lens unit which is light-weight and which has a high sensitivity of image blur correction. In other words, it is possible to improve the response of the motion blur correction lens unit. As a result, it is possible to correct the image blur at a high speed.

A zoom optical system of a third embodiment has the abovementioned first basic arrangement, and a motion blur correction lens unit is included between the first intermediate unit up to the image plane, and an image blur is corrected by the motion blur correction lens unit being moved in a direction perpendicular to the optical axis, and the following conditional expression (2') is satisfied:

$$2.5 \le KMBT \le 20.0 \tag{2'}$$

where, $$KMBT = |MGMBT\text{back}^2 \times (MGMBT^2 - 1)|, \text{ where}$$

MGMBTback denotes a lateral magnification of a first predetermined optical system at the telephoto end, and MGMBT denotes a lateral magnification of the second intermediate unit at the telephoto end, and here the first predetermined optical system is an optical system which includes all lenses positioned on the image side of the second intermediate unit, and the lateral magnification is a lateral magnification at a time of infinite object point focusing.

An action effect of disposing the motion blur correction lens unit is as mentioned above, and a technical significance of conditional expression (2') is same as the technical significance of conditional expression (2).

In the zoom optical system of the second embodiment and the zoom optical system of the third embodiment, it is preferable that the following conditional expression (2) be satisfied:

$$4.2 \le KMBT \le 20.0 \tag{2}$$

where, $$KMBT = |MGMBT\text{back}^2 \times (MGMBT^2 - 1)|, \text{ where}$$

MGMBTback denotes the lateral magnification of a first predetermined optical system at the telephoto end, MGMBT denotes the lateral magnification of the second intermediate unit at the telephoto end, and here the first predetermined optical system is an optical system which includes all lenses positioned on the image side of the second intermediate unit, and the lateral magnification is a lateral magnification at the time of infinite object point focusing.

The technical significance of conditional expression (2) is as mentioned above.

A zoom optical system of a fourth embodiment has the abovementioned second basic arrangement, and a motion blur correction lens unit having a negative refractive power is included between the first sub unit and the image plane, and an image blur is corrected by the motion blur correction lens unit being moved in a direction perpendicular to an optical axis, and the following conditional expression (2a) is satisfied:

$$4.4 \le KMBT \le 20.0 \tag{2a}$$

where, $$KMBT = |MGMBT\text{back}^2 \times (MGMBT^2 - 1)|, \text{ where}$$

MGMBTback denotes a lateral magnification of a first predetermined optical system at the telephoto end, MGMBT denotes a lateral magnification of the second intermediate unit at the telephoto end, and here the first predetermined optical system is an optical system which includes all lenses positioned on the image side of the second intermediate unit, and the lateral magnification is a lateral magnification at a time of infinite object point focusing.

As mentioned above, in the second basic arrangement, between the first sub unit and the image plane, at the time of zooming, the fluctuation in the angle of a light ray and the fluctuation in the height of a light ray are small. Consequently, even when a lens unit moves between the first sub unit and the image plane, a fluctuation in aberration caused by the movement of the lens unit is small.

Therefore, the motion blur correction lens unit is disposed between the first sub unit and the image plane, and the motion blur correction lens unit is moved in the direction perpendicular to the optical axis. By making such arrangement, even when the image blur occurs, it is possible to correct the image blur while securing a stable imaging performance over the entire zoom range.

Moreover, an image forming optical system is formed between the first sub unit and the image plane. In the image forming optical system, a variation in the height of a light ray is small over the entire zoom range. Consequently, when the motion blur correction lens unit is disposed between the first sub unit and the image plane, it is possible to make a diameter of the motion blur correction lens unit small. When it is possible to make the diameter of the motion blur correction lens unit small, it is possible to improve a response of the motion blur correction lens unit. As a result, it is possible to correct the image blur at a high speed.

The motion blur correction lens unit has a negative refractive power. As mentioned above, the image forming optical system is formed between the first sub unit and the image plane. The refractive power of the image forming optical system being a positive refractive power, when the refractive power of the motion blur correction lens unit is a negative refractive power, a motion blur correction lens unit having a negative refractive power is disposed in the optical system of a positive refractive power.

By making such arrangement, it is possible to make the sensitivity of image blur correction large. In other words, it is possible to make the amount of shift of the motion blur correction lens unit small. As a result, it is possible to make a correction at a high speed.

Moreover, a light beam is converged in the image forming optical system. Therefore, by disposing the motion blur correction lens unit in the image forming optical system, it is possible to facilitate making the diameter of the motion blur correction lens unit small. Accordingly, it is possible to realize a motion blur correction lens unit which is lightweight and which has a high sensitivity of image blur correction. In other words, it is possible to improve the response of the motion blur correction lens unit. As a result, it is possible to correct the image blur at a high speed.

A technical significance of conditional expression (2a) is same as the technical significance of conditional expression (2).

A zoom optical system of a fifth embodiment has the abovementioned second basic arrangement, and a motion blur correction lens unit having a negative refractive power is included between the first sub unit and the image plane, and an image blur is corrected by the motion blur correction lens unit being moved in a direction perpendicular to an optical axis, and in a lens unit which includes the motion blur correction lens unit, a position is fixed at the time of zooming and at the time of focusing.

An action effect of disposing the motion blur correction lens unit is as mentioned above.

At the time of zooming and at the time of focusing, a lens unit moves along the optical axis. In the lens unit that moves along the optical axis, there is shaking of a posture of the lens unit and an error caused in a static position due to the movement of the lens unit. Consequently, when the motion blur correction lens unit is disposed in the lens unit that moves at the time of zooming or at the time of focusing, it is difficult to move the motion blur correction lens unit with high accuracy.

For achieving an image with high resolution such as an image of more than 4K, it is necessary that a sharp optical image is formed. For forming the sharp optical image even when the image blur occurs, a high accuracy is sought for the movement of the motion blur correction lens unit.

As mentioned above, in the lens unit to be moved at the time of zooming or at the time of focusing, it is difficult to move the motion blur correction lens unit with high accuracy. Consequently, it is not preferable to dispose the motion blur correction lens unit in a lens unit that is to be moved at the time of zooming or at the time of focusing.

A zoom optical system of a sixth embodiment has the abovementioned second basic arrangement, and a motion blur correction lens unit having a negative refractive power is disposed in the rear-side lens unit, and an image blur is corrected by the motion blur correction lens unit being moved in a direction perpendicular to the optical axis.

The rear-side lens unit being positioned nearest to the image, a diameter of an axial light beam has become small at a position of the rear-side lens unit. Therefore, even when a lens is moved at a position of the rear-side lens unit, an effect for the spherical aberration is comparatively smaller as compared to a case in which the lens is moved in other lens unit. By disposing the motion blur correction lens unit in the rear-side lens unit, it is possible to suppress degradation of the spherical aberration at the time of moving even when the motion blur correction lens unit is moved.

The rear-side lens unit may include one sub unit and the motion blur correction lens unit. In this case, the sub unit may be positioned on the object side of the motion blur correction lens unit or on the image side of the motion blur correction lens unit.

Or, the rear-side lens unit may include two sub units and the motion blur correction lens unit. In this case, one sub unit may be positioned on the object side of the motion blur correction lens unit and the other sub unit may be positioned on the image side of the motion blur correction lens unit.

In a case of letting the refractive power of the motion blur correction lens unit to be a negative refractive power in such arrangement, it is preferable to let the refractive power of the sub unit to be a positive refractive power. By making such arrangement, it becomes easy to secure the high sensitivity of image blur correction, and to correct tilting of image plane when the motion blur correction lens unit moves.

A zoom optical system of a seventh embodiment has the abovementioned second basic arrangement, and a motion blur correction lens unit having a negative refractive power is disposed in a lens unit having a positive refractive power in the first intermediate unit, and an image blur is corrected by the motion blur correction lens unit being moved in a direction perpendicular to the optical axis, and in a lens unit which includes the motion blur correction lens unit, a position is fixed at the time of zooming and at the time of focusing.

The first intermediate unit includes two subunits having a positive refractive power. Therefore, it is possible to make the positive refractive power large in the first intermediate unit. The refractive power of the motion blur correction lens unit being a negative refractive power, a lens unit having a negative refractive power is disposed in a lens unit having a large positive refractive power. Consequently, it is possible to improve further an effect of making the motion blur correction lens unit with a small diameter and light-weight and an effect of an ability to make the sensitivity of image blur correction high. As a result, it is possible to correct the image blur with even higher speed.

A zoom optical system of the eighth embodiment has the abovementioned second basic arrangement, and the following conditional expression (2a') is satisfied:

$$4.7 \leq KMBT \leq 20.0 \quad (2a')$$

where, $$KMBT = |MGMBTback^2 \times (MGMBT^2 - 1)|, \text{ where}$$

MGMBTback denotes a lateral magnification of a first predetermined optical system at the telephoto end, and MGMBT denotes a lateral magnification of the second intermediate unit at the telephoto end, and here the first predetermined optical system is an optical system which includes all lenses positioned on the image side of the second intermediate unit, and the lateral magnification is a lateral magnification at a time of infinite object point focusing.

An action effect of disposing the motion blur correction lens unit is as mentioned above. A technical significance of conditional express (2a') is same as the technical significance of conditional expression (2).

In the zoom optical system of the fifth embodiment, the zoom optical system of the sixth embodiment, and the zoom optical system of the seventh embodiment, it is preferable that the following conditional expression (2a) be satisfied:

$$4.4 \leq KMBT \leq 20.0 \quad (2a)$$

where, $$KMBT = |MGMBTback^2 \times (MGMBT^2 - 1)|, \text{ where}$$

MGMBTback denotes the lateral magnification of a first predetermined optical system at the telephoto end, MGMBT denotes the lateral magnification of the second intermediate unit at the telephoto end, and here the first predetermined optical system is an optical system which includes all lenses positioned on the image side of the second intermediate unit, and the lateral magnification is a lateral magnification at the time of infinite object point focusing.

The technical significance of conditional expression (2a) is as mentioned above.

A zoom optical systems from the zoom optical system of the first embodiment to the zoom optical system of the eighth embodiment will be referred to as 'the zoom optical system of the present embodiment'. A zoom optical systems from the zoom optical system of the first embodiment to the zoom optical system of the third embodiment will be referred to as 'the zoom optical system of type 1'. A zoom optical systems from the zoom optical system of the fourth embodiment to the zoom optical system of the eighth embodiment will be referred to as 'the zoom optical system of type 2').

In the zoom optical system of the present embodiment, it is preferable that the following conditional expression (3) be satisfied:

$$0.45 \leq fFB/fMB \leq 3.0 \quad (3)$$

where, fFB denotes a focal length of the second front unit, and fMB denotes a focal length of the second intermediate unit.

In a case of falling below a lower limit value of conditional expression (3), the correction effect of the image-plane position in the second intermediate unit is weakened. In this case, an amount of movement of the second intermediate unit at the time of focusing becomes large. Consequently, small-sizing of the optical system becomes difficult. Or, the occurrence of the spherical aberration in the second front unit becomes large. Consequently, it is not possible to achieve a favorable imaging performance.

In a case of exceeding an upper limit value of conditional expression (3), the occurrence of the spherical aberration in the second intermediate unit becomes large. Consequently, it is not possible to achieve a favorable imaging performance.

In the zoom optical system of the present embodiment, it is preferable that the following conditional expression (4) be satisfied:

$$0.7 \leq LTLT/fFF \leq 3.0 \quad (4)$$

where,

LTLT denotes the overall length of the zoom optical system at the telephoto end, and fFF denotes a focal length of the first front unit, here the overall length is the distance from the lens surface positioned nearest to the image up to the image plane.

In a case of falling below a lower limit value of conditional expression (4), the refractive power of a lens unit having a positive refractive power which is positioned between the first intermediate unit and the rear-side lens unit becomes excessively large. Consequently, correction of the spherical aberration becomes difficult.

In a case of exceeding an upper limit value of conditional expression (4), the occurrence of the spherical aberration in the first front unit becomes large. Consequently, it is not possible to achieve a favorable imaging performance.

It is preferable that the zoom optical system of the first embodiment include the motion blur correction lens unit between the first intermediate unit and the image plane, and the image blur be corrected by the motion blur correction lens unit being moved in the direction perpendicular to the optical axis.

It is preferable that the zoom optical system of the fifth embodiment include the motion blur correction lens unit between the first sub unit and the image plane, and the image blur be corrected by the motion blur correction lens unit being moved in the direction perpendicular to the optical axis.

The action effect by disposing the motion blur correction lens unit is as mentioned above.

In the zoom optical system of the present embodiment, it is preferable that the following conditional expression (5) be satisfied:

$$0.7 \leq KIST \leq 3.5 \quad (5)$$

where, $$KIST = |MGISTback \times (MGIST - 1)|, \text{ where}$$

MGISTback denotes a lateral magnification of a second predetermined optical system at the telephoto end, and MGIST denotes a lateral magnification of the motion blur correction lens unit at the telephoto end, and here the second predetermined optical system is an optical system which includes all lenses positioned on the image side of the motion blur correction lens unit, and the lateral magnification is a lateral magnification at the time of infinite object point focusing.

In a case of falling below a lower limit value of conditional expression (5), the amount of movement of the motion blur correction lens unit is to be made large in order to achieve a correction effect of image blur. Consequently, a diameter of the zoom optical system becomes large.

In a case of exceeding an upper limit value of conditional expression (5), the occurrence of the spherical aberration and an occurrence of an astigmatism in the motion blur correction lens unit become large. Consequently, imaging performance at the time of image blur correction is degraded substantially.

In the zoom optical system of type 1, it is preferable that the following conditional expression (6) be satisfied:

$$0.06 \leq \Delta MVFB/LTLT \leq 0.45 \quad (6)$$

where,

ΔMVFB denotes the maximum amount of movement of the second front unit at the time of zooming, and LTLT denotes the overall length of the zoom optical system at the telephoto end, and here the overall length is the distance from the lens surface positioned nearest to the object side up to the image plane.

In the zoom optical system of type 2, it is preferable that the following conditional expression (6a) be satisfied:

$$0.04 \leq \Delta MVFB/LTLT \leq 0.45 \quad (6a)$$

where,

ΔMVFB denotes the maximum amount of movement of the second front unit at the time of zooming, and LTLT denotes the overall length of the zoom optical system at the telephoto end, and here the overall length is the distance from the lens surface positioned nearest to the object side up to the image plane.

In a case of falling below a lower limit value of conditional expression (6), it is hard to achieve an adequate zoom ratio such as the zoom ratio more than double. Consequently, it is not possible to deal with various photographic scenes. Or, the overall length of the optical system becomes excessively long. Consequently, the mobility is degraded.

In a case of exceeding an upper limit value of conditional expression (6), the amount of movement of the second front unit with respect to the overall length of the optical system becomes excessively large. Consequently, an overall length of the second front unit becomes long.

A technical significance of conditional expression (6a) is same as the technical significance of conditional expression (6).

In the zoom optical system of the present embodiment, it is preferable that the following conditional expression (7) be satisfied:

$$1.6 \leq |fFF/fFB| \leq 5.0 \quad (7)$$

where, fFF denotes the focal length of the first front unit, and fFB denotes the focal length of the second front unit.

In a case of falling below a lower limit value of conditional expression (7), the refractive power of the first front unit becomes large. In this case, since a weight of the first front unit increases, it becomes difficult to make the optical system light-weight. In a case of exceeding an upper limit value of conditional expression (7), an effect by a telephoto arrangement is weakened. Consequently, it becomes difficult to shorten the overall length of the optical system.

In the zoom optical system of type 1, it is preferable that the following conditional expression (8) be satisfied:

$$0.4 \leq |fMF/fMB| \leq 3.5 \quad (8)$$

where, fMF denotes a focal length of the first intermediate unit, and fMB denotes the focal length of the second intermediate unit.

In a case of falling below a lower limit value of conditional expression (8), the correction effect of the spherical aberration in the second intermediate unit is weakened. Consequently, the tendency of the spherical aberration occurring to be 'under' increases. In a case of exceeding an upper limit value of conditional expression (8), the correction effect of the spherical aberration in the second intermediate unit becomes strong. Consequently, the tendency of the spherical aberration occurring to be 'over' increases. Therefore, it is neither preferable that the value fall below the lower limit value of conditional expression (8), nor preferable to exceed the upper limit value of conditional expression (8).

In the zoom optical system of type 2, it is preferable that the following conditional expression (29) be satisfied:

$$0.5 \leq |fMF2/fMB| \leq 3.5 \quad (29)$$

where, fMF2 denotes a focal length of the second sub unit, and fMB denotes the focal length of the second intermediate unit.

In a case of falling below a lower limit value of conditional expression (29), the correction effect of the spherical aberration in the second intermediate unit is weakened. Consequently, the tendency of the spherical aberration occurring to be 'under' increases. In a case of exceeding an upper limit value of conditional expression (29), the correction effect of the spherical aberration in the second intermediate unit becomes strong. Consequently, the tendency of the spherical aberration occurring to be 'over' increases. Therefore, it is neither preferable that the value fall below the lower limit value of conditional expression (29), nor preferable to exceed the upper limit value of conditional expression (29).

In the zoom optical system of the present embodiment, it is preferable that the overall length of the zoom optical system do not vary at the time of zooming and at the time of focusing.

In a telephoto zoom or a super-telephoto zoom, a diameter of a lens unit nearest to the object becomes large. Consequently, a weight of the lens unit nearest to the object becomes extremely heavy as compared to other lens units. When a heavy lens unit moves substantially at the time of zooming, a fluctuation in the position of the center of gravity before the movement of the lens unit and after the movement of the lens unit becomes large. A large fluctuation in the position of the center of gravity causes an image shift at the time of photography. Thus, the movement of the lens unit nearest to the object hinders a stable photography.

The first front unit is positioned nearest to the object. By making an arrangement such that the overall length of the zoom optical system does not vary at the time of zooming and at the time of focusing, it is possible to let a position of the first front unit to be in a fixed state all the time. Accordingly, it is possible to lessen the fluctuation in the position of the center of gravity in both of the entire zoom range and the entire focusing range. As a result, it is possible to carry out a stable photography.

Moreover, since it is possible to hold the first front unit stably, it is possible to secure a stable imaging performance over the entire zoom range as well as the entire focusing range.

In the zoom optical system of the present embodiment, it is preferable that a position of the rear-side lens unit be fixed at the time of zooming.

For example, an entry of dirt, dust, or moisture into an optical system leads to degradation of an imaging performance. By letting the position of the rear-side lens unit to be fixed, it becomes easy to prevent the entry of dirt, dust, or moisture from the image side, by a simple structure.

In the zoom optical system of type 1, it is preferable that a position of the first intermediate unit be fixed at the time of zooming and at the time of focusing.

The first intermediate unit contributes significantly to shortening the overall length of the optical system and the occurrence of the spherical aberration in the entire zoom range. Consequently, when an error due to shift or an error due to tilt occurs in the first intermediate unit, the imaging performance is degraded due to the error. The error due to shift and the error due to tilt occur due to the movement of the first intermediate unit. By letting the position of the first intermediate unit to be fixed, it is possible to prevent the occurrence of these errors. As a result, it is possible to achieve a stable imaging performance.

In the zoom optical system of type 1, it is preferable that the first intermediate unit move at the time of zooming.

The first intermediate unit contributes significantly to the shortening the overall length of the optical system and the occurrence of the spherical aberration in the entire zoom range. Consequently, when an error due to shift or an error due to tilt occurs in the first intermediate unit, the imaging performance is degraded due to the error.

However, when the first intermediate unit is moved, it is possible to improve the correction effect of the spherical aberration and the correction effect of the image-plane position. Therefore, the first intermediate unit is to be moved upon securing a high positional accuracy. By making such arrangement, it is possible to improve the correction effect of the spherical aberration and the correction effect of the image-plane position.

In the zoom optical system of type 1, it is preferable that only two lens units move at the time of zooming.

When the number of lens units to be moved is made large, maintaining a high imaging performance becomes easy. However, when such an arrangement is made, an effect of an error due to shift, an error due to tilt, or an error of optical-axis position shift becomes substantial. These errors effect the degradation of imaging performance.

Moreover, when the fluctuation in the position of the center of gravity at the time of zooming is large, it becomes difficult to carry out stable photography. Therefore, it is significant to reduce the fluctuation in the position of the center of gravity at the time of zooming. For this, a reduction in the fluctuation in the overall length of the optical system becomes necessary. When the number of lens units to be moved is made large, reduction in the fluctuation of the overall length becomes easy.

In such manner, it is desirable to determine the number of lens units to be moved at the time of zooming upon taking into consideration, maintaining high imaging performance, suppressing degradation of imaging performance, and reducing the fluctuation in the overall length of the optical system.

In a case of placing significance on suppressing the degradation of imaging performance, it is preferable to let the number of lens units to be moved at the time of zooming to be only two. By moving only two lens units, it is possible to lessen to some extent the fluctuation in the position of the center of gravity at the time of zooming.

Since the zoom optical system of the present embodiment includes the first front unit, the second front unit, the first intermediate unit, the second intermediate unit, and the rear-side lens unit, the arrangement is made such that it is possible to move only two lens units. Therefore, in the zoom optical system of the present embodiment, it is possible to reduce to some extent, the fluctuation in the overall length of the optical system while suppressing the degradation of imaging performance due to the abovementioned errors.

In the zoom optical system of type 2, it is preferable that a position of the first intermediate unit be fixed at the time of zooming and at the time of focusing.

The second sub unit contributes significantly to the shortening the overall length of the optical system and the occurrence of the spherical aberration in the entire zoom range. Consequently, when an error due to shift or an error due to tilt occurs in the second sub unit, the imaging performance is degraded due to the error. The error due to shift and the error due to tilt occur due to the movement of the second sub unit. By letting the position of the second sub unit to be fixed, it is possible to prevent the occurrence of these errors. As a result, it is possible to achieve a stable imaging performance.

In the zoom optical system of type 2, it is preferable that the first sub unit move at the time of zooming.

The first sub unit contributes significantly to the shortening the overall length of the optical system and the occurrence of the spherical aberration in the entire zoom range. Consequently, when an error due to shift or an error due to tilt occurs in the first sub unit, the imaging performance is degraded due to the error.

However, when the first sub unit is moved, it is possible to improve the correction effect of the spherical aberration and the correction effect of the image-plane position. Therefore, the first sub unit is to be moved upon securing a high positional accuracy. By making such arrangement, it is possible to improve the correction effect of the spherical aberration and the correction effect of the image-plane position.

In the zoom optical system of type 2, it is preferable to move the second sub unit at the time of zooming.

The second sub unit contributes significantly to the shortening the overall length of the optical system and the occurrence of the spherical aberration over the entire zoom range. Consequently, when an error due to shift or an error due to tilt occurs in the second sub unit, the imaging performance is degraded due to the error.

However, when the second sub unit is moved, it is possible to improve the correction effect of the spherical aberration and the correction effect of the image-plane position. Therefore, the second sub unit is to be moved upon securing a high positional accuracy. By making such arrangement, it is possible to improve the correction effect of the spherical aberration and the correction effect of the image-plane position.

In the zoom optical system of the present embodiment, it is preferable that only three lens units move at the time of zooming.

The zoom optical system of type 1 will be described below.

In a case of placing significance on maintaining the high imaging performance and reducing the fluctuation in the overall length of the optical system, it is preferable to let the number of lens units to be moved at the time of zooming to be only three. By moving only three lens units, it is possible to reduce the fluctuation in the overall length of the optical system while maintaining the high imaging performance.

Moreover, by increasing the number of lens units to be moved, it is possible to reduce an amount of movement of each lens unit as compared to an amount of movement in a case of moving only two lens units. Consequently, it is possible to suppress to some extent, the degradation of imaging performance due to the abovementioned errors.

Since the zoom optical system of type 1 includes the first front unit, the second front unit, the first intermediate unit, the second intermediate unit, and the rear-side lens unit, the arrangement is made such that it is possible to move only three lens units. Therefore, in the zoom optical system of type 1, it is possible to achieve both of maintaining the high imaging performance and reducing the fluctuation in the overall length of the optical system. Moreover, it is possible to suppress the degradation of imaging performance.

The zoom optical system of type 2 will be described below.

When the fluctuation in the position of the center of gravity at the time of zooming is large, it becomes difficult to carry out stable photography. Therefore, it is significant to reduce the fluctuation in the position of the center of gravity at the time of zooming. For this, a control of the fluctuation in the overall length of the optical system becomes necessary. It is possible to carry out zooming by moving at least two lens units. However, the control of the fluctuation in the overall length of the optical system is difficult with two lens units.

However, when the number of lens units to be moved is made large, although it becomes easy to secure the high imaging performance, the effect of the error due to shift, the error due to tilt, or the error of optical-axis position shift becomes large. For such reason, it is preferable that the number of lens units to be moved be three. By moving three lens units, it is possible to carry out the control of the fluctuation in the overall length of the optical system without having an effect of the abovementioned errors.

Since the zoom optical system of type 2 includes the first front unit, the second front unit, the first intermediate unit having the first sub unit and the second sub unit, the second intermediate unit, and the rear-side lens unit, the arrangement is made such that it is possible to move only three lens units. Therefore, in the zoom optical system of type 2, it is possible to secure an optical performance of a case in which only three lens units are moved.

In the zoom optical system of the present embodiment, it is preferable that only four lens units move at the time of zooming.

The zoom optical system of type 1 will be described below.

In a case of further placing significance on maintaining the high imaging performance and reducing the fluctuation in the overall length of the optical system, it is preferable to let the number of lens units to be moved at the time of zooming to be only four. By moving only four lens units, it is possible to reduce extremely the fluctuation in the overall length of the optical system while maintaining even higher imaging performance.

Moreover, by increasing the number of lens units to be moved, it is possible to reduce an amount of movement of each lens unit as compared to an amount of movement in a case of moving only two lens units or an amount of movement in a case of moving only three lens units. Consequently, it is possible to suppress further the degradation of the imaging performance due to the abovementioned errors.

In the first intermediate unit, the correction effect of the spherical aberration is large. By moving the first intermediate unit, it becomes easy to shorten the overall length of the optical system.

Since the zoom optical system of type 1 includes the first front unit, the second front unit, the first intermediate unit, the second intermediate unit, and the rear-side lens unit, the arrangement is made such that it is possible move only four lens units. Therefore, in the zoom optical system of type 1, it is possible to achieve both of maintaining even higher imaging performance and reducing further the fluctuation in the overall length of the optical system. Moreover, it is possible to suppress further the degradation of the imaging performance.

The zoom optical system of type 2 will be described below.

As mentioned above, when the number of lens units to be moved is made large, although it becomes easy to secure the high imaging performance, the effect of the error due to shift, the error due to tilt, or the error of optical-axis position shift becomes large. Therefore, four lens units are to be moved upon securing the high imaging performance. By making such arrangement, the control of the fluctuation in the overall length of the optical system becomes easier.

In the first intermediate unit, the correction effect of the spherical aberration is large. By moving the first intermediate unit, it becomes easy to shorten the overall length.

Since the zoom optical system of type 2 includes the first front unit, the second front unit, the first intermediate unit having the first sub unit and the second sub unit, the second intermediate unit, and the rear-side lens unit, the arrangement is made such that it is possible to move only four lens units. Therefore, in the zoom optical system of type 2, it is possible to secure the imaging performance of a case in which only four lens units are moved.

In the zoom optical system of type 1, it is preferable that the lens unit that is to be moved at the time of zooming be only a lens unit having a negative refractive power.

In the zoom optical system of type 1, the first front unit having a positive refractive power and the first intermediate unit having a positive refractive power are involved in shortening the overall length of the optical system. A lens unit having a negative refractive power is disposed on the image side of these lens units having a positive refractive power. Consequently, among the lens units in the zoom optical system, the lens unit having a negative refractive power is a lens unit which facilitates making the diameter small and making the optical system light-weight.

In such manner, by letting only the lens unit having a negative refractive power to be a lens unit that is to be moved at the time of zooming, it is possible to reduce a load on a moving mechanism at the time of zooming, and to configure a zoom optical system having a superior mobility with a small fluctuation in the center of gravity.

It is preferable that the zoom optical system of the present embodiment include a movable lens unit which is disposed between the intermediate lens unit and the rear-side lens unit, and the movable lens unit move either at the time of zooming or at the time of focusing.

A fluctuation in astigmatism is susceptible to occur in the second intermediate unit either at the time of zooming or at the time of focusing. By disposing the movable lens unit near the image side of the second intermediate unit, it is possible to correct the fluctuation in the astigmatism favorably. Moreover, it is possible to improve further a correction effect of the fluctuation in astigmatism by moving the movable lens unit at the time of zooming.

In the zoom optical system of the present embodiment, it is preferable that the movable lens unit have a negative refractive power.

By letting the refractive power of the movable lens unit to be a negative refractive power, it is possible to facilitate making a diameter of the movable lens unit small and making the movable lens unit light-weight. By moving the movable lens unit at the time of zooming, it is possible to improve further the correction effect of the fluctuation in astigmatism.

In the zoom optical system of type 1, it is preferable that the movable lens unit have a positive refractive power, and the movable lens unit move at the time of zooming.

By letting the refractive power of the movable lens unit to be a positive refractive power, it is possible to facilitate making a diameter of a lens unit positioned on the image side of the movable lens unit small and making the lens unit positioned on the image side of the movable lens unit light-weight.

The movable lens unit is disposed between the intermediate lens unit and the rear-side lens unit. Therefore, movable lens unit is positioned on the image side of the intermediate lens unit. At the time of zooming, in the second intermediate unit, a fluctuation in astigmatism occurs. By disposing the movable lens unit near the second intermediate unit, it is possible to suppress the fluctuation in astigmatism. Furthermore, by moving the movable lens unit at the time of zooming, it is possible to suppress further the fluctuation in astigmatism.

Moreover, sometimes the fluctuation in astigmatism in the second intermediate unit occurs at the time of focusing. Even in such case, by disposing the movable lens unit near the second intermediate unit, it is possible to suppress the fluctuation in astigmatism.

In the zoom optical system of the present embodiment, it is preferable that one lens unit other than the second intermediate unit move at the time of focusing.

By making such arrangement, it becomes easy to secure high imaging performance at the time of focusing to an object point at a short distance.

A diameter of a lens is small particularly between the first intermediate unit and the rear-side lens unit. Therefore, in a case of moving a lens unit other than the second intermediate unit, it is preferable to move a lens unit which is disposed between the first intermediate unit and the rear-side lens unit. By doing so, it becomes easy to secure a stable imaging performance over the entire zoom range.

Moreover, it is possible to let a lens unit positioned immediately on the image side of the second intermediate unit to be a lens unit that is to be moved. In this case, the lens unit to be moved is positioned between the second intermediate unit and the rear-side lens unit. Since it is possible to correct various aberrations depending on the lens unit that is to be moved, correction of the astigmatism remained in the second intermediate unit becomes easy.

Moreover, it is possible to let the refractive power of the lens unit to be moved to be a negative refractive power. By doing so, it is possible to facilitate making a diameter of the lens unit to be moved small and making the lens unit to be moved light-weight.

In the zoom optical system of the present embodiment, it is preferable that the motion blur correction lens unit be disposed in the first intermediate unit.

It is possible to make the positive refractive power of the first intermediate unit large. In this case, the motion blur correction lens unit is disposed in a lens unit having a large positive refractive power. Consequently, even when an image blur occurs, it is possible to correct the image blur while securing more stable imaging performance. Moreover, it is possible to correct the image blur at even higher speed.

It is possible to let the refractive power of the motion blur correction lens unit to be a negative refractive power. By doing so, it is possible to further improve an effect of securing a stable imaging performance and an effect of correcting the image blur at a high speed.

The first intermediate unit may include two sub units and the motion blur correction lens unit. In this case, one sub unit may be positioned on the object side of the motion blur correction lens unit and the other sub unit may be positioned on the image side of the motion blur correction lens unit.

In a case of making the refractive power of the motion blur correction lens unit to be a negative refractive power by such arrangement, it is preferable to make the refractive power of the two sub units to be a positive refractive power. By making such arrangement, it becomes easier to improve the sensitivity of correction of the motion blur. Moreover, since it is possible to make a diameter of the motion blur correction lens unit small, it is possible to facilitate making the motion blur correction lens unit light-weight. As a result, it is possible to correct the image blur at a high speed.

In the zoom optical system of the present embodiment, it is preferable that the motion blur correction lens unit be disposed in the rear-side lens unit.

An action effect of disposing the motion blur correction lens unit in the rear-side lens unit is as described above.

In the zoom optical system of type 2, it is preferable that each of the first sub unit and the second sub unit include a positive lens and a negative lens.

Both the first subunit and the second subunit contribute substantially to shorten the overall length of the optical system and to the occurrence of the spherical aberration in the entire zoom range. By making the refractive power of the first intermediate unit large, it is possible to shorten the overall length of the optical system. However, when the refractive power of the first intermediate unit is made large, the occurrence of the spherical aberration becomes large.

By each of the first sub unit and the second sub unit having at least the positive lens and the negative lens, it is possible suppress the occurrence of the spherical aberration and the occurrence of the longitudinal chromatic aberration even when the overall length of the optical system is shortened by making the refractive power of the first intermediate unit large.

It is possible to vary the distance between the first sub unit and the second sub unit at the time of zooming. By making such arrangement, it is possible suppress the occurrence of the spherical aberration and the occurrence of the longitudinal chromatic aberration in the entire zoom range.

It is preferable that the zoom optical system of type 1 include in order from an object side, a first front unit, a second front unit, a first intermediate unit, a second intermediate unit, and a rear-side lens unit.

It is preferable that the zoom optical system of type 2 include in order from an object side, a first front unit, a second front unit, a first sub unit, a second sub unit, a second intermediate unit, and a rear-side lens unit.

By making such arrangement, it is possible to realize shortening of the overall length of the optical system, making the optical system light-weight, making the focusing speed high, and securing a favorable imaging performance at the time of zooming and at the time of focusing, while including a small number of lens units.

It is preferable that the zoom optical system of type 1 include in order from an object side, a first front unit, a second front unit, a first intermediate unit, a second intermediate unit, a movable lens unit having a negative refractive power, and a rear-side lens unit.

It is preferable that the zoom optical system of type 2 include in order from an object side, a first front unit, a second front unit, a first sub unit, a second sub unit, a second intermediate unit, a movable lens unit having a negative refractive power, and a rear-side lens unit.

By making such arrangement, it is possible to realize shortening of the overall length of the optical system, making the optical system light-weight, making the focusing speed high, and securing a favorable imaging performance at the time of zooming and at the time of focusing, while including a small number of lens units.

It is preferable that the zoom optical system of type 1 include in order from an object side, a first front unit, a second front unit, a first intermediate unit, a second intermediate unit, a movable lens unit having a positive refractive power, and a rear-side lens unit.

By making such arrangement, it is possible to realize shortening of the overall length of the optical system, making the optical system light-weight, making the focusing speed high, and securing a favorable imaging performance at the time of zooming and at the time of focusing, while including a small number of lens units.

In the zoom optical system of type 1, it is preferable that the second front unit move toward the image side at the time of zooming from the wide angle end to the telephoto end, and a position of the first intermediate unit be fixed at the time of zooming and at the time of focusing.

In the zoom optical system of type 2, it is preferable that the second front unit move toward the image side at the time of zooming from the wide angle end to the telephoto end, and a position of the second sub unit be fixed at the time of zooming and at the time of focusing.

It is preferable not to move the first front unit as far as possible. However, it is possible to move the first front unit toward the object side at the time of zooming from the wide angle end to the telephoto end. At this time, by moving the second front unit toward the image side, it is possible to reduce an amount of movement of the first front unit toward the object side. As a result, it is possible to make the optical system small-sized.

The first intermediate unit contributes substantially to the occurrence of the spherical aberration. In the zoom optical system of type 1, by fixing the position of the first intermediate unit at the time of zooming and at the time of focusing, it becomes easy to prevent the degradation of imaging performance caused by the spherical aberration.

The second sub unit contributes substantially to the occurrence of the spherical aberration. In the zoom optical system of type 2, by fixing the position of the second sub unit at the time of zooming and at the time of focusing, it becomes easy to prevent the degradation of imaging performance caused by the spherical aberration.

In the zoom optical system of the present embodiment, it is preferable that the second intermediate unit and the movable lens unit move at the time of zooming.

By making such arrangement, it is possible to correct favorably the fluctuation in astigmatism at the time of zooming.

In the zoom optical system of type 1, it is preferable that the second front unit move toward the image side at the time of zooming from the wide angle to the telephoto end, and the first intermediate unit move to be positioned on the object side at the telephoto end than at the wide angle end at the time of zooming.

In the zoom optical system of type 2, it is preferable that the second front unit move toward the image side at the time of zooming from the wide angle to the telephoto end, and the first sub unit move to be positioned on the object side at the telephoto end than at the wide angle end at the time of zooming.

It is preferable not to move the first front unit as far as possible. However, it is possible to move the first front unit toward the object side at the time of zooming from the wide angle end to the telephoto end. At this time, by moving the second front unit toward the image side, it is possible to reduce the amount of movement of the first front unit toward the object side. As a result, it is possible to make the optical system small-sized.

The first intermediate unit contributes substantially to the occurrence of the spherical aberration. In the zoom optical system of type 1, when the first intermediate unit is moved, it is possible to improve the correction effect of the spherical aberration. Therefore, a high positional accuracy is secured and the first intermediate unit is moved at the time of zooming. At this time, by moving the first intermediate unit to be positioned on the object side at the telephoto end than at the wide angle end, correction of the spherical aberration at the time of zooming becomes easier.

The first sub unit contributes substantially to the occurrence of the spherical aberration. In the zoom optical system of type 2, when the first sub unit is moved, it is possible to improve the correction effect of the spherical aberration. Therefore, a high positional accuracy is secured and the first subunit is moved at the time of zooming. At this time, by moving the first sub unit to be positioned on the object side at the telephoto end than at the wide angle end, correction of the spherical aberration at the time of zooming becomes easier.

In the zoom optical system of type 1, it is preferable that a position of the first front unit and the position of the first intermediate unit be fixed.

In the zoom optical system of type 2, it is preferable that a position of the first front unit and the position of the second sub unit be fixed.

By letting the position of the first front unit to be fixed at the time of zooming, it is possible to make an arrangement such that the overall length of the zoom optical system does not vary. Accordingly, it is possible make small the fluctuation in the position of the center of gravity over the entire zoom range.

Moreover, the first front unit is a lens unit having a heavyweight. When the position of the first front unit is fixed at the time of zooming, it is possible to hold the zoom lens system stably even when the zoom lens system is subjected to an impact from outside. As a result, it is possible to prevent degradation of imaging performance.

The first intermediate unit contributes substantially to the occurrence of the spherical aberration. In the zoom optical system of type 1, by fixing the position of the first intermediate unit at the time of zooming, it is possible to facilitate further stability of imaging performance.

The second sub unit contributes substantially to the occurrence of the spherical aberration. In the zoom optical system of type 2, by fixing the position of the second sub unit at the time of zooming, it is possible to facilitate further stability of imaging performance.

In the zoom optical system of the present embodiment, it is preferable that an aperture stop be disposed on the image side of the second front unit and on the object side of the rear-side lens unit.

Between the first intermediate unit and the rear-side lens unit, it is possible to reduce a fluctuation in an angle of a light ray and a fluctuation in a height of a light ray at the time of zooming. Consequently, in the zoom optical system of type 1, it is preferable to dispose the aperture stop between the first intermediate unit and the image plane. The first intermediate unit is positioned on the image side of the second front unit. Therefore, the aperture stop is to be disposed on the image side of the second front unit and on the object side of the rear-side lens unit. By making such arrangement, it is possible to reduce a variation in an F-number at the time of zooming.

Between the first sub unit and the rear-side lens unit, it is possible to reduce a fluctuation in an angle of a light ray and a fluctuation in a height of a light ray at the time of zooming. Consequently, in the zoom optical system of type 2, it is preferable to dispose the aperture stop between the first sub unit and the image plane. The first sub unit is positioned on the image side of the second front unit. Therefore, the aperture stop is to be disposed on the image side of the second front unit and on the object side of the rear-side lens unit. By making such arrangement, it is possible to reduce a variation in an F-number at the time of zooming.

Moreover, for reducing the chromatic aberration of magnification and reducing the distortion, it is preferable to secure a symmetry of the optical system. For securing the symmetry of the optical system, an arrangement is to be made such that for an optical system positioned on the object side of the aperture stop and an optical system positioned on the image side of the aperture stop, a refractive power and a shape of the optical systems are substantially symmetrical about the aperture stop. By disposing the aperture stop on the image side of the second front unit and on the object side of the rear-side lens unit, it is possible to secure the symmetry of the optical system.

In the zoom optical system of the present embodiment, it is preferable that at the time of zooming, a position of the aperture stop be fixed with respect to the intermediate unit.

In the zoom optical system of the present embodiment, it is preferable that, at the time of zooming, a position of the aperture stop be either fixed with respect to the first subunit or fixed with respect to the second sub unit.

By making such arrangement, it is possible to reduce an error in the F-number at the time of zooming.

In the zoom optical system of type 1, it is possible to dispose the aperture stop at an interior of the first intermediate unit. In this case, it is preferable that the position of the aperture stop in the first intermediate unit be at a location near the object. By disposing the aperture stop at this location, it is possible to reduce the variation in the F-number at the time of focusing to the object point at a short distance, and moreover, it is possible to suppress an increase in the height of a light ray on the image side of the first intermediate unit.

Moreover, by disposing the aperture stop at a portion in an air space inside the first intermediate unit, it becomes easy to suppress in balanced manner, the change in the F-number and an increase in a diameter of a lens positioned on the image side of the second intermediate unit at the time of focusing to the object point at a short distance.

In the zoom optical system of type 2, it is possible to dispose the aperture stop at an interior of the first sub unit. In this case, it is preferable that the position of the aperture stop in the first sub unit be at a location near the object. By disposing the aperture stop at this location, it is possible to reduce the variation in the F-number at the time of focusing to the object point at a short distance.

Moreover, it is possible to dispose the aperture stop either in the second sub unit or near the second sub unit. By disposing the aperture stop at this location, it is possible to suppress an increase in the height of a light rayon the image side of the second sub unit.

Moreover, by disposing the aperture stop at a portion in an air space between the first subunit and the second sub unit, it becomes easy to suppress in balanced manner, the change in the F-number and an increase in a diameter of a lens positioned on the image side of the second sub unit at the time of focusing to the object point at a short distance.

When the aperture stop is moved integrally with a lens unit at the time of zooming, it is possible to reduce an error in the F-number.

In the zoom optical system of the present embodiment, it is preferable that the first front unit include two lens components, and in the lens component, only a side of incidence and a side of emergence are air-contact surfaces, and the lens component positioned on the object side have a positive refractive power, and the lens component positioned on the image side include a negative lens and a positive lens.

By letting the refractive power of the lens component positioned on the object side (hereinafter, referred to as 'lens component FF1*a*') to be a positive refractive power, it is possible to make the positive refractive power of the overall first front unit large. As a result, it is possible to shorten the overall length of the optical system easily.

In the lens component FF1*a*, it is possible to let a lens surface on the object side to be convex toward the object side. By making such arrangement, it is possible to make the positive refractive power of the lens component FF1*a* even larger. As a result, it is possible to shorten the overall length of the optical system more easily.

By making an arrangement such that the lens component positioned on the image side (hereinafter, referred to as 'lens component FF2*a*') includes the negative lens and the positive lens, it is possible to correct the chromatic aberration of magnification as well as to correct favorably a chromatic coma occurred in the lens component FF1*a*.

Accordingly, since it is possible to reduce the chromatic aberration remained in the first front unit, the necessity of correcting the chromatic aberration in the second front unit becomes low. As a result, it becomes easy to achieve an effect of reducing the number of lenses in the second front unit and to achieve stable imaging performance at the time of zooming.

It is possible to make an arrangement such that the lens component FF1*a* includes a negative lens and a positive lens. By making such arrangement, correction of the chromatic aberration becomes easy. In a case of giving priority to suppressing an increase in the weight of the first front unit, it is desirable that the lens component FF1*a* include a positive single lens.

In the lens component FF2*a*, it is possible to let the negative lens to be a negative meniscus lens having a convex surface directed toward the object side. It is possible to let the positive lens to be either a positive lens having a convex surface directed toward the object side or a positive meniscus lens having a convex surface directed toward the object side. By making such arrangement, it is possible to achieve a high correction effect in a correction of the chromatic coma.

In the lens component FF2$a$, it is preferable that the negative lens and the positive lens be cemented. Making the negative lens and the positive lens a cemented lens is desirable for holding the lenses stably.

In the lens component FF2$a$, it is possible to let a lens surface nearest to the object to be a surface convex toward the object side and a lens surface nearest to the image to be a surface concave toward the image side. Making such arrangement is preferable as it is possible to reduce the occurrence of the spherical aberration in the first front unit.

In the zoom optical system of the present embodiment, it is preferable that the first front unit include two lens components, and in the lens component, only a side of incidence and a side of emergence are air-contact surfaces, and the lens component positioned on the object side include a negative lens and a positive lens, and the lens component positioned on the image side include a positive lens.

By making an arrangement such that a component used as the lens component FF1$a$ includes the negative lens and the positive lens, it is possible to use a high refractive index lens. Consequently, it becomes easy to make the refractive power of the first front unit large. As a result, it is possible to improve an effect of shortening the overall length of the optical system.

In the lens component FF1$a$, it is preferable that the negative lens and the positive lens be cemented. Making the negative lens and the positive lens a cemented lens is desirable for holding the lenses stably.

In the zoom optical system of the present embodiment, it is preferable that at least one of the positive lenses in the first front unit satisfy the following conditional expression (9):

$$80 \leq \nu dFFp \tag{9}$$

where,

νdFFp denotes Abbe number for the positive lens in the first front unit.

By satisfying conditional expression (9), it is possible to correct the longitudinal chromatic aberration and the chromatic aberration of magnification favorably over the entire zoom range.

In the zoom optical system of type 1, it is preferable that the first intermediate unit include an image-side lens component having a positive refractive power, which is nearest to the image, and in the image-side lens component, only a side of incidence and a side of emergence be air-contact surfaces.

In the zoom optical system of type 2, it is preferable that the second sub unit include an image-side lens component having a positive refractive power, which is nearest to the image, and in the image-side lens component, only a side of incidence and a side of emergence be air-contact surfaces.

By a convergence effect of the image-side lens component, it is possible to lower a height of a light ray in the second intermediate unit. In this case, since it is possible make a diameter of the second intermediate unit small, it becomes easier to make the second intermediate unit further light-weight.

In the zoom optical system of type 1, it is preferable that the following conditional expression (10) be satisfied:

$$0.3 \leq fMFLCi/fMF \leq 3.5 \tag{10}$$

where, fMFLCi denotes a focal length of the image-side lens component, and fMF denotes the focal length of the first intermediate unit.

In a case of falling below a lower limit value of conditional expression (10), the positive refractive power of a lens positioned on the image side in the first intermediate unit becomes excessively large. Consequently, the occurrence of the spherical aberration in the first intermediate unit becomes large. In a case of exceeding an upper limit value of conditional expression (10), the convergence effect of the image-side lens component is weakened. Consequently, an effect of making the diameter of the second lens unit small is diminished.

In the zoom optical system of type 1, it is preferable that the first intermediate unit include an aperture stop, a first subunit having a positive refractive power, and a second sub unit having a positive refractive power, and the first sub unit be positioned on the object side of the aperture stop and the second sub unit be positioned on the image side of the aperture stop.

When such arrangement is made, in the first intermediate unit, the lens unit having a positive refractive power is positioned each on the object side and the image side sandwiching the aperture stop. In this case, at the time of zooming, it is possible to reduce a variation in the height of a light ray passing through the first intermediate unit. Consequently, it becomes easy to make the diameter of the first intermediate unit small.

In the zoom optical system of type 1, it is preferable that the following conditional expression (11) be satisfied:

$$0.2 \cdot fMF1/fMF2 \leq 4.8 \tag{11}$$

where, fMF1 denotes a focal length of the first sub unit, and fMF2 denotes a focal length of the second sub unit.

In a case of falling below a lower limit value of conditional expression (11), an effect of making the diameter of the second front unit small is weakened. Consequently, it becomes difficult to make a focusing unit light-weight. In a case of exceeding an upper limit value of conditional expression (11), the occurrence of the spherical aberration in the second sub unit becomes large. In this case, since correction of the spherical aberration in the first intermediate unit becomes difficult, it is hard to achieve a favorable imaging performance.

In the zoom optical system of the present embodiment, it is preferable that the second sub unit include two negative lenses and one positive lens.

In the first front unit, the spherical aberration, the astigmatism, and the chromatic aberration remain. In the second front unit, correction of these aberrations is carried out on priority basis. The correction of these aberrations is effective in shortening the overall length of the optical system and securing a favorable imaging performance over the entire zoom range.

As mentioned above, by making an arrangement such that the first front unit includes two lens components, an occurrence of the chromatic coma and the occurrence of the spherical aberration are reduced in the first front unit. Consequently, in aberration correction in the second front unit, it is possible to reduce the number of aberrations that are to be corrected on a priority basis.

For such reason, even when the second front unit includes two negative lenses and one positive lens, it is possible to correct the spherical aberration, the astigmatism, and the chromatic aberration. As a result, it is possible to achieve an effect of reduction of the number of lenses and an effect of weight reduction in the second front unit.

In the zoom optical system of the present embodiment, it is preferable that the second intermediate unit include a positive lens and a negative lens.

By making such arrangement, it is possible to suppress the occurrence of the chromatic aberration in the second intermediate unit. As a result, it is possible to achieve a favorable imaging performance, such as an imaging performance with lesser the occurrence of the longitudinal chromatic aberration at the time of focusing.

It is possible to make an arrangement such that the second intermediate unit includes one positive lens and one negative lens. By making such arrangement, it is possible to facilitate making the focusing unit light-weight.

In the second intermediate unit, it is possible to let a lens surface nearest to the image to be a surface concave toward the image side, and to let an absolute value of a radius of curvature of the lens surface nearest to the image to be smaller than an absolute value of a radius of curvature of a lens surface nearest to the object. By making such arrangement, it is possible to reduce a fluctuation in the spherical aberration at the time of focusing. Consequently, it becomes easy to secure an imaging performance when focused to the object point at a short distance.

In the zoom optical system of the present embodiment, it is preferable that the following conditional expression (12) be satisfied:

$$10 \leq \nu dMBn\max - \nu dMBp\min \leq 50 \quad (12)$$

where,

νdMBnmax denotes the maximum Abbe number out of Abbe numbers for the negative lens in the second intermediate unit, and νdMBpmin denotes the minimum Abbe number out of Abbe numbers for the positive lens in the second intermediate unit.

In a case of falling below a lower limit value of conditional expression (12), correction of the chromatic aberration in the second intermediate unit becomes inadequate. Consequently, a degradation of imaging performance due to the occurrence of the longitudinal chromatic aberration occurs. In a case of exceeding an upper limit value of conditional expression (12), the correction effect of the spherical aberration in the second intermediate unit becomes inadequate. Consequently, it is not possible to achieve a favorable imaging performance.

In the zoom optical system of type 2, it is preferable that the second intermediate unit include one negative lens, and the following conditional expression (30) be satisfied:

$$45 \leq \nu dMBn \quad (30)$$

where,

νdMBn denotes Abbe number for the negative lens in the second intermediate unit.

As mentioned above, the second intermediate unit functions as a focusing unit. By making an arrangement such that the second intermediate unit includes one negative lens, it is possible to make the focusing unit further light-weight.

In a case of making the arrangement such that the second intermediate unit includes one negative lens, it is desirable to satisfy conditional expression (30). By satisfying conditional expression (30), it is possible to suppress the fluctuation in the longitudinal chromatic aberration at the time of focusing.

In the second intermediate unit, it is possible to let a lens surface nearest to the image to be a surface concave toward the image side, and to let an absolute value of a radius of curvature of the lens surface nearest to the image to be smaller than an absolute value of a radius of curvature of a lens surface nearest to the object. By making such arrangement, it is possible to reduce a fluctuation in the spherical aberration at the time of focusing. Consequently, it becomes easy to secure an imaging performance when focused to the object point at a short distance.

In the zoom optical system of the present embodiment, it is preferable that two lenses be disposed on a side nearest to the image of the rear-side lens unit, and one of the two lenses be a positive lens and the other lens be a negative lens.

By disposing one positive lens and one negative lens on the side nearest to the image of the rear-side lens unit, it is possible to improve further the abovementioned predetermined effect.

In the zoom optical system of type 1, it is preferable that the following conditional expression (13) be satisfied:

$$16 \leq \nu dRni \leq 26 \quad (13)$$

where,

νdRni denotes Abbe number for the other lens.

In the zoom optical system of type 2, it is preferable that the following conditional expression (13a) be satisfied:

$$16 \leq \nu dRni \leq 32 \quad (13a)$$

where,

νdRni denotes the Abbe number for the other lens.

In a case of falling below a lower limit value of conditional expression (13), correction of the chromatic aberration of magnification on a short-wavelength side becomes excessive in the overall optical system. Consequently, it becomes hard to achieve the abovementioned predetermined effect. In a case of exceeding an upper limit value of conditional expression (13), the correction effect of the chromatic aberration of magnification on the short-wavelength side is weakened in the overall optical system. Consequently, it becomes hard to achieve the abovementioned predetermined effect.

A technical significance of conditional expression (13a) is same as the technical significance of conditional expression (13).

In the zoom optical system of type 1, it is preferable that the first intermediate unit include at least two positive lenses for which a value of Abbe number is not less than 80.

By making the refractive power of the first intermediate unit large, although an effect of shortening the overall length of the optical system is improved, the occurrence of the spherical aberration and the occurrence of the longitudinal chromatic aberration increase. By using at least two positive lenses for which the value of Abbe number is not less than 80 in the first intermediate unit, it is possible to suppress the occurrence of the spherical aberration and the occurrence of the longitudinal chromatic aberration.

It is possible to let the number of positive lenses in the first intermediate unit to be at least three. By making such arrangement, it is possible to make the correction of the spherical aberration easier.

In the zoom optical system of type 1, it is preferable that a distance between the first sub unit and the second sub unit vary at the time of zooming, and the first sub unit move to be positioned on the object side at the telephoto end than at the wide angle end.

By varying the distance between the first sub unit and the second sub unit at the time of zooming, it is possible to reduce further the fluctuation in the spherical aberration at the time of zooming. As a result, it becomes easy to achieve a favorable imaging performance. Moreover, by moving the first sub unit to be positioned on the object side at the telephoto end than at the wide angle end, it is possible to improve a zooming effect. Making such arrangement is effective for securing a high zoom ratio.

Even in a case of varying the distance between the first sub unit and the second sub unit at the time of zooming, it is desirable to satisfy conditional expression (8) and conditional expression (10). In this case, the focal length of the first intermediate unit is a combined focal length of the first sub unit and the second sub unit at the telephoto end.

It is preferable that the zoom optical system of type 1 have an aperture stop between the first sub unit and the second sub unit, and a position of the second sub unit and a position of the aperture stop be fixed at the time of zooming.

When the second sub unit is moved at the time of zooming, an error due to shift and an error due to tilt occurs. Consequently, imaging performance is degraded due to these errors. Moreover, the fluctuation in the spherical aberration occurs.

By fixing the position of the second sub unit at the time of zooming, it is possible to suppress the occurrence of these errors. As a result, it is possible to reduce the degradation of the imaging performance and the fluctuation in the spherical aberration. Moreover, by fixing the position of the aperture stop, it is possible to reduce the occurrence of an error in the F-number.

In the zoom optical system of the present embodiment, it is preferable that the rear-side lens unit include a third sub unit and a fourth sub unit.

By making such arrangement, it is possible to reduce an aberration which occurs in the rear-side lens unit.

The rear-side lens unit is disposed nearest to the image. Consequently, in the rear-side lens unit, a diameter of an axial light beam is small as compared to a diameter at other lens units. When the diameter of an axial light beam is small, the occurrence of the spherical aberration and an occurrence of a coma are suppressed.

In a telephoto zoom and a super-telephoto zoom, the occurrence of the spherical aberration and the occurrence of the coma lead to degradation of imaging performance. In the zoom optical system of the present embodiment, the occurrence of the spherical aberration and the occurrence of the coma are suppressed. Consequently, it is possible to let the zoom optical system of the present embodiment to be a zoom optical system of telephoto type or a zoom optical system of super-telephoto type, without letting the imaging performance to be degraded.

Moreover, since the occurrence of the spherical aberration and the occurrence of the coma are suppressed, it is possible to widen easily a distance between the third sub unit and the fourth sub unit without letting the imaging performance to be degraded. In this case, it is possible to put in and out a converter lens between the third sub unit and the fourth sub unit. By making such arrangement, it is possible to vary optical specifications such as focal length. As a result, it is possible to increase photography scenes that can be dealt with.

In the zoom optical system of the present embodiment, it is preferable that the third sub unit include a positive lens.

By making such arrangement, it is possible to suppress a height of an off-axis light beam between the third sub unit and the fourth sub unit. Consequently, in a case of putting in an out a converter lens between the third sub unit and the fourth sub unit for example, it is possible to make a diameter of the converter lens small.

In the zoom optical system of the present embodiment, it is preferable that the fourth sub unit include a positive lens and a negative lens.

The fourth subunit is disposed nearest to the image. The fourth sub unit contributes significantly to an occurrence of the distortion and an occurrence of the chromatic aberration of magnification. It is possible to improve a correction effect of positive distortion by the positive lens, and it is possible to improve the correction effect of chromatic aberration of magnification by the negative lens.

As mentioned above, when the overall length of the optical system is shortened, mainly the positive distortion occurs in the first front unit. Moreover, the chromatic aberration of magnification remains in the front-side lens unit. It is possible to correct the positive distortion favorably by the positive lens. It is possible to correct the chromatic aberration of magnification by the negative lens.

In such manner, by the fourth sub unit including the positive lens and the negative lens, it is possible to distribute the load of the first front unit concerning the chromatic aberration and shortening the overall length of the optical system to the fourth sub unit. As a result, it is possible to achieve small-sizing of the optical system and improvement in the imaging performance.

Moreover, the diameter of a lens in the first front unit being large, the weight is susceptible to increase in the first front unit. However, since it is possible to distribute the load on the first front unit to the fourth sub unit, it is possible to reduce the number of lenses to be used in the first front unit. Moreover, since types of glass that can be selected increase, it is possible to use a glass of lower specific gravity for the first front unit. As a result, it becomes easy to make the first front unit light-weight.

When the number of lenses used in the fourth sub unit becomes large, it becomes difficult to secure adequately the back focus and the distance between the third sub unit and the fourth sub unit while achieving the abovementioned effect. Therefore, it is desirable that the fourth sub unit includes only one positive lens and one negative lens.

In the zoom optical system of type 1, it is preferable that the fourth sub unit include one positive lens and one negative lens, and the following conditional expression (14) be satisfied:

$$16 \leq \nu dR2n \leq 26 \quad (14)$$

where, $\nu dR2n$ denotes Abbe number for the negative lens in the fourth sub unit.

In the zoom optical system of type 2, it is preferable that the fourth sub unit include one positive lens and one negative lens, and the following conditional expression (14a) be satisfied.

$$16 \leq \nu dR2n \leq 32 \quad (14a)$$

where, $\nu dR2n$ denotes the Abbe number for the negative lens in the fourth sub unit.

By making an arrangement such that the fourth sub unit includes only one positive lens and one negative lens, it is possible to realize correction of the positive distortion, correction of the chromatic aberration of magnification, making the first front unit light-weight, securing an adequate distance between the third sub unit and the fourth sub unit, and securing an adequate back focus.

In a case of falling below a lower limit value of conditional expression (14), correction of the chromatic aberration of magnification on the short-wavelength side becomes excessive in the overall optical system. Consequently, it becomes hard to achieve the abovementioned predetermined effect. In a case of exceeding an upper limit value of conditional expression (14), the correction effect of the chromatic aberration of magnification on the short-wavelength side is weakened in the overall optical system. Consequently, it becomes hard to achieve the abovementioned predetermined effect.

A technical significance of conditional expression (14a) is same as the technical significance of conditional expression (14).

In the zoom optical system of the present embodiment, it is preferable that a predetermined space for putting in an out a converter lens be provided between the third sub unit and the fourth sub unit, and the focal length of the zoom optical system before inserting the converter lens and after inserting the converted lens differ.

By making such arrangement, it is possible to realize a state with the zoom optical system alone and a state in which the zoom optical system and the converter lens are integrated, without removing the zoom optical system from the a body of the image pickup apparatus.

For putting the converter lens in and out of the predetermined space, it is preferable to use a mechanism which moves the converter lens by operating a lever manually or electrically. In this case, a space for disposing the converter lens is provided in a lens barrel which holds the zoom optical system. The moving mechanism which moves the converter lens is disposed near the space provided. The moving mechanism and the lever are to be connected mechanically or electrically.

By putting the converter lens in and out of the predetermined space, it is possible to let the focal length of the zoom optical system to differ before inserting the converter lens and after inserting the converter lens. In this case, since it is possible to deal with various photography scenes, it is possible to carry out the photography without missing capturing opportunities.

In the zoom optical system of the present embodiment, it is preferable that the fourth sub unit include a predetermined lens, and a sign of the refractive power of the predetermined lens be a sign opposite to a sign of the refractive power of the converter lens.

The converter lens has a refractive power. Therefore, when the converter lens is inserted into the zoom optical system, Petzval sum varies according to the refractive power of the converter lens. As a result, an amount of occurrence of the astigmatism becomes large as the case may be.

By letting the sign of the refractive power of the predetermined lens to be a sign opposite to the sign of the refractive power of the converter lens, it is possible to change the occurrence of the astigmatism effectively.

In the zoom optical system of the present embodiment, it is preferable that the overall length of the zoom optical system be same before and after inserting the converter lens.

Since the overall length of the zoom optical system is invariable before and after inserting the converter lens, it is possible to suppress the fluctuation in the center of gravity. Consequently, it is possible to deal with various photography scenes.

It is desirable that the back focus almost does not vary before and after inserting the converter lens. However, even when the back focus varies, it is possible to keep the back focus constant by moving the focusing unit, provided that the amount of variation is an amount that can be corrected by moving the focusing unit.

An image pickup optical system according to a first embodiment, an image pickup optical system according to a second embodiment, and an image pickup optical system according to a third embodiment will be described below.

The image pickup optical system according to the first embodiment includes a master optical system, and a converter lens which includes a plurality of lens components, wherein in the lens component, only a side of incidence and a side of emergence are air-contact surfaces, and the master optical system is the zoom optical system of the present embodiment, and the master optical system includes a predetermined space for putting in and out the converter lens, and the following conditional expression (15) is satisfied:

$$|\Delta FbT|/FnoT \leq 0.05 \text{ (mm)} \quad (15)$$

where, $\Delta FbT = FbT - FbconT$, where

Fbt denotes a back focus of the image pickup optical system at a time of infinite object point focusing in a first state, FbconT denotes a back focus of the image pickup optical system at the time of infinite object point focusing in a second state, FnoT denotes an F-number of the master optical system at the time of infinite object point focusing, and here the first state is a state in which the converter lens has not been inserted into the predetermined space, and the second state is a state in which the converter lens has been inserted into the predetermined space, and the back focus and the F-number are a back focus and an F-number in a state in which the focal length of the master optical system becomes the maximum.

The image pickup optical system of the first embodiment includes the master optical system, and a converter lens which includes a plurality of lens components. The master optical system includes a predetermined space for putting in and out the converter lens. Therefore, by putting the converter lens in and out of the predetermined space, it is possible to vary optical specifications such as the focal length. As a result, it is possible to increase photography scenes than can be dealt with.

The zoom optical system of the present embodiment is used for the master optical system. Therefore, it is possible to realize an image pickup optical system having a superior mobility, in which aberrations are corrected favorably.

It is desirable that the back focus almost does not vary before and after inserting the converter lens. However, even when the back focus varies, it is possible to keep the back focus constant by moving the focusing unit, provided that the amount of variation is an amount that can be corrected by moving the focusing unit.

In a case of exceeding an upper limit value of conditional expression (15), a focus shift when the converter lens has been inserted becomes large. In this case, since a possibility that an object cannot be identified becomes high, there is a possibility of missing an opportunity of capturing.

The image pickup optical system of the second embodiment and the image pickup optical system of the third embodiment has a common arrangement. The common arrangement will be described below.

The common arrangement is that the image pickup optical system includes the master optical system and the converter lens which includes the plurality of lens components, and in the lens component, only the side of incidence and the side of emergence are air-contact surfaces, and the master optical system is the zoom optical system of the present embodiment, and the master optical system includes the predetermined space for putting in and out the converter lens, and the focal length of the master optical system differs in the first state and the second state, and the converter lens is a teleconverter lens, and the teleconverter lens includes an object-side sub unit having a positive refractive power, an intermediate sub unit, and an image-side sub unit having a negative refractive power, and the object-side sub unit is positioned nearest to the object, and the intermediate sub unit is positioned on the image side of the object-side sub unit, and the image-side sub unit is positioned on the image side of the intermediate sub unit, and a lens surface on the object side of the object-side sub unit is a surface which is convex toward the object side, and the image-side sub unit includes a positive lens and a negative lens.

In the image pickup optical system of the first embodiment and the common arrangement, a type in which the converter lens is put in and out (hereinafter, referred to as 'insertion type') is used for the optical system. In the insertion type, in a case in which the converter lens is a teleconverter lens, it is necessary to let the converter lens to have a negative refractive power.

When the teleconverter lens is inserted into the predetermined space, the focal length of the image pickup optical system becomes long. Moreover, optical specifications other than the focal length also vary. For making this variation large, it is necessary to make the negative refractive power of the converter lens large.

However, when the negative refractive power of the converter lens is made large, the positive spherical aberration becomes large. It is possible to correct the positive spherical aberration effectively by disposing a sub unit having a positive refractive power at a location where a diameter of an axial light beam becomes large.

The negative refractive power of the converter lens is borne by the image-side sub unit. Therefore, the positive spherical aberration occurs in the image-side sub unit. The diameter of an axial light beam has become large on the object side of the image-side sub unit. Therefore, it is preferable to dispose a sub lens unit having a positive refractive power on the object side of the image-side sub unit.

In the common arrangement, the object-side sub unit having a positive refractive power is disposed nearest to the object. In other words, a sub unit having a positive refractive power is disposed on the object side of the image-side sub unit. Therefore, even when the negative refractive power of the image-side sub unit is made large, it is possible to correct the positive spherical aberration effectively.

A rear teleconverter lens is disposed between the master optical system and the body of the image pickup apparatus. When the rear teleconverter lens is disposed, the back focus, in general, becomes longer than the back focus before disposing the rear teleconverter lens. In the common arrangement, the converter lens is inserted into the rear-side lens unit. The converter lens being the teleconverter lens, the back focus becomes longer than the back focus before inserting the converter lens.

However, it is desirable that the overall length of the optical system be invariable even when the converter lens is inserted into the master optical system. In a converter lens having a negative refractive power, when a sub unit having a positive refractive power is disposed on the object side, it is possible to bring an imaging position close to the object side, or in other words, to shorten the back focus. For such reason, it is necessary to impart a convergence effect to a portion nearest to the object of the converter lens.

In the common arrangement, the object-side sub unit having a positive refractive power is positioned nearest to the object of the converter lens. As a result, even when the converter lens is inserted into the master optical system, it is possible to minimize the variation in the overall length of the optical system.

For shortening the overall length of the optical system, it is necessary to make a thickness of the converter lens thin and to make the predetermined space as narrow as possible. However, when the predetermined space is narrowed, the spherical aberration which occurs in the converter lens is susceptible to increase.

In the common arrangement, the image-side subunit having a negative refractive power is disposed on the image side of the object-side sub unit. Therefore, it is possible to make the correction effect of the spherical aberration large by the positive refractive power of the object-side sub unit and the negative refractive power of the image-side sub unit.

Furthermore, the intermediate sub unit is disposed between the object-side sub unit and the image-side sub unit. When the refractive power of the intermediate sub unit is let to be a positive refractive power, it is possible to let the positive refractive power to be shared by the object-side sub unit and the intermediate sub unit. When the refractive power of the intermediate sub unit is let to be a negative refractive power, it is possible to let the negative refractive power to be shared by the intermediate sub unit and the image-side sub unit.

In both cases, since it is possible to let the refractive power to be shared by two sub units, it is possible to make the correction effect of the spherical aberration even larger. Consequently, it is possible to suppress the occurrence of the spherical aberration and to correct the spherical aberration favorably.

In the image pickup apparatus of the second embodiment, the following conditional expression (16) be satisfied:

$$0.7 \leq |fconLCOB/fconLCB| \leq 3.5 \quad (16)$$

where, fconLCOB denotes a focal length of the object-side sub unit, fconLCB denotes a focal length of the image-side sub unit, the first state is a state in which the converter lens has not been inserted into the predetermined space, and the second state is a state in which the converter lens has been inserted into the predetermined space.

In a case of falling below a lower limit value of conditional expression (16), an effect of the spherical aberration increasing toward an 'under' side becomes strong. Consequently, it is not possible to achieve a favorable imaging performance. In a case of exceeding an upper limit value of conditional expression (16), an effect of the spherical aberration increasing toward an 'over' side becomes strong. Consequently, it is not possible to achieve a favorable imaging performance.

In the image pickup apparatus of the third embodiment, the following conditional expression (17) is satisfied.

$$2.0 \leq (fT/FnoT)/LTC \leq 6.0 \quad (17)$$

where, fT denotes a focal length of the image pickup optical system in the first state, FnoT denotes the F-number of the master optical system at the time of infinite object point focusing, and LTC denotes a distance from a lens surface positioned nearest to the object of the converter lens up to a lens surface positioned nearest to the image of the converter lens, and here the focal length and the F-number are a focal length and an F-number in a state in which the focal length of the master optical system becomes the maximum, the first state is a state in which the converter lens has not been inserted into the predetermined space, and the second lens is a state in which the converter lens has been inserted into the predetermined space.

In a case of falling below a lower limit value of conditional expression (17), since the predetermined space becomes wide, it becomes difficult to shorten the overall length of the master optical system. In a case of exceeding an upper limit value of conditional expression (17), the correction effect of the spherical aberration of the converter lens is degraded. Consequently, it is not possible to achieve a favorable imaging performance in the second state.

A basic arrangement of image pickup optical systems from an image pickup optical system of a fourth embodiment to an image pickup optical system of a tenth embodiment (hereinafter, referred to as 'third basic arrangement') will be described below.

The third basic arrangement includes a master optical system, and a converter lens which includes a plurality of lenses, wherein the master optical system includes a rear-side lens unit which is disposed nearest to an image, and of which a position is fixed all the time, and the rear-side lens unit includes a third sub unit and a fourth sub unit, and a predetermined space for putting in and out the converter lens, is provided between the third sub unit and the fourth sub unit, and a focal length of the master optical system differs in a first state and in a second state, and an overall length of the master optical system is same in the first state and in the second state, and the first state is a state in which the converter lens has not been inserted into the predetermined space, and the second state is a state in which the converter lens has been inserted into the predetermined space.

The third basic arrangement includes the master optical system and the converter lens. The converter lens either includes a plurality of lenses, or includes a plurality of lens components. In the lens component, only the side of incidence and the side of emergence are air-contact surfaces, and the lens component is a lens such as a single lens and a cemented lens.

An optical system having a half angle of view not more than 5 degrees or not more than 4 degrees is called as a telephoto optical system or a super-telephoto optical system. In an image pickup apparatus in which such optical system is used, it is possible to capture an object positioned far away or a small object. However, there is a limit on a distance at which an image can be captured and a size of which an image can be captured.

For such reason, in a case of photographing an object positioned farther or a smaller object, generally, a teleconverter lens is installed in these optical systems. By doing so, it is possible to make a magnification ratio of photography large.

However, it takes time for installing the teleconverter lens. Consequently, according to the circumstances, a photographer is not able to capture an image at the desired timing. In order not to miss an opportunity of capturing an image, it is significant to change quickly the magnification ratio of photography by the teleconverter lens in a state in which a high imaging performance is maintained.

In the third basic arrangement, the master optical system includes the rear-side lens unit. The rear-side lens unit is disposed nearest to the image and the position thereof is fixed all the time. The rear-side lens unit includes the third sub unit and the fourth sub unit. The predetermined space for putting in and out the converter lens is provided between the third sub unit and the fourth sub unit.

The rear-side lens unit is disposed nearest to the image. Consequently, in the rear-side lens unit, a diameter of an axial light beam is small as compared to a diameter at other lens units. When the diameter of an axial light beam is small, the occurrence of the spherical aberration and an occurrence of a coma are suppressed.

In a telephoto optical system and a super-telephoto optical system, the occurrence of the spherical aberration and the occurrence of the coma lead to degradation of imaging performance. In the third basic arrangement, the occurrence of the spherical aberration and the occurrence of the coma are suppressed. Consequently, it is possible to realize an optical system of telephoto type or an optical system of super-telephoto type, without letting the imaging performance to be degraded.

Moreover, since the occurrence of the spherical aberration and the occurrence of the coma are suppressed, it is possible to widen easily a distance between the third sub unit and the fourth sub unit without letting the imaging performance to be degraded. In this case, it is possible to put in and out a converter lens between the third sub unit and the fourth sub unit. By making such arrangement, it is possible to vary optical specifications such as focal length. As a result, it is possible to increase photography scenes that can be dealt with, particularly, photography scenes that need to deal with quickly.

Moreover, by making such arrangement, it is possible to realize the first state and the second state, or in other words, a state with the master optical system only and a state in which the master optical system and the converter lens are integrated, without removing the master optical system from the body of the image pickup apparatus.

For putting the converter lens in and out of the predetermined space, it is preferable to use a mechanism which moves the converter lens by operating a lever manually or electrically. In this case, a space for disposing the converter lens is provided in a lens barrel which holds the image pickup optical system. The moving mechanism which moves the converter lens is disposed near the space provided. The moving mechanism and the lever are to be connected mechanically or electrically.

By putting the converter lens in and out of the predetermined space, it is possible to let the focal length of the image pickup optical system to differ in the first state and the second state. In this case, since it is possible to deal with various photography scenes, it is possible to carry out the photography without missing capturing opportunities.

The position of the rear-side lens unit is fixed all the time. By making such arrangement, it is possible to make it hard to have an effect of putting the converter lens in and out. As a result, it is possible to achieve a stable imaging performance.

In the third basic arrangement, the overall length of the image pickup optical system is invariable in the first state and the second state. Moreover, a position of inserting the converter lens is near a body portion of the image pickup apparatus. As a result, in the third basic arrangement, there occurs almost no fluctuation in the position of the center of gravity between the first state and the second state. In this case, even when the size of an object or a distance up to the object varies, it is possible to deal quickly with the variation. Consequently, it is possible to deal with various photographic scenes.

It is desirable that the back focus almost does not vary n the first state and the second state. However, even when the back focus varies, it is possible to keep the back focus constant by moving the focusing unit, provided that the amount of variation is an amount that can be corrected by moving the focusing unit.

The image pickup optical system of the fourth embodiment has the abovementioned third basic arrangement, and the following conditional expressions (21b) and (22b) are satisfied:

$$0.12 \leq LconT/LT \leq 0.3 \tag{21b}$$

$$1.65 \leq LconT/FbT \leq 3.5 \tag{22b}$$

where,

LconT denotes a predetermined distance at a time of infinite object point focusing in the second state, LT denotes an overall length of the image pickup optical system at the time of infinite object point focusing in the first state, and FbT denotes a back focus of the image pickup optical system at the time of infinite object point focusing in the first state, and here the predetermined distance is a distance from a lens surface positioned nearest to an object of the converter lens up to an image plane in a state in which the focal length of the master optical system becomes the maximum, the overall length is a distance from a lens surface positioned nearest to the object of the image pickup optical system up to the image plane in the state in which the focal length of the master optical system becomes the maximum, the back focus is a back focus in the state in which the focal length of the master optical system becomes the maximum, the first state is a state in which the converter lens has not been inserted into the predetermined space, and the second state is a state in which the converter lens has been inserted into the predetermined space.

An angle of view of the image pickup optical system varies by putting in and out the converter lens. The variation in the angle of view is shared by the refractive power of the master lens and the refractive power of the converter lens.

In a case of falling below a lower limit value of conditional expression (21b), a proportion of the refractive power shared by the converter lens with respect to the variation in the angle of view becomes large. In this case, since a diameter of the converter lens tends to increase, small-sizing of the converter lens becomes difficult.

In a case of exceeding an upper limit value of conditional expression (21b), an effect of the spherical aberration in the converter lens increases. Consequently, when the converter lens is inserted, a degradation of imaging performance due to a shift in an inserting position increases. Moreover, since correction of the spherical aberration in the master optical system becomes difficult, it becomes difficult to shorten the overall length of the optical system.

In a case of falling below a lower limit value of conditional expression (22b), the astigmatism which occurs in the converter lens cannot be corrected adequately in the master optical system. In a case of exceeding an upper limit value of conditional expression (22b), the effect of the spherical aberration in the converter lens increases. Consequently, when the converter lens is inserted, the degradation of imaging performance due to the shift in the inserting position increases. Moreover, since the correction of the spherical aberration in the master optical system becomes difficult, it becomes difficult to shorten the overall length of the optical system.

The image pickup optical system of the fifth embodiment has the abovementioned third basic arrangement, and the following conditional expression (23b) is satisfied:

$$-5.0 \leq FbT/RtconR \leq 0.5 \tag{23b}$$

where,

FbT denotes a back focus of the image pickup optical system at a time of infinite object point focusing in the first state, and RtconR denotes a radius of curvature of a lens surface of the converter lens, which is positioned nearest to image, and here the back focus is a back focus in a state in which the focal length of the master optical system becomes the maximum, the first state is a state in which the converter lens has not been inserted into the predetermined space, and the second state is a state in which the converter lens has been inserted into the predetermined space.

In a case of falling below a lower limit value of conditional expression (23b), the occurrence of the spherical aberration in the converter lens becomes large. Consequently, it is not possible to achieve a favorable imaging performance. Moreover, it becomes difficult to shorten the overall length of the master optical system.

In a case of exceeding an upper limit value of conditional expression (23b), the occurrence of the astigmatism in the converter lens becomes large. Consequently, it is not possible to achieve a favorable imaging performance. Moreover, it becomes difficult to shorten the overall length of the master optical system.

The image pickup optical system of the sixth embodiment has the abovementioned third basic arrangement, and the following conditional expressions (21b') and (24b) are satisfied:

$$0.1 \leq LconT/LT \leq 0.44 \tag{21b'}$$

$$0.1 \leq FbT/RtconF \leq 2.4 \tag{24b}$$

where,

LconT denotes a predetermined distance at a time of infinite object point focusing in the second state, LT denotes an overall length of the image pickup optical system at the time of infinite object point focusing in the first state, FbT denotes a back focus of the image pickup optical system at the time of infinite object point focusing in the first state, and Rtconf denotes a radius of curvature of a lens surface of the converter lens, which is positioned nearest to an object, and here the predetermined distance is a distance from a lens surface positioned nearest to the object of the converter lens up to an image plane in a state in which the focal length of the master optical system becomes the maximum, the overall length is a distance from a lens surface positioned nearest to the object of the image pickup optical system up to the image plane in the state in which the focal length of the master optical system becomes the maximum, the back focus is a back focus in the state in which the focal length of the master optical system becomes the maximum, the first state is a state in which the converter lens has not been inserted into the predetermined space, and the second state is a state in which the converter lens has been inserted into the predetermined space.

A technical significance of conditional expression (21b') is same as the technical significance of conditional expression (21b).

In a case of falling below a lower limit value of conditional expression (24b), correction of the spherical aberration in the converter lens becomes inadequate. Consequently, it is not possible to achieve a favorable imaging performance. Moreover, it becomes difficult to shorten the overall length of the master optical system.

In a case of exceeding an upper limit value of conditional expression (24b), the occurrence of the spherical aberration in the converter lens becomes large. Consequently, it is not possible to achieve a favorable imaging performance. Moreover, it becomes difficult to shorten the overall length of the master optical system.

The image pickup optical system of the seventh embodiment has the abovementioned third basic arrangement, and the following conditional expressions (23b') and (24b') are satisfied:

$$-5.0 \leq FbT/RtconR \leq 1.0 \quad (23b')$$

$$0.1 \leq FbT/RtconF \leq 2.65 \quad (24b')$$

where,

FbT denotes a back focus of the image pickup optical system at a time of infinite object point focusing in the first state, RtconF denotes a radius of curvature of a lens surface of the converter lens, which is positioned nearest to an object, and RtconR denotes a radius of curvature of a lens surface of the converter lens, which is positioned nearest to the image, and here the back focus is a back focus in a state in which the focal length of the master optical system becomes the maximum.

A technical significance of conditional expression (23b') is same as the technical significance of conditional expression (23b). A technical significance of conditional expression (24b') is same as the technical significance of conditional expression (24b).

The image pickup optical system of the eighth embodiment has the abovementioned third basic arrangement, and the converter lens is a teleconverter lens, and the teleconverter lens includes an object-side lens component having a positive refractive power, an image-side lens component which includes a positive lens, and an intermediate lens component having a negative refractive power, and the object-side lens component is positioned nearest to an object, and the image-side lens component is positioned nearest to the image, and the intermediate lens component is positioned between the object-side lens component and the image side lens component, and the negative refractive power of the intermediate lens component is the largest of all the lens components having a negative refractive power, and the following conditional expression (26b) is satisfied:

$$1.2 \leq |fconLCObj/fconLCM2| \leq 4.0 \quad (26b)$$

where, fconLCObj denotes a focal length of the object-side lens component, and fconLCM2 denotes a focal length of the intermediate lens component.

In the insertion type, in a case in which the converter lens is a teleconverter lens, it is necessary to let the converter lens to have a negative refractive power.

When a teleconverter lens is inserted into the predetermined space, the focal length of the image pickup optical system becomes long. Moreover, optical specifications other than the focal length also vary. For making this variation large, it is necessary to make the negative refractive power of the converter lens large.

However, when the negative refractive power of the converter lens is made large, the positive spherical aberration becomes large. It is possible to correct the positive spherical aberration effectively by disposing a lens component having a positive refractive power at a location where the diameter of an axial light beam becomes large.

The negative refractive power of the converter lens is borne by the intermediate lens component. Therefore, the positive spherical aberration occurs in the intermediate lens component. The diameter of an axial light beam has become large on the object side of the intermediate lens component. Therefore, it is preferable to dispose a lens component having a positive refractive power on the object side of the intermediate lens component.

In the image pickup optical system of the present embodiment, the object-side lens component having a positive refractive power is disposed nearest to the object. In other words, a lens component having a positive refractive power is disposed on the object side of the intermediate lens component. Therefore, even when the negative refractive power of the intermediate lens component is made large, it is possible to correct the positive spherical aberration effectively.

The rear teleconverter lens is disposed between the master optical system and the body of the image pickup apparatus. When the rear teleconverter lens is disposed, the back focus, in general, becomes longer than the back focus before disposing the rear teleconverter lens. In the image pickup optical system of the present embodiment, the converter lens is inserted into the rear-side lens unit. The converter lens being the teleconverter lens, the back focus becomes longer than the back focus before inserting the converter lens.

However, it is desirable that the overall length of the optical system be invariable even when the converter lens is inserted into the master optical system. In a converter lens having a negative refractive power, when a lens component having a positive refractive power is disposed on the object side, it is possible to bring the image forming position close to the object side, or in other words, to shorten the back focus. For such reason, it is necessary to impart the convergence effect to a portion nearest to the object of the converter lens.

In the image pickup optical system of the present embodiment, the object-side lens component having a positive refractive power is positioned nearest to the object of the converter lens. As a result, even when the converter lens is inserted into the master optical system, it is possible to minimize the variation in the overall length of the optical system.

Moreover, when the negative refractive power of the converter lens is made large, a tendency of a curvature of field and a distortion becoming large toward a plus side increases. In this case, by disposing a lens component having a positive refractive power on the image side of a lens component which bears the negative refractive power, it is possible to suppress effectively an occurrence of the curvature of field and the occurrence of the distortion.

As mentioned above, the negative refractive power of the converter lens is borne by the intermediate lens component. Therefore, it is preferable to dispose a lens having a positive refractive power on the image side of the intermediate lens component.

In the image pickup optical system of the present embodiment, the image-side lens component which includes the positive lens is disposed nearest to the image. In other words, a lens having a positive refractive power is disposed on the image side of the intermediate lens component. Therefore, even when the negative refractive power of the intermediate lens component is made large, it is possible to suppress effectively the occurrence of the curvature of field and the occurrence of the distortion.

In a case of falling below a lower limit value of conditional expression (26b), since the negative refractive power of the intermediate lens unit becomes small, the negative refractive power of the converter lens becomes small. For maintaining a large negative refractive power in the converter lens, it is necessary make a position of the predetermined space, or in other words, a position of inserting the converter lens to be positioned farther on the object side.

Most of the lenses in the master optical system are positioned on the object side of the predetermined space. These lenses contribute to shortening the overall length of the optical system. Therefore, when the inserting position of the converter lens is positioned on the object side, a space in which a lens can be disposed in the master optical system is compressed. As a result, it becomes difficult to shorten the overall length of the optical system.

In a case of exceeding an upper limit value of conditional expression (26b), the negative refractive power of the intermediate lens unit becomes large. In this case, the positive spherical aberration occurs largely. For correcting the spherical aberration, in the intermediate lens unit, it is necessary to let the negative refractive power to be shared by a plurality of lenses. Consequently, the number of lenses in the intermediate lens unit increases. As the number of lenses increases, since the overall length of the converter lens becomes long, it becomes difficult to shorten the overall optical system.

The image pickup optical system of the ninth embodiment has the abovementioned third basic arrangement, and the converter lens is a teleconverter lens, and the teleconverter lens includes an object-side sub unit having a positive refractive power, an intermediate sub unit, and an image-side sub unit having a negative refractive power, and the object-side sub unit is positioned nearest to an object, the intermediate sub unit is positioned on an image side of the object-side sub unit, and the image-side sub unit is positioned on the image side of the intermediate subunit, and a lens surface on an object side of the object-side sub unit is a surface which is convex toward the object side, and the image-side sub unit includes a positive lens and a negative lens, and the following conditional expression (16) is satisfied:

$$0.7 \leq |fconLCOB/fconLCB| \leq 3.5 \qquad (16)$$

where, fconLCOB denotes a focal length of the object-side sub unit, and fconLCB denotes a focal length of the image-side sub unit.

In the image pickup optical system of the ninth embodiment, the converter lens has the object-side sub unit nearest to the object. The object-side sub unit has a positive refractive power. In this case, the object-side subunit functions in the same manner as the object-side lens component in the image pickup optical system of the eighth embodiment. Therefore, even in the image pickup optical system of the ninth embodiment, it is possible to achieve an effect similar to the effect of the image pickup optical system of the eighth embodiment.

For shortening the overall length of the optical system, it is necessary to make a thickness of the converter lens thin, and to narrow the predetermined space as much as possible. However, when the predetermined space is narrowed, the spherical aberration which occurs in the converter lens is susceptible to increase.

In the image pickup optical system of the ninth embodiment, the image-side sub unit having a negative refractive power is disposed on the image side of the object-side sub unit. Therefore, it is possible to make the correction effect of the spherical aberration large by the positive refractive power of the object-side sub unit and the negative refractive power of the image-side sub unit.

Furthermore, the intermediate sub unit is disposed between the object-side sub unit and the image-side sub unit. When the refractive power of the intermediate sub unit is let to be a positive refractive power, it is possible to let the positive refractive power to be shared by the object-side sub unit and the intermediate sub unit. When the refractive power of the intermediate sub unit is let to be a negative refractive power, it is possible to let the negative refractive power to be shared by the intermediate sub unit and the image-side sub unit.

In both cases, since it is possible to let the refractive power to be shared by two sub units, it is possible to make the correction effect of the spherical aberration even larger. Consequently, it is possible to suppress the occurrence of the spherical aberration and to correct the spherical aberration favorably.

The technical significance of conditional expression (16) is as mentioned above.

The image pickup optical system of the tenth embodiment has the abovementioned third basic arrangement, and the converter lens is a teleconverter lens, and the teleconverter lens includes an object-side sub unit having a positive refractive power, an intermediate sub unit, and an image-side sub unit having a negative refractive power, and the object-side sub unit is positioned nearest to an object, and the intermediate sub unit is positioned on an image side of the object-side sub unit, and the image-side sub unit is positioned on the image side of the intermediate sub unit, and a lens surface on an object side of the object-side subunit is a surface which is convex toward the object side, and the image-side sub unit includes a positive lens and a negative lens, and the following conditional expression (17) is satisfied:

$$2.0 \leq (fT/FnoT)/LTC \leq 6.0 \quad (17)$$

where, fT denotes a focal length of the image pickup optical system in the first state, FnoT denotes an F-number of the master optical system at the time of infinite object point focusing, and LTC denotes a distance from a lens surface positioned nearest to the object of the converter lens up to a lens surface positioned nearest to the image of the converter lens, and here the focal length and the F-number are a focal length and an F-number in a state in which the focal length of the master optical system becomes the maximum.

The image pickup optical system of the tenth embodiment has an arrangement similar to the arrangement of the image pickup optical system of the ninth embodiment. Therefore, even in the image pickup optical system of the tenth embodiment, it is possible to achieve an effect similar to the effect of the image pickup optical system of the ninth embodiment.

As mentioned above, even in the image pickup optical system of the tenth embodiment, since it is possible to let the refractive power to be shared by two sub units, it is possible to make the correction effect of the spherical aberration even larger. Consequently, it is possible to improve the magnification of the converter lens while suppressing the occurrence of the spherical aberration.

When it is possible to improve the magnification of the converter lens, it is possible to make an arrangement such that the image-side sub unit includes one lens component. Furthermore, when an arrangement is made such that each of the object-side subunit and the intermediate subunit includes one lens component, it is possible to form the converter lens by three lens components. As a result, it is possible to shorten the overall length of the converter lens. Moreover, accordingly, it is possible to shorten the overall length of the master optical system.

The technical significance of conditional expression (17) is as mentioned above.

The image pickup optical systems from the image pickup optical system of the first embodiment to the image pickup optical system of the tenth embodiment will be referred to as 'image pickup optical system of the present embodiment'. The image pickup optical systems from the image pickup optical system of the first embodiment to the image pickup optical system of the third embodiment will be referred to as 'image pickup optical system of type 1'. The image pickup optical systems from the image pickup optical system of the fourth embodiment to the image pickup optical system of the tenth embodiment will be referred to 'image pickup optical system of type 2'.

In the image pickup optical system of type 1, the zoom optical system of the present embodiment is used. In the zoom optical system, the focal length at the telephoto end becomes the maximum, and the focal length at the wide angle end becomes the minimum.

Whereas, in the image pickup optical system of type 2, the master optical system is used. The master optical system may be a variable focus optical system or a single focus optical system. In the variable focus optical system, the focal length varies. In the single focus optical system, the focal length does not vary.

In the case in which the master optical system is the variable focus optical system, the master optical system has a state in which the focal length becomes the maximum and a state in which the focal length becomes the minimum. In this case, the state in which the focal length becomes the maximum corresponds to the telephoto end in the zoom optical system. The state in which the focal length becomes the minimum corresponds to the wide angle end in the zoom optical system.

Moreover, in the case in which the master optical system is the single focus optical system, there is only a state in which there is one focal length. In this case, the only the state in which there is one focal length may be deemed either as the state in which the focal length becomes the maximum or the state in which the focal length becomes the minimum. Even in the case in which the master optical system is the single focus optical system, the master optical system has the state in which the focal length becomes the maximum.

Therefore, with regard to conditional expressions related to the image pickup optical system of type 1, by reading the 'telephoto end' as the 'state in which the focal length becomes the maximum', these conditional expressions are applicable to the image pickup optical system of type 2. Moreover, with regard to conditional expressions related to the image pickup optical system of type 2, by reading the 'state in which the focal length becomes the maximum' as the 'telephoto end', these conditional expressions are applicable to the image pickup apparatus of type 1.

Preferable arrangements of the image pickup optical system will be described below.

In the image pickup optical system of type 1, it is preferable that the following conditional expression (18) be satisfied:

$$0.05 \leq LR12/LT \leq 0.25 \quad (18)$$

where,

LR12 denotes a length along an optical axis of the predetermined space, and

LT denotes the overall length of the image pickup optical system at the time of infinite object point focusing in the first state, and here the overall length is a distance from a lens surface positioned nearest to the object of the image pickup optical system up to the image plane in a state in which the focal length of the master optical system becomes the maximum.

In a case of falling below a lower limit value of conditional expression (18), a width of the predetermined space becomes inadequate. When the overall length of the converter lens is shortened, mainly the correction of the spherical aberration and the correction of the chromatic aberration become difficult. Consequently, it is not possible to achieve a favorable imaging performance.

In a case of exceeding an upper limit value of conditional expression (18), in the master optical system, it becomes difficult to secure a space for moving the movable lens. Consequently, it becomes difficult to secure an adequate zoom ratio such as a zoom ratio more than double. Or, by the refractive power of the movable lens unit becoming large, the occurrence of the spherical aberration and the occurrence of the chromatic aberration in the movable lens unit become large. Consequently, it is not possible to achieve a favorable imaging performance.

In the image pickup optical system of type 1, it is preferable that the converter lens have a positive refractive power, and in the second state, the following conditional expression (19) be satisfied:

$$0.6 \leq fwconT/fT \leq 0.85 \tag{19}$$

where, fwconT denotes a focal length of the image pickup optical system in the second state, and fT denotes a focal length of the image pickup optical system in the first state, and here the focal length is a focal length at the telephoto end.

In a case of falling below a lower limit value of conditional expression (19), the positive refractive power of the converter lens becomes large. Consequently, correction of the astigmatism becomes difficult. In a case of exceeding an upper limit value of conditional expression (19), a variation in the angle of view becomes small before and after inserting the converter lens. Consequently, it becomes hard to deal with a variation in an object distance and a variation in the size of the object. As a result, it becomes difficult to deal with various photographic scenes.

It is preferable that the image pickup optical system of the first embodiment have the abovementioned common arrangement, and the following conditional expression (16) be satisfied:

$$0.7 \leq |fconLCOB/fconLCB| \leq 3.5 \tag{16}$$

where, fconLCOB denotes the focal length of the object-side sub unit, and fconLCB denotes the focal length of the image-side sub unit.

An action effect of the common arrangement and the technical significance of conditional expression (16) are as mentioned above.

It is preferable that the image pickup optical system of the first embodiment have the abovementioned common arrangement, and the following conditional expression (17) be satisfied:

$$2.0 \leq (fT/FnoT)/LTC \leq 6.0 \tag{17}$$

where, fT denotes the focal length of the image pickup optical system in the first state, FnoT denotes the F-number of the master optical system at the time of infinite object point focusing, and LTC denotes the distance from a lens surface positioned nearest to the object of the converter lens up to a lens surface positioned nearest to the image of the converter lens, here the focal length and the F-number are a focal length and an F-number in a state in which the focal length of the master optical system becomes the maximum, the first state is a state in which the converter lens has not been inserted into the predetermined space, and the second lens is a state in which the converter lens has been inserted into the predetermined space.

The action effect of the common arrangement and the technical significance of conditional expression (17) are as mentioned above.

In the image pickup optical system of type 1, it is preferable that the converter lens have a negative refractive power, and the following conditional expression (20) be satisfied:

$$1.15 \leq ftconT/fT \leq 2.05 \tag{20}$$

where, ftconT denotes a focal length of the image pickup optical system in the second state, and fT denotes the focal length of the image pickup optical system in the first state, and here the focal length is a focal length in a state in which the focal length of the master optical system becomes the maximum.

In a case of falling below a lower limit value of conditional expression (20), the variation in the angle of view becomes small before and after inserting the converter lens. Consequently, it becomes hard to deal with the variation in the object distance and the variation in the size of the object. As a result, it becomes difficult to deal with various photographic scenes. In a case of is exceeding an upper limit value of conditional expression (20), the negative refractive power of the converter lens becomes large. Consequently, correction of the astigmatism becomes difficult.

In the image pickup optical system of type 1, it is preferable that the following conditional expression (21) be satisfied:

$$0.1 \leq LconT/LT \leq 0.4 \tag{21}$$

where,

LconT denotes the predetermined distance at the time of infinite object point focusing in the second state, and LT denotes the overall length of the image pickup optical system at the time of infinite object point focusing in the second state, and here the overall length is a distance from a lens surface positioned nearest to the object of the image pickup optical system up to the image plane at the telephoto end.

A technical significance of conditional expression (21) is same as the technical significance of conditional expression (21b).

In the image pickup optical system of type 1, it is preferable that the following conditional expression (22) be satisfied:

$$1.2 \leq LconT/FbT \leq 4.0 \tag{22}$$

where,

LconT denotes the predetermined distance at the time of infinite object point focusing in the second state, and FbT denotes the back focus of the image pickup optical system at the time of infinite object point focusing in the first state, and here the predetermined distance is a distance from a lens surface positioned nearest to an object of the converter lens up to an image plane at the telephoto end, and the back focus is a back focus at the telephoto end.

A technical significance of conditional expression (22) is same as the technical significance of conditional expression (22b).

In the image pickup optical system of type 1, it is preferable that the following conditional expression (23) be satisfied.

$$-6.0 \leq FbT/RtconR \leq 2.5 \tag{23}$$

where,

FbT denotes the back focus of the image pickup optical system at the time of infinite object point focusing in the first state, and RtconR denotes the radius of curvature of a lens surface positioned nearest to the image of the converter lens, and here the back focus is a back focus at the telephoto end.

In a case of falling below a lower limit value of conditional expression (23), the occurrence of the spherical aberration in the converter lens becomes large. Consequently, it is not possible to achieve a favorable imaging performance. In a case of exceeding an upper limit value of conditional expression (23), the occurrence of the astigmatism in the converter lens becomes large. Consequently, it is not possible to achieve a favorable imaging performance.

In the image pickup optical system of type 1, it is preferable that the following conditional expression (24) be satisfied:

$$0.1 \leq FbT/RtconF \leq 4.0 \quad (24)$$

where,

FbT denotes the back focus of the image pickup optical system at the time of infinite object point focusing in the first state, and RtconF denotes the radius of curvature of a lens surface positioned nearest to the object of the converter lens, and here the back focus is a back focus at the telephoto end.

In a case of falling below a lower limit value of conditional expression (24), the correction of the spherical aberration in the converter lens becomes inadequate. Consequently, it is not possible to achieve a favorable imaging performance. In a case of exceed an upper limit value of conditional expression (24), the occurrence of the spherical aberration in the converter lens becomes large. Consequently, it is not possible to achieve a favorable imaging performance.

In the image pickup optical system of type 1 and the image pickup optical system of the eighth embodiment, it is preferable that the plurality of lens components include an object-side lens component, and the object-side lens component be a single lens, and be positioned nearest to the object, and the following conditional expression (25) be satisfied:

$$50 \leq \nu dconLc1 \quad (25)$$

where,

νdconLc1 denotes Abbe number for the single lens.

The converter lens includes the plurality of lens components. The plurality of lens components includes an object-side lens component. The object-side lens component is disposed nearest to the object. By letting the object-side lens component to be a single lens, it is possible to facilitate shortening of the overall length of the converter lens.

By satisfying conditional expression (25), it is possible to reduce a load of correction of the longitudinal chromatic aberration on a lens component positioned on the image side of the object-side lens component. In this case, as it becomes easier to facilitate shortening of the overall length of the converter lens, it is possible to carry out small-sizing of the converter lens.

In the image pickup optical system of the first embodiment, it is preferable that the converter lens be a teleconverter lens, and include an object-side lens component having a positive refractive power, an image-side lens component which include a positive lens, and an intermediate lens component having a negative refractive power, and the object-side lens component be positioned nearest to the object, and the image-side lens component be positioned nearest to the image, and the intermediate lens component be positioned between the object-side lens component and the image-side lens component, and the negative refractive power of the intermediate lens component be the largest among the lens components having a negative refractive power.

In the image pickup optical system of the first embodiment, the insertion type has been used. In the insertion type, in a case in which the converter lens is a teleconverter lens, it is necessary to let the converter lens to have a negative refractive power.

When the teleconverter lens is inserted into the predetermined space, the focal length of the image pickup optical system becomes long. Moreover, optical specifications other than the focal length also vary. For making this variation large, it is necessary to make the negative refractive power of the converter lens large.

However, when the negative refractive power of the converter lens is made large, the positive spherical aberration becomes large. It is possible to correct the positive spherical aberration effectively by disposing a lens component having a positive refractive power at a location where the diameter of an axial light beam becomes large.

The negative refractive power of the converter lens is borne by the intermediate lens component. Therefore, the positive spherical aberration occurs in the intermediate lens component. The diameter of an axial light beam has become large on the object side of the intermediate lens component. Therefore, it is preferable to dispose a lens component having a positive refractive power on the object side of the intermediate lens component.

In the image pickup optical system of type 1, the object-side lens component having a positive refractive power is disposed nearest to the object. In other words, a lens component having a positive refractive power is disposed on the object side of the intermediate lens component. Therefore, even when the negative refractive power of the intermediate lens component is made large, it is possible to correct the positive spherical aberration effectively.

The rear teleconverter lens is disposed between the master optical system and the body of the image pickup apparatus. When the rear teleconverter lens is disposed, the back focus, in general, becomes longer than the back focus before disposing the rear teleconverter lens. In the image pickup optical system of type 1, the converter lens is inserted into the rear-side lens unit. The converter lens being the teleconverter lens, the back focus becomes longer than the back focus before inserting the converter lens.

However, it is desirable that the overall length of the optical system be invariable even when the converter lens is inserted into the master optical system. In a converter lens having a negative refractive power, when a lens component having a positive refractive power is disposed on the object side, it is possible to bring the image forming position close to the object side, or in other words, to shorten the back focus. For such reason, it is necessary to impart the convergence effect to a portion nearest to the object of the converter lens.

In the image pickup optical system of type 1, the object-side lens component having a positive refractive power is positioned nearest to the object of the converter lens. As a result, even when the converter lens is inserted into the master optical system, it is possible to minimize the variation in the overall length of the optical system.

Moreover, when the negative refractive power of the converter lens is made large, the tendency of the curvature of field and the distortion becoming large toward the plus side increases. In this case, by disposing a lens component having a positive refractive power on the image side of a lens component which bears the negative refractive power, it is possible to suppress effectively the occurrence of the curvature of field and the occurrence of the distortion.

As mentioned above, the negative refractive power of the converter lens is borne by the intermediate lens component. Therefore, it is preferable to dispose a lens having a positive refractive power on the image side of the intermediate lens component.

In the image pickup optical system of type 1, the image-side lens component which includes the positive lens is disposed nearest to the image. In other words, a lens having a positive refractive power is disposed on the image side of the intermediate lens component. Therefore, even when the negative refractive power of the intermediate lens component is made large, it is possible to suppress effectively the occurrence of the curvature of field and the occurrence of the distortion.

In the image pickup optical system of the second embodiment and the image pickup optical system of the third embodiment, it is preferable that the object-side sub unit include an object-side lens component which is positioned nearest to the object, and the image-side sub unit include an image-side lens component which is positioned nearest to the image, and the intermediate lens component be positioned between the object-side lens component and the image-side lens component, and the negative refractive power of the intermediate lens component be the largest among the lens components having a negative refractive power.

An action effect by such arrangement is as mentioned above.

In the image pickup optical system of type 1, the image pickup optical systems from the fourth embodiment to the seventh embodiment, the image pickup optical system of the ninth embodiment, and the image pickup optical system of the tenth embodiment, it is preferable that the following conditional expression (26) be satisfied:

$$0.5 \leq |fconLCObj/fconLCM2| \leq 4.0 \quad (26)$$

where, fconLCObj denotes the focal length of the object-side lens, and fconLCM2 denotes the focal length of the intermediate lens component.

By satisfying conditional expression (26), it is possible to correct the positive spherical aberration effectively even when the negative refractive power of the intermediate lens component is made large, and furthermore, it is possible to suppress the occurrence of the curvature of field and the occurrence of the distortion effectively.

In the image pickup optical system of the present embodiment, it is preferable that a lens component which includes a negative lens be disposed on the object side of the intermediate lens component.

As mentioned above, the negative refractive power of the converter lens is borne by the intermediate lens component. By disposing the lens component having a negative refractive power on the object side of the intermediate lens component, it is possible to let the negative refractive power of the converter lens to be shared by this lens component and the intermediate lens component. As a result, it is possible to suppress further an occurrence of the positive spherical aberration effectively.

It is desirable that the refractive power of the lens component which includes the negative lens be a negative refractive power. By making such arrangement, it is possible to suppress further the occurrence of the positive spherical aberration.

In the image pickup optical system of the present embodiment, it is preferable that the image-side lens component have a positive refractive power.

By making such arrangement, it is possible to improve an effect of suppressing the occurrence of the curvature of field and the occurrence of the distortion.

In the image pickup optical system of the present embodiment, it is preferable that the converter lens include in order from the object side, an object-side lens component, a lens component which includes a negative lens, an intermediate lens component, and an image-side lens component.

Disposing a large number of lens components in the converter lens is effective from a point of view of aberration correction. However, when the number of lens components is large, since the overall length of the converter lens becomes long, the predetermined space also becomes large. As a result, a balance of the overall length of the master optical system and the overall length of the predetermined space is disrupted.

By the converter lens including four lens components, it is possible to balance the overall length of the master optical system and the overall length of the predetermined space appropriately.

In the image pickup optical system of type 1, it is preferable that the converter lens be a wide converter lens, and include an object-side lens component which is positioned nearest to the object and an image-side lens component which is positioned nearest to the image, and a lens surface nearest to the object of the object-side lens component be a surface which is concave toward the object side, and a lens surface nearest to the image of the image-side lens component be a surface which is concave toward the image side, and a lens surface having a large positive refractive power be included between the lens surface nearest to the object and the lens surface nearest to the image.

In the insertion type, in a case in which the converter lens is a wide converter lens, it is necessary to let the converter to have a positive refractive power.

When a wide converter lens is inserted into the predetermined space, the focal length of the image pickup optical system becomes short. Moreover, optical specifications other than the focal length also vary. For making this variation large, it is necessary to make the positive refractive power of the converter lens large.

A rear wide converter lens is disposed between the master optical system and the body of the image pickup apparatus. When the rear wide converter lens is disposed, the back focus, in general, becomes shorter than the back focus before disposing the rear wide converter lens. In the image pickup optical system of type 1, the converter lens is inserted into the rear-side lens unit. The converter lens being the wide converter lens, the back focus becomes shorter than the back focus before inserting the converter lens.

However, it is desirable that the overall length of the optical system be invariable even when the converter lens is inserted into the master optical system. In a converter lens having a positive refractive power, when a lens surface having a negative refractive power is disposed on the object side, it is possible to keep the image forming position away from the object side, or in other words, to make the back focus long. For such reason, it is necessary to impart a divergence effect to a portion nearest to the object of the converter lens.

Moreover, when the positive refractive power of the converter lens is made large, a negative spherical aberration becomes substantial. It is possible to correct the negative spherical aberration effectively by disposing the lens surface having a negative refractive power on the object side of a lens component which bears the positive refractive power. Moreover, by disposing the lens surface having a negative refractive power, as mentioned above, it is possible to make the overall length of the image pickup optical system invariable.

In the image pickup optical system of type 1, the object-side lens component is disposed nearest to the object and the lens surface nearest to the object of the object-side lens component is a surface which is concave toward the object side. In other words, a lens surface having a negative refractive power is disposed nearest to the object. Therefore, even when the positive refractive power of the converter lens is made large, it is possible to achieve both of correction of the negative spherical aberration and to make the overall length of the image pickup optical system invariable.

Moreover, when the positive refractive power of the converter lens is made large, a tendency of the curvature of field and the distortion becoming large toward a minus side increases. In this case, by disposing a surface of a lens having a negative refractive power on the image side of a lens component which bears the positive refractive power, it is possible to suppress effectively the occurrence of the curvature of field and the occurrence of the distortion.

In the image pickup optical system of type 1, the image-side lens component is disposed nearest to the image, and a lens surface nearest to the image of the image-side lens component is a surface which is concave toward the image side. In other words, a lens surface having a negative refractive power is disposed nearest to the image. Therefore, even when the positive refractive power of the converter lens is made large, it is possible to suppress the occurrence of the curvature of field and the occurrence of the distortion effectively.

In the image pickup optical system of type 1, it is preferable that the following conditional expression (27) be satisfied:

$$0.2 \leq |FbT/RwconR| \leq 1.2 \qquad (27)$$

where,

FbT denotes the back focus of the zoom optical system at the time of infinite object point focusing in the first state, and RwconR denotes a radius of curvature of the lens surface nearest to the image of the image-side lens component.

In a case of falling below a lower limit value of conditional expression (27), the tendency of the curvature of field becoming large toward the minus side and the tendency of the distortion becoming large toward the minus side increase. Consequently, a degradation of imaging performance when the wide converter lens was inserted becomes large.

In a case of exceeding an upper limit value of conditional expression (27), the tendency of the curvature of field becoming large toward the plus side and the tendency of the distortion becoming large toward the plus side increase. Consequently, the degradation of imaging performance when the wide converter lens was inserted becomes large.

In the image pickup optical system of type 1, it is preferable that the following conditional expression (28) be satisfied:

$$0.5 \leq |RwconfF/RwconR| \leq 2.5 \qquad (28)$$

RwconfF denotes a radius of curvature of the lens surface positioned nearest to the object of the converter lens, and RwconR denotes a radius of curvature of the lens surface positioned nearest to the image of the converter lens.

In a case of falling below a lower limit value of conditional expression (28), correction of the spherical aberration becomes excessive. Consequently, it is not possible to achieve a favorable imaging performance. In a case of exceeding an upper limit value of conditional expression (28), correction of the curvature of field and correction of the distortion become excessive. Consequently, it is not possible to achieve a favorable imaging performance.

It is preferable that the image pickup optical system of type 1 include a first lens component which is disposed on the image side of the object-side lens component and a second lens component which is disposed between the first lens component and the image-side lens component, and a lens surface on the image side of the first lens component be a surface which is convex toward the image side, and a lens surface on the object side of the second lens component be a surface which is convex toward the object side.

By disposing the first lens component and the second lens component between the object-side lens component and the image-side lens component, it is possible to suppress the occurrence of the spherical aberration even when the positive refractive power of the converter lens is made large.

By letting the lens surface on the image side of the first lens component to be a surface which is convex on the image side and the lens surface on the object side of the second lens component to be a surface which is convex toward the object side, it is possible to make the refractive power large. Since the positive refractive power is shared by two lens surfaces, it is possible to suppress the occurrence of the spherical aberration. As a result, it is possible to achieve a favorable imaging performance.

In the image pickup optical system of type 2, it is preferable that the third sub unit include a positive lens.

By making such arrangement, it is possible to suppress a height of an off-axis light beam between the third sub unit and the fourth sub unit. Consequently, in a case of putting in an out a converter lens between the third sub unit and the fourth sub unit, it is possible to make a diameter of the converter lens small.

In the image pickup optical system of type 2, it is preferable that the fourth sub unit include a predetermined lens, and a sign of the refractive power of the predetermined lens be a sign opposite to a sign of the refractive power of the converter lens.

The converter lens has a refractive power. Therefore, when the converter lens is inserted into the zoom optical system, Petzval sum varies according to the refractive power of the converter lens. As a result, an amount of occurrence of the astigmatism becomes large as the case may be.

By letting the sign of the refractive power of the predetermined lens to be a sign opposite to the sign of the refractive power of the converter lens, it is possible to change the occurrence of the astigmatism effectively.

In the image pickup optical system of type 2, it is preferable that the fourth sub unit include a positive lens and a negative lens.

The fourth sub unit is disposed nearest to the image. The fourth sub unit contributes significantly to an occurrence of the distortion and an occurrence of the chromatic aberration of magnification. It is possible to improve a correction effect of positive distortion by the positive lens, and it is possible to improve the correction effect of chromatic aberration of magnification by the negative lens.

As mentioned above, when the overall length of the optical system is shortened, in a lens unit positioned nearest to the object in the master optical system (hereinafter, referred to as 'first front unit'), mainly the positive distortion occurs. Moreover, in a lens unit positioned on the object side in the master optical system (hereinafter, referred to as 'front-side lens unit'), the chromatic aberration of magnification remains. It is possible to correct the positive distortion favorably by the positive lens. It is possible to correct the chromatic aberration of magnification by the negative lens.

In such manner, by the fourth sub unit including the positive lens and the negative lens, it is possible to distribute the load of the first front unit concerning the chromatic aberration and shortening the overall length of the optical system to the fourth sub unit. As a result, it is possible to achieve small-sizing of the optical system and improvement in the imaging performance.

Moreover, the diameter of a lens in the first front unit being large, the weight is susceptible to increase in the first front unit. However, since it is possible to distribute the load on the first front unit to the fourth sub unit, it is possible to reduce the number of lenses to be used in the first front unit. Moreover, since types of glass that can be selected increase, it is possible to use a glass of lower specific gravity for the first front unit. As a result, it becomes easy to make the first front unit light-weight.

When the number of lenses used in the fourth sub unit becomes large, it becomes difficult to secure adequately the back focus and the distance between the third sub unit and the fourth sub unit while achieving the abovementioned effect. Therefore, it is desirable that the fourth sub unit includes only one positive lens and one negative lens.

In the image pickup optical system of type 2, it is preferable that the following conditional expression (15) be satisfied:

$$|\Delta FbT|/FnoT \leq 0.05 \text{ (mm)} \tag{15}$$

where, $$\Delta FbT = FbT - FbconT,$$

Fbt denotes the back focus of the image pickup optical system at the time of infinite object point focusing in the first state, FbconT denotes the back focus of the image pickup optical system at the time of infinite object point focusing in the second state, and FnoT denotes the F-number of the master optical system at the time of infinite object point focusing, and here the first state is a state in which the converter lens has not been inserted into the predetermined space, and the second state is a state in which the converter lens has been inserted into the predetermined space, and the back focus and the F-number are a back focus and an F-number in a state in which the focal length of the master optical system becomes the maximum.

It is desirable that the back focus almost does not vary in the first state and in the second state. However, even when the back focus varies, it is possible to keep the back focus constant by moving the focusing unit, provided that the amount of variation is an amount that can be corrected by moving the focusing unit.

The technical significance of conditional expression (15) is as described above.

In the image pickup optical system of type 2, it is preferable that the following conditional expression (18) be satisfied:

$$0.05 \leq LR12/LT \leq 0.25 \tag{18}$$

where,

LR12 denotes the length along an optical axis of the predetermined space, and

LT denotes the overall length of the image pickup optical system at the time of infinite object point focusing in the first state, and here the overall length is a distance from a lens surface positioned nearest to the object of the image pickup optical system up to the image plane in a state in which the focal length of the master optical system becomes the maximum.

In a case of falling below a lower limit value of conditional expression (18), a width of the predetermined space becomes inadequate. When the overall length of the converter lens is shortened, mainly the correction of the spherical aberration and the correction of the chromatic aberration become difficult. Consequently, it is not possible to achieve a favorable imaging performance.

Most of the lenses in the master optical system are positioned on the object side of the predetermined space. These lenses contribute to correction of various aberrations. Therefore, when the predetermined space becomes wide, a space in which a lens can be disposed in the master optical system is compressed. As a result, correction of various aberrations becomes difficult.

In a case of exceeding an upper limit value of conditional expression (18), a width of the predetermined space becomes wide. In this case, a space for disposing a lens in the master optical system becomes small. Consequently, it is not possible to achieve a correction effect of various aberrations adequately.

In a telephoto optical system and a super-telephoto optical system, mainly the spherical aberration, the chromatic aberration of magnification, and the distortion are degraded. Moreover, in a case of providing these optical systems with a focusing function and a zooming function, it is not possible to secure adequately a space for moving a lens and a space for disposing a moving mechanism. Consequently, the spherical aberration and a fluctuation in the chromatic aberration of magnification due to the movement of lenses become large.

In the image pickup optical system of type 2, it is preferable that the converter lens have a negative refractive power, and the following conditional expression (20) be satisfied:

$$1.15 \leq ftconT/fT \leq 2.05 \tag{20}$$

where, ftconT denotes the focal length of the image pickup optical system in the second state, and fT denotes the focal length of the image pickup optical system in the first state, and here the focal length is a focal length in a state in which the focal length of the master optical system becomes the maximum.

In a case of falling below a lower limit value of conditional expression (20), the variation in the angle of view becomes small in the first state and in the second state. Consequently, it becomes hard to deal with the variation in the object distance and the variation in the size of the object. As a result, it becomes difficult to deal with various photographic scenes. In a case of is exceeding an upper limit value of conditional expression (20), the negative refractive power of the converter lens becomes large. Consequently, correction of the astigmatism becomes difficult.

In the image pickup optical system of the fifth embodiment and image pickup optical systems from the image pickup optical system of the eighth embodiment to the image pickup optical system of the tenth embodiment, it is preferable that the following conditional expression (21b') be satisfied:

$$0.1 \leq LconT/LT \leq 0.44 \tag{21b'}$$

where,

LconT denotes the predetermined distance at the time of infinite object point focusing in the second state, and LT denotes the overall length of the image pickup optical system at the time of infinite object point focusing in the first state, and here the predetermine distance is a distance from a lens surface positioned nearest to the object of the converter lens up to the image plane in a state in which the focal length of the master optical system becomes the maximum, and the overall length is a distance from a lens surface positioned nearest to the object of the image pickup optical system up to the image plane in the state in which the focal length of the master optical system becomes the maximum.

A technical significance of conditional expression (21b') is same as the technical significance of conditional expression (21b).

In image pickup optical systems from the image pickup optical system of the fifth embodiment up to the image pickup optical system of the tenth embodiment, it is preferable that the following conditional expression (22) be satisfied:

$$1.2 \leq LconT/FbT \leq 4.0 \tag{22}$$

where,

LconT denotes the predetermined distance at the time of infinite object point focusing in the second state, and FbT denotes the back focus of the image pickup optical system at the time of infinite object point focusing in the first state, and here the predetermined distance is a distance from a lens surface positioned nearest to the object of the converter lens up to an image plane, in a state in which the focal length of the master optical system becomes the maximum, and the back focus is a back focus in the state in which the focal length of the master optical system becomes the maximum.

A technical significance of conditional expression (22) is same as the technical significance of conditional expression (22b).

In the image pickup optical system of the fourth embodiment, the image pickup optical system of the sixth embodiment, and image pickup optical systems from the image pickup optical system of the eighth embodiment up to the image pickup optical system of the tenth embodiment, it is preferable that the following conditional expression (23b') be satisfied:

$$-0.5 \leq FbT/RtconR \leq 1.0 \tag{23b'}$$

where,

FbT denotes the back focus of the image pickup optical system at the time of infinite object point focusing in the first state, and RtconR denotes the radius of curvature of a lens surface positioned nearest to the image of the converter lens.

A technical significance of conditional expression (23b') is same as the technical significance of conditional expression (23b).

In the image pickup optical system of the fourth embodiment, the image pickup optical system of the fifth embodiment, and image pickup optical systems from the image pickup optical system of the eighth embodiment to the image pickup optical system of the tenth embodiment, it is preferable that the following conditional expression (24) be satisfied:

$$0.1 \leq FbT/RtconF \leq 4.0 \tag{24}$$

where,

FbT denotes the back focus of the image pickup optical system at the time of infinite object point focusing in the first state, and RtconF denotes the radius of curvature of a lens surface positioned nearest to the object of the converter lens.

The technical significance of conditional expression (24) is as mentioned above. Moreover, when the conditional expression (24) is not satisfied, it becomes difficult to shorten the overall length of the master optical system.

In image pickup optical systems from the image pickup optical system of the fourth embodiment up to the image pickup optical system of the seventh embodiment, the image pickup optical system of the ninth embodiment, and the image pickup optical system of the tenth embodiment, the converter lens includes a plurality of lenses. In this case, it is preferable that the plurality of lenses include an object-side lens, and the object lens be a single lens, and be positioned nearest to the object, and the abovementioned conditional expression (25) be satisfied.

In image pickup optical systems from the image pickup optical system of the fourth embodiment up to the image pickup optical system of the seventh embodiment, the image pickup optical system of the ninth embodiment, and the image pickup optical system of the tenth embodiment, it is preferable that the converter lens be a teleconverter lens which includes a plurality of lens components, and in the lens component, only a side of incidence and a side of emergence are air-contact surfaces, and the teleconverter lens include an object-side lens component having a positive refractive power, an image-side lens component which includes a positive lens, and an intermediate lens component having a negative refractive power, and the object-side lens component be positioned nearest to the object, and the image-side lens component be positioned nearest to the image, and the intermediate lens component be positioned between the object-side lens component and the image-side lens component, and the negative refractive power of the intermediate lens component be the largest among the lens components having a negative refractive power.

By making such arrangement, it is possible to achieve a technical effect described in the image pickup optical system of the eighth embodiment.

In image pickup optical systems from the image pickup optical system of the fourth embodiment up to the image pickup optical system of the seventh embodiment, it is preferable that the converter lens be a teleconverter lens, and the teleconverter lens include an object-side sub unit having a positive refractive power, an intermediate sub unit, and an image-side sub unit having a negative refractive power, and the object-side sub unit be disposed nearest to the object, and the intermediate sub unit be disposed on the image side of the object-side sub unit, and the image-side sub unit be disposed on the image side of the intermediate sub unit, and a lens surface on the object side of the object-side sub unit be a surface which is convex toward the object side, and the image-side sub unit include a positive lens and a negative lens.

By making such arrangement, it is possible to achieve an effect described in the image pickup optical system of the ninth embodiment and the image pickup optical system of the tenth embodiment. Moreover, in the image pickup optical system of the eighth embodiment, it is possible to divide a plurality of lens components into the abovementioned sub units.

In the image pickup optical system of type 2, it is preferable that the following conditional expression (16b) be satisfied:

$$0.69 \leq |fconLCOB/fconLCB| \leq 3.5 \tag{16b}$$

where, fconLCOB denotes the focal length of the object-side sub unit, and fconLCB denotes the focal length of the image-side sub unit.

A technical significance of conditional expression (16b) is same as the technical significance of conditional expression (16).

In the image pickup optical system of type 2, it is preferable that the intermediate sub unit have a negative refractive power, and a shape of the intermediate sub unit be a meniscus shape.

By making such arrangement, it is possible to let the negative refractive power of the converter lens to be shared by the intermediate sub unit and the image-side sub unit. Consequently, it is possible to shorten the overall length of the converter lens while suppressing the occurrence of the spherical aberration. In such manner, even by shortening the overall length of the converter lens, it is becomes easy to secure a favorable imaging performance. Moreover, it is also possible to shorten the overall length of the master optical system.

In the image pickup optical system of type 2, it is preferable that the following conditional expression (17b) be satisfied:

$$2.5 \leq (fT/FnoT)/LTC \leq 6.0 \tag{17b}$$

where, fT denotes the focal length of the image pickup optical system in the first state, FnoT denotes the F-number of the master optical system at the time of infinite object point focusing, and LTC denotes the distance from a lens surface positioned nearest to the object of the converter lens up to a lens surface positioned nearest to the image of the converter lens, and here the focal length and the F-number are a focal length and an F-number in a state in which the focal length of the master optical system becomes the maximum.

A technical significance of conditional expression (17b) is same as the technical significance of conditional expression (17).

In the image pickup optical system of type 2, it is preferable that the rear-side lens unit include a motion blur correction lens unit, and the image side of the motion blur correction lens unit include a sub unit having a positive refractive power and a fourth sub unit, and the predetermined space be positioned between the sub unit having a positive refractive power and the fourth sub unit.

For small-sizing the converter lens, it is preferable that the object side of the converter lens have a portion having a positive refractive power effect. Moreover, it is preferable that the image side of the motion blur correction lens unit have a portion having a positive refractive power effect.

By making the refractive power of the motion blur correction lens unit a negative refractive power by such arrangement, it becomes easy to secure the high sensitivity of image blur correction, and to correct the tilting of image plane when the motion blur correction lens unit moves.

The sensitivity of image blur correction is the amount of shift in the image forming position with respect to the amount of shift of the motion blur correction lens unit. By securing the high sensitivity of image blur correction, it is possible to make the amount of shift of the motion blur correction lens unit small. As a result, it is possible to correct the image blur at high speed.

The rear-side lens unit being positioned nearest to the image, a diameter of an axial light beam has become small at a position of the rear-side lens unit. Therefore, even when a lens is moved at a position of the rear-side lens unit, an effect for the spherical aberration is comparatively smaller as compared to a case in which the lens is moved in other lens unit. By disposing the motion blur correction lens unit in the rear-side lens unit, it is possible to suppress degradation of the spherical aberration at the time of moving even when the motion blur correction lens unit is moved.

It is preferable that the image pickup optical system of type 2 include a sub unit having a positive refractive power, on the object side of the motion blur correction lens unit.

By making such arrangement, a light beam which is incident on the motion blur correction lens unit becomes a convergent light beam. Since a height of a light ray incident on the motion blur correction lens unit becomes low, it is possible to small-size the motion blur correction lens unit.

When the refractive power of the motion blur correction lens unit is let to be a negative refractive power, a sub unit having a positive refractive power is disposed on both sides of the motion blur correction lens unit. Consequently, it is possible to realize a motion blur correction lens unit which has the high sensitivity of image blur correction. As a result, it is possible to correct the image blur at a high speed.

In the image pickup optical system of type 2, it is preferable that the rear-side lens unit include a plurality of lens components, and in the lens component, only a side of incidence and a side of emergence are air-contact surfaces, and both the third sub unit and the fourth sub unit include a lens component.

By making such arrangement, it is possible to simplify retention of the third sub unit and retention of the fourth sub unit. In this case, since it is possible to use the predetermined space more effectively, it is possible to make the predetermined space small. As a result, it is possible to make the optical system further small-sized.

By the third sub unit including one lens component such as one single lens, it is possible to make the optical system further small-sized.

In the image pickup optical system of type 2, it is preferable that the master optical system include a front-side lens unit which is disposed nearest to the object, an intermediate lens unit, and a rear-side lens unit which is disposed nearest to the image, wherein the front-side lens unit include in order from an object side, a first front unit having a positive refractive power and a second front unit having a negative refractive power, and each of the first front unit and the second front unit include a positive lens and a negative lens, and a distance between the first front unit and the second front unit be wider at a telephoto end than at a wide angle end, and the intermediate lens unit include in order from the object side, a first intermediate unit having a positive refractive power and a second intermediate unit having a negative refractive power, and the first intermediate unit include a positive lens and a negative lens, and a distance between the first intermediate unit and the second front unit be narrower at the telephoto end than at the wide angle end, and a distance between the second intermediate unit and a lens unit adjacent to the second intermediate unit on an image side vary either at the time of zooming or at the time of focusing, and the second intermediate unit move toward the image side at the time of focusing from a far point to a near point, and the rear unit include a positive lens and a negative lens.

A zoom optical system having a half angle of view not more than 5 degrees or not more than 4 degrees is called as a telephoto zoom or a super-telephoto zoom. For securing a superior mobility in such zoom optical system, it is significant to shorten the overall length of an optical system and to make the optical system light-weight. Moreover, it is also significant to further increase a focusing speed for securing the superior mobility.

Moreover, in a zoom optical system, it is significant to have a favorable imaging performance in both of an entire zoom range and an entire focusing range. For securing a favorable imaging performance, correction of a spherical aberration and correction of a chromatic aberration become extremely significant.

The master optical system of the image pickup optical system of the present embodiment (hereinafter, referred to as the 'first master optical system') is a zoom optical system. In the first master optical system, the front-side lens unit includes in order from an object side, a first front unit having a positive refractive power and a second front unit having a negative refractive power, and each of the first front unit and the second front unit includes a positive lens and a negative lens. By making such arrangement, it is possible to reduce the occurrence of the chromatic aberration in each lens unit. As a result, it is possible to suppress the occurrence of the longitudinal chromatic aberration and the occurrence of the off-axis chromatic aberration at the time of zooming.

The distance between the first front unit and the second front unit is wider at the telephoto end than at the wide angle end. By making such arrangement, it is possible to improve mainly a zooming effect as well as to enhance a telephoto effect near the telephoto end. Such arrangement contributes to securing a high zoom ratio and shortening the overall length of the optical system.

The intermediate lens unit includes in order from the object side, the first intermediate unit having a positive refractive power and the second intermediate unit having a negative refractive power, and the first intermediate unit includes the positive lens and the negative lens. The distance between the first intermediate unit and the second front unit is narrower at the telephoto end than at the wide angle end, and the distance between the second intermediate unit and the lens unit adjacent to the second intermediate unit on the image side varies either at the time of zooming or at the time of focusing. The second intermediate unit moves toward the image side at the time of focusing from a far point to a near point.

The first intermediate unit contributes substantially to shorten the overall length of the optical system and to an occurrence of the spherical aberration in the entire zoom range. By making the refractive power of the first intermediate unit large, it is possible to shorten the overall length of the optical system. However, when the refractive power of the first intermediate unit is made large, the occurrence of the spherical aberration becomes large.

The first intermediate unit includes the positive lens and the negative lens. Accordingly, even in a case of shortening the overall length of the optical system by making the refractive power of the first intermediate unit large, it is possible to suppress the occurrence of the spherical aberration and the occurrence of the longitudinal chromatic aberration.

Moreover, by the second intermediate unit having a negative refractive power, it is possible to achieve the correction effect of spherical aberration. Moreover, by making the negative refractive power large, it is possible to improve further the correction effect of the spherical aberration. Accordingly, even when the refractive power of the first intermediate unit is made further larger and the overall length of the optical system is shortened, it is possible to correct the spherical aberration that has occurred in the first intermediate unit.

Moreover, in a case in which an image-plane position fluctuates at the time of focusing, by varying the distance between the second intermediate unit and the lens unit adjacent to the second intermediate unit on the image side, it is possible to make a diameter of the second intermediate unit small, and to improve a correction effect of the image-plane position. The image-plane position may fluctuate even at the time of zooming. The variation in the distance between the two lens units may be used for making the diameter of the second intermediate unit small and improving the correction effect of the image-plane position at the time of zooming.

Moreover, when the negative refractive power of the second intermediate unit is made large, as mentioned above, not only that the correction effect of the spherical aberration is improved, but also the correction effect of the image-plane position of the second intermediate unit is also improved. The improvement in the correction effect of image-plane position leads to an improvement in sensitivity of correction of the image-plane position, or in other words, to a reduction in an amount of movement of the second intermediate unit in the correction of image-plane position.

In an optical system having the overall length thereof shortened, an amount of movement of lens units is restricted. By reducing the amount of movement of the second intermediate unit, it is possible to reduce a fluctuation in the overall length of the optical system at the time of zooming. Accordingly, it is possible to reduce a fluctuation in a position of the center of gravity. As a result, it is possible to carry out a stable photography.

The second intermediate unit moves toward the image side at the time of focusing from the far point to the near point. Thus, the second intermediate unit functions as a focusing unit. As mentioned above, it is possible to make the diameter of the second intermediate unit small. Therefore, it is possible to make the focusing unit light-weight and to reduce the amount of movement of the focusing unit.

The first front unit has a positive refractive power, the second front unit has a negative refractive power, and the first intermediate unit has a positive refractive power. Therefore, the master zoom optical system has a portion in which an arrangement of refractive power is a positive refractive power, a negative refractive power, and a positive refractive power. In such arrangement of refractive power, the distance between the first front unit and the second front unit is wider at the telephoto end than at the wide angle end, and the distance between the intermediate unit and the second front unit is narrower at the telephoto end than at the wide angle end.

By making such arrangement, it becomes easy to let a light ray in the first intermediate unit to be in a state close to afocal, over the entire zoom range. Accordingly, in a space from the first intermediate unit up to the image plane, it is possible to reduce a fluctuation in an angle of a light ray and a fluctuation in a height of a light ray at the time of zooming.

In this case, it is possible to reduce the fluctuation in the spherical aberration and the fluctuation in a curvature of field over the entire zoom range. Consequently, it becomes easy to reduce the number of lenses in the second intermediate unit. Moreover, since it is possible to reduce the aberration fluctuation caused due to a movement of the second intermediate unit at the time of focusing and at the time of zooming, it becomes easier to reduce the number of lenses in the second intermediate unit.

As mentioned above, the second intermediate unit functions as the focusing unit. Since it becomes easier to make the focusing unit light-weight by reducing the number of lenses in the second intermediate unit, it becomes easy to further increase the focusing speed. As a result, speedy focusing becomes possible.

The rear-side lens unit includes the positive lens and the negative lens. By making such arrangement, it is possible to achieve the following predetermined effect.

When the overall length of the optical system is shortened, mainly the positive distortion occurs in the first front unit. It is possible to correct the positive distortion favorably by the positive lens in the rear-side lens unit. Moreover, it is possible to improve the correction effect of a chromatic aberration of magnification. The chromatic aberration of magnification remains in the front-side lens unit. Therefore, it is possible to correct the chromatic aberration of magnification favorably by the negative lens in the rear-side lens unit.

The front-side lens unit, particularly the first front unit bears the shortening of the overall length of the optical system and the correction of the chromatic aberration. By the rear-side lens unit including the positive lens and the negative lens, it is possible distribute a load on the first front unit to the rear-side lens unit. As a result, it is possible to achieve small-sizing of the optical system and securing a high imaging performance.

Moreover, a diameter of lenses being large in the first front unit, the first front unit has become a heavy lens unit. By distributing the load on the first front unit, it is possible to reduce the number of lenses in the first front unit. Moreover, since types of glasses that can be selected increases, it is possible to use a glass of a lower specific gravity in the first front unit. As a result, it becomes easy to make the first front unit light-weight.

In the image pickup optical system of type 2, it is preferable that the master optical system include a front-side lens unit which is disposed nearest to the object, an intermediate lens unit, and a rear-side lens unit, and the front-side lens unit include in order from an object side, a first front unit having a positive refractive power and a second front unit having a negative refractive power, and each of the first front unit and the second front unit include a positive lens and a negative lens, and a distance between the first front unit and the second front unit be wider at the telephoto end than at the wide angle end, and the intermediate lens unit include in order from the object side, a first intermediate unit, and a second intermediate unit having a negative refractive power, and the first intermediate unit include in order from the object side, a first sub unit having a positive refractive power and a second sub unit having a positive refractive power, and the first intermediate unit as a whole, include a positive lens and a negative lens, and a distance between the first sub unit and the second front unit be narrower at the telephoto end than at the wide angle end, and a distance between the second intermediate unit and a lens unit adjacent to the second intermediate unit on an image side vary at the time of zooming or at the time of focusing, and the second intermediate unit move toward the image side at the time of focusing from a far point to a near point, and the rear-side lens unit include a positive lens, and a motion blur correction lens unit having a negative refractive power is included between the first sub unit and an image plane, and an image blur is corrected by the motion blur correction lens unit being moved in a direction perpendicular to an optical axis.

A master optical system of the image pickup optical system of the present embodiment (hereinafter, referred to as the 'second master optical system') is a zoom optical system. Description of arrangement which is same as in the first master optical system will be omitted.

The intermediate lens unit includes in order from the object side, the first intermediate unit, and the second intermediate unit having a negative refractive power. The first intermediate unit includes in order from the object side, the first sub unit having a positive refractive power and the second sub unit having a positive refractive power, and the first intermediate unit as a whole, includes the positive lens and the negative lens. The distance between the first subunit and the second sub unit is narrower at the telephoto end than at the wide angle end, and the distance between the second intermediate unit and the lens unit adjacent to the second intermediate unit on the image side varies either at the time of zooming or at the time of focusing. The second intermediate unit moves toward the image side at the time of focusing from a far point to a near point.

The first intermediate unit contributes substantially to shorten the overall length of the optical system and to an occurrence of the spherical aberration in the entire zoom range. By making the refractive power of the first intermediate unit large, it is possible to shorten the overall length of the optical system. However, when the refractive power of the first intermediate unit is made large, the occurrence of the spherical aberration becomes large.

The first intermediate unit includes in order from the object side, the first sub unit having a positive refractive power and the second sub unit having a positive refractive power, and the first intermediate unit as a whole includes at least the positive lens and the negative lens. Accordingly, even in a case of shortening the overall length of the optical system by making the refractive power of the first intermediate unit large, it is possible to suppress the occurrence of the spherical aberration and the occurrence of the longitudinal chromatic aberration.

It is possible to vary the distance between the first sub unit and the second sub unit at the time of zooming. By making such arrangement, it is possible suppress the occurrence of the spherical aberration in the entire zoom range.

The first front unit has a positive refractive power and the second front unit has a negative refractive power, and the first intermediate unit includes the first sub unit having a positive refractive power and the second sub unit having a positive refractive power. Therefore, the master optical system has a portion in which an arrangement of refractive power is a positive refractive power, a negative refractive power, a positive refractive power, and a positive refractive power. In such arrangement of refractive power, the distance between the first front unit and the second front unit is wider at the telephoto end than at the wide angle end, and the distance between the first subunit and the second front unit is narrower at the telephoto end than at the wide angle end.

By making such arrangement, it becomes easy to let a light ray in the first intermediate unit, or in other words, a light ray in the first sub unit and the second sub unit, to be in a state close to afocal, over the entire zoom range. Accordingly, in a space from the first sub unit up to the image plane, it is possible to reduce a fluctuation in an angle of a light ray and a fluctuation in a height of a light ray at the time of zooming.

In this case, it is possible to reduce the fluctuation in the spherical aberration and the fluctuation in a curvature of field over the entire zoom range. Consequently, it becomes easy to reduce the number of lenses in the second intermediate unit. Moreover, since it is possible to reduce the aberration fluctuation caused due to a movement of the second intermediate unit at the time of focusing and at the time of zooming, it becomes easier to reduce the number of lenses in the second intermediate unit.

As mentioned above, the second intermediate unit functions as the focusing unit. Since it becomes easier to make the focusing unit light-weight by reducing the number of lenses in the second intermediate unit, it becomes easy to further increase the focusing speed. As a result, speedy focusing becomes possible.

In the second basic arrangement, the rear-side lens unit includes the positive lens. By making such arrangement, similarly as the abovementioned predetermined effect, it is possible to achieve the following effect.

When the overall length of the optical system is shortened, mainly the positive distortion occurs in the first front unit. It is possible to correct the positive distortion favorably by the positive lens in the rear-side lens unit.

It is possible to dispose a negative lens in the rear-side lens unit. By making such arrangement, it is possible improve the correction effect of the chromatic aberration of magnification by the negative lens in the rear-side lens unit. The chromatic aberration of magnification remains in the front-side lens unit. Therefore, it is possible to correct the chromatic aberration of magnification favorably by the negative lens in the rear-side lens unit.

The front-side lens unit, particularly the first front unit bears the shortening of the overall length of the optical system and the correction of the chromatic aberration. By the rear-side lens unit including the positive lens and the negative lens, it is possible distribute a load on the first front unit to the rear-side lens unit. As a result, it is possible to achieve small-sizing of the optical system and securing a high imaging performance.

In the image pickup optical system of type 2, it is preferable that the following conditional expression (31) be satisfied:

$$LTLL/LTLS \leq 1.25 \quad (31)$$

where,

LTLL denotes the minimum overall length out of the overall length of the image pickup optical system between the wide angle end and the telephoto end, and LTLS denotes the maximum overall length out of the overall length of the image pickup optical system between the wide angle end and the telephoto end, and here the overall length is a distance from a lens surface positioned nearest to the object up to the image plane.

In a telephoto zoom or a super-telephoto zoom, a diameter of a lens unit nearest to the object becomes large. Consequently, a weight of the lens unit nearest to the object becomes extremely heavy as compared to other lens units. When a heavy lens unit moves substantially at the time of zooming, a fluctuation in the position of the center of gravity before the movement of the lens unit and after the movement of the lens unit becomes large. A large fluctuation in the position of the center of gravity causes an image shift at the time of photography. Thus, the movement of the lens unit nearest to the object hinders a stable photography.

Moreover, in a moving a lens unit, a lens barrel which holds the lens unit is moved with respect to a circular cylindrical member. The circular cylindrical member is disposed at an outer side of the lens barrel. The lens barrel moves along an inner peripheral surface of the circular cylindrical member. Consequently, there is more than a little mechanical resistance at the time of movement of a lens unit. When a heavy lens unit moves, the mechanical resistance becomes high. As the mechanical resistance becomes high, an operability of an image pickup apparatus is degraded. Consequently, the movement of the lens unit nearest to the object hinders realization of a favorable operability.

In the first master optical system and the second master optical system, the first front unit is disposed nearest to the object. Therefore, in the first master optical system and the second master optical system, for reducing the abovementioned effect or for eliminating the abovementioned effect, an amount of movement of the first front unit at the time of zooming has been regulated.

In a case of exceeding an upper limit value of conditional expression (31), the fluctuation in the position of the center of gravity and a drive resistance at the time of zooming becomes large. Consequently, it becomes difficult to carry out a stable photography or to realize a favorable operability. When a value of conditional expression (31) is 1, the overall length of the image pickup optical system does not vary at the time of zooming. In other words, in the image pickup optical system, the overall length of the optical system is fixed.

Moreover, an arrangement may be made such that of the overall length of the image pickup optical system from the wide angle end up to the telephoto end, the maximum overall length becomes the overall length of the image pickup optical system in a state in which the focal length of the master optical system becomes the maximum. When such arrangement is made, in a case of moving the first front unit and the second front unit at the time of zooming, it is possible to let the movement of the second front unit to be shared by the first front unit. As a result, since it is possible to reduce an amount of movement of the second front unit, it is possible to secure a large telephoto ratio while preventing deterioration of various aberrations.

In the first master optical system and the second master optical system, at the time of zooming, it is possible to move one of the first intermediate unit and the second intermediate unit.

It is possible to reduce easily the drive resistance and the fluctuation in the position of the center of gravity by improving an effect achieved by the intermediate lens unit. By moving one of the first intermediate unit and the second intermediate unit, it is possible to improve the effect achieved by the intermediate lens unit. In other words, it is possible to correct favorably the fluctuation in the image-plane position at the time of zooming. Moreover, it becomes easy to reduce the fluctuation in the overall length of the optical system or to fix the overall length of the optical system.

In the image pickup optical system of type 2, it is preferable that the following conditional expression (2b) be satisfied:

$$2.5 \leq KMBT \leq 15.0 \quad (2b)$$

where, $KMBT = |MGMBTback^2 \times (MGMBT^2 - 1)|$, where

MGMBTback denotes the lateral magnification of a first predetermined optical system at the telephoto end, MGMBT denotes the lateral magnification of the second intermediate unit at the telephoto end, and here the first predetermined optical system is an optical system which includes all lenses positioned on the image side of the second intermediate unit, and the lateral magnification is a lateral magnification at the time of infinite object point focusing.

A technical significance of conditional expression (2b) is same as the technical significance of conditional expression (2).

In the image pickup optical system of type 2, it is preferable that the second front unit include a fifth sub unit having a negative refractive power and a sixth sub unit having a negative refractive power, and a distance between the fifth sub unit and the sixth sub unit vary at the time of zooming.

By making such arrangement, it is possible to make the negative refractive power of the overall second front unit large. Consequently, it is possible to shorten the overall length of the second front unit easily. Moreover, it becomes easy to correct a variation in the spherical aberration and a variation in the astigmatism at the time of zooming. It is possible to reduce the fluctuation in the overall length of the optical system at the time of zooming.

In the image pickup optical system of type 2, it is preferable that the second front unit include a fifth sub unit having a negative refractive power and a sixth sub unit having a negative refractive power, and a distance between the fifth sub unit and the sixth sub unit vary at the time of zooming, and the rear-side lens unit include a positive lens and a negative lens.

The first front unit has a positive refractive power, the second front unit has a negative refractive power, and the first intermediate unit has a positive refractive power. Therefore, the master zoom optical system has a portion in which an arrangement of refractive power is a positive refractive power, a negative refractive power, and a positive refractive power. In such arrangement of refractive power, the distance between the first front unit and the second front unit is wider at the telephoto end than at the wide angle end, and the distance between the intermediate unit and the second front unit is narrower at the telephoto end than at the wide angle end.

By making such arrangement, it becomes easy to make an arrangement close to afocal optical system, over the entire zoom range. Accordingly, in a space from the first intermediate unit up to the image plane, it is possible to reduce a fluctuation in an angle of a light ray and a fluctuation in a height of a light ray at the time of zooming. As a result, it is possible to make the converter lens further small-sized In the insertion type, it is necessary to provide a space for disposing a converter lens in a lens barrel which holds the image pickup optical system. When it is possible to carry out small-sizing of the converter lens, it becomes easy to secure the space for disposing the converter lens.

The rear-side lens unit includes the positive lens and the negative lens. By making such arrangement, it is possible to achieve the abovementioned predetermined effect.

In the image pickup optical system of type 2, it is preferable that the focusing unit be disposed between the first intermediate unit and a lens surface nearest to the object of the rear-side lens unit.

By making such arrangement, since it is possible to carry out small-sizing of the focusing lens unit easily, it becomes easy to make the focusing lens unit light-weight. As a result, even when the size of the object or the distance up to the object varies, it is possible to deal quickly with the variation.

In the image pickup optical system of type 2, it is preferable that the motion blur correction lens unit be disposed between the first intermediate unit and the image plane.

By making such arrangement, it is possible to achieve the action and effect described in the zoom optical system of the second embodiment.

An image pickup apparatus of the present embodiment includes an optical system, and an image pickup element having an image pickup surface, which converts an image formed on the image pickup surface by the optical system to an electric signal, and the optical system is any one of the abovementioned zoom optical systems or the abovementioned image pickup optical systems.

The image pickup apparatus of the present embodiment includes an optical system, and an image pickup element having an image pickup surface, which converts an image formed on the image pickup surface by the optical system to an electric signal, and the optical system is any one of the abovementioned image pickup optical systems.

It is possible to provide an image pickup apparatus which has a superior mobility and which enables to achieve an image of a high quality.

It is preferable to satisfy mutually the plurality of abovementioned arrangement simultaneously. Moreover, an arrangement may be made such that some of the arrangements are satisfied simultaneously. For instance, an arrangement may be made such that in any of the abovementioned zoom optical systems, image pickup optical systems, and image pickup apparatuses, any of the abovementioned another zoom optical system and another image pickup optical system may be used.

Regarding conditional expressions, an arrangement may be made such that each conditional expression is satisfied separately. When such arrangement is made, it becomes easy to achieve the respective effect, and therefore it is preferable.

Regarding conditional expressions, the lower limit values and the upper limit values may be changed as below. By doing so, it is possible to have further assured effect of each conditional expression, and therefore it is preferable.

For conditional expression (1), it is preferable to let the lower limit value to be any one of 0.93, 0.95, and 1, and it is preferable to let the upper limit value to be any one of 1.13, 1.1, and 1.

For conditional expression (2), it is preferable to let the lower limit value to be any one of 4.5, 5.0, and 5.5, and it is preferable to let the upper limit value to be any one of 18.0, 15.0, and 12.0.

For conditional expression (2') it is preferable to let the lower limit value to be any one of 3.0, 3.5, 4, 5.0, and 5.5, and it is preferable to let the upper limit value to be any one of 18.0, 17.0, 15.0, and 12.0.

For conditional expression (2a), it is preferable to let the lower limit value to be any one of 4.6, 5.0, and 5.3, and it is preferable to let the upper limit value to be any one of 18.0, 15.0, and 12.0.

For conditional expression (2a'), it is preferable to let the lower limit value to be any one of 4.9, 5.3, and 5.5, and it is preferable to let the upper limit value to be 18.0, 15.0, and 12.0.

For conditional expression (2b), it is preferable to let the lower limit value to be any one of 3.0, 3.5, 4, and 5.5, and it is preferable to let the upper limit value to be any one of 12.0, 10.0, and 8.0.

For conditional expression (3), it is preferable to let the lower limit value to be any one of 0.47, 0.5, 0.57, 0.6, 0.68, and 0.7, and it is preferable to let the upper limit value to be any one of 2.7, 2.5, and 2.3.

For conditional expression (4), it is preferable to let the lower limit value to be any one of 0.8, 1.0, and 1.2, and it is preferable to let the upper limit value to be any one of 2.5, 2.0, and 1.8.

For conditional expression (5), it is preferable to let the lower limit value to be any one of 0.8, 1.0, and 1.2, and it is preferable to let the upper limit value to be any one of 3.0, 2.5, and 2.3.

For conditional expression (6), it is preferable to let the lower limit value to be any one of 0.08, 0.10, and 0.13, and it is preferable to let the upper limit value to be any one of 0.4, 0.35, and 0.32.

For conditional expression (6a), it is preferable to let the lower limit value to be any one of 0.05, 0.06, and 0.07, and it is preferable to let the upper limit value to be any one of 0.4, 0.35, and 0.32.

For conditional expression (7), it is preferable to let the lower limit value to be any one of 1.8, 1.9, and 2.0, and it is preferable to let the upper limit value to be any one of 4.5, 4.3, and 4.0.

For conditional expression (8), it is preferable to let the lower limit value to be any one of 0.5, 0.55, and 0.6, and it is preferable to let the upper limit value to be any one of 3.0, 2.5, and 2.0.

For conditional expression (9), it is preferable to let the lower limit value to be one of 85 and 93.

For conditional expression (10), it is preferable to let the lower limit value to be one of 0.35 and 0.4, and it is preferable to let the upper limit value to be one of 3.0 and 2.7.

For conditional expression (11), it is preferable to let the lower limit value to be any one of 0.25, 0.27, and 0.3, and it is preferable to let the upper limit value to be any one of 4.5, 4.3, and 4.0.

For conditional expression (12), it is preferable to let the lower limit value to be one of 13 and 15, and it is preferable to let the upper limit value to be one of 45 and 40.

For conditional expression (13), it is preferable to let the lower limit value to be one of 17 and 17.5, and it is preferable to let the upper limit value to be one of 25 and 24.

For conditional expression (13a), it is preferable to let the lower limit value to be one of 17 and 17.5, and it is preferable to let the upper limit value to be any one of 30, 26, and 23.

For conditional expression (14), it is preferable to let the lower limit value to be one of 17 and 17.5, and it is preferable to let the upper limit value to be any one of 25.5, 24, and 23.

For conditional expression (14a), it is preferable to let the lower limit value to be one of 17 and 17.5, and it is preferable to let the upper limit value to be any one of 30, 26, and 23.

For conditional expression (15), it is preferable to let the upper limit value to be any one of 0.03, 0.015, and 0.

For conditional expressions (16) and (16b), it is preferable to let the lower limit value to be any one of 0.72, 0.75, 0.85, and 1.0, and it is preferable to let the upper limit value to be any one of 3, 2.5, and 2.

For conditional expression (17), it is preferable to let the lower limit value to be any one of 2.2, 2.5, and 3.0, and it is preferable to let the upper limit value to be any one of 5.5, 5.0, and 4.5.

For conditional expression (17b), it is preferable to let the lower limit value to be any one of 2.8, 3.0, and 3.5, and it is preferable to let the upper limit value to be any one of 5.5, 5.0, and 4.5.

For conditional expression (18), it is preferable to let the lower limit value to be one of 0.06 and 0.08, and it is preferable to let the upper limit value to be any one of 0.22, 0.2, 0.17, 0.15, and 0.14.

For conditional expression (19), it is preferable to let the lower limit value to be 0.65, and it is preferable to let the upper limit value to be 0.8.

For conditional expression (20), it is preferable to let the lower limit value to be one of 1.2 and 1.23, and it is preferable to let the upper limit value to be one of 1.7 and 1.5.

For conditional expression (21), it is preferable to let the lower limit value to be one of 0.13, 0.15, and 0.17, and it is preferable to let the upper limit value to be any one of 0.35, 0.3, and 0.27.

For conditional expression (21b), it is preferable to let the lower limit value to be any one of 0.13, 0.15, and 0.17, and it is preferable to let the upper limit value to be one of 0.28 and 0.27.

For conditional expression (21b'), it is preferable to let the lower limit value to be any one of 0.13, 0.15, and 0.17, and it is preferable to let the upper limit value to be any one of 0.4, 0.35, and 0.3.

For conditional expression (22), it is preferable to let the lower limit value to be any one of 1.5, 1.7, and 1.9, and it is preferable to let the upper limit value to be any one of 3.7, 3.5, 3.3, 3.0, and 2.9.

For conditional expression (22b), it is preferable to let the lower limit value to be one of 1.7 and 1.9, and it is preferable to let the upper limit value to be any one of 3.3, 3.2, and 2.8.

For conditional expression (23), it is preferable to let the lower limit value to be any one of −3.5, −2.5, and −2, and it is preferable to let the upper limit value to be any one of 2, 1.5, 0.2, and −0.2.

For conditional expression (23b), it is preferable to let the lower limit value to be any one of −3.5, −2.5, and −2, and it is preferable to let the upper limit value to be any one of 0.35, 0.25, 0.0, and −0.1.

For conditional expression (23b'), it is preferable to let the lower limit value to be any one of −3.5, −2.5, and −2, and it is preferable to let the upper limit value to be any one of 0.8, 0.5, 0.3, and −0.1.

For conditional expression (24), it is preferable to let the lower limit value to be any one of 0.5, 0.7, and 0.9, and it is preferable to let the upper limit value to be any one of 3.5, 3, and 2.5.

For conditional expression (24b), it is preferable to let the lower limit value to be any one of 0.5, 0.7, and 0.9, and it is preferable to let the upper limit value to be any one of 2.3, 2.2, and 2.0.

For conditional expression (24b'), it is preferable to let the lower limit value to be any one of 0.5, 0.7, and 0.9, and it is preferable to let the upper limit value to be any one 2.5, 2.3, and 2.0.

For conditional expression (25), it is preferable to let the lower limit value to be any one of 58, 63, and 68.

For conditional expression (26), it is preferable to let the lower limit value to be any one of 0.7, 1.0, 1.4, 1.5, and 1.6, and it is preferable to let the upper limit value to be any one of 3.8, 3.5, 3.2, and 2.8.

For conditional expression (26b), it is preferable to let the lower limit value to be any one of 1.4, 1.5, and 1.6, and it is preferable to let the upper limit value to be any one of 3.8, 3.5, 3.2, and 2.8.

For conditional expression (29), it is preferable to let the lower limit value to be any one of 0.6, 0.7, and 0.8, and it is preferable to let the upper limit value to be any one of 3.2, 2.6, and 2.3.

For conditional expression (30), it is preferable to let the lower limit value to be one of 47 and 50.

For conditional expression (31), it is preferable to let the upper limit value to be any one of 1.2, 1.15, and 1.

Examples of the zoom optical system, examples of the master optical system, and examples of the image pickup optical system will be described below by referring to the accompanying diagrams. However, the present invention is not restricted to the examples described below.

Lens cross-sectional views of each example will be described below.

FIG. 1A, FIG. 2A, FIG. 3A, FIG. 4A, FIG. 5A, FIG. 6A, FIG. 7A, FIG. 8A, FIG. 9A, FIG. 10A, FIG. 11A, FIG. 12A, FIG. 13A, FIG. 14A, FIG. 15A, FIG. 16A, FIG. 17A, FIG. 18A, FIG. 19A, FIG. 20A, FIG. 21A, FIG. 22A, FIG. 23A, FIG. 24A, FIG. 25A, FIG. 26A, FIG. 27A, FIG. 28A, FIG. 29A, FIG. 30A, FIG. 31A, FIG. 32A, FIG. 33A, FIG. 34A, FIG. 35A, FIG. 36A, FIG. 37A, FIG. 38A, FIG. 39A, FIG. 40A, FIG. 41A, FIG. 42A, FIG. 43A, FIG. 44A, FIG. 45A, FIG. 46A, FIG. 47A, FIG. 48A, FIG. 49A, FIG. 50A, FIG. 51A, FIG. 52A, FIG. 53A, FIG. 54A, FIG. 55A, FIG. 56A, FIG. 57A, and FIG. 58A are lens cross-sectional views at a wide angle end.

FIG. 1B, FIG. 2B, FIG. 3B, FIG. 4B, FIG. 5B, FIG. 6B, FIG. 7B, FIG. 8B, FIG. 9B, FIG. 10B, FIG. 11B, FIG. 12B, FIG. 13B, FIG. 14B, FIG. 15B, FIG. 16B, FIG. 17B, FIG. 18B, FIG. 19B, FIG. 20B, FIG. 21B, FIG. 22B, FIG. 23B, FIG. 24B, FIG. 25B, FIG. 26B, FIG. 27B, FIG. 28B, FIG. 29B, FIG. 30B, FIG. 31B, FIG. 32B, FIG. 33B, FIG. 34B, FIG. 35B, FIG. 36B, FIG. 37B, FIG. 38B, FIG. 39B, FIG. 40B, FIG. 41B, FIG. 42B, FIG. 43B, FIG. 44B, FIG. 45B, FIG. 46B, FIG. 47B, FIG. 48B, FIG. 49B, FIG. 50B, FIG. 51B, FIG. 52B, FIG. 53B, FIG. 54B, FIG. 55B, FIG. 56B, FIG. 57B, and FIG. 58B are lens-cross-sectional views in an intermediate focal length state.

FIG. 1C, FIG. 2C, FIG. 3C, FIG. 4C, FIG. 5C, FIG. 6C, FIG. 7C, FIG. 8C, FIG. 9C, FIG. 10C, FIG. 11C, FIG. 12C, FIG. 13C, FIG. 14C, FIG. 15C, FIG. 16C, FIG. 17C, FIG. 18C, FIG. 19C, FIG. 20C, FIG. 21C, FIG. 22C, FIG. 23C, FIG. 24C, FIG. 25C, FIG. 26C, FIG. 27C, FIG. 28C, FIG. 29C, FIG. 30C, FIG. 31C, FIG. 32C, FIG. 33C, FIG. 34C, FIG. 35C, FIG. 36C, FIG. 37C, FIG. 38C, FIG. 39C, FIG. 40C, FIG. 41C, FIG. 42C, FIG. 43C, FIG. 44C, FIG. 45C, FIG. 46C, FIG. 47C, FIG. 48C, FIG. 49C, FIG. 50C, FIG. 51C, FIG. 52C, FIG. 53C, FIG. 54C, FIG. 55C, FIG. 56C, FIG. 57C, and FIG. 58C are lens cross-sectional views at a telephoto end.

Aberration diagrams of each example will be described below.

FIG. 59A, FIG. 60A, FIG. 61A, FIG. 62A, FIG. 63A, FIG. 64A, FIG. 65A, FIG. 66A, FIG. 67A, FIG. 68A, FIG. 69A, FIG. 70A, FIG. 71A, FIG. 72A, FIG. 73A, FIG. 74A, FIG. 75A, FIG. 76A, FIG. 77A, FIG. 78A, FIG. 79A, FIG. 80A, FIG. 81A, FIG. 82A, FIG. 83A, FIG. 84A, FIG. 85A, FIG. 86A, FIG. 87A, FIG. 88A, FIG. 89A, FIG. 90A, FIG. 91A, FIG. 92A, FIG. 93A, FIG. 94A, FIG. 95A, FIG. 96A, FIG. 97A, FIG. 98A, FIG. 99A, FIG. 100A, FIG. 101A, FIG. 102A, FIG. 103A, FIG. 104A, FIG. 105A, FIG. 106A, FIG. 107A, FIG. 108A, FIG. 109A, FIG. 110A, FIG. 111A, FIG. 112A, FIG. 113A, FIG. 114A, FIG. 115A, and FIG. 116A show a spherical aberration (SA) at the wide angle end.

FIG. 59B, FIG. 60B, FIG. 61B, FIG. 62B, FIG. 63B, FIG. 64B, FIG. 65B, FIG. 66B, FIG. 67B, FIG. 68B, FIG. 69B, FIG. 70B, FIG. 71B, FIG. 72B, FIG. 73B, FIG. 74B, FIG. 75B, FIG. 76B, FIG. 77B, FIG. 78B, FIG. 79B, FIG. 80B, FIG. 81B, FIG. 82B, FIG. 83B, FIG. 84B, FIG. 85B, FIG. 86B, FIG. 87B, FIG. 88B, FIG. 89B, FIG. 90B, FIG. 91B, FIG. 92B, FIG. 93B, FIG. 94B, FIG. 95B, FIG. 96B, FIG. 97B, FIG. 98B, FIG. 99B, FIG. 100B, FIG. 101B, FIG. 102B, FIG. 103B, FIG. 104B, FIG. 105B, FIG. 106B, FIG. 107B, FIG. 108B, FIG. 109B, FIG. 110B, FIG. 111B, FIG. 112B, FIG. 113B, FIG. 114B, FIG. 115B, and FIG. 116B show an astigmatism (AS) at the wide angle end.

FIG. 59C, FIG. 60C, FIG. 61C, FIG. 62C, FIG. 63C, FIG. 64C, FIG. 65C, FIG. 66C, FIG. 67C, FIG. 68C, FIG. 69C, FIG. 70C, FIG. 71C, FIG. 72C, FIG. 73C, FIG. 74C, FIG. 75C, FIG. 76C, FIG. 77C, FIG. 78C, FIG. 79C, FIG. 80C, FIG. 81C, FIG. 82C, FIG. 83C, FIG. 84C, FIG. 85C, FIG. 86C, FIG. 87C, FIG. 88C, FIG. 89C, FIG. 90C, FIG. 91C, FIG. 92C, FIG. 93C, FIG. 94C, FIG. 95C, FIG. 96C, FIG. 97C, FIG. 98C, FIG. 99C, FIG. 100C, FIG. 101C, FIG. 102C, FIG. 103C, FIG. 104C, FIG. 105C, FIG. 106C, FIG. 107C, FIG. 108C, FIG. 109C, FIG. 110C, FIG. 111C, FIG. 112C, FIG. 113C, FIG. 114C, FIG. 115C, and FIG. 116C show a distortion (DT) at the wide angle end.

FIG. 59D, FIG. 60D, FIG. 61D, FIG. 62D, FIG. 63D, FIG. 64D, FIG. 65D, FIG. 66D, FIG. 67D, FIG. 68D, FIG. 69D, FIG. 70D, FIG. 71D, FIG. 72D, FIG. 73D, FIG. 74D, FIG. 75D, FIG. 76D, FIG. 77D, FIG. 78D, FIG. 79D, FIG. 80D, FIG. 81D, FIG. 82D, FIG. 83D, FIG. 84D, FIG. 85D, FIG. 86D, FIG. 87D, FIG. 88D, FIG. 89D, FIG. 90D, FIG. 91D, FIG. 92D, FIG. 93D, FIG. 94D, FIG. 95D, FIG. 96D, FIG. 97D, FIG. 98D, FIG. 99D, FIG. 100D, FIG. 101D, FIG. 102D, FIG. 103D, FIG. 104D, FIG. 105D, FIG. 106D, FIG. 107D, FIG. 108D, FIG. 109D, FIG. 110D, FIG. 111D, FIG. 112D, FIG. 113D, FIG. 114D, FIG. 115D, and FIG. 116D show a chromatic aberration of magnification (CC) at the wide angle end.

FIG. 59E, FIG. 60E, FIG. 61E, FIG. 62E, FIG. 63E, FIG. 64E, FIG. 65E, FIG. 66E, FIG. 67E, FIG. 68E, FIG. 69E, FIG. 70E, FIG. 71E, FIG. 72E, FIG. 73E, FIG. 74E, FIG. 75E, FIG. 76E, FIG. 77E, FIG. 78E, FIG. 79E, FIG. 80E, FIG. 81E, FIG. 82E, FIG. 83E, FIG. 84E, FIG. 85E, FIG. 86E, FIG. 87E, FIG. 88E, FIG. 89E, FIG. 90E, FIG. 91E, FIG. 92E, FIG. 93E, FIG. 94E, FIG. 95E, FIG. 96E, FIG. 97E, FIG. 98E, FIG. 99E, FIG. 100E, FIG. 101E, FIG. 102E, FIG. 103E, FIG. 104E, FIG. 105E, FIG. 106E, FIG. 107E, FIG. 108E, FIG. 109E, FIG. 110E, FIG. 111E, FIG. 112E,

FIG. 113E, FIG. 114E, FIG. 115E, and FIG. 116E show a spherical aberration (SA) in the intermediate focal length state.

FIG. 59F, FIG. 60F, FIG. 61F, FIG. 62F, FIG. 63F, FIG. 64F, FIG. 65F, FIG. 66F, FIG. 67F, FIG. 68F, FIG. 69F, FIG. 70F, FIG. 71F, FIG. 72F, FIG. 73F, FIG. 74F, FIG. 75F, FIG. 76F, FIG. 77F, FIG. 78F, FIG. 79F, FIG. 80F, FIG. 81F, FIG. 82F, FIG. 83F, FIG. 84F, FIG. 85F, FIG. 86F, FIG. 87F, FIG. 88F, FIG. 89F, FIG. 90F, FIG. 91F, FIG. 92F, FIG. 93F, FIG. 94F, FIG. 95F, FIG. 96F, FIG. 97F, FIG. 98F, FIG. 99F, FIG. 100F, FIG. 101F, FIG. 102F, FIG. 103F, FIG. 104F, FIG. 105F, FIG. 106F, FIG. 107F, FIG. 108F, FIG. 109F, FIG. 110F, FIG. 111F, FIG. 112F, FIG. 113F, FIG. 114F, FIG. 115F, and FIG. 116F show an astigmatism (AS) in the intermediate focal length state.

FIG. 59G, FIG. 60G, FIG. 61G, FIG. 62G, FIG. 63G, FIG. 64G, FIG. 65G, FIG. 66G, FIG. 67G, FIG. 68G, FIG. 69G, FIG. 70G, FIG. 71G, FIG. 72G, FIG. 73G, FIG. 74G, FIG. 75G, FIG. 76G, FIG. 77G, FIG. 78G, FIG. 79G, FIG. 80G, FIG. 81G, FIG. 82G, FIG. 83G, FIG. 84G, FIG. 85G, FIG. 86G, FIG. 87G, FIG. 88G, FIG. 89G, FIG. 90G, FIG. 91G, FIG. 92G, FIG. 93G, FIG. 94G, FIG. 95G, FIG. 96G, FIG. 97G, FIG. 98G, FIG. 99G, FIG. 100G, FIG. 101G, FIG. 102G, FIG. 103G, FIG. 104G, FIG. 105G, FIG. 106G, FIG. 107G, FIG. 108G, FIG. 109G, FIG. 110G, FIG. 111G, FIG. 112G, FIG. 113G, FIG. 114G, FIG. 115G, and FIG. 116G show a distortion (DT) in the intermediate focal length state.

FIG. 59H, FIG. 60H, FIG. 61H, FIG. 62H, FIG. 63H, FIG. 64H, FIG. 65H, FIG. 66H, FIG. 67H, FIG. 68H, FIG. 69H, FIG. 70H, FIG. 71H, FIG. 72H, FIG. 73H, FIG. 74H, FIG. 75H, FIG. 76H, FIG. 77H, FIG. 78H, FIG. 79H, FIG. 80H, FIG. 81H, FIG. 82H, FIG. 83H, FIG. 84H, FIG. 85H, FIG. 86H, FIG. 87H, FIG. 88H, FIG. 89H, FIG. 90H, FIG. 91H, FIG. 92H, FIG. 93H, FIG. 94H, FIG. 95H, FIG. 96H, FIG. 97H, FIG. 98H, FIG. 99H, FIG. 100H, FIG. 101H, FIG. 102H, FIG. 103H, FIG. 104H, FIG. 105H, FIG. 106H, FIG. 107H, FIG. 108H, FIG. 109H, FIG. 110H, FIG. 111H, FIG. 112H, FIG. 113H, FIG. 114H, FIG. 115H, and FIG. 116H show a chromatic aberration of magnification (CC) in the intermediate focal length state.

FIG. 59I, FIG. 60I, FIG. 61I, FIG. 62I, FIG. 63I, FIG. 64I, FIG. 65I, FIG. 66I, FIG. 67I, FIG. 68I, FIG. 69I, FIG. 70I, FIG. 71I, FIG. 72I, FIG. 73I, FIG. 74I, FIG. 75I, FIG. 76I, FIG. 77I, FIG. 78I, FIG. 79I, FIG. 80I, FIG. 81I, FIG. 82I, FIG. 83I, FIG. 84I, FIG. 85I, FIG. 86I, FIG. 87I, FIG. 88I, FIG. 89I, FIG. 90I, FIG. 91I, FIG. 92I, FIG. 93I, FIG. 94I, FIG. 95I, FIG. 96I, FIG. 97I, FIG. 98I, FIG. 99I, FIG. 100I, FIG. 101I, FIG. 102I, FIG. 103I, FIG. 104I, FIG. 105I, FIG. 106I, FIG. 107I, FIG. 108I, FIG. 109I, FIG. 110I, FIG. 111I, FIG. 112I, FIG. 113I, FIG. 114I, FIG. 115I, and FIG. 116I show a spherical aberration (SA) at the telephoto end.

FIG. 59J, FIG. 60J, FIG. 61J, FIG. 62J, FIG. 63J, FIG. 64J, FIG. 65J, FIG. 66J, FIG. 67J, FIG. 68J, FIG. 69J, FIG. 70J, FIG. 71J, FIG. 72J, FIG. 73J, FIG. 74J, FIG. 75J, FIG. 76J, FIG. 77J, FIG. 78J, FIG. 79J, FIG. 80J, FIG. 81J, FIG. 82J, FIG. 83J, FIG. 84J, FIG. 85J, FIG. 86J, FIG. 87J, FIG. 88J, FIG. 89J, FIG. 90J, FIG. 91J, FIG. 92J, FIG. 93J, FIG. 94J, FIG. 95J, FIG. 96J, FIG. 97J, FIG. 98J, FIG. 99J, FIG. 100J, FIG. 101J, FIG. 102J, FIG. 103J, FIG. 104J, FIG. 105J, FIG. 106J, FIG. 107J, FIG. 108J, FIG. 109J, FIG. 110J, FIG. 111J, FIG. 112J, FIG. 113J, FIG. 114J, FIG. 115J, and FIG. 116J show an astigmatism (AS) at the telephoto end.

FIG. 59K, FIG. 60K, FIG. 61K, FIG. 62K, FIG. 63K, FIG. 64K, FIG. 65K, FIG. 66K, FIG. 67K, FIG. 68K, FIG. 69K, FIG. 70K, FIG. 71K, FIG. 72K, FIG. 73K, FIG. 74K, FIG. 75K, FIG. 76K, FIG. 77K, FIG. 78K, FIG. 79K, FIG. 80K, FIG. 81K, FIG. 82K, FIG. 83K, FIG. 84K, FIG. 85K, FIG. 86K, FIG. 87K, FIG. 88K, FIG. 89K, FIG. 90K, FIG. 91K, FIG. 92K, FIG. 93K, FIG. 94K, FIG. 95K, FIG. 96K, FIG. 97K, FIG. 98K, FIG. 99K, FIG. 100K, FIG. 101K, FIG. 102K, FIG. 103K, FIG. 104K, FIG. 105K, FIG. 106K, FIG. 107K, FIG. 108K, FIG. 109K, FIG. 110K, FIG. 111K, FIG. 112K, FIG. 113K, FIG. 114K, FIG. 115K, and FIG. 116K show a distortion (DT) at the telephoto end.

FIG. 59L, FIG. 60L, FIG. 61L, FIG. 62L, FIG. 63L, FIG. 64L, FIG. 65L, FIG. 66L, FIG. 67L, FIG. 68L, FIG. 69L, FIG. 70L, FIG. 71L, FIG. 72L, FIG. 73L, FIG. 74L, FIG. 75L, FIG. 76L, FIG. 77L, FIG. 78L, FIG. 79L, FIG. 80L, FIG. 81L, FIG. 82L, FIG. 83L, FIG. 84L, FIG. 85L, FIG. 86L, FIG. 87L, FIG. 88L, FIG. 89L, FIG. 90L, FIG. 91L, FIG. 92L, FIG. 93L, FIG. 94L, FIG. 95L, FIG. 96L, FIG. 97L, FIG. 98L, FIG. 99L, FIG. 100L, FIG. 101L, FIG. 102L, FIG. 103L, FIG. 104L, FIG. 105L, FIG. 106L, FIG. 107L, FIG. 108L, FIG. 109L, FIG. 110L, FIG. 111L, FIG. 112L, FIG. 113L, FIG. 114L, FIG. 115L, and FIG. 116L show a chromatic aberration of magnification (CC) at the telephoto end.

The lens cross-sectional views are lens cross-sectional views at the time of infinite object point focusing. The aberration diagrams are aberration diagrams at the time of infinite object point focusing.

A first lens unit is denoted by G1, a second lens unit is denoted by G2, a third lens unit is denoted by G3, a fourth lens unit is denoted by G4, a fifth lens unit is denoted by G5, a sixth lens unit is denoted by G6, a seventh lens unit is denoted by G7, an aperture stop is denotes by S, and an image plane (image pickup surface) is denoted by I.

In the image pickup optical system, the converter lens is inserted into the zoom optical system. A relationship between the zoom optical system and the image pickup optical system in the examples is as given below. In the description of relationship, TC refers to a teleconverter lens and WC refers to a wide converter lens.

For instance, an example 1 is a zoom optical system. In the zoom optical system of the example 1, there is no example of an image pickup optical system in which a converter lens inserted. Moreover, an example 9 is an image pickup optical system. In the image pickup optical system of example 9, a teleconverter lens is inserted into a zoom optical system of an example 8.

| Zoom optical system | Image pickup optical system |
|---|---|
| Example 1 | No example |
| Example 2 | No example |
| Example 3 | No example |
| Example 4 | No example |
| Example 5 | No example |
| Example 6 | No example |
| Example 7 | No example |
| Example 8 | Example 9 (TC inserted) |
| Example 10 | Example 11 (TC inserted) |
| Example 12 | Example 13 (TC inserted) |
| Example 14 | Example 15 (TC inserted) |
| Example 16 | Example 17 (TC inserted), and Example 18 (WC inserted) |
| Example 19 | No example |
| Example 20 | Example 21 (TC inserted) |
| Example 22 | No example |
| Example 23 | No example |
| Example 24 | No example |
| Example 25 | No example |
| Example 26 | No example |
| Example 27 | Example 28 (TC inserted) |

-continued

| Zoom optical system | Image pickup optical system |
|---|---|
| Example 29 | No example |
| Example 30 | No example |
| Example 31 | No example |
| Example 32 | Example 33 (TC inserted) |
| Example 34 | Example 35 (TC inserted) |
| Example 36 | No example |
| Example 37 | No example |
| Example 38 | No example |
| Example 39 | Example 40 (TC inserted) |

For some examples, for simplifying the description and for the ease of comparison, an image pickup optical system is described after describing a zoom optical system. For instance, the image pickup optical system of the example 9 is described after describing the zoom optical system of the example 8.

Moreover, in the image pickup optical system, the converter lens is inserted in to the master optical system. A relationship between the master optical system and the image pickup optical system is as given below.

For instance, an example 42 is an image pickup optical system. In the image pickup optical system of the example 42, a teleconverter lens is inserted into a master optical system of an example 41.

| Master optical system | Image pickup optical system |
|---|---|
| Example 41 | Example 42 (TC inserted) |
| Example 43 | Example 44 (TC inserted) |
| Example 45 | Example 46 (TC inserted) |
| Example 47 | Example 48 (TC inserted) |
| Example 49 | Example 50 (TC inserted) |
| Example 51 | Example 52 (TC inserted) |
| Example 53 | Example 54 (TC inserted) |
| Example 55 | Example 56 (TC inserted) |
| Example 57 | Example 58 (TC inserted) |

With regard to examples, for simplifying the description and for the ease of comparison, an image pickup optical is described after describing a master optical system. For instance, the image pickup optical system of the example 42 is described after describing a master optical system of the example 41.

Regarding the movement of lens units at the time of focusing, in a case in which a direction of movement is same at the wide angle end, in the intermediate focal length state, and at the telephoto end, the description thereof is simplified. For instance, in the example 1, in the description, it is mentioned that 'the fourth lens unit G4 moves toward the image side'. This indicates that 'the fourth lens unit G4 moves toward the image side at the wide angle end, in the intermediate focal length state, as well as at the telephoto end.

An example 1 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed between the second lens unit G2 and the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a negative meniscus lens L1 having a convex surface directed toward the object side, a biconvex positive lens L2, and a biconvex positive lens L3. Here, the negative meniscus lens L1 and the biconvex positive lens L2 are cemented.

The second lens unit G2 includes a positive meniscus lens L4 having a convex surface directed toward an image side, a biconcave negative lens L5, a positive meniscus lens L6 having a convex surface directed toward the object side, and a biconcave negative lens L7. Here, the positive meniscus lens L4, the biconcave negative lens L5, and the positive meniscus lens L6 are cemented.

The third lens unit G3 includes a biconvex positive lens L8, a negative meniscus lens L9 having a convex surface directed toward the object side, a biconvex positive lens L10, and a biconvex positive lens L11. Here, the negative meniscus lens L9 and the biconvex positive lens L10 are cemented.

The fourth lens unit G4 includes a biconvex positive lens L12 and a biconcave negative lens L13. Here, the biconvex positive lens L12 and the biconcave negative lens L13 are cemented.

The fifth lens unit G5 includes a negative meniscus lens L14 having a convex surface directed toward the object side.

The sixth lens unit G6 includes a biconvex positive lens L15, a biconvex positive lens L16, a biconcave negative lens L17, a biconcave negative lens L18, a biconvex positive lens L19, a negative meniscus lens L20 having a convex surface directed toward the image side, a biconvex positive lens L21, and a negative meniscus lens L22 having a convex surface directed toward the image side.

Here, the biconvex positive lens L16 and the biconcave negative lens L17 are cemented. The biconvex positive lens L19 and the negative meniscus lens L20 are cemented. The biconvex positive lens L21 and the negative meniscus lens L22 are cemented.

At a time of zooming from a wide angle end to a telephoto end, the first lens unit G1, the third lens unit G3, and the sixth lens unit G6 are fixed. The second lens unit G2 moves toward the image side. The fourth lens unit G4, after moving toward the image side, moves toward the object side. The fifth lens unit G5, after moving toward the object side, moves toward the image side. The aperture stop S is fixed together with the third lens unit G3.

At a time of focusing from a far point to a near point, both the fourth lens unit G4 and the fifth lens unit G5 move. The fourth lens unit G4 moves toward the image side. The fifth lens unit G5 moves toward the image side at the wide angle end and in the intermediate focal length state, and moves toward the object side at the telephoto end. At a time of correcting image blur, the biconvex positive lens L16, the biconcave negative lens L17, and the biconcave negative lens L18 move in a direction perpendicular to an optical axis.

An aspheric surface is provided to a total of five surfaces which are, both surfaces of the biconcave negative lens L7, both surfaces of the biconvex positive lens L8, and an image-side surface of the biconcave negative lens L13.

An example 2 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed between the second lens unit G2 and the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth unit G4 is a second intermediate unit. The fifth lens unit G5 is a movable lens unit. The sixth lens unit G6 is a rear-side lens unit.

The first lens unit G1 includes a positive meniscus lens L1 having a convex surface directed toward the object side, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a positive meniscus lens L4 having a convex surface directed toward an image side, a biconcave negative lens L5, a positive meniscus lens L6 having a convex surface directed toward the object side, and a biconcave negative lens L7. Here, the positive meniscus lens L4, the biconcave negative lens L5, and the positive meniscus lens L6 are cemented.

The third lens unit G3 includes a biconvex positive lens L8, a negative meniscus lens L9 having a convex surface directed toward the object side, a biconvex positive lens L10, and a biconvex positive lens L11. Here, the negative meniscus lens L9 and the biconvex positive lens L10 are cemented.

The fourth lens unit G4 includes a biconvex positive lens L12 and a biconcave negative lens L13. Here, the biconvex positive lens L12 and the biconcave negative lens L13 are cemented.

The fifth lens unit G5 includes a negative meniscus lens L4 having a convex surface directed toward the object side.

The sixth lens unit G6 includes a biconvex positive lens L15, a biconvex positive lens L16, a biconcave negative lens L17, a negative meniscus lens L18 having a convex surface directed toward the image side, a biconvex positive lens L19, a negative meniscus lens L20 having a convex surface directed toward the image side, a biconvex positive lens L21, and a negative meniscus lens L22 having a convex surface directed toward the image side.

Here, the biconvex positive lens L16 and the biconcave negative lens L17 are cemented. The biconvex positive lens L19 and the negative meniscus lens L20 are cemented. The biconvex positive lens L21 and the negative meniscus lens L22 are cemented.

At a time of zooming from a wide angle end to a telephoto end, the first lens unit G1, the third lens unit G3, and the sixth lens unit G6 are fixed. The second lens unit G2 moves toward the image side. The fourth lens unit G4, after moving toward the image side, moves toward the object side. The fifth lens unit G5, after moving toward the object side, moves toward the image side. The aperture stop S is fixed together with the third lens unit G3.

At a time of focusing from a far point to a near point, both the fourth lens unit G4 and the fifth lens unit G5 move. The fourth lens unit G4 moves toward the image side. The fifth lens unit G5 moves toward the image side at the wide angle end and in the intermediate focal length state, and moves toward the object side at the telephoto end. At a time of correcting image blur, the biconvex positive lens L16, the biconcave negative lens L17, and the negative meniscus lens L18 move in a direction perpendicular to an optical axis.

An aspheric surface is provided to a total of three surfaces which are, both surfaces of the biconvex positive lens L8, and an image-side surface of the biconcave negative lens L13.

An example 3 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a biconcave negative lens L4, a positive meniscus lens L5 having a convex surface directed toward the object side, and a biconcave negative lens L6. Here, the biconcave negative lens L4 and the positive meniscus lens L5 are cemented.

The third lens unit G3 includes a biconvex positive lens L7, a positive meniscus lens L8 having a convex surface directed toward the object side, a biconcave negative lens L9, a biconvex positive lens L10, a positive meniscus lens L11 having a convex surface directed toward an image side, a negative meniscus lens L12 having a convex surface directed toward the image side, a biconcave negative lens L13, and a biconvex positive lens L14.

Here, the biconcave negative lens L9 and the biconvex positive lens L10 are cemented. The positive meniscus lens L11 and the negative meniscus lens L12 are cemented.

The fourth lens unit G4 includes a negative meniscus lens L15 having a convex surface directed toward the object side and a positive meniscus lens L16 having a convex surface directed toward the object side. Here, the negative meniscus lens L15 and the positive meniscus lens L16 are cemented.

The fifth lens unit G5 includes a biconcave negative lens L17.

The sixth lens unit G6 includes a biconvex positive lens L18, a positive meniscus lens L19 having a convex surface directed toward the image side, and a negative meniscus lens L20 having a convex surface directed toward the image side. Here, the positive meniscus lens L19 and the negative meniscus lens L20 are cemented.

At a time of zooming from a wide angle end to a telephoto end, the first lens unit G1, the third lens unit G3, and the third lens unit G6 are fixed. The second lens unit G2 moves toward the image side. The fourth lens unit G4, after moving toward the image side, moves toward the object side. The fifth lens unit G5 moves toward the object side. The aperture stop S is fixed together with the third lens unit G3.

At a time of focusing from a far point to a near point, both the fourth lens unit G4 and the fifth lens unit G5 move toward the image side. At a time of correcting image blur, the positive meniscus lens L11, the negative meniscus lens L12, and the biconcave negative lens L13 move in a direction perpendicular to an optical axis.

An aspheric surface is provided to a total of three surfaces which are, an image-side surface of the biconvex positive lens L10 and both surfaces of the biconvex positive lens L14.

An example 4 is an example of a zoom optical system. The zoom optical system includes in order form an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a negative meniscus lens L1 having a convex surface directed toward the object side, a biconvex positive lens L2, a negative meniscus lens L3 having a convex surface directed toward the object side, and a positive meniscus lens L4 having a convex surface directed toward the object side. Here, the negative meniscus lens L1 and the biconvex positive lens L2 are cemented. The negative meniscus lens L3 and the positive meniscus lens L4 are cemented.

The second lens unit G2 includes a biconcave negative lens L5, a positive meniscus lens L6 having a convex surface directed toward the object side, and a biconcave negative lens L7. Here, the biconcave negative lens L5 and the positive meniscus lens L6 are cemented.

The third lens unit G3 includes a biconvex positive lens L8, a positive meniscus lens L9 having a convex surface directed toward the object side, a biconvex positive lens L10, a biconcave negative lens L11, a positive meniscus lens L12 having a convex surface directed toward the object side, a biconvex positive lens L13, a biconcave negative lens L14, a biconcave negative lens L15, and a biconvex positive lens L16.

Here, the biconvex positive lens L10, the biconcave negative lens L11, and the positive meniscus lens L12 are cemented. The biconvex positive lens L13 and the biconcave negative lens L14 are cemented.

The fourth lens unit G4 includes a negative meniscus lens L17 having a convex surface directed toward the object side and a positive meniscus lens L18 having a convex surface directed toward the object side. Here, the negative meniscus lens L17 and the positive meniscus lens L18 are cemented.

The fifth lens unit G5 includes a biconcave negative lens L19 and a positive meniscus lens L20 having a convex surface directed toward the object side. Here, the biconcave negative lens L19 and the positive meniscus lens L20 are cemented.

The sixth lens unit G6 includes a biconvex positive lens L21 and a negative meniscus lens L22 having a convex surface directed toward an image side.

At a time of zooming from a wide angle end to a telephoto end, the first lens unit G1 and the sixth lens unit G6 are fixed. The second lens unit G2 moves toward the image side. The third lens unit G3, the fourth lens unit G4, and the fifth lens unit G5 move toward the object side. The aperture stop S moves together with the third lens unit G3.

At a time of focusing from a far point to a near point, both the fourth lens unit G4 and the fifth lens unit G5 move toward the image side. At a time of correcting image blur, the biconvex positive lens L13, the biconcave negative lens L14, and the biconcave negative lens L15 move in a direction perpendicular to an optical axis.

An aspheric surface is provided to an object-side surface of the biconvex positive lens L16.

An example 5 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a positive meniscus lens L1 having a convex surface directed toward the object side, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a biconcave negative lens L4, a positive meniscus lens L5 having a convex surface directed toward the object side, and a biconcave negative lens L6. Here, the biconcave negative lens L4 and the positive meniscus lens L5 are cemented.

The third lens unit G3 includes a biconvex positive lens L7, a biconvex positive lens L8, a biconcave negative lens L9, a negative meniscus lens L10 having a convex surface directed toward the object side, a biconvex positive lens L11, a negative meniscus lens L12 having a convex surface directed toward an image side, and a positive meniscus lens L13 having a convex surface directed toward the object side.

Here, the biconvex positive lens L8 and the biconcave negative lens L9 are cemented. The negative meniscus lens L10, the biconvex positive lens L11, and the negative meniscus lens L12 are cemented.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented.

The fifth lens unit G5 includes a positive meniscus lens L16 having a convex surface directed toward the object side and a negative meniscus lens L17 having a convex surface directed toward the object side. Here, the positive meniscus lens L16 and the negative meniscus lens L17 are cemented.

The sixth lens unit G6 includes a positive meniscus lens L18 having a convex surface directed toward the image side, a biconvex positive lens L19, a biconcave negative lens L20, a biconcave negative lens L21, a biconvex positive lens L22, a biconvex positive lens L23, and a biconcave negative lens L24.

Here, the biconvex positive lens L19 and the biconcave negative lens L20 are cemented. The biconcave negative lens L21 and the biconvex positive lens L22 are cemented.

At a time of zooming from a wide angle end to a telephoto end, the first lens unit G1, the third lens unit G3, and the sixth lens unit G6 are fixed. The second lens unit G2 moves toward the image side. The fourth lens unit G4, after moving toward the image side, moves toward the object side. The fifth lens unit G5 moves toward the object side. The aperture stop S moves together with the third lens unit G3.

At a time of focusing from a far point to a near point, both the fourth lens unit G4 and the fifth lens unit G5 move toward the image side. At a time of correcting image blur, the biconvex positive lens L19, the biconcave negative lens L20, and the biconcave negative lens L21 move in a direction perpendicular to an optical axis.

An example 6 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a biconcave negative lens L4, a positive meniscus lens L5 having a convex surface directed toward the object side, and a biconcave negative lens L6. Here, the biconcave negative lens L4 and the positive meniscus lens L5 are cemented.

The third lens unit G3 includes a biconvex positive lens L7, a biconvex positive lens L8, a biconcave negative lens L9, a negative meniscus lens L10 having a convex surface directed toward the object side, a positive meniscus lens L11 having a convex surface directed toward the object side, a positive meniscus lens L12 having a convex surface directed toward an image side, a biconcave negative lens L13, a biconcave negative lens L14, and a biconvex positive lens L15.

Here, the biconvex positive lens L8 and the biconcave negative lens L9 are cemented. The negative meniscus lens L10 and the positive meniscus lens 111 are cemented. The positive meniscus lens L12 and the biconcave negative lens L13 are cemented.

The fourth lens unit G4 includes a negative meniscus lens L16 having a convex surface directed toward the object side and a positive meniscus lens L17 having a convex surface directed toward the object side. Here, the negative meniscus lens L16 and the positive meniscus lens L17 are cemented.

The fifth lens unit G5 includes a positive meniscus lens L18 having a convex surface directed toward the image side and a biconcave negative lens L19. Here, the positive meniscus lens L18 and the biconcave negative lens L19 are cemented.

The sixth lens unit G6 includes a biconvex positive lens L20, a positive meniscus lens L21 having a convex surface directed toward the image side, and a negative meniscus lens L22 having a convex surface directed toward the image side. Here, the positive meniscus lens L21 and the negative meniscus lens L22 are cemented.

At a time of zooming from a wide angle end to a telephoto end, the first lens unit G1, the third lens unit G3, and the sixth lens unit G6 are fixed. The second lens unit G2 moves toward the image side. The fourth lens unit G4 and the fifth lens unit G5 move toward the object side. The aperture stop S is fixed together with the third lens unit G3.

At a time of focusing from a far point to a near point, both the fourth lens unit G4 and the fifth lens unit G5 move toward the image side. At a time of correcting image blur, the positive meniscus lens L12, the biconcave negative lens L13, and the biconcave negative lens L14 move in a direction perpendicular to an optical axis.

An aspheric surface is provided to a total of two surfaces which are, both surfaces of the biconvex positive lens L15.

An example 7 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a biconcave negative lens L4, a positive meniscus lens L5 having a convex surface directed toward the object side, and a biconcave negative lens L6. Here, the biconcave negative lens L4 and the positive meniscus lens L5 are cemented.

The third lens unit G3 includes a biconvex positive lens L7, a positive meniscus lens L8 having a convex surface directed toward the object side, a biconcave negative lens L9, a biconvex positive lens L10, a positive meniscus lens L11 having a convex surface directed toward an image side, a biconcave negative lens L12, a biconcave negative lens L13, and a biconvex positive lens L14.

Here, the biconcave negative lens L9 and the biconvex positive lens L10 are cemented. The positive meniscus lens L11 and the biconcave negative lens L12 are cemented.

The fourth lens unit G4 includes a negative meniscus lens L15 having a convex surface directed toward the object side and a positive meniscus lens L16 having a convex surface directed toward the object side. Here, the negative meniscus lens L15 and the positive meniscus lens L16 are cemented.

The fifth lens unit G5 includes a biconvex positive lens L17 and a biconcave negative lens L18. Here, the biconvex positive lens L17 and the biconcave negative lens L18 are cemented.

The sixth lens unit G6 includes a biconvex positive lens L19, a positive meniscus lens L20 having a convex surface directed toward the image side, and the negative meniscus lens L21 having a convex surface directed toward the image side. Here, the positive meniscus lens L20 and the negative meniscus lens L21 are cemented.

At a time of zooming from a wide angle end to a telephoto end, the first lens unit G1, the third lens unit G3, and the sixth lens unit G6 are fixed. The second lens unit G2 moves toward the image side. The fourth lens unit G4, after moving toward the image side, moves toward the object side. The fifth lens unit G5 moves toward the object side. The aperture stop is fixed together with the third lens unit G3.

At a time of focusing from a far point to a near point, both the fourth lens unit G4 and the fifth lens unit G5 move toward the image side. At a time of correcting image blur, the positive meniscus lens L11, the biconcave negative lens L12, and the biconcave negative lens L13 move in a direction perpendicular to an optical axis.

An aspheric surface is provided to a total of two surfaces which are, an image-side surface of the biconvex positive lens L10 and an object-side surface of the biconvex positive lens L14.

An example 8 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed between the second lens unit G2 and the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a positive meniscus lens L1 having a convex surface directed toward the object side, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a positive meniscus lens L4 having a convex surface directed toward an image side, a biconcave negative lens L5, a positive meniscus lens L6 having a convex surface directed toward the object side, and a biconcave negative lens L7. Here, the positive meniscus lens L4, the biconcave negative lens L5, and the positive meniscus lens L6 are cemented.

The third lens unit G3 includes a biconvex positive lens L8, a biconcave negative lens L9, a biconvex positive lens L10, and a biconvex positive lens L11. Here, the biconcave negative lens L9 and the biconvex positive lens L10 are cemented.

The fourth lens unit G4 includes a negative meniscus lens L12 having a convex surface directed toward the object side and a positive meniscus lens L13 having a convex surface directed toward the object side. Here, the negative meniscus lens L12 and the positive meniscus lens L13 are cemented.

The fifth lens unit G5 includes a negative meniscus lens L14 having a convex surface directed toward the object side.

The sixth lens unit G6 includes a positive meniscus lens L15 having a convex surface directed toward the image side, a biconvex positive lens L16, a biconcave negative lens L17, a biconcave negative lens L18, a positive meniscus lens L19 having a convex surface directed toward the object side, a biconvex positive lens L20, and a biconcave negative lens L21.

Here, the biconvex positive lens L16 and the biconcave negative lens L17 are cemented. The biconvex positive lens L20 and the biconcave negative lens L21 are cemented.

At a time of zooming from a wide angle end to a telephoto end, the first lens unit G1, the third lens unit G3, and the sixth lens unit G6 are fixed. The second lens unit G2 moves toward the image side. The fourth lens unit G4, after moving toward the image side, moves toward the object side. The fifth lens unit G5, after moving toward the object side, moves toward the image side. The aperture stop S is fixed together with the third lens unit G3.

At a time of focusing from a far point to a near point, both the fourth lens unit G4 and the fifth lens unit G5 move toward the image side. At a time of correcting image blur, the biconvex positive lens L16, the biconcave negative lens L17, and the biconcave negative lens L18 move in a direction perpendicular to an optical axis.

An aspheric surface is provided to a total of two surfaces which are, both surfaces of the biconvex positive lens L8.

An example 9 is an example of an image pickup optical system. In the image pickup optical system of the example 9, a teleconverter lens is inserted in the zoom optical system of the example 8. Description of arrangement same as that of the zoom optical system of the example 8 is omitted.

The teleconverter lens includes a positive meniscus lens L20 having a convex surface directed toward the object side, a biconvex positive lens L21, a biconcave negative lens L22, a biconcave negative lens L23, a biconvex positive lens L24, a biconcave negative lens L25, and a biconvex positive lens L26.

Here, the biconvex positive lens L21 and the biconcave negative lens 22 are cemented. The biconcave negative lens L23, the biconvex positive lens L24, and the biconcave negative lens L25 are cemented.

A biconvex positive lens L27 corresponds to the biconvex positive lens L20 in the zoom optical system of the example 8. A biconcave negative lens L28 corresponds to the biconcave negative lens L21 in the zoom optical system of the example 8.

In the zoom optical system of the example 8, the predetermined space is formed between the positive meniscus lens L19 and the biconvex positive lens L20. In the image pickup optical system of the example 9, the teleconverter lens is inserted between the positive meniscus lens L19 and the biconvex positive lens L27.

An example 10 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a positive meniscus lens L7 having a convex surface directed toward the object side, a biconvex positive lens L8, a biconcave negative lens L9, a negative meniscus lens L10 having a convex surface directed toward the object side, a positive meniscus lens L11 having a convex surfaced directed toward the object side, and a biconvex positive lens L12.

Here, the biconvex positive lens L8 and the biconcave negative lens L9 are cemented. The negative meniscus lens L10 and the positive meniscus lens L11 are cemented.

The fourth lens unit G4 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The fifth lens unit G5 includes a negative meniscus lens L15 having a convex surface directed toward the object side.

The sixth lens unit G6 includes a biconvex positive lens L16, a biconvex positive lens L17, a biconcave negative lens L18, a biconcave negative lens L19, a positive meniscus lens L20 having a convex surface directed toward the object side, a biconvex positive lens L21, and a biconcave negative lens L22.

Here, the biconvex positive lens L17 and the biconcave negative lens L18 are cemented. The biconvex positive lens L21 and the biconcave negative lens L22 are cemented.

At a time of zooming from a wide angle end to a telephoto end, the first lens unit G1, the third lens unit G3, and the sixth lens unit G6 are fixed. The second lens unit G2 moves toward an image side. The fourth lens unit G4, after moving toward the image side, moves toward the object side. The fifth lens unit G5 moves toward the object side. The aperture stop S is fixed together with the third lens unit G3.

At a time of focusing from a far point to a near point, the fourth lens unit G4 moves toward the image side. At a time of correcting image blur, the biconvex positive lens L17, the biconcave negative lens L18, and the biconcave negative lens L19 move in a direction perpendicular to an optical axis.

An aspheric surface is provided to a total of two surfaces which are, both surfaces of the biconvex positive lens L12.

An example 11 is an example of an image pickup optical system. In the image pickup optical system of the example 11, a teleconverter lens is inserted in the zoom optical system of the example 10. Description of arrangement same as that of the zoom optical system of the example 10 is omitted.

The teleconverter lens includes a biconvex positive lens L21, a negative meniscus lens L22 having a convex surface directed toward the object side, a biconcave negative lens L23, a biconvex positive lens L24, a biconcave negative lens L25, and a biconvex positive lens L26. Here, the biconcave negative lens L23, the biconvex positive lens L24, and the biconcave negative lens L25 are cemented.

A biconvex positive lens L27 corresponds to the biconvex positive lens L21 in the zoom optical system of the example 10. A biconcave negative lens L28 corresponds to the biconcave negative lens L22 in the zoom optical system of the example 10.

In the zoom optical system of the example 10, the predetermined space is formed between the positive meniscus lens L20 and the biconvex positive lens L21. In the image pickup optical system of the example 11, the teleconverter lens is inserted between the positive meniscus lens L20 and the biconvex positive lens L27.

An example 12 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a biconcave negative lens L4, a positive meniscus lens L5 having a convex surface directed toward the object side, and a biconcave negative lens L6. Here, the biconcave negative lens L4 and the positive meniscus lens L5 are cemented.

The third lens unit G3 includes a biconvex positive lens L7, a biconvex positive lens L8, a biconcave negative lens L9, a negative meniscus lens L10 having a convex surface directed toward the object side, a positive meniscus lens L11 having a convex surface directed toward the object side, a biconvex positive lens L12, a biconcave negative lens L13, a biconcave negative lens L14, and a biconvex positive lens L15.

Here, the biconvex positive lens L8 and the biconcave negative lens L9 are cemented. The negative meniscus lens L10 and the positive meniscus lens L11 are cemented. The biconvex positive lens L12 and the biconcave negative lens L13 are cemented.

The fourth lens unit G4 includes a negative meniscus lens L16 having a convex surface directed toward the object side and a positive meniscus lens L17 having a convex surface directed toward the object side. Here, the negative meniscus lens L16 and the positive meniscus lens L17 are cemented.

The fifth lens unit G5 includes a positive meniscus lens L18 having a convex surface directed toward an image side and a biconcave negative lens L19. Here, the positive meniscus lens L18 and the biconcave negative lens L19 are cemented.

The sixth lens unit G6 includes a positive meniscus lens L20 having a convex surface directed toward the object side, a positive meniscus lens L21 having a convex surface directed toward the image side, and a negative meniscus lens L22 having a convex surface directed toward the image side. Here, the positive meniscus lens L21 and the negative meniscus lens L22 are cemented.

At a time of zooming from a wide angle end to a telephoto end, the first lens unit G1, the third lens unit G3, and the sixth lens unit G6 are fixed. The second lens unit G2 moves toward the image side. The fourth lens unit G4, after moving toward the image side, moves toward the object side. The fifth lens unit G5, after moving toward the object side, moves toward the image side. The aperture stop S is fixed together with the third lens unit G3.

At a time of focusing from a far point to a near point, both the fourth lens unit G4 and the fifth lens unit G5 move toward the image side. At a time of correcting image blur, the biconvex positive lens L12, the biconcave negative lens L13, and the biconcave negative lens L14 move in a direction perpendicular to an optical axis.

An aspheric surface is provided to a total of two surfaces which are, both surfaces of the biconvex positive lens L15.

An example 13 is an example of an image pickup optical system. In the image pickup optical system of the example 13, a teleconverter lens is inserted in the zoom optical system of the example 12. Description of arrangement same as that of the zoom optical system of the example 12 is omitted.

The teleconverter lens includes a biconvex positive lens L21, a negative meniscus lens L22 having a convex surface directed toward the object side, a biconcave negative lens L23, a biconvex positive lens L24, a biconcave negative lens L25, and a biconvex positive lens L26. Here, the biconcave negative lens L23, the biconvex positive lens L24, and the biconcave negative lens L25 are cemented.

A positive meniscus lens L27 corresponds to the positive meniscus lens L21 in the zoom optical system of the example 12. A negative meniscus lens L28 corresponds to the negative meniscus lens L22 in the zoom optical system of the example 12.

In the zoom optical system of the example 12, the predetermined space is formed between the positive meniscus lens L20 and the positive meniscus lens L21. In the image pickup optical system of the example 13, the teleconverter lens is inserted between the positive meniscus lens L20 and the positive meniscus lens L27.

An example 14 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth unit G4 is a second intermediate unit. The fifth lens unit G5 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a positive meniscus lens L7 having a convex surface directed toward the object side, a biconvex positive lens L8, a biconcave negative lens L9, a negative meniscus lens L10 having a convex surface directed toward the object side, a positive meniscus lens L11 having a convex surface directed toward the object side, and a biconvex positive lens L12.

Here, the biconvex positive lens L8 and the biconcave negative lens L9 are cemented. The negative meniscus lens L10 and the positive meniscus lens L11 are cemented.

The fourth lens unit G4 includes a biconcave negative lens L13 and a positive meniscus lens L14 having a convex surface directed toward the object side. Here, the biconcave negative lens L13 and the positive meniscus lens L14 are cemented.

The fifth lens unit G5 includes a negative meniscus lens L15 having a convex surface directed toward the object side, a biconvex positive lens L16, a biconvex positive lens L17, a biconcave negative lens L18, a biconcave negative lens L19, a biconvex positive lens L20, a biconvex positive lens L21, and a biconcave negative lens L22.

Here, the biconvex positive lens L17 and the biconcave negative lens L18 are cemented. The biconvex positive lens L21 and the biconcave negative lens L22 are cemented.

At a time of zooming from a wide angle end to a telephoto end, the first lens unit G1 and the fifth lens unit G5 are fixed. The second lens unit G2 moves toward an image side. The third lens unit G3 and the fourth lens unit G4 move toward the object side. The aperture stop S moves together with the third lens unit G3.

At a time of focusing from a far point to a near point, the fourth lens unit G4 moves toward the image side. At a time of correcting image blur, the biconvex positive lens L17, the biconcave negative lens L18, and the biconcave negative lens L19 move in a direction perpendicular to an optical axis.

An aspheric surface is provided to a total of two surfaces which are, both surfaces of the biconvex positive lens L12.

An example 15 is an example of an image pickup optical system. In the image pickup optical system of the example 15, a teleconverter lens is inserted in the zoom optical system of the example 14. Description of arrangement same as that of the zoom optical system of the example 14 is omitted.

The teleconverter lens includes a biconvex positive lens L21, a negative meniscus lens L22 having a convex surface directed toward an object side, a biconcave negative lens L23, a biconvex positive lens L24, a biconcave negative lens L25, and a biconvex positive lens L26. Here, the biconcave negative lens L23, the biconvex positive lens L24, and the biconcave negative lens L25 are cemented.

A biconvex positive lens L27 corresponds to the biconvex positive lens L21 in the zoom optical system of the example 14. A biconcave negative lens L28 corresponds to the biconcave negative lens L22 in the zoom optical system of the example 14.

In the zoom optical system of the example 14, the predetermined space is formed between the biconvex positive lens L20 and the biconvex positive lens L21. In the image pickup optical system of the example 15, the teleconverter lens is inserted between the biconvex positive lens L20 and the biconvex positive lens L27.

An example 16 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed between the second lens unit G2 and the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a positive meniscus lens L1 having a convex surface directed toward the object side, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a positive meniscus lens L4 having a convex surface directed toward an image side, a biconcave negative lens L5, a positive meniscus lens L6 having a convex surface directed toward the object side, and a biconcave negative lens L7. Here, the positive meniscus lens L4, the biconcave negative lens L5, and the positive meniscus lens L6 are cemented.

The third lens unit G3 includes a biconvex positive lens L8, a biconcave negative lens L9, a biconvex positive lens L10, and a biconvex positive lens L11. Here, the biconcave negative lens L9 and the biconvex positive lens L10 are cemented.

The fourth lens unit G4 includes a negative meniscus lens L12 having a convex surface directed toward the object side and a positive meniscus lens L13 having a convex surface directed toward the object side. Here, the negative meniscus lens 12 and the positive meniscus lens L13 are cemented.

The fifth lens unit G5 includes a negative meniscus lens L14 having a convex surface directed toward the object side.

The sixth lens unit G6 includes a biconvex positive lens L15, a biconvex positive lens L16, a biconcave negative lens L17, a biconcave negative lens L18, a biconvex positive lens L19, a positive meniscus lens L20 having a convex surface directed toward the object side, and a negative meniscus lens L21 having a convex surface directed toward the object side.

Here, the biconvex positive lens L16 and the biconcave negative lens L17 are cemented. The positive meniscus lens L20 and the negative meniscus lens L21 are cemented.

At a time of zooming from a wide angle end to a telephoto end, the first lens unit G1, the third lens unit G3, and the sixth lens unit G6 are fixed. The second lens unit G2 moves toward the image side. The fourth lens unit G4, after moving toward the image side, moves toward the object side. The fifth lens unit G5 moves toward the object side. The aperture stop S is fixed together with the third lens unit G3.

At a time of focusing from a far point to a near point, both the fourth lens unit G4 and the fifth lens unit G5 move toward the image side. At a time of correcting image blur, the biconvex positive lens L16, the biconcave negative lens L17, and the biconcave negative lens L18 move in a direction perpendicular to an optical axis.

An aspheric surface is provided to a total of three surfaces which are, both surfaces of the biconvex positive lens L8, and an object-side surface of the negative meniscus lens L12.

An example 17 is an example of an image pickup optical system. In the image pickup optical system of the example 17, a teleconverter lens is inserted in the zoom optical system of the example 16. Description of arrangement same as that of the zoom optical system of the example 16 is omitted.

The teleconverter lens includes a positive meniscus lens L20 having a convex surface directed toward an object side, a biconvex positive lens L21, a biconcave negative lens L22, a negative meniscus lens L23 having a convex surface directed toward the object side, a biconvex positive lens L24, a biconcave negative lens L25, and a positive meniscus lens L26 having a convex surface directed toward the object side.

Here, the biconvex positive lens L21 and the biconcave negative lens L22 are cemented. The negative meniscus lens L23, the biconvex positive lens L24, and the biconcave negative lens L25 are cemented.

A positive meniscus lens L27 corresponds to the positive meniscus lens L20 in the zoom optical system of the example 16. A negative meniscus lens L28 corresponds to the negative meniscus lens L21 in the zoom optical system of the example 16.

In the zoom optical system of the example 16, the predetermined space is formed between the biconvex positive lens L19 and the positive meniscus lens L20. In the image pickup optical system of the example 17, the teleconverter lens is inserted between the biconvex positive lens L19 and the positive meniscus lens L27.

An example 18 is an example of an image pickup optical system. In the image pickup optical system of the example 18, a wide converter lens is inserted in the zoom optical system of the example 16. Description of arrangement same as that of the zoom optical system of the example 16 is omitted.

The wide converter lens includes a biconcave negative lens L20, a biconvex positive lens L21, a negative meniscus lens L22 having a convex surface directed toward an image side, a positive meniscus lens L23 having a convex surface directed toward the image side, a positive meniscus lens L24 having a convex surface directed toward the object side, a biconvex positive lens L25, and a biconcave negative lens L26.

Here, the biconcave negative lens L20 and the biconvex positive lens L21 are cemented. The negative meniscus lens L22 and the positive meniscus lens L23 are cemented. The biconvex positive lens L25 and the biconcave negative lens L26 are cemented.

A positive meniscus lens L27 corresponds to the positive meniscus lens L20 in the zoom optical system of the example 16. A negative meniscus lens L28 corresponds to the negative meniscus lens L21 in the zoom optical system of the example 16.

In the zoom optical system of the example 16, the predetermined space is formed between the biconvex positive lens L19 and the positive meniscus lens L20. In the image pickup optical system of the example 18, the wide converter lens is inserted between the biconvex positive lens L19 and the positive meniscus lens L27.

An example 19 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a positive refractive power, a fifth lens unit G5 having a negative refractive power, a sixth lens unit G6 having a negative refractive power, and a seventh lens unit G7 having a positive refractive power. An aperture stop S is disposed between the third lens unit G3 and the fourth lens unit G4.

A front-side lens unit includes the first lens unit G1 and the second lens unit G2. The first lens unit G1 is a first front unit and the second lens unit G2 is a second front unit. An intermediate lens unit includes the third lens unit G3, the fourth lens unit G4, and the fifth lens unit G5. A first intermediate unit includes the third lens unit G3 and the fourth lens unit G4. The third lens unit G3 is a first sub unit and the fourth lens unit G4 is a second sub unit. The fifth lens unit G5 is a second intermediate unit. The sixth lens unit G6 is a movable lens unit. The seventh lens unit G7 is a rear-side lens unit.

The first lens unit G1 includes a positive meniscus lens L1 having a convex surface directed toward the object side, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a biconcave negative lens L4, a positive meniscus lens L5 having a convex surface directed toward the object side, and a biconcave negative lens L6. Here, the biconcave negative lens L4 and the positive meniscus lens L5 are cemented.

The third lens unit G3 includes a biconvex positive lens L7, a biconvex positive lens L8, and a negative meniscus lens L9 having a convex surface directed toward an image side. Here, the biconvex positive lens L8 and the negative meniscus lens L9 are cemented.

The fourth lens unit G4 includes a negative meniscus lens L10 having a convex surface directed toward the object side, a biconvex positive lens L11, a negative meniscus lens L12 having a convex surface directed toward the image side, and a positive meniscus lens L13 having a convex surface directed toward the object side. Here, the negative meniscus lens L10, the biconvex positive lens L11, and the negative meniscus lens L12 are cemented.

The fifth lens unit G5 includes a negative meniscus lens L14 having a convex surface directed toward the object side and a positive meniscus lens L15 having a convex surface directed toward the object side. Here, the negative meniscus lens L14 and the positive meniscus lens L15 are cemented.

The sixth lens unit G6 includes a positive meniscus lens L16 having a convex surface directed toward the object side and a negative meniscus lens L17 having a convex surface directed toward the object side. Here, the positive meniscus lens L16 and the negative meniscus lens L17 are cemented.

The seventh lens unit G7 includes a biconvex positive lens L18, a biconvex positive lens L19, a biconcave negative lens L20, a negative meniscus lens L21 having a convex surface directed toward the image side, a biconvex positive lens L22, a positive meniscus lens L23 having a convex surface directed toward the image side, and a negative meniscus lens L24 having a convex surface directed toward the image side.

Here, the biconvex positive lens L19 and the biconcave negative lens L20 are cemented. The positive meniscus lens L23 and the negative meniscus lens L24 are cemented.

At a time of zooming from a wide angle end to a telephoto end, the first lens unit G1, the fourth lens unit G4, and the seventh lens unit G7 are fixed. The second lens unit G2 moves toward the image side. The third lens unit G3 and the fifth lens unit G5 moves toward the object side. The sixth lens unit G6, after moving toward the object side, moves toward the image side. The aperture stop S is fixed together with the fourth lens unit G4.

At a time of focusing from a far point to a near point, both the fifth lens unit G5 and the sixth lens unit G6 move toward the image side. At a time correcting image blur, the biconvex positive lens L19, the biconcave negative lens L20, and the negative meniscus lens L21 move in a direction perpendicular to an optical axis.

An example 20 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a positive refractive power, a fifth lens unit G5 having a negative refractive power, and a sixth lens unit G6 having a positive refractive power. An aperture stop S is disposed between the third lens unit G3 and the fourth lens unit G4.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a positive meniscus lens L7 having a convex surface directed toward the object side, a biconvex positive lens L8, a biconcave negative lens L9, a negative meniscus lens L10 having a convex surface directed toward the object side, and a positive meniscus lens L11 having a convex surface directed toward the object side.

Here, the biconvex positive lens L8 and the biconcave negative lens L9 are cemented. The negative meniscus lens L10 and the positive meniscus lens L11 are cemented.

The fourth lens unit G4 includes a biconvex positive lens L12.

The fifth lens unit G5 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The sixth lens unit G6 includes a negative meniscus lens L15 having a convex surface directed toward the object side, a biconvex positive lens L16, a biconvex positive lens L17, a biconcave negative lens L18, a biconcave negative lens L19, a positive meniscus lens L20 having a convex surface directed toward the object side, a biconvex positive lens L21, and a biconcave negative lens L22.

Here, the biconvex positive lens L17 and the biconcave negative lens L18 are cemented. The biconvex positive lens L21 and the biconcave negative lens L22 are cemented.

At a time of zooming from a wide angle end to a telephoto end, the first lens unit G1, the fourth lens unit G4, and the sixth lens unit G6 are fixed. The second lens unit G2 moves toward an image side. The third lens unit G3 moves toward an object side. The fifth lens unit G5, after moving toward the image side, moves toward the object side. The aperture stop S moves together with the third lens unit G3.

At a time of focusing from a far point to a near point, the fifth lens unit G5 moves toward the image side. At a time of correcting image blur, the biconvex positive lens L17, the biconcave negative lens L18, and the biconcave negative lens L19 move in a direction perpendicular to an optical axis.

An aspheric surface is provided to a total of two surfaces which are, both surfaces of the biconvex positive lens L12.

An example 21 is an example of an image pickup optical system. In the image pickup optical system of the example 21, a teleconverter lens is inserted in the zoom optical system of the example 20. Description of arrangement same as that of the zoom optical system of the example 20 is omitted.

The teleconverter lens includes a biconvex positive lens L21, a negative meniscus lens L22 having a convex surface directed toward an object side, a biconcave negative lens L23, a biconvex positive lens L24, a biconcave negative lens L25, and a biconvex positive lens L26. Here, the biconcave negative lens L23, the biconvex positive lens L24, and the biconcave negative lens L25 are cemented.

Here, a biconvex positive lens L27 corresponds to the biconvex positive lens L21 in the zoom optical system of the example 20. A biconcave negative lens L28 corresponds to the biconcave negative lens L22 in the zoom optical system of the example 20.

In the zoom optical system of the example 20, the predetermined space is formed between the positive meniscus lens L20 and the biconvex positive lens L21. In the image pickup optical system of the example 21, the teleconverter lens is inserted between the positive meniscus lens L20 and the biconvex positive lens L27.

An example 22 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a positive meniscus lens L7 having a convex surface directed toward the object side, a positive meniscus lens L8 having a convex surface directed toward the object side, a negative meniscus lens L9 having a convex surface directed toward the object side, a biconvex positive lens L10, a positive meniscus lens L11 having a convex surface directed toward an image side, a biconcave negative lens L12, a biconcave negative lens L13, and a biconvex positive lens L14.

Here, the negative meniscus lens L9 and the biconvex positive lens L10 are cemented. The positive meniscus lens L11 and the biconcave negative lens L12 are cemented.

The fourth lens unit G4 includes a negative meniscus lens L15 having a convex surface directed toward the object side and a positive meniscus lens L16 having a convex surface directed toward the object side. Here, the negative meniscus lens L15 and the positive meniscus lens L16 are cemented.

The fifth lens unit G5 includes a biconcave negative lens L17, a biconvex positive lens L18, a positive meniscus lens L19 having a convex surface directed toward the image side, and a negative meniscus lens L20 having a convex surface directed toward the image side. Here, the positive meniscus lens L19 and the negative meniscus lens L20 are cemented.

At a time of zooming from a wide angle end to a telephoto end, the first lens unit G1 moves toward the object side. The second lens unit G2 moves toward the image side. The third lens unit G3 and the fifth lens unit G5 are fixed. The fourth lens unit G4, after moving toward the image side, moves toward the object side. The aperture stop S is fixed together with the third lens unit G3.

At a time of focusing from a far point to a near point, the fourth lens unit G4 moves toward the image side. At a time of correcting image blur, the positive meniscus lens L11, the biconcave negative lens L12, and the biconcave negative lens L13 move in direction perpendicular to an optical axis.

An aspheric surface is provided to a total of three surfaces which are, an image-side surface of the biconvex positive lens L10 and both surfaces of the biconvex positive lens L14.

An example 23 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a negative refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a biconvex positive lens L7, a positive meniscus lens L8 having a convex surface directed toward the object side, a biconcave negative lens L9, a biconvex positive lens L10, a positive meniscus lens L11 having a convex surface directed toward an image side, a biconcave negative lens L12, a biconcave negative lens L13, and a biconvex positive lens L14.

Here, the biconcave negative lens L9 and the biconvex positive lens L10 are cemented. The positive meniscus lens L11 and the biconcave negative lens L12 are cemented.

The fourth lens unit G4 includes a negative meniscus lens L15 having a convex surface directed toward the object side and a positive meniscus lens L16 having a convex surface directed toward the object side. Here, the negative meniscus lens L15 and the positive meniscus lens L16 are cemented.

The fifth lens unit G5 includes a biconvex positive lens L17, a biconcave negative lens L18, a biconvex positive lens L19, a positive meniscus lens L20 having a convex surface directed toward the image side, and a biconcave negative lens L21. Here, the biconvex positive lens L17 and the biconcave negative lens L18 are cemented. The positive meniscus lens L20 and the biconcave negative lens L21 are cemented.

At a time of zooming from a wide angle end to a telephoto end, the first lens unit G1 and the second lens unit G2 move toward the image side. The third lens unit G3 and the fifth lens unit G5 are fixed. The fourth lens unit G4, after moving toward the image side, moves toward the object side. The aperture stop S is fixed together with the third lens unit G3.

At a time of focusing from a far point to a near point, the fourth lens unit G4 moves toward the image side. At a time of correcting image blur, the positive meniscus lens L11, the biconcave negative lens L12, and the biconcave negative lens L13 move in a direction perpendicular to an optical axis.

An aspheric surface is provided to a total of two surfaces which are, an image-side surface of the biconvex positive lens L10 and an object-side surface of the biconvex positive lens L14.

An example 24 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a positive meniscus lens L7 having a convex surface directed toward the object side, a biconvex positive lens L8, a biconcave negative lens L9, a negative meniscus lens L10 having a convex surface directed toward the object side, a positive meniscus lens L11 having a convex surface directed toward the object side, and a biconvex positive lens L12.

Here, the biconvex positive lens L8 and the biconcave negative lens L9 are cemented. The negative meniscus lens L10 and the positive meniscus lens L11 are cemented.

The fourth lens unit G4 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The fifth lens unit G5 includes a negative meniscus lens L15 having a convex surface directed toward the object side, a biconvex positive lens L16, a biconvex positive lens L17, a biconcave negative lens L18, a biconcave negative lens L19, a biconvex positive lens L20, a biconvex positive lens L21, and a biconcave negative lens L22.

Here, the negative meniscus lens L15 and the biconvex positive lens L16 are cemented. The biconvex positive lens L17 and the biconcave negative lens L18 are cemented. The biconvex positive lens L21 and the biconcave negative lens L22 are cemented.

At a time of zooming from a wide angle end to a telephoto end, the first lens unit G1, the third lens unit G3, and the fifth lens unit G5 are fixed. The second lens unit G2 moves toward an image side. The fourth lens unit G4, after moving toward the image side, moves toward the object side. The aperture stop S is fixed together with the third lens unit G3.

At a time of focusing from a far point to a near point, the fourth lens unit G4 moves toward the image side. At a time of correcting image blur, the biconvex positive lens L17, the biconcave negative lens L18, and the biconcave negative lens L19 move in a direction perpendicular to an optical axis.

An aspheric surface is provided to a total of two surfaces which are, both surfaces of the biconvex positive lens L12.

An example 25 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a biconcave negative lens L4, a positive meniscus lens L5 having a convex surface directed toward the object side, and a negative meniscus lens L6 having a convex surface directed toward an image side. Here, the biconcave negative lens L4 and the positive meniscus lens L5 are cemented.

The third lens unit G3 includes a positive meniscus lens L7 having a convex surface directed toward the object side, a biconvex positive lens L8, a biconcave negative lens L9, a negative meniscus lens L10 having a convex surface directed toward the object side, a biconvex positive lens L11, a negative meniscus lens L12 having a convex surface directed toward the image side, and a positive meniscus lens L13 having a convex surface directed toward the object side.

Here, the biconvex positive lens L8 and the biconcave negative lens L9 are cemented. The negative meniscus lens L10, the biconvex positive lens 11, and the negative meniscus lens L12 are cemented.

The fourth lens unit G4 includes a biconcave negative lens L14 and a positive meniscus lens L15 having a convex surface directed toward the object side. Here, the biconcave negative lens L14 and the positive meniscus lens L15 are cemented.

The fifth lens unit G5 includes a negative meniscus lens L16 having a convex surface directed toward the object side, a biconvex positive lens L17, a biconvex positive lens L18, a biconcave negative lens L19, a biconcave negative lens L20, a positive meniscus lens L21 having a convex surface directed toward the object side, a biconvex positive lens L22, and a biconcave negative lens L23.

Here, the biconvex positive lens L18 and the biconcave negative lens L19 are cemented. The biconvex positive lens L22 and the biconcave negative lens L23 are cemented.

At a time of zooming from a wide angle end to a telephoto end, the first lens unit G1, the third lens unit G3, and the fifth lens unit G5 are fixed. The second lens unit G2 moves toward the image side. The fourth lens unit G4 moves toward the object side. The aperture stop S is fixed together with the third lens unit G3.

At a time of focusing from a far point to a near point, the fourth lens unit G4 moves toward the image side. At a time of correcting image blur, the biconvex positive lens L18, the biconcave negative lens L19, and the biconcave negative lens L20 move in a direction perpendicular to an optical axis.

An example 26 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a positive refractive power, and a sixth lens unit G6 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a positive meniscus lens L7 having a convex surface directed toward the object side, a biconvex positive lens L8, a biconcave negative lens L9, a negative meniscus lens L10 having a convex surface directed toward the object side, a positive meniscus lens L11 having a convex surface directed toward the object side, and a biconvex positive lens L12.

Here, the biconvex positive lens L8 and the biconcave negative lens L9 are cemented. The negative meniscus lens L10 and the positive meniscus lens L11 are cemented.

The fourth lens unit G4 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The fifth lens unit G5 includes a negative meniscus lens L15 having a convex surface directed toward the object side, and a biconvex positive lens L16. Here, the negative meniscus lens L15 and the biconvex positive lens L16 are cemented.

The sixth lens unit G6 includes a biconvex positive lens L17, a biconcave negative lens L18, a biconcave negative lens L19, a biconvex positive lens L20, a biconvex positive lens L21, and a biconcave negative lens L22.

Here, the biconvex positive lens L17 and the biconcave negative lens L18 are cemented. The biconvex positive lens L21 and the biconcave negative lens L22 are cemented.

At a time of zooming from a wide angle end to a telephoto end, the first lens unit G1, the third lens unit G3, and the sixth lens unit G6 are fixed. The second lens unit G2 and the fifth lens unit G5 move toward the image side. The fourth lens unit G4, after moving toward the image side, moves toward the object side. The aperture stop S is fixed together with the third lens unit G3.

At a time of focusing from a far point to a near point, the fourth lens unit G4 moves toward the image side. At a time of correcting image blur, the biconvex positive lens L17, the biconcave negative lens L18, and the biconcave negative lens L19 move in a direction perpendicular to an optical axis.

An aspheric surface is provided to a total of two surfaces which are, both surfaces of the biconvex positive lens L12.

An example 27 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed between the second lens unit G2 and the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a positive meniscus lens L1 having a convex surface directed toward the object side, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a positive meniscus lens L4 having a convex surface directed toward an image side, a biconcave negative lens L5, a positive meniscus lens L6 having a convex surface directed toward the object side, and a biconcave negative lens L7. Here, the positive meniscus lens L4, the biconcave negative lens L5, and the positive meniscus lens L6 are cemented.

The third lens unit G3 includes a biconvex positive lens L8, a biconcave negative lens L9, a biconvex positive lens L10, and a biconvex positive lens L11. Here, the biconcave negative lens L9 and the biconvex positive lens L10 are cemented.

The fourth lens unit G4 includes a negative meniscus lens L12 having a convex surface directed toward the object side and a positive meniscus lens L13 having a convex surface directed toward the object side. Here, the negative meniscus lens L12 and the positive meniscus lens L13 are cemented.

The fifth lens unit G5 includes a negative meniscus lens L14 having a convex surface directed toward the object side.

The sixth lens unit G6 includes a positive meniscus lens L15 having a convex surface directed toward the object side, a biconvex positive lens L16, a biconcave negative lens L17, a biconcave negative lens L18, a biconvex positive lens L19, a biconvex positive lens L20, and a biconcave negative lens L21.

Here, the biconvex positive lens L16 and the biconcave negative lens L17 are cemented. The biconvex positive lens L20 and the biconcave negative lens L21 are cemented.

At a time of zoom from a wide angle end to a telephoto end, the first lens unit G1, the third lens unit G3, and the sixth lens unit G6 are fixed. The second lens unit G2 moves toward an image side. The fourth lens unit G4, after moving toward the image side, moves toward the object side. The fifth lens unit G5, after moving toward the object side, moves toward the image side. The aperture stop S is fixed together with the third lens unit G3.

At a time of focusing from a far point to a near point, the fourth lens unit G4 moves toward the image side. At a time of correcting image blur, the biconvex positive lens L16, the biconcave negative lens L17, and the biconcave negative lens L18 move in a direction perpendicular to an optical axis.

An aspheric surface is provided to a total of two surfaces which are, both surfaces of the biconvex positive lens L8.

An example 28 is an example of an image pickup optical system. In the image pickup optical system of the example 28, a teleconverter lens is inserted in the zoom optical system of the example 27. Description of arrangement same as that of the zoom optical system of the example 27 is omitted.

The teleconverter lens includes a negative meniscus lens L20 having a convex surface directed toward the object side, a positive meniscus lens L21 having a convex surface directed toward the object side, a positive meniscus lens L22 having a convex surface directed toward the object side, a negative meniscus lens L23 having a convex surface directed toward the object side, a negative meniscus lens L24 having a convex surface directed toward the object side, a biconvex positive lens L25, and a biconcave negative lens L26.

Here, the negative meniscus lens L20 and the positive meniscus lens L21 are cemented. The positive meniscus lens L22 and the negative meniscus lens L23 are cemented. The negative meniscus lens L24, the biconvex positive lens L25, and the biconcave negative lens L26 are cemented.

A biconvex positive lens L27 corresponds to the biconvex positive lens L20 in the zoom optical system of the example 27. A biconcave negative lens L28 corresponds to the biconcave negative lens L21 in the zoom optical system of the example 27.

In the zoom optical system of the example 27, the predetermined space is formed between the biconvex positive lens L19 and the biconvex positive lens L20. In the image pickup optical system of the example 28, the teleconverter lens is inserted between the biconvex positive lens L19 and the biconvex positive lens L27.

An example 29 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a positive refractive power, a fifth lens unit G5 having a negative refractive power, a sixth lens unit G6 having a negative refractive power, and a seventh lens unit G7 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit.

An intermediate lens unit includes the third lens unit G3, the fourth lens unit G4, and the fifth lens unit G5. a first intermediate unit includes the third lens unit G3 and the fourth lens unit G5. The third lens unit G3 is a first sub unit and the fourth lens unit G4 is a second sub unit. The fifth lens unit G5 is a second intermediate unit. The sixth lens unit G6 is a movable lens unit. The seventh lens unit G7 is a rear-side lens unit G7.

The first lens unit G1 includes a negative lens L1 having a convex surface directed toward the object side, a biconvex positive lens L2, a negative meniscus lens L3 having a convex surface directed toward the object side, and a positive meniscus lens L4 having a convex surface directed toward the object side. Here, the negative meniscus lens L1 and the biconvex positive lens L2 are cemented. The negative meniscus lens L3 and the positive meniscus lens L4 are cemented.

The second lens unit G2 includes a biconcave negative lens L5, a positive meniscus lens L6 having a convex surface directed toward the object side, and a biconcave negative lens L7. Here, the biconcave negative lens L5 and the positive meniscus lens L6 are cemented.

The third lens unit G3 includes a positive meniscus lens L8 having a convex surface directed toward the object side, a positive meniscus lens L9 having a convex surface directed toward the object side, a negative meniscus lens L10 having a convex surface directed toward the object side, and a biconvex positive lens L11. Here, the negative meniscus lens L10 and the biconvex positive lens L11 are cemented.

The fourth lens unit G4 includes a biconvex positive lens L12, a biconcave negative lens L13, a biconcave negative lens L14, and a biconvex positive lens L15. Here, the biconvex positive lens L12 and the biconcave negative lens L13 are cemented.

The fifth lens unit G5 includes a negative meniscus lens L16 having a convex surface directed toward the object side and a positive meniscus lens L17 having a convex surface directed toward the object side. Here, the negative meniscus lens L16 and the positive meniscus lens L17 are cemented.

The sixth lens unit G6 includes a biconcave negative lens L18 and a positive meniscus lens L19 having a convex surface directed toward the object side. Here, the biconcave negative lens L18 and the positive meniscus lens L19 are cemented.

The seventh lens unit G7 includes a biconvex positive lens L20 and a negative meniscus lens L21 having a convex surface directed toward an image side.

At a time of zooming from a wide angle end to a telephoto end, the first lens unit G1, the fourth lens unit G4, and the seventh lens unit G7 are fixed. The second lens unit G2 moves toward the image side. The third lens unit G3 moves toward the object side. The fifth lens unit G5 and the sixth lens unit G6, after moving toward the image side, move toward the object side. The aperture stop S moves together with the third lens unit G3.

At a time of focusing from a far point to a near point, both the fifth lens unit G5 and the sixth lens unit G6 move toward the image side. At a time of correcting image blur, the biconvex positive lens L12, the biconcave negative lens 113, and the biconcave negative lens L14 move in a direction perpendicular to an optical axis.

An aspheric surface is provided to a total of two surfaces which are, an object-side surface of the positive meniscus lens L8 and an object-side surface of the biconvex positive lens L15.

An example 30 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a positive refractive power, a fifth lens unit G5 having a negative refractive power, a sixth lens unit G6 having a negative refractive power, and a seventh lens unit G7 having a positive refractive power. An aperture stop S is disposed in the fourth lens unit G4.

A front-side lens unit includes the first lens unit G1 and the second lens unit G2. The first lens unit G1 is a first front unit and the second lens unit G2 is a second front unit. An intermediate lens unit includes the third lens unit G3, the fourth lens unit G4, and the fifth lens unit G5. A first intermediate unit includes the third lens unit G3 and the fourth lens unit G4. The third lens unit G3 is a first sub unit and the fourth lens unit G4 is a second sub unit. The fifth lens unit G5 is a second intermediate unit. The sixth lens unit G6 is a movable lens unit. The seventh lens unit G7 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a biconvex positive lens L7.

The fourth lens unit G4 includes a positive meniscus lens L8 having a convex surface directed toward the object side, a biconcave negative lens L9, a biconvex positive lens L10, a biconvex positive lens L11, a biconcave negative lens L12, a biconcave negative lens L13, and a biconvex positive lens L14.

Here, the biconcave negative lens L9 and the biconvex positive lens L10 are cemented. The biconvex positive lens L11 and the biconcave negative lens L12 are cemented.

The fifth lens unit G5 includes a negative meniscus lens L15 having a convex surface directed toward the object side and a positive meniscus lens L16 having a convex surface directed toward the object side. Here, the negative meniscus lens L15 and the positive meniscus lens L16 are cemented.

The sixth lens unit G6 includes a biconcave negative lens L17.

The seventh lens unit G7 includes a biconvex positive lens L18 and a positive meniscus lens L19 having a convex surface directed toward an image side.

At a time of zooming from a wide angle end to a telephoto end, the first lens unit G1, the fourth lens unit G4, and the seventh lens unit G7 are fixed. The second lens unit G2 moves toward the image side. The third lens unit G3 moves toward the object side. The fifth lens unit G5 and the sixth lens unit G6, after moving toward the image side, move toward the object side. The aperture stop S is fixed together with the fourth lens unit G4.

At a time of focusing from a far point to a near point, both the fifth lens unit G5 and the sixth lens unit G6 move toward the image side. At a time of correcting image blur, the biconvex positive lens L11, the biconcave negative lens L12, and the biconcave negative lens L13 move in a direction perpendicular to an optical axis.

An aspheric surface is provided to a total of three surfaces which are, an image-side surface of the biconvex positive lens L10 and both surfaces of the biconvex positive lens L14.

An example 31 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a positive refractive power, a fifth lens unit G5 having a negative refractive power, and a sixth lens unit G6 having a positive refractive power. An aperture stop S is disposed between the third lens unit G3 and the fourth lens unit G4.

A front-side lens unit includes the first lens unit G1 and the second lens unit G2. The first lens unit G1 is a first front unit and the second lens unit G2 is a second front unit. An intermediate lens unit includes the third lens unit G3, the fourth lens unit G4, and the fifth lens unit G5. A first intermediate unit includes the third lens unit G3 and the fourth lens unit G4. The third lens unit G3 is a first sub unit and the fourth lens unit G4 is a second sub unit. The fifth lens unit G5 is a second intermediate unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a biconcave negative lens L4, a positive meniscus lens L5 having a convex surface directed toward the object side, and a biconcave negative lens L6. Here, the biconcave negative lens L4 and the positive meniscus lens L5 are cemented.

The third lens unit G3 includes a biconvex positive lens L7, a positive meniscus lens L8 having a convex surface directed toward the object side, a negative meniscus lens L9 having a convex surface directed toward the object side, and a positive meniscus lens L10 having a convex surface directed toward the object side. Here, the negative meniscus lens L9 and the positive meniscus lens L10 are cemented.

The fourth lens unit G4 includes a biconvex positive lens L11 and a negative meniscus lens L12 having a convex surface directed toward an image side. Here, the biconvex positive lens L11 and the negative meniscus lens L12 are cemented.

The fifth lens unit G5 includes a biconcave negative lens L13.

The sixth lens unit G6 includes a positive meniscus lens L14 having a convex surface directed toward the image side, a biconcave negative lens L15, a biconcave negative lens L16, a biconvex positive lens L17, a positive meniscus lens L18 having a convex surface directed toward the object side, a negative meniscus lens L19 having a convex surface directed toward the object side, a biconvex positive lens L20, and a biconcave negative lens L21.

Here, the positive meniscus lens L14 and the biconcave negative lens L15 are cemented. The positive meniscus lens L18 and the negative meniscus lens L19 are cemented. The biconvex positive lens L20 and the biconcave negative lens L21 are cemented.

At a time of zooming from a wide angle end to a telephoto end, the first lens unit G1, the fourth lens unit G4, and the sixth lens unit G6 are fixed. The second lens unit G2 moves toward the image side. The third lens unit G3 and the fifth lens unit G5 moves toward the object side. The aperture stop S is fixed together with the fourth lens unit G4.

At a time of focusing from a far point to a near point, the fifth lens unit G5 moves toward the image side. At a time of correcting image blur, the positive meniscus lens L14, the biconcave negative lens L15, and the biconcave negative lens L16 move in a direction perpendicular to an optical axis.

An example 32 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a positive refractive power, a fifth lens unit G5 having a negative refractive power, and a sixth lens unit G6 having a positive refractive power. An aperture stop S is disposed between the third lens unit G3 and the fourth lens unit G4.

A front-side lens unit includes the first lens unit G1 and the second lens unit G2. The first lens unit G1 is a first front unit and the second lens unit G2 is a second front unit. An intermediate lens unit includes the third lens unit G3, the fourth lens unit G4, and the fifth lens unit G5. A first intermediate unit includes the third lens unit G3 and the fourth lens unit G4. The third lens unit G3 is a first sub unit and the fourth lens unit G4 is a second sub unit. The fifth lens unit G5 is a second intermediate unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a biconvex positive lens L7, a positive meniscus lens L8 having a convex surface directed toward the object side, a negative meniscus lens L9 having a convex surface directed toward the object side, and a positive meniscus lens L10 having a convex surface directed toward the object side. Here, the negative meniscus lens L9 and the positive meniscus lens L10 are cemented.

The fourth lens unit G4 includes a biconvex positive lens L11 and a negative meniscus lens L12 having a convex surface directed toward an image side. Here, the biconvex positive lens L11 and the negative meniscus lens L12 are cemented.

The fifth lens unit G5 includes a biconcave negative lens L13.

The sixth lens unit G6 includes a positive meniscus lens L14 having a convex surface directed toward the image side, a biconcave negative lens L15, a biconcave negative lens L16, a biconvex positive lens L17, a biconvex positive lens L18, a negative meniscus lens L19 having a convex surface directed toward the image side, a biconvex positive lens L20, and a biconcave negative lens L21.

Here, the positive meniscus lens L14 and the biconcave negative lens L15 are cemented. The biconvex positive lens L18 and the negative meniscus lens L19 are cemented. The biconvex positive lens L20 and the biconcave negative lens L21 are cemented.

At a time of zooming from a wide angle end to a telephoto end, the first lens unit G1 and the sixth lens unit G6 are fixed. The second lens unit G2 moves toward the image side. The third lens unit G3, the fourth lens unit G4, and the fifth lens unit G5 move toward the object side. The aperture stop S moves together with the fourth lens unit G4.

At a time of focusing from a far point to a near point, the fifth lens unit G5 moves toward the image side. At a time of correcting image blur, the positive meniscus lens L14, the biconcave negative lens L15, and the biconcave negative lens L16 move in a direction perpendicular to an optical axis.

An example 33 is an example of an image pickup optical system. In the image pickup optical system of the example 33, a teleconverter lens is inserted in the zoom optical system of the example 32. Description of arrangement same as that of the zoom optical system of the example 32 is omitted.

The teleconverter lens includes a positive meniscus lens L20 having a convex surface directed toward an object side, a positive meniscus lens L21 having a convex surface directed toward the object side, a negative meniscus lens L22 having a convex surface directed toward the object side, a negative meniscus lens L23 having a convex surface directed toward the object side, a biconvex positive lens L24, a biconcave negative lens L25, and a positive meniscus lens L26 having a convex surface directed toward the object side.

Here, the positive meniscus lens L21 and the negative meniscus lens L22 are cemented. The negative meniscus lens L23, the biconvex positive lens L24, and the biconcave negative lens L25 are cemented.

A biconvex positive lens L27 corresponds to the biconvex positive lens L20 in the zoom optical system of the example 32. A biconcave negative lens L28 corresponds to the biconcave negative lens L21 in the zoom optical system of the example 32.

In the zoom optical system of the example 32, the predetermined space is formed between the negative meniscus lens L19 and the biconvex positive lens L20. In the image pickup optical system of the example 33, the teleconverter lens is inserted between negative meniscus lens L19 and the biconvex positive lens L27.

An example 34 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a positive refractive power, a fifth lens unit G5 having a negative refractive power, and a sixth lens unit G6 having a positive refractive power. An aperture stop S is disposed between the third lens unit G3 and the fourth lens unit G4.

A front-side lens unit includes the first lens unit G1 and the second lens unit G2. The first lens unit G1 is a first front unit and the second lens unit G2 is a second front unit. An intermediate lens unit includes the third lens unit G3, the fourth lens unit G4, and the fifth lens unit G5. A first intermediate unit includes the third lens unit G3 and the fourth lens unit G4. The third lens unit G3 is a first sub unit and the fourth lens unit G4 is a second sub unit. The fifth sub unit G5 is a second intermediate unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a biconvex positive lens L7, a positive meniscus lens L8 having a convex surface directed toward the object side, a negative meniscus lens L9 having a convex surface directed toward the object side, and a positive meniscus lens L10 having a convex surface directed toward the object side. Here, the negative meniscus lens L9 and the positive meniscus lens L10 are cemented.

The fourth lens unit G4 includes a biconvex positive lens L11 and a negative meniscus lens L12 having a convex surface directed toward an image side. Here, the biconvex positive lens L11 and the negative meniscus lens L12 are cemented.

The fifth lens unit G5 includes a biconcave negative lens L13.

The sixth lens unit G6 includes a positive meniscus lens L14 having a convex surface directed toward the object side, a positive meniscus lens L15 having a convex surface directed toward the image side, a biconcave negative lens L16, a biconcave negative lens L17, a biconvex positive lens L18, a biconvex positive lens L19, a negative meniscus lens L20 having a convex surface directed toward the image side, a biconvex positive lens L21, and a biconcave negative lens L22.

Here, the positive meniscus lens L15 and the biconcave negative lens L16 are cemented. The biconvex positive lens L19 and the negative meniscus lens L20 are cemented. The biconvex positive lens L21 and the biconcave negative lens L22 are cemented.

At a time of zooming from a wide angle end to a telephoto end, the first lens unit G1 and the sixth lens unit G6 are fixed. The second lens unit G2 moves toward the image side. The third lens unit G3, the fourth lens unit G4, and the fifth lens unit G5 move toward the object side. The aperture stop S moves together with the fourth lens unit G4.

At a time of focusing from a far point to a near point, the fifth lens unit G5 moves toward the image side. At a time of correcting image blur, the positive meniscus lens L15, the biconcave negative lens L16, and the biconcave negative lens L17 move in a direction perpendicular to an optical axis.

An example 35 is an example of an image pickup optical system. In the image pickup optical system of the example 35, a teleconverter lens is inserted in the zoom optical system of the example 34. Description of arrangement same as that of the zoom optical system of the example 34 is omitted.

The teleconverter lens includes a positive meniscus lens L21 having a convex surface directed toward the object side, a biconvex positive lens L22, a biconcave negative lens L23, a negative meniscus lens L24 having a convex surface directed toward the object side, a biconvex positive lens L25, a biconcave negative lens L26, and a biconvex positive lens L27.

Here, the biconvex positive lens L22 and the biconcave negative lens L23 are cemented. The negative meniscus lens L24, the biconvex positive lens L25, and the biconcave negative lens L26 are cemented.

A biconvex positive lens L28 corresponds to the biconvex positive lens L21 in the zoom optical system of the example 34. A biconcave negative lens L29 corresponds to the biconcave negative lens L22 in the zoom optical system of the example 34.

In the zoom optical system of the example 34, the predetermined space is formed between the negative meniscus lens L20 and the biconvex positive lens L21. In the image pickup optical system of the example 35, the teleconverter lens is inserted between the negative meniscus lens L20 and the biconvex positive lens L28.

An example 36 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a positive refractive power, a fifth lens unit G5 having a negative refractive power, and a sixth lens unit G6 having a positive refractive power. An aperture stop S is disposed between the third lens unit G3 and the fourth lens unit G4.

A front-side lens unit includes the first lens unit G1 and the second lens unit G2. The first lens unit G1 is a first front unit and the second lens unit G2 is a second front unit. An intermediate lens unit includes the third lens unit G3, the fourth lens unit G4, and the fifth lens unit G5. A first intermediate unit includes the third lens unit G3 and the fourth lens unit G4. The third lens unit G3 is a first sub unit and the fourth lens unit G4 is a second sub unit. The fifth lens unit G5 is a second intermediate unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a biconvex positive lens L7, a biconvex positive lens L8, a biconcave negative lens L9, a negative meniscus lens L10 having a convex surface directed toward the object side, and a positive meniscus lens L11 having a convex surface directed toward the object side.

Here, the biconvex positive lens L8 and the biconcave negative lens L9 are cemented. The negative meniscus lens L10 and the positive meniscus lens L11 are cemented.

The fourth lens unit G4 includes a biconvex positive lens L12.

The fifth lens unit G5 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The sixth lens unit G6 includes a negative meniscus lens L15 having a convex surface directed toward the object side, a biconvex positive lens L16, a positive meniscus lens L17 having a convex surface directed toward an image side, a biconcave negative lens L18, a biconcave negative lens L19, a biconvex positive lens L20, a biconvex positive lens L21, and a negative meniscus lens L22 having a convex surface directed toward the image side.

Here, the positive meniscus lens L17 and the biconcave negative lens L18 are cemented. The biconvex positive lens L21 and the negative meniscus lens L22 are cemented.

At a time of zooming from a wide angle end to a telephoto end, the first lens unit G1 and the fifth lens unit G5 move toward the object side. The second lens unit G2 moves toward the image side. The third lens unit G3, after moving toward the image side, moves toward the object side. The fourth lens unit G4 and the sixth lens unit G6 are fixed. The aperture stop S moves together with the third lens unit G3.

At a time of focusing from a far point to a near point, the fifth lens unit G5 moves toward the image side. At a time of correcting image blur, the positive meniscus lens L17, the biconcave negative lens L18, and the biconcave negative lens L19 move in a direction perpendicular to an optical axis.

An aspheric surface is provided to a total of two surfaces which are, both surfaces of the biconvex positive lens L12.

An example 37 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a positive refractive power, a fifth lens unit G5 having a negative refractive power, and a sixth lens unit G6 having a positive refractive power. An aperture stop S is disposed between the third lens unit G3 and the fourth lens unit G4.

A front-side lens unit includes the first lens unit G1 and the second lens unit G2. The first lens unit G1 is a first front unit and the second lens unit G2 is a second front unit. An intermediate lens unit includes the third lens unit G3, the fourth lens unit G4, and the fifth lens unit G5. A first intermediate unit includes the third lens unit G3 and the fourth lens unit G4. The third lens unit G3 is a first sub unit and the fourth lens unit G4 is a second sub unit. The fifth lens unit G5 is a second intermediate unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a positive meniscus lens L7 having a convex surface directed toward the object side, a biconvex positive lens L8, a biconcave negative lens L9, a negative meniscus lens L10 having a convex surface directed toward the object side, and a positive meniscus lens L11 having a convex surface directed toward the object side.

Here, the biconvex positive lens L8 and the biconcave negative lens L9 are cemented. The negative meniscus lens L10 and the positive meniscus lens L11 are cemented.

The fourth lens unit G4 includes a biconvex positive lens L12.

The fifth lens unit G5 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The sixth lens unit G6 includes a negative meniscus lens L15 having a convex surface directed toward the object side, a biconvex positive lens L16, a biconvex positive lens L17, a biconcave negative lens L18, a biconcave negative lens L19, a positive meniscus lens L20 having a convex surface directed toward the object side, a biconvex positive lens L21, and a biconcave negative lens L22.

Here, the biconvex positive lens L17 and the biconcave negative lens L18 are cemented. The biconvex positive lens L21 and the biconcave negative lens L22 are cemented.

At a time of zooming from a wide angle end to a telephoto end, the first lens unit G1 and the second lens unit G2 move toward the image side. The third lens unit G3, after moving toward the object side, moves toward the image side. The fourth lens unit G4 and the sixth lens unit G6 are fixed. The fifth lens unit G5, after moving toward the image side, moves toward the object side. The aperture stop S moves together with the third lens unit G3.

At a time of focusing from a far point to a near point, the fifth lens unit G5 moves toward the image side. At a time of correcting image blur, the biconvex positive lens L17, the biconcave negative lens L18, and the biconcave negative lens L19 move in a direction perpendicular to an optical axis.

An aspheric surface is provided to a total of two surfaces which are, both surfaces of the biconvex positive lens L12.

An example 38 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a positive refractive power, a fifth lens unit G5 having a negative refractive power, a sixth lens unit G6 having a negative refractive power, and a seventh lens unit G7 having a positive refractive power. An aperture stop S is disposed between the third lens unit G3 and the fourth lens unit G4.

A front-side lens unit includes the first lens unit G1 and the second lens unit G2. The first lens unit G1 is a first front unit and the second lens unit G2 is a second front unit. An intermediate lens unit includes the third lens unit G3, the fourth lens unit G4, and the fifth lens unit G5. A first intermediate unit includes the third lens unit G3 and the fourth lens unit G4. The third lens unit G3 is a first sub unit and the fourth lens unit G4 is a second sub unit. The fifth lens unit G5 is a second intermediate unit. The sixth lens unit G6 is a movable lens unit. The seventh lens unit G7 is a rear-side lens unit.

The first lens unit G1 includes a positive meniscus lens L1 having a convex surface directed toward the object side, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a biconcave negative lens L4, a positive meniscus lens L5 having a convex surface directed toward the object side, and a biconcave negative lens L6. Here, the biconcave negative lens L4 and the positive meniscus lens L5 are cemented.

The third lens unit G3 includes a biconvex positive lens L7, a biconvex positive lens L8, and a negative meniscus lens L9 having a convex surface directed toward an image side. Here, the biconvex positive lens L8 and the negative meniscus lens L9 are cemented.

The fourth lens unit G4 includes a negative meniscus lens L10 having a convex surface directed toward the object side, a biconvex positive lens L11, a negative meniscus lens L12 having a convex surface directed toward the image side, and a positive meniscus lens L13 having a convex surface directed toward the object side. Here, the negative meniscus lens L10, the biconvex positive lens L11, and the negative meniscus lens L12 are cemented.

The fifth lens unit G5 includes a negative meniscus lens L14 having a convex surface directed toward the object side and a positive meniscus lens L15 having a convex surface directed toward the object side. Here, the negative meniscus lens L14 and the positive meniscus lens L15 are cemented.

The sixth lens unit G6 includes a positive meniscus lens L16 having a convex surface directed toward the object side and a negative meniscus lens L17 having a convex surface directed toward the object side. Here, the positive meniscus lens L16 and the negative meniscus lens L17 are cemented.

The seventh lens unit G7 includes a biconvex positive lens L18, a biconvex positive lens L19, a biconcave negative lens L20, a negative meniscus lens L21 having a convex surface directed toward the image side, a biconvex positive lens L22, a positive meniscus lens L23 having a convex surface directed toward the image side, and a negative meniscus lens L24 having a convex surface directed toward the image side.

Here, the biconvex positive lens L19 and the biconcave negative lens L20 are cemented. The positive meniscus lens L23 and the negative meniscus lens L24 are cemented.

At a time of zooming from a wide angle end to a telephoto end, the first lens unit G1, the fourth lens unit G4, and the seventh lens unit G7 are fixed. The second lens unit G2 moves toward the image side. The third lens unit G3 and the fifth lens unit G5 moves toward the object side. The sixth lens unit G6, after moving toward the object side, moves toward the image side. The aperture stop S is fixed together with the fourth lens unit G4.

At a time of focusing from a far point to a near point, both the fifth lens unit G5 and the sixth lens unit G6 move toward the image side. At a time correcting image blur, the biconvex positive lens L19, the biconcave negative lens L20, and the negative meniscus lens L21 move in a direction perpendicular to an optical axis.

An example 39 is an example of a zoom optical system. The zoom optical system includes in order from an object side, a first lens unit G1 having a positive refractive power, a second lens unit G2 having a negative refractive power, a third lens unit G3 having a positive refractive power, a fourth lens unit G4 having a positive refractive power, a fifth lens unit G5 having a negative refractive power, and a sixth lens unit G6 having a positive refractive power. An aperture stop S is disposed between the third lens unit G3 and the fourth lens unit G4.

A front-side lens unit includes the first lens unit G1 and the second lens unit G2. The first lens unit G1 is a first front unit and the second lens unit G2 is a second front unit. An intermediate lens unit includes the third lens unit G3, the fourth lens unit G4, and the fifth lens unit G5. A first intermediate unit includes the third lens unit G3 and the fourth lens unit G4. The third lens unit G3 is a first sub unit and the fourth lens unit G4 is a second sub unit. The fifth lens unit G5 is a second intermediate unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a positive meniscus lens L7 having a convex surface directed toward the object side, a biconvex positive lens L8, a biconcave negative lens L9, a negative meniscus lens L10 having a convex surface directed toward the object side, and a positive meniscus lens L11 having a convex surface directed toward the object side.

Here, the biconvex positive lens L8 and the biconcave negative lens L9 are cemented. The negative meniscus lens L10 and the positive meniscus lens L11 are cemented.

The fourth lens unit G4 includes a biconvex positive lens L12.

The fifth lens unit G5 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The sixth lens unit G6 includes a negative meniscus lens L15 having a convex surface directed toward the object side, a biconvex positive lens L16, a biconvex positive lens L17, a biconcave negative lens L18, a biconcave negative lens L19, a positive meniscus lens L20 having a convex surface directed toward the object side, a biconvex positive lens L21, and a biconcave negative lens L22.

Here, the biconvex positive lens L17 and the biconcave negative lens L18 are cemented. The biconvex positive lens L21 and the biconcave negative lens L22 are cemented.

At a time of zooming from a wide angle end to a telephoto end, the first lens unit G1, the fourth lens unit G4, and the sixth lens unit G6 are fixed. The second lens unit G2 moves toward an image side. The third lens unit G3 moves toward an object side. The fifth lens unit G5, after moving toward the image side, moves toward the object side. The aperture stop S moves together with the third lens unit G3.

At a time of focusing from a far point to a near point, the fifth lens unit G5 moves toward the image side. At a time of correcting image blur, the biconvex positive lens L17, the biconcave negative lens L18, and the biconcave negative lens L19 move in a direction perpendicular to an optical axis.

An aspheric surface is provided to a total of two surfaces which are, both surfaces of the biconvex positive lens L12.

An example 40 is an example of an image pickup optical system. In the image pickup optical system of the example 40, a teleconverter lens is inserted in the zoom optical system of the example 39. Description of arrangement same as that of the zoom optical system of the example 39 is omitted.

The teleconverter lens includes a biconvex positive lens L21, a negative meniscus lens L22 having a convex surface directed toward an object side, a biconcave negative lens L23, a biconvex positive lens L24, a biconcave negative lens L25, and a biconvex positive lens L26. Here, the biconcave negative lens L23, the biconvex positive lens L24, and the biconcave negative lens L25 are cemented.

Here, a biconvex positive lens L27 corresponds to the biconvex positive lens L21 in the zoom optical system of the example 39. A biconcave negative lens L28 corresponds to the biconcave negative lens L22 in the zoom optical system of the example 39.

In the zoom optical system of the example 39, the predetermined space is formed between the positive meniscus lens L20 and the biconvex positive lens L21. In the image pickup optical system of the example 40, the teleconverter lens is inserted between the positive meniscus lens L20 and the biconvex positive lens L27.

An example 41 is an example of a master optical system. The master optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a positive meniscus lens L7 having a convex surface directed toward the object side, a biconvex positive lens L8, a biconcave negative lens L9, a negative meniscus lens L10 having a convex surface directed toward the object side, a positive meniscus lens L11 having a convex surfaced directed toward the object side, and a biconvex positive lens L12.

Here, the biconvex positive lens L8 and the biconcave negative lens L9 are cemented. The negative meniscus lens L10 and the positive meniscus lens L11 are cemented.

The fourth lens unit G4 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The fifth lens unit G5 includes a negative meniscus lens L15 having a convex surface directed toward the object side.

The sixth lens unit G6 includes a biconvex positive lens L16, a biconvex positive lens L17, a biconcave negative lens L18, a biconcave negative lens L19, a positive meniscus lens L20 having a convex surface directed toward the object side, a biconvex positive lens L21, and a biconcave negative lens L22.

Here, the biconvex positive lens L17 and the biconcave negative lens L18 are cemented. The biconvex positive lens L21 and the biconcave negative lens L22 are cemented.

At a time of zooming from a wide angle end to a telephoto end, the first lens unit G1, the third lens unit G3, and the sixth lens unit G6 are fixed. The second lens unit G2 moves toward an image side. The fourth lens unit G4, after moving toward the image side, moves toward the object side. The fifth lens unit G5 moves toward the object side. The aperture stop S is fixed together with the third lens unit G3.

At a time of focusing from a far point to a near point, the fourth lens unit G4 moves toward the image side. At a time of correcting image blur, the biconvex positive lens L17, the biconcave negative lens L18, and the biconcave negative lens L19 move in a direction perpendicular to an optical axis.

An aspheric surface is provided to a total of two surfaces which are, both surfaces of the biconvex positive lens L12.

An example 42 is an example of an image pickup optical system. In the image pickup optical system of the example 42, a teleconverter lens is inserted in the master optical system of the example 41. Description of arrangement same as that of the master optical system of the example 41 is omitted.

The teleconverter lens includes a biconvex positive lens L21, a negative meniscus lens L22 having a convex surface directed toward the object side, a biconcave negative lens L23, a biconvex positive lens L24, a biconcave negative lens L25, and a biconvex positive lens L26. Here, the biconcave negative lens L23, the biconvex positive lens L24, and the biconcave negative lens L25 are cemented.

A biconvex positive lens L27 corresponds to the biconvex positive lens L21 in the master optical system of the example 41. A biconcave negative lens L28 corresponds to the biconcave negative lens L22 in the master optical system of the example 41.

In the master optical system of the example 41, the predetermined space is formed between the positive meniscus lens L20 and the biconvex positive lens L21. In the image pickup optical system of the example 42, the teleconverter lens is inserted between the positive meniscus lens L20 and the biconvex positive lens L27.

An example 43 is an example of a master optical system. The master optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed between the second lens unit G2 and the third lens unit G3.

A front-side lens unit includes the first les unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a positive meniscus lens L1 having a convex surface directed toward the object side, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a positive meniscus lens L4 having a convex surface directed toward an image side, a biconcave negative lens L5, a positive meniscus lens L6 having a convex surface directed toward the object side, and a biconcave negative lens L7. Here, the positive meniscus lens L4, the biconcave negative lens L5, and the positive meniscus lens L6 are cemented.

The third lens unit G3 includes a biconvex positive lens L8, a biconcave negative lens L9, a biconvex positive lens L10, and a biconvex positive lens L11. Here, the biconcave negative lens L9 and the biconvex positive lens L10 are cemented.

The fourth lens unit G4 includes a negative meniscus lens L12 having a convex surface directed toward the object side and a positive meniscus lens L13 having a convex surface directed toward the object side. Here, the negative meniscus lens L12 and the positive meniscus lens L13 are cemented.

The fifth lens unit G5 includes a negative meniscus lens L14 having a convex surface directed toward the object side.

The sixth lens unit G6 includes a positive meniscus lens L15 having a convex surface directed toward the image side, a biconvex positive lens L16, a biconcave negative lens L17, a biconcave negative lens L18, a positive meniscus lens L19 having a convex surface directed toward the object side, a biconvex positive lens L20, and a biconcave negative lens L21.

Here, the biconvex positive lens L16 and the biconcave negative lens L17 are cemented. The biconvex positive lens L20 and the biconcave negative lens L21 are cemented.

At a time of zooming from a wide angle end to a telephoto end, the first lens unit G1, the third lens unit G3, and the sixth lens unit G6 are fixed. The second lens unit G2 moves toward the image side. The fourth lens unit G4, after moving toward the image side, moves toward the object side. The fifth lens unit G5, after moving toward the object side, moves toward the image side. The aperture stop S is fixed together with the third lens unit G3.

At a time of focusing from a far point to a near point, both the fourth lens unit G4 and the fifth lens unit G5 move toward the image side. At a time of correcting image blur, the biconvex positive lens L16, the biconcave negative lens L17, and the biconcave negative lens L18 move in a direction perpendicular to an optical axis.

An aspheric surface is provided to a total of two surfaces which are, both surfaces of the biconvex positive lens L8.

An example 44 is an example of an image pickup optical system. In the image pickup optical system of the example 44, a teleconverter lens is inserted in the master optical system of the example 43. Description of arrangement same as that of the master optical system of the example 43 is omitted.

The teleconverter lens includes a positive meniscus lens L20 having a convex surface directed toward the object side, a biconvex positive lens L21, a biconcave negative lens L22, a biconcave negative lens L23, a biconvex positive lens L24, a biconcave negative lens L25, and a biconvex positive lens L26.

Here, the biconvex positive lens L21 and the biconcave negative lens 22 are cemented. The biconcave negative lens L23, the biconvex positive lens L24, and the biconcave negative lens L25 are cemented.

A biconvex positive lens L27 corresponds to the biconvex positive lens L20 in the master optical system of the example 43. A biconcave negative lens L28 corresponds to the biconcave negative lens L21 in the master optical system of the example 43.

In the master optical system of the example 43, the predetermined space is formed between the positive meniscus lens L19 and the biconvex positive lens L20. In the image pickup optical system of the example 44, the teleconverter lens is inserted between the positive meniscus lens L19 and the biconvex positive lens L27.

An example 45 is an example of a master optical system. The master optical system includes in order from an object side, a first lens unit G1 having a positive refractive power, a second lens unit G2 having a negative refractive power, a third lens unit G3 having a positive refractive power, a fourth lens unit G4 having a positive refractive power, a fifth lens unit G5 having a negative refractive power, and a sixth lens unit G6 having a positive refractive power. An aperture stop S is disposed between the third lens unit G3 and the fourth lens unit G4.

A front-side lens unit includes the first lens unit G1 and the second lens unit G2. The first lens unit G1 is a first front unit and the second lens unit G2 is a second front unit. An intermediate lens unit includes the third lens unit G3, the fourth lens unit G4, and the fifth lens unit G5. A first intermediate unit includes the third lens unit G3 and the fourth lens unit G4. The third lens unit G3 is a first sub unit and the fourth lens unit G4 is a second sub unit. The fifth lens unit G5 is a second intermediate unit. The sixth lens unit G6 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a biconvex positive lens L7, a positive meniscus lens L8 having a convex surface directed toward the object side, a negative meniscus lens L9 having a convex surface directed toward the object side, and a positive meniscus lens L10 having a convex surface directed toward the object side. Here, the negative meniscus lens L9 and the positive meniscus lens L10 are cemented.

The fourth lens unit G4 includes a biconvex positive lens L11 and a negative meniscus lens L12 having a convex surface directed toward an image side. Here, the biconvex positive lens L11 and the negative meniscus lens L12 are cemented.

The fifth lens unit G5 includes a biconcave negative lens L13.

The sixth lens unit G6 includes a positive meniscus lens L14 having a convex surface directed toward the image side, a biconcave negative lens L15, a biconcave negative lens L16, a biconvex positive lens L17, a biconvex positive lens L18, a negative meniscus lens L19 having a convex surface directed toward the image side, a biconvex positive lens L20, and a biconcave negative lens L21.

Here, the positive meniscus lens L14 and the biconcave negative lens L15 are cemented. The biconvex positive lens L18 and the negative meniscus lens L19 are cemented. The biconvex positive lens L20 and the biconcave negative lens L21 are cemented.

At a time of zooming from a wide angle end to a telephoto end, the first lens unit G1 and the sixth lens unit G6 are fixed. The second lens unit G2 moves toward the image side. The third lens unit G3, the fourth lens unit G4, and the fifth lens unit G5 move toward the object side. The aperture stop S moves together with the fourth lens unit G4.

At a time of focusing from a far point to a near point, the fifth lens unit G5 moves toward the image side. At a time of correcting image blur, the positive meniscus lens L14, the biconcave negative lens L15, and the biconcave negative lens L16 move in a direction perpendicular to an optical axis.

An example 46 is an example of an image pickup optical system. In the image pickup optical system of the example 46, a teleconverter lens is inserted in the master optical system of the example 45. Description of arrangement same as that of the master optical system of the example 45 is omitted.

The teleconverter lens includes a positive meniscus lens L20 having a convex surface directed toward an object side, a positive meniscus lens L21 having a convex surface directed toward the object side, a negative meniscus lens L22 having a convex surface directed toward the object side, a negative meniscus lens L23 having a convex surface directed toward the object side, a biconvex positive lens L24, a biconcave negative lens L25, and a positive meniscus lens L26 having a convex surface directed toward the object side.

Here, the positive meniscus lens L21 and the negative meniscus lens L22 are cemented. The negative meniscus lens L23, the biconvex positive lens L24, and the biconcave negative lens L25 are cemented.

A biconvex positive lens L27 corresponds to the biconvex positive lens L20 in the master optical system of the example 45. A biconcave negative lens L28 corresponds to the biconcave negative lens L21 in the master optical system of the example 45.

In the master optical system of the example 45, the predetermined space is formed between the negative meniscus lens L19 and the biconvex positive lens L20. In the image pickup optical system of the example 46, the teleconverter lens is inserted between negative meniscus lens L19 and the biconvex positive lens L27.

An example 47 is an example of a master optical system. The master optical system includes in order from an object side, a first lens unit G1 having a positive refractive power, a second lens unit G2 having a negative refractive power, a third lens unit G3 having a negative refractive power, a fourth lens unit G4 having a positive refractive power, a fifth lens unit G5 having a negative refractive power, a sixth lens unit G6 having a negative refractive power, and a seventh lens unit G7 having a positive refractive power. An aperture stop S is disposed between the fourth lens unit G4 and the fifth lens unit G5.

A front-side lens unit includes the first lens unit G1, the second lens unit G2, and the third lens unit G3. The first lens unit G1 is a first front unit, and the second lens unit G2 and the third lens unit G3 area second front unit. The second lens unit G2 is a third sub unit and the third lens unit G3 is a fourth sub unit. An intermediate lens unit includes the fourth lens unit G4 and the fifth lens unit G5. The fourth lens unit G4 is a first intermediate unit and the fifth lens unit G5 is a second intermediate unit. The sixth lens unit G6 is a movable lens unit. The seventh lens unit G7 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side and a positive meniscus lens L5 having a convex surface directed toward the object side. Here, the negative meniscus lens L4 and the positive meniscus lens L5 are cemented.

The third lens unit G3 includes a biconcave negative lens L6 and a positive meniscus lens L7 having a convex surface directed toward the object side. Here, the biconcave negative lens L6 and the positive meniscus lens L7 are cemented.

The fourth lens unit G4 includes a biconvex positive lens L8, a biconvex positive lens L9, a biconcave negative lens L10, a negative meniscus lens L11 having a convex surface directed toward an image side, a positive meniscus lens L12 having a convex surface directed toward the object side, a biconvex positive lens L13, a biconcave negative lens L14, a negative meniscus lens L15 having a convex surface directed toward the image side, and a biconvex positive lens L16.

Here, the biconvex positive lens L9 and the biconcave negative lens L10 are cemented. The negative meniscus lens L11 and the positive meniscus lens L12 are cemented. The biconvex positive lens L13 and the biconcave negative lens L14 are cemented.

The fifth lens unit G5 includes a negative meniscus lens L17 having a convex surface directed toward the object side and a positive meniscus lens L18 having a convex surface directed toward the object side. Here, the negative meniscus lens L17 and the positive meniscus lens L18 are cemented.

The sixth lens unit G6 includes a positive meniscus lens L19 having a convex surface directed toward the image side and a biconcave negative lens L20. Here, the positive meniscus lens L19 and the biconcave negative lens L20 are cemented.

The seventh lens unit G7 includes a biconvex positive lens L21, a positive meniscus lens L22 having a convex surface directed toward the image side, and a negative meniscus lens L23 having a convex surface directed toward the image side. Here, the positive meniscus lens L22 and the negative meniscus lens L23 are cemented.

At a time of zooming from a wide angle end to a telephoto end, the first lens unit G1, the fourth lens unit G4, and the seventh lens unit G7 are fixed. The second lens unit G2 and the third lens unit G3 are move toward the image side. The fifth lens unit G5, after moving toward the image side, moves toward the object side. The sixth lens unit G6, after moving toward the object side, moves toward the image side. The aperture stop S is fixed together with the fourth lens unit G4.

At a time of focusing from a far point to a near point, the fifth lens unit G5 moves toward the image side. At a time of correcting image blur, the biconvex positive lens L13, the biconcave negative lens L14, and the negative meniscus lens L15 move in a direction perpendicular to an optical axis.

An aspheric surface is provided to a total of two surfaces which are, both surfaces of the biconvex positive lens L16.

An example 48 is an example of an image pickup optical system. In the image pickup optical system of the example 48, a teleconverter lens is inserted in the master optical system of the example 47. Description of arrangement same as that of the master optical system of the example 47 is omitted.

The teleconverter lens includes a biconvex positive lens L22, a negative meniscus lens L23 having a convex surface directed toward the object side, a biconcave negative lens L24, a biconvex positive lens L25, a biconcave negative lens L26, and a positive meniscus lens L27 having a convex surface directed toward the object side. Here, the biconcave negative lens L24, the biconvex positive lens L25, and the biconcave negative lens L26 are cemented.

A positive meniscus lens L28 corresponds to the positive meniscus lens L22 in the master optical system of the example 47. A negative meniscus lens L29 corresponds to the negative meniscus lens L23 in the master optical system of the example 47.

In the master optical system of the example 47, the predetermined space is formed between the biconvex positive lens L21 and the positive meniscus lens L22. In the image pickup optical system of the example 48, the teleconverter lens is inserted between the biconvex positive lens L21 and the positive meniscus lens L28.

An example 49 is an example of a master optical system. The master optical system includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth unit G4 is a second intermediate unit. The fifth lens unit G5 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a positive meniscus lens L7 having a convex surface directed toward the object side, a biconvex positive lens L8, a biconcave negative lens L9, a negative meniscus lens L10 having a convex surface directed toward the object side, a positive meniscus lens L11 having a convex surface directed toward the object side, and a biconvex positive lens L12.

Here, the biconvex positive lens L8 and the biconcave negative lens L9 are cemented. The negative meniscus lens L10 and the positive meniscus lens L11 are cemented.

The fourth lens unit G4 includes a biconcave negative lens L13 and a positive meniscus lens L14 having a convex surface directed toward the object side. Here, the biconcave negative lens L13 and the positive meniscus lens L14 are cemented.

The fifth lens unit G5 includes a negative meniscus lens L15 having a convex surface directed toward the object side, a biconvex positive lens L16, a biconvex positive lens L17, a biconcave negative lens L18, a biconcave negative lens L19, a biconvex positive lens L20, a biconvex positive lens L21, and a biconcave negative lens L22.

Here, the biconvex positive lens L17 and the biconcave negative lens L18 are cemented. The biconvex positive lens L21 and the biconcave negative lens L22 are cemented.

At a time of zooming from a wide angle end to a telephoto end, the first lens unit G1 and the fifth lens unit G5 are fixed. The second lens unit G2 moves toward an image side. The third lens unit G3 and the fourth lens unit G4 move toward the object side. The aperture stop S moves together with the third lens unit G3.

At a time of focusing from a far point to a near point, the fourth lens unit G4 moves toward the image side. At a time of correcting image blur, the biconvex positive lens L17, the biconcave negative lens L18, and the biconcave negative lens L19 move in a direction perpendicular to an optical axis.

An aspheric surface is provided to a total of two surfaces which are, both surfaces of the biconvex positive lens L12.

An example 50 is an example of an image pickup optical system. In the image pickup optical system of the example 50, a teleconverter lens is inserted in the master optical system of the example 49. Description of arrangement same as that of the master optical system of the example 49 is omitted.

The teleconverter lens includes a biconvex positive lens L21, a negative meniscus lens L22 having a convex surface directed toward an object side, a biconcave negative lens L23, a biconvex positive lens L24, a biconcave negative lens L25, and a biconvex positive lens L26. Here, the biconcave negative lens L23, the biconvex positive lens L24, and the biconcave negative lens L25 are cemented.

A biconvex positive lens L27 corresponds to the biconvex positive lens L21 in the master optical system of the example 49. A biconcave negative lens L28 corresponds to the biconcave negative lens L22 in the master optical system of the example 49.

In the master optical system of the example 49, the predetermined space is formed between the biconvex positive lens L20 and the biconvex positive lens L21. In the image pickup optical system of the example 50, the teleconverter lens is inserted between the biconvex positive lens L20 and the biconvex positive lens L27.

An example 51 is an example of a master optical system. The master optical system includes in order from an object side, a first lens unit G1 having a positive refractive power, a second lens unit G2 having a negative refractive power, a third lens unit G3 having a positive refractive power, and a fourth lens unit G4 having a positive refractive power. An aperture stop S is disposed in the fourth lens unit G4.

The first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented.

The second lens unit G2 includes a biconvex positive lens L4, a negative meniscus lens L5 having a convex surface directed toward an image side, a biconcave negative lens L6, a positive meniscus lens L7 having a convex surface directed toward the object side, a negative meniscus lens L8 having a convex surface directed toward the object side, and a biconcave negative lens L9. Here, the biconvex positive lens L4 and the negative meniscus lens L5 are cemented. The biconcave negative lens L6 and the positive meniscus lens L7 are cemented.

The third lens unit G3 includes a biconvex positive lens L10, a negative meniscus lens L11 having a convex surface directed toward the object side, and a biconvex positive lens L12. Here, the negative meniscus lens L11 and the biconvex positive lens L12 are cemented.

The fourth lens unit G4 includes a positive meniscus lens L13 having a convex surface directed toward the object side, a positive meniscus lens L14 having a convex surface directed toward the object side, a negative meniscus lens L15 having a convex surface directed toward the object side, a biconcave negative lens L16, a positive meniscus lens L17 having a convex surface directed toward the image side, a biconvex positive lens L18, a biconcave negative lens L19, a biconvex positive lens L20, and a negative meniscus lens L21 having a convex surface directed toward the image side.

Here, the positive meniscus lens L14 and the negative meniscus lens L15 are cemented. The biconvex positive lens L20 and the negative meniscus lens L21 are cemented.

At a time of zooming from a wide angle end to a telephoto end, the first lens unit G1 and the fourth lens unit G4 are fixed.

The second lens unit G2 moves toward the image side. The third lens unit G3, after moving toward the image side, moves toward the object side. The aperture stop S is fixed together with the fourth lens unit G4.

At a time of focusing from a far point to a near point, the third lens unit G3 moves toward the image side. At a time of correcting image blur, the positive meniscus lens L14, the negative meniscus lens L15, and the biconcave negative lens L16 move in a direction perpendicular to an optical axis.

An aspheric surface is provided to a total of two surfaces which are, both surfaces of the biconvex positive lens L10.

An example 52 is an example of an image pickup optical system. In the image pickup optical system of the example 52, a teleconverter lens is inserted in the master optical system of the example 51. Description of arrangement same as that of the master optical system of the example 51 is omitted.

The converter lens includes a positive meniscus lens L20 having a convex surface directed toward an object side, a biconvex positive lens L21, a biconcave negative lens L22, a biconcave negative lens L23, a biconvex positive lens L24, a biconcave negative lens L25, a biconvex positive lens L26, and a biconcave negative lens L27.

Here, the biconvex positive lens L21 and the biconcave negative lens L22 are cemented. The biconcave negative lens L23, the biconvex positive lens L24, and the biconcave negative lens L25 are cemented. The biconvex positive lens L26 and the biconcave negative lens L27 are cemented.

A biconvex positive lens L28 corresponds to the biconvex positive lens L20 in the master optical system of the example 51. A negative meniscus lens L29 corresponds to the negative meniscus lens L21 in the master optical system of the example 51.

In the master optical system of the example 51, the predetermined space is formed between the biconcave negative lens L19 and the biconvex positive lens L20. In the image pickup optical system of the example 52, the teleconverter lens is inserted between the biconcave negative lens L19 and the biconvex positive lens L28.

An example 53 is an example of a master optical system. The master optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed between the second lens unit G2 and the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a positive meniscus lens L1 having a convex surface directed toward the object side, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a positive meniscus lens L4 having a convex surface directed toward an image side, a biconcave negative lens L5, a positive meniscus lens L6 having a convex surface directed toward the object side, and a biconcave negative lens L7. Here, the positive meniscus lens L4, the biconcave negative lens L5, and the positive meniscus lens L6 are cemented.

The third lens unit G3 includes a biconvex positive lens L8, a biconcave negative lens L9, a biconvex positive lens L10, and a biconvex positive lens L11. Here, the biconcave negative lens L9 and the biconvex positive lens L10 are cemented.

The fourth lens unit G4 includes a negative meniscus lens L12 having a convex surface directed toward the object side and a positive meniscus lens L13 having a convex surface directed toward the object side. Here, the negative meniscus lens 12 and the positive meniscus lens L13 are cemented.

The fifth lens unit G5 includes a negative meniscus lens L14 having a convex surface directed toward the object side.

The sixth lens unit G6 includes a biconvex positive lens L15, a biconvex positive lens L16, a biconcave negative lens L17, a biconcave negative lens L18, a biconvex positive lens L19, a positive meniscus lens L20 having a convex surface directed toward the object side, and a negative meniscus lens L21 having a convex surface directed toward the object side.

Here, the biconvex positive lens L16 and the biconcave negative lens L17 are cemented. The positive meniscus lens L20 and the negative meniscus lens L21 are cemented.

At a time of zooming from a wide angle end to a telephoto end, the first lens unit G1, the third lens unit G3, and the sixth lens unit G6 are fixed. The second lens unit G2 moves toward the image side. The fourth lens unit G4, after moving toward the image side, moves toward the object side. The fifth lens unit G5 moves toward the object side. The aperture stop S is fixed together with the third lens unit G3.

At a time of focusing from a far point to a near point, both the fourth lens unit G4 and the fifth lens unit G5 move toward the image side. At a time of correcting image blur, the biconvex positive lens L16, the biconcave negative lens L17, and the biconcave negative lens L18 move in a direction perpendicular to an optical axis.

An aspheric surface is provided to a total of three surfaces which are, both surfaces of the biconvex positive lens L8, and an object-side surface of the negative meniscus lens L12.

An example 54 is an example of an image pickup optical system. In the image pickup optical system of the example 54, a teleconverter lens is inserted in the master optical system of the example 53. Description of arrangement same as that of the master optical system of the example 53 is omitted.

The teleconverter lens includes a positive meniscus lens L20 having a convex surface directed toward an object side, a biconvex positive lens L21, a biconcave negative lens L22, a negative meniscus lens L23 having a convex surface directed toward the object side, a biconvex positive lens L24, a biconcave negative lens L25, and a positive meniscus lens L26 having a convex surface directed toward the object side.

Here, the biconvex positive lens L21 and the biconcave negative lens L22 are cemented. The negative meniscus lens L23, the biconvex positive lens L24, and the biconcave negative lens L25 are cemented.

A positive meniscus lens L27 corresponds to the positive meniscus lens L20 in the master optical system of the example 53. A negative meniscus lens L28 corresponds to the negative meniscus lens L21 in the master optical system of the example 53.

In the master optical system of the example 53, the predetermined space is formed between the biconvex positive lens L19 and the positive meniscus lens L20. In the image pickup optical system of the example 54, the teleconverter lens is inserted between the biconvex positive lens L19 and the positive meniscus lens L27.

An example 55 is an example of a master optical system. The master optical system includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed in the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a rear-side lens unit.

The first lens unit G1 includes a biconvex positive lens L1, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a negative meniscus lens L4 having a convex surface directed toward the object side, a positive meniscus lens L5 having a convex surface directed toward the object side, and a biconcave negative lens L6. Here, the negative meniscus lens L4 and the positive meniscus lens L5 are cemented.

The third lens unit G3 includes a positive meniscus lens L7 having a convex surface directed toward the object side, a biconvex positive lens L8, an biconcave negative lens L9, a negative meniscus lens L10 having a convex surface directed toward the object side, a positive meniscus lens L11 having a convex surface directed toward the object side, and a biconvex positive lens L12.

Here, the biconvex positive lens L8 and the biconcave negative lens L9 are cemented. The negative meniscus lens L10 and the positive meniscus lens L11 are cemented.

The fourth lens unit G4 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The fifth lens unit G5 includes a biconcave negative lens L15, a biconvex positive lens L16, a positive meniscus lens L17 having a convex surface directed toward an image side, a biconcave negative lens L18, a biconcave negative lens L19, a biconvex positive lens L20, a biconvex positive lens L21, and a biconcave negative lens L22.

Here, the positive meniscus lens L17 and the biconcave negative lens L18 are cemented. The biconvex positive lens L21 and the biconcave negative lens L22 are cemented.

At a time of zooming from a wide angle end to a telephoto end, the first lens unit G1, the third lens unit G3, and the fourth lens unit G4 move toward the object side. The second lens unit G2 moves toward the image side. The fifth lens unit G5 is fixed. The aperture stop S moves together with the third lens unit G3.

At a time of focusing from a far point to a near point, the fourth lens unit G4 moves toward the image side. At a time of correcting image blur, the positive meniscus lens L17, the biconcave negative lens L18, and the biconcave negative lens L19 move in a direction perpendicular to an optical axis.

An aspheric surface is provided to a total of two surfaces which are, both surfaces of the biconvex positive lens L12.

An example 56 is an example of an image pickup optical system. In the image pickup optical system of the example 56 a teleconverter lens is inserted in the master optical system of the example 55. Description of arrangement same as that of the master optical system of the example 55 is omitted.

The converter lens includes a biconvex positive lens L21, a negative meniscus lens L22 having a convex surface directed toward the object side, a biconcave negative lens L23, a biconvex positive lens L24, a biconcave negative lens L25, and a biconvex positive lens L26. Here, the biconcave negative lens L23, the biconvex positive lens L24, and the biconcave negative lens L25 are cemented.

A biconvex positive lens L27 corresponds to the biconvex positive lens L21 in the master optical system of the example 55. A biconcave negative lens L28 corresponds to the biconcave negative lens L22 in the master optical system of the example 55.

In the master optical system of the example 55, the predetermined space is formed between the biconvex positive lens L20 and the biconvex positive lens L21. In the image pickup optical system of the example 56, the teleconverter lens is inserted between the biconvex positive lens L20 and the biconvex positive lens L27.

An example 57 is an example of a master optical system. The master optical system includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. An aperture stop S is disposed between the second lens unit G2 and the third lens unit G3.

A front-side lens unit includes the first lens unit G1 and the second lens unit G2. The first lens unit G1 is a first front unit and the second lens unit G2 is a second front unit. An intermediate lens unit includes the third lens unit G3 and the fourth lens unit G4. The third lens unit G3 is a first intermediate unit and the fourth lens unit G4 is a second intermediate unit. The fifth lens unit G5 is a movable lens unit. The sixth lens unit G6 is a rear-side lens unit.

The first lens unit G1 includes a positive meniscus lens L1 having a convex surface directed toward the object side, a negative meniscus lens L2 having a convex surface directed toward the object side, and a positive meniscus lens L3 having a convex surface directed toward the object side. Here, the negative meniscus lens L2 and the positive meniscus lens L3 are cemented.

The second lens unit G2 includes a positive meniscus lens L4 having a convex surface directed toward an image side, a biconcave negative lens L5, a positive meniscus lens L6 having a convex surface directed toward the object side, and a biconcave negative lens L7. Here, the positive meniscus lens L4, the biconcave negative lens L5, and the positive meniscus lens L6 are cemented.

The third lens unit G3 includes a biconvex positive lens L8, a biconcave negative lens L9, a biconvex positive lens L10, and a biconvex positive lens L11. Here, the biconcave negative lens L9 and the biconvex positive lens L10 are cemented.

The fourth lens unit G4 includes a negative meniscus lens L12 having a convex surface directed toward the object side and a positive meniscus lens L13 having a convex surface directed toward the object side. Here, the negative meniscus lens L12 and the positive meniscus lens L13 are cemented.

The fifth lens unit G5 includes a negative meniscus lens L14 having a convex surface directed toward the object side.

The sixth lens unit G6 includes a positive meniscus lens L15 having a convex surface directed toward the object side, a biconvex positive lens L16, a biconcave negative lens L17, a biconcave negative lens L18, a biconvex positive lens L19, a biconvex positive lens L20, and a biconcave negative lens L21.

Here, the biconvex positive lens L16 and the biconcave negative lens L17 are cemented. The biconvex positive lens L20 and the biconcave negative lens L21 are cemented.

At a time of zoom from a wide angle end to a telephoto end, the first lens unit G1, the third lens unit G3, and the sixth lens unit G6 are fixed. The second lens unit G2 moves toward an image side. The fourth lens unit G4, after moving toward the image side, moves toward the object side. The fifth lens unit G5, after moving toward the object side, moves toward the image side. The aperture stop S is fixed together with the third lens unit G3.

At a time of focusing from a far point to a near point, the fourth lens unit G4 moves toward the image side. At a time of correcting image blur, the biconvex positive lens L16, the biconcave negative lens L17, and the biconcave negative lens L18 move in a direction perpendicular to an optical axis.

An aspheric surface is provided to a total of two surfaces which are, both surfaces of the biconvex positive lens L8.

An example 58 is an example of an image pickup optical system. In the image pickup optical system of the example 58, a teleconverter lens is inserted in the master optical system of the example 57. Description of arrangement same as that of the master optical system of the example 57 is omitted.

The teleconverter lens includes a negative meniscus lens L20 having a convex surface directed toward the object side, a positive meniscus lens L21 having a convex surface directed toward the object side, a positive meniscus lens L22 having a convex surface directed toward the object side, a negative meniscus lens L23 having a convex surface directed toward the object side, a negative meniscus lens L24 having a convex surface directed toward the object side, a biconvex positive lens L25, and a biconcave negative lens L26.

Here, the negative meniscus lens L20 and the positive meniscus lens L21 are cemented. The positive meniscus lens L22 and the negative meniscus lens L23 are cemented. The negative meniscus lens L24, the biconvex positive lens L25, and the biconcave negative lens L26 are cemented.

A biconvex positive lens L27 corresponds to the biconvex positive lens L20 in the master optical system of the example 57. A biconcave negative lens L28 corresponds to the biconcave negative lens L21 in the master optical system of the example 57.

In the master optical system of the example 57, the predetermined space is formed between the biconvex positive lens L19 and the biconvex positive lens L20. In the image pickup optical system of the example 58, the teleconverter lens is inserted between the biconvex positive lens L19 and the biconvex positive lens L27.

Numerical data of each example described above is shown below. In Surface data, r denotes radius of curvature of each lens surface, d denotes a distance between respective lens surfaces, nd denotes a refractive index of each lens for a d-line, νd denotes an Abbe number for each lens and *denotes an aspherical surface.

Moreover, in Zoom data 1 and Zoom data 2, OB denotes a distance to an object, f denotes a focal length of the entire system, FNO. denotes an F number, ω denotes a half angle of view, BF denotes a back focus, LTL denotes a lens total length of the optical system. Further, back focus is a unit which is expressed upon air conversion of a distance from a rearmost lens surface to a paraxial image surface. The lens total length is a distance from a frontmost lens surface to the rearmost lens surface plus back focus. Zoom data 1 is data at a time of an infinite object point focusing. Zoom data 2 is data at the time of focusing to an object point at a short distance. Unit of OB is m (meter). WE denotes a wide angle end, ST denotes an intermediate state, TE denotes a telephoto end.

A shape of an aspherical surface is defined by the following expression where the direction of the optical axis is represented by z, the direction orthogonal to the optical axis is represented by y, a conical coefficient is represented by K, aspherical surface coefficients are represented by A4, A6, A8, A10, A12 . . . .

$$Z=(y^2/r)/\left[1+\left\{1-(1+k)(y/r)^2\right\}^{1/2}\right]+A4y^4+A6y^6+A8y^8+A10y^{10}+A12y^{12}+\ldots$$

Further, in the aspherical surface coefficients, 'e−n' (where, n is an integral number) indicates '$10^{-n}$'. Moreover, these symbols are commonly used in the following numerical data for each example.

Example 1

Unit mm

Surface data

| Surface no. | r | d | nd | νd |
|---|---|---|---|---|
| Object plane | ∞ | ∞ | | |
| 1 | 149.303 | 2.60 | 1.95375 | 32.32 |
| 2 | 98.205 | 9.31 | 1.43875 | 94.66 |
| 3 | −366.919 | 0.20 | | |
| 4 | 101.412 | 7.41 | 1.43875 | 94.66 |
| 5 | −16090.886 | Variable | | |
| 6 | −315.310 | 2.46 | 1.85478 | 24.80 |
| 7 | −75.457 | 1.60 | 1.48749 | 70.23 |
| 8 | 36.528 | 5.13 | 1.80610 | 33.27 |
| 9 | 45.960 | 4.15 | | |
| 10* | −63.727 | 1.50 | 1.80139 | 45.45 |
| 11* | 224.152 | Variable | | |
| 12(Stop) | ∞ | 1.80 | | |
| 13* | 41.917 | 6.32 | 1.49700 | 81.54 |
| 14* | −108.431 | 5.90 | | |
| 15 | 87.055 | 1.50 | 1.85025 | 30.05 |
| 16 | 35.172 | 10.07 | 1.48749 | 70.23 |
| 17 | −188.732 | 3.12 | | |
| 18 | 231.965 | 4.43 | 1.49700 | 81.54 |
| 19 | −65.440 | Variable | | |
| 20 | 1229.188 | 2.18 | 1.92286 | 18.90 |
| 21 | −76.155 | 1.30 | 1.80139 | 45.45 |
| 22* | 30.101 | Variable | | |
| 23 | 39.710 | 1.40 | 1.80420 | 46.50 |
| 24 | 22.410 | Variable | | |
| 25 | 27.720 | 3.78 | 1.43875 | 94.66 |
| 26 | −162.301 | 1.19 | | |
| 27 | 157.628 | 2.45 | 1.92286 | 20.88 |
| 28 | −119.287 | 0.90 | 1.48749 | 70.23 |
| 29 | 28.516 | 5.54 | | |
| 30 | −50.747 | 0.90 | 1.69680 | 55.53 |
| 31 | 47.120 | 2.64 | | |
| 32 | 42.301 | 4.92 | 1.63980 | 34.46 |
| 33 | −38.471 | 1.30 | 1.92286 | 20.88 |
| 34 | −210.071 | 0.30 | | |
| 35 | 84.758 | 9.07 | 1.59551 | 39.24 |
| 36 | −25.430 | 1.30 | 1.92286 | 20.88 |
| 37 | −37.648 | Variable | | |
| Image plane | ∞ | | | |

Aspherical surface data

10th surface k = 0.000
A4 = 4.53077e−07, A6 = 1.36401e−09, A8 = 1.66252e−12

11th surface k = 0.000
A4 = 4.28061e−07, A6 = 1.58387e−09, A8 = 6.57722e−13

13th surface k = 0.000
A4 = −2.65536e−06, A6 = 1.58078e−09, A8 = −1.74710e−12

14th surface k = 0.000
A4 = 2.43516e−06, A6 = 1.30990e−09, A8 = −1.48814e−12

22th surface k = −0.493
A4 = 8.72223e−07, A6 = −1.58762e−09

-continued

Unit mm

| | WE | ST | TE |
|---|---|---|---|
| **Zoom data 1** | | | |
| f | 101.63 | 200.26 | 394.08 |
| FNO. | 4.59 | 5.15 | 5.78 |
| 2ω | 12.15 | 6.16 | 3.12 |
| BF(in air) | 30.71 | 30.71 | 30.71 |
| LTL(in air) | 251.51 | 251.51 | 251.51 |
| d5 | 14.85 | 48.06 | 77.14 |
| d11 | 64.68 | 31.47 | 2.38 |
| d19 | 14.82 | 17.00 | 6.05 |
| d22 | 16.63 | 13.29 | 25.03 |
| d24 | 3.15 | 4.32 | 3.53 |
| d37 | 30.71 | 30.71 | 30.71 |
| **Zoom data 2** | | | |
| OB | 947.1 | 947.1 | 947.1 |
| d5 | 14.85 | 48.06 | 77.14 |
| d11 | 64.68 | 31.47 | 2.38 |
| d19 | 16.12 | 22.45 | 25.63 |
| d22 | 16.18 | 9.52 | 4.22 |
| d24 | 2.31 | 2.64 | 4.75 |
| d37 | 30.71 | 30.71 | 30.71 |

Unit focal length

| | | | |
|---|---|---|---|
| f1 = 150.49 | f2 = −44.95 | f3 = 41.80 | f4 = −41.30 |
| f5 = −66.36 | f6 = 68.45 | | |

Example 2

Unit mm

Surface data

| Surface no. | r | d | nd | νd |
|---|---|---|---|---|
| Object plane | ∞ | ∞ | | |
| 1 | 111.721 | 8.52 | 1.48749 | 70.23 |
| 2 | 2761.774 | 0.20 | | |
| 3 | 109.671 | 2.74 | 1.65412 | 39.68 |
| 4 | 58.341 | 12.39 | 1.43875 | 94.66 |
| 5 | 532.867 | Variable | | |
| 6 | −1399.873 | 2.64 | 1.85478 | 24.80 |
| 7 | −80.384 | 1.60 | 1.48749 | 70.23 |
| 8 | 37.086 | 2.51 | 1.80610 | 33.27 |
| 9 | 50.402 | 3.50 | | |
| 10 | −77.132 | 1.50 | 1.83481 | 42.71 |
| 11 | 111.280 | Variable | | |
| 12 (Stop) | ∞ | 1.80 | | |
| 13* | 37.402 | 6.39 | 1.49700 | 81.54 |
| 14* | −219.288 | 2.33 | | |
| 15 | 127.887 | 1.50 | 1.76182 | 26.52 |
| 16 | 45.105 | 5.35 | 1.49700 | 81.54 |
| 17 | −122.323 | 0.32 | | |
| 18 | 116.003 | 3.93 | 1.49700 | 81.54 |
| 19 | −58.952 | Variable | | |
| 20 | −884.227 | 2.18 | 1.92286 | 18.90 |
| 21 | −88.666 | 1.30 | 1.74320 | 49.29 |
| 22* | 33.440 | Variable | | |
| 23 | 56.690 | 1.40 | 1.80420 | 46.50 |
| 24 | 27.944 | Variable | | |
| 25 | 134.078 | 3.28 | 1.43875 | 94.66 |
| 26 | −33.180 | 9.94 | | |
| 27 | 120.362 | 2.45 | 1.92286 | 20.88 |
| 28 | −122.423 | 0.90 | 1.59282 | 68.63 |
| 29 | 20.413 | 7.55 | | |
| 30 | −28.974 | 0.90 | 1.77250 | 49.60 |
| 31 | −245.135 | 1.94 | | |
| 32 | 48.912 | 4.86 | 1.63980 | 34.46 |
| 33 | −31.932 | 1.30 | 1.92286 | 20.88 |
| 34 | −94.105 | 0.30 | | |

-continued

| Unit mm | | | | |
|---|---|---|---|---|
| 35 | 141.087 | 5.54 | 1.59551 | 39.24 |
| 36 | −23.829 | 1.30 | 1.92286 | 20.88 |
| 37 | −33.580 | Variable | | |
| Image plane | ∞ | | | |

Aspherical surface data

13th surface k = 0.000
A4 = −2.08583e−06, A6 = 4.45329e−09, A8 = 1.53138e−12

14th surface k = 0.000
A4 = 6.40441e−06, A6 = 5.28792e−09, A8 = 2.00163e−12

22th surface k = −1.014
A4 = 3.75206e−06, A6 = −8.15545e−10

| | WE | ST | TE |
|---|---|---|---|
| Zoom data 1 | | | |
| f | 101.61 | 200.18 | 393.07 |
| FNO. | 4.58 | 5.15 | 5.78 |
| 2ω | 12.21 | 6.19 | 3.15 |
| BF (in air) | 28.25 | 28.25 | 28.25 |
| LTL (in air) | 254.66 | 254.66 | 254.65 |
| d5 | 27.70 | 62.30 | 93.09 |
| d11 | 67.83 | 33.24 | 2.44 |
| d19 | 8.09 | 9.86 | 1.89 |
| d22 | 16.60 | 11.48 | 20.71 |
| d24 | 3.83 | 7.17 | 5.92 |
| d37 | 28.25 | 28.25 | 28.25 |
| Zoom data 2 | | | |
| OB | 944.0 | 944.0 | 944.0 |
| d5 | 27.70 | 62.30 | 93.09 |
| d11 | 67.83 | 33.24 | 2.44 |
| d19 | 9.15 | 14.14 | 17.93 |
| d22 | 16.03 | 8.40 | 4.37 |
| d24 | 3.34 | 5.98 | 6.22 |
| d37 | 28.25 | 28.25 | 28.25 |

Unit focal length

| | | | |
|---|---|---|---|
| f1 = 174.70 | f2 = −46.80 | f3 = 34.46 | f4 = −47.06 |
| f5 = −70.05 | f6 = 92.77 | | |

Example 3

Unit mm

Surface data

| Surface no. | r | d | nd | νd |
|---|---|---|---|---|
| Object plane | ∞ | ∞ | | |
| 1 | 110.146 | 9.00 | 1.48749 | 70.23 |
| 2 | −5329.944 | 0.20 | | |
| 3 | 95.949 | 3.00 | 1.83400 | 37.16 |
| 4 | 59.408 | 11.80 | 1.43875 | 94.66 |
| 5 | 601.890 | Variable | | |
| 6 | −1553.067 | 2.00 | 1.59349 | 67.00 |
| 7 | 33.555 | 6.00 | 1.85478 | 24.80 |
| 8 | 55.229 | 3.31 | | |
| 9 | −127.893 | 1.80 | 1.78800 | 47.37 |
| 10 | 135.513 | Variable | | |
| 11 | 48.570 | 6.51 | 1.70154 | 41.24 |
| 12 | −611.019 | 3.30 | | |
| 13 | 34.258 | 6.80 | 1.49700 | 81.54 |
| 14 | 321.779 | 2.50 | | |

-continued

| Unit mm | | | | |
|---|---|---|---|---|
| 15 (Stop) | ∞ | 2.03 | | |
| 16 | −161.311 | 2.00 | 2.00100 | 29.13 |
| 17 | 27.417 | 8.00 | 1.49700 | 81.54 |
| 18* | −108.979 | 5.97 | | |
| 19 | −108.990 | 3.68 | 1.80000 | 29.84 |
| 20 | −25.777 | 1.15 | 1.69680 | 55.53 |
| 21 | −320.517 | 0.70 | | |
| 22 | −127.670 | 1.15 | 1.80100 | 34.97 |
| 23 | 68.128 | 3.50 | | |
| 24* | 25.918 | 6.72 | 1.61881 | 63.85 |
| 25* | −52.713 | Variable | | |
| 26 | 112.714 | 1.00 | 1.69680 | 55.53 |
| 27 | 18.825 | 2.05 | 1.80810 | 22.76 |
| 28 | 23.129 | Variable | | |
| 29 | −169.801 | 1.00 | 1.77250 | 49.60 |
| 30 | 46.489 | Variable | | |
| 31 | 98.622 | 4.50 | 1.80810 | 22.76 |
| 32 | −36.834 | 0.77 | | |
| 33 | −48.261 | 3.60 | 1.84666 | 23.78 |
| 34 | −23.512 | 1.50 | 1.94595 | 17.98 |
| 35 | −96.087 | Variable | | |
| Image plane | ∞ | | | |

Aspherical surface data

18th surface k = 0.000
A4 = −3.39307e−06, A6 = 4.81854e−09, A8 = −2.42826e−12

24th surface k = 0.000
A4 = −1.43449e−05, A6 = −3.91171e−09, A8 = −6.32139e−12

25th surface k = 0.000
A4 = 2.71199e−06, A6 = −5.56805e−09, A8 = 5.29659e−12

| | WE | ST | TE |
|---|---|---|---|
| Zoom data 1 | | | |
| f | 102.57 | 201.12 | 394.21 |
| FNO. | 4.60 | 5.03 | 5.78 |
| 2ω | 11.95 | 6.08 | 3.11 |
| BF (in air) | 32.51 | 32.50 | 32.51 |
| LTL (in air) | 258.77 | 258.77 | 258.77 |
| d5 | 2.00 | 41.29 | 72.15 |
| d10 | 72.00 | 32.71 | 1.50 |
| d25 | 7.14 | 10.72 | 3.00 |
| d28 | 30.11 | 24.85 | 29.68 |
| d30 | 9.47 | 11.15 | 14.04 |
| d35 | 32.51 | 32.50 | 32.51 |
| Zoom data 2 | | | |
| OB | 867.4 | 867.4 | 867.4 |
| d5 | 2.00 | 41.29 | 72.50 |
| d10 | 72.00 | 32.71 | 1.50 |
| d25 | 8.33 | 15.82 | 22.00 |
| d28 | 31.03 | 25.37 | 21.26 |
| d30 | 7.34 | 5.52 | 3.46 |
| d35 | 32.51 | 32.51 | 32.51 |

Unit focal length

| | | | |
|---|---|---|---|
| f1 = 167.09 | f2 = −50.54 | f3 = 51.08 | f4 = −44.92 |
| f5 = −47.15 | f6 = 55.34 | | |

Example 4

| Unit mm | | | | |
|---|---|---|---|---|
| Surface data | | | | |
| Surface no. | r | d | nd | νd |
| Object plane | ∞ | ∞ | | |
| 1 | 145.311 | 3.00 | 1.48749 | 70.23 |
| 2 | 120.467 | 9.38 | 1.49700 | 81.54 |
| 3 | −378.744 | 0.20 | | |
| 4 | 69.412 | 2.60 | 1.80100 | 34.97 |
| 5 | 50.247 | 10.30 | 1.43875 | 94.66 |
| 6 | 122.514 | Variable | | |
| 7 | −885.590 | 2.20 | 1.49700 | 81.54 |
| 8 | 31.393 | 4.18 | 1.85478 | 24.80 |
| 9 | 53.663 | 5.17 | | |
| 10 | −193.671 | 1.80 | 1.83400 | 37.16 |
| 11 | 82.578 | Variable | | |
| 12 | 53.081 | 5.60 | 1.71999 | 50.23 |
| 13 | −843.289 | 0.50 | | |
| 14 | 53.912 | 7.33 | 1.59282 | 68.63 |
| 15 | 195.079 | 0.27 | | |
| 16 | 42.871 | 6.89 | 1.49700 | 81.54 |
| 17 | −122.364 | 1.79 | 1.89190 | 37.13 |
| 18 | 23.505 | 6.50 | 1.49700 | 81.54 |
| 19 | 1128.398 | 6.14 | | |
| 20 | 85.096 | 4.00 | 1.80100 | 34.97 |
| 21 | −42.481 | 1.25 | 1.71999 | 50.23 |
| 22 | 55.655 | 6.63 | | |
| 23 | −75.846 | 1.20 | 1.80610 | 40.92 |
| 24 | 97.000 | 7.00 | | |
| 25 (Stop) | ∞ | 1.50 | | |
| 26* | 30.457 | 4.00 | 1.61881 | 63.85 |
| 27 | −70.217 | Variable | | |
| 28 | 213.630 | 1.20 | 1.77250 | 49.60 |
| 29 | 19.889 | 2.03 | 1.76182 | 26.52 |
| 30 | 30.081 | Variable | | |
| 31 | −1071.904 | 1.20 | 1.77250 | 49.60 |
| 32 | 23.827 | 2.30 | 1.64769 | 33.79 |
| 33 | 54.464 | Variable | | |
| 34 | 125.357 | 6.00 | 1.69895 | 30.13 |
| 35 | −29.257 | 0.20 | | |
| 36 | −30.509 | 1.80 | 1.94595 | 17.98 |
| 37 | −50.857 | Variable | | |
| Image plane | ∞ | | | |

Aspherical surface data

26th surface k = 0.000
A4 = −8.31494e−06, A6 = −4.96017e−09, A8 = −1.05386e−11

| | WE | ST | TE |
|---|---|---|---|
| Zoom data 1 | | | |
| f | 101.71 | 199.48 | 391.16 |
| FNO. | 4.32 | 4.66 | 5.71 |
| 2ω | 12.02 | 6.13 | 3.14 |
| BF (in air) | 42.25 | 42.25 | 42.25 |
| LTL (in air) | 261.53 | 261.53 | 261.53 |
| d6 | 7.22 | 41.83 | 58.83 |
| d11 | 78.82 | 38.08 | 1.50 |
| d27 | 3.00 | 6.20 | 2.99 |
| d30 | 6.38 | 3.92 | 21.60 |
| d33 | 9.71 | 15.11 | 20.21 |
| d37 | 42.25 | 42.25 | 42.25 |
| Zoom data 2 | | | |
| OB | 935.0 | 935.0 | 935.0 |
| d6 | 7.22 | 41.83 | 58.83 |
| d11 | 78.82 | 38.08 | 1.50 |
| d27 | 4.49 | 12.45 | 22.00 |

-continued

| Unit mm | | | |
|---|---|---|---|
| d30 | 8.03 | 5.82 | 18.81 |
| d33 | 6.57 | 6.96 | 4.00 |
| d37 | 42.32 | 42.29 | 42.25 |

| Unit focal length | | | |
|---|---|---|---|
| f1 = 169.02 | f2 = −52.05 | f3 = 57.75 | f4 = −45.26 |
| f5 = −55.68 | f6 = 59.08 | | |

Example 5

| Unit mm | | | | |
|---|---|---|---|---|
| Surface data | | | | |
| Surface no. | r | d | nd | νd |
| Object plane | ∞ | ∞ | | |
| 1 | 121.937 | 12.04 | 1.48749 | 70.23 |
| 2 | 4843.755 | 0.20 | | |
| 3 | 109.453 | 3.60 | 1.89190 | 37.13 |
| 4 | 69.557 | 15.44 | 1.43875 | 94.66 |
| 5 | 831.754 | Variable | | |
| 6 | −4710.631 | 2.50 | 1.60311 | 60.64 |
| 7 | 42.093 | 7.41 | 1.85478 | 24.80 |
| 8 | 64.369 | 5.10 | | |
| 9 | −96.124 | 1.80 | 1.59349 | 67.00 |
| 10 | 226.742 | Variable | | |
| 11 | 61.941 | 7.76 | 1.66672 | 48.32 |
| 12 | −330.617 | 0.50 | | |
| 13 | 66.371 | 7.61 | 1.43875 | 94.66 |
| 14 | −131.030 | 2.97 | 1.71999 | 50.23 |
| 15 | 139.786 | 14.08 | | |
| 16 (Stop) | ∞ | 4.12 | | |
| 17 | 101.276 | 2.00 | 2.00069 | 25.46 |
| 18 | 30.095 | 10.41 | 1.49700 | 81.54 |
| 19 | −38.764 | 3.36 | 1.75500 | 52.32 |
| 20 | −98.304 | 0.30 | | |
| 21 | 42.591 | 4.50 | 1.80000 | 29.84 |
| 22 | 407.724 | Variable | | |
| 23 | 430.483 | 1.00 | 1.78800 | 47.37 |
| 24 | 37.215 | 2.01 | 1.80810 | 22.76 |
| 25 | 53.453 | Variable | | |
| 26 | 66.799 | 2.00 | 1.61340 | 44.27 |
| 27 | 619.280 | 1.00 | 1.80400 | 46.58 |
| 28 | 30.010 | Variable | | |
| 29 | −608.775 | 3.50 | 1.49700 | 81.54 |
| 30 | −40.883 | 3.00 | | |
| 31 | 64.570 | 3.00 | 1.72825 | 28.46 |
| 32 | −40.835 | 1.00 | 1.72916 | 54.68 |
| 33 | 28.719 | 4.84 | | |
| 34 | −136.761 | 1.00 | 1.83481 | 42.73 |
| 35 | 56.033 | 5.62 | | |
| 36 | 41.844 | 4.50 | 1.61772 | 49.81 |
| 37 | −1319.160 | 8.02 | | |
| 38 | 56.686 | 4.50 | 1.84666 | 23.78 |
| 39 | −43.002 | 1.50 | 1.94595 | 17.98 |
| 40 | 460.012 | Variable | | |
| Image plane | ∞ | | | |

| | WE | ST | TE |
|---|---|---|---|
| Zoom data 1 | | | |
| f | 154.31 | 272.32 | 494.21 |
| FNO. | 5.14 | 5.40 | 5.80 |
| 2ω | 8.04 | 4.55 | 2.50 |
| BF (in air) | 33.03 | 33.03 | 33.03 |
| LTL (in air) | 302.83 | 302.83 | 302.83 |
| d5 | 4.42 | 43.27 | 76.65 |
| d10 | 73.73 | 34.88 | 1.50 |
| d22 | 9.51 | 14.25 | 3.00 |
| d25 | 21.68 | 11.54 | 22.73 |

-continued

| Unit mm | | | |
|---|---|---|---|
| d28 | 8.28 | 13.69 | 13.74 |
| d40 | 33.03 | 33.03 | 33.03 |
| Zoom data 2 | | | |
| OB | 1300.4 | 1300.4 | 1300.4 |
| d5 | 4.42 | 43.27 | 76.65 |
| d10 | 73.73 | 34.88 | 1.50 |
| d22 | 11.28 | 19.08 | 19.29 |
| d25 | 21.36 | 13.18 | 19.11 |
| d28 | 6.83 | 7.21 | 1.07 |
| d40 | 33.03 | 33.03 | 33.03 |

Unit focal length f1 = 193.80 f2 = −62.24 f3 = 55.95 f4 = −78.78
f5 = −59.32 f6 = 140.91

Example 6

Unit mm

Surface data

| Surface no. | r | d | nd | νd |
|---|---|---|---|---|
| Object plane | ∞ | ∞ | | |
| 1 | 133.168 | 11.81 | 1.48749 | 70.23 |
| 2 | −2359.129 | 0.20 | | |
| 3 | 116.357 | 3.80 | 1.83400 | 37.16 |
| 4 | 70.858 | 15.07 | 1.43875 | 94.66 |
| 5 | 899.129 | Variable | | |
| 6 | −1781.962 | 2.35 | 1.48749 | 70.23 |
| 7 | 46.329 | 5.97 | 1.85478 | 24.80 |
| 8 | 66.914 | 5.15 | | |
| 9 | −187.736 | 1.80 | 1.69680 | 55.53 |
| 10 | 151.953 | Variable | | |
| 11 | 54.375 | 7.87 | 1.70154 | 41.24 |
| 12 | −528.893 | 0.55 | | |
| 13 | 36.389 | 8.56 | 1.49700 | 81.54 |
| 14 | −187.152 | 1.80 | 1.88300 | 40.76 |
| 15 | 152.853 | 4.91 | | |
| 16 (Stop) | ∞ | 2.60 | | |
| 17 | 96.920 | 1.51 | 2.00100 | 29.13 |
| 18 | 23.355 | 7.03 | 1.49700 | 81.54 |
| 19 | 165.160 | 7.35 | | |
| 20 | −279.360 | 3.40 | 1.80100 | 34.97 |
| 21 | −35.122 | 1.00 | 1.69680 | 55.53 |
| 22 | 87.557 | 1.41 | | |
| 23 | −386.520 | 1.00 | 1.78800 | 47.37 |
| 24 | 70.056 | 3.50 | | |
| 25* | 25.776 | 6.84 | 1.61881 | 63.85 |
| 26* | −57.485 | Variable | | |
| 27 | 68.637 | 1.00 | 1.83481 | 42.73 |
| 28 | 16.711 | 2.10 | 1.80810 | 22.76 |
| 29 | 22.025 | Variable | | |
| 30 | −135.932 | 2.40 | 1.76182 | 26.52 |
| 31 | −16.289 | 1.00 | 1.88300 | 40.76 |
| 32 | 39.756 | Variable | | |
| 33 | 53.677 | 5.00 | 1.84666 | 23.78 |
| 34 | −31.220 | 0.20 | | |
| 35 | −65.245 | 4.50 | 1.80000 | 29.84 |
| 36 | −17.459 | 1.50 | 1.94595 | 17.98 |
| 37 | −109.637 | Variable | | |
| Image plane | ∞ | | | |

Aspherical surface data

25th surface k = 0.000
A4 = −1.09321e−05, A6 = −6.77521e−09, A8 = −9.79193e−12

-continued

Unit mm

26th surface k = 0.000
A4 = 3.46924e−06, A6 = −6.11169e−09, A8 = 2.50249e−12

| | WE | ST | TE |
|---|---|---|---|
| Zoom data 1 | | | |
| f | 140.63 | 220.60 | 360.31 |
| FNO. | 4.21 | 4.21 | 4.21 |
| 2ω | 8.69 | 5.55 | 3.42 |
| BF (in air) | 25.79 | 25.79 | 25.79 |
| LTL (in air) | 255.63 | 255.63 | 255.63 |
| d5 | 4.27 | 37.72 | 69.09 |
| d10 | 66.32 | 32.87 | 1.50 |
| d26 | 13.96 | 12.73 | 3.00 |
| d29 | 14.81 | 14.99 | 23.00 |
| d32 | 7.29 | 8.34 | 10.06 |
| d37 | 25.79 | 25.79 | 25.79 |
| Zoom data 2 | | | |
| OB | 986.4 | 986.4 | 986.4 |
| d5 | 4.27 | 37.72 | 69.09 |
| d10 | 66.32 | 32.87 | 1.50 |
| d26 | 17.20 | 20.82 | 22.04 |
| d29 | 13.96 | 11.21 | 9.64 |
| d32 | 4.90 | 4.03 | 4.37 |
| d37 | 25.79 | 25.79 | 25.79 |

Unit focal length f1 = 196.30 f2 = −76.04 f3 = 60.35 f4 = −39.34
f5 = −28.06 f6 = 33.13

Example 7

Unit mm

Surface data

| Surface no. | r | d | nd | νd |
|---|---|---|---|---|
| Object plane | ∞ | ∞ | | |
| 1 | 152.378 | 11.16 | 1.43875 | 94.66 |
| 2 | −785.028 | 0.20 | | |
| 3 | 107.267 | 3.67 | 1.83400 | 37.16 |
| 4 | 72.391 | 14.20 | 1.43875 | 94.66 |
| 5 | 604.702 | Variable | | |
| 6 | −1338.874 | 2.20 | 1.49700 | 81.54 |
| 7 | 37.645 | 7.50 | 1.85478 | 24.80 |
| 8 | 49.297 | 4.93 | | |
| 9 | −120.261 | 1.80 | 1.72916 | 54.68 |
| 10 | 205.458 | Variable | | |
| 11 | 56.079 | 6.68 | 1.70154 | 41.24 |
| 12 | −596.574 | 2.18 | | |
| 13 | 32.396 | 6.80 | 1.49700 | 81.54 |
| 14 | 231.943 | 2.51 | | |
| 15 (Stop) | ∞ | 2.06 | | |
| 16 | −2717.224 | 3.43 | 2.00100 | 29.13 |
| 17 | 24.925 | 9.01 | 1.49700 | 81.54 |
| 18* | −130.226 | 4.00 | | |
| 19 | −149.974 | 3.60 | 1.80100 | 34.97 |
| 20 | −25.965 | 1.15 | 1.72916 | 54.68 |
| 21 | 286.035 | 1.00 | | |
| 22 | −162.449 | 1.15 | 1.78800 | 47.37 |
| 23 | 76.640 | 3.50 | | |
| 24* | 27.617 | 6.50 | 1.61881 | 63.85 |
| 25 | −51.577 | Variable | | |
| 26 | 116.518 | 1.00 | 1.69680 | 55.53 |
| 27 | 18.394 | 2.08 | 1.80810 | 22.76 |
| 28 | 23.229 | Variable | | |
| 29 | 329.309 | 2.00 | 1.72825 | 28.46 |

-continued

| Unit mm | | | | |
|---|---|---|---|---|
| 30 | −111.463 | 1.00 | 1.77250 | 49.60 |
| 31 | 38.131 | Variable | | |
| 32 | 67.421 | 4.50 | 1.80810 | 22.76 |
| 33 | −42.397 | 0.20 | | |
| 34 | −62.211 | 3.60 | 1.84666 | 23.78 |
| 35 | −24.445 | 1.50 | 1.94595 | 17.98 |
| 36 | −419.264 | Variable | | |
| Image plane | ∞ | | | |

Aspherical surface data

18th surface k = 0.000
A4 = −7.33808e−07, A6 = 8.57504e−09, A8 = −5.79950e−12

24th surface k = 0.000
A4 = −1.36872e−05, A6 = 1.75165e−09, A8 = −7.90166e−12

| | WE | ST | TE |
|---|---|---|---|
| **Zoom data 1** | | | |
| f | 102.59 | 201.16 | 394.28 |
| FNO. | 4.60 | 4.60 | 4.60 |
| 2ω | 11.93 | 6.08 | 3.11 |
| BF (in air) | 29.91 | 29.89 | 29.90 |
| LTL (in air) | 276.26 | 276.24 | 276.24 |
| d5 | 3.00 | 48.00 | 84.89 |
| d10 | 83.39 | 38.39 | 1.50 |
| d25 | 6.02 | 9.58 | 3.00 |
| d28 | 28.54 | 21.42 | 20.93 |
| d31 | 10.29 | 13.85 | 20.92 |
| d36 | 29.91 | 29.89 | 29.90 |
| **Zoom data 2** | | | |
| OB | 963.1 | 963.1 | 963.1 |
| d5 | 3.00 | 48.00 | 84.89 |
| d10 | 83.39 | 38.39 | 1.50 |
| d25 | 6.90 | 13.47 | 19.96 |
| d28 | 31.12 | 27.39 | 21.40 |
| d31 | 6.84 | 4.00 | 3.50 |
| d36 | 29.91 | 29.89 | 29.90 |

Unit focal length

| | | | |
|---|---|---|---|
| f1 = 193.93 | f2 = −58.00 | f3 = 50.98 | f4 = −45.10 |
| f5 = −54.43 | f6 = 63.88 | | |

Example 8

Unit mm

Surface data

| Surface no. | r | d | nd | νd |
|---|---|---|---|---|
| Object plane | ∞ | ∞ | | |
| 1 | 134.303 | 12.49 | 1.48749 | 70.23 |
| 2 | 4713.154 | 0.20 | | |
| 3 | 125.063 | 3.00 | 1.67300 | 38.15 |
| 4 | 70.036 | 16.94 | 1.43875 | 94.66 |
| 5 | 490.913 | Variable | | |
| 6 | −1224.194 | 3.76 | 1.84666 | 23.78 |
| 7 | −96.069 | 1.60 | 1.48749 | 70.23 |
| 8 | 48.344 | 2.91 | 1.80610 | 33.27 |
| 9 | 61.926 | 7.34 | | |
| 10 | −84.876 | 1.50 | 1.83481 | 42.71 |
| 11 | 163.805 | Variable | | |
| 12 (Stop) | ∞ | 1.80 | | |
| 13* | 63.026 | 6.29 | 1.49700 | 81.54 |
| 14* | −118.473 | 2.99 | | |

-continued

| Unit mm | | | | |
|---|---|---|---|---|
| 15 | −878.167 | 1.50 | 1.84666 | 23.78 |
| 16 | 83.578 | 10.13 | 1.59282 | 68.63 |
| 17 | −116.921 | 0.20 | | |
| 18 | 66.106 | 7.19 | 1.49700 | 81.54 |
| 19 | −56.691 | Variable | | |
| 20 | 980.005 | 1.50 | 1.74320 | 49.29 |
| 21 | 21.425 | 2.95 | 1.80518 | 25.42 |
| 22 | 32.721 | Variable | | |
| 23 | 52.574 | 1.40 | 1.77250 | 49.60 |
| 24 | 35.488 | Variable | | |
| 25 | −133.222 | 2.47 | 1.43875 | 94.66 |
| 26 | −38.532 | 1.08 | | |
| 27 | 74.653 | 2.45 | 1.85478 | 24.80 |
| 28 | −163.855 | 0.90 | 1.59282 | 68.63 |
| 29 | 40.205 | 2.06 | | |
| 30 | −120.987 | 0.90 | 1.77250 | 49.60 |
| 31 | 54.572 | 5.78 | | |
| 32 | 40.338 | 3.03 | 1.62299 | 58.16 |
| 33 | 460.286 | 39.88 | | |
| 34 | 36.411 | 8.38 | 1.61293 | 37.00 |
| 35 | −90.002 | 1.30 | 1.92286 | 20.88 |
| 36 | 103.304 | Variable | | |
| Image plane | ∞ | | | |

Aspherical surface data

13th surface k = 0.000
A4 = −1.49186e−06, A6 = 3.68488e−09, A8 = −6.55574e−12,
A10 = 2.24053e−14

14th surface k = 0.000
A4 = 4.08165e−06, A6 = 4.62924e−09, A8 = −6.75584e−12,
A10 = 2.62846e−14

| | WE | ST | TE |
|---|---|---|---|
| **Zoom data 1** | | | |
| f | 151.86 | 244.31 | 392.63 |
| FNO. | 4.57 | 4.57 | 4.57 |
| 2ω | 8.22 | 5.11 | 3.17 |
| BF (in air) | 29.14 | 29.14 | 29.14 |
| LTL (in air) | 313.98 | 313.98 | 313.98 |
| d5 | 47.71 | 74.73 | 100.26 |
| d11 | 55.34 | 28.32 | 2.79 |
| d19 | 7.84 | 8.40 | 3.87 |
| d22 | 14.96 | 11.03 | 16.05 |
| d24 | 5.07 | 8.44 | 7.95 |
| d36 | 29.14 | 29.14 | 29.14 |
| **Zoom data 2** | | | |
| OB | 984.6 | 984.6 | 984.6 |
| d5 | 47.71 | 74.73 | 100.26 |
| d11 | 55.34 | 28.32 | 2.79 |
| d19 | 9.99 | 13.82 | 17.81 |
| d22 | 13.56 | 7.96 | 4.87 |
| d24 | 4.32 | 6.10 | 5.19 |
| d36 | 29.14 | 29.14 | 29.14 |

Unit focal length

| | | | |
|---|---|---|---|
| f1 = 210.01 | f2 = −54.84 | f3 = 38.51 | f4 = −48.09 |
| f5 = −146.59 | f6 = 137.14 | | |

Example 9

| Unit mm | | | | |
|---|---|---|---|---|
| Surface data | | | | |
| Surface no. | r | d | nd | νd |
| Object plane | ∞ | ∞ | | |
| 1 | 134.303 | 12.49 | 1.48749 | 70.23 |
| 2 | 4713.154 | 0.20 | | |
| 3 | 125.063 | 3.00 | 1.67300 | 38.15 |
| 4 | 70.036 | 16.94 | 1.43875 | 94.66 |
| 5 | 490.913 | Variable | | |
| 6 | −1224.194 | 3.76 | 1.84666 | 23.78 |
| 7 | −96.069 | 1.60 | 1.48749 | 70.23 |
| 8 | 48.344 | 2.91 | 1.80610 | 33.27 |
| 9 | 61.926 | 7.34 | | |
| 10 | −84.876 | 1.50 | 1.83481 | 42.71 |
| 11 | 163.805 | Variable | | |
| 12 (Stop) | ∞ | 1.80 | | |
| 13* | 63.026 | 6.29 | 1.49700 | 81.54 |
| 14* | −118.473 | 2.99 | | |
| 15 | −878.167 | 1.50 | 1.84666 | 23.78 |
| 16 | 83.578 | 10.13 | 1.59282 | 68.63 |
| 17 | −116.921 | 0.20 | | |
| 18 | 66.106 | 7.19 | 1.49700 | 81.54 |
| 19 | −56.691 | Variable | | |
| 20 | 980.005 | 1.50 | 1.74320 | 49.29 |
| 21 | 21.425 | 2.95 | 1.80518 | 25.42 |
| 22 | 32.721 | Variable | | |
| 23 | 52.574 | 1.40 | 1.77250 | 49.60 |
| 24 | 35.488 | Variable | | |
| 25 | −133.222 | 2.47 | 1.43875 | 94.66 |
| 26 | −38.532 | 1.08 | | |
| 27 | 74.653 | 2.45 | 1.85478 | 24.80 |
| 28 | −163.855 | 0.90 | 1.59282 | 68.63 |
| 29 | 40.205 | 2.06 | | |
| 30 | −120.987 | 0.90 | 1.77250 | 49.60 |
| 31 | 54.572 | 5.78 | | |
| 32 | 40.338 | 3.03 | 1.62299 | 58.16 |
| 33 | 460.286 | 1.92 | | |
| 34 | 23.197 | 5.24 | 1.54072 | 47.23 |
| 35 | 296.376 | 0.30 | | |
| 36 | 25.397 | 4.64 | 1.60342 | 38.03 |
| 37 | −1327.790 | 1.15 | 1.90366 | 31.32 |
| 38 | 17.767 | 9.85 | | |
| 39 | −52.478 | 0.95 | 1.88300 | 40.76 |
| 40 | 15.554 | 6.40 | 1.72047 | 34.71 |
| 41 | −19.970 | 0.95 | 1.88300 | 40.76 |
| 42 | 56.959 | 0.54 | | |
| 43 | 42.736 | 6.01 | 1.61340 | 44.27 |
| 44 | −35.480 | 1.93 | | |
| 45 | 36.411 | 8.38 | 1.61293 | 37.00 |
| 46 | −90.002 | 1.30 | 1.92286 | 20.88 |
| 47 | 103.304 | Variable | | |
| Image plane | ∞ | | | |

Aspherical surface data

13th surface k = 0.000
A4 = −1.49186e−06, A6 = 3.68488e−09, A8 = −6.55574e−12,
A10 = 2.24053e−14

14th surface k = 0.000
A4 = 4.08165e−06, A6 = 4.62924e−09, A8 = −6.75584e−12,
A10 = 2.62846e−14

| Zoom data 1 | | | |
|---|---|---|---|
| | WE | ST | TE |
| f | 189.70 | 305.19 | 490.47 |
| FNO. | 5.71 | 5.71 | 5.71 |
| 2ω | 6.50 | 4.04 | 2.51 |
| BF (in air) | 29.14 | 29.14 | 29.14 |

-continued

| Unit mm | | | |
|---|---|---|---|
| LTL (in air) | 313.99 | 313.99 | 313.99 |
| d5 | 47.71 | 74.73 | 100.26 |
| d11 | 55.34 | 28.32 | 2.79 |
| d19 | 7.84 | 8.40 | 3.87 |
| d22 | 14.96 | 11.03 | 16.05 |
| d24 | 5.07 | 8.44 | 7.95 |
| d47 | 29.14 | 29.14 | 29.14 |

Unit focal length f1 = 210.01 f2 = −54.84 f3 = 38.51 f4 = −48.09
f5 = −146.59 f6 = 5336.99

Example 10

| Unit mm | | | | |
|---|---|---|---|---|
| Surface data | | | | |
| Surface no. | r | d | nd | νd |
| Object plane | ∞ | ∞ | | |
| 1 | 181.127 | 8.85 | 1.48749 | 70.23 |
| 2 | −947.805 | 0.40 | | |
| 3 | 133.128 | 3.00 | 1.72047 | 34.71 |
| 4 | 83.287 | 11.68 | 1.43875 | 94.66 |
| 5 | 443.733 | Variable | | |
| 6 | 307.590 | 2.20 | 1.48749 | 70.23 |
| 7 | 42.617 | 7.50 | 1.84666 | 23.78 |
| 8 | 52.879 | 7.80 | | |
| 9 | −104.850 | 1.80 | 1.72916 | 54.68 |
| 10 | 674.298 | Variable | | |
| 11 | 54.532 | 7.08 | 1.74400 | 44.78 |
| 12 | 1357.445 | 0.50 | | |
| 13 | 31.270 | 9.06 | 1.49700 | 81.54 |
| 14 | −380.692 | 2.00 | 1.73400 | 51.47 |
| 15 | 28.188 | 3.96 | | |
| 16 | 80.687 | 2.00 | 1.85478 | 24.80 |
| 17 | 39.283 | 5.01 | 1.49700 | 81.54 |
| 18 | 87.400 | 3.50 | | |
| 19 (Stop) | ∞ | 10.40 | | |
| 20* | 33.508 | 7.50 | 1.49700 | 81.54 |
| 21* | −75.978 | Variable | | |
| 22 | 499.087 | 1.00 | 1.72916 | 54.68 |
| 23 | 25.389 | 2.00 | 1.85478 | 24.80 |
| 24 | 31.472 | Variable | | |
| 25 | 169.917 | 1.20 | 1.75520 | 27.51 |
| 26 | 45.668 | Variable | | |
| 27 | 45.738 | 4.20 | 1.51633 | 64.14 |
| 28 | −58.203 | 3.00 | | |
| 29 | 140.081 | 2.80 | 1.85478 | 24.80 |
| 30 | −69.350 | 1.00 | 1.59282 | 68.63 |
| 31 | 49.103 | 1.95 | | |
| 32 | −86.784 | 1.00 | 1.77250 | 49.60 |
| 33 | 51.657 | 3.00 | | |
| 34 | 48.308 | 3.70 | 1.67300 | 38.15 |
| 35 | 15364.863 | 30.00 | | |
| 36 | 49.999 | 6.00 | 1.74951 | 35.33 |
| 37 | −43.225 | 1.50 | 1.80810 | 22.76 |
| 38 | 105.758 | Variable | | |
| Image plane | ∞ | | | |

Aspherical surface data

20th surface k = 0.000
A4 = −3.77264e−06, A6 = −2.12851e−09, A8 = −2.70099e−12

-continued

| Unit mm | | | |
|---|---|---|---|
| 21th surface | | | |
| k = 0.000 | | | |
| A4 = 1.21904e−06, A6 = −1.70217e−09, A8 = −7.92292e−13 | | | |
| | WE | ST | TE |
| Zoom data 1 | | | |
| f | 152.04 | 238.52 | 389.53 |
| FNO. | 4.55 | 4.55 | 4.55 |
| 2ω | 8.15 | 5.19 | 3.18 |
| BF (in air) | 28.63 | 28.63 | 28.63 |
| LTL (in air) | 318.47 | 318.47 | 318.47 |
| d5 | 27.63 | 62.53 | 97.90 |
| d10 | 71.76 | 36.87 | 1.50 |
| d21 | 11.42 | 11.85 | 5.50 |
| d24 | 19.27 | 17.86 | 23.30 |
| d26 | 3.19 | 4.17 | 5.08 |
| d38 | 28.63 | 28.63 | 28.63 |
| Zoom data 2 | | | |
| OB | 981.5 | 981.5 | 981.5 |
| d5 | 27.63 | 62.53 | 97.90 |
| d10 | 71.76 | 36.87 | 1.50 |
| d21 | 14.58 | 19.51 | 25.03 |
| d24 | 16.11 | 10.20 | 3.77 |
| d26 | 3.19 | 4.17 | 5.08 |
| d38 | 28.63 | 28.63 | 28.63 |
| Unit focal length | | | |
| f1 = 231.10 | f2 = −74.79 | f3 = 56.72 | f4 = −48.68 |
| f5 = −83.04 | f6 = 72.15 | | |

Example 11

Unit mm

Surface data

| Surface no. | r | d | nd | νd |
|---|---|---|---|---|
| Object plane | ∞ | ∞ | | |
| 1 | 181.127 | 8.85 | 1.48749 | 70.23 |
| 2 | −947.805 | 0.40 | | |
| 3 | 133.128 | 3.00 | 1.72047 | 34.71 |
| 4 | 83.287 | 11.68 | 1.43875 | 94.66 |
| 5 | 443.733 | Variable | | |
| 6 | 307.590 | 2.20 | 1.48749 | 70.23 |
| 7 | 42.617 | 7.50 | 1.84666 | 23.78 |
| 8 | 52.879 | 7.80 | | |
| 9 | −104.850 | 1.80 | 1.72916 | 54.68 |
| 10 | 674.298 | Variable | | |
| 11 | 54.532 | 7.08 | 1.74400 | 44.78 |
| 12 | 1357.445 | 0.50 | | |
| 13 | 31.270 | 9.06 | 1.49700 | 81.54 |
| 14 | −380.692 | 2.00 | 1.73400 | 51.47 |
| 15 | 28.188 | 3.96 | | |
| 16 | 80.687 | 2.00 | 1.85478 | 24.80 |
| 17 | 39.283 | 5.01 | 1.49700 | 81.54 |
| 18 | 87.400 | 3.50 | | |
| 19 (Stop) | ∞ | 10.40 | | |
| 20* | 33.508 | 7.50 | 1.49700 | 81.54 |
| 21* | −75.978 | Variable | | |
| 22 | 499.087 | 1.00 | 1.72916 | 54.68 |
| 23 | 25.389 | 2.00 | 1.85478 | 24.80 |
| 24 | 31.472 | Variable | | |
| 25 | 169.917 | 1.20 | 1.75520 | 27.51 |
| 26 | 45.668 | Variable | | |
| 27 | 45.738 | 4.20 | 1.51633 | 64.14 |
| 28 | −58.203 | 3.00 | | |
| 29 | 140.081 | 2.80 | 1.85478 | 24.80 |

-continued

Unit mm

| Surface no. | r | d | nd | νd |
|---|---|---|---|---|
| 30 | −69.350 | 1.00 | 1.59282 | 68.63 |
| 31 | 49.103 | 1.95 | | |
| 32 | −86.784 | 1.00 | 1.77250 | 49.60 |
| 33 | 51.657 | 3.00 | | |
| 34 | 48.308 | 3.70 | 1.67300 | 38.15 |
| 35 | 15364.863 | 3.98 | | |
| 36 | 16.111 | 5.52 | 1.48749 | 70.23 |
| 37 | −84.774 | 0.43 | | |
| 38 | 52.118 | 1.02 | 1.49700 | 81.54 |
| 39 | 25.550 | 2.21 | | |
| 40 | −98.115 | 0.90 | 1.88100 | 40.14 |
| 41 | 13.481 | 6.59 | 1.67300 | 38.15 |
| 42 | −13.139 | 0.90 | 1.88100 | 40.14 |
| 43 | 22.295 | 1.36 | | |
| 44 | 33.953 | 2.93 | 1.73800 | 32.26 |
| 45 | −89.590 | 4.15 | | |
| 4 6 | 49.999 | 6.00 | 1.74951 | 35.33 |
| 47 | −43.225 | 1.50 | 1.80810 | 22.76 |
| 48 | 105.758 | Variable | | |
| Image plane | ∞ | | | |

| Aspherical surface data | | | |
|---|---|---|---|
| 20th surface | | | |
| k = 0.000 | | | |
| A4 = −3.77264e−06, A6 = −2.12851e−09, A8 = −2.70099e−12 | | | |
| 21th surface | | | |
| k = 0.000 | | | |
| A4 = 1.21904e−06, A6 = −1.70217e−09, A8 = −7.92292e−13 | | | |
| Zoom data 1 | | | |
| | WE | ST | TE |
| f | 190.06 | 298.16 | 486.94 |
| FNO. | 5.69 | 5.69 | 5.69 |
| 2ω | 6.42 | 4.09 | 2.51 |
| BF (in air) | 28.63 | 28.63 | 28.63 |
| LTL (in air) | 318.47 | 318.47 | 318.47 |
| d5 | 27.63 | 62.53 | 97.90 |
| d10 | 71.76 | 36.87 | 1.50 |
| d21 | 11.42 | 11.85 | 5.50 |
| d24 | 19.27 | 17.86 | 23.30 |
| d26 | 3.19 | 4.17 | 5.08 |
| d48 | 28.63 | 28.63 | 28.63 |
| Unit focal length | | | |
| f1 = 231.10 | f2 = −74.79 | f3 = 56.72 | f4 = −48.68 |
| f5 = −83.04 | f6 = 91.13 | | |

Example 12

Unit mm

Surface data

| Surface no. | r | d | nd | νd |
|---|---|---|---|---|
| Object plane | ∞ | ∞ | | |
| 1 | 186.560 | 7.92 | 1.48749 | 70.23 |
| 2 | −2210.980 | 0.30 | | |
| 3 | 155.505 | 3.00 | 1.72047 | 34.71 |
| 4 | 92.440 | 11.80 | 1.43875 | 94.66 |
| 5 | 3662.903 | Variable | | |
| 6 | −1315.400 | 1.90 | 1.48749 | 70.23 |
| 7 | 45.851 | 6.50 | 1.84666 | 23.78 |
| 8 | 68.617 | 5.74 | | |
| 9 | −145.470 | 1.70 | 1.77250 | 49.60 |
| 10 | 184.725 | Variable | | |
| 11 | 89.508 | 6.66 | 1.74400 | 44.78 |

| Unit mm | | | | |
|---|---|---|---|---|
| 12 | −230.408 | 19.20 | | |
| 13 | 50.748 | 6.83 | 1.49700 | 81.54 |
| 14 | −96.508 | 2.00 | 1.88100 | 40.14 |
| 15 | 71.593 | 0.25 | | |
| 16 | 35.629 | 10.00 | 1.80810 | 22.76 |
| 17 | 23.150 | 6.50 | 1.43875 | 94.66 |
| 18 | 168.720 | 3.50 | | |
| 19 | 77.949 | 3.80 | 1.83481 | 42.73 |
| 20 | −74.361 | 0.90 | 1.53996 | 59.46 |
| 21 | 33.975 | 11.37 | | |
| 22 | −45.008 | 0.90 | 1.70154 | 41.24 |
| 23 | 446.846 | 3.00 | | |
| 24 (Stop) | ∞ | 1.00 | | |
| 25* | 28.561 | 9.24 | 1.58313 | 59.38 |
| 26* | −46.437 | Variable | | |
| 27 | 152.108 | 1.00 | 1.88300 | 40.76 |
| 28 | 28.638 | 2.00 | 1.85478 | 24.80 |
| 29 | 28.459 | Variable | | |
| 30 | −979.818 | 2.30 | 1.85478 | 24.80 |
| 31 | −28.039 | 1.00 | 1.71999 | 50.23 |
| 32 | 25.246 | Variable | | |
| 33 | 29.339 | 4.00 | 1.61340 | 44.27 |
| 34 | 131.851 | 28.09 | | |
| 35 | −7634.218 | 4.20 | 1.73800 | 32.26 |
| 36 | −22.311 | 1.32 | 1.80810 | 22.76 |
| 37 | −49.000 | Variable | | |
| Image plane | ∞ | | | |

Aspherical surface data

25th surface k = 0.000
A4 = −7.75790e−06, A6 = 5.19318e−11, A8 = −1.38826e−11,
A10 = 2.04906e−13

26th surface k = 0.000
A4 = 6.79048e−06, A6 = −2.80188e−09, A8 = −8.54943e−13,
A10 = 2.19885e−13

| | WE | ST | TE |
|---|---|---|---|
| **Zoom data 1** | | | |
| f | 152.71 | 239.55 | 391.26 |
| FNO. | 4.57 | 4.57 | 4.57 |
| 2ω | 8.08 | 5.14 | 3.15 |
| BF (in air) | 29.01 | 29.01 | 29.01 |
| LTL (in air) | 318.54 | 318.54 | 318.54 |
| d5 | 22.15 | 58.58 | 91.06 |
| d10 | 70.41 | 33.98 | 1.50 |
| d26 | 4.10 | 6.69 | 3.81 |
| d29 | 21.30 | 18.69 | 21.60 |
| d32 | 3.65 | 3.67 | 3.64 |
| d37 | 29.01 | 29.01 | 29.01 |
| **Zoom data 2** | | | |
| OB | 979.3 | 979.3 | 979.3 |
| d5 | 22.15 | 58.58 | 91.06 |
| d10 | 70.41 | 33.98 | 1.50 |
| d26 | 7.08 | 14.05 | 21.92 |
| d29 | 18.80 | 12.05 | 4.54 |

| Unit mm | | | |
|---|---|---|---|
| d32 | 3.18 | 2.96 | 2.40 |
| d37 | 29.01 | 29.01 | 29.01 |

Unit focal length

| | | | |
|---|---|---|---|
| f1 = 231.50 | f2 = −70.98 | f3 = 70.18 | f4 = −40.06 |
| f5 = −40.74 | f6 = 45.03 | | |

Example 13

Unit mm

Surface data

| Surface no. | r | d | nd | νd |
|---|---|---|---|---|
| Object plane | ∞ | ∞ | | |
| 1 | 186.560 | 7.92 | 1.48749 | 70.23 |
| 2 | −2210.980 | 0.30 | | |
| 3 | 155.505 | 3.00 | 1.72047 | 34.71 |
| 4 | 92.440 | 11.80 | 1.43875 | 94.66 |
| 5 | 3662.903 | Variable | | |
| 6 | −1315.400 | 1.90 | 1.48749 | 70.23 |
| 7 | 45.851 | 6.50 | 1.84666 | 23.78 |
| 8 | 68.617 | 5.74 | | |
| 9 | −145.470 | 1.70 | 1.77250 | 49.60 |
| 10 | 184.725 | Variable | | |
| 11 | 89.508 | 6.66 | 1.74400 | 44.78 |
| 12 | −230.408 | 19.20 | | |
| 13 | 50.748 | 6.83 | 1.49700 | 81.54 |
| 14 | −96.508 | 2.00 | 1.88100 | 40.14 |
| 15 | 71.593 | 0.25 | | |
| 16 | 35.629 | 10.00 | 1.80810 | 22.76 |
| 17 | 23.150 | 6.50 | 1.43875 | 94.66 |
| 18 | 168.720 | 3.50 | | |
| 19 | 77.949 | 3.80 | 1.83481 | 42.73 |
| 20 | −74.361 | 0.90 | 1.53996 | 59.46 |
| 21 | 33.975 | 11.37 | | |
| 22 | −45.008 | 0.90 | 1.70154 | 41.24 |
| 23 | 446.846 | 3.00 | | |
| 24 (Stop) | ∞ | 1.00 | | |
| 25* | 28.561 | 9.24 | 1.58313 | 59.38 |
| 26* | −46.437 | Variable | | |
| 27 | 152.108 | 1.00 | 1.88300 | 40.76 |
| 28 | 28.638 | 2.00 | 1.85478 | 24.80 |
| 29 | 28.459 | Variable | | |
| 30 | −979.818 | 2.30 | 1.85478 | 24.80 |
| 31 | −28.039 | 1.00 | 1.71999 | 50.23 |
| 32 | 25.246 | Variable | | |
| 33 | 29.339 | 4.00 | 1.61340 | 44.27 |
| 34 | 131.851 | 1.75 | | |
| 35 | 15.345 | 5.91 | 1.48749 | 70.23 |
| 36 | −59.840 | 0.21 | | |
| 37 | 53.422 | 0.90 | 1.49700 | 81.54 |
| 38 | 21.184 | 3.25 | | |
| 39 | −38.458 | 0.90 | 1.88100 | 40.14 |
| 40 | 19.625 | 6.00 | 1.65412 | 39.68 |
| 41 | −11.985 | 0.90 | 1.88100 | 40.14 |
| 42 | 21.480 | 0.82 | | |
| 43 | 27.434 | 3.20 | 1.73800 | 32.26 |
| 44 | −43.105 | 4.25 | | |
| 45 | −7634.218 | 4.20 | 1.73800 | 32.26 |
| 46 | −22.311 | 1.32 | 1.80810 | 22.76 |
| 47 | −49.000 | Variable | | |
| Image plane | ∞ | | | |

Aspherical surface data

25th surface k = 0.000
A4 = −7.75790e−06, A6 = 5.19318e−11, A8 = −1.38826e−11,
A10 = 2.04906e−13

-continued

| Unit mm | | | |
|---|---|---|---|
| 26th surface | | | |
| k = 0.000 | | | |
| A4 = 6.79048e−06, A6 = −2.80188e−09, A8 = −8.54943e−13, A10 = 2.19885e−13 | | | |
| Zoom data 1 | | | |
| | WE | ST | TE |
| f | 191.11 | 299.78 | 489.65 |
| FNO. | 5.72 | 5.72 | 5.72 |
| 2ω | 6.38 | 4.06 | 2.49 |
| BF (in air) | 29.01 | 29.01 | 29.00 |
| LTL (in air) | 318.54 | 318.54 | 318.54 |
| d5 | 22.15 | 58.58 | 91.06 |
| d10 | 70.41 | 33.98 | 1.50 |
| d26 | 4.10 | 6.69 | 3.81 |
| d29 | 21.30 | 18.69 | 21.60 |
| d32 | 3.65 | 3.67 | 3.64 |
| d47 | 29.01 | 29.01 | 29.00 |
| Unit focal length | | | |
| f1 = 231.50 | f2 = −70.98 | f3 = 70.18 | f4 = −40.06 |
| f5 = −40.74 | f6 = 49.78 | | |

Example 14

| Unit mm | | | | |
|---|---|---|---|---|
| Surface data | | | | |
| Surface no. | r | d | nd | νd |
| Object plane | ∞ | ∞ | | |
| 1 | 194.227 | 8.85 | 1.48749 | 70.23 |
| 2 | −790.562 | 0.40 | | |
| 3 | 143.773 | 3.00 | 1.72047 | 34.71 |
| 4 | 87.588 | 11.84 | 1.43875 | 94.66 |
| 5 | 603.838 | Variable | | |
| 6 | 595.030 | 2.50 | 1.48749 | 70.23 |
| 7 | 44.876 | 7.50 | 1.84666 | 23.78 |
| 8 | 59.624 | 6.41 | | |
| 9 | −116.653 | 1.80 | 1.72916 | 54.68 |
| 10 | 365.411 | Variable | | |
| 11 | 52.695 | 7.43 | 1.74400 | 44.78 |
| 12 | 859.060 | 0.75 | | |
| 13 | 32.120 | 9.26 | 1.49700 | 81.54 |
| 14 | −338.501 | 2.00 | 1.73400 | 51.47 |
| 15 | 28.322 | 7.58 | | |
| 16 | 63.344 | 2.00 | 1.85478 | 24.80 |
| 17 | 33.798 | 10.00 | 1.49700 | 81.54 |
| 18 | 61.134 | 4.93 | | |
| 19 (Stop) | ∞ | 4.00 | | |
| 20* | 30.816 | 7.52 | 1.49700 | 81.54 |
| 21* | −72.746 | Variable | | |
| 22 | −2050.395 | 1.00 | 1.72916 | 54.68 |
| 23 | 31.112 | 2.00 | 1.85478 | 24.80 |
| 24 | 35.983 | Variable | | |
| 25 | 323.835 | 1.20 | 1.75520 | 27.51 |
| 26 | 60.394 | 0.36 | | |
| 27 | 80.909 | 4.20 | 1.51633 | 64.14 |
| 28 | −48.975 | 3.00 | | |
| 29 | 426.502 | 2.80 | 1.85478 | 24.80 |
| 30 | −54.309 | 1.00 | 1.59282 | 68.63 |
| 31 | 46.430 | 2.29 | | |
| 32 | −85.808 | 1.00 | 1.77250 | 49.60 |
| 33 | 50.295 | 3.00 | | |
| 34 | 50.867 | 3.70 | 1.67300 | 38.15 |
| 35 | −183.323 | 31.56 | | |

-continued

| Unit mm | | | | |
|---|---|---|---|---|
| 36 | 39.283 | 6.00 | 1.73800 | 32.26 |
| 37 | −63.358 | 1.50 | 1.80810 | 22.76 |
| 38 | 77.120 | Variable | | |
| Image plane | ∞ | | | |
| Aspherical surface data | | | | |
| 20th surface | | | | |
| k = 0.000 | | | | |
| A4 = −4.31228e−06, A6 = −3.97179e−09, A8 = −5.30871e−12 | | | | |
| 21th surface | | | | |
| k = 0.000 | | | | |
| A4 = 1.69811e−06, A6 = −4.09330e−09, A8 = 7.45483e−13 | | | | |
| | WE | ST | TE | |
| Zoom data 1 | | | | |
| f | 153.00 | 240.01 | 392.01 | |
| FNO. | 4.58 | 4.58 | 4.58 | |
| 2ω | 8.13 | 5.17 | 3.17 | |
| BF (in air) | 28.75 | 28.75 | 28.75 | |
| LTL (in air) | 318.60 | 318.60 | 318.60 | |
| d5 | 31.06 | 64.90 | 97.98 | |
| d10 | 71.94 | 36.96 | 1.50 | |
| d21 | 11.11 | 11.31 | 5.50 | |
| d24 | 13.35 | 14.30 | 22.49 | |
| d38 | 28.75 | 28.75 | 28.75 | |
| Zoom data 2 | | | | |
| OB | 980.0 | 980.0 | 980.0 | |
| d5 | 31.06 | 64.90 | 97.98 | |
| d10 | 71.94 | 36.96 | 1.50 | |
| d21 | 14.56 | 19.38 | 25.01 | |
| d24 | 9.91 | 6.24 | 2.98 | |
| d38 | 28.75 | 28.75 | 28.75 | |
| Unit focal length | | | | |
| f1 = 235.13 | f2 = −76.45 | f3 = 57.75 | f4 = −50.04 | |
| f5 = 208.43 | | | | |

Example 15

| Unit mm | | | | |
|---|---|---|---|---|
| Surface data | | | | |
| Surface no. | r | d | nd | νd |
| Object plane | ∞ | ∞ | | |
| 1 | 194.227 | 8.85 | 1.48749 | 70.23 |
| 2 | −790.562 | 0.40 | | |
| 3 | 143.773 | 3.00 | 1.72047 | 34.71 |
| 4 | 87.588 | 11.84 | 1.43875 | 94.66 |
| 5 | 603.838 | Variable | | |
| 6 | 595.030 | 2.50 | 1.48749 | 70.23 |
| 7 | 44.876 | 7.50 | 1.84666 | 23.78 |
| 8 | 59.624 | 6.41 | | |
| 9 | −116.653 | 1.80 | 1.72916 | 54.68 |
| 10 | 365.411 | Variable | | |
| 11 | 52.695 | 7.43 | 1.74400 | 44.78 |
| 12 | 859.060 | 0.75 | | |
| 13 | 32.120 | 9.26 | 1.49700 | 81.54 |
| 14 | −338.501 | 2.00 | 1.73400 | 51.47 |
| 15 | 28.322 | 7.58 | | |
| 16 | 63.344 | 2.00 | 1.85478 | 24.80 |
| 17 | 33.798 | 10.00 | 1.49700 | 81.54 |
| 18 | 61.134 | 4.93 | | |
| 19 (Stop) | ∞ | 4.00 | | |
| 20* | 30.816 | 7.52 | 1.49700 | 81.54 |
| 21* | −72.746 | Variable | | |

-continued

| Unit mm | | | | |
|---|---|---|---|---|
| 22 | −2050.395 | 1.00 | 1.72916 | 54.68 |
| 23 | 31.112 | 2.00 | 1.85478 | 24.80 |
| 24 | 35.983 | Variable | | |
| 25 | 323.835 | 1.20 | 1.75520 | 27.51 |
| 26 | 60.394 | 0.36 | | |
| 27 | 80.909 | 4.20 | 1.51633 | 64.14 |
| 28 | −48.975 | 3.00 | | |
| 29 | 426.502 | 2.80 | 1.85478 | 24.80 |
| 30 | −54.309 | 1.00 | 1.59282 | 68.63 |
| 31 | 46.430 | 2.29 | | |
| 32 | −85.808 | 1.00 | 1.77250 | 49.60 |
| 33 | 50.295 | 3.00 | | |
| 34 | 50.867 | 3.70 | 1.67300 | 38.15 |
| 35 | −183.323 | 5.26 | | |
| 36 | 15.080 | 5.91 | 1.48749 | 70.23 |
| 37 | −66.979 | 0.21 | | |
| 38 | 53.422 | 0.90 | 1.49700 | 81.54 |
| 39 | 21.184 | 3.25 | | |
| 40 | −38.458 | 0.90 | 1.88100 | 40.14 |
| 41 | 19.625 | 6.00 | 1.65412 | 39.68 |
| 42 | −11.985 | 0.90 | 1.88100 | 40.14 |
| 43 | 21.480 | 0.82 | | |
| 44 | 29.898 | 3.20 | 1.73800 | 32.26 |
| 45 | −37.992 | 4.20 | | |
| 46 | 39.283 | 6.00 | 1.73800 | 32.26 |
| 47 | −63.358 | 1.50 | 1.80810 | 22.76 |
| 48 | 77.120 | Variable | | |
| Image plane | ∞ | | | |

Aspherical surface data

20th surface k = 0.000
A4 = −4.31228e−06, A6 = −3.97179e−09, A8 = −5.30871e−12

21th surface k = 0.000
A4 = 1.69811e−06, A6 = −4.09330e−09, A8 = 7.45483e−13

| Zoom data 1 | | | |
|---|---|---|---|
| | WE | ST | TE |
| f | 191.06 | 299.72 | 489.52 |
| FNO. | 5.72 | 5.72 | 5.72 |
| 2ω | 6.39 | 4.07 | 2.49 |
| BF (in air) | 28.75 | 28.75 | 28.75 |
| LTL (in air) | 318.60 | 318.60 | 318.60 |
| d5 | 31.06 | 64.90 | 97.98 |
| d10 | 71.94 | 36.96 | 1.50 |
| d21 | 11.11 | 11.31 | 5.50 |
| d24 | 13.35 | 14.30 | 22.49 |
| d48 | 28.75 | 28.75 | 28.75 |

Unit focal length f1 = 235.13 f2 = −76.45 f3 = 57.75 f4 = −50.04
f5 = −134.82

Example 16

Unit mm

Surface data

| Surface no. | r | d | nd | νd |
|---|---|---|---|---|
| Object plane | ∞ | ∞ | | |
| 1 | 136.167 | 12.48 | 1.48749 | 70.23 |
| 2 | 4007.094 | 0.20 | | |
| 3 | 126.381 | 3.00 | 1.67300 | 38.15 |
| 4 | 70.832 | 17.39 | 1.43875 | 94.66 |

-continued

| Unit mm | | | | |
|---|---|---|---|---|
| 5 | 627.438 | Variable | | |
| 6 | −1128.152 | 3.17 | 1.84666 | 23.78 |
| 7 | −89.953 | 1.60 | 1.48749 | 70.23 |
| 8 | 49.320 | 2.85 | 1.80610 | 33.27 |
| 9 | 61.759 | 4.93 | | |
| 10 | −82.912 | 1.50 | 1.83481 | 42.71 |
| 11 | 155.228 | Variable | | |
| 12 (Stop) | ∞ | 1.80 | | |
| 13* | 59.929 | 5.95 | 1.49700 | 81.54 |
| 14* | −150.255 | 1.98 | | |
| 15 | −683.173 | 1.50 | 1.84666 | 23.78 |
| 16 | 83.039 | 9.43 | 1.59282 | 68.63 |
| 17 | −106.121 | 0.20 | | |
| 18 | 66.462 | 7.65 | 1.49700 | 81.54 |
| 19 | −53.205 | Variable | | |
| 20* | 982.456 | 1.50 | 1.74320 | 49.29 |
| 21 | 22.498 | 2.90 | 1.80518 | 25.42 |
| 22 | 33.932 | Variable | | |
| 23 | 132.876 | 1.40 | 1.69680 | 55.53 |
| 24 | 45.457 | Variable | | |
| 25 | 353.096 | 3.02 | 1.43875 | 94.66 |
| 26 | −47.475 | 0.97 | | |
| 27 | 119.943 | 2.45 | 1.85478 | 24.80 |
| 28 | −95.645 | 0.90 | 1.59282 | 68.63 |
| 29 | 49.369 | 1.86 | | |
| 30 | −178.717 | 0.90 | 1.77250 | 49.60 |
| 31 | 54.524 | 2.69 | | |
| 32 | 43.898 | 3.18 | 1.69680 | 55.53 |
| 33 | −835.837 | 39.38 | | |
| 34 | 33.810 | 4.69 | 1.67300 | 38.15 |
| 35 | 919.956 | 1.30 | 1.92286 | 20.88 |
| 36 | 48.339 | Variable | | |
| Image plane | ∞ | | | |

Aspherical surface data

13th surface k = 0.000
A4 = −2.29861e−06, A6 = −3.96906e−09, A8 = 1.22868e−11,
A10 = −4.18684e−14

14th surface k = 0.000
A4 = 3.84772e−06, A6 = −2.42464e−09, A8 = 1.17099e−11,
A10 = −3.81267e−14

20th surface k = −1.010
A4 = −1.65301e−09, A6 = 4.65449e−10

| | WE | ST | TE |
|---|---|---|---|
| Zoom data 1 | | | |
| f | 136.88 | 220.20 | 353.30 |
| FNO. | 4.08 | 4.08 | 4.08 |
| 2ω | 9.08 | 5.64 | 3.51 |
| BF (in air) | 30.03 | 30.03 | 30.03 |
| LTL (in air) | 299.52 | 299.53 | 299.52 |
| d5 | 46.28 | 73.12 | 98.52 |
| d11 | 55.11 | 28.27 | 2.87 |
| d19 | 6.77 | 7.51 | 3.61 |
| d22 | 14.38 | 11.58 | 14.85 |
| d24 | 4.18 | 6.24 | 6.86 |
| d36 | 30.03 | 30.03 | 30.03 |
| Zoom data 2 | | | |
| OB | 999.1 | 999.1 | 999.1 |
| d5 | 46.28 | 73.12 | 98.52 |
| d11 | 55.11 | 28.27 | 2.87 |
| d19 | 8.70 | 12.40 | 16.47 |

-continued

| Unit mm | | | |
|---|---|---|---|
| d22 | 13.19 | 9.09 | 5.62 |
| d24 | 3.44 | 3.84 | 3.24 |
| d36 | 30.03 | 30.03 | 30.03 |

| Unit focal length | | | |
|---|---|---|---|
| f1 = 206.25 | f2 = −53.75 | f3 = 37.76 | f4 = −49.82 |
| f5 = −99.82 | f6 = 105.85 | | |

Example 17

Unit mm

Surface data

| Surface no. | r | d | nd | νd |
|---|---|---|---|---|
| Object plane | ∞ | ∞ | | |
| 1 | 136.167 | 12.48 | 1.48749 | 70.23 |
| 2 | 4007.094 | 0.20 | | |
| 3 | 126.381 | 3.00 | 1.67300 | 38.15 |
| 4 | 70.832 | 17.39 | 1.43875 | 94.66 |
| 5 | 627.438 | Variable | | |
| 6 | −1128.152 | 3.17 | 1.84666 | 23.78 |
| 7 | −89.953 | 1.60 | 1.48749 | 70.23 |
| 8 | 49.320 | 2.85 | 1.80610 | 33.27 |
| 9 | 61.759 | 4.93 | | |
| 10 | −82.912 | 1.50 | 1.83481 | 42.71 |
| 11 | 155.228 | Variable | | |
| 12 (Stop) | ∞ | 1.80 | | |
| 13* | 59.929 | 5.95 | 1.49700 | 81.54 |
| 14* | −150.255 | 1.98 | | |
| 15 | −683.173 | 1.50 | 1.84666 | 23.78 |
| 16 | 83.039 | 9.43 | 1.59282 | 68.63 |
| 17 | −106.121 | 0.20 | | |
| 18 | 66.462 | 7.65 | 1.49700 | 81.54 |
| 19 | −53.205 | Variable | | |
| 20* | 982.456 | 1.50 | 1.74320 | 49.29 |
| 21 | 22.498 | 2.90 | 1.80518 | 25.42 |
| 22 | 33.932 | Variable | | |
| 23 | 132.876 | 1.40 | 1.69680 | 55.53 |
| 24 | 45.457 | Variabl | | |
| 25 | 353.096 | 3.02 | 1.43875 | 94.66 |
| 26 | −47.475 | 0.97 | | |
| 27 | 119.943 | 2.45 | 1.85478 | 24.80 |
| 28 | −95.645 | 0.90 | 1.59282 | 68.63 |
| 29 | 49.369 | 1.86 | | |
| 30 | −178.717 | 0.90 | 1.77250 | 49.60 |
| 31 | 54.524 | 2.69 | | |
| 32 | 43.898 | 3.18 | 1.69680 | 55.53 |
| 33 | −835.837 | 1.65 | | |
| 34 | 21.620 | 5.24 | 1.54072 | 47.23 |
| 35 | 145.686 | 0.30 | | |
| 36 | 30.470 | 4.64 | 1.60342 | 38.03 |
| 37 | −628.503 | 1.15 | 1.90366 | 31.32 |
| 38 | 19.203 | 9.85 | | |
| 39 | 141.283 | 0.95 | 1.88300 | 40.76 |
| 40 | 11.229 | 6.40 | 1.72047 | 34.71 |
| 41 | −17.932 | 0.95 | 1.88300 | 40.76 |
| 42 | 29.070 | 0.54 | | |
| 43 | 23.622 | 6.01 | 1.61340 | 44.27 |
| 44 | 475.765 | 1.70 | | |
| 45 | 33.810 | 4.69 | 1.67300 | 38.15 |
| 46 | 919.956 | 1.30 | 1.92286 | 20.88 |
| 47 | 48.339 | Variable | | |
| Image plane | ∞ | | | |

Aspherical surface data

13th surface k = 0.000
A4 = −2.29861e−06, A6 = −3.96906e−09, A8 = 1.22868e−11,
A10 = −4.18684e−14

14th surface k = 0.000
A4 = 3.84772e−06, A6 = −2.42464e−09, A8 = 1.17099e−11,
A10 = −3.81267e−14

20th surface k = −1.010
A4 = −1.65301e−09, A6 = 4.65449e−10

Zoom data 1

| | WE | ST | TE |
|---|---|---|---|
| f | 192.94 | 310.41 | 498.00 |
| FNO. | 5.74 | 5.75 | 5.74 |
| 2ω | 6.35 | 3.94 | 2.46 |
| BF (in air) | 30.03 | 30.03 | 30.03 |
| LTL (in air) | 299.52 | 299.53 | 299.52 |
| d5 | 46.28 | 73.12 | 98.52 |
| d11 | 55.11 | 28.27 | 2.87 |
| d19 | 6.77 | 7.51 | 3.61 |
| d22 | 14.38 | 11.58 | 14.85 |
| d24 | 4.18 | 6.24 | 6.86 |
| d47 | 30.03 | 30.03 | 30.03 |

| Unit focal length | | | |
|---|---|---|---|
| f1 = 206.25 | f2 = −53.75 | f3 = 37.76 | f4 = −49.82 |
| f5 = −99.82 | f6 = 584.42 | | |

Example 18

Unit mm

Surface data

| Surface no. | r | d | nd | νd |
|---|---|---|---|---|
| Object plane | ∞ | ∞ | | |
| 1 | 136.167 | 12.48 | 1.48749 | 70.23 |
| 2 | 4007.094 | 0.20 | | |
| 3 | 126.381 | 3.00 | 1.67300 | 38.15 |
| 4 | 70.832 | 17.39 | 1.43875 | 94.66 |
| 5 | 627.438 | Variable | | |
| 6 | −1128.152 | 3.17 | 1.84666 | 23.78 |
| 7 | −89.953 | 1.60 | 1.48749 | 70.23 |
| 8 | 49.320 | 2.85 | 1.80610 | 33.27 |
| 9 | 61.759 | 4.93 | | |
| 10 | −82.912 | 1.50 | 1.83481 | 42.71 |
| 11 | 155.228 | Variable | | |
| 12(絞り) | ∞ | 1.80 | | |
| 13* | 59.929 | 5.95 | 1.49700 | 81.54 |
| 14* | −150.255 | 1.98 | | |
| 15 | −683.173 | 1.50 | 1.84666 | 23.78 |
| 16 | 83.039 | 9.43 | 1.59282 | 68.63 |
| 17 | −106.121 | 0.20 | | |
| 18 | 66.462 | 7.65 | 1.49700 | 81.54 |
| 19 | −53.205 | Variable | | |
| 20* | 982.456 | 1.50 | 1.74320 | 49.29 |
| 21 | 22.498 | 2.90 | 1.80518 | 25.42 |
| 22 | 33.932 | Variable | | |
| 23 | 132.876 | 1.40 | 1.69680 | 55.53 |
| 24 | 45.457 | Variable | | |
| 25 | 353.096 | 3.02 | 1.43875 | 94.66 |
| 26 | −47.475 | 0.97 | | |
| 27 | 119.943 | 2.45 | 1.85478 | 24.80 |
| 28 | −95.645 | 0.90 | 1.59282 | 68.63 |
| 29 | 49.369 | 1.86 | | |
| 30 | −178.717 | 0.90 | 1.77250 | 49.60 |
| 31 | 54.524 | 2.69 | | |
| 32 | 43.898 | 3.18 | 1.69680 | 55.53 |

| Unit mm | | | | |
|---|---|---|---|---|
| 33 | −835.837 | 3.49 | | |
| 34 | −51.576 | 2.50 | 2.00100 | 29.13 |
| 35 | 52.652 | 8.32 | 1.92286 | 20.88 |
| 36 | −45.826 | 0.30 | | |
| 37 | −61.190 | 2.00 | 1.92286 | 20.88 |
| 38 | −153.015 | 5.51 | 1.88300 | 40.76 |
| 39 | −69.884 | 0.30 | | |
| 40 | 90.469 | 2.14 | 1.88300 | 40.76 |
| 41 | 166.550 | 0.30 | | |
| 42 | 46.887 | 9.41 | 1.88300 | 40.76 |
| 43 | −51.670 | 1.50 | 1.85478 | 24.80 |
| 44 | 40.513 | 3.61 | | |
| 45 | 33.810 | 4.69 | 1.67300 | 38.15 |
| 46 | 919.956 | 1.30 | 1.92286 | 20.88 |
| 47 | 48.339 | Variable | | |
| Image plane | ∞ | | | |

Aspherical surface data

13th surface k = 0.000
A4 = −2.29861e−06, A6 = −3.96906e−09, A8 = 1.22868e−11,
A10 = −4.18684e−14

14th surface k = 0.000
A4 = 3.84772e−06, A6 = −2.42464e−09, A8 = 1.17099e−11,
A10 = −3.81267e−14

20th surface k = −1.010
A4 = −1.65301e−09, A6 = 4.65449e−10

Zoom data 1

| | WE | ST | TE |
|---|---|---|---|
| f | 97.89 | 157.48 | 252.67 |
| FNO. | 2.91 | 2.91 | 2.91 |
| 2ω | 12.72 | 7.89 | 4.91 |
| BF (in air) | 30.03 | 30.03 | 30.03 |
| LTL (in air) | 299.52 | 299.52 | 299.52 |
| d5 | 46.28 | 73.12 | 98.52 |
| d11 | 55.11 | 28.27 | 2.87 |
| d19 | 6.77 | 7.51 | 3.61 |
| d22 | 14.38 | 11.58 | 14.85 |
| d24 | 4.18 | 6.24 | 6.86 |
| d47 | 30.03 | 30.03 | 30.03 |

Unit focal length f1 = 206.25 f2 = −53.75 f3 = 37.76 f4 = −49.82
f5 = −99.82 f6 = 65.65

Example 19

Unit mm

Surface data

| Surface no. | r | d | nd | νd |
|---|---|---|---|---|
| Object plane | ∞ | ∞ | | |
| 1 | 113.660 | 12.34 | 1.48749 | 70.23 |
| 2 | 4723.991 | 0.20 | | |
| 3 | 109.753 | 3.60 | 1.72047 | 34.71 |
| 4 | 62.259 | 17.24 | 1.43875 | 94.66 |
| 5 | 2255.011 | Variable | | |
| 6 | −218.647 | 2.20 | 1.69680 | 55.53 |
| 7 | 46.547 | 7.50 | 1.85025 | 30.05 |
| 8 | 140.697 | 3.27 | | |
| 9 | −397.467 | 1.80 | 1.48749 | 70.23 |

| Unit mm | | | | |
|---|---|---|---|---|
| 10 | 90.053 | Variable | | |
| 11 | 90.812 | 6.50 | 1.61800 | 63.40 |
| 12 | −223.265 | 11.90 | | |
| 13 | 136.600 | 6.80 | 1.49700 | 81.54 |
| 14 | −90.555 | 2.00 | 1.80000 | 29.84 |
| 15 | −522.620 | Variable | | |
| 16 (Stop) | ∞ | 2.00 | | |
| 17 | 78.264 | 2.00 | 1.95375 | 32.32 |
| 18 | 32.106 | 8.16 | 1.49700 | 81.54 |
| 19 | −81.298 | 1.80 | 1.85025 | 30.05 |
| 20 | −308.610 | 0.30 | | |
| 21 | 38.195 | 4.54 | 1.73800 | 32.26 |
| 22 | 341.955 | Variable | | |
| 23 | 595.928 | 1.00 | 1.77250 | 49.60 |
| 24 | 21.166 | 2.00 | 1.80810 | 22.76 |
| 25 | 27.947 | Variable | | |
| 26 | 32.525 | 2.00 | 1.80810 | 22.76 |
| 27 | 134.186 | 1.00 | 1.88300 | 40.76 |
| 28 | 19.580 | Variable | | |
| 29 | 54.449 | 3.50 | 1.43875 | 94.66 |
| 30 | −28.871 | 3.00 | | |
| 31 | 153.778 | 3.00 | 1.85478 | 24.80 |
| 32 | −29.747 | 1.00 | 1.75500 | 52.32 |
| 33 | 20.074 | 4.02 | | |
| 34 | −26.292 | 1.00 | 1.88300 | 40.76 |
| 35 | −49.083 | 3.00 | | |
| 36 | 42.128 | 5.20 | 1.69895 | 30.13 |
| 37 | −21.482 | 0.20 | | |
| 38 | −25.000 | 4.20 | 1.85478 | 24.80 |
| 39 | −14.925 | 1.50 | 1.94595 | 17.98 |
| 40 | −47.324 | Variable | | |
| Image plane | ∞ | | | |

| | WE | ST | TE |
|---|---|---|---|
| Zoom data 1 | | | |
| f | 149.85 | 235.09 | 383.85 |
| FNO. | 4.49 | 4.49 | 4.48 |
| 2ω | 8.21 | 5.23 | 3.19 |
| d5 | 2.84 | 25.90 | 44.24 |
| d10 | 65.10 | 33.85 | 1.80 |
| d15 | 3.10 | 11.29 | 25.00 |
| d22 | 17.80 | 13.54 | 3.00 |
| d25 | 5.00 | 8.05 | 18.70 |
| d28 | 6.23 | 7.44 | 7.33 |
| d40 | 28.08 | 28.08 | 28.08 |
| Zoom data 2 | | | |
| OB | 851.8 | 851.8 | 851.8 |
| d5 | 2.84 | 25.90 | 44.24 |
| d10 | 65.10 | 33.85 | 1.80 |
| d15 | 3.10 | 11.29 | 25.00 |
| d22 | 20.67 | 20.33 | 17.94 |
| d25 | 4.55 | 4.27 | 6.17 |
| d28 | 3.82 | 4.43 | 4.94 |
| d40 | 28.08 | 28.08 | 28.08 |
| BF (in air) | 28.08 | 28.08 | 28.08 |
| LTL (in air) | 257.92 | 257.92 | 257.92 |

Unit focal length f1 = 164.32 f2 = −78.24 f3 = 89.67 f4 = 71.93
f5 = −38.73 f6 = −55.99 f7 = 80.58

Example 20

| Unit mm | | | | |
|---|---|---|---|---|
| Surface data | | | | |
| Surface no. | r | d | nd | νd |
| Object plane | ∞ | ∞ | | |
| 1 | 182.793 | 8.90 | 1.48749 | 70.23 |
| 2 | −773.063 | 0.40 | | |
| 3 | 128.644 | 3.00 | 1.72047 | 34.71 |
| 4 | 80.920 | 11.75 | 1.43875 | 94.66 |
| 5 | 398.021 | Variable | | |
| 6 | 288.158 | 2.20 | 1.48749 | 70.23 |
| 7 | 42.798 | 7.10 | 1.84666 | 23.78 |
| 8 | 53.816 | 5.61 | | |
| 9 | −114.243 | 1.80 | 1.72916 | 54.68 |
| 10 | 360.334 | Variable | | |
| 11 | 54.948 | 7.25 | 1.74400 | 44.78 |
| 12 | 4333.735 | 0.73 | | |
| 13 | 35.207 | 9.32 | 1.49700 | 81.54 |
| 14 | −188.319 | 2.53 | 1.73400 | 51.47 |
| 15 | 31.337 | 6.91 | | |
| 16 | 73.418 | 2.00 | 1.85478 | 24.80 |
| 17 | 36.736 | 4.94 | 1.49700 | 81.54 |
| 18 | 70.971 | 4.37 | | |
| 19 (Stop) | ∞ | Variable | | |
| 20* | 33.391 | 8.93 | 1.49700 | 81.54 |
| 21* | −71.853 | Variable | | |
| 22 | 2769.769 | 1.00 | 1.72916 | 54.68 |
| 23 | 25.306 | 2.00 | 1.85478 | 24.80 |
| 24 | 31.785 | Variable | | |
| 25 | 142.096 | 1.20 | 1.75520 | 27.51 |
| 26 | 45.141 | 2.90 | | |
| 27 | 45.692 | 4.20 | 1.51633 | 64.14 |
| 28 | −49.767 | 3.00 | | |
| 29 | 118.585 | 2.80 | 1.85478 | 24.80 |
| 30 | −80.427 | 1.00 | 1.59282 | 68.63 |
| 31 | 47.402 | 1.84 | | |
| 32 | −101.774 | 1.00 | 1.77250 | 49.60 |
| 33 | 45.971 | 3.00 | | |
| 34 | 46.082 | 3.70 | 1.67300 | 38.15 |
| 35 | 270.819 | 30.00 | | |
| 36 | 40.511 | 6.00 | 1.74951 | 35.33 |
| 37 | −51.068 | 1.50 | 1.80518 | 25.42 |
| 38 | 74.717 | Variable | | |
| Image plane | ∞ | | | |

Aspherical Surface data

20th surface k = 0.000
A4 = −3.75524e−06, A6 = −2.17024e−09, A8 = −4.07174e−12

21th surface k = 0.000
A4 = 1.48614e−06, A6 = −2.09476e−09, A8 = −9.65410e−13

| | WE | ST | TE |
|---|---|---|---|
| Zoom data 1 | | | |
| f | 152.21 | 238.78 | 389.97 |
| FNO. | 4.56 | 4.56 | 4.56 |
| 2ω | 8.17 | 5.20 | 3.19 |
| BF (in air) | 28.65 | 28.65 | 28.65 |
| LTL (in air) | 318.49 | 318.49 | 318.49 |
| d5 | 29.11 | 61.87 | 95.64 |
| d10 | 75.02 | 37.39 | 1.50 |
| d19 | 4.03 | 8.90 | 11.02 |
| d21 | 11.57 | 12.07 | 5.50 |
| d24 | 17.23 | 16.73 | 23.30 |
| d38 | 28.65 | 28.65 | 28.6 |
| Zoom data 2 | | | |
| OB | 980.0 | 980.0 | 980.0 |
| d5 | 29.11 | 61.87 | 95.64 |

-continued

| Unit mm | | | |
|---|---|---|---|
| d10 | 75.02 | 37.39 | 1.50 |
| d19 | 4.03 | 8.90 | 11.02 |
| d21 | 14.88 | 19.96 | 24.99 |
| d24 | 13.92 | 8.84 | 3.81 |
| d38 | 28.65 | 28.65 | 28.65 |

Unit focal length f1 = 226.98 f2 = −74.95 f3 = 179.82 f4 = 47.20
f5 = −46.49 f6 = 167.21

Example 21

| Unit mm | | | | |
|---|---|---|---|---|
| Surface data | | | | |
| Surface no. | r | d | nd | νd |
| Object plane | ∞ | ∞ | | |
| 1 | 182.793 | 8.90 | 1.48749 | 70.23 |
| 2 | −773.063 | 0.40 | | |
| 3 | 128.644 | 3.00 | 1.72047 | 34.71 |
| 4 | 80.920 | 11.75 | 1.43875 | 94.66 |
| 5 | 398.021 | Variable | | |
| 6 | 288.158 | 2.20 | 1.48749 | 70.23 |
| 7 | 42.798 | 7.10 | 1.84666 | 23.78 |
| 8 | 53.816 | 5.61 | | |
| 9 | −114.243 | 1.80 | 1.72916 | 54.68 |
| 10 | 360.334 | Variable | | |
| 11 | 54.948 | 7.25 | 1.74400 | 44.78 |
| 12 | 4333.735 | 0.73 | | |
| 13 | 35.207 | 9.32 | 1.49700 | 81.54 |
| 14 | −188.319 | 2.53 | 1.73400 | 51.47 |
| 15 | 31.337 | 6.91 | | |
| 16 | 73.418 | 2.00 | 1.85478 | 24.80 |
| 17 | 36.736 | 4.94 | 1.49700 | 81.54 |
| 18 | 70.971 | 4.37 | | |
| 19 (Stop) | ∞ | Variable | | |
| 20* | 33.391 | 8.93 | 1.49700 | 81.54 |
| 21* | −71.853 | Variable | | |
| 22 | 2769.769 | 1.00 | 1.72916 | 54.68 |
| 23 | 25.306 | 2.00 | 1.85478 | 24.80 |
| 24 | 31.785 | Variable | | |
| 25 | 142.096 | 1.20 | 1.75520 | 27.51 |
| 26 | 45.141 | 2.90 | | |
| 27 | 45.692 | 4.20 | 1.51633 | 64.14 |
| 28 | −49.767 | 3.00 | | |
| 29 | 118.585 | 2.80 | 1.85478 | 24.80 |
| 30 | −80.427 | 1.00 | 1.59282 | 68.63 |
| 31 | 47.402 | 1.84 | | |
| 32 | −101.774 | 1.00 | 1.77250 | 49.60 |
| 33 | 45.971 | 3.00 | | |
| 34 | 46.082 | 3.70 | 1.67300 | 38.15 |
| 35 | 270.819 | 6.00 | | |
| 36 | 16.111 | 5.52 | 1.48749 | 70.23 |
| 37 | −84.774 | 0.43 | | |
| 38 | 52.118 | 1.02 | 1.49700 | 81.54 |
| 39 | 25.550 | 2.21 | | |
| 40 | −98.115 | 0.90 | 1.88100 | 40.14 |
| 41 | 13.481 | 6.59 | 1.67300 | 38.15 |
| 42 | −13.139 | 0.90 | 1.88100 | 40.14 |
| 43 | 22.295 | 1.36 | | |
| 44 | 33.953 | 2.93 | 1.73800 | 32.26 |
| 45 | −86.500 | 2.12 | | |

| Unit mm | | | | |
|---|---|---|---|---|
| 46 | 40.511 | 6.00 | 1.74951 | 35.33 |
| 47 | −51.068 | 1.50 | 1.80518 | 25.42 |
| 48 | 74.717 | Variable | | |
| Image plane | ∞ | | | |

Aspherical surface data

20th surface k = 0.000
A4 = −3.75524e−06, A6 = −2.17024e−09, A8 = −4.07174e−12

21th surface k = 0.000
A4 = 1.48614e−06, A6 = −2.09476e−09, A8 = −9.65410e−13

Zoom data 1

| | WE | ST | TE |
|---|---|---|---|
| f | 190.23 | 298.42 | 487.38 |
| FNO. | 5.69 | 5.70 | 5.69 |
| 2ω | 6.42 | 4.09 | 2.50 |
| BF (in air) | 28.65 | 28.65 | 28.65 |
| LTL (in air) | 318.50 | 318.50 | 318.50 |
| d5 | 29.11 | 61.87 | 95.64 |
| d10 | 75.02 | 37.39 | 1.50 |
| d19 | 4.03 | 8.90 | 11.02 |
| d21 | 11.57 | 12.07 | 5.50 |
| d24 | 17.23 | 16.73 | 23.30 |
| d48 | 28.65 | 28.65 | 28.65 |

Unit focal length f1 = 226.98 f2 = −74.95 f3 = 179.82 f4 = 47.20
f5 = −46.49 f6 = −200.08

Example 22

Unit mm

Surface data

| Surface no. | r | d | nd | νd |
|---|---|---|---|---|
| Object plane | ∞ | ∞ | | |
| 1 | 172.870 | 10.75 | 1.43875 | 94.66 |
| 2 | −887.478 | 0.20 | | |
| 3 | 130.635 | 5.32 | 1.83400 | 37.16 |
| 4 | 85.312 | 12.90 | 1.43875 | 94.66 |
| 5 | 678.206 | Variable | | |
| 6 | 538.042 | 2.20 | 1.49700 | 81.54 |
| 7 | 37.873 | 7.50 | 1.85478 | 24.80 |
| 8 | 49.873 | 10.17 | | |
| 9 | −81.209 | 1.80 | 1.72916 | 54.68 |
| 10 | 507.207 | Variable | | |
| 11 | 50.315 | 6.91 | 1.70154 | 41.24 |
| 12 | 4949.561 | 0.50 | | |
| 13 | 32.171 | 7.31 | 1.49700 | 81.54 |
| 14 | 162.839 | 2.71 | | |
| 15 (Stop) | ∞ | 2.00 | | |
| 16 | 383.614 | 4.47 | 2.00100 | 29.13 |
| 17 | 22.484 | 7.55 | 1.49700 | 81.54 |
| 18* | −326.723 | 4.00 | | |
| 19 | −162.577 | 3.60 | 1.80100 | 34.97 |
| 20 | −25.662 | 1.15 | 1.72916 | 54.68 |
| 21 | 633.523 | 0.93 | | |
| 22 | −135.760 | 1.15 | 1.78800 | 47.37 |
| 23 | 69.733 | 3.50 | | |
| 24* | 28.749 | 7.00 | 1.61881 | 63.85 |
| 25* | −52.806 | Variable | | |
| 26 | 162.828 | 1.36 | 1.69680 | 55.53 |
| 27 | 22.050 | 2.10 | 1.80810 | 22.76 |
| 28 | 27.748 | Variable | | |
| 29 | −341.518 | 1.00 | 1.48749 | 70.23 |
| 30 | 45.226 | 3.38 | | |
| 31 | 93.105 | 4.50 | 1.80810 | 22.76 |
| 32 | −33.849 | 0.20 | | |
| 33 | −40.290 | 3.60 | 1.85478 | 24.80 |
| 34 | −27.124 | 1.50 | 1.94595 | 17.98 |
| 35 | −147.411 | Variable | | |
| Image plane | ∞ | | | |

Aspherical surface data

18th surface k = 0.000
A4 = −4.16816e−07, A6 = 8.56099e−09, A8 = −8.39631e−13

24th surface k = 0.000
A4 = −1.43628e−05, A6 = 5.80934e−09, A8 = −3.69606e−11

25th surface k = 0.000
A4 = −1.22432e−06, A6 = 2.15531e−09, A8 = −2.94013e−11

Zoom data 1

| | WE | ST | TE |
|---|---|---|---|
| f | 101.99 | 199.98 | 392.06 |
| FNO. | 4.08 | 4.31 | 4.58 |
| 2ω | 12.06 | 6.12 | 3.12 |
| BF (in air) | 39.50 | 39.50 | 39.50 |
| LTL (in air) | 276.09 | 289.28 | 307.27 |
| d5 | 5.58 | 60.02 | 107.02 |
| d10 | 71.76 | 30.50 | 1.50 |
| d25 | 6.52 | 11.66 | 3.19 |
| d28 | 31.47 | 26.33 | 34.80 |
| d35 | 39.50 | 39.50 | 39.50 |

Zoom data 2

| | | | |
|---|---|---|---|
| OB | 1101.7 | 1101.7 | 1101.7 |
| d5 | 5.58 | 60.02 | 107.02 |
| d10 | 71.76 | 30.50 | 1.50 |
| d25 | 8.34 | 18.94 | 27.70 |
| d28 | 29.65 | 19.06 | 10.29 |
| d35 | 39.50 | 39.50 | 39.50 |

Unit focal length f1 = 233.87 f2 = −59.99 f3 = 53.72 f4 = −51.55
f5 = 341.31

Example 23

Unit mm

Surface data

| Surface no. | r | d | nd | νd |
|---|---|---|---|---|
| Object plane | ∞ | ∞ | | |
| 1 | 148.261 | 16.65 | 1.43875 | 94.66 |
| 2 | −1019.961 | 0.20 | | |
| 3 | 113.409 | 3.63 | 1.83400 | 37.16 |
| 4 | 74.430 | 14.24 | 1.43875 | 94.66 |
| 5 | 675.743 | Variable | | |
| 6 | 478.085 | 2.36 | 1.49700 | 81.54 |
| 7 | 35.527 | 7.16 | 1.85478 | 24.80 |
| 8 | 45.697 | 11.42 | | |
| 9 | −77.183 | 1.80 | 1.72916 | 54.68 |
| 10 | 854.382 | Variable | | |
| 11 | 53.398 | 10.00 | 1.70154 | 41.24 |

-continued

| Unit mm | | | | |
|---|---|---|---|---|
| 12 | −1854.279 | 1.51 | | |
| 13 | 35.452 | 6.81 | 1.49700 | 81.54 |
| 14 | 479.580 | 2.51 | | |
| 15 (Stop) | ∞ | 2.02 | | |
| 16 | −374.630 | 3.42 | 2.00100 | 29.13 |
| 17 | 26.523 | 8.00 | 1.49700 | 81.54 |
| 18* | −106.871 | 4.66 | | |
| 19 | −190.014 | 3.67 | 1.80100 | 34.97 |
| 20 | −26.724 | 1.25 | 1.72916 | 54.68 |
| 21 | 322.259 | 1.10 | | |
| 22 | −126.125 | 1.15 | 1.78800 | 47.37 |
| 23 | 82.894 | 3.50 | | |
| 24* | 31.074 | 9.02 | 1.61881 | 63.85 |
| 25 | −48.918 | Variable | | |
| 26 | 120.921 | 1.13 | 1.69680 | 55.53 |
| 27 | 20.985 | 2.02 | 1.80810 | 22.76 |
| 28 | 26.393 | Variable | | |
| 29 | 59.215 | 2.00 | 1.72825 | 28.46 |
| 30 | −56.117 | 1.00 | 1.77250 | 49.60 |
| 31 | 27.371 | 7.95 | | |
| 32 | 39.512 | 4.50 | 1.80810 | 22.76 |
| 33 | −43.396 | 0.20 | | |
| 34 | −78.699 | 3.60 | 1.85478 | 24.80 |
| 35 | −23.509 | 1.50 | 1.94595 | 17.98 |
| 36 | 75.661 | Variable | | |
| Image plane | ∞ | | | |

Aspherical surface data

18th surface k = 0.000
A4 = −3.42868e−07, A6 = 5.46714e−09, A8 = −1.74774e−12

24th surface k = 0.000
A4 = −1.15038e−05, A6 = 1.97573e−09, A8 = −2.10793e−12

| | WE | ST | TE |
|---|---|---|---|
| Zoom data 1 | | | |
| f | 102.00 | 199.99 | 392.13 |
| FNO. | 4.08 | 4.08 | 4.08 |
| 2ω | 12.05 | 6.13 | 3.12 |
| BF (in air) | 29.27 | 29.27 | 29.27 |
| LTL (in air) | 316.10 | 300.29 | 296.10 |
| d5 | 12.94 | 51.47 | 85.77 |
| d10 | 97.40 | 43.07 | 4.57 |
| d25 | 4.27 | 9.32 | 2.99 |
| d28 | 32.23 | 27.18 | 33.51 |
| d36 | 29.27 | 29.27 | 29.27 |
| Zoom data 2 | | | |
| OB | 1073.6 | 1073.6 | 1073.6 |
| d5 | 12.94 | 51.47 | 85.77 |
| d10 | 97.40 | 43.07 | 4.57 |
| d25 | 5.82 | 15.61 | 25.13 |
| d28 | 30.69 | 20.90 | 11.38 |
| d36 | 29.27 | 29.27 | 29.27 |

Unit focal length

| | | | |
|---|---|---|---|
| f1 = 204.96 | f2 = −57.36 | f3 = 54.84 | f4 = −52.42 |
| f5 = −466.53 | | | |

Example 24

Unit mm

Surface data

| Surface no. | r | d | nd | νd |
|---|---|---|---|---|
| Object plane | ∞ | ∞ | | |
| 1 | 194.065 | 9.85 | 1.48749 | 70.23 |
| 2 | −778.121 | 0.50 | | |
| 3 | 138.752 | 3.02 | 1.72047 | 34.71 |
| 4 | 86.349 | 11.00 | 1.43875 | 94.66 |
| 5 | 451.416 | Variable | | |
| 6 | 1708.735 | 2.10 | 1.48749 | 70.23 |
| 7 | 41.306 | 3.90 | 1.76182 | 26.52 |
| 8 | 70.524 | 4.24 | | |
| 9 | −152.174 | 1.80 | 1.72916 | 54.68 |
| 10 | 145.230 | Variable | | |
| 11 | 57.513 | 5.88 | 1.76200 | 40.10 |
| 12 | 672.799 | 0.50 | | |
| 13 | 41.225 | 9.09 | 1.49700 | 81.54 |
| 14 | −206.918 | 1.85 | 1.69680 | 55.53 |
| 15 | 39.441 | 11.47 | | |
| 16 | 66.153 | 1.80 | 1.85478 | 24.80 |
| 17 | 33.576 | 5.82 | 1.43875 | 94.66 |
| 18 | 272.014 | 4.49 | | |
| 19 (Stop) | ∞ | 5.63 | | |
| 20* | 34.063 | 9.60 | 1.49700 | 81.54 |
| 21* | −152.652 | Variable | | |
| 22 | 262.523 | 1.00 | 1.78800 | 47.37 |
| 23 | 31.024 | 2.00 | 1.85478 | 24.80 |
| 24 | 33.340 | Variable | | |
| 25 | 113.031 | 1.00 | 1.90366 | 31.32 |
| 26 | 42.201 | 4.00 | 1.48749 | 70.23 |
| 27 | −62.511 | 3.00 | | |
| 28 | 164.301 | 2.70 | 1.85478 | 24.80 |
| 29 | −74.587 | 0.90 | 1.43875 | 94.66 |
| 30 | 27.258 | 2.16 | | |
| 31 | −52.680 | 0.90 | 1.77250 | 49.60 |
| 32 | 56.754 | 3.00 | | |
| 33 | 45.177 | 3.30 | 1.67270 | 32.10 |
| 34 | −145.682 | 30.00 | | |
| 35 | 37.806 | 6.00 | 1.73800 | 32.33 |
| 36 | −43.946 | 1.50 | 1.80810 | 22.76 |
| 37 | 80.933 | Variable | | |
| Image plane | ∞ | | | |

Aspherical surface data

20th surface k = 0.000
A4 = −2.24329e−06, A6 = −4.35396e−10, A8 = −1.10031e−12

21th surface k = 0.000
A4 = 1.30113e−06, A6 = 8.50844e−10, A8 = −1.92250e−12

| | WE | ST | TE |
|---|---|---|---|
| Zoom data 1 | | | |
| f | 152.91 | 239.86 | 391.85 |
| FNO. | 4.59 | 4.59 | 4.59 |
| 2ω | 8.17 | 5.20 | 3.18 |
| BF (in air) | 28.80 | 28.80 | 28.80 |
| LTL (in air) | 318.65 | 318.65 | 318.65 |
| d5 | 36.83 | 71.65 | 106.29 |
| d10 | 70.96 | 36.14 | 1.50 |
| d21 | 9.12 | 10.21 | 5.50 |
| d24 | 18.94 | 17.85 | 22.57 |
| d37 | 28.80 | 28.80 | 28.80 |
| Zoom data 2 | | | |
| OB | 980.0 | 980.0 | 980.0 |
| BF (in air) | 9.93 | −9.99 | −45.61 |
| LTL (in air) | 299.77 | 279.86 | 244.24 |
| d5 | 36.83 | 71.65 | 106.29 |

-continued

| Unit mm | | | |
|---|---|---|---|
| d10 | 70.96 | 36.14 | 1.50 |
| d21 | 12.28 | 17.85 | 25.05 |
| d24 | 15.78 | 10.21 | 3.01 |
| d37 | 28.80 | 28.80 | 28.80 |

| Unit focal length | | | |
|---|---|---|---|
| f1 = 239.95 | f2 = −73.72 | f3 = 56.17 | f4 = −49.26 |
| f5 = 199.99 | | | |

Example 25

Unit mm

Surface data

| Surface no. | r | d | nd | νd |
|---|---|---|---|---|
| Object plane | ∞ | ∞ | | |
| 1 | 155.309 | 9.90 | 1.48749 | 70.23 |
| 2 | −1244.269 | 0.40 | | |
| 3 | 129.584 | 3.00 | 1.72047 | 34.71 |
| 4 | 77.032 | 13.27 | 1.43875 | 94.66 |
| 5 | 747.299 | Variable | | |
| 6 | −796.282 | 2.50 | 1.63854 | 55.38 |
| 7 | 51.302 | 7.50 | 1.84666 | 23.78 |
| 8 | 78.802 | 5.76 | | |
| 9 | −122.433 | 1.80 | 1.48749 | 70.23 |
| 10 | −920.834 | Variable | | |
| 11 | 50.860 | 7.17 | 1.72047 | 34.71 |
| 12 | 270.610 | 4.29 | | |
| 13 | 43.089 | 7.03 | 1.49700 | 81.54 |
| 14 | −1155.646 | 2.00 | 1.83400 | 37.16 |
| 15 | 39.393 | 20.00 | | |
| 16 (Stop) | ∞ | 6.64 | | |
| 17 | 85.967 | 2.00 | 1.80810 | 22.76 |
| 18 | 30.974 | 10.18 | 1.49700 | 81.54 |
| 19 | −41.778 | 3.50 | 1.77250 | 49.60 |
| 20 | −115.653 | 5.09 | | |
| 21 | 45.463 | 4.81 | 1.80000 | 29.84 |
| 22 | 762.338 | Variable | | |
| 23 | −1571.184 | 1.00 | 1.69680 | 55.53 |
| 24 | 22.426 | 2.00 | 1.85478 | 24.80 |
| 25 | 29.042 | Variable | | |
| 26 | 84.585 | 1.00 | 1.67270 | 32.10 |
| 27 | 41.679 | 3.79 | | |
| 28 | 41.640 | 4.22 | 1.51633 | 64.14 |
| 29 | −51.115 | 3.00 | | |
| 30 | 68.660 | 3.00 | 1.85478 | 24.80 |
| 31 | −148.561 | 1.00 | 1.61800 | 63.40 |
| 32 | 33.859 | 2.42 | | |
| 33 | −73.521 | 1.00 | 1.69680 | 55.53 |
| 34 | 57.077 | 3.00 | | |
| 35 | 49.078 | 3.50 | 1.55032 | 75.50 |
| 36 | 326.783 | 30.00 | | |
| 37 | 75.633 | 5.00 | 1.73800 | 32.26 |
| 38 | −29.494 | 1.50 | 1.80810 | 22.76 |
| 39 | 532.928 | Variable | | |
| Image plane | ∞ | | | |

| | WE | ST | TE |
|---|---|---|---|
| Zoom data 1 | | | |
| f | 156.01 | 246.27 | 402.33 |
| FNO. | 4.78 | 5.13 | 5.31 |
| 2ω | 7.90 | 5.00 | 3.06 |
| BF (in air) | 28.77 | 28.77 | 28.77 |
| LTL (in air) | 318.61 | 318.61 | 318.61 |
| d5 | 5.65 | 42.72 | 79.25 |
| d10 | 74.50 | 37.43 | 0.90 |
| d22 | 18.59 | 15.25 | 2.60 |
| d25 | 8.82 | 12.16 | 24.82 |

-continued

| Unit mm | | | |
|---|---|---|---|
| d39 | 28.77 | 28.77 | 28.77 |
| Zoom data 2 | | | |
| OB | 980.0 | 980.0 | 980.0 |
| BF (in air) | 9.17 | −10.74 | −45.96 |
| LTL (in air) | 299.02 | 279.10 | 243.88 |
| d5 | 5.65 | 42.72 | 78.65 |
| d10 | 74.50 | 37.43 | 1.50 |
| d22 | 22.36 | 23.82 | 22.06 |
| d25 | 5.06 | 3.60 | 5.35 |
| d39 | 28.77 | 28.77 | 28.77 |

| Unit focal length | | | |
|---|---|---|---|
| f1 = 203.90 | f2 = −91.70 | f3 = 70.21 | f4 = −44.19 |
| f5 = 154.70 | | | |

Example 26

Unit mm

Surface data

| Surface no. | r | d | nd | νd |
|---|---|---|---|---|
| Object plane | ∞ | ∞ | | |
| 1 | 194.065 | 9.85 | 1.48749 | 70.23 |
| 2 | −778.121 | 0.50 | | |
| 3 | 138.752 | 3.02 | 1.72047 | 34.71 |
| 4 | 86.349 | 11.00 | 1.43875 | 94.66 |
| 5 | 451.416 | Variable | | |
| 6 | 1708.735 | 2.10 | 1.48749 | 70.23 |
| 7 | 41.306 | 3.90 | 1.76182 | 26.52 |
| 8 | 70.524 | 4.24 | | |
| 9 | −152.174 | 1.80 | 1.72916 | 54.68 |
| 10 | 145.230 | Variable | | |
| 11 | 57.513 | 5.88 | 1.76200 | 40.10 |
| 12 | 672.799 | 0.50 | | |
| 13 | 41.225 | 9.09 | 1.49700 | 81.54 |
| 14 | −206.918 | 1.85 | 1.69680 | 55.53 |
| 15 | 39.441 | 11.47 | | |
| 16 | 66.153 | 1.80 | 1.85478 | 24.80 |
| 17 | 33.576 | 5.82 | 1.43875 | 94.66 |
| 18 | 272.014 | 4.49 | | |
| 19 (Stop) | ∞ | 5.63 | | |
| 20* | 34.063 | 9.60 | 1.49700 | 81.54 |
| 21* | −152.652 | Variable | | |
| 22 | 262.523 | 1.00 | 1.78800 | 47.37 |
| 23 | 31.024 | 2.00 | 1.85478 | 24.80 |
| 24 | 33.340 | Variable | | |
| 25 | 113.031 | 1.00 | 1.90366 | 31.32 |
| 26 | 42.201 | 4.00 | 1.48749 | 70.23 |
| 27 | −62.511 | Variable | | |
| 28 | 164.301 | 2.70 | 1.85478 | 24.80 |
| 29 | −74.587 | 0.90 | 1.43875 | 94.66 |
| 30 | 27.258 | 2.16 | | |
| 31 | −52.680 | 0.90 | 1.77250 | 49.60 |
| 32 | 56.754 | 3.00 | | |
| 33 | 45.177 | 3.30 | 1.67270 | 32.10 |
| 34 | −145.682 | 30.00 | | |
| 35 | 37.806 | 6.00 | 1.73800 | 32.33 |
| 36 | −43.946 | 1.50 | 1.80810 | 22.76 |
| 37 | 80.933 | Variable | | |
| Image plane | ∞ | | | |

Aspherical surface data

20th surface k = 0.000

A4 = −2.24329e−06, A6 = −4.35396e−10, A8 = −1.10031e−12

-continued

| Unit mm | | | |
|---|---|---|---|
| 21th surface | | | |
| k = 0.000 | | | |
| A4 = 1.30113e−06, A6 = 8.50844e−10, A8 = −1.92250e−12 | | | |
| | WE | ST | TE |
| Zoom data 1 | | | |
| f | 152.91 | 239.91 | 392.35 |
| FNO. | 4.59 | 4.59 | 4.59 |
| 2ω | 8.17 | 5.20 | 3.18 |
| BF (in air) | 28.80 | 28.80 | 28.80 |
| LTL (in air) | 318.65 | 318.65 | 318.65 |
| d5 | 36.83 | 71.65 | 106.29 |
| d10 | 70.96 | 36.14 | 1.50 |
| d21 | 9.12 | 10.28 | 5.69 |
| d24 | 18.94 | 18.28 | 23.87 |
| d27 | 3.00 | 2.50 | 1.50 |
| d37 | 28.80 | 28.80 | 28.80 |
| Zoom data 2 | | | |
| OB | 980.0 | 980.0 | 980.0 |
| BF (in air) | 9.93 | −10.00 | −45.68 |
| LTL (in air) | 299.77 | 279.84 | 244.16 |
| d5 | 368.83 | 71.652 | 106.29 |
| d10 | 70.96 | 36.14 | 1.50 |
| d21 | 12.28 | 17.93 | 25.33 |
| d24 | 15.78 | 10.63 | 4.23 |
| d27 | 3.00 | 2.50 | 1.50 |
| d37 | 28.80 | 28.80 | 28.80 |

| Unit focal length | | | |
|---|---|---|---|
| f1 = 239.95 | f2 = −73.72 | f3 = 56.17 | f4 = −49.26 |
| f5 = 167.26 | f6 = 1031.42 | | |

Example 27

Unit mm

Surface data

| Surface no. | r | d | nd | νd |
|---|---|---|---|---|
| Object plane | ∞ | ∞ | | |
| 1 | 145.227 | 11.73 | 1.48749 | 70.23 |
| 2 | 2973.253 | 0.20 | | |
| 3 | 138.335 | 3.00 | 1.67300 | 38.26 |
| 4 | 75.845 | 16.95 | 1.43875 | 94.66 |
| 5 | 985.334 | Variable | | |
| 6 | −436.095 | 3.94 | 1.85478 | 24.80 |
| 7 | −74.917 | 1.60 | 1.48749 | 70.23 |
| 8 | 49.184 | 2.84 | 1.80000 | 29.84 |
| 9 | 62.645 | 5.78 | | |
| 10 | −71.980 | 1.50 | 1.83481 | 42.71 |
| 11 | 194.121 | Variable | | |
| 12 (Stop) | ∞ | 1.80 | | |
| 13* | 70.532 | 5.97 | 1.49700 | 81.54 |
| 14* | −111.780 | 3.27 | | |
| 15 | −638.347 | 1.50 | 1.84666 | 23.78 |
| 16 | 129.890 | 6.64 | 1.43875 | 94.66 |
| 17 | −65.692 | 0.20 | | |
| 18 | 82.485 | 16.58 | 1.43875 | 94.66 |
| 19 | −45.906 | Variable | | |
| 20 | 183.146 | 1.10 | 1.77250 | 49.60 |
| 21 | 25.017 | 2.50 | 1.85478 | 24.80 |
| 22 | 36.540 | Variable | | |
| 23 | 71.798 | 1.00 | 1.58144 | 40.75 |
| 24 | 26.976 | Variable | | |
| 25 | 30.066 | 3.13 | 1.43875 | 94.66 |
| 26 | 327.127 | 1.89 | | |
| 27 | 205.926 | 2.45 | 1.85478 | 24.80 |
| 28 | −49.304 | 0.90 | 1.59282 | 68.63 |
| 29 | 37.671 | 2.29 | | |
| 30 | −77.012 | 0.90 | 1.77250 | 49.60 |
| 31 | 47.424 | 3.19 | | |
| 32 | 45.955 | 5.40 | 1.58313 | 59.38 |
| 33 | −91.431 | 23.51 | | |
| 34 | 37.861 | 8.37 | 1.65412 | 39.68 |
| 35 | −88.792 | 1.30 | 1.92286 | 20.88 |
| 36 | 138.592 | Variable | | |
| Image plane | ∞ | | | |

Aspherical surface data

13th surface k = 0.000
A4 = −2.62615e−06, A6 = 5.45187e−09, A8 = −1.06603e−11,
A10 = 2.59025e−14

14th surface k = 0.000
A4 = 2.98721e−06, A6 = 6.43178e−09, A8 = −1.12044e−11,
A10 = 2.95382e−14

| Zoom data 1 | | | |
|---|---|---|---|
| | WE | ST | TE |
| f | 152.25 | 244.93 | 393.11 |
| FNO. | 4.58 | 4.58 | 4.58 |
| 2ω | 8.21 | 5.10 | 3.17 |
| BF (in air) | 35.09 | 35.09 | 35.09 |
| LTL (in air) | 318.40 | 318.41 | 318.43 |
| d5 | 58.72 | 84.90 | 108.78 |
| d11 | 52.89 | 26.77 | 2.63 |
| d19 | 5.24 | 6.80 | 2.93 |
| d22 | 22.95 | 20.29 | 24.71 |
| d24 | 2.08 | 3.12 | 2.87 |
| d36 | 35.09 | 35.09 | 35.09 |

| Unit focal length | | | |
|---|---|---|---|
| f1 = 218.89 | f2 = −51.80 | f3 = 40.89 | f4 = −64.11 |
| f5 = −74.93 | f6 = 98.61 | | |

Example 28

Unit mm

Surface data

| Surface no. | r | d | nd | νd |
|---|---|---|---|---|
| Object plane | ∞ | ∞ | | |
| 1 | 145.227 | 11.73 | 1.48749 | 70.23 |
| 2 | 2973.253 | 0.20 | | |
| 3 | 138.335 | 3.00 | 1.67300 | 38.26 |
| 4 | 75.845 | 16.95 | 1.43875 | 94.66 |
| 5 | 985.334 | Variable | | |
| 6 | −436.095 | 3.94 | 1.85478 | 24.80 |
| 7 | −74.917 | 1.60 | 1.48749 | 70.23 |
| 8 | 49.184 | 2.84 | 1.80000 | 29.84 |
| 9 | 62.645 | 5.78 | | |
| 10 | −71.980 | 1.50 | 1.83481 | 42.71 |
| 11 | 194.121 | Variable | | |
| 12 (Stop) | ∞ | 1.80 | | |
| 13* | 70.532 | 5.97 | 1.49700 | 81.54 |
| 14* | −111.780 | 3.27 | | |
| 15 | −638.347 | 1.50 | 1.84666 | 23.78 |
| 16 | 129.890 | 6.64 | 1.43875 | 94.66 |
| 17 | −65.692 | 0.20 | | |
| 18 | 82.485 | 16.58 | 1.43875 | 94.66 |
| 19 | −45.906 | Variable | | |

-continued

| Unit mm | | | | |
|---|---|---|---|---|
| 20 | 183.146 | 1.10 | 1.77250 | 49.60 |
| 21 | 25.017 | 2.50 | 1.85478 | 24.80 |
| 22 | 36.540 | Variable | | |
| 23 | 71.798 | 1.00 | 1.58144 | 40.75 |
| 24 | 26.976 | Variable | | |
| 25 | 30.066 | 3.13 | 1.43875 | 94.66 |
| 26 | 327.127 | 1.89 | | |
| 27 | 205.926 | 2.45 | 1.85478 | 24.80 |
| 28 | −49.304 | 0.90 | 1.59282 | 68.63 |
| 29 | 37.671 | 2.29 | | |
| 30 | −77.012 | 0.90 | 1.77250 | 49.60 |
| 31 | 47.424 | 3.19 | | |
| 32 | 45.955 | 5.40 | 1.58313 | 59.38 |
| 33 | −91.431 | 1.95 | | |
| 34 | 24.803 | 1.10 | 1.80810 | 22.76 |
| 35 | 20.700 | 4.18 | 1.51742 | 52.43 |
| 36 | 131.562 | 0.30 | | |
| 37 | 26.918 | 2.23 | 1.59270 | 35.31 |
| 38 | 45.737 | 1.00 | 1.91082 | 35.25 |
| 39 | 22.854 | 2.47 | | |
| 40 | 60.942 | 0.95 | 1.88300 | 40.76 |
| 41 | 15.909 | 6.40 | 1.72047 | 34.71 |
| 42 | −23.982 | 0.95 | 1.80610 | 40.92 |
| 43 | 41.874 | 1.97 | | |
| 44 | 37.861 | 8.37 | 1.65412 | 39.68 |
| 45 | −88.792 | 1.30 | 1.92286 | 20.88 |
| 46 | 138.592 | Variable | | |
| Image plane | ∞ | | | |

Aspherical surface data

13th surface k = 0.000
A4 = −2.62615e−06, A6 = 5.45187e−09, A8 = −1.06603e−11,
A10 = 2.59025e−14

14th surface k = 0.000
A4 = 2.98721e−06, A6 = 6.43178e−09, A8 = −1.12044e−11,
A10 = 2.95382e−14

Zoom data 1

| | WE | ST | TE |
|---|---|---|---|
| f | 189.93 | 305.55 | 490.39 |
| FNO. | 5.71 | 5.71 | 5.71 |
| 2ω | 6.45 | 4.01 | 2.50 |
| BF (in air) | 35.09 | 35.09 | 35.09 |
| LTL (in air) | 318.40 | 318.41 | 318.43 |
| d5 | 58.72 | 84.90 | 108.78 |
| d11 | 52.89 | 26.77 | 2.63 |
| d19 | 5.24 | 6.80 | 2.93 |
| d22 | 22.95 | 20.29 | 24.71 |
| d24 | 2.08 | 3.12 | 2.87 |
| d46 | 35.09 | 35.09 | 35.09 |

Unit focal length

| | | | |
|---|---|---|---|
| f1 = 218.89 | f2 = −51.80 | f3 = 40.89 | f4 = −64.11 |
| f5 = −74.93 | f6 = 323.41 | | |

Example 29

Unit mm

Surface data

| Surface no. | r | d | nd | νd |
|---|---|---|---|---|
| Object plane | ∞ | ∞ | | |
| 1 | 220.886 | 3.00 | 1.48749 | 70.23 |
| 2 | 88.930 | 10.50 | 1.49700 | 81.54 |
| 3 | −489.374 | 0.20 | | |
| 4 | 106.945 | 2.60 | 1.80100 | 34.97 |
| 5 | 74.650 | 10.50 | 1.43875 | 94.66 |
| 6 | 489.383 | Variable | | |
| 7 | −453.239 | 2.20 | 1.49700 | 81.54 |
| 8 | 36.190 | 5.00 | 1.85478 | 24.80 |
| 9 | 50.659 | 3.61 | | |
| 10 | −108.632 | 1.80 | 1.72916 | 54.68 |
| 11 | 245.978 | Variable | | |
| 12* | 42.751 | 7.00 | 1.69350 | 53.21 |
| 13 | 183.936 | 0.50 | | |
| 14 | 35.153 | 7.00 | 1.49700 | 81.54 |
| 15 | 477.974 | 2.00 | | |
| 16 (Stop) | ∞ | 1.75 | | |
| 17 | 97.374 | 1.60 | 1.91082 | 35.25 |
| 18 | 20.389 | 9.00 | 1.49700 | 81.54 |
| 19 | −539.804 | Variable | | |
| 20 | 306.347 | 3.80 | 1.80100 | 34.97 |
| 21 | −43.927 | 1.20 | 1.71300 | 53.87 |
| 22 | 87.301 | 1.52 | | |
| 23 | −148.141 | 1.20 | 1.69680 | 55.53 |
| 24 | 61.246 | 3.50 | | |
| 25* | 24.170 | 5.79 | 1.49700 | 81.54 |
| 26 | −61.526 | Variable | | |
| 27 | 52.552 | 1.20 | 1.77250 | 49.60 |
| 28 | 16.773 | 2.26 | 1.71736 | 29.52 |
| 29 | 22.030 | Variable | | |
| 30 | −49.651 | 1.20 | 1.77250 | 49.60 |
| 31 | 21.519 | 2.30 | 1.80518 | 25.42 |
| 32 | 74.674 | Variable | | |
| 33 | 108.115 | 6.00 | 1.62004 | 36.26 |
| 34 | −24.113 | 0.20 | | |
| 35 | −24.157 | 1.80 | 1.94595 | 17.98 |
| 36 | −38.170 | Variable | | |
| Image plane | ∞ | | | |

Aspherical surface data

12th surface k = 0.000
A4 = −9.07612e−07, A6 = −6.61273e−10, A8 = −2.55292e−13

25th surface k = 0.000
A4 = −1.48006e−05, A6 = −7.22545e−09, A8 = 4.32608e−12

| | WE | ST | TE |
|---|---|---|---|
| **Zoom data 1** | | | |
| f | 103.33 | 202.61 | 397.40 |
| FNO. | 4.55 | 5.07 | 5.80 |
| 2ω | 11.92 | 6.06 | 3.09 |
| BF (in air) | 44.57 | 44.57 | 44.57 |
| LTL (in air) | 274.19 | 274.19 | 274.19 |
| d6 | 6.00 | 50.31 | 88.25 |
| d11 | 84.52 | 39.73 | 1.50 |
| d19 | 2.80 | 3.29 | 3.57 |
| d26 | 4.78 | 8.83 | 3.16 |
| d29 | 15.24 | 11.50 | 14.26 |
| d32 | 16.05 | 15.74 | 18.65 |
| d36 | 44.57 | 44.57 | 44.57 |
| **Zoom data 2** | | | |
| OB | 940.0 | 940.0 | 940.0 |
| d6 | 6.00 | 50.31 | 88.25 |
| d11 | 84.52 | 39.73 | 1.50 |

| Unit mm | | | |
|---|---|---|---|
| d26 | 2.80 | 3.29 | 3.57 |
| d29 | 5.89 | 13.45 | 22.15 |
| d32 | 14.54 | 10.68 | 4.00 |
| d36 | 44.57 | 44.57 | 44.57 |

| Unit focal length | | | |
|---|---|---|---|
| f1 = 194.60 | f2 = −57.24 | f3 = 54.82 | f4 = 90.79 |
| f5 = −49.25 | f6 = −39.82 | f7 = 58.53 | |

Example 30

Unit mm

Surface data

| Surface no. | r | d | nd | νd |
|---|---|---|---|---|
| Object plane | ∞ | ∞ | | |
| 1 | 103.839 | 9.50 | 1.48749 | 70.23 |
| 2 | −3553.791 | 0.20 | | |
| 3 | 99.088 | 2.60 | 1.80450 | 39.64 |
| 4 | 55.878 | 12.30 | 1.43875 | 94.66 |
| 5 | 691.346 | Variable | | |
| 6 | 509.750 | 2.20 | 1.61800 | 63.40 |
| 7 | 33.065 | 5.21 | 1.85478 | 24.80 |
| 8 | 53.098 | 4.21 | | |
| 9 | −85.112 | 1.80 | 1.69680 | 55.53 |
| 10 | 156.979 | Variable | | |
| 11 | 51.369 | 6.00 | 1.71999 | 50.23 |
| 12 | −1297.362 | Variable | | |
| 13 | 31.119 | 6.77 | 1.49700 | 81.54 |
| 14 | 289.694 | 3.10 | | |
| 15 | −667.118 | 1.50 | 2.00100 | 29.13 |
| 16 | 33.024 | 6.75 | 1.49700 | 81.54 |
| 17* | −103.992 | 3.50 | | |
| 18 | 116.339 | 3.70 | 1.80000 | 29.84 |
| 19 | −35.778 | 1.15 | 1.79952 | 42.22 |
| 20 | 49.258 | 2.25 | | |
| 21 | −150.479 | 1.15 | 1.79952 | 42.22 |
| 22 | 132.407 | 7.48 | | |
| 23 (Stop) | ∞ | 1.50 | | |
| 24* | 26.166 | 5.50 | 1.61881 | 63.85 |
| 25* | −117.137 | Variable | | |
| 26 | 139.677 | 1.00 | 1.69680 | 55.53 |
| 27 | 17.208 | 2.20 | 1.80810 | 22.76 |
| 28 | 21.667 | Variable | | |
| 29 | −96.555 | 1.00 | 1.77250 | 49.60 |
| 30 | 59.001 | Variable | | |
| 31 | 104.432 | 5.00 | 1.68893 | 31.07 |
| 32 | −24.041 | 0.20 | | |
| 33 | −24.130 | 1.50 | 1.94595 | 17.98 |
| 34 | −37.995 | Variable | | |
| Image plane | ∞ | | | |

Aspherical surface data

17th surface k = 0.000
A4 = 3.44088e−06, A6 = −3.25060e−09, A8 = 8.76064e−13

24th surface k = 0.000
A4 = −6.00773e−06, A6 = −5.56644e−09, A8 = 1.21892e−11

Unit mm

25th surface k = 0.000
A4 = 4.89884e−06, A6 = 1.83191e−09, A8 = 4.21625e−12

| | WE | ST | TE |
|---|---|---|---|
| Zoom data 1 | | | |
| f | 102.00 | 200.04 | 392.05 |
| FNO. | 4.48 | 5.00 | 5.75 |
| 2ω | 12.05 | 6.12 | 3.13 |
| BF (in air) | 37.12 | 37.12 | 37.12 |
| LTL (in air) | 262.60 | 262.60 | 262.60 |
| d5 | 2.50 | 41.23 | 70.13 |
| d10 | 73.51 | 34.25 | 1.50 |
| d12 | 7.24 | 7.77 | 11.62 |
| d25 | 4.95 | 8.78 | 2.99 |
| d28 | 25.92 | 22.42 | 24.99 |
| d30 | 12.10 | 11.78 | 14.99 |
| d34 | 37.12 | 37.12 | 37.12 |
| Zoom data 2 | | | |
| OB | 873.4 | 873.4 | 873.4 |
| d5 | 2.50 | 41.23 | 70.13 |
| d10 | 73.51 | 34.35 | 1.50 |
| d12 | 7.24 | 7.77 | 11.62 |
| d25 | 6.32 | 14.08 | 23.02 |
| d28 | 25.98 | 22.37 | 16.46 |
| d30 | 10.68 | 6.53 | 3.50 |
| d34 | 37.112 | 37..12 | 37.12 |

| Unit focal length | | | |
|---|---|---|---|
| f1 = 169.37 | f2 = −49.74 | f3 = 68.76 | f4 = 68.90 |
| f5 = −39.63 | f6 = −47.28 | f7 = 48.00 | |

Example 31

Unit mm

Surface data

| Surface no. | r | d | nd | νd |
|---|---|---|---|---|
| Object plane | ∞ | ∞ | | |
| 1 | 157.785 | 10.75 | 1.48749 | 70.23 |
| 2 | −1520.233 | 8.55 | | |
| 3 | 132.430 | 3.00 | 1.62588 | 35.70 |
| 4 | 70.544 | 13.46 | 1.43875 | 94.66 |
| 5 | 2517.592 | Variable | | |
| 6 | −499.841 | 1.80 | 1.49700 | 81.54 |
| 7 | 43.071 | 5.19 | 1.84666 | 23.78 |
| 8 | 62.906 | 8.83 | | |
| 9 | −111.079 | 1.55 | 1.72916 | 54.67 |
| 10 | 189.183 | Variable | | |
| 11 | 180.743 | 5.64 | 1.49700 | 81.54 |
| 12 | −165.241 | 1.85 | | |
| 13 | 56.446 | 6.41 | 1.49700 | 81.54 |
| 14 | 284.308 | 12.77 | | |
| 15 | 71.737 | 1.50 | 1.88100 | 40.14 |
| 16 | 33.950 | 8.02 | 1.49700 | 81.54 |
| 17 | 613.860 | Variable | | |
| 18 (Stop) | ∞ | 15.87 | | |
| 19 | 43.309 | 4.98 | 1.59349 | 67.00 |
| 20 | −62.592 | 1.10 | 1.90043 | 37.37 |
| 21 | −292.344 | Variable | | |
| 22 | −350.136 | 1.00 | 1.75500 | 52.32 |
| 23 | 41.322 | Variable | | |
| 24 | −70.029 | 2.34 | 1.84666 | 23.78 |
| 25 | −26.817 | 0.80 | 1.49700 | 81.54 |
| 26 | 42.362 | 3.58 | | |
| 27 | −64.498 | 0.80 | 1.85025 | 30.05 |

-continued

| Unit mm | | | | |
|---|---|---|---|---|
| 28 | 112.207 | 4.19 | | |
| 29 | 146.095 | 3.50 | 1.61772 | 49.81 |
| 30 | −37.067 | 0.30 | | |
| 31 | 50.602 | 4.20 | 1.48749 | 70.23 |
| 32 | 1106.912 | 1.00 | 2.00100 | 29.13 |
| 33 | 951.737 | 24.44 | | |
| 34 | 47.325 | 4.07 | 1.59270 | 35.31 |
| 35 | −82.015 | 1.20 | 2.00100 | 29.13 |
| 36 | 124.049 | Variable | | |
| Image plane | ∞ | | | |

| | WE | ST | TE |
|---|---|---|---|
| Zoom data 1 | | | |
| f | 149.55 | 241.57 | 388.53 |
| FNO. | 4.54 | 4.55 | 4.55 |
| 2ω | 8.21 | 5.07 | 3.15 |
| BF (in air) | 29.09 | 29.09 | 29.09 |
| LTL (in air) | 318.33 | 318.33 | 318.33 |
| d5 | 30.45 | 52.79 | 60.62 |
| d10 | 63.94 | 34.45 | 2.50 |
| d17 | 2.50 | 9.64 | 33.76 |
| d21 | 7.44 | 6.02 | 1.79 |
| d23 | 22.22 | 23.64 | 27.87 |
| d36 | 29.09 | 29.09 | 29.09 |
| Zoom data 2 | | | |
| OB | 980.0 | 980.0 | 980.0 |
| d5 | 30.45 | 52.79 | 60.62 |
| d10 | 63.94 | 34.45 | 2.50 |
| d17 | 2.50 | 9.64 | 33.76 |
| d21 | 10.99 | 14.80 | 23.68 |
| d23 | 18.67 | 14.86 | 5.98 |
| d36 | 29.09 | 29.09 | 29.09 |

| Unit focal length | | | |
|---|---|---|---|
| f1 = 190.31 | f2 = −59.18 | f3 = 76.13 | f4 = 83.74 |
| f5 = −48.90 | f6 = 203.00 | | |

Example 32

| Unit mm | | | | |
|---|---|---|---|---|
| Surface data | | | | |
| Surface no. | r | d | nd | νd |
| Object plane | ∞ | ∞ | | |
| 1 | 125.084 | 10.00 | 1.48749 | 70.23 |
| 2 | −5323.708 | 11.64 | | |
| 3 | 108.564 | 3.00 | 1.65412 | 39.68 |
| 4 | 61.018 | 13.54 | 1.43875 | 94.66 |
| 5 | 401.982 | Variable | | |
| 6 | 302.147 | 1.80 | 1.49700 | 81.54 |
| 7 | 33.099 | 4.32 | 1.84666 | 23.78 |
| 8 | 43.904 | 14.83 | | |
| 9 | −70.516 | 1.55 | 1.67790 | 50.72 |
| 10 | 290.538 | Variable | | |
| 11 | 211.364 | 5.50 | 1.49700 | 81.54 |
| 12 | −128.471 | 0.30 | | |
| 13 | 45.364 | 6.70 | 1.49700 | 81.54 |
| 14 | 220.409 | 3.49 | | |
| 15 | 58.608 | 1.50 | 1.91082 | 35.25 |
| 16 | 29.036 | 8.70 | 1.49700 | 81.54 |
| 17 | 359.483 | Variable | | |
| 18 (Stop) | ∞ | 4.98 | | |
| 19 | 60.436 | 5.50 | 1.57135 | 52.95 |
| 20 | −60.230 | 1.10 | 1.88300 | 40.76 |
| 21 | −215.358 | Variable | | |
| 22 | −1463.883 | 1.00 | 1.71700 | 47.92 |
| 23 | 51.486 | Variable | | |

-continued

| Unit mm | | | | |
|---|---|---|---|---|
| 24 | −53.854 | 1.90 | 1.85478 | 24.80 |
| 25 | −28.920 | 0.80 | 1.48749 | 70.23 |
| 26 | 47.015 | 2.03 | | |
| 27 | −55.501 | 0.80 | 1.57250 | 57.74 |
| 28 | 130.815 | 13.43 | | |
| 29 | 65.955 | 4.50 | 1.53172 | 48.84 |
| 30 | −50.967 | 0.30 | | |
| 31 | 101.308 | 4.10 | 1.58144 | 40.75 |
| 32 | −41.429 | 1.00 | 2.00100 | 29.13 |
| 33 | −108.065 | 36.40 | | |
| 34 | 58.068 | 5.99 | 1.60342 | 38.03 |
| 35 | −37.000 | 1.20 | 2.00100 | 29.13 |
| 36 | 494.125 | Variable | | |
| Image plane | ∞ | | | |

| | WE | ST | TE |
|---|---|---|---|
| Zoom data 1 | | | |
| f | 152.13 | 243.53 | 389.74 |
| FNO. | 4.56 | 4.56 | 4.56 |
| 2ω | 8.06 | 5.02 | 3.14 |
| BF (in air) | 27.52 | 27.52 | 27.52 |
| LTL (in air) | 318.07 | 318.07 | 318.07 |
| d5 | 33.03 | 49.18 | 57.74 |
| d10 | 57.20 | 30.89 | 2.51 |
| d17 | 4.63 | 10.85 | 20.53 |
| d21 | 8.11 | 5.78 | 1.80 |
| d23 | 15.71 | 21.97 | 36.09 |
| d36 | 27.52 | 27.52 | 27.52 |
| Zoom data 2 | | | |
| OB | 980.4 | 980.4 | 980.4 |
| d5 | 33.03 | 49.18 | 57.74 |
| d10 | 57.20 | 30.89 | 2.51 |
| d17 | 4.63 | 10.85 | 20.53 |
| d21 | 13.13 | 17.51 | 29.23 |
| d23 | 10.68 | 10.25 | 8.66 |
| d36 | 27.52 | 27.52 | 27.52 |

| Unit focal length | | | |
|---|---|---|---|
| f1 = 184.02 | f2 = −51.87 | f3 = 65.08 | f4 = 118.98 |
| f5 = −69.35 | f6 = 280.01 | | |

Example 33

| Unit mm | | | | |
|---|---|---|---|---|
| Surface data | | | | |
| Surface no. | r | d | nd | νd |
| Object plane | ∞ | ∞ | | |
| 1 | 125.084 | 10.00 | 1.48749 | 70.23 |
| 2 | −5323.708 | 11.64 | | |
| 3 | 108.564 | 3.00 | 1.65412 | 39.68 |
| 4 | 61.018 | 13.54 | 1.43875 | 94.66 |
| 5 | 401.982 | Variable | | |
| 6 | 302.147 | 1.80 | 1.49700 | 81.54 |
| 7 | 33.099 | 4.32 | 1.84666 | 23.78 |
| 8 | 43.904 | 14.83 | | |
| 9 | −70.516 | 1.55 | 1.67790 | 50.72 |
| 10 | 290.538 | Variable | | |
| 11 | 211.364 | 5.50 | 1.49700 | 81.54 |
| 12 | −128.471 | 0.30 | | |
| 13 | 45.364 | 6.70 | 1.49700 | 81.54 |
| 14 | 220.409 | 3.49 | | |
| 15 | 58.608 | 1.50 | 1.91082 | 35.25 |
| 16 | 29.036 | 8.70 | 1.49700 | 81.54 |
| 17 | 359.483 | Variable | | |
| 18 (Stop) | ∞ | 4.98 | | |
| 19 | 60.436 | 5.50 | 1.57135 | 52.95 |

| Unit mm | | | | |
|---|---|---|---|---|
| 20 | −60.230 | 1.10 | 1.88300 | 40.76 |
| 21 | −215.358 | Variable | | |
| 22 | −1463.883 | 1.00 | 1.71700 | 47.92 |
| 23 | 51.486 | Variable | | |
| 24 | −53.854 | 1.90 | 1.85478 | 24.80 |
| 25 | −28.920 | 0.80 | 1.48749 | 70.23 |
| 26 | 47.015 | 2.03 | | |
| 27 | −55.501 | 0.80 | 1.57250 | 57.74 |
| 28 | 130.815 | 13.43 | | |
| 29 | 65.955 | 4.50 | 1.53172 | 48.84 |
| 30 | −50.967 | 0.30 | | |
| 31 | 101.308 | 4.10 | 1.58144 | 40.75 |
| 32 | −41.429 | 1.00 | 2.00100 | 29.13 |
| 33 | −108.065 | 3.18 | | |
| 34 | 17.484 | 4.20 | 1.51742 | 52.43 |
| 35 | 71.565 | 1.23 | | |
| 36 | 30.544 | 2.62 | 1.68893 | 31.07 |
| 37 | 222.321 | 0.90 | 1.85150 | 40.78 |
| 38 | 16.519 | 5.91 | | |
| 39 | 74.368 | 0.90 | 1.92286 | 20.88 |
| 40 | 10.175 | 7.90 | 1.75211 | 25.05 |
| 41 | −14.669 | 0.90 | 1.91082 | 35.25 |
| 42 | 28.818 | 0.30 | | |
| 43 | 22.013 | 2.90 | 1.69895 | 30.13 |
| 44 | 267.121 | 5.47 | | |
| 45 | 58.068 | 5.99 | 1.60342 | 38.03 |
| 46 | −37.000 | 1.20 | 2.00100 | 29.13 |
| 47 | 494.125 | Variable | | |
| Image plane | ∞ | | | |

| Zoom data 1 | | | |
|---|---|---|---|
| | WE | ST | TE |
| f | 190.19 | 304.45 | 487.23 |
| FNO. | 5.72 | 5.71 | 5.72 |
| 2ω | 6.42 | 4.00 | 2.50 |
| BF (in air) | 27.52 | 27.52 | 27.52 |
| LTL (in air) | 318.08 | 318.08 | 318.08 |
| d5 | 33.03 | 49.18 | 57.74 |
| d10 | 57.20 | 30.89 | 2.51 |
| d17 | 4.63 | 10.85 | 20.53 |
| d21 | 8.11 | 5.78 | 1.80 |
| d23 | 15.71 | 21.97 | 36.09 |
| d47 | 27.52 | 27.52 | 27.52 |

| Unit focal length | | | |
|---|---|---|---|
| f1 = 184.02 | f2 = −51.87 | f3 = 65.08 | f4 = 118.98 |
| f5 = −69.35 | f6 = −98.04 | | |

Example 34

| Unit mm | | | | |
|---|---|---|---|---|
| Surface data | | | | |
| Surface no. | r | d | nd | νd |
| Object plane | ∞ | ∞ | | |
| 1 | 132.926 | 10.00 | 1.48749 | 70.23 |
| 2 | −1700.958 | 9.25 | | |
| 3 | 107.749 | 3.00 | 1.65412 | 39.68 |
| 4 | 62.991 | 13.20 | 1.43875 | 94.66 |
| 5 | 372.262 | Variable | | |
| 6 | 405.033 | 1.80 | 1.49700 | 81.54 |
| 7 | 34.236 | 4.46 | 1.84666 | 23.78 |
| 8 | 45.364 | 13.49 | | |
| 9 | −72.340 | 1.55 | 1.67790 | 50.72 |
| 10 | 267.419 | Variable | | |
| 11 | 144.312 | 5.70 | 1.49700 | 81.54 |
| 12 | −124.886 | 0.30 | | |
| 13 | 45.444 | 6.70 | 1.49700 | 81.54 |

| Unit mm | | | | |
|---|---|---|---|---|
| 14 | 193.417 | 2.07 | | |
| 15 | 65.194 | 1.50 | 1.91082 | 35.25 |
| 16 | 30.222 | 9.30 | 1.49700 | 81.54 |
| 17 | 116791.487 | Variable | | |
| 18 (Stop) | ∞ | 1.00 | | |
| 19 | 64.834 | 5.50 | 1.58267 | 46.42 |
| 20 | −67.122 | 1.10 | 1.88300 | 40.76 |
| 21 | −430.717 | Variable | | |
| 22 | −1131.367 | 1.00 | 1.71700 | 47.92 |
| 23 | 54.918 | Variable | | |
| 24 | 33.180 | 2.00 | 1.48749 | 70.23 |
| 25 | 32.760 | 8.24 | | |
| 26 | −67.263 | 1.90 | 1.85478 | 24.80 |
| 27 | −32.526 | 0.80 | 1.48749 | 70.23 |
| 28 | 43.088 | 2.10 | | |
| 29 | −49.165 | 0.80 | 1.57250 | 57.74 |
| 30 | 198.026 | 12.71 | | |
| 31 | 86.350 | 4.20 | 1.53172 | 48.84 |
| 32 | −43.735 | 0.30 | | |
| 33 | 134.401 | 4.00 | 1.58144 | 40.75 |
| 34 | −39.696 | 1.00 | 2.00100 | 29.13 |
| 35 | −103.563 | 39.56 | | |
| 36 | 53.236 | 5.51 | 1.63980 | 34.46 |
| 37 | −55.124 | 1.20 | 2.00100 | 29.13 |
| 38 | 160.867 | Variable | | |
| Image plane | ∞ | | | |

| | WE | ST | TE |
|---|---|---|---|
| Zoom data 1 | | | |
| f | 151.14 | 241.95 | 387.19 |
| FNO. | 4.53 | 4.53 | 4.53 |
| 2ω | 8.13 | 5.07 | 3.16 |
| BF (in air) | 27.74 | 27.74 | 27.74 |
| LTL (in air) | 313.97 | 313.97 | 313.97 |
| d5 | 32.62 | 49.15 | 57.30 |
| d10 | 56.99 | 30.71 | 2.50 |
| d17 | 4.82 | 10.22 | 20.61 |
| d21 | 8.02 | 5.84 | 1.80 |
| d23 | 8.55 | 15.07 | 28.79 |
| d38 | 27.74 | 27.74 | 27.74 |
| Zoom data 2 | | | |
| OB | 984.4 | 984.4 | 984.4 |
| d5 | 32.62 | 49.15 | 57.30 |
| d10 | 56.99 | 30.71 | 2.50 |
| d17 | 4.82 | 10.22 | 20.61 |
| d21 | 12.81 | 17.12 | 29.09 |
| d23 | 3.76 | 3.79 | 1.50 |
| d38 | 27.74 | 27.74 | 27.74 |

| Unit focal length | | | |
|---|---|---|---|
| f1 = 182.46 | f2 = −51.62 | f3 = 61.13 | f4 = 150.76 |
| f5 = −73.02 | f6 = 288.82 | | |

Example 35

| Unit mm | | | | |
|---|---|---|---|---|
| Surface data | | | | |
| Surface no. | r | d | nd | νd |
| Object plane | ∞ | ∞ | | |
| 1 | 132.926 | 10.00 | 1.48749 | 70.23 |
| 2 | −1700.958 | 9.25 | | |
| 3 | 107.749 | 3.00 | 1.65412 | 39.68 |
| 4 | 62.991 | 13.20 | 1.43875 | 94.66 |
| 5 | 372.262 | Variable | | |
| 6 | 405.033 | 1.80 | 1.49700 | 81.54 |
| 7 | 34.236 | 4.46 | 1.84666 | 23.78 |

-continued

| Unit mm | | | | |
|---|---|---|---|---|
| 8 | 45.364 | 13.49 | | |
| 9 | −72.340 | 1.55 | 1.67790 | 50.72 |
| 10 | 267.419 | Variable | | |
| 11 | 144.312 | 5.70 | 1.49700 | 81.54 |
| 12 | −124.886 | 0.30 | | |
| 13 | 45.444 | 6.70 | 1.49700 | 81.54 |
| 14 | 193.417 | 2.07 | | |
| 15 | 65.194 | 1.50 | 1.91082 | 35.25 |
| 16 | 30.222 | 9.30 | 1.49700 | 81.54 |
| 17 | 116791.487 | Variable | 21 | |
| 18 (Stop) | ∞ | 1.00 | | |
| 19 | 64.834 | 5.50 | 1.58267 | 46.42 |
| 20 | −67.122 | 1.10 | 1.88300 | 40.76 |
| 21 | −430.717 | Variable | | |
| 22 | −1131.367 | 1.00 | 1.71700 | 47.92 |
| 23 | 54.918 | Variable | | |
| 24 | 33.180 | 2.00 | 1.48749 | 70.23 |
| 25 | 32.760 | 8.24 | | |
| 26 | −67.263 | 1.90 | 1.85478 | 24.80 |
| 27 | −32.526 | 0.80 | 1.48749 | 70.23 |
| 28 | 43.088 | 2.10 | | |
| 29 | −49.165 | 0.80 | 1.57250 | 57.74 |
| 30 | 198.026 | 12.71 | | |
| 31 | 86.350 | 4.20 | 1.53172 | 48.84 |
| 32 | −43.735 | 0.30 | | |
| 33 | 134.401 | 4.00 | 1.58144 | 40.75 |
| 34 | −39.696 | 1.00 | 2.00100 | 29.13 |
| 35 | −103.563 | 5.88 | | |
| 36 | 16.737 | 4.20 | 1.51742 | 52.43 |
| 37 | 101.714 | 0.30 | | |
| 38 | 26.512 | 3.30 | 1.68893 | 31.07 |
| 39 | −431.062 | 1.00 | 1.85150 | 40.78 |
| 40 | 15.200 | 4.97 | | |
| 41 | 621.116 | 1.00 | 1.92286 | 20.88 |
| 42 | 10.095 | 7.50 | 1.75211 | 25.05 |
| 43 | −13.281 | 1.00 | 1.91082 | 35.25 |
| 44 | 34.124 | 0.30 | | |
| 45 | 25.062 | 3.20 | 1.69895 | 30.13 |
| 46 | −163.374 | 6.91 | | |
| 47 | 53.236 | 5.51 | 1.63980 | 34.46 |
| 48 | −55.124 | 1.20 | 2.00100 | 29.13 |
| 49 | 160.867 | Variable | | |
| Image plane | ∞ | | | |

Zoom data 1

| | WE | ST | TE |
|---|---|---|---|
| f | 188.95 | 302.48 | 484.05 |
| FNO. | 5.60 | 5.59 | 5.67 |
| 2ω | 6.47 | 4.03 | 2.52 |
| BF(in air) | 27.74 | 27.74 | 27.74 |
| LTL(in air) | 313.97 | 313.97 | 313.97 |
| d5 | 32.62 | 49.15 | 57.30 |
| d10 | 56.99 | 30.71 | 2.50 |
| d17 | 4.82 | 10.22 | 20.61 |
| d21 | 8.02 | 5.84 | 1.80 |
| d23 | 8.55 | 15.07 | 28.790 |
| d49 | 27.74 | 27.74 | 27.74 |

Unit focal length

| | | | |
|---|---|---|---|
| f1 = 182.46 | f2 = −51.62 | f3 = 61.13 | f4 = 150.76 |
| f5 = −73.02 | f6 = −101.37 | | |

Example 36

Unit mm

Surface data

| Surface no. | r | d | nd | νd |
|---|---|---|---|---|
| Object plane | ∞ | ∞ | | |
| 1 | 181.862 | 8.85 | 1.48749 | 70.23 |
| 2 | −865.008 | 0.40 | | |
| 3 | 137.609 | 3.20 | 1.72047 | 34.71 |
| 4 | 85.184 | 11.16 | 1.43875 | 94.66 |
| 5 | 390.122 | Variable | | |
| 6 | 259.552 | 2.21 | 1.48749 | 70.23 |
| 7 | 42.628 | 7.50 | 1.84666 | 23.78 |
| 8 | 55.583 | 7.90 | | |
| 9 | −101.856 | 1.80 | 1.72916 | 54.68 |
| 10 | 337.770 | Variable | | |
| 11 | 59.262 | 7.05 | 1.74400 | 44.78 |
| 12 | −1026.946 | 2.53 | | |
| 13 | 38.888 | 9.59 | 1.49700 | 81.54 |
| 14 | −147.546 | 4.37 | 1.73400 | 51.47 |
| 15 | 33.230 | 2.29 | | |
| 16 | 53.872 | 2.00 | 1.85478 | 24.80 |
| 17 | 32.955 | 6.12 | 1.49700 | 81.54 |
| 18 | 144.445 | 3.50 | | |
| 19 (Stop) | ∞ | Variable | | |
| 20* | 37.882 | 9.34 | 1.49700 | 81.54 |
| 21* | −129.114 | Variable | | |
| 22 | 383.816 | 1.72 | 1.72916 | 54.68 |
| 23 | 26.565 | 2.01 | 1.72000 | 46.02 |
| 24 | 32.352 | Variable | | |
| 25 | 80.605 | 1.20 | 1.80610 | 33.27 |
| 26 | 33.270 | 2.83 | | |
| 27 | 32.833 | 4.20 | 1.51633 | 64.14 |
| 28 | −71.758 | 3.00 | | |
| 29 | −360.577 | 2.80 | 1.85478 | 24.80 |
| 30 | −48.020 | 1.00 | 1.59282 | 68.63 |
| 31 | 28.674 | 5.34 | | |
| 32 | −84.373 | 1.00 | 1.77250 | 49.60 |
| 33 | 46.556 | 3.00 | | |
| 34 | 58.135 | 3.70 | 1.67300 | 38.15 |
| 35 | −404.506 | 4.52 | | |
| 36 | 46.593 | 6.00 | 1.73800 | 32.26 |
| 37 | −29.142 | 1.50 | 1.80810 | 22.76 |
| 38 | −105.732 | Variable | | |
| Image plane | ∞ | | | |

Aspherical surface data

20th surface k = 0.000
A4 = −1.75027e−06, A6 = 7.83521e−10, A8 = 3.81938e−12

21th surface k = 0.000
A4 = 9.16020e−07, A6 = 1.56530e−09, A8 = 1.31372e−12

| | WE | ST | TE |
|---|---|---|---|
| **Zoom data 1** | | | |
| f | 153.00 | 240.00 | 391.99 |
| FNO. | 4.58 | 4.58 | 4.58 |
| 2ω | 8.07 | 5.14 | 3.14 |
| BF (in air) | 26.75 | 26.75 | 26.75 |
| LTL (in air) | 270.60 | 301.60 | 305.60 |
| d5 | 20.45 | 69.11 | 100.81 |
| d10 | 52.56 | 35.75 | 1.50 |
| d19 | 4.20 | 3.35 | 9.90 |
| d21 | 14.00 | 10.99 | 5.50 |
| d24 | 18.97 | 21.98 | 27.47 |
| d38 | 26.75 | 26.75 | 26.75 |
| **Zoom data 2** | | | |
| OB | 1028.0 | 1028.0 | 1028.0 |
| d5 | 20.45 | 69.11 | 100.81 |

-continued

| Unit mm | | | |
|---|---|---|---|
| d10 | 52.56 | 35.75 | 1.50 |
| d19 | 4.20 | 3.35 | 9.90 |
| d21 | 18.14 | 19.99 | 28.50 |
| d24 | 14.84 | 12.99 | 4.48 |
| d38 | 26.75 | 26.75 | 26.75 |

| Unit focal length | | | |
|---|---|---|---|
| f1 = 241.58 | f2 = −73.99 | f3 = 101.19 | f4 = 60.05 |
| f5 = −48.50 | f6 = 131.10 | | |

Example 37

Unit mm

Surface data

| Surface no. | r | d | nd | νd |
|---|---|---|---|---|
| Object plane | ∞ | ∞ | | |
| 1 | 181.897 | 10.00 | 1.48749 | 70.23 |
| 2 | −674.479 | 0.40 | | |
| 3 | 127.850 | 3.18 | 1.72047 | 34.71 |
| 4 | 79.056 | 11.92 | 1.43875 | 94.66 |
| 5 | 372.544 | Variable | | |
| 6 | 325.364 | 2.20 | 1.48749 | 70.23 |
| 7 | 42.832 | 7.50 | 1.84666 | 23.78 |
| 8 | 56.004 | 5.41 | | |
| 9 | −114.233 | 1.80 | 1.72916 | 54.68 |
| 10 | 291.883 | Variable | | |
| 11 | 55.547 | 8.00 | 1.74400 | 44.78 |
| 12 | 8009.089 | 2.96 | | |
| 13 | 36.712 | 9.36 | 1.49700 | 81.54 |
| 14 | −145.681 | 3.39 | 1.73400 | 51.47 |
| 15 | 31.298 | 2.89 | | |
| 16 | 63.371 | 2.00 | 1.85478 | 24.80 |
| 17 | 34.377 | 5.49 | 1.49700 | 81.54 |
| 18 | 92.475 | 3.50 | | |
| 19 (Stop) | ∞ | Variable | | |
| 20* | 34.323 | 8.05 | 1.49700 | 81.54 |
| 21* | −81.950 | Variable | | |
| 22 | 2288.340 | 1.09 | 1.72916 | 54.68 |
| 23 | 28.803 | 2.00 | 1.85478 | 24.80 |
| 24 | 33.789 | Variable | | |
| 25 | 76.985 | 1.20 | 1.80100 | 34.97 |
| 26 | 29.222 | 2.90 | | |
| 27 | 31.416 | 4.20 | 1.51633 | 64.14 |
| 28 | −46.497 | 3.00 | | |
| 29 | 348.043 | 2.80 | 1.85478 | 24.80 |
| 30 | −57.901 | 1.00 | 1.59282 | 68.63 |
| 31 | 44.647 | 6.50 | | |
| 32 | −85.929 | 1.00 | 1.77250 | 49.60 |
| 33 | 33.687 | 3.00 | | |
| 34 | 40.033 | 3.70 | 1.67300 | 38.15 |
| 35 | 119.042 | 10.50 | | |
| 36 | 41.690 | 6.00 | 1.73800 | 32.26 |
| 37 | −36.127 | 1.50 | 1.80810 | 22.76 |
| 38 | 1705.348 | Variable | | |
| Image plane | ∞ | | | |

Aspherical surface data

20th surface k = 0.000
A4 = −3.23418e−06, A6 = −1.47108e−09, A8 = −4.13399e−12

-continued

Unit mm

21th surface k = 0.000
A4 = 9.79393e−07, A6 = −1.46072e−09, A8 = −1.78826e−12

| | WE | ST | TE |
|---|---|---|---|
| Zoom data 1 | | | |
| f | 123.00 | 230.02 | 391.98 |
| FNO. | 4.08 | 4.08 | 4.08 |
| 2ω | 10.09 | 5.39 | 3.16 |
| BF (in air) | 26.75 | 26.75 | 26.75 |
| LTL (in air) | 315.08 | 302.60 | 302.08 |
| d5 | 15.72 | 57.84 | 95.06 |
| d10 | 98.40 | 38.58 | 1.50 |
| d19 | 5.35 | 10.55 | 9.90 |
| d21 | 10.37 | 13.14 | 5.50 |
| d24 | 20.04 | 17.28 | 24.92 |
| d38 | 26.75 | 26.75 | 26.75 |
| Zoom data 2 | | | |
| OB | 983.5 | 983.5 | 983.5 |
| d5 | 15.72 | 57.84 | 95.06 |
| d10 | 98.40 | 38.58 | 1.50 |
| d19 | 5.35 | 10.55 | 9.90 |
| d21 | 12.69 | 21.38 | 27.43 |
| d24 | 17.73 | 9.05 | 3.00 |
| d38 | 26.75 | 26.75 | 26.75 |

| Unit focal length | | | |
|---|---|---|---|
| f1 = 227.37 | f2 = −74.80 | f3 = 142.87 | f4 = 49.82 |
| f5 = −48.81 | f6 = 202.26 | | |

Example 38

Unit mm

Surface data

| Surface no. | r | d | nd | νd |
|---|---|---|---|---|
| Object plane | ∞ | ∞ | | |
| 1 | 113.660 | 12.34 | 1.48749 | 70.23 |
| 2 | 4723.991 | 0.20 | | |
| 3 | 109.753 | 3.60 | 1.72047 | 34.71 |
| 4 | 62.259 | 17.24 | 1.43875 | 94.66 |
| 5 | 2255.011 | Variable | | |
| 6 | −218.647 | 2.20 | 1.69680 | 55.53 |
| 7 | 46.547 | 7.50 | 1.85025 | 30.05 |
| 8 | 140.697 | 3.27 | | |
| 9 | −397.467 | 1.80 | 1.48749 | 70.23 |
| 10 | 90.053 | Variable | | |
| 11 | 90.812 | 6.50 | 1.61800 | 63.40 |
| 12 | −223.265 | 11.90 | | |
| 13 | 136.600 | 6.80 | 1.49700 | 81.54 |
| 14 | −90.555 | 2.00 | 1.80000 | 29.84 |
| 15 | −522.620 | Variable | | |
| 16 (Stop) | ∞ | 2.00 | | |
| 17 | 78.264 | 2.00 | 1.95375 | 32.32 |
| 18 | 32.106 | 8.16 | 1.49700 | 81.54 |
| 19 | −81.298 | 1.80 | 1.85025 | 30.05 |
| 20 | −308.610 | 0.30 | | |
| 21 | 38.195 | 4.54 | 1.73800 | 32.26 |
| 22 | 341.955 | Variable | | |
| 23 | 595.928 | 1.00 | 1.77250 | 49.60 |
| 24 | 21.166 | 2.00 | 1.80810 | 22.76 |
| 25 | 27.947 | Variable | | |
| 26 | 32.525 | 2.00 | 1.80810 | 22.76 |
| 27 | 134.186 | 1.00 | 1.88300 | 40.76 |
| 28 | 19.580 | Variable | | |
| 29 | 54.449 | 3.50 | 1.43875 | 94.66 |

-continued

| Unit mm | | | | |
|---|---|---|---|---|
| 30 | −28.871 | 3.00 | | |
| 31 | 153.778 | 3.00 | 1.85478 | 24.80 |
| 32 | −29.747 | 1.00 | 1.75500 | 52.32 |
| 33 | 20.074 | 4.02 | | |
| 34 | −26.292 | 1.00 | 1.88300 | 40.76 |
| 35 | −49.083 | 3.00 | | |
| 36 | 42.128 | 5.20 | 1.69895 | 30.13 |
| 37 | −21.482 | 0.20 | | |
| 38 | −25.000 | 4.20 | 1.85478 | 24.80 |
| 39 | −14.925 | 1.50 | 1.94595 | 17.98 |
| 40 | −47.324 | Variable | | |
| Image plane | ∞ | | | |

| | WE | ST | TE |
|---|---|---|---|
| Zoom data 1 | | | |
| f | 149.85 | 235.09 | 383.85 |
| FNO. | 4.49 | 4.49 | 4.48 |
| 2ω | 8.21 | 5.23 | 3.19 |
| d5 | 2.84 | 25.90 | 44.24 |
| d10 | 65.10 | 33.85 | 1.80 |
| d15 | 3.10 | 11.29 | 25.00 |
| d22 | 17.80 | 13.54 | 3.00 |
| d25 | 5.00 | 8.05 | 18.70 |
| d28 | 6.23 | 7.44 | 7.33 |
| d40 | 28.08 | 28.08 | 28.08 |
| Zoom data 2 | | | |
| OB | 851.8 | 851.8 | 851.8 |
| d5 | 2.84 | 25.90 | 44.24 |
| d10 | 65.10 | 33.85 | 1.80 |
| d15 | 3.10 | 11.29 | 25.00 |
| d22 | 20.67 | 20.33 | 17.94 |
| d25 | 4.55 | 4.27 | 6.17 |
| d28 | 3.82 | 4.43 | 4.94 |
| d40 | 28.08 | 28.08 | 28.08 |
| BF (in air) | 28.08 | 28.08 | 28.08 |
| LTL (in air) | 257.92 | 257.92 | 257.92 |

| Unit focal length | | | |
|---|---|---|---|
| f1 = 164.32 | f2 = −78.24 | f3 = 89.67 | f4 = 71.93 |
| f5 = −38.73 | f6 = −55.99 | f7 = 80.58 | |

Example 39

Unit mm

Surface data

| Surface no. | r | d | nd | νd |
|---|---|---|---|---|
| Object plane | ∞ | ∞ | | |
| 1 | 182.793 | 8.90 | 1.48749 | 70.23 |
| 2 | −773.063 | 0.40 | | |
| 3 | 128.644 | 3.00 | 1.72047 | 34.71 |
| 4 | 80.920 | 11.75 | 1.43875 | 94.66 |
| 5 | 398.021 | Variable | | |
| 6 | 288.158 | 2.20 | 1.48749 | 70.23 |
| 7 | 42.798 | 7.10 | 1.84666 | 23.78 |
| 8 | 53.816 | 5.61 | | |
| 9 | −114.243 | 1.80 | 1.72916 | 54.68 |
| 10 | 360.334 | Variable | | |
| 11 | 54.948 | 7.25 | 1.74400 | 44.78 |
| 12 | 4333.735 | 0.73 | | |
| 13 | 35.207 | 9.32 | 1.49700 | 81.54 |
| 14 | −188.319 | 2.53 | 1.73400 | 51.47 |
| 15 | 31.337 | 6.91 | | |
| 16 | 73.418 | 2.00 | 1.85478 | 24.80 |
| 17 | 36.736 | 4.94 | 1.49700 | 81.54 |
| 18 | 70.971 | 4.37 | | |
| 19 (Stop) | ∞ | Variable | | |
| 20* | 33.391 | 8.93 | 1.49700 | 81.54 |
| 21* | −71.853 | Variable | | |
| 22 | 2769.769 | 1.00 | 1.72916 | 54.68 |
| 23 | 25.306 | 2.00 | 1.85478 | 24.80 |
| 24 | 31.785 | Variable | | |
| 25 | 142.096 | 1.20 | 1.75520 | 27.51 |
| 26 | 45.141 | 2.90 | | |
| 27 | 45.692 | 4.20 | 1.51633 | 64.14 |
| 28 | −49.767 | 3.00 | | |
| 29 | 118.585 | 2.80 | 1.85478 | 24.80 |
| 30 | −80.427 | 1.00 | 1.59282 | 68.63 |
| 31 | 47.402 | 1.84 | | |
| 32 | −101.774 | 1.00 | 1.77250 | 49.60 |
| 33 | 45.971 | 3.00 | | |
| 34 | 46.082 | 3.70 | 1.67300 | 38.15 |
| 35 | 270.819 | 30.00 | | |
| 36 | 40.511 | 6.00 | 1.74951 | 35.33 |
| 37 | −51.068 | 1.50 | 1.80518 | 25.42 |
| 38 | 74.717 | Variable | | |
| Image plane | ∞ | | | |

Aspherical surface data

20th surface k = 0.000
A4 = −3.75524e−06, A6 = −2.17024e−09, A8 = −4.07174e−12

21th surface k = 0.000
A4 = 1.48614e−06, A6 = −2.09476e−09, A8 = −9.65410e−13

| | WE | ST | TE |
|---|---|---|---|
| Zoom data 1 | | | |
| f | 152.21 | 238.78 | 389.97 |
| FNO. | 4.56 | 4.56 | 4.56 |
| 2ω | 8.17 | 5.20 | 3.19 |
| BF (in air) | 28.65 | 28.65 | 28.65 |
| LTL (in air) | 318.49 | 318.49 | 318.49 |
| d5 | 29.11 | 61.87 | 95.64 |
| d10 | 75.02 | 37.39 | 1.50 |
| d19 | 4.03 | 8.90 | 11.02 |
| d21 | 11.57 | 12.07 | 5.50 |
| d24 | 17.23 | 16.73 | 23.30 |
| d38 | 28.65 | 28.65 | 28.6 |
| Zoom data 2 | | | |
| OB | 980.0 | 980.0 | 980.0 |
| d5 | 29.11 | 61.87 | 95.64 |
| d10 | 75.02 | 37.39 | 1.50 |
| d19 | 4.03 | 8.90 | 11.02 |
| d21 | 14.88 | 19.96 | 24.99 |
| d24 | 13.92 | 8.84 | 3.81 |
| d38 | 28.65 | 28.65 | 28.65 |

| Unit focal length | | | |
|---|---|---|---|
| f1 = 226.98 | f2 = −74.95 | f3 = 179.82 | f4 = 47.20 |
| f5 = −46.49 | f6 = 167.21 | | |

Example 40

Unit mm

Surface data

| Surface no. | r | d | nd | νd |
|---|---|---|---|---|
| Object plane | ∞ | ∞ | | |
| 1 | 182.793 | 8.90 | 1.48749 | 70.23 |
| 2 | −773.063 | 0.40 | | |

-continued

| Unit mm | | | | |
|---|---|---|---|---|
| 3 | 128.644 | 3.00 | 1.72047 | 34.71 |
| 4 | 80.920 | 11.75 | 1.43875 | 94.66 |
| 5 | 398.021 | Variable | | |
| 6 | 288.158 | 2.20 | 1.48749 | 70.23 |
| 7 | 42.798 | 7.10 | 1.84666 | 23.78 |
| 8 | 53.816 | 5.61 | | |
| 9 | −114.243 | 1.80 | 1.72916 | 54.68 |
| 10 | 360.334 | Variable | | |
| 11 | 54.948 | 7.25 | 1.74400 | 44.78 |
| 12 | 4333.735 | 0.73 | | |
| 13 | 35.207 | 9.32 | 1.49700 | 81.54 |
| 14 | −188.319 | 2.53 | 1.73400 | 51.47 |
| 15 | 31.337 | 6.91 | | |
| 16 | 73.418 | 2.00 | 1.85478 | 24.80 |
| 17 | 36.736 | 4.94 | 1.49700 | 81.54 |
| 18 | 70.971 | 4.37 | | |
| 19 (Stop) | ∞ | Variable | | |
| 20* | 33.391 | 8.93 | 1.49700 | 81.54 |
| 21* | −71.853 | Variable | | |
| 22 | 2769.769 | 1.00 | 1.72916 | 54.68 |
| 23 | 25.306 | 2.00 | 1.85478 | 24.80 |
| 24 | 31.785 | Variable | | |
| 25 | 142.096 | 1.20 | 1.75520 | 27.51 |
| 26 | 45.141 | 2.90 | | |
| 27 | 45.692 | 4.20 | 1.51633 | 64.14 |
| 28 | −49.767 | 3.00 | | |
| 29 | 118.585 | 2.80 | 1.85478 | 24.80 |
| 30 | −80.427 | 1.00 | 1.59282 | 68.63 |
| 31 | 47.402 | 1.84 | | |
| 32 | −101.774 | 1.00 | 1.77250 | 49.60 |
| 33 | 45.971 | 3.00 | | |
| 34 | 46.082 | 3.70 | 1.67300 | 38.15 |
| 35 | 270.819 | 6.00 | | |
| 36 | 16.111 | 5.52 | 1.48749 | 70.23 |
| 37 | −84.774 | 0.43 | | |
| 38 | 52.118 | 1.02 | 1.49700 | 81.54 |
| 39 | 25.550 | 2.21 | | |
| 40 | −98.115 | 0.90 | 1.88100 | 40.14 |
| 41 | 13.481 | 6.59 | 1.67300 | 38.15 |
| 42 | −13.139 | 0.90 | 1.88100 | 40.14 |
| 43 | 22.295 | 1.36 | | |
| 44 | 33.953 | 2.93 | 1.73800 | 32.26 |
| 45 | −86.500 | 2.12 | | |
| 46 | 40.511 | 6.00 | 1.74951 | 35.33 |
| 47 | −51.068 | 1.50 | 1.80518 | 25.42 |
| 48 | 74.717 | Variable | | |
| Image plane | ∞ | | | |

Aspherical surface data

20th surface k = 0.000
A4 = −3.75524e−06, A6 = −2.17024e−09, A8 = −4.07174e−12

21th surface k = 0.000
A4 = 1.48614e−06, A6 = −2.09476e−09, A8 = −9.65410e−13

Zoom data 1

| | WE | ST | TE |
|---|---|---|---|
| f | 190.23 | 298.42 | 487.38 |
| FNO. | 5.69 | 5.70 | 5.69 |
| 2ω | 6.42 | 4.09 | 2.50 |
| BF (in air) | 28.65 | 28.65 | 28.65 |
| LTL (in air) | 318.50 | 318.50 | 318.50 |
| d5 | 29.11 | 61.87 | 95.64 |
| d10 | 75.02 | 37.39 | 1.50 |
| d19 | 4.03 | 8.90 | 11.02 |
| d21 | 11.57 | 12.07 | 5.50 |
| d24 | 17.23 | 16.73 | 23.30 |
| d48 | 28.65 | 28.65 | 28.65 |

Unit focal length f1 = 226.98 f2 = −74.95 f3 = 179.82 f4 = 47.20
f5 = −46.49 f6 = −200.08

Example 41

Unit mm

Surface data

| Surface no. | r | d | nd | νd |
|---|---|---|---|---|
| Object plane | ∞ | ∞ | | |
| 1 | 181.127 | 8.85 | 1.48749 | 70.23 |
| 2 | −947.805 | 0.40 | | |
| 3 | 133.128 | 3.00 | 1.72047 | 34.71 |
| 4 | 83.287 | 11.68 | 1.43875 | 94.66 |
| 5 | 443.733 | Variable | | |
| 6 | 307.590 | 2.20 | 1.48749 | 70.23 |
| 7 | 42.617 | 7.50 | 1.84666 | 23.78 |
| 8 | 52.879 | 7.80 | | |
| 9 | −104.850 | 1.80 | 1.72916 | 54.68 |
| 10 | 674.298 | Variable | | |
| 11 | 54.532 | 7.08 | 1.74400 | 44.78 |
| 12 | 1357.445 | 0.50 | | |
| 13 | 31.270 | 9.06 | 1.49700 | 81.54 |
| 14 | −380.692 | 2.00 | 1.73400 | 51.47 |
| 15 | 28.188 | 3.96 | | |
| 16 | 80.687 | 2.00 | 1.85478 | 24.80 |
| 17 | 39.283 | 5.01 | 1.49700 | 81.54 |
| 18 | 87.400 | 3.50 | | |
| 19 (Stop) | ∞ | 10.40 | | |
| 20* | 33.508 | 7.50 | 1.49700 | 81.54 |
| 21* | −75.978 | Variable | | |
| 22 | 499.087 | 1.00 | 1.72916 | 54.68 |
| 23 | 25.389 | 2.00 | 1.85478 | 24.80 |
| 24 | 31.472 | Variable | | |
| 25 | 169.917 | 1.20 | 1.75520 | 27.51 |
| 26 | 45.668 | Variable | | |
| 27 | 45.738 | 4.20 | 1.51633 | 64.14 |
| 28 | −58.203 | 3.00 | | |
| 29 | 140.081 | 2.80 | 1.85478 | 24.80 |
| 30 | −69.350 | 1.00 | 1.59282 | 68.63 |
| 31 | 49.103 | 1.95 | | |
| 32 | −86.784 | 1.00 | 1.77250 | 49.60 |
| 33 | 51.657 | 3.00 | | |
| 34 | 48.308 | 3.70 | 1.67300 | 38.15 |
| 35 | 15364.863 | 30.00 | | |
| 36 | 49.999 | 6.00 | 1.74951 | 35.33 |
| 37 | −43.225 | 1.50 | 1.80810 | 22.76 |
| 38 | 105.758 | Variable | | |
| Image plane | ∞ | | | |

Aspherical surface data

20th surface k = 0.000
A4 = −3.77264e−06, A6 = −2.12851e−09, A8 = −2.70099e−12

-continued

| Unit mm | | | |
|---|---|---|---|
| 21th surface | | | |
| k = 0.000 | | | |
| A4 = 1.21904e−06, A6 = −1.70217e−09, A8 = −7.92292e−13 | | | |
| | WE | ST | TE |
| Zoom data 1 | | | |
| f | 152.04 | 238.52 | 389.53 |
| FNO. | 4.55 | 4.55 | 4.55 |
| 2ω | 8.15 | 5.19 | 3.18 |
| BF (in air) | 28.63 | 28.63 | 28.63 |
| LTL (in air) | 318.47 | 318.47 | 318.47 |
| d5 | 27.63 | 62.53 | 97.90 |
| d10 | 71.76 | 36.87 | 1.50 |
| d21 | 11.42 | 11.85 | 5.50 |
| d24 | 19.27 | 17.86 | 23.30 |
| d26 | 3.19 | 4.17 | 5.08 |
| d38 | 28.63 | 28.63 | 28.63 |
| Zoom data 2 | | | |
| OB | 981.5 | 981.5 | 981.5 |
| d5 | 27.63 | 62.53 | 97.90 |
| d10 | 71.76 | 36.87 | 1.50 |
| d21 | 14.58 | 19.51 | 25.03 |
| d24 | 16.11 | 10.20 | 3.77 |
| d26 | 3.19 | 4.17 | 5.08 |
| d38 | 28.63 | 28.63 | 28.63 |

| Unit focal length | | | |
|---|---|---|---|
| f1 = 231.10 | f2 = −74.79 | f3 = 56.72 | f4 = −48.68 |
| f5 = −83.04 | f6 = 72.15 | | |

Example 42

| Unit mm | | | | |
|---|---|---|---|---|
| Surface data | | | | |
| Surface no. | r | d | nd | νd |
| Object plane | ∞ | ∞ | | |
| 1 | 181.127 | 8.85 | 1.48749 | 70.23 |
| 2 | −947.805 | 0.40 | | |
| 3 | 133.128 | 3.00 | 1.72047 | 34.71 |
| 4 | 83.287 | 11.68 | 1.43875 | 94.66 |
| 5 | 443.733 | Variable | | |
| 6 | 307.590 | 2.20 | 1.48749 | 70.23 |
| 7 | 42.617 | 7.50 | 1.84666 | 23.78 |
| 8 | 52.879 | 7.80 | | |
| 9 | −104.850 | 1.80 | 1.72916 | 54.68 |
| 10 | 674.298 | Variable | | |
| 11 | 54.532 | 7.08 | 1.74400 | 44.78 |
| 12 | 1357.445 | 0.50 | | |
| 13 | 31.270 | 9.06 | 1.49700 | 81.54 |
| 14 | −380.692 | 2.00 | 1.73400 | 51.47 |
| 15 | 28.188 | 3.96 | | |
| 16 | 80.687 | 2.00 | 1.85478 | 24.80 |
| 17 | 39.283 | 5.01 | 1.49700 | 81.54 |
| 18 | 87.400 | 3.50 | | |
| 19 (Stop) | ∞ | 10.40 | | |
| 20* | 33.508 | 7.50 | 1.49700 | 81.54 |
| 21* | −75.978 | Variable | | |
| 22 | 499.087 | 1.00 | 1.72916 | 54.68 |
| 23 | 25.389 | 2.00 | 1.85478 | 24.80 |
| 24 | 31.472 | Variable | | |
| 25 | 169.917 | 1.20 | 1.75520 | 27.51 |
| 26 | 45.668 | Variable | | |
| 27 | 45.738 | 4.20 | 1.51633 | 64.14 |
| 28 | −58.203 | 3.00 | | |
| 29 | 140.081 | 2.80 | 1.85478 | 24.80 |
| 30 | −69.350 | 1.00 | 1.59282 | 68.63 |
| 31 | 49.103 | 1.95 | | |
| 32 | −86.784 | 1.00 | 1.77250 | 49.60 |
| 33 | 51.657 | 3.00 | | |
| 34 | 48.308 | 3.70 | 1.67300 | 38.15 |
| 35 | 15364.863 | 3.98 | | |
| 36 | 16.111 | 5.52 | 1.48749 | 70.23 |
| 37 | −84.774 | 0.43 | | |
| 38 | 52.118 | 1.02 | 1.49700 | 81.54 |
| 39 | 25.550 | 2.21 | | |
| 40 | −98.115 | 0.90 | 1.88100 | 40.14 |
| 41 | 13.481 | 6.59 | 1.67300 | 38.15 |
| 42 | −13.139 | 0.90 | 1.88100 | 40.14 |
| 43 | 22.295 | 1.36 | | |
| 44 | 33.953 | 2.93 | 1.73800 | 32.26 |
| 45 | −89.590 | 4.15 | | |
| 46 | 49.999 | 6.00 | 1.74951 | 35.33 |
| 47 | −43.225 | 1.50 | 1.80810 | 22.76 |
| 48 | 105.758 | Variable | | |
| Image plane | ∞ | | | |

| Aspherical surface data |
|---|
| 20th surface |
| k = 0.000 |
| A4 = −3.77264e−06, A6 = −2.12851e−09, A8 = −2.70099e−12 |
| 21th surface |
| k = 0.000 |
| A4 = 1.21904e−06, A6 = −1.70217e−09, A8 = −7.92292e−13 |

| Zoom data 1 | | | |
|---|---|---|---|
| | WE | ST | TE |
| f | 190.06 | 298.16 | 486.94 |
| FNO. | 5.69 | 5.69 | 5.69 |
| 2ω | 6.42 | 4.09 | 2.51 |
| BF (in air) | 28.63 | 28.63 | 28.63 |
| LTL (in air) | 318.47 | 318.47 | 318.47 |
| d5 | 27.63 | 62.53 | 97.90 |
| d10 | 71.76 | 36.87 | 1.50 |
| d21 | 11.42 | 11.85 | 5.50 |
| d24 | 19.27 | 17.86 | 23.30 |
| d26 | 3.19 | 4.17 | 5.08 |
| d48 | 28.63 | 28.63 | 28.63 |

| Unit focal length | | | |
|---|---|---|---|
| f1 = 231.10 | f2 = −74.79 | f3 = 56.72 | f4 = −48.68 |
| f5 = −83.04 | f6 = 91.13 | | |

Example 43

| Unit mm | | | | |
|---|---|---|---|---|
| Surface data | | | | |
| Surface no. | r | d | nd | νd |
| Object plane | ∞ | ∞ | | |
| 1 | 134.303 | 12.49 | 1.48749 | 70.23 |
| 2 | 4713.154 | 0.20 | | |
| 3 | 125.063 | 3.00 | 1.67300 | 38.15 |
| 4 | 70.036 | 16.94 | 1.43875 | 94.66 |
| 5 | 490.913 | Variable | | |
| 6 | −1224.194 | 3.76 | 1.84666 | 23.78 |
| 7 | −96.069 | 1.60 | 1.48749 | 70.23 |
| 8 | 48.344 | 2.91 | 1.80610 | 33.27 |
| 9 | 61.926 | 7.34 | | |
| 10 | −84.876 | 1.50 | 1.83481 | 42.71 |
| 11 | 163.805 | Variable | | |

-continued

| Unit mm | | | | |
|---|---|---|---|---|
| 12 (Stop) | ∞ | 1.80 | | |
| 13* | 63.026 | 6.29 | 1.49700 | 81.54 |
| 14* | −118.473 | 2.99 | | |
| 15 | −878.167 | 1.50 | 1.84666 | 23.78 |
| 16 | 83.578 | 10.13 | 1.59282 | 68.63 |
| 17 | −116.921 | 0.20 | | |
| 18 | 66.106 | 7.19 | 1.49700 | 81.54 |
| 19 | −56.691 | Variable | | |
| 20 | 980.005 | 1.50 | 1.74320 | 49.29 |
| 21 | 21.425 | 2.95 | 1.80518 | 25.42 |
| 22 | 32.721 | Variable | | |
| 23 | 52.574 | 1.40 | 1.77250 | 49.60 |
| 24 | 35.488 | Variable | | |
| 25 | −133.222 | 2.47 | 1.43875 | 94.66 |
| 26 | −38.532 | 1.08 | | |
| 27 | 74.653 | 2.45 | 1.85478 | 24.80 |
| 28 | −163.855 | 0.90 | 1.59282 | 68.63 |
| 29 | 40.205 | 2.06 | | |
| 30 | −120.987 | 0.90 | 1.77250 | 49.60 |
| 31 | 54.572 | 5.78 | | |
| 32 | 40.338 | 3.03 | 1.62299 | 58.16 |
| 33 | 460.286 | 39.88 | | |
| 34 | 36.411 | 8.38 | 1.61293 | 37.00 |
| 35 | −90.002 | 1.30 | 1.92286 | 20.88 |
| 36 | 103.304 | Variable | | |
| Image plane | ∞ | | | |

Aspherical surface data

13th surface k = 0.000
A4 = −1.49186e−06, A6 = 3.68488e−09, A8 = −6.55574e−12,
A10 = 2.24053e−14

14th surface k = 0.000
A4 = 4.08165e−06, A6 = 4.62924e−09, A8 = −6.75584e−12,
A10 = 2.62846e−14

| | WE | ST | TE |
|---|---|---|---|
| Zoom data 1 | | | |
| f | 151.86 | 244.31 | 392.63 |
| FNO. | 4.57 | 4.57 | 4.57 |
| 2ω | 8.22 | 5.11 | 3.17 |
| BF (in air) | 29.14 | 29.14 | 29.14 |
| LTL (in air) | 313.98 | 313.98 | 313.98 |
| d5 | 47.71 | 74.73 | 100.26 |
| d11 | 55.34 | 28.32 | 2.79 |
| d19 | 7.84 | 8.40 | 3.87 |
| d22 | 14.96 | 11.03 | 16.05 |
| d24 | 5.07 | 8.44 | 7.95 |
| d36 | 29.14 | 29.14 | 29.14 |
| Zoom data 2 | | | |
| OB | 984.6 | 984.6 | 984.6 |
| d5 | 47.71 | 74.73 | 100.26 |
| d11 | 55.34 | 28.32 | 2.79 |
| d19 | 9.99 | 13.82 | 17.81 |
| d22 | 13.56 | 7.96 | 4.87 |
| d24 | 4.32 | 6.10 | 5.19 |
| d36 | 29.14 | 29.14 | 29.14 |

Unit focal length f1 = 210.01 f2 = −54.84 f3 = 38.51 f4 = −48.09
f5 = −146.59 f6 = 137.14

Example 44

Unit mm

Surface data

| Surface no. | r | d | nd | νd |
|---|---|---|---|---|
| Object plane | ∞ | ∞ | | |
| 1 | 134.303 | 12.49 | 1.48749 | 70.23 |
| 2 | 4713.154 | 0.20 | | |
| 3 | 125.063 | 3.00 | 1.67300 | 38.15 |
| 4 | 70.036 | 16.94 | 1.43875 | 94.66 |
| 5 | 490.913 | Variable | | |
| 6 | −1224.194 | 3.76 | 1.84666 | 23.78 |
| 7 | −96.069 | 1.60 | 1.48749 | 70.23 |
| 8 | 48.344 | 2.91 | 1.80610 | 33.27 |
| 9 | 61.926 | 7.34 | | |
| 10 | −84.876 | 1.50 | 1.83481 | 42.71 |
| 11 | 163.805 | Variable | | |
| 12 (Stop) | ∞ | 1.80 | | |
| 13* | 63.026 | 6.29 | 1.49700 | 81.54 |
| 14* | −118.473 | 2.99 | | |
| 15 | −878.167 | 1.50 | 1.84666 | 23.78 |
| 16 | 83.578 | 10.13 | 1.59282 | 68.63 |
| 17 | −116.921 | 0.20 | | |
| 18 | 66.106 | 7.19 | 1.49700 | 81.54 |
| 19 | −56.691 | Variable | | |
| 20 | 980.005 | 1.50 | 1.74320 | 49.29 |
| 21 | 21.425 | 2.95 | 1.80518 | 25.42 |
| 22 | 32.721 | Variable | | |
| 23 | 52.574 | 1.40 | 1.77250 | 49.60 |
| 24 | 35.488 | Variable | | |
| 25 | −133.222 | 2.47 | 1.43875 | 94.66 |
| 26 | −38.532 | 1.08 | | |
| 27 | 74.653 | 2.45 | 1.85478 | 24.80 |
| 28 | −163.855 | 0.90 | 1.59282 | 68.63 |
| 29 | 40.205 | 2.06 | | |
| 30 | −120.987 | 0.90 | 1.77250 | 49.60 |
| 31 | 54.572 | 5.78 | | |
| 32 | 40.338 | 3.03 | 1.62299 | 58.16 |
| 33 | 460.286 | 1.92 | | |
| 34 | 23.197 | 5.24 | 1.54072 | 47.23 |
| 35 | 296.376 | 0.30 | | |
| 36 | 25.397 | 4.64 | 1.60342 | 38.03 |
| 37 | −1327.790 | 1.15 | 1.90366 | 31.32 |
| 38 | 17.767 | 9.85 | | |
| 39 | −52.478 | 0.95 | 1.88300 | 40.76 |
| 40 | 15.554 | 6.40 | 1.72047 | 34.71 |
| 41 | −19.970 | 0.95 | 1.88300 | 40.76 |
| 42 | 56.959 | 0.54 | | |
| 43 | 42.736 | 6.01 | 1.61340 | 44.27 |
| 44 | −35.480 | 1.93 | | |
| 45 | 36.411 | 8.38 | 1.61293 | 37.00 |
| 46 | −90.002 | 1.30 | 1.92286 | 20.88 |
| 47 | 103.304 | Variable | | |
| Image plane | ∞ | | | |

Aspherical surface data

13th surface k = 0.000
A4 = −1.49186e−06, A6 = 3.68488e−09, A8 = −6.55574e−12,
A10 = 2.24053e−14

14th surface k = 0.000
A4 = 4.08165e−06, A6 = 4.62924e−09, A8 = −6.75584e−12,
A10 = 2.62846e−14

Zoom data 1

| | WE | ST | TE |
|---|---|---|---|
| f | 189.70 | 305.19 | 490.47 |
| FNO. | 5.71 | 5.71 | 5.71 |
| 2ω | 6.50 | 4.04 | 2.51 |
| BF (in air) | 29.14 | 29.14 | 29.14 |

| Unit mm | | | |
|---|---|---|---|
| LTL (in air) | 313.99 | 313.99 | 313.99 |
| d5 | 47.71 | 74.73 | 100.26 |
| d11 | 55.34 | 28.32 | 2.79 |
| d19 | 7.84 | 8.40 | 3.87 |
| d22 | 14.96 | 11.03 | 16.05 |
| d24 | 5.07 | 8.44 | 7.95 |
| d47 | 29.14 | 29.14 | 29.14 |

| Unit focal length | | | |
|---|---|---|---|
| f1 = 210.01 | f2 = −54.84 | f3 = 38.51 | f4 = −48.09 |
| f5 = −146.59 | f6 = 5336.99 | | |

Example 45

Unit mm

Surface data

| Surface no. | r | d | nd | νd |
|---|---|---|---|---|
| Object plane | ∞ | ∞ | | |
| 1 | 125.084 | 10.00 | 1.48749 | 70.23 |
| 2 | −5323.708 | 11.64 | | |
| 3 | 108.564 | 3.00 | 1.65412 | 39.68 |
| 4 | 61.018 | 13.54 | 1.43875 | 94.66 |
| 5 | 401.982 | Variable | | |
| 6 | 302.147 | 1.80 | 1.49700 | 81.54 |
| 7 | 33.099 | 4.32 | 1.84666 | 23.78 |
| 8 | 43.904 | 14.83 | | |
| 9 | −70.516 | 1.55 | 1.67790 | 50.72 |
| 10 | 290.538 | Variable | | |
| 11 | 211.364 | 5.50 | 1.49700 | 81.54 |
| 12 | −128.471 | 0.30 | | |
| 13 | 45.364 | 6.70 | 1.49700 | 81.54 |
| 14 | 220.409 | 3.49 | | |
| 15 | 58.608 | 1.50 | 1.91082 | 35.25 |
| 16 | 29.036 | 8.70 | 1.49700 | 81.54 |
| 17 | 359.483 | Variable | | |
| 18 (Stop) | ∞ | 4.98 | | |
| 19 | 60.436 | 5.50 | 1.57135 | 52.95 |
| 20 | −60.230 | 1.10 | 1.88300 | 40.76 |
| 21 | −215.358 | Variable | | |
| 22 | −1463.883 | 1.00 | 1.71700 | 47.92 |
| 23 | 51.486 | Variable | | |
| 24 | −53.854 | 1.90 | 1.85478 | 24.80 |
| 25 | −28.920 | 0.80 | 1.48749 | 70.23 |
| 26 | 47.015 | 2.03 | | |
| 27 | −55.501 | 0.80 | 1.57250 | 57.74 |
| 28 | 130.815 | 13.43 | | |
| 29 | 65.955 | 4.50 | 1.53172 | 48.84 |
| 30 | −50.967 | 0.30 | | |
| 31 | 101.308 | 4.10 | 1.58144 | 40.75 |
| 32 | −41.429 | 1.00 | 2.00100 | 29.13 |
| 33 | −108.065 | 36.40 | | |
| 34 | 58.068 | 5.99 | 1.60342 | 38.03 |
| 35 | −37.000 | 1.20 | 2.00100 | 29.13 |
| 36 | 494.125 | Variable | | |
| Image plane | ∞ | | | |

| | WE | ST | TE |
|---|---|---|---|
| Zoom data 1 | | | |
| f | 152.13 | 243.54 | 389.77 |
| FNO. | 4.56 | 4.56 | 4.56 |
| 2ω | 8.06 | 5.02 | 3.14 |
| BF (in air) | 27.52 | 27.53 | 27.54 |
| LTL (in air) | 318.07 | 318.08 | 318.10 |
| d5 | 33.03 | 49.18 | 57.74 |
| d10 | 57.20 | 30.89 | 2.51 |
| d17 | 4.63 | 10.85 | 20.53 |
| d21 | 8.11 | 5.78 | 1.80 |

| Unit mm | | | |
|---|---|---|---|
| d23 | 15.71 | 21.97 | 36.10 |
| d36 | 27.52 | 27.53 | 27.54 |
| Zoom data 2 | | | |
| OB | 980.4 | 980.4 | 980.4 |
| d5 | 33.03 | 49.18 | 57.74 |
| d10 | 57.20 | 30.89 | 2.51 |
| d17 | 4.63 | 10.85 | 20.53 |
| d21 | 13.13 | 17.51 | 29.22 |
| d23 | 10.68 | 10.25 | 8.67 |
| d36 | 27.52 | 27.53 | 27.54 |

| Unit focal length | | | |
|---|---|---|---|
| f1 = 184.02 | f2 = −51.87 | f3 = 65.08 | f4 = 118.98 |
| f5 = −69.35 | f6 = 280.01 | | |

Example 46

Unit mm

Surface data

| Surface no. | r | d | nd | νd |
|---|---|---|---|---|
| Object plane | ∞ | ∞ | | |
| 1 | 125.084 | 10.00 | 1.48749 | 70.23 |
| 2 | −5323.708 | 11.64 | | |
| 3 | 108.564 | 3.00 | 1.65412 | 39.68 |
| 4 | 61.018 | 13.54 | 1.43875 | 94.66 |
| 5 | 401.982 | Variable | | |
| 6 | 302.147 | 1.80 | 1.49700 | 81.54 |
| 7 | 33.099 | 4.32 | 1.84666 | 23.78 |
| 8 | 43.904 | 14.83 | | |
| 9 | −70.516 | 1.55 | 1.67790 | 50.72 |
| 10 | 290.538 | Variable | | |
| 11 | 211.364 | 5.50 | 1.49700 | 81.54 |
| 12 | −128.471 | 0.30 | | |
| 13 | 45.364 | 6.70 | 1.49700 | 81.54 |
| 14 | 220.409 | 3.49 | | |
| 15 | 58.608 | 1.50 | 1.91082 | 35.25 |
| 16 | 29.036 | 8.70 | 1.49700 | 81.54 |
| 17 | 359.483 | Variable | | |
| 18 (Stop) | ∞ | 4.98 | | |
| 19 | 60.436 | 5.50 | 1.57135 | 52.95 |
| 20 | −60.230 | 1.10 | 1.88300 | 40.76 |
| 21 | −215.358 | Variable | | |
| 22 | −1463.883 | 1.00 | 1.71700 | 47.92 |
| 23 | 51.486 | Variable | | |
| 24 | −53.854 | 1.90 | 1.85478 | 24.80 |
| 25 | −28.920 | 0.80 | 1.48749 | 70.23 |
| 26 | 47.015 | 2.03 | | |
| 27 | −55.501 | 0.80 | 1.57250 | 57.74 |
| 28 | 130.815 | 13.43 | | |
| 29 | 65.955 | 4.50 | 1.53172 | 48.84 |
| 30 | −50.967 | 0.30 | | |
| 31 | 101.308 | 4.10 | 1.58144 | 40.75 |
| 32 | −41.429 | 1.00 | 2.00100 | 29.13 |
| 33 | −108.065 | 3.18 | | |
| 34 | 17.484 | 4.20 | 1.51742 | 52.43 |
| 35 | 71.565 | 1.23 | | |
| 36 | 30.544 | 2.62 | 1.68893 | 31.07 |
| 37 | 222.321 | 0.90 | 1.85150 | 40.78 |
| 38 | 16.519 | 5.91 | | |
| 39 | 74.368 | 0.90 | 1.92286 | 20.88 |
| 40 | 10.175 | 7.90 | 1.75211 | 25.05 |
| 41 | −14.669 | 0.90 | 1.91082 | 35.25 |
| 42 | 28.818 | 0.30 | | |
| 43 | 22.013 | 2.90 | 1.69895 | 30.13 |
| 44 | 267.121 | 5.47 | | |

-continued

| Unit mm | | | | |
|---|---|---|---|---|
| 45 | 58.068 | 5.99 | 1.60342 | 38.03 |
| 46 | −37.000 | 1.20 | 2.00100 | 29.13 |
| 47 | 494.125 | Variable | | |
| Image plane | ∞ | | | |

| Zoom data 1 | | | |
|---|---|---|---|
| | WE | ST | TE |
| f | 190.19 | 304.50 | 487.46 |
| FNO. | 5.72 | 5.72 | 5.72 |
| 2ω | 6.42 | 4.00 | 2.50 |
| BF (in air) | 27.52 | 27.53 | 27.56 |
| LTL (in air) | 318.08 | 318.09 | 318.12 |
| d5 | 33.03 | 49.18 | 57.74 |
| d10 | 57.20 | 30.89 | 2.51 |
| d17 | 4.63 | 10.85 | 20.53 |
| d21 | 8.11 | 5.78 | 1.80 |
| d23 | 15.71 | 21.97 | 36.10 |
| d47 | 27.52 | 27.53 | 27.56 |

| Unit focal length | | | |
|---|---|---|---|
| f1 = 184.02 | f2 = −51.87 | f3 = 65.08 | f4 = 118.98 |
| f5 = −69.35 | f6 = −98.04 | | |

Example 47

Unit mm

Surface data

| Surface no. | r | d | nd | νd |
|---|---|---|---|---|
| Object plane | ∞ | ∞ | | |
| 1 | 154.683 | 9.03 | 1.48749 | 70.23 |
| 2 | −2082.738 | 0.30 | | |
| 3 | 131.373 | 3.00 | 1.72047 | 34.71 |
| 4 | 77.338 | 12.73 | 1.43875 | 94.66 |
| 5 | 754.277 | Variable | | |
| 6 | 9590.851 | 1.90 | 1.48749 | 70.23 |
| 7 | 38.397 | 6.70 | 1.84666 | 23.78 |
| 8 | 54.151 | Variable | | |
| 9 | −110.925 | 1.70 | 1.81600 | 46.62 |
| 10 | 133.812 | 3.00 | 1.80809 | 22.76 |
| 11 | 188.184 | Variable | | |
| 12 | 80.864 | 6.73 | 1.74950 | 35.28 |
| 13 | −206.590 | 10.45 | | |
| 14 | 49.089 | 7.94 | 1.49700 | 81.54 |
| 15 | −90.388 | 1.80 | 1.80610 | 33.27 |
| 16 | 58.845 | 0.25 | | |
| 17 | 34.457 | 10.00 | 1.80810 | 22.76 |
| 18 | 21.652 | 6.50 | 1.43875 | 94.66 |
| 19 | 160.185 | 3.50 | | |
| 20 | 72.399 | 3.74 | 1.78800 | 47.37 |
| 21 | −60.172 | 0.90 | 1.51823 | 58.90 |
| 22 | 29.035 | 7.32 | | |
| 23 | −40.205 | 0.90 | 1.72916 | 54.68 |
| 24 | −529.151 | 4.32 | | |
| 25* | 28.004 | 8.63 | 1.58313 | 59.38 |
| 26* | −42.075 | 2.55 | | |
| 27 (Stop) | ∞ | Variable | | |
| 28 | 200.928 | 1.00 | 1.83481 | 42.73 |
| 29 | 21.638 | 2.00 | 1.85478 | 24.80 |
| 30 | 25.212 | Variable | | |
| 31 | −81.176 | 2.59 | 1.80610 | 33.27 |
| 32 | −23.145 | 1.00 | 1.69680 | 55.53 |
| 33 | 39.116 | Variable | | |
| 34 | 43.781 | 4.00 | 1.54814 | 45.79 |
| 35 | −43.116 | 26.83 | | |

-continued

| Unit mm | | | | |
|---|---|---|---|---|
| 36 | −57.501 | 4.60 | 1.74950 | 35.28 |
| 37 | −20.495 | 1.30 | 1.80810 | 22.76 |
| 38 | −36.814 | Variable | | |
| Image plane | ∞ | | | |

Aspherical surface data

25th surface k = 0.000
A4 = −1.00822e−05, A6 = −3.38389e−09, A8 = −6.53625e−11,
A10 = 7.04643e−14

26th surface k = 0.000
A4 = 5.94989e−06, A6 = −4.70284e−09, A8 = −8.66496e−11,
A10 = 2.20225e−13

| | WE | ST | TE |
|---|---|---|---|
| Zoom data 1 | | | |
| f | 152.03 | 238.49 | 389.51 |
| FNO. | 4.55 | 4.55 | 4.55 |
| 2ω | 8.13 | 5.18 | 3.17 |
| BF (in air) | 28.61 | 28.61 | 28.61 |
| LTL (in air) | 318.46 | 318.46 | 318.46 |
| d5 | 40.74 | 68.03 | 91.76 |
| d8 | 6.64 | 8.58 | 11.78 |
| d11 | 57.66 | 28.43 | 1.50 |
| d27 | 3.36 | 5.50 | 2.70 |
| d30 | 21.79 | 19.42 | 22.37 |
| d33 | 2.44 | 2.67 | 2.52 |
| d38 | 28.61 | 28.61 | 28.61 |
| Zoom data 2 | | | |
| OB | 979.4 | 979.4 | 979.4 |
| d5 | 40.74 | 68.03 | 91.76 |
| d8 | 6.64 | 8.58 | 11.78 |
| d11 | 57.66 | 28.43 | 1.50 |
| d27 | 6.42 | 12.90 | 20.95 |
| d30 | 18.75 | 12.22 | 4.45 |
| d33 | 2.43 | 2.48 | 2.20 |
| d38 | 28.61 | 28.61 | 28.61 |

| Unit focal length | | | |
|---|---|---|---|
| f1 = 212.45 | f2 = −175.54 | f3 = −84.80 | f4 = 60.40 |
| f5 = −35.01 | f6 = −42.99 | f7 = 39.55 | |

Example 48

Unit mm

Surface data

| Surface no. | r | d | nd | νd |
|---|---|---|---|---|
| Object plane | ∞ | ∞ | | |
| 1 | 154.683 | 9.03 | 1.48749 | 70.23 |
| 2 | −2082.738 | 0.30 | | |
| 3 | 131.373 | 3.00 | 1.72047 | 34.71 |
| 4 | 77.338 | 12.73 | 1.43875 | 94.66 |
| 5 | 754.277 | Variable | | |
| 6 | 9590.851 | 1.90 | 1.48749 | 70.23 |
| 7 | 38.397 | 6.70 | 1.84666 | 23.78 |
| 8 | 54.151 | Variable | | |
| 9 | −110.925 | 1.70 | 1.81600 | 46.62 |
| 10 | 133.812 | 3.00 | 1.80809 | 22.76 |
| 11 | 188.184 | Variable | | |
| 12 | 80.864 | 6.73 | 1.74950 | 35.28 |
| 13 | −206.590 | 10.45 | | |
| 14 | 49.089 | 7.94 | 1.49700 | 81.54 |

| Unit mm | | | | |
|---|---|---|---|---|
| 15 | −90.388 | 1.80 | 1.80610 | 33.27 |
| 16 | 58.845 | 0.25 | | |
| 17 | 34.457 | 10.00 | 1.80810 | 22.76 |
| 18 | 21.652 | 6.50 | 1.43875 | 94.66 |
| 19 | 160.185 | 3.50 | | |
| 20 | 72.399 | 3.74 | 1.78800 | 47.37 |
| 21 | −60.172 | 0.90 | 1.51823 | 58.90 |
| 22 | 29.035 | 7.32 | | |
| 23 | −40.205 | 0.90 | 1.72916 | 54.68 |
| 24 | −529.151 | 4.32 | | |
| 25* | 28.004 | 8.63 | 1.58313 | 59.38 |
| 26* | −42.075 | 2.55 | | |
| 27 (Stop) | ∞ | Variable | | |
| 28 | 200.928 | 1.00 | 1.83481 | 42.73 |
| 29 | 21.638 | 2.00 | 1.85478 | 24.80 |
| 30 | 25.212 | Variable | | |
| 31 | −81.176 | 2.59 | 1.80610 | 33.27 |
| 32 | −23.145 | 1.00 | 1.69680 | 55.53 |
| 33 | 39.116 | Variable | | |
| 34 | 43.781 | 4.00 | 1.54814 | 45.79 |
| 35 | −43.116 | 2.30 | | |
| 36 | 16.297 | 5.19 | 1.48749 | 70.23 |
| 37 | −95.148 | 0.20 | | |
| 38 | 53.892 | 1.00 | 1.49700 | 81.54 |
| 39 | 26.656 | 1.80 | | |
| 40 | −602.828 | 0.90 | 1.88100 | 40.14 |
| 41 | 13.128 | 6.11 | 1.67300 | 38.15 |
| 42 | −15.421 | 0.90 | 1.88100 | 40.14 |
| 43 | 16.292 | 0.51 | | |
| 44 | 18.200 | 3.20 | 1.68893 | 31.07 |
| 45 | 204.656 | 4.72 | | |
| 46 | −57.501 | 4.60 | 1.74950 | 35.28 |
| 47 | −20.495 | 1.30 | 1.80810 | 22.76 |
| 48 | −36.814 | Variable | | |
| Image plane | ∞ | | | |

Aspherical surface data

25th surface k = 0.000
A4 = −1.00822e−05, A6 = −3.38389e−09, A8 = −6.53625e−11,
A10 = 7.04643e−14

26th surface k = 0.000
A4 = 5.94989e−06, A6 = −4.70284e−09, A8 = −8.66496e−11,
A10 = 2.20225e−13

| Zoom data 1 | WE | ST | TE |
|---|---|---|---|
| f | 190.00 | 298.05 | 486.79 |
| FNO. | 5.69 | 5.69 | 5.69 |
| 2ω | 6.41 | 4.08 | 2.50 |
| BF (in air) | 28.56 | 28.56 | 28.56 |
| LTL (in air) | 318.41 | 318.41 | 318.41 |
| d5 | 40.74 | 68.03 | 91.76 |
| d8 | 6.64 | 8.58 | 11.78 |
| d11 | 57.66 | 28.43 | 1.50 |
| d27 | 3.36 | 5.50 | 2.70 |
| d30 | 21.79 | 19.42 | 22.37 |
| d33 | 2.44 | 2.67 | 2.52 |
| d48 | 28.56 | 28.56 | 28.56 |

| Unit focal length | | | |
|---|---|---|---|
| f1 = 212.45 | f2 = −175.54 | f3 = −84.80 | f4 = 60.40 |
| f5 = −35.01 | f6 = −42.99 | f7 = 38.05 | |

Example 49

Unit mm

Surface data

| Surface no. | r | d | nd | νd |
|---|---|---|---|---|
| Object plane | ∞ | ∞ | | |
| 1 | 194.227 | 8.85 | 1.48749 | 70.23 |
| 2 | −790.562 | 0.40 | | |
| 3 | 143.773 | 3.00 | 1.72047 | 34.71 |
| 4 | 87.588 | 11.84 | 1.43875 | 94.66 |
| 5 | 603.838 | Variable | | |
| 6 | 595.030 | 2.50 | 1.48749 | 70.23 |
| 7 | 44.876 | 7.50 | 1.84666 | 23.78 |
| 8 | 59.624 | 6.41 | | |
| 9 | −116.653 | 1.80 | 1.72916 | 54.68 |
| 10 | 365.411 | Variable | | |
| 11 | 52.695 | 7.43 | 1.74400 | 44.78 |
| 12 | 859.060 | 0.75 | | |
| 13 | 32.120 | 9.26 | 1.49700 | 81.54 |
| 14 | −338.501 | 2.00 | 1.73400 | 51.47 |
| 15 | 28.322 | 7.58 | | |
| 16 | 63.344 | 2.00 | 1.85478 | 24.80 |
| 17 | 33.798 | 10.00 | 1.49700 | 81.54 |
| 18 | 61.134 | 4.93 | | |
| 19 (Stop) | ∞ | 4.00 | | |
| 20* | 30.816 | 7.52 | 1.49700 | 81.54 |
| 21* | −72.746 | Variable | | |
| 22 | −2050.395 | 1.00 | 1.72916 | 54.68 |
| 23 | 31.112 | 2.00 | 1.85478 | 24.80 |
| 24 | 35.983 | Variable | | |
| 25 | 323.835 | 1.20 | 1.75520 | 27.51 |
| 26 | 60.394 | 0.36 | | |
| 27 | 80.909 | 4.20 | 1.51633 | 64.14 |
| 28 | −48.975 | 3.00 | | |
| 29 | 426.502 | 2.80 | 1.85478 | 24.80 |
| 30 | −54.309 | 1.00 | 1.59282 | 68.63 |
| 31 | 46.430 | 2.29 | | |
| 32 | −85.808 | 1.00 | 1.77250 | 49.60 |
| 33 | 50.295 | 3.00 | | |
| 34 | 50.867 | 3.70 | 1.67300 | 38.15 |
| 35 | −183.323 | 31.56 | | |
| 36 | 39.283 | 6.00 | 1.73800 | 32.26 |
| 37 | −63.358 | 1.50 | 1.80810 | 22.76 |
| 38 | 77.120 | Variable | | |
| Image plane | ∞ | | | |

Aspherical surface data

20th surface k = 0.000
A4 = −4.31228e−06 , A6 = −3.97179e−09, A8 = −5.30871e−12

21th surface k = 0.000
A4 = 1.69811e−06, A6 = −4.09330e−09, A8 = 7.45483e−13

| | WE | ST | TE |
|---|---|---|---|
| Zoom data 1 | | | |
| f | 153.00 | 240.01 | 392.01 |
| FNO. | 4.58 | 4.58 | 4.58 |
| 2ω | 8.13 | 5.17 | 3.17 |
| BF (in air) | 28.75 | 28.75 | 28.75 |
| LTL (in air) | 318.60 | 318.60 | 318.60 |
| d5 | 31.06 | 64.90 | 97.98 |
| d10 | 71.94 | 36.96 | 1.50 |
| d21 | 11.11 | 11.31 | 5.50 |
| d24 | 13.35 | 14.30 | 22.49 |
| d38 | 28.75 | 28.75 | 28.75 |
| Zoom data 2 | | | |
| OB | 980.0 | 980.0 | 980.0 |
| d5 | 31.06 | 64.90 | 97.98 |
| d10 | 71.94 | 36.96 | 1.50 |

| Unit mm | | | |
|---|---|---|---|
| d21 | 14.56 | 19.38 | 25.01 |
| d24 | 9.91 | 6.24 | 2.98 |
| d38 | 28.75 | 28.75 | 28.75 |

| Unit focal length | | | |
|---|---|---|---|
| f1 = 235.13 | f2 = −76.45 | f3 = 57.75 | f4 = −50.04 |
| f5 = 208.43 | | | |

Example 50

Unit mm

Surface data

| Surface no. | r | d | nd | νd |
|---|---|---|---|---|
| Object plane | ∞ | ∞ | | |
| 1 | 194.227 | 8.85 | 1.48749 | 70.23 |
| 2 | −790.562 | 0.40 | | |
| 3 | 143.773 | 3.00 | 1.72047 | 34.71 |
| 4 | 87.588 | 11.84 | 1.43875 | 94.66 |
| 5 | 603.838 | Variable | | |
| 6 | 595.030 | 2.50 | 1.48749 | 70.23 |
| 7 | 44.876 | 7.50 | 1.84666 | 23.78 |
| 8 | 59.624 | 6.41 | | |
| 9 | −116.653 | 1.80 | 1.72916 | 54.68 |
| 10 | 365.411 | Variable | | |
| 11 | 52.695 | 7.43 | 1.74400 | 44.78 |
| 12 | 859.060 | 0.75 | | |
| 13 | 32.120 | 9.26 | 1.49700 | 81.54 |
| 14 | −338.501 | 2.00 | 1.73400 | 51.47 |
| 15 | 28.322 | 7.58 | | |
| 16 | 63.344 | 2.00 | 1.85478 | 24.80 |
| 17 | 33.798 | 10.00 | 1.49700 | 81.54 |
| 18 | 61.134 | 4.93 | | |
| 19 (Stop) | ∞ | 4.00 | | |
| 20* | 30.816 | 7.52 | 1.49700 | 81.54 |
| 21* | −72.746 | Variable | | |
| 22 | −2050.395 | 1.00 | 1.72916 | 54.68 |
| 23 | 31.112 | 2.00 | 1.85478 | 24.80 |
| 24 | 35.983 | Variable | | |
| 25 | 323.835 | 1.20 | 1.75520 | 27.51 |
| 26 | 60.394 | 0.36 | | |
| 27 | 80.909 | 4.20 | 1.51633 | 64.14 |
| 28 | −48.975 | 3.00 | | |
| 29 | 426.502 | 2.80 | 1.85478 | 24.80 |
| 30 | −54.309 | 1.00 | 1.59282 | 68.63 |
| 31 | 46.430 | 2.29 | | |
| 32 | −85.808 | 1.00 | 1.77250 | 49.60 |
| 33 | 50.295 | 3.00 | | |
| 34 | 50.867 | 3.70 | 1.67300 | 38.15 |
| 35 | −183.323 | 5.26 | | |
| 36 | 15.080 | 5.91 | 1.48749 | 70.23 |
| 37 | −66.979 | 0.21 | | |
| 38 | 53.422 | 0.90 | 1.49700 | 81.54 |
| 39 | 21.184 | 3.25 | | |
| 40 | −38.458 | 0.90 | 1.88100 | 40.14 |
| 41 | 19.625 | 6.00 | 1.65412 | 39.68 |
| 42 | −11.985 | 0.90 | 1.88100 | 40.14 |
| 43 | 21.480 | 0.82 | | |
| 44 | 29.898 | 3.20 | 1.73800 | 32.26 |
| 45 | −37.992 | 4.20 | | |
| 46 | 39.283 | 6.00 | 1.73800 | 32.26 |
| 47 | −63.358 | 1.50 | 1.80810 | 22.76 |
| 48 | 77.120 | Variable | | |
| Image plane | ∞ | | | |

Aspherical surface data

20th surface k = 0.000
A4 = −4.31228e−06, A6 = −3.97179e−09, A8 = −5.30871e−12

21th surface k = 0.000
A4 = 1.69811e−06, A6 = −4.09330e−09, A8 = 7.45483e−13

Zoom data 1

| | WE | ST | TE |
|---|---|---|---|
| f | 191.06 | 299.72 | 489.52 |
| FNO. | 5.72 | 5.72 | 5.72 |
| 2ω | 6.39 | 4.07 | 2.49 |
| BF (in air) | 28.75 | 28.75 | 28.75 |
| LTL (in air) | 318.60 | 318.60 | 318.60 |
| d5 | 31.06 | 64.90 | 97.98 |
| d10 | 71.94 | 36.96 | 1.50 |
| d21 | 11.11 | 11.31 | 5.50 |
| d24 | 13.35 | 14.30 | 22.49 |
| d48 | 28.75 | 28.75 | 28.75 |

| Unit focal length | | | |
|---|---|---|---|
| f1 = 235.13 | f2 = −76.45 | f3 = 57.75 | f4 = −50.04 |
| f5 = −134.82 | | | |

Example 51

Unit mm

Surface data

| Surface no. | r | d | nd | νd |
|---|---|---|---|---|
| Object plane | ∞ | ∞ | | |
| 1 | 212.744 | 2.50 | 1.80610 | 33.27 |
| 2 | 105.176 | 13.30 | 1.43875 | 94.66 |
| 3 | −430.512 | 0.30 | | |
| 4 | 98.328 | 11.00 | 1.49700 | 81.54 |
| 5 | 1296.115 | Variable | | |
| 6 | 1294.917 | 5.20 | 1.90366 | 31.32 |
| 7 | −61.847 | 1.50 | 1.69680 | 55.53 |
| 8 | −329.996 | 2.84 | | |
| 9 | −1144.889 | 1.50 | 1.69680 | 55.53 |
| 10 | 32.781 | 4.26 | 1.90366 | 31.32 |
| 11 | 79.252 | 4.21 | | |
| 12 | 299.599 | 1.50 | 1.83481 | 42.71 |
| 13 | 60.291 | 4.20 | | |
| 14 | −40.073 | 1.50 | 1.80400 | 46.57 |
| 15 | 217.512 | Variable | | |
| 16* | 69.460 | 5.20 | 1.49700 | 81.54 |
| 17* | −104.254 | 0.30 | | |
| 18 | 193.223 | 1.40 | 1.90366 | 31.32 |
| 19 | 60.966 | 5.45 | 1.49700 | 81.54 |
| 20 | −82.319 | Variable | | |
| 21 | 33.173 | 6.96 | 1.59282 | 68.63 |
| 22 | 188.697 | 2.00 | | |
| 23 (Stop) | ∞ | 15.94 | | |
| 24 | 160.026 | 1.30 | 1.92286 | 20.88 |
| 25 | 733.373 | 1.00 | 1.49700 | 81.54 |
| 26 | 32.631 | 1.82 | | |
| 27 | −132.411 | 1.00 | 1.62280 | 57.05 |
| 28 | 50.178 | 3.50 | | |

| Unit mm | | | | |
|---|---|---|---|---|
| 29 | −71.835 | 1.80 | 1.62299 | 58.16 |
| 30 | −29.423 | 0.43 | | |
| 31 | 36.322 | 2.39 | 1.62299 | 58.16 |
| 32 | −101.148 | 0.94 | | |
| 33 | −30.113 | 1.00 | 1.80610 | 33.27 |
| 34 | 80.083 | 48.80 | | |
| 35 | 85.101 | 7.26 | 1.58144 | 40.75 |
| 36 | −29.212 | 1.50 | 1.88300 | 40.76 |
| 37 | −44.842 | Variable | | |
| Image plane | ∞ | | | |

Aspherical surface data

16th surface k = 0.000
A4 = −4.43829e−07, A6 = 5.54012e−10, A8 = 7.07238e−13

17th surface k = 0.000
A4 = 1.10979e−06, A6 = 3.60298e−10, A8 = 1.21521e−12

| | WE | ST | TE |
|---|---|---|---|
| Zoom data 1 | | | |
| f | 152.76 | 244.55 | 391.36 |
| FNO. | 4.58 | 4.58 | 4.58 |
| 2ω | 8.06 | 5.03 | 3.14 |
| BF (in air) | 27.52 | 27.52 | 27.52 |
| LTL (in air) | 303.60 | 303.60 | 303.60 |
| d5 | 47.19 | 71.14 | 84.39 |
| d15 | 27.27 | 17.39 | 2.00 |
| d20 | 37.82 | 23.74 | 25.88 |
| d37 | 27.52 | 27.52 | 27.52 |
| Zoom data 2 | | | |
| OB | 1695.0 | 1695.0 | 1695.0 |
| d5 | 47.19 | 71.14 | 84.39 |
| d15 | 31.04 | 26.54 | 21.29 |
| d20 | 34.04 | 14.60 | 6.59 |
| d37 | 27.52 | 27.52 | 27.52 |

Unit focal length

| | | | |
|---|---|---|---|
| f1 = 167.38 | f2 = −30.44 | f3 = 64.42 | f4 = 110.78 |

Example 52

Unit mm

Surface data

| Surface no. | r | d | nd | νd |
|---|---|---|---|---|
| Object plane | ∞ | ∞ | | |
| 1 | 212.744 | 2.50 | 1.80610 | 33.27 |
| 2 | 105.176 | 13.30 | 1.43875 | 94.66 |
| 3 | −430.512 | 0.30 | | |
| 4 | 98.328 | 11.00 | 1.49700 | 81.54 |
| 5 | 1296.115 | Variable | | |
| 6 | 1294.917 | 5.20 | 1.90366 | 31.32 |
| 7 | −61.847 | 1.50 | 1.69680 | 55.53 |
| 8 | −329.996 | 2.84 | | |
| 9 | −1144.889 | 1.50 | 1.69680 | 55.53 |
| 10 | 32.781 | 4.26 | 1.90366 | 31.32 |
| 11 | 79.252 | 4.21 | | |
| 12 | 299.599 | 1.50 | 1.83481 | 42.71 |
| 13 | 60.291 | 4.20 | | |
| 14 | −40.073 | 1.50 | 1.80400 | 46.57 |
| 15 | 217.512 | Variable | | |
| 16* | 69.460 | 5.20 | 1.49700 | 81.54 |
| 17* | −104.254 | 0.30 | | |

| Unit mm | | | | |
|---|---|---|---|---|
| 18 | 193.223 | 1.40 | 1.90366 | 31.32 |
| 19 | 60.966 | 5.45 | 1.49700 | 81.54 |
| 20 | −82.319 | Variable | | |
| 21 | 33.173 | 6.96 | 1.59282 | 68.63 |
| 22 | 188.697 | 2.00 | | |
| 23 (Stop) | ∞ | 15.94 | | |
| 24 | 160.026 | 1.30 | 1.92286 | 20.88 |
| 25 | 733.373 | 1.00 | 1.49700 | 81.54 |
| 26 | 32.631 | 1.82 | | |
| 27 | −132.411 | 1.00 | 1.62280 | 57.05 |
| 28 | 50.178 | 3.50 | | |
| 29 | −71.835 | 1.80 | 1.62299 | 58.16 |
| 30 | −29.423 | 0.43 | | |
| 31 | 36.322 | 2.39 | 1.62299 | 58.16 |
| 32 | −101.148 | 0.94 | | |
| 33 | −30.113 | 1.00 | 1.80610 | 33.27 |
| 34 | 80.083 | 2.00 | | |
| 35 | 24.000 | 2.40 | 1.51633 | 64.14 |
| 36 | 162.337 | 4.46 | | |
| 37 | 35.068 | 2.10 | 1.59270 | 35.31 |
| 38 | −3789.975 | 1.00 | 1.88300 | 40.76 |
| 39 | 23.510 | 19.04 | | |
| 40 | −1907.791 | 1.00 | 1.92286 | 20.88 |
| 41 | 18.891 | 5.00 | 1.75211 | 25.05 |
| 42 | −19.241 | 1.00 | 1.85150 | 40.78 |
| 43 | 53.104 | 0.30 | | |
| 44 | 35.759 | 7.00 | 1.59270 | 35.31 |
| 45 | −23.768 | 1.00 | 1.58313 | 59.38 |
| 4 6 | 510.633 | 2.50 | | |
| 47 | 85.101 | 7.26 | 1.58144 | 40.75 |
| 48 | −29.212 | 1.50 | 1.88300 | 40.76 |
| 49 | −44.842 | Variable | | |
| Image plane | ∞ | | | |

Aspherical surface data

16th surface k = 0.000
A4 = −4.43829e−07, A6 = 5.54012e−10, A8 = 7.07238e−13

17th surface k = 0.000
A4 = 1.10979e−06, A6 = 3.60298e−10, A8 = 1.21521e−12

Zoom data 1

| | WE | ST | TE |
|---|---|---|---|
| f | 213.88 | 342.39 | 547.93 |
| FNO. | 6.42 | 6.42 | 6.42 |
| 2ω | 5.73 | 3.58 | 2.24 |
| BF (in air) | 27.52 | 27.52 | 27.52 |
| LTL (in air) | 303.60 | 303.60 | 303.60 |
| d5 | 47.19 | 71.14 | 84.39 |
| d15 | 27.27 | 17.39 | 2.00 |
| d20 | 37.82 | 23.74 | 25.88 |
| d49 | 27.52 | 27.52 | 27.52 |

Unit focal length

| | | | |
|---|---|---|---|
| f1 = 167.38 | f2 = −30.44 | f3 = 64.42 | f4 = 402.50 |

Example 53

| Unit mm | | | | |
|---|---|---|---|---|
| Surface data | | | | |
| Surface no. | r | d | nd | νd |
| Object plane | ∞ | ∞ | | |
| 1 | 136.167 | 12.48 | 1.48749 | 70.23 |
| 2 | 4007.094 | 0.20 | | |
| 3 | 126.381 | 3.00 | 1.67300 | 38.15 |
| 4 | 70.832 | 17.39 | 1.43875 | 94.66 |
| 5 | 627.438 | Variable | | |
| 6 | −1128.152 | 3.17 | 1.84666 | 23.78 |
| 7 | −89.953 | 1.60 | 1.48749 | 70.23 |
| 8 | 49.320 | 2.85 | 1.80610 | 33.27 |
| 9 | 61.759 | 4.93 | | |
| 10 | −82.912 | 1.50 | 1.83481 | 42.71 |
| 11 | 155.228 | Variable | | |
| 12 (Stop) | ∞ | 1.80 | | |
| 13* | 59.929 | 5.95 | 1.49700 | 81.54 |
| 14* | −150.255 | 1.98 | | |
| 15 | −683.173 | 1.50 | 1.84666 | 23.78 |
| 16 | 83.039 | 9.43 | 1.59282 | 68.63 |
| 17 | −106.121 | 0.20 | | |
| 18 | 66.462 | 7.65 | 1.49700 | 81.54 |
| 19 | −53.205 | Variable | | |
| 20* | 982.456 | 1.50 | 1.74320 | 49.29 |
| 21 | 22.498 | 2.90 | 1.80518 | 25.42 |
| 22 | 33.932 | Variable | | |
| 23 | 132.876 | 1.40 | 1.69680 | 55.53 |
| 24 | 45.457 | Variable | | |
| 25 | 353.096 | 3.02 | 1.43875 | 94.66 |
| 26 | −47.475 | 0.97 | | |
| 27 | 119.943 | 2.45 | 1.85478 | 24.80 |
| 28 | −95.645 | 0.90 | 1.59282 | 68.63 |
| 29 | 49.369 | 1.86 | | |
| 30 | −178.717 | 0.90 | 1.77250 | 49.60 |
| 31 | 54.524 | 2.69 | | |
| 32 | 43.898 | 3.18 | 1.69680 | 55.53 |
| 33 | −835.837 | 39.38 | | |
| 34 | 33.810 | 4.69 | 1.67300 | 38.15 |
| 35 | 919.956 | 1.30 | 1.92286 | 20.88 |
| 36 | 48.339 | Variable | | |
| Image plane | ∞ | | | |

Aspherical surface data

13th surface k = 0.000
A4 = −2.29861e−06, A6 = −3.96906e−09, A8 = 1.22868e−11,
A10 = −4.18684e−14

14th surface k = 0.000
A4 = 3.84772e−06, A6 = −2.42464e−09, A8 = 1.17099e−11,
A10 = −3.81267e−14

20th surface k = −1.010
A4 = −1.65301e−09, A6 = 4.65449e−10

| | WE | ST | TE |
|---|---|---|---|
| Zoom data 1 | | | |
| f | 136.88 | 220.20 | 353.30 |
| FNO. | 4.08 | 4.08 | 4.08 |
| 2ω | 9.08 | 5.64 | 3.51 |
| BF (in air) | 30.03 | 30.03 | 30.03 |
| LTL (in air) | 299.52 | 299.53 | 299.52 |
| d5 | 46.28 | 73.12 | 98.52 |
| d11 | 55.11 | 28.27 | 2.87 |
| d19 | 6.77 | 7.51 | 3.61 |

-continued

| Unit mm | | | |
|---|---|---|---|
| d22 | 14.38 | 11.58 | 14.85 |
| d24 | 4.18 | 6.24 | 6.86 |
| d36 | 30.03 | 30.03 | 30.03 |
| Zoom data 2 | | | |
| OB | 999.1 | 999.1 | 999.1 |
| d5 | 46.28 | 73.12 | 98.52 |
| d11 | 55.11 | 28.27 | 2.87 |
| d19 | 8.70 | 12.40 | 16.47 |
| d22 | 13.19 | 9.09 | 5.62 |
| d24 | 3.44 | 3.84 | 3.24 |
| d36 | 30.03 | 30.03 | 30.03 |

| Unit focal length | | | |
|---|---|---|---|
| f1 = 206.25 | f2 = −53.75 | f3 = 37.76 | f4 = −49.82 |
| f5 = −99.82 | f6 = 105.85 | | |

Example 54

| Unit mm | | | | |
|---|---|---|---|---|
| Surface data | | | | |
| Surface no. | r | d | nd | νd |
| Object plane | ∞ | ∞ | | |
| 1 | 136.167 | 12.48 | 1.48749 | 70.23 |
| 2 | 4007.094 | 0.20 | | |
| 3 | 126.381 | 3.00 | 1.67300 | 38.15 |
| 4 | 70.832 | 17.39 | 1.43875 | 94.66 |
| 5 | 627.438 | Variable | | |
| 6 | −1128.152 | 3.17 | 1.84666 | 23.78 |
| 7 | −89.953 | 1.60 | 1.48749 | 70.23 |
| 8 | 49.320 | 2.85 | 1.80610 | 33.27 |
| 9 | 61.759 | 4.93 | | |
| 10 | −82.912 | 1.50 | 1.83481 | 42.71 |
| 11 | 155.228 | Variable | | |
| 12 (Stop) | ∞ | 1.80 | | |
| 13* | 59.929 | 5.95 | 1.49700 | 81.54 |
| 14* | −150.255 | 1.98 | | |
| 15 | −683.173 | 1.50 | 1.84666 | 23.78 |
| 16 | 83.039 | 9.43 | 1.59282 | 68.63 |
| 17 | −106.121 | 0.20 | | |
| 18 | 66.462 | 7.65 | 1.49700 | 81.54 |
| 19 | −53.205 | Variable | | |
| 20* | 982.456 | 1.50 | 1.74320 | 49.29 |
| 21 | 22.498 | 2.90 | 1.80518 | 25.42 |
| 22 | 33.932 | Variable | | |
| 23 | 132.876 | 1.40 | 1.69680 | 55.53 |
| 24 | 45.457 | Variable | | |
| 25 | 353.096 | 3.02 | 1.43875 | 94.66 |
| 26 | −47.475 | 0.97 | | |
| 27 | 119.943 | 2.45 | 1.85478 | 24.80 |
| 28 | −95.645 | 0.90 | 1.59282 | 68.63 |
| 29 | 49.369 | 1.86 | | |
| 30 | −178.717 | 0.90 | 1.77250 | 49.60 |
| 31 | 54.524 | 2.69 | | |
| 32 | 43.898 | 3.18 | 1.69680 | 55.53 |
| 33 | −835.837 | 1.65 | | |
| 34 | 21.620 | 5.24 | 1.54072 | 47.23 |
| 35 | 145.686 | 0.30 | | |
| 36 | 30.470 | 4.64 | 1.60342 | 38.03 |
| 37 | −628.503 | 1.15 | 1.90366 | 31.32 |
| 38 | 19.203 | 9.85 | | |
| 39 | 141.283 | 0.95 | 1.88300 | 40.76 |
| 40 | 11.229 | 6.40 | 1.72047 | 34.71 |
| 41 | −17.932 | 0.95 | 1.88300 | 40.76 |
| 42 | 29.070 | 0.54 | | |
| 43 | 23.622 | 6.01 | 1.61340 | 44.27 |
| 44 | 475.765 | 1.70 | | |

-continued

| Unit mm | | | | |
|---|---|---|---|---|
| 45 | 33.810 | 4.69 | 1.67300 | 38.15 |
| 46 | 919.956 | 1.30 | 1.92286 | 20.88 |
| 47 | 48.339 | Variable | | |
| Image plane | ∞ | | | |

Aspherical surface data

13th surface k = 0.000
A4 = −2.29861e−06, A6 = −3.96906e−09, A8 = 1.22868e−11,
A10 = −4.18684e−14

14th surface k = 0.000
A4 = 3.84772e−06, A6 = −2.42464e−09, A8 = 1.17099e−11,
A10 = −3.81267e−14

20th surface k = −1.010
A4 = −1.65301e−09, A6 = 4.65449e−10

Zoom data 1

| | WE | ST | TE |
|---|---|---|---|
| f | 192.94 | 310.41 | 498.00 |
| FNO. | 5.74 | 5.75 | 5.74 |
| 2ω | 6.35 | 3.94 | 2.46 |
| BF (in air) | 30.03 | 30.03 | 30.03 |
| LTL (in air) | 299.52 | 299.53 | 299.52 |
| d5 | 46.28 | 73.12 | 98.52 |
| d11 | 55.11 | 28.27 | 2.87 |
| d19 | 6.77 | 7.51 | 3.61 |
| d22 | 14.38 | 11.58 | 14.85 |
| d24 | 4.18 | 6.24 | 6.86 |
| d47 | 30.03 | 30.03 | 30.03 |

Unit focal length f1 = 206.25 f2 = −53.75 f3 = 37.76 f4 = −49.82
f5 = −99.82 f6 = 584.42

Example 55

Unit mm

Surface data

| Surface no. | r | d | nd | νd |
|---|---|---|---|---|
| Object plane | ∞ | ∞ | | |
| 1 | 201.620 | 8.85 | 1.48749 | 70.23 |
| 2 | −773.957 | 0.40 | | |
| 3 | 149.928 | 3.00 | 1.72047 | 34.71 |
| 4 | 89.527 | 11.59 | 1.43875 | 94.66 |
| 5 | 678.553 | Variable | | |
| 6 | 369.960 | 2.20 | 1.48749 | 70.23 |
| 7 | 42.213 | 6.91 | 1.84666 | 23.78 |
| 8 | 56.569 | 12.45 | | |
| 9 | −111.110 | 1.80 | 1.72916 | 54.68 |
| 10 | 416.091 | Variable | | |
| 11 | 46.022 | 7.08 | 1.74400 | 44.78 |
| 12 | 241.991 | 1.33 | | |
| 13 | 32.132 | 9.27 | 1.49700 | 81.54 |
| 14 | −272.923 | 2.01 | 1.73400 | 51.47 |
| 15 | 27.349 | 3.94 | | |
| 16 | 50.953 | 2.00 | 1.85478 | 24.80 |
| 17 | 30.906 | 4.97 | 1.49700 | 81.54 |
| 18 | 53.513 | 3.91 | | |
| 19 (Stop) | ∞ | 4.00 | | |
| 20* | 30.646 | 10.00 | 1.49700 | 81.54 |
| 21* | −74.277 | Variable | | |
| 22 | 958.752 | 1.00 | 1.72916 | 54.68 |
| 23 | 32.782 | 2.00 | 1.85478 | 24.80 |
| 24 | 35.714 | Variable | | |
| 25 | −1485.787 | 1.22 | 1.75520 | 27.51 |
| 26 | 51.583 | 2.84 | | |
| 27 | 55.240 | 4.50 | 1.51633 | 64.14 |
| 28 | −57.664 | 3.00 | | |
| 29 | −367.327 | 2.80 | 1.85478 | 24.80 |
| 30 | −55.187 | 1.00 | 1.59282 | 68.63 |
| 31 | 37.006 | 2.21 | | |
| 32 | −106.091 | 1.00 | 1.77250 | 49.60 |
| 33 | 87.825 | 3.00 | | |
| 34 | 60.683 | 3.70 | 1.67300 | 38.15 |
| 35 | −98.565 | 27.00 | | |
| 36 | 37.187 | 6.00 | 1.73800 | 32.26 |
| 37 | −194.340 | 1.50 | 1.80810 | 22.76 |
| 38 | 76.125 | Variable | | |
| Image plane | ∞ | | | |

Aspherical surface data

20th surface k = 0.000
A4 = −4.35494e−06, A6 = −3.52224e−09, A8 = 2.85782e−12

21th surface k = 0.000
A4 = 1.94045e−06, A6 = −2.72541e−09, A8 = 5.17297e−12

| | WE | ST | TE |
|---|---|---|---|
| Zoom data 1 | | | |
| f | 141.99 | 239.97 | 392.01 |
| FNO. | 4.58 | 4.58 | 4.58 |
| 2ω | 8.77 | 5.18 | 3.17 |
| BF (in air) | 26.75 | 26.75 | 26.75 |
| LTL (in air) | 271.60 | 315.60 | 321.60 |
| d5 | 13.79 | 71.91 | 100.76 |
| d10 | 48.78 | 33.26 | 1.50 |
| d21 | 16.83 | 11.95 | 5.49 |
| d24 | 6.98 | 13.24 | 28.62 |
| d38 | 26.75 | 26.75 | 26.75 |
| Zoom data 2 | | | |
| OB | 1027.0 | 1027.0 | 1027.0 |
| d5 | 13.79 | 71.91 | 100.76 |
| d10 | 48.78 | 33.26 | 1.50 |
| d21 | 20.83 | 21.14 | 24.99 |
| d24 | 2.98 | 4.06 | 9.13 |
| d38 | 26.75 | 26.75 | 26.75 |

Unit focal length f1 = 243.25 f2 = −76.53 f3 = 54.72 f4 = −52.04
f5 = 150.02

Example 56

Unit mm

Surface data

| Surface no. | r | d | nd | νd |
|---|---|---|---|---|
| Object plane | ∞ | ∞ | | |
| 1 | 201.620 | 8.85 | 1.48749 | 70.23 |
| 2 | −773.957 | 0.40 | | |
| 3 | 149.928 | 3.00 | 1.72047 | 34.71 |
| 4 | 89.527 | 11.59 | 1.43875 | 94.66 |
| 5 | 678.553 | Variable | | |
| 6 | 369.960 | 2.20 | 1.48749 | 70.23 |

-continued

| Unit mm | | | | |
|---|---|---|---|---|
| 7 | 42.213 | 6.91 | 1.84666 | 23.78 |
| 8 | 56.569 | 12.45 | | |
| 9 | −111.110 | 1.80 | 1.72916 | 54.68 |
| 10 | 416.091 | Variable | | |
| 11 | 46.022 | 7.08 | 1.74400 | 44.78 |
| 12 | 241.991 | 1.33 | | |
| 13 | 32.132 | 9.27 | 1.49700 | 81.54 |
| 14 | −272.923 | 2.01 | 1.73400 | 51.47 |
| 15 | 27.349 | 3.94 | | |
| 16 | 50.953 | 2.00 | 1.85478 | 24.80 |
| 17 | 30.906 | 4.97 | 1.49700 | 81.54 |
| 18 | 53.513 | 3.91 | | |
| 19 (Stop) | ∞ | 4.00 | | |
| 20* | 30.646 | 10.00 | 1.49700 | 81.54 |
| 21* | −74.277 | Variable | | |
| 22 | 958.752 | 1.00 | 1.72916 | 54.68 |
| 23 | 32.782 | 2.00 | 1.85478 | 24.80 |
| 24 | 35.714 | Variable | | |
| 25 | −1485.787 | 1.22 | 1.75520 | 27.51 |
| 26 | 51.583 | 2.84 | | |
| 27 | 55.240 | 4.50 | 1.51633 | 64.14 |
| 28 | −57.664 | 3.00 | | |
| 29 | −367.327 | 2.80 | 1.85478 | 24.80 |
| 30 | −55.187 | 1.00 | 1.59282 | 68.63 |
| 31 | 37.006 | 2.21 | | |
| 32 | −106.091 | 1.00 | 1.77250 | 49.60 |
| 33 | 87.825 | 3.00 | | |
| 34 | 60.683 | 3.70 | 1.67300 | 38.15 |
| 35 | −98.565 | 1.01 | | |
| 36 | 14.358 | 5.52 | 1.48749 | 70.23 |
| 37 | −85.924 | 0.48 | | |
| 38 | 54.751 | 1.00 | 1.49700 | 81.54 |
| 39 | 21.673 | 3.23 | | |
| 40 | −41.768 | 0.90 | 1.88100 | 40.14 |
| 41 | 14.240 | 6.15 | 1.67300 | 38.15 |
| 42 | −11.684 | 0.90 | 1.88100 | 40.14 |
| 43 | 19.483 | 1.21 | | |
| 44 | 27.240 | 3.44 | 1.72047 | 34.71 |
| 45 | −39.227 | 3.17 | | |
| 46 | 37.187 | 6.00 | 1.73800 | 32.26 |
| 47 | −194.340 | 1.50 | 1.80810 | 22.76 |
| 48 | 76.125 | Variable | | |
| Image plane | ∞ | | | |

Aspherical surface data

20th surface k = 0.000
A4 = −4.35494e−06, A6 = −3.52224e−09, A8 = 2.85782e−12

21th surface k = 0.000
A4 = 1.94045e−06, A6 = −2.72541e−09, A8 = 5.17297e−12

Zoom data 1

| | WE | ST | TE |
|---|---|---|---|
| f | 179.40 | 303.19 | 495.28 |
| FNO. | 5.79 | 5.79 | 5.79 |
| 2ω | 6.80 | 4.02 | 2.46 |
| BF (in air) | 26.75 | 26.75 | 26.75 |
| LTL (in air) | 271.60 | 315.60 | 321.60 |
| d5 | 13.79 | 71.91 | 100.76 |
| d10 | 48.78 | 33.26 | 1.50 |
| d21 | 16.83 | 11.95 | 5.49 |
| d24 | 6.98 | 13.24 | 28.62 |
| d48 | 26.75 | 26.75 | 26.75 |

Unit focal length f1 = 243.25 f2 = −76.53 f3 = 54.72 f4 = −52.04
f5 = −122.57

Example 57

Unit mm

Surface data

| Surface no. | r | d | nd | νd |
|---|---|---|---|---|
| Object plane | ∞ | ∞ | | |
| 1 | 145.227 | 11.73 | 1.48749 | 70.23 |
| 2 | 2973.253 | 0.20 | | |
| 3 | 138.335 | 3.00 | 1.67300 | 38.26 |
| 4 | 75.845 | 16.95 | 1.43875 | 94.66 |
| 5 | 985.334 | Variable | | |
| 6 | −436.095 | 3.94 | 1.85478 | 24.80 |
| 7 | −74.917 | 1.60 | 1.48749 | 70.23 |
| 8 | 49.184 | 2.84 | 1.80000 | 29.84 |
| 9 | 62.645 | 5.78 | | |
| 10 | −71.980 | 1.50 | 1.83481 | 42.71 |
| 11 | 194.121 | Variable | | |
| 12 (Stop) | ∞ | 1.80 | | |
| 13* | 70.532 | 5.97 | 1.49700 | 81.54 |
| 14* | −111.780 | 3.27 | | |
| 15 | −638.347 | 1.50 | 1.84666 | 23.78 |
| 16 | 129.890 | 6.64 | 1.43875 | 94.66 |
| 17 | −65.692 | 0.20 | | |
| 18 | 82.485 | 16.58 | 1.43875 | 94.66 |
| 19 | −45.906 | Variable | | |
| 20 | 183.146 | 1.10 | 1.77250 | 49.60 |
| 21 | 25.017 | 2.50 | 1.85478 | 24.80 |
| 22 | 36.540 | Variable | | |
| 23 | 71.798 | 1.00 | 1.58144 | 40.75 |
| 24 | 26.976 | Variable | | |
| 25 | 30.066 | 3.13 | 1.43875 | 94.66 |
| 26 | 327.127 | 1.89 | | |
| 27 | 205.926 | 2.45 | 1.85478 | 24.80 |
| 28 | −49.304 | 0.90 | 1.59282 | 68.63 |
| 29 | 37.671 | 2.29 | | |
| 30 | −77.012 | 0.90 | 1.77250 | 49.60 |
| 31 | 47.424 | 3.19 | | |
| 32 | 45.955 | 5.40 | 1.58313 | 59.38 |
| 33 | −91.431 | 23.51 | | |
| 34 | 37.861 | 8.37 | 1.65412 | 39.68 |
| 35 | −88.792 | 1.30 | 1.92286 | 20.88 |
| 36 | 138.592 | Variable | | |
| Image plane | ∞ | | | |

Aspherical surface data

13th surface k = 0.000
A4 = −2.62615e−06, A6 = 5.45187e−09, A8 = −1.06603e−11,
A10 = 2.59025e−14

14th surface k = 0.000
A4 = 2.98721e−06, A6 = 6.43178e−09, A8 = −1.12044e−11,
A10 = 2.95382e−14

Zoom data 1

| | WE | ST | TE |
|---|---|---|---|
| f | 152.25 | 244.93 | 393.11 |
| FNO. | 4.58 | 4.58 | 4.58 |
| 2ω | 8.21 | 5.10 | 3.17 |
| BF (in air) | 35.09 | 35.09 | 35.09 |
| LTL (in air) | 318.40 | 318.41 | 318.43 |
| d5 | 58.72 | 84.90 | 108.78 |
| d11 | 52.89 | 26.77 | 2.63 |
| d19 | 5.24 | 6.80 | 2.93 |
| d22 | 22.95 | 20.29 | 24.71 |

-continued

| Unit mm | | | |
|---|---|---|---|
| d24 | 2.08 | 3.12 | 2.87 |
| d36 | 35.09 | 35.09 | 35.09 |
| Unit focal length | | | |
| f1 = 218.89 | f2 = −51.80 | f3 = 40.89 | f4 = −64.11 |
| f5 = −74.93 | f6 = 98.61 | | |

Example 58

Unit mm

Surface data

| Surface no. | r | d | nd | νd |
|---|---|---|---|---|
| Object plane | ∞ | ∞ | | |
| 1 | 145.227 | 11.73 | 1.48749 | 70.23 |
| 2 | 2973.253 | 0.20 | | |
| 3 | 138.335 | 3.00 | 1.67300 | 38.26 |
| 4 | 75.845 | 16.95 | 1.43875 | 94.66 |
| 5 | 985.334 | Variable | | |
| 6 | −436.095 | 3.94 | 1.85478 | 24.80 |
| 7 | −74.917 | 1.60 | 1.48749 | 70.23 |
| 8 | 49.184 | 2.84 | 1.80000 | 29.84 |
| 9 | 62.645 | 5.78 | | |
| 10 | −71.980 | 1.50 | 1.83481 | 42.71 |
| 11 | 194.121 | Variable | | |
| 12 (Stop) | ∞ | 1.80 | | |
| 13* | 70.532 | 5.97 | 1.49700 | 81.54 |
| 14* | −111.780 | 3.27 | | |
| 15 | −638.347 | 1.50 | 1.84666 | 23.78 |
| 16 | 129.890 | 6.64 | 1.43875 | 94.66 |
| 17 | −65.692 | 0.20 | | |
| 18 | 82.485 | 16.58 | 1.43875 | 94.66 |
| 19 | −45.906 | Variable | | |
| 20 | 183.146 | 1.10 | 1.77250 | 49.60 |
| 21 | 25.017 | 2.50 | 1.85478 | 24.80 |
| 22 | 36.540 | Variable | | |
| 23 | 71.798 | 1.00 | 1.58144 | 40.75 |
| 24 | 26.976 | Variable | | |
| 25 | 30.066 | 3.13 | 1.43875 | 94.66 |
| 26 | 327.127 | 1.89 | | |
| 27 | 205.926 | 2.45 | 1.85478 | 24.80 |
| 28 | −49.304 | 0.90 | 1.59282 | 68.63 |
| 29 | 37.671 | 2.29 | | |
| 30 | −77.012 | 0.90 | 1.77250 | 49.60 |
| 31 | 47.424 | 3.19 | | |
| 32 | 45.955 | 5.40 | 1.58313 | 59.38 |
| 33 | −91.431 | 1.95 | | |
| 34 | 24.803 | 1.10 | 1.80810 | 22.76 |
| 35 | 20.700 | 4.18 | 1.51742 | 52.43 |
| 36 | 131.562 | 0.30 | | |
| 37 | 26.918 | 2.23 | 1.59270 | 35.31 |
| 38 | 45.737 | 1.00 | 1.91082 | 35.25 |
| 39 | 22.854 | 2.47 | | |
| 40 | 60.942 | 0.95 | 1.88300 | 40.76 |
| 41 | 15.909 | 6.40 | 1.72047 | 34.71 |
| 42 | −23.982 | 0.95 | 1.80610 | 40.92 |
| 43 | 41.874 | 1.97 | | |
| 44 | 37.861 | 8.37 | 1.65412 | 39.68 |
| 45 | −88.792 | 1.30 | 1.92286 | 20.88 |
| 46 | 138.592 | Variable | | |
| Image plane | ∞ | | | |

Aspherical surface data

13th surface k = 0.000
A4 = −2.62615e−06, A6 = 5.45187e−09, A8 = −1.06603e−11,
A10 = 2.59025e−14

-continued

Unit mm

14th surface k = 0.000
A4 = 2.98721e−06, A6 = 6.43178e−09, A8 = −1.12044e−11,
A10 = 2.95382e−14

Zoom data 1

| | WE | ST | TE |
|---|---|---|---|
| f | 189.93 | 305.55 | 490.39 |
| FNO. | 5.71 | 5.71 | 5.71 |
| 2ω | 6.45 | 4.01 | 2.50 |
| BF (in air) | 35.09 | 35.09 | 35.09 |
| LTL (in air) | 318.40 | 318.41 | 318.43 |
| d5 | 58.72 | 84.90 | 108.78 |
| d11 | 52.89 | 26.77 | 2.63 |
| d19 | 5.24 | 6.80 | 2.93 |
| d22 | 22.95 | 20.29 | 24.71 |
| d24 | 2.08 | 3.12 | 2.87 |
| d46 | 35.09 | 35.09 | 35.09 |

Unit focal length

| | | | |
|---|---|---|---|
| f1 = 218.89 | f2 = −51.80 | f3 = 40.89 | f4 = −64.11 |
| f5 = −74.93 | f6 = 323.41 | | |

Next, values of conditional expressions in each example are given below. '-' (hyphen) indicates that there is no corresponding arrangement.

| | | Example 1 | Example 2 | Example 3 | Example 4 |
|---|---|---|---|---|---|
| (1) | LTLT/LTLW | 1.00 | 1.00 | 1.00 | 1.00 |
| (2), (2') | KMBT | 8.34 | 9.37 | 7.31 | 6.76 |
| (3) | fFB/fMB | 1.09 | 1.00 | 1.13 | 1.15 |
| (4) | LTLT/fFF | 1.67 | 1.46 | 1.55 | 1.55 |
| (5) | KIST | 1.33 | 1.44 | 1.94 | 1.93 |
| (6) | ΔMVFB/LTLT | 0.25 | 0.26 | 0.27 | 0.20 |
| (7) | \|fFF/fFB\| | 3.35 | 3.73 | 3.31 | 3.25 |
| (8) | \|fMF/fMB\| | 1.01 | 0.73 | 1.14 | 1.28 |
| (9) | νdFFp | 94.66 | 94.66 | 94.66 | 94.66 |
| (10) | fMFLCi/fMF | 2.47 | 2.30 | 0.57 | 0.60 |
| (11) | fMF1/fMF2 | — | — | 0.35 | 2.13 |
| (12) | νdMBnmax − νdMBpmin | 26.55 | 30.39 | 32.77 | 23.08 |
| (13) | νdRni | 20.88 | 20.88 | 17.98 | 17.98 |
| (14) | νdR2n | 20.88 | 20.88 | 17.98 | 17.98 |
| (15) | \|ΔFbT\|/FnoT | — | — | — | — |
| (16) | \|fconLCOB/fconLCB\| | — | — | — | — |
| (17) | (fT/FnoT)/LTC | — | — | — | — |
| (18) | LR12/LT | — | — | — | — |
| (19) | fwconT/fT | — | — | — | — |
| (20) | ftconT/fT | — | — | — | — |
| (21) | LconT/LT | — | — | — | — |
| (22) | LconT/FbT | — | — | — | — |
| (23) | FbT/RtconR | — | — | — | — |
| (24) | FbT/RtconF | — | — | — | — |
| (25) | νdconLc1 | — | — | — | — |
| (26) | \|fconLCObj/fconLCM2\| | — | — | — | — |
| (27) | \|FbT/RwconR\| | — | — | — | — |
| (28) | \|RwconF/RwconR\| | — | — | — | — |

| | | Example 5 | Example 6 | Example 7 | Example 8 |
|---|---|---|---|---|---|
| (1) | LTLT/LTLW | 1.00 | 1.00 | 1.00 | 1.00 |
| (2), (2') | KMBT | 8.20 | 5.98 | 6.67 | 9.23 |

-continued

| | Example 5 | Example 6 | Example 7 | Example 8 |
|---|---|---|---|---|
| (3) fFB/fMB | 0.79 | 1.93 | 1.29 | 1.14 |
| (4) LTLT/fFF | 1.56 | 1.30 | 1.42 | 1.50 |
| (5) KIST | 1.51 | 1.77 | 1.94 | 1.45 |
| (6) ΔMVFB/LTLT | 0.24 | 0.25 | 0.30 | 0.17 |
| (7) \|fFF/fFB\| | 3.11 | 2.58 | 3.34 | 3.83 |
| (8) \|fMF/fMB\| | 0.71 | 1.53 | 1.13 | 0.80 |
| (9) vdFFp | 94.66 | 94.66 | 94.66 | 94.66 |
| (10) fMFLCi/fMF | 1.06 | 0.49 | 0.59 | 1.63 |
| (11) fMF1/fMF2 | 0.97 | 0.40 | 0.31 | — |
| (12) vdMBnmax − vdMBpmin | 24.61 | 19.97 | 32.77 | 23.87 |
| (13) vdRni | 17.98 | 17.98 | 17.98 | 20.88 |
| (14) vdR2n | 17.98 | 17.98 | 17.98 | 20.88 |
| (15) \|ΔFbT\|/FnoT | — | — | — | — |
| (16) \|fconLCOB/fconLCB\| | — | — | — | — |
| (17) (fT/FnoT)/LTC | — | — | — | — |
| (18) LR12/LT | — | — | — | — |
| (19) fwconT/fT | — | — | — | — |
| (20) ftconT/fT | — | — | — | — |
| (21) LconT/LT | — | — | — | — |
| (22) LconT/FbT | — | — | — | — |
| (23) FbT/RtconR | — | — | — | — |
| (24) FbT/RtconF | — | — | — | — |
| (25) vdconLc1 | — | — | — | — |
| (26) \|fconLCObj/fconLCM2\| | — | — | — | — |
| (27) \|FbT/RwconR\| | — | — | — | — |
| (28) \|RwconF/RwconR\| | — | — | — | — |

| | Example 9 | Example 10 | Example 11 | Example 12 |
|---|---|---|---|---|
| (1) LTLT/LTLW | — | 1.00 | — | 1.00 |
| (2), (2') KMBT | 14.40 | 6.93 | 10.82 | 6.96 |
| (3) fFB/fMB | — | 1.54 | — | 1.77 |
| (4) LTLT/fFF | — | 1.38 | — | 1.38 |
| (5) KIST | 1.81 | 1.49 | 1.86 | 1.73 |
| (6) ΔMVFB/LTLT | — | 0.22 | — | 0.22 |
| (7) \|fFF/fFB\| | — | 3.09 | — | 3.26 |
| (8) \|fMF/fMB\| | — | 1.17 | — | 1.75 |
| (9) vdFFp | — | 94.66 | — | 94.66 |
| (10) fMFLCi/fMF | — | 0.84 | — | 0.45 |
| (11) fMF1/fMF2 | — | 3.57 | — | 3.16 |
| (12) vdMBnmax − vdMBpmin | — | 29.88 | — | 15.96 |
| (13) vdRni | — | 22.76 | — | 22.76 |
| (14) vdR2n | 20.88 | 22.76 | 22.76 | 22.76 |
| (15) \|ΔFbT\|/FnoT | 0.00 | — | 0.00 | — |
| (16) \|fconLCOB/fconLCB\| | 0.687 | — | 1.365 | — |
| (17) (fT/FnoT)/LTC | 2.39 | — | 3.91 | — |
| (18) LR12/LT | 0.13 | — | 0.09 | — |
| (19) fwconT/fT | — | — | — | — |
| (20) ftconT/fT | 1.25 | — | 1.25 | — |
| (21) LconT/LT | 0.25 | — | 0.20 | — |
| (22) LconT/FbT | 2.64 | — | 2.17 | — |
| (23) FbT/RtconR | −0.82 | — | −0.32 | — |
| (24) FbT/RtconF | 1.26 | — | 1.78 | — |
| (25) vdconLc1 | 47.23 | — | 70.23 | — |
| (26) \|fconLCObj/fconLCM2\| | 2.49 | — | 2.44 | — |
| (27) \|FbT/RwconR\| | — | — | — | — |
| (28) \|RwconF/RwconR\| | — | — | — | — |

| | Example 13 | Example 14 | Example 15 | Example 16 |
|---|---|---|---|---|
| (1) LTLT/LTLW | — | 1.00 | — | 1.00 |
| (2), (2') KMBT | 10.90 | 7.05 | 11.00 | 7.96 |
| (3) fFB/fMB | — | 1.53 | — | 1.08 |
| (4) LTLT/fFF | — | 1.36 | — | 1.45 |
| (5) KIST | 2.16 | 1.72 | 2.14 | 1.42 |
| (6) ΔMVFB/LTLT | — | 0.21 | — | 0.17 |
| (7) \|fFF/fFB\| | — | 3.08 | — | 3.84 |
| (8) \|fMF/fMB\| | — | 1.15 | — | 0.76 |
| (9) vdFFp | — | 94.66 | — | 94.66 |
| (10) fMFLCi/fMF | — | 0.77 | — | 1.64 |
| (11) fMF1/fMF2 | — | 3.89 | — | — |
| (12) vdMBnmax − vdMBpmin | — | 29.88 | — | 23.87 |
| (13) vdRni | — | 22.76 | — | 20.88 |
| (14) vdR2n | 22.76 | 22.76 | 22.76 | 20.88 |
| (15) \|ΔFbT\|/FnoT | 0.00 | — | 0.00 | — |
| (16) \|fconLCOB/fconLCB\| | 1.2 | — | 1.193 | — |
| (17) (fT/FnoT)/LTC | 3.87 | — | 3.87 | — |
| (18) LR12/LT | 0.09 | — | 0.10 | — |
| (19) fwconT/fT | — | — | — | — |
| (20) ftconT/fT | 1.25 | — | 1.25 | — |
| (21) LconT/LT | 0.19 | — | 0.20 | — |
| (22) LconT/FbT | 2.10 | — | 2.18 | — |
| (23) FbT/RtconR | −0.67 | — | −0.76 | — |
| (24) FbT/RtconF | 1.89 | — | 1.91 | — |
| (25) vdconLc1 | 70.23 | — | 70.23 | — |
| (26) \|fconLCObj/fconLCM2\| | 2.67 | — | 2.69 | — |
| (27) \|FbT/RwconR\| | — | — | — | — |
| (28) \|RwconF/RwconR\| | — | — | — | — |

| | Example 17 | Example 18 | Example 19 | Example 20 |
|---|---|---|---|---|
| (1) LTLT/LTLW | — | — | 1.00 | 1.00 |
| (2), (2') KMBT | 15.71 | 4.07 | 10.29 | 6.80 |
| (3) fFB/fMB | — | — | 2.02 | 1.61 |
| (4) LTLT/fFF | — | — | 1.57 | 1.40 |
| (5) KIST | 2.01 | 1.02 | 1.47 | 1.49 |
| (6) ΔMVFB/LTLT | — | — | 0.16 | 0.21 |
| (7) \|fFF/fFB\| | — | — | 2.10 | 3.03 |
| (8) \|fMF/fMB\| | — | — | 1.54 | 1.29 |
| (9) vdFFp | — | — | 94.66 | 94.66 |
| (10) fMFLCi/fMF | — | — | 0.97 | 0.79 |
| (11) fMF1/fMF2 | — | — | 1.25 | 3.81 |
| (12) vdMBnmax − vdMBpmin | — | — | 26.84 | 29.88 |
| (13) vdRni | — | — | 17.98 | 25.42 |
| (14) vdR2n | 20.88 | 20.88 | 17.98 | 25.42 |
| (15) \|ΔFbT\|/FnoT | 0.00 | 0.00 | — | — |
| (16) \|fconLCOB/fconLCB\| | 1.057 | — | — | — |
| (17) (fT/FnoT)/LTC | 2.41 | — | — | — |
| (18) LR12/LT | 0.13 | 0.13 | — | — |
| (19) fwconT/fT | — | 0.72 | — | — |
| (20) ftconT/fT | 1.41 | — | — | — |
| (21) LconT/LT | 0.25 | 0.24 | — | — |
| (22) LconT/FbT | 2.46 | 2.40 | — | — |
| (23) FbT/RtconR | 0.06 | — | — | — |
| (24) FbT/RtconF | 1.39 | — | — | — |
| (25) vdconLc1 | 47.23 | — | — | — |

-continued

| | Example 17 | Example 18 | Example 19 | Example 20 |
|---|---|---|---|---|
| (26) \|fconLCObj/fconLCM2\| | 2.27 | — | — | — |
| (27) \|FbT/RwconR\| | — | 0.74 | — | — |
| (28) \|RwconF/RwconR\| | — | 1.27 | — | — |

| | Example 21 | Example 22 | Example 23 | Example 24 |
|---|---|---|---|---|
| (1) LTLT/LTLW | — | 1.11 | 0.94 | 1.00 |
| (2), (2') KMBT | 10.62 | 5.09 | 5.66 | 7.02 |
| (3) fFB/fMB | — | 1.16 | 1.09 | 1.50 |
| (4) LTLT/fFF | — | 1.31 | 1.45 | 1.33 |
| (5) KIST | 1.86 | 1.96 | 1.97 | 1.80 |
| (6) ΔMVFB/LTLT | — | 0.23 | 0.31 | 0.22 |
| (7) \|fFF/fFB\| | — | 3.90 | 3.57 | 3.25 |
| (8) \|fMF/fMB\| | — | 1.04 | 1.05 | 1.14 |
| (9) vdFFp | — | 94.66 | 94.66 | 94.66 |
| (10) fMFLCi/fMF | — | 0.58 | 0.59 | 1.01 |
| (11) fMF1/fMF2 | — | 0.17 | 0.25 | 2.04 |
| (12) vdMBnmax − vdMBpmin | — | 32.77 | 32.77 | 22.57 |
| (13) vdRni | — | 17.98 | 17.98 | 22.76 |
| (14) vdR2n | 25.42 | 17.98 | 17.98 | 22.76 |
| (15) \|ΔFbT\|/FnoT | 0.00 | — | — | — |
| (16) \|fconLCOB/fconLCB\| | 1.354 | — | — | — |
| (17) (fT/FnoT)/LTC | 3.91 | — | — | — |
| (18) LR12/LT | 0.09 | — | — | — |
| (19) fwconT/fT | — | — | — | — |
| (20) ftconT/fT | 1.25 | — | — | — |
| (21) LconT/LT | 0.20 | — | — | — |
| (22) LconT/FbT | 2.10 | — | — | — |
| (23) FbT/RtconR | −0.33 | — | — | — |
| (24) FbT/RtconF | 1.78 | — | — | — |
| (25) vdconLc1 | 70.23 | — | — | — |
| (26) \|fconLCObj/fconLCM2\| | 2.44 | — | — | — |
| (27) \|FbT/RwconR\| | — | — | — | — |
| (28) \|RwconF/RwconR\| | — | — | — | — |

| | Example 25 | Example 26 | Example 27 | Example 28 |
|---|---|---|---|---|
| (1) LTLT/LTLW | 1.00 | 1.00 | 1.00 | — |
| (2), (2') KMBT | 7.15 | 7.02 | 6.87 | |
| (3) fFB/fMB | 2.07 | 1.50 | 0.81 | — |
| (4) LTLT/fFF | 1.56 | 1.33 | 1.46 | — |
| (5) KIST | 1.49 | 1.80 | 1.83 | |
| (6) ΔMVFB/LTLT | 0.23 | 0.22 | 0.16 | — |
| (7) \|fFF/fFB\| | 2.22 | 3.25 | 4.23 | — |
| (8) \|fMF/fMB\| | 1.59 | 1.14 | 0.64 | — |
| (9) vdFFp | 94.66 | 94.66 | 94.66 | — |
| (10) fMFLCi/fMF | 0.86 | 1.01 | 1.71 | — |
| (11) fMF1/fMF2 | 2.97 | 2.04 | — | — |
| (12) vdMBnmax − vdMBpmin | 30.55 | 22.57 | 24.8 | — |
| (13) vdRni | 22.76 | 22.57 | 20.88 | — |
| (14) vdR2n | 22.76 | 22.57 | 20.88 | 20.88 |
| (15) \|ΔFbT\|/FnoT | — | — | — | 0.00 |
| (16) \|fconLCOB/fconLCB\| | — | — | — | 1.182 |
| (17) (fT/FnoT)/LTC | — | — | — | 4.38 |
| (18) LR12/LT | — | — | — | 0.07 |
| (19) fwconT/fT | — | — | — | — |
| (20) ftconT/fT | — | — | — | 1.25 |
| (21) LconT/LT | — | — | — | 0.21 |
| (22) LconT/FbT | — | — | — | 1.89 |
| (23) FbT/RtconR | — | — | — | 0.84 |

-continued

| | Example 25 | Example 26 | Example 27 | Example 28 |
|---|---|---|---|---|
| (24) FbT/RtconF | — | — | — | 1.42 |
| (25) vdconLc1 | — | — | — | — |
| (26) \|fconLCObj/fconLCM2\| | — | — | — | — |
| (27) \|FbT/RwconR\| | — | — | — | — |
| (28) \|RwconF/RwconR\| | — | — | — | — |

| | Example 29 | Example 30 | Example 31 | Example 32 |
|---|---|---|---|---|
| (1) LTLT/LTLW | 1.00 | 1.00 | 1.00 | 1.00 |
| (2a), (2a') KMBT | 6.46 | 6.80 | 6.05 | 5.58 |
| (3) fFB/fMB | 1.16 | 1.26 | 1.21 | 0.75 |
| (4) LTLT/fFF | 1.41 | 1.55 | 1.67 | 1.73 |
| (5) KIST | 1.96 | 1.93 | 1.77 | 1.80 |
| (6a) ΔMVFB/LTLT | 0.30 | 0.26 | 0.10 | 0.08 |
| (7) \|fFF/fFB\| | 3.40 | 3.41 | 3.22 | 3.55 |
| (29) \|fMF2/fMB\| | 1.84 | 1.74 | 1.71 | 1.72 |
| (9) vdFFp | 94.66 | 94.66 | 94.66 | 94.66 |
| (12) vdMBnmax − vdMBpmin | 20.08 | 32.77 | — | — |
| (30) vdMBn | — | — | 52.32 | 47.92 |
| (13a) vdRni | 17.98 | 17.98 | 29.13 | 29.13 |
| (14a) vdR2n | 17.98 | 17.98 | 29.13 | — |
| (15) \|ΔFbT\|/FnoT | — | — | — | — |
| (18) LR12/LT | — | — | — | — |
| (20) ftconT/fT | — | — | — | — |
| (21) LconT/LT | — | — | — | — |
| (22) LconT/FbT | — | — | — | — |
| (23) FbT/RtconR | — | — | — | — |
| (24) FbT/RtconF | — | — | — | — |
| (25) vdconLc1 | — | — | — | — |
| (26) \|fconLCObj/fconLCM2\| | — | — | — | — |

| | Example 33 | Example 34 | Example 35 | Example 36 |
|---|---|---|---|---|
| (1) LTLT/LTLW | — | 1.00 | — | 1.13 |
| (2a), (2a') KMBT | 5.58 | 5.71 | 8.92 | 6.06 |
| (3) fFB/fMB | — | 0.71 | — | 1.53 |
| (4) LTLT/fFF | — | 1.72 | — | 1.27 |
| (5) KIST | 2.25 | 1.79 | 2.24 | 1.50 |
| (6a) ΔMVFB/LTLT | — | 0.08 | — | 0.115 |
| (7) \|fFF/fFB\| | — | 3.53 | — | 3.27 |
| (29) \|fMF2/fMB\| | — | 2.07 | — | 1.24 |
| (9) vdFFp | 94.66 | 94.66 | 94.66 | 94.66 |
| (12) vdMBnmax − vdMBpmin | — | — | — | 8.66 |
| (30) vdMBn | — | 47.92 | — | — |
| (13a) vdRni | — | 29.13 | — | 22.76 |
| (14a) vdR2n | 29.13 | — | 29.13 | 22.76 |
| (15) \|ΔFbT\|/FnoT | 0.00 | — | 0.00 | — |
| (18) LR12/LT | 0.11 | — | 0.13 | — |
| (20) ftconT/fT | 1.25 | — | 1.25 | — |
| (21) LconT/LT | 0.21 | — | 0.22 | — |
| (22) LconT/FbT | 2.46 | — | 2.46 | — |
| (23) FbT/RtconR | −0.17 | — | | |

| | Example 33 | Example 34 | Example 35 | Example 36 |
|---|---|---|---|---|
| (24) FbT/RtconF | 1.58 | — | 1.66 | — |
| (25) vdconLc1 | 52.43 | — | 52.43 | — |
| (26) \|fconLCObj/fconLCM2\| | 2.07 | — | 2.17 | — |

| | Example 37 | Example 38 | Example 39 | Example 40 |
|---|---|---|---|---|
| (1) LTLT/LTLW | 0.96 | 1.00 | 1.00 | — |
| (2a), (2a') KMBT | 6.43 | 10.29 | 6.80 | 10.62 |
| (3) fFB/fMB | 1.53 | 2.02 | 1.61 | — |
| (4) LTLT/fFF | 1.33 | 1.57 | 1.40 | — |
| (5) KIST | 1.52 | 1.47 | 1.49 | 1.87 |
| (6a) ΔMVFB/LTLT | 0.31 | 0.16 | 0.21 | — |
| (7) \|fFF/fFB\| | 3.04 | 2.10 | 3.03 | — |

| | Example 37 | Example 38 | Example 39 | Example 40 |
|---|---|---|---|---|
| (29) \|fMF2/fMB\| | 1.02 | 1.86 | 1.02 | — |
| (9) vdFFp | 94.66 | 94.66 | 94.66 | 94.66 |
| (12) vdMBnmax − vdMBpmin | 29.88 | 26.84 | 29.88 | — |
| (30) vdMBn | — | — | — | — |
| (13a) vdRni | 22.76 | 17.98 | 25.42 | — |
| (14a) vdR2n | 22.76 | 17.98 | 25.42 | 25.42 |
| (15) \|ΔFbT\|/FnoT | — | — | — | 0.00 |
| (18) LR12/LT | — | — | — | 0.09 |
| (20) ftconT/fT | — | — | — | 1.25 |
| (21) LconT/LT | — | — | — | 0.19 |
| (22) LconT/FbT | — | — | — | 2.10 |
| (23) FbT/RtconR | — | — | — | −0.33 |
| (24) FbT/RtconF | — | — | — | 1.78 |
| (25) vdconLc1 | — | — | — | 70.23 |
| (26) \|fconLCObj/fconLCM2\| | — | — | — | 2.44 |

| | Example 41 | Example 42 | Example 43 | Example 44 |
|---|---|---|---|---|
| (21b), (21b') LconT/LT | — | 0.20 | — | 0.25 |
| (22), (22b) LconT/FbT | — | 2.17 | — | 2.64 |
| (23), (23b') FbT/RtconR | — | −0.32 | — | −0.82 |
| (24), (24b), (24b') FbT/RtconF | — | 1.78 | — | 1.26 |
| (26), (26b) \|fconLCObj/fconLCM2\| | — | 2.44 | — | 2.49 |
| (16), (16b) \|fconLCOB/fconLCB\| | — | 1.365 | — | 0.687 |
| (17), (17b) (fT/FnoT)/LTC | — | 3.912 | — | 2.385 |
| (15) \|ΔFbT\|/FnoT | — | 0.00 | — | 0.00 |
| (18) LR12/LT | — | 0.09 | — | 0.13 |
| (20) ftconT/fT | — | 1.25 | — | 1.25 |
| (25) vdconLc1 | — | 70.23 | — | 47.23 |
| (31) LTLL/LTLS | — | 1.00 | — | 1.00 |
| (2b) KMBT | 6.93 | — | 9.23 | — |

| | Example 45 | Example 46 | Example 47 | Example 48 |
|---|---|---|---|---|
| (21b), (21b') LconT/LT | — | 0.21 | — | 0.19 |
| (22), (22b) LconT/FbT | — | 2.47 | — | 2.06 |
| (23), (23b') FbT/RtconR | — | 0.10 | — | 0.14 |
| (24), (24b), (24b') FbT/RtconF | — | 1.58 | — | 1.76 |
| (26), (26b) \|fconLCObj/fconLCM2\| | — | 2.07 | — | 2.61 |
| (16), (16b) \|fconLCOB/fconLCB\| | — | 0.758 | — | 1.494 |
| (17), (17b) (fT/FnoT)/LTC | — | 3.077 | — | 4.321 |
| (15) \|ΔFbT\|/FnoT | — | 0.00 | — | 0.01 |
| (18) LR12/LT | — | 0.11 | — | 0.08 |
| (20) ftconT/fT | — | 1.25 | — | 1.25 |
| (25) vdconLc1 | — | 52.43 | — | 70.23 |
| (31) LTLL/LTLS | — | 1.00 | — | 1.00 |
| (2b) KMBT | 5.58 | — | 6.57 | — |

| | Example 49 | Example 50 | Example 51 | Example 52 |
|---|---|---|---|---|
| (21b), (21b') LconT/LT | — | 0.20 | — | 0.27 |
| (22), (22b) LconT/FbT | — | 2.18 | — | 3.02 |
| (23), (23b') FbT/RtconR | — | −0.76 | — | 0.05 |
| (24), (24b), (24b') FbT/RtconF | — | 1.91 | — | 1.15 |
| (26), (26b) \|fconLCObj/fconLCM2\| | — | 2.69 | — | 1.71 |
| (16), (16b) \|fconLCOB/fconLCB\| | — | 1.193 | — | 0.81 |
| (17), (17b) (fT/FnoT)/LTC | — | 3.875 | — | 1.927 |
| (15) \|ΔFbT\|/FnoT | — | 0.00 | — | 0.00 |
| (18) LR12/LT | — | 0.10 | — | 0.16 |

-continued

| | Example 49 | Example 50 | Example 51 | Example 52 |
|---|---|---|---|---|
| (20) ftconT/fT | — | 1.25 | — | 1.40 |
| (25) νdconLc1 | — | 70.23 | — | 64.14 |
| (31) LTLL/LTLS | — | 1.00 | — | 1.00 |
| (2b) KMBT | 7.05 | — | — | — |

| | Example 53 | Example 54 | Example 55 | Example 56 |
|---|---|---|---|---|
| (21b), (21b') LconT/LT | — | 0.25 | — | 0.19 |
| (22), (22b) LconT/FbT | — | 2.46 | — | 2.25 |
| (23), (23b') FbT/RtconR | — | 0.06 | — | −0.68 |
| (24), (24b), (24b') FbT/RtconF | — | 1.39 | — | 1.86 |
| (26), (26b) \|fconLCObj/fconLCM2\| | — | 2.27 | — | 2.80 |
| (16), (16b) \|fconLCOB/fconLCB\| | — | 1.057 | — | 1.234 |
| (17), (17b) (fT/FnoT)/LTC | — | 2.403 | — | 3.75 |
| (15) \|ΔFbT\|/FnoT | — | 0.00 | — | 0.00 |
| (18) LR12/LT | — | 0.13 | — | 0.08 |
| (20) ftconT/fT | — | 1.41 | — | 1.26 |
| (25) νdconLc1 | — | 47.23 | — | 70.23 |
| (31) LTLL/LTLS | — | 1.00 | — | 1.18 |
| (2b) KMBT | 7.96 | — | 6.97 | — |

| | Example 57 | Example 58 |
|---|---|---|
| (21b), (21b') LconT/LT | — | 0.21 |
| (22), (22b) LconT/FbT | — | 1.89 |
| (23), (23b') FbT/RtconR | — | 0.84 |
| (24), (24b), (24b') FbT/RtconF | — | 1.42 |
| (26), (26b) \|fconLCObj/fconLCM2\| | — | 1.18 |
| (16), (16b) \|fconLCOB/fconLCB | — | 1.182 |
| (17), (17b) (fT/FnoT)/LTC | — | 4.384 |
| (15) \|ΔFbT\|/FnoT | — | 0.00 |
| (18) LR12/LT | — | 0.07 |
| (20) ftconT/fT | — | 1.25 |
| (25) νdconLc1 | — | 52.43 |
| (31) LTLL/LTLS | — | 1.00 |
| (2b) KMBT | 6.87 | — |

Figure 117:
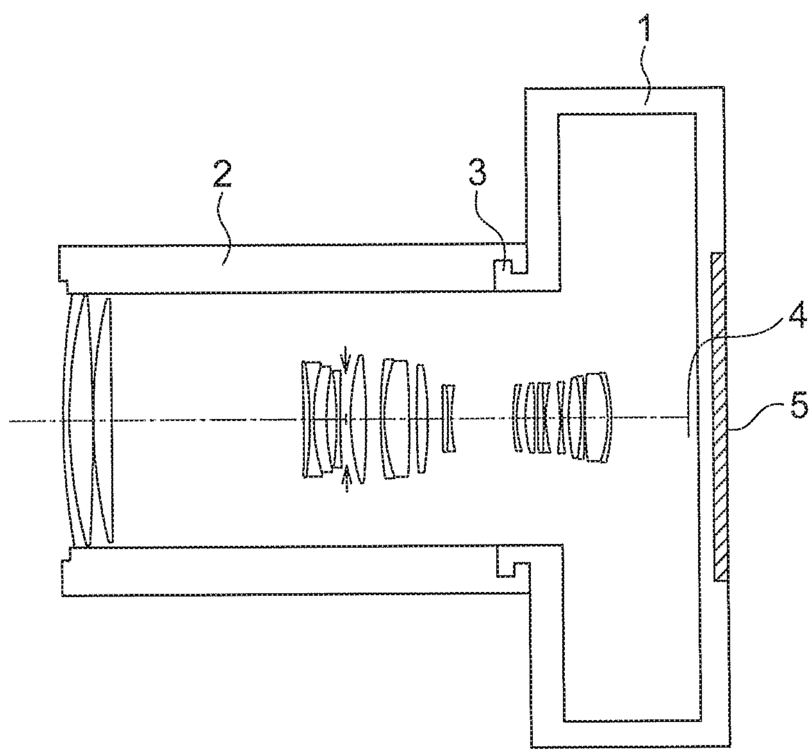
FIG. 117 is a cross-sectional view of an image pickup apparatus.

FIG. 117 is a cross-sectional view of a single-lens mirrorless camera as an electronic image pickup apparatus. In FIG. 117, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the zoom optical system or the image pickup optical system described in any one of the examples is used.

Figure 118:
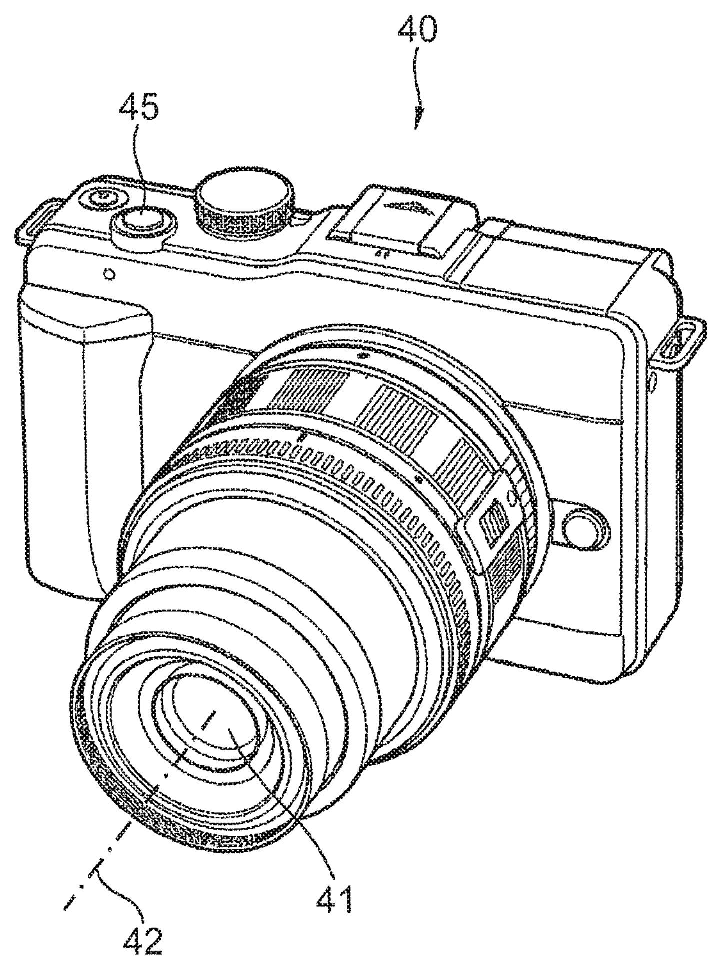
FIG. 118 is a front perspective view of the image pickup apparatus.
Figure 119:
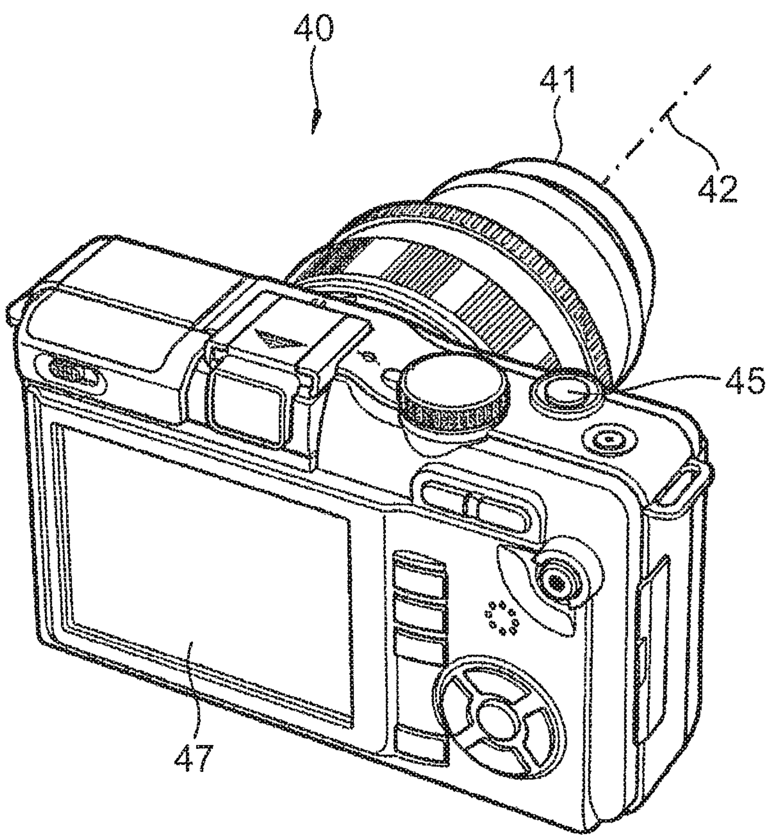
FIG. 119 is a rear perspective view of the image pickup apparatus.

FIG. 118 and FIG. 119 are conceptual diagrams of an arrangement of the image pickup apparatus. FIG. 118 is a front perspective view of a digital camera 40 as the image pickup apparatus, and FIG. 119 is a rear perspective view of the digital camera 40. The zoom optical system or the image pickup optical system according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom optical system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 120:
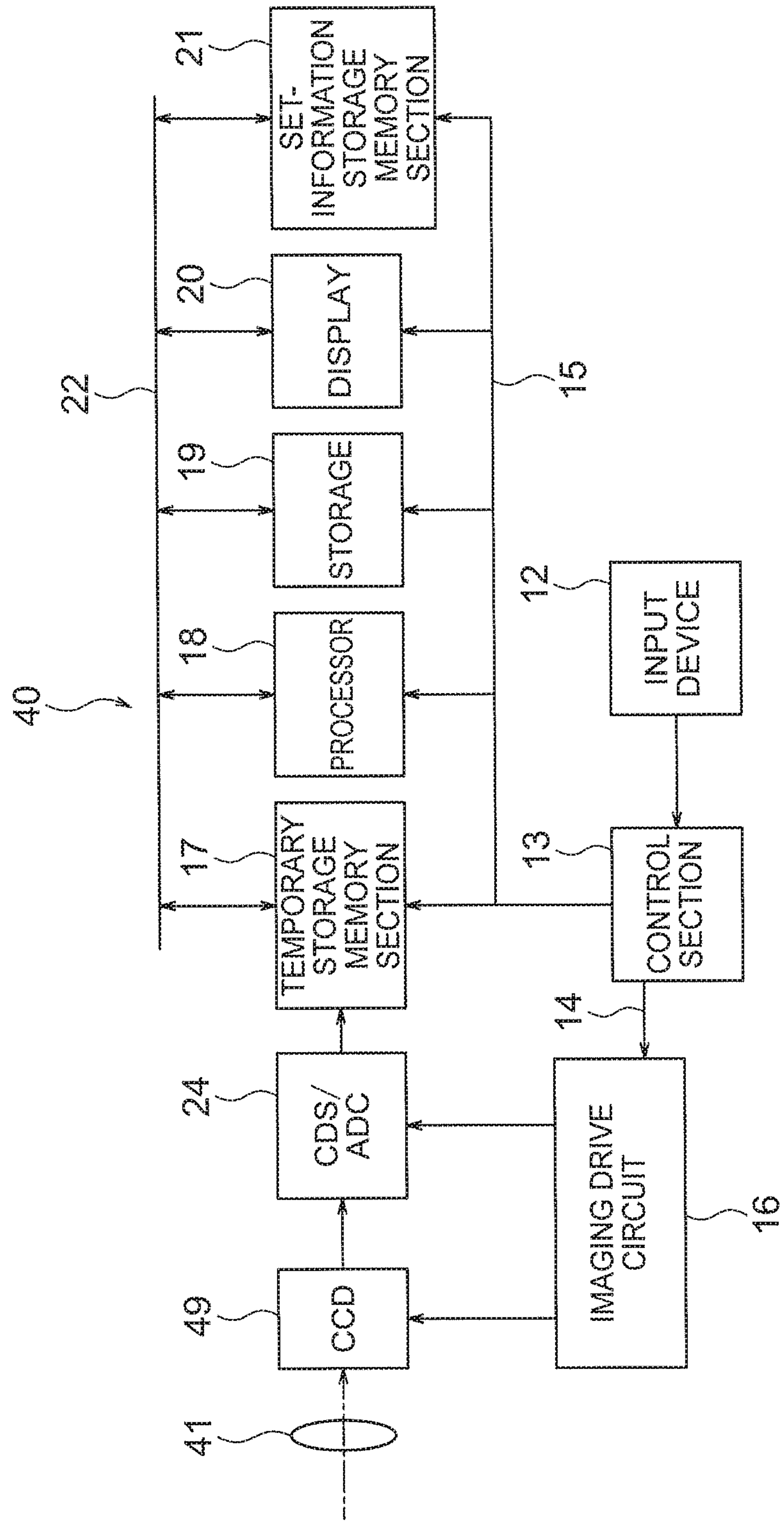

FIG. 120 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 120, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is an image pickup element which is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

The present invention can have various modified examples without departing from the scope of the invention. Moreover, shapes of lenses and the number of lenses are not necessarily restricted to the shapes and the number of lenses indicated in the examples. A lens that is not shown in the diagrams of the examples described above, and that does not have a refractive power practically may be disposed in a lens unit or outside the lens unit.

According to the present embodiment, it is possible to provide a zoom optical system, an image pickup optical system, and an image pickup apparatus using the same having a superior operability and mobility, and in which aberrations are corrected favorably.

According to the present embodiment, it is possible to provide an image pickup optical system and an image pickup apparatus using the same having a superior stability and mobility, and in which aberrations are corrected favorably.

As described heretofore, the present invention is suitable for a zoom optical system, an image pickup optical system, and an image pickup apparatus using the same having a superior operability and mobility, and in which aberrations are corrected favorably.

The present invention is suitable for an image pickup optical system, and an image pickup apparatus using the same having a superior stability and mobility, and in which aberrations are corrected favorably.

What is claimed is:

1. A zoom optical system, comprising:

a front-side lens unit which is disposed nearest to an object;

an intermediate lens unit; and a rear-side lens unit which is disposed nearest to an image, wherein:

the front-side lens unit includes, in order from an object side, a first front unit having a positive refractive power and a second front unit having a negative refractive power, each of the first front unit and the second front unit includes a positive lens and a negative lens, a distance between the first front unit and the second front unit is wider at a telephoto end than at a wide angle end, the intermediate lens unit includes, in order from the object side, a first intermediate unit having a positive refractive power and a second intermediate unit having a negative refractive power, the first intermediate unit includes a positive lens and a negative lens, a distance between the first intermediate unit and the second front unit is narrower at the telephoto end than at the wide angle end, a distance between the second intermediate unit and a lens unit adjacent to the second intermediate unit on an image side varies at a time of zooming or at a time of focusing, the second intermediate unit moves toward the image side at the time of focusing from a far point to a near point, the rear-side lens unit includes a positive lens and a negative lens, and the following conditional expressions (1) and (2) are satisfied:

$$0.9 \le LTLT/LTLW \le 1.17 \quad (1)$$

$$4.2 \le KMBT \le 20.0 \quad (2)$$

where,

LTLW denotes an overall length of the zoom optical system at the wide angle end, LTLT denotes an overall length of the zoom optical system at the telephoto end, and here the overall length is a distance from a lens surface positioned nearest to the object up to an image plane, $$KMBT = |MGMBT\text{back}^2 \times (MGMBT^2 - 1)|, \text{ where}$$

MGMBTback denotes a lateral magnification of a first predetermined optical system at the telephoto end, MGMBT denotes a lateral magnification of the second intermediate unit at the telephoto end, and here the first predetermined optical system is an optical system which includes all lenses positioned on the image side of the second intermediate unit, and the lateral magnification is a lateral magnification at a time of infinite object point focusing.

2. The zoom optical system according to claim 1, wherein the following conditional expression (3) is satisfied:

$$0.45 \leq fFB/fMB \leq 3.0 \quad (3)$$

where, fFB denotes a focal length of the second front unit, and fMB denotes a focal length of the second intermediate unit.

3. The zoom optical system according to claim 1, wherein the following conditional expression (4) is satisfied:

$$0.7 \leq LTLT/fFF \leq 3.0 \quad (4)$$

where, fFF denotes a focal length of the first front unit.

4. The zoom optical system according to claim 1, wherein the following conditional expression (5) is satisfied:

$$0.7 \leq KIST \leq 3.5 \quad (5)$$

where, $$KIST = |MGISTback \times (MGIST - 1)|, \text{ where}$$

MGISTback denotes a lateral magnification of a second predetermined optical system at the telephoto end, and MGIST denotes a lateral magnification of a motion blur correction lens unit at the telephoto end, and here the second predetermined optical system is an optical system which includes all lenses positioned on the image side of the motion blur correction lens unit, and the lateral magnification is a lateral magnification at the time of infinite object point focusing.

5. The zoom optical system according to claim 1, wherein the following conditional expression (6) is satisfied:

$$0.06 \leq \Delta MVFB/LTLT \leq 0.45 \quad (6)$$

where,

ΔMVFB denotes the maximum amount of movement of the second front unit at the time of zooming.

6. The zoom optical system according to claim 1, wherein the following conditional expression (7) is satisfied:

$$1.6 \leq |fFF/fFB| \leq 5.0 \quad (7)$$

where, fFF denotes a focal length of the first front unit, and fFB denotes a focal length of the second front unit.

7. The zoom optical system according to claim 1, wherein the following conditional expression (8) is satisfied:

$$0.4 \leq |fMF/fMB| \leq 3.5 \quad (8)$$

where, fMF denotes a focal length of the first intermediate unit, and fMB denotes a focal length of the second intermediate unit.

8. The zoom optical system according to claim 1, wherein only three lens units move at the time of zooming.

9. The zoom optical system according to claim 1, wherein a lens unit which moves at the time of zooming is only a lens unit having a negative refractive power.

10. A zoom optical system, comprising:

a front-side lens unit which is disposed nearest to an object;

an intermediate lens unit; and a rear-side lens unit which is disposed nearest to an image, wherein:

the front-side lens unit includes, in order from an object side, a first front unit having a positive refractive power and a second front unit having a negative refractive power, each of the first front unit and the second front unit includes a positive lens and a negative lens, a distance between the first front unit and the second front unit is wider at a telephoto end than at a wide angle end, the intermediate lens unit includes, in order from the object side, a first intermediate unit having a positive refractive power and a second intermediate unit having a negative refractive power, the first intermediate unit includes a positive lens and a negative lens, a distance between the first intermediate unit and the second front unit is narrower at the telephoto end than at the wide angle end, a distance between the second intermediate unit and a lens unit adjacent to the second intermediate unit on an image side varies at a time of zooming or a time of focusing, the second intermediate unit moves toward the image side at the time of focusing from a far point to a near point, the rear-side lens unit includes a positive lens and a negative lens, a motion blur correction lens unit is included between the first intermediate unit and an image plane, an image blur is corrected by the motion blur correction lens unit being moved in a direction perpendicular to an optical axis, and the following conditional expressions (1) and (2) are satisfied:

$$0.9 \leq LTLT/LTLW \leq 1.17 \quad (1)$$

$$4.2 \leq KMBT \leq 20.0 \quad (2)$$

where,

LTLW denotes an overall length of the zoom optical system at the wide angle end, LTLT denotes an overall length of the zoom optical system at the telephoto end, and here the overall length is a distance from a lens surface positioned nearest to the object up to the image plane, $$KMBT = |MGMBTback^2 \times (MGMBT^2 - 1)|, \text{ where}$$

MGMBTback denotes a lateral magnification of a first predetermined optical system at the telephoto end, MGMBT denotes a lateral magnification of the second intermediate unit at the telephoto end, and here the first predetermined optical system is an optical system which includes all lenses positioned on the image side of the second intermediate unit, and the lateral magnification is a lateral magnification at a time of infinite object point focusing.

11. The zoom optical system according to claim 10, wherein the motion blur correction lens unit is disposed in the rear-side lens unit.

12. A zoom optical system, comprising:

a front-side lens unit which is disposed nearest to an object;

an intermediate lens unit; and a rear-side lens unit which is disposed nearest to an image, wherein:

the front-side lens unit includes, in order from an object side, a first front unit having a positive refractive power and a second front unit having a negative refractive power, each of the first front unit and the second front unit includes a positive lens and a negative lens, a distance between the first front unit and the second front unit is wider at a telephoto end than at a wide angle end, the intermediate lens unit includes, in order from the object side, a first intermediate unit having a positive refractive power and a second intermediate unit having a negative refractive power, the first intermediate unit includes a positive lens and a negative lens, a distance between the first intermediate unit and the second front unit is narrower at the telephoto end than at the wide angle end, a distance between the second intermediate unit and a lens unit adjacent to the second intermediate unit on an image side varies at a time of zooming or at a time of focusing, the second intermediate unit moves toward the image side at the time of focusing from a far point to a near point, the rear-side lens unit includes a positive lens and a negative lens, a motion blur correction lens unit is included between the first intermediate unit and an image plane, an image blur is corrected by the motion blur correction lens unit being moved in a direction perpendicular to an optical axis, and the following conditional expressions (1) and (2') are satisfied:

$$0.9 \leq LTLT/LTLW \leq 1.17 \quad (1)$$

$$4.2 \leq KMBT \leq 20.0 \quad (2)$$

where,

LTLW denotes an overall length of the zoom optical system at the wide angle end, LTLT denotes an overall length of the zoom optical system at the telephoto end, and here the overall length is a distance from a lens surface positioned nearest to the object up to the image plane, $KMBT = |MGMBT\text{back}^2 \times (MGMBT^2 - 1)|$, where MGMBTback denotes a lateral magnification of a first predetermined optical system at the telephoto end, MGMBT denotes a lateral magnification of the second intermediate unit at the telephoto end, and here the first predetermined optical system is an optical system which includes all lenses positioned on the image side of the second intermediate unit, and the lateral magnification is a lateral magnification at a time of infinite object point focusing.

* * * * *